(12) United States Patent
Caneba

(10) Patent No.: US 7,143,912 B2
(45) Date of Patent: Dec. 5, 2006

(54) CUSTOMIZING PACK CARRIER ON WHEELS

(76) Inventor: Mary Ann Caneba, 302 W. Jacker Ave., Houghton, MI (US) 49931

( * ) Notice: Subject to any disclaimer, the term of this patent is extended or adjusted under 35 U.S.C. 154(b) by 319 days.

(21) Appl. No.: 09/858,012

(22) Filed: May 14, 2001

(65) Prior Publication Data

US 2002/0043544 A1    Apr. 18, 2002

Related U.S. Application Data

(60) Provisional application No. 60/240,104, filed on Oct. 16, 2000.

(51) Int. Cl.
*A45F 4/02* (2006.01)

(52) U.S. Cl. ............... 224/153; 224/417; 224/584; 280/47.18; 280/654

(58) Field of Classification Search ............. 224/153, 224/417, 584, 576; 280/47.18, 30, 645, 654
See application file for complete search history.

(56) References Cited

U.S. PATENT DOCUMENTS

| | | | | |
|---|---|---|---|---|
| 2,401,986 | A * | 6/1946 | Talbott | 280/645 |
| 3,560,015 | A | 2/1971 | Tracy et al. | |
| 3,998,476 | A | 12/1976 | Kazmark | |
| 4,105,247 | A | 8/1978 | Saint | |
| 4,248,367 | A * | 2/1981 | Buel | 224/153 |
| 4,362,307 | A * | 12/1982 | Nakatani | 280/30 |
| 4,368,835 | A | 1/1983 | Murphy | |
| 4,433,802 | A * | 2/1984 | Woolf | 224/153 |
| 4,523,773 | A * | 6/1985 | Holtz | 280/654 |
| 4,634,177 | A | 1/1987 | Meeker | |
| 5,149,032 | A | 9/1992 | Jones et al. | |
| 5,161,811 | A | 11/1992 | Cheng | |
| 5,199,811 | A | 4/1993 | Huang | |
| 5,374,073 | A | 12/1994 | Hung-Hsin | |
| 5,397,151 | A | 3/1995 | Jserng | |
| 5,433,358 | A * | 7/1995 | Millard | 224/153 |
| 5,487,498 | A | 1/1996 | Gleason | |
| 5,529,229 | A | 6/1996 | Fier | |
| 5,573,302 | A | 11/1996 | Harrison | |
| 5,609,278 | A * | 3/1997 | Fresco | 224/153 |
| 5,667,117 | A * | 9/1997 | Nutto | 224/417 |
| 5,676,293 | A | 10/1997 | Farris | |
| 5,722,725 | A | 3/1998 | McNaughton | |
| 5,810,230 | A * | 9/1998 | Nutto | 224/417 |
| 5,893,495 | A | 4/1999 | Godshaw | |
| 5,984,154 | A | 11/1999 | Scicluna | |
| 5,984,157 | A | 11/1999 | Swetish | |
| 6,012,729 | A * | 1/2000 | Lin | 280/47.18 |
| 6,024,265 | A | 2/2000 | Clements | |
| 6,029,875 | A * | 2/2000 | Johnston | 224/417 |
| 6,164,509 | A | 12/2000 | Gausling et al. | |

* cited by examiner

*Primary Examiner*—Stephen K. Cronin

(57) ABSTRACT

A customizing pack carrier having one or a combination of independently unique and novel components comprising a main frame assembled of elongated or planar members having fixed or height-adjustable pack retainers, a single-handed operating method for adjusting retainer height, a support base that manually or self-adjusts to the depth of the pack, a quasi-permanent height-adjustable handle, an outer layer on an extendible main frame that can function as an amusing accessory and as part of a strap-lifting apparatus, a concealable seat and inclinable main frame combination, an ergonomically designed removable or non-removable back support, and a detachable shoulder harness, is provided.

The main frame is adapted for use on ground casters, on upright and recumbent bikes, and on scooters.

A one-piece clasping article for temporarily connecting any two tubes side by side as in connecting a tubular main frame to a tubular bike frame is also provided.

27 Claims, 175 Drawing Sheets

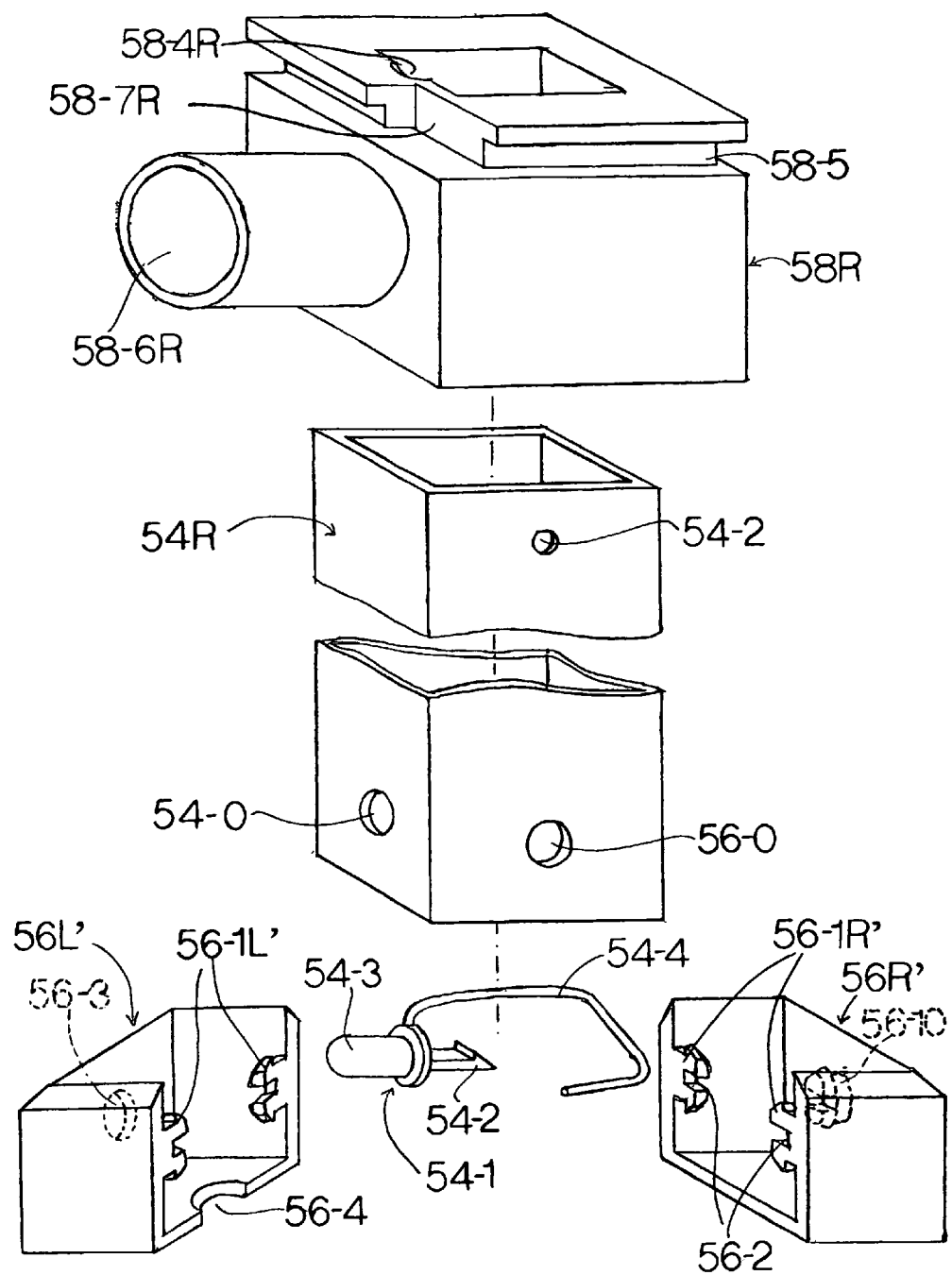
FIG.3-A

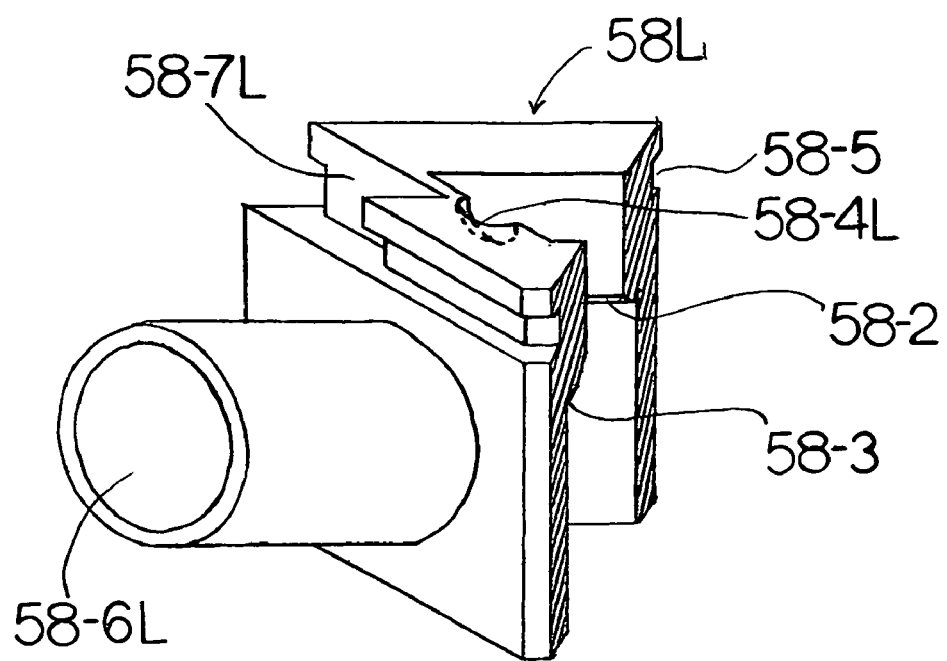
FIG. 3-B

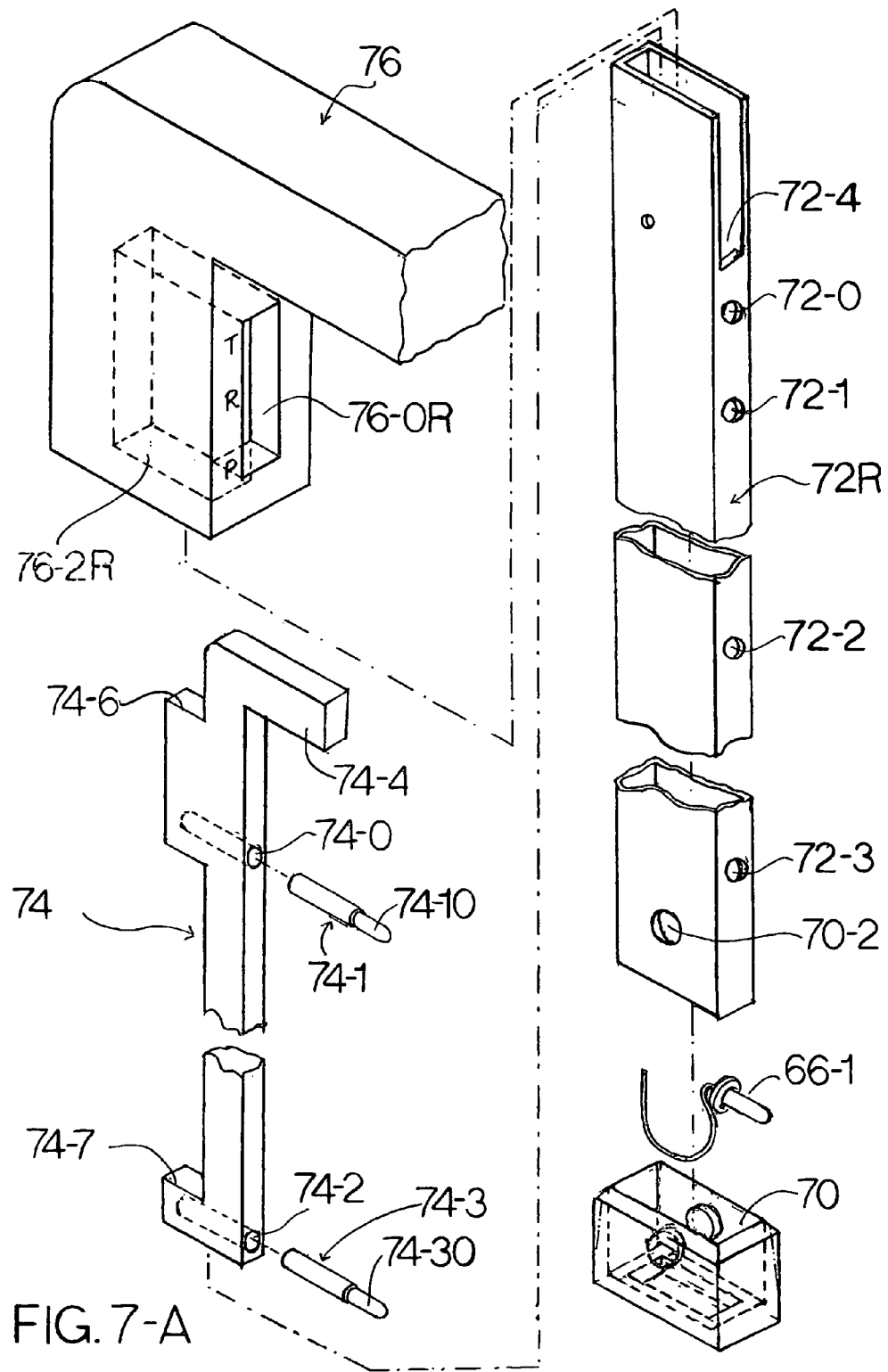
FIG. 7-A

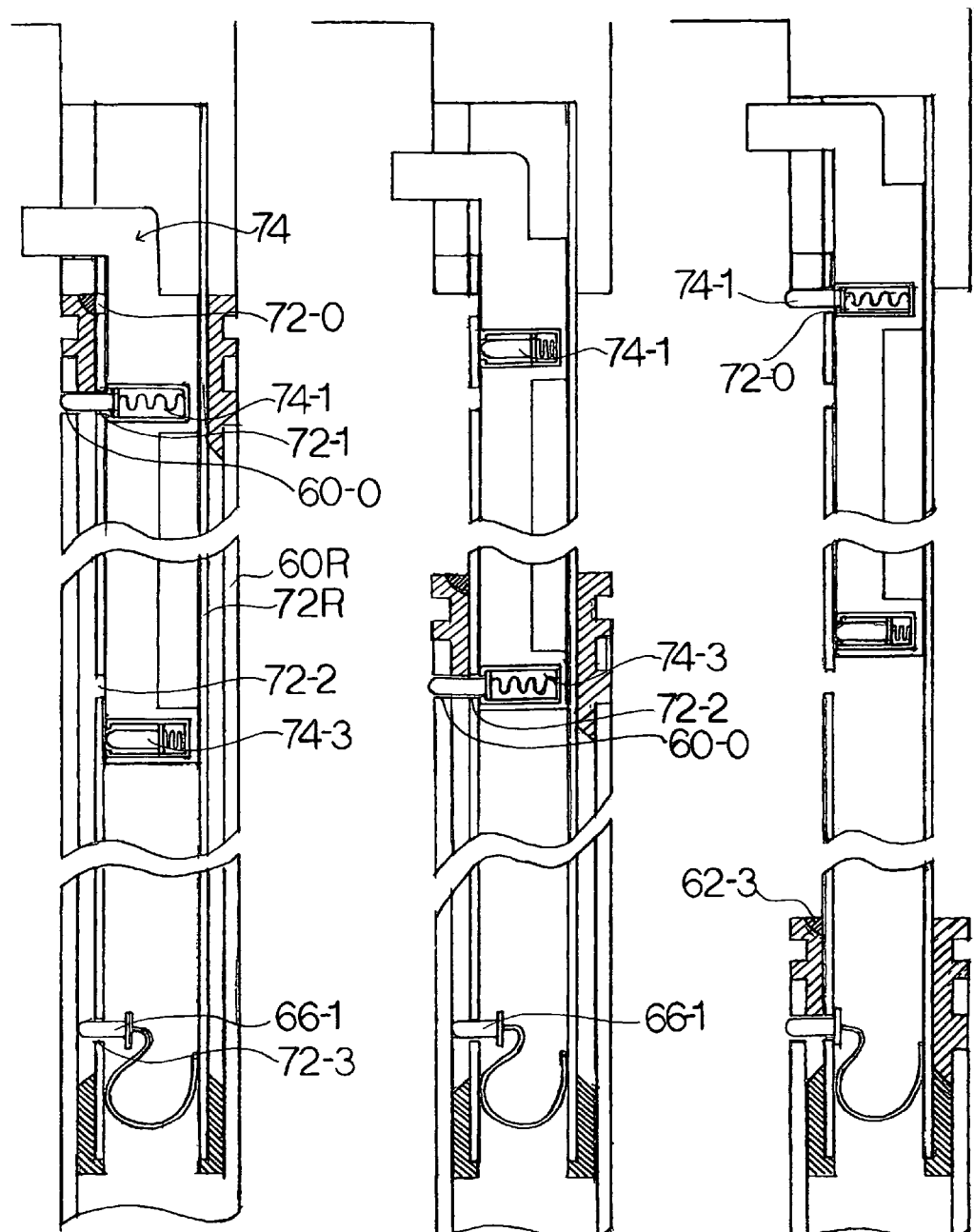
FIG. 7-BA    FIG. 7-BB    FIG. 7-BC

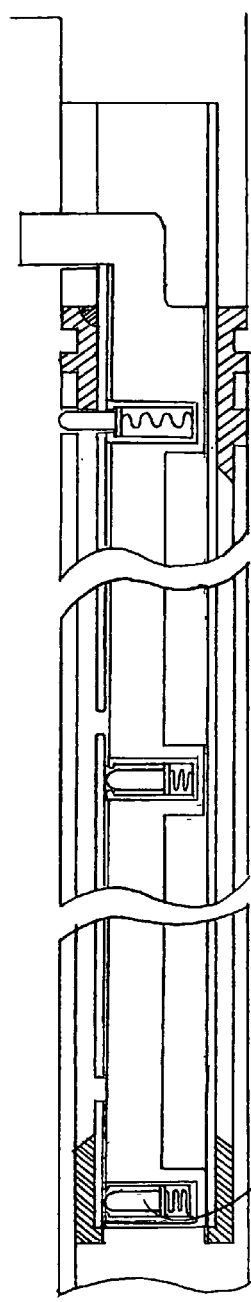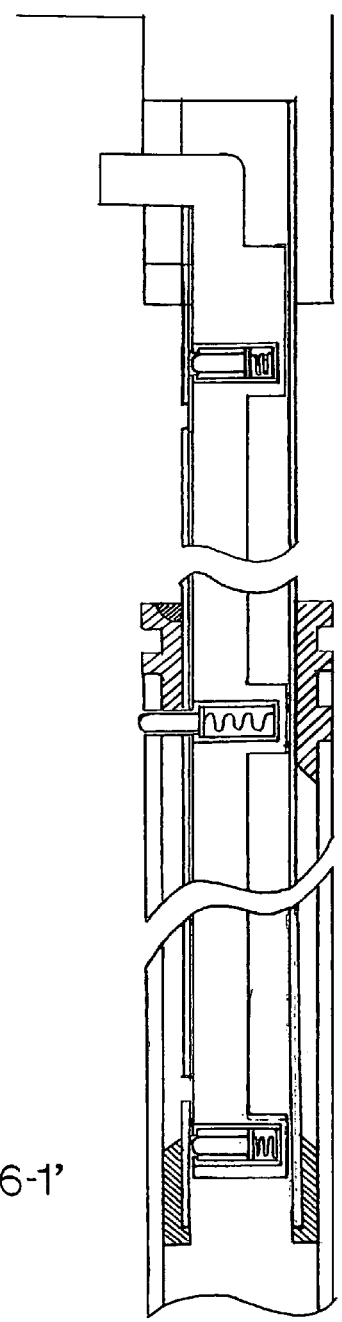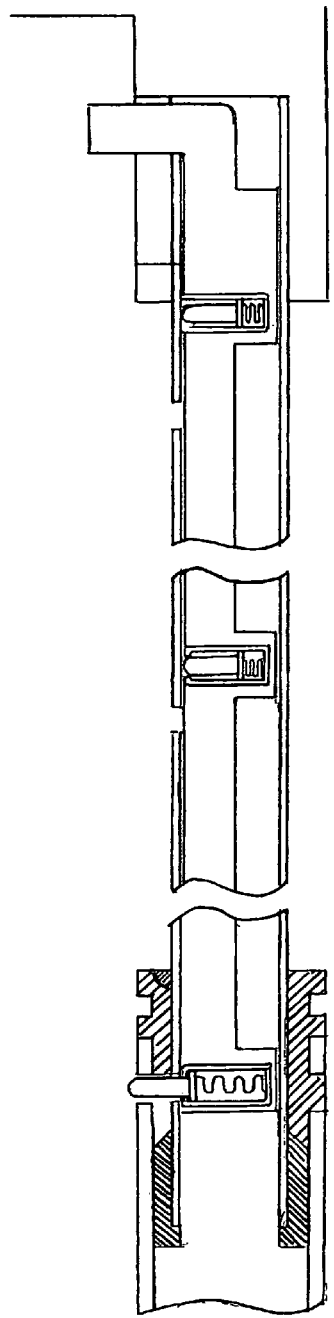
FIG. 7-CA  FIG. 7-CB  FIG. 7-CC

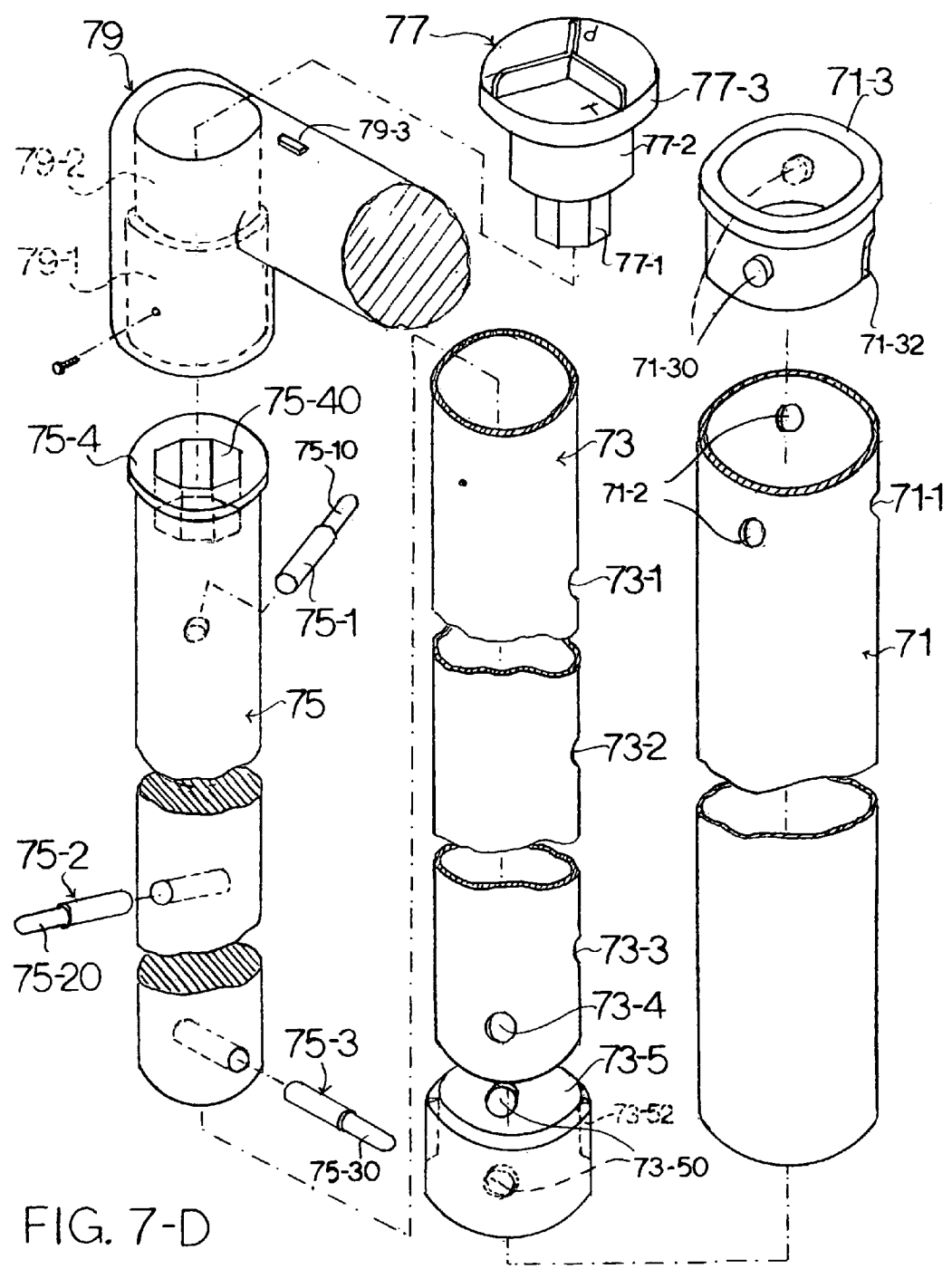
FIG. 7-D

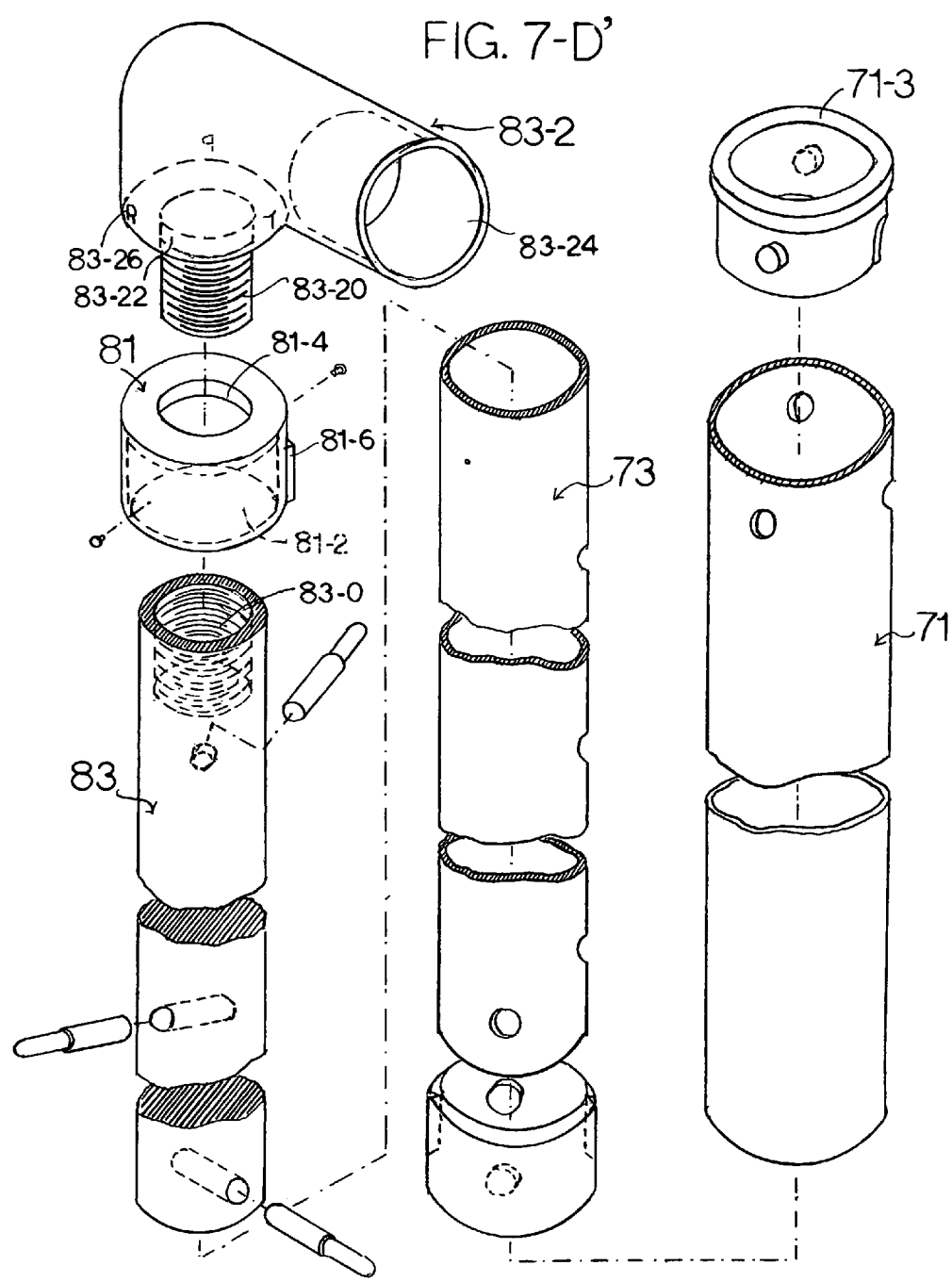

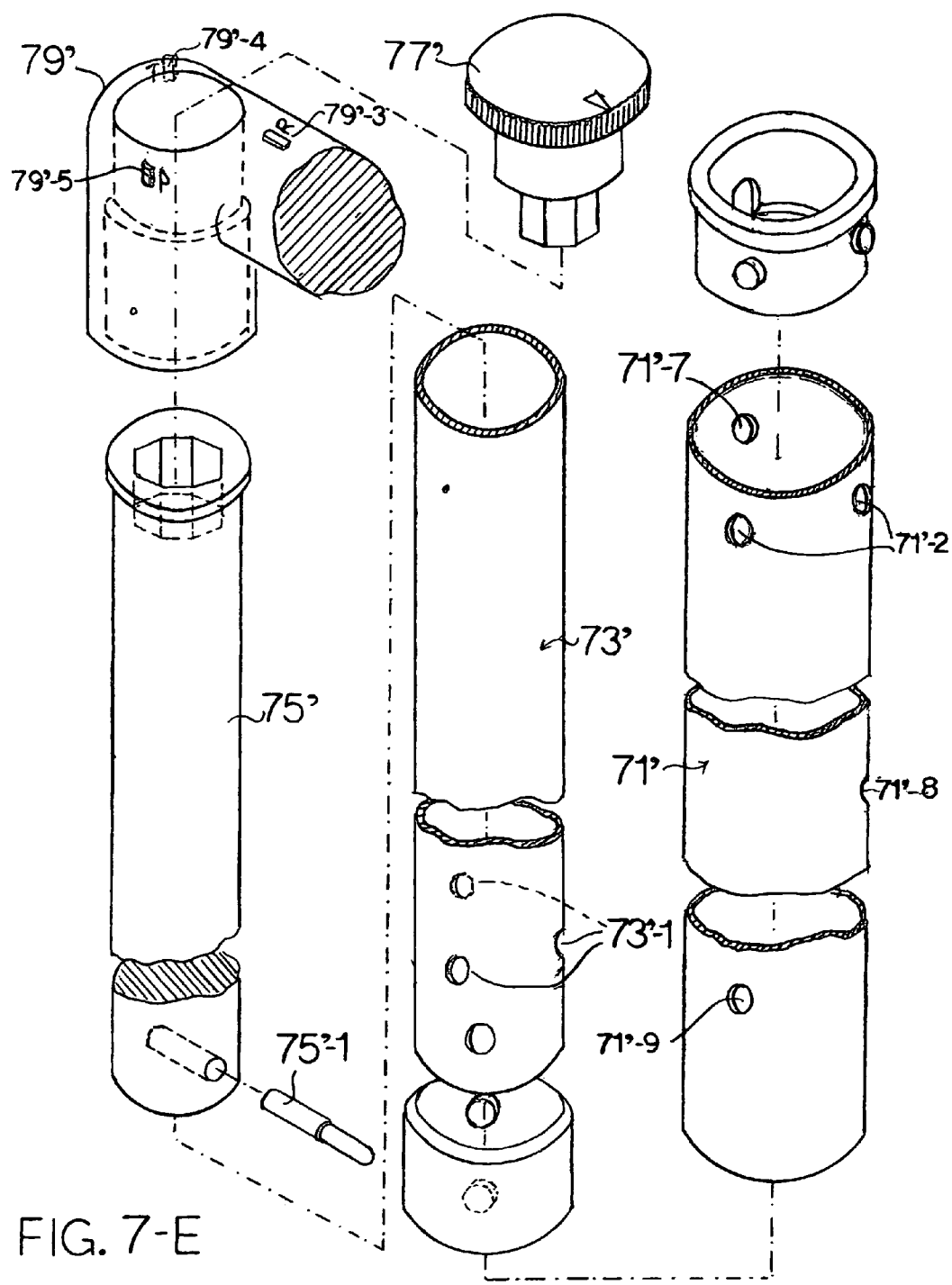
FIG. 7-E

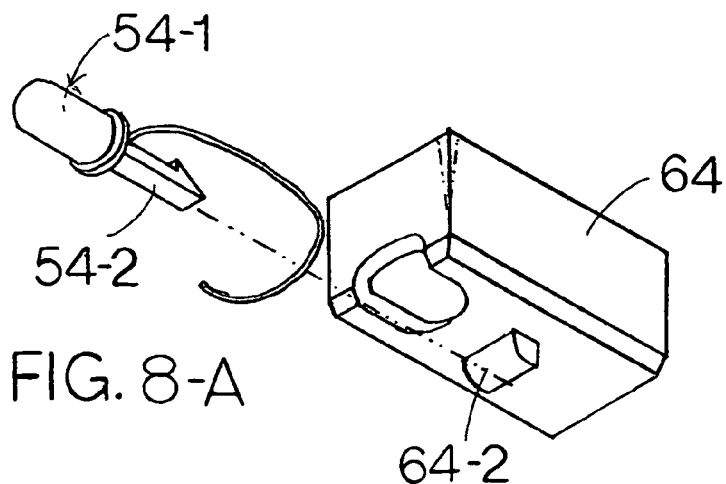
FIG. 8-A
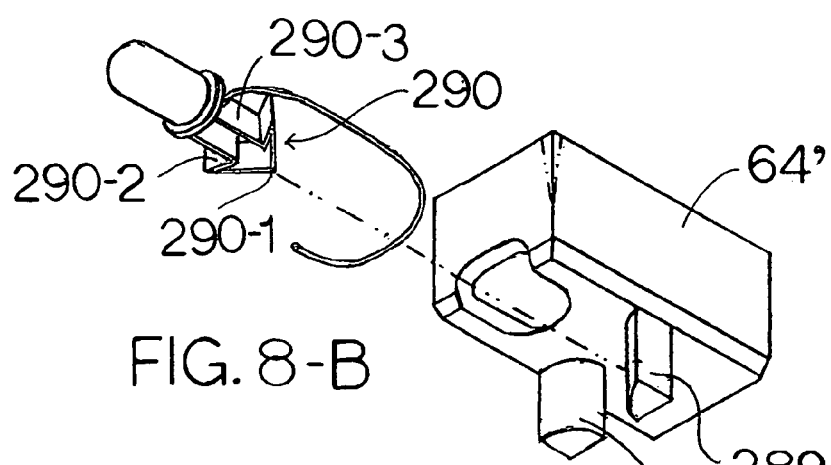
FIG. 8-B
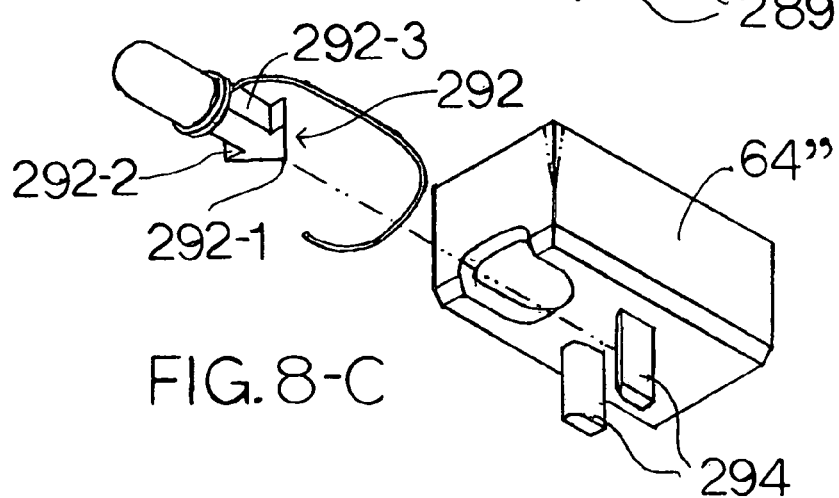
FIG. 8-C

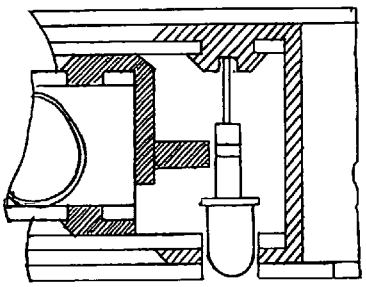
FIG. 8-A4
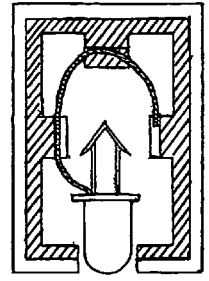
FIG. 8-B4
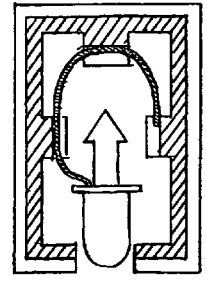
FIG. 8-C4
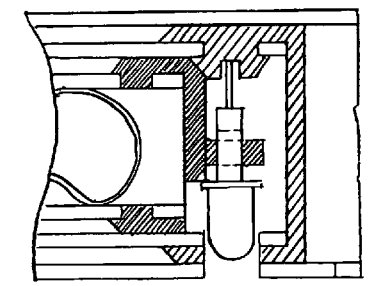
FIG. 8-A3
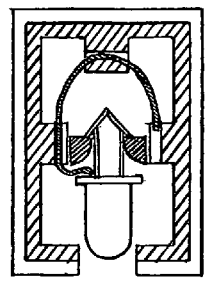
FIG. 8-B3
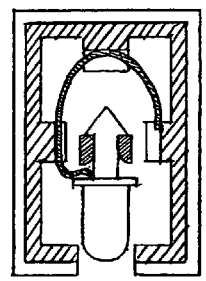
FIG. 8-C3
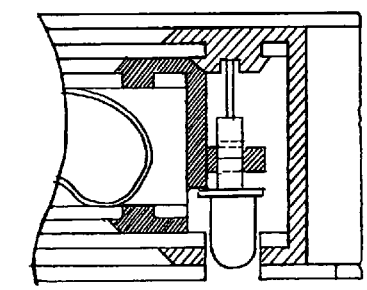
FIG. 8-A2
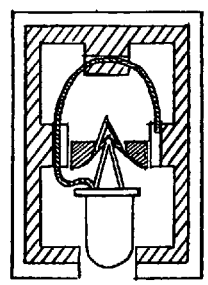
FIG. 8-B2
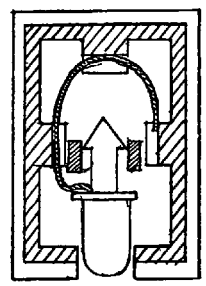
FIG. 8-C2
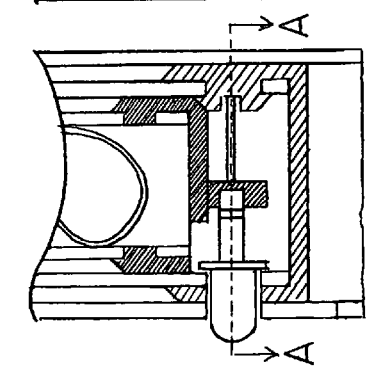
FIG. 8-A1
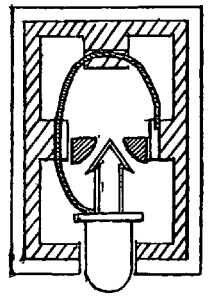
FIG. 8-B1
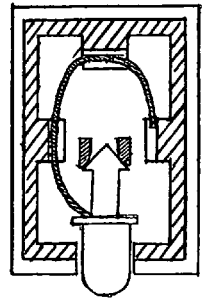
FIG. 8-C1

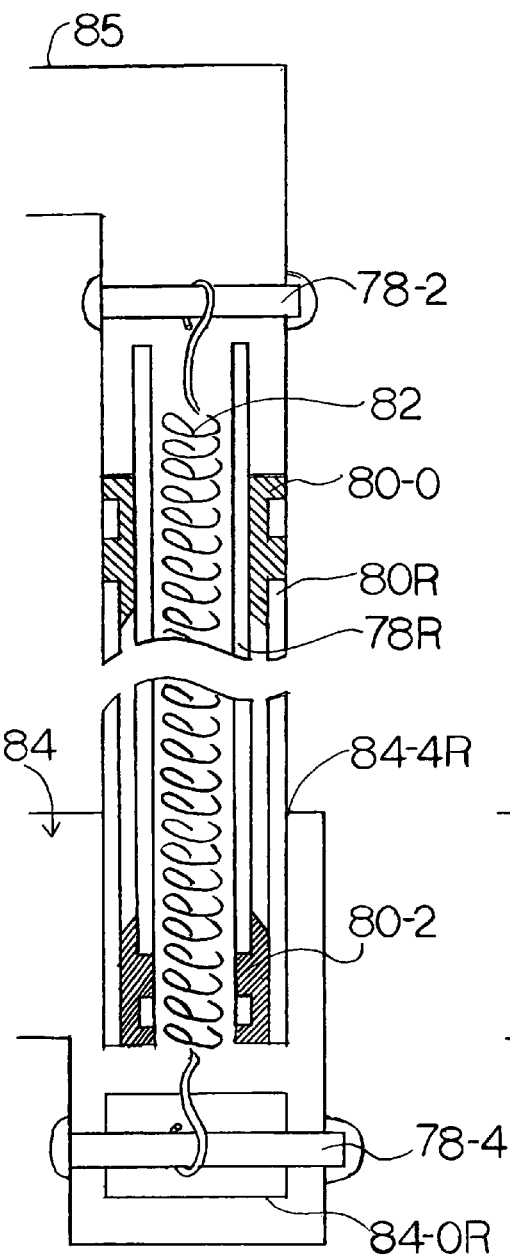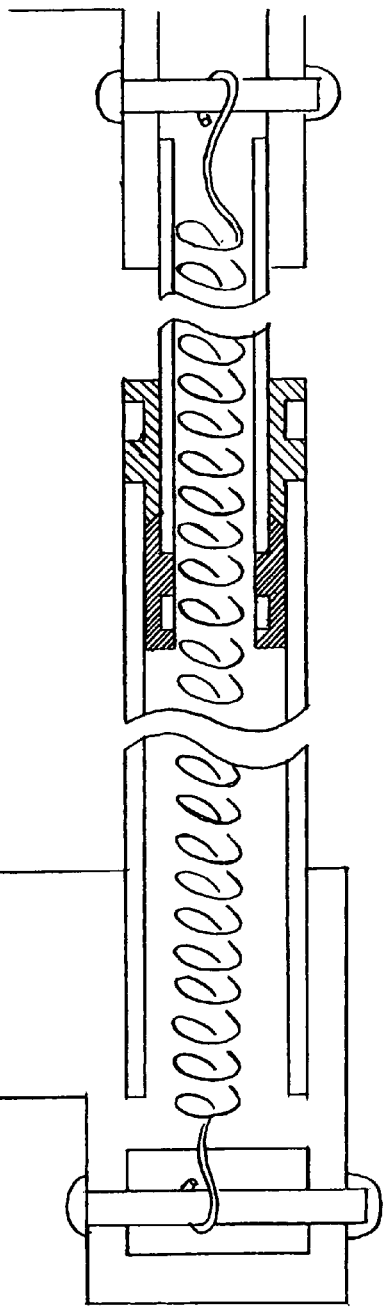
FIG. 9-A  FIG. 9-B

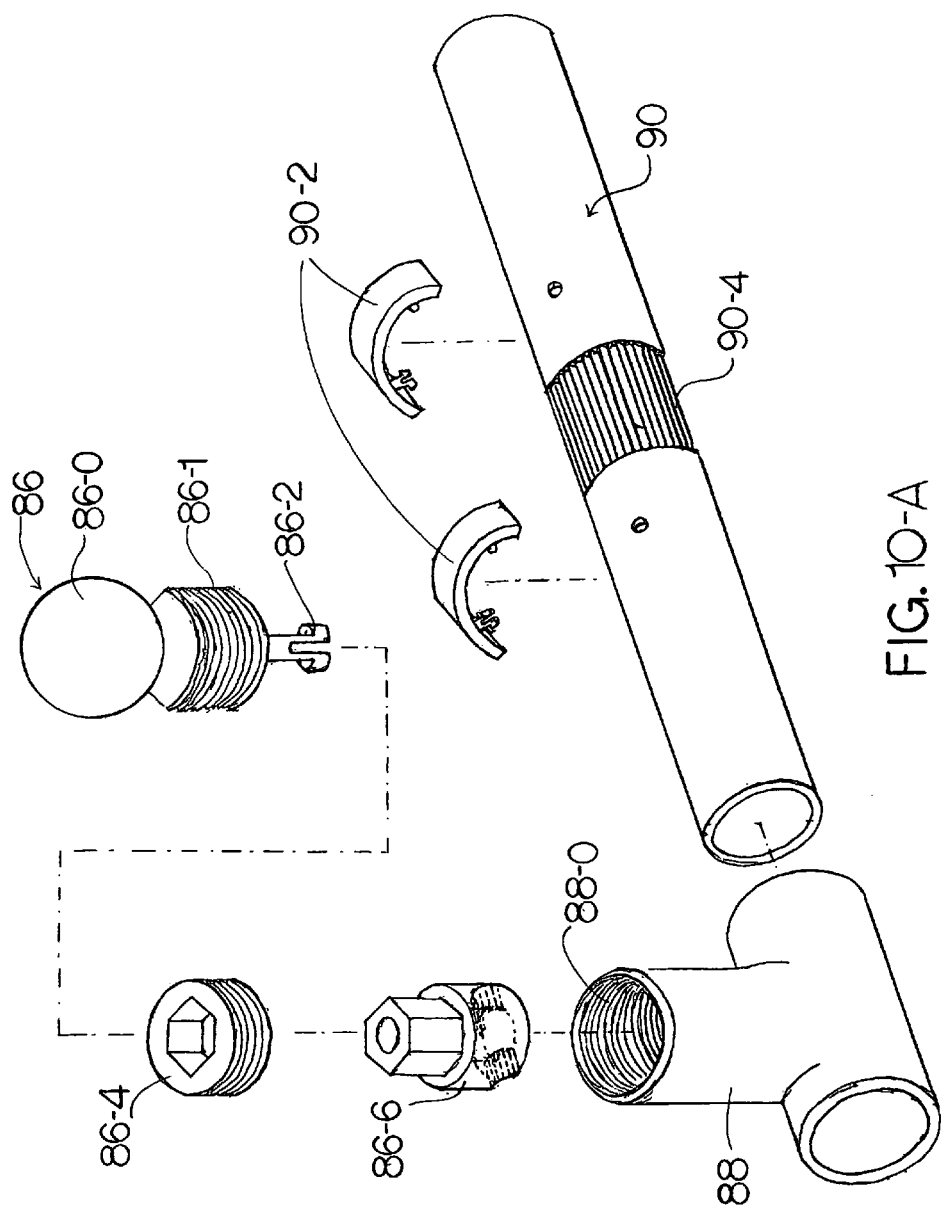
FIG. 10-A

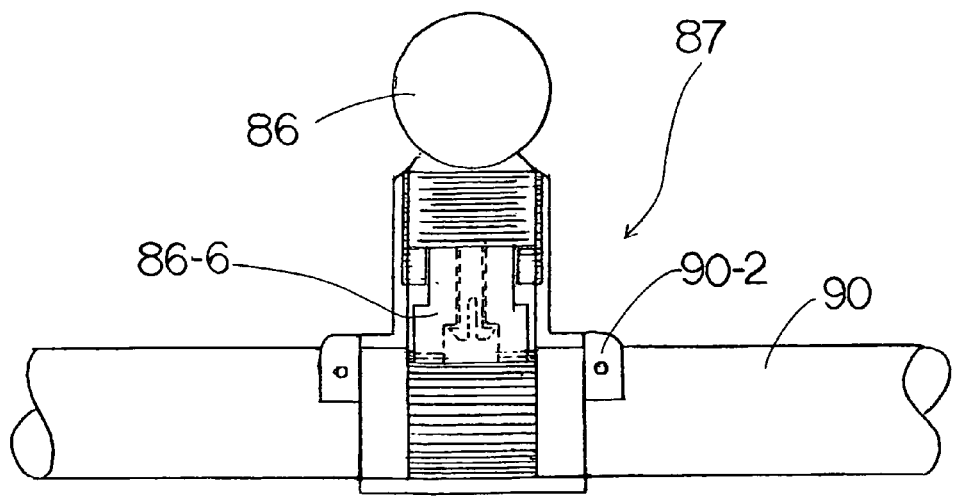
FIG. 10-A'
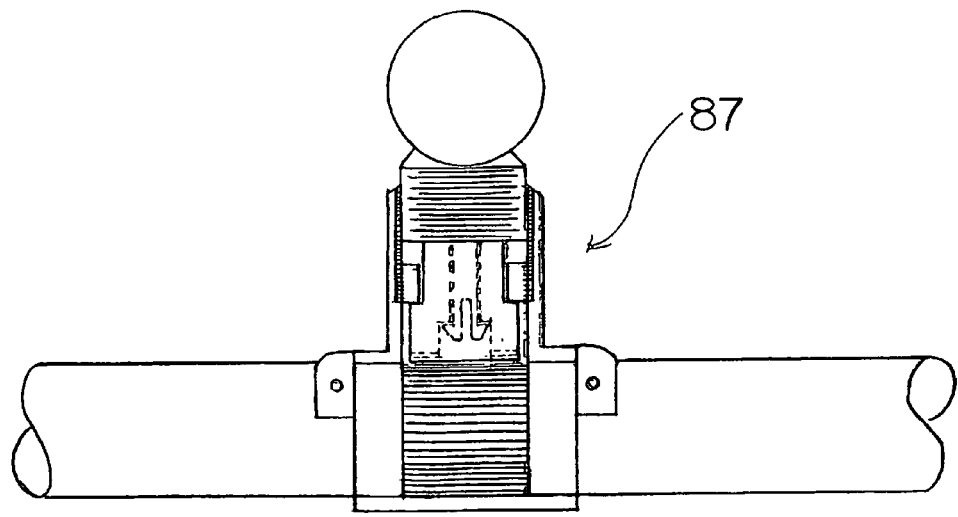
FIG. 10-A"

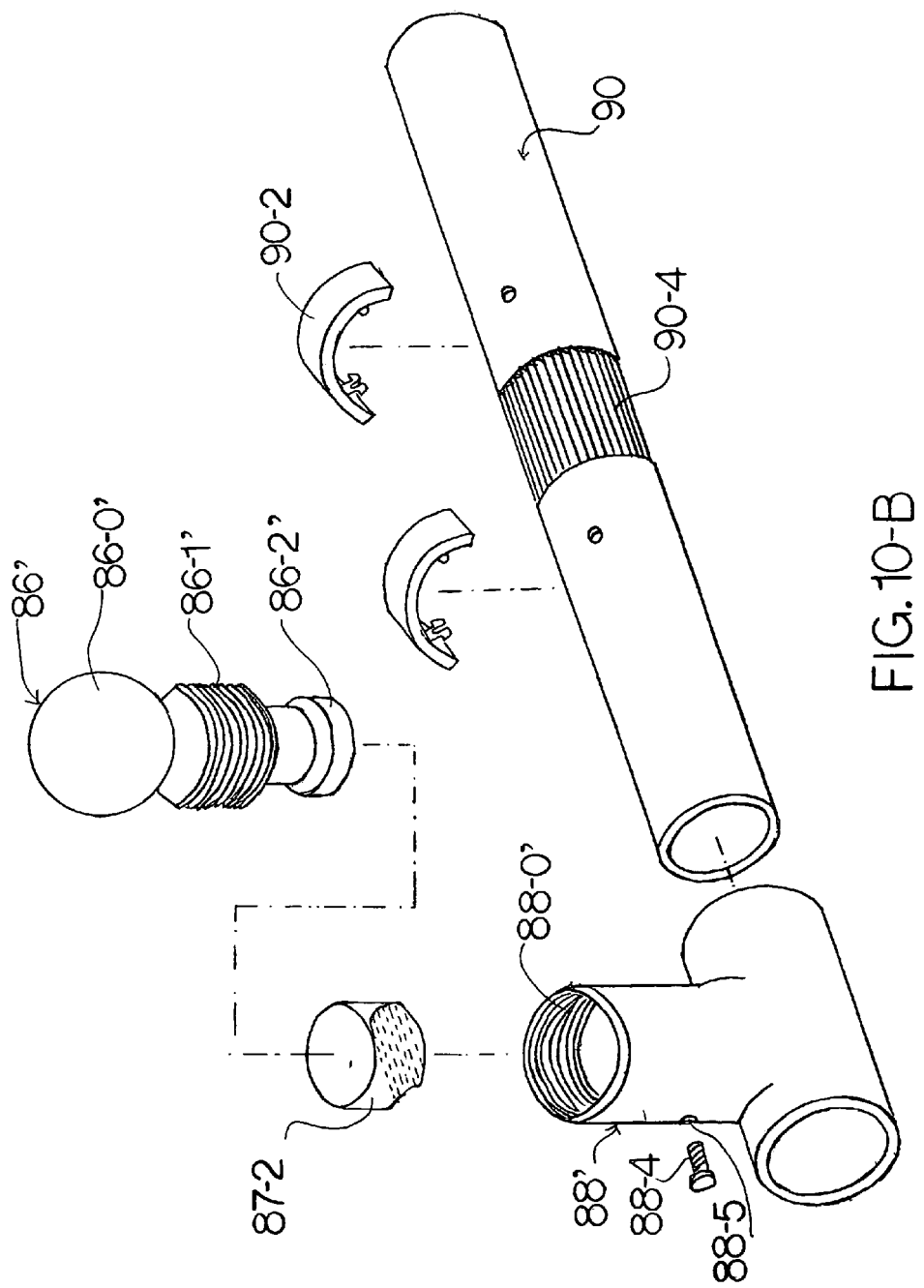
FIG.10-B

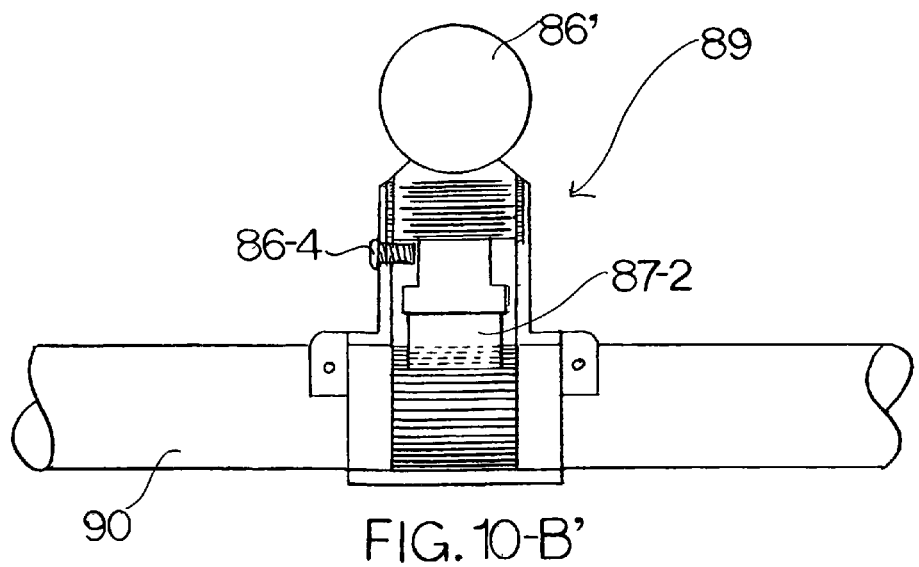
FIG. 10-B'
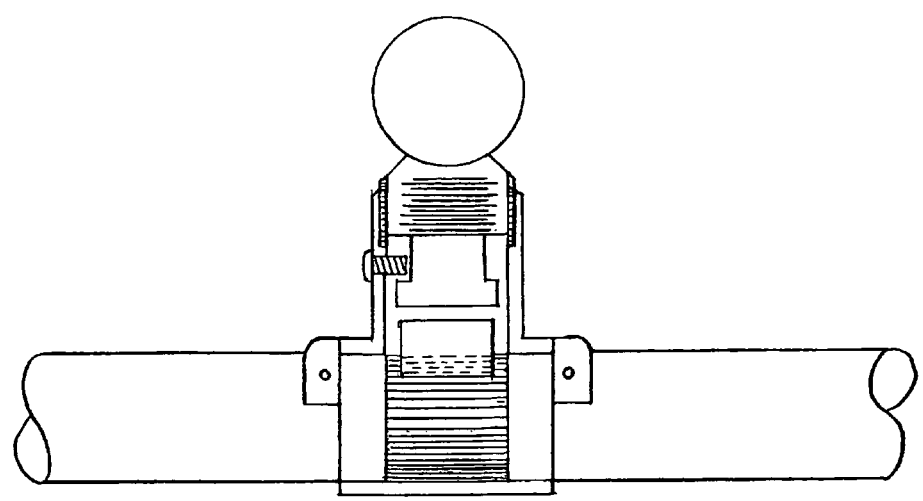
FIG. 10-B"

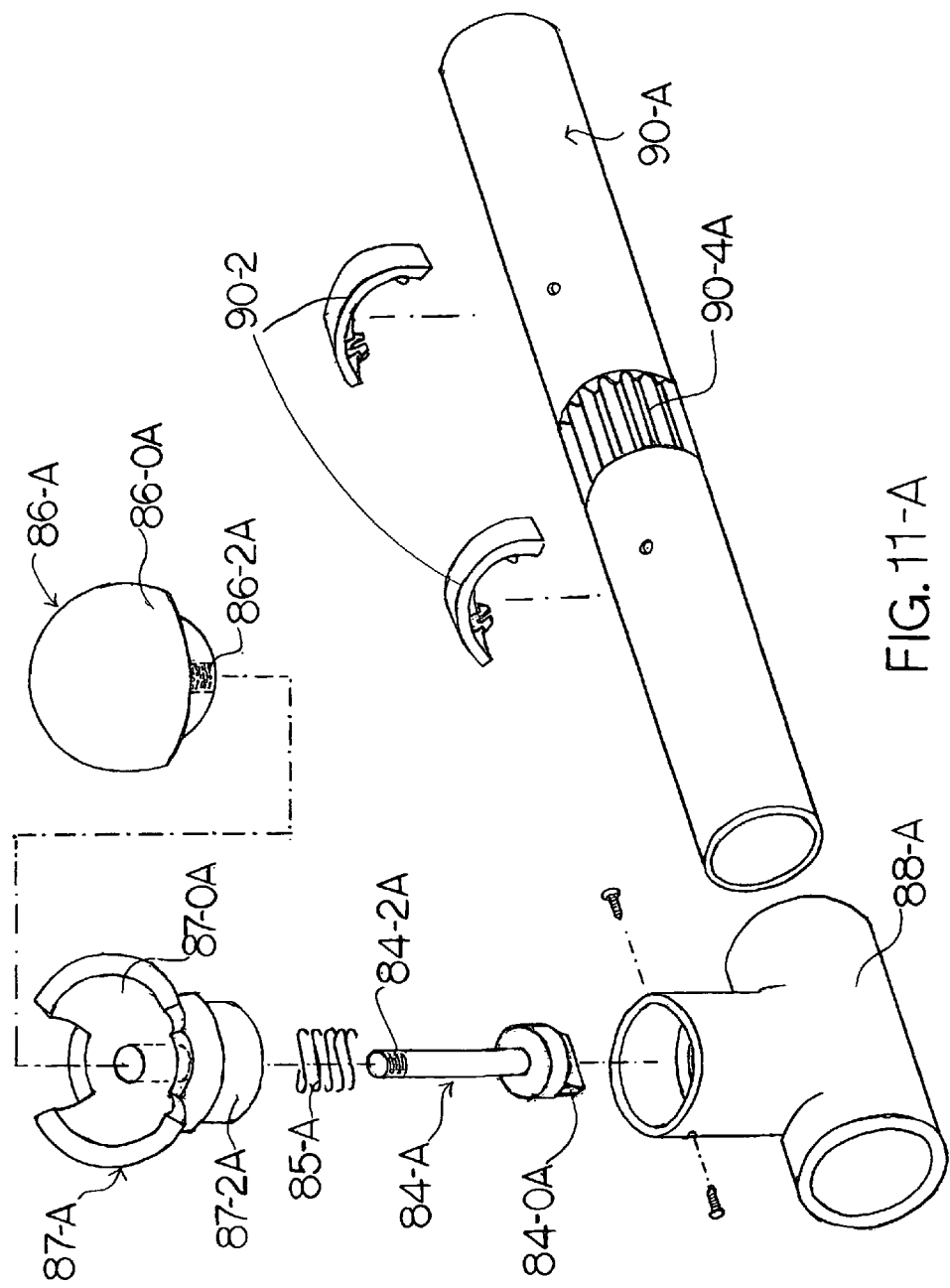
FIG. 11-A

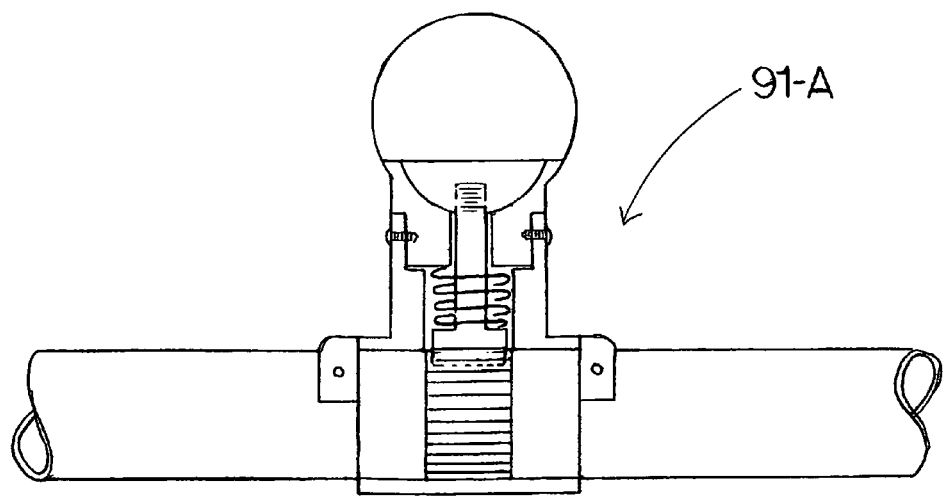
FIG. 11-A'
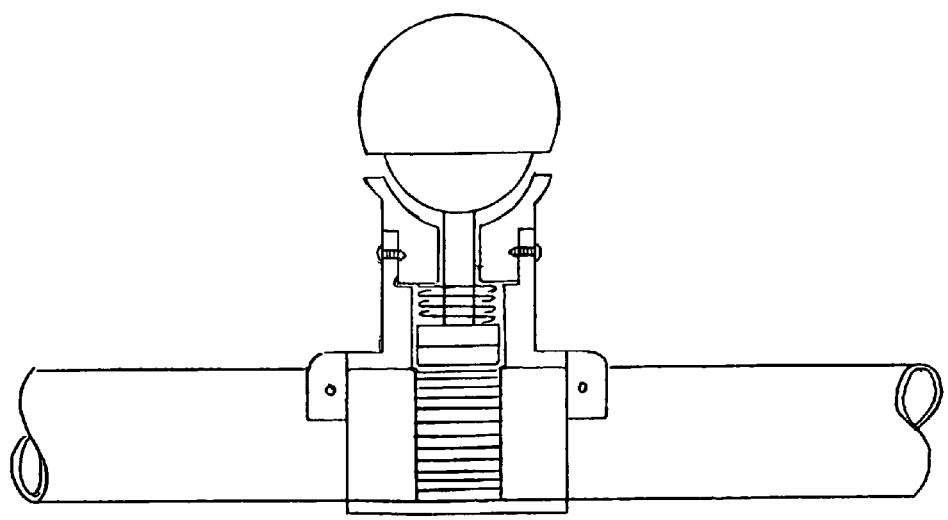
FIG. 11-A"

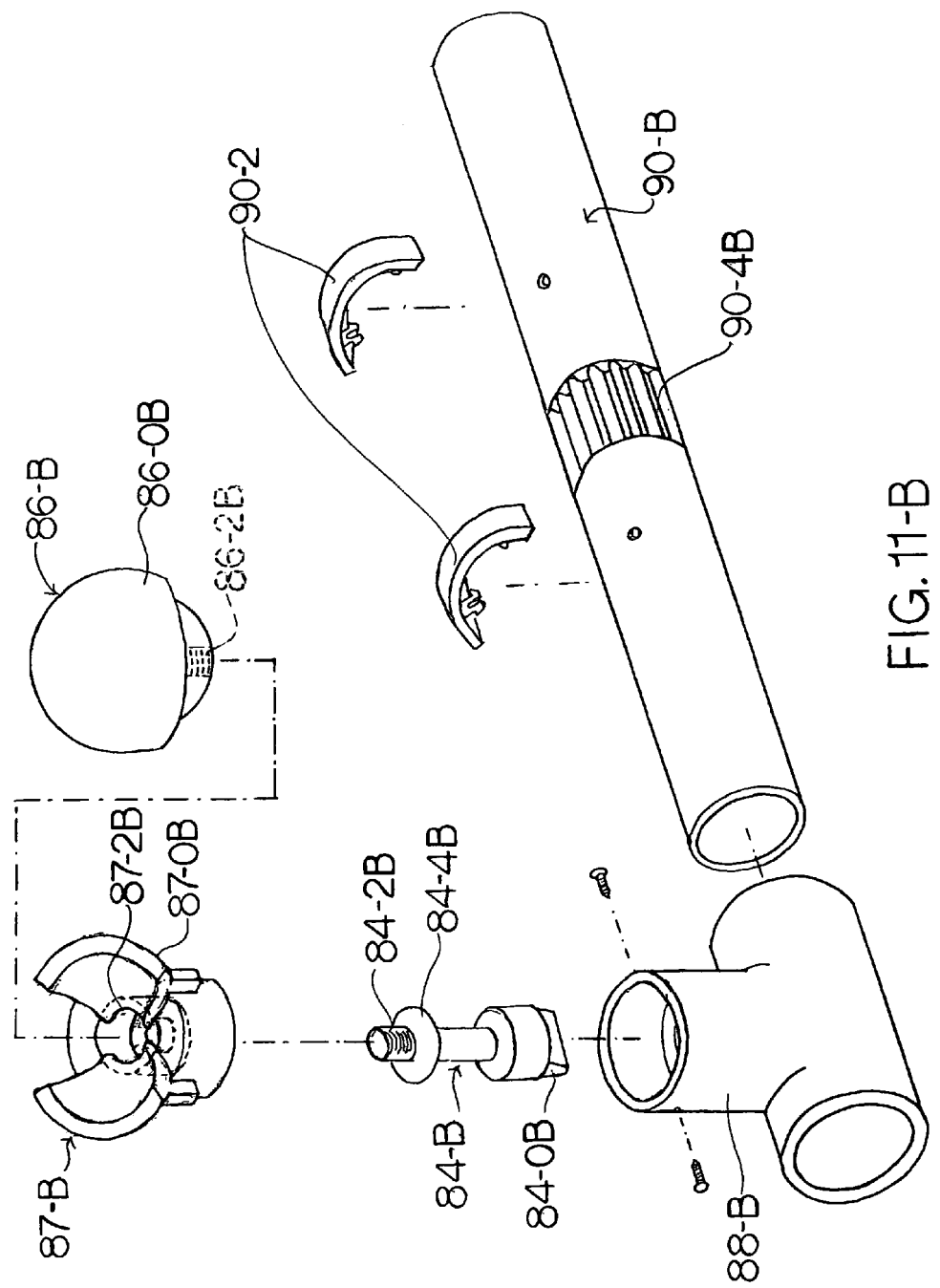
FIG.11-B

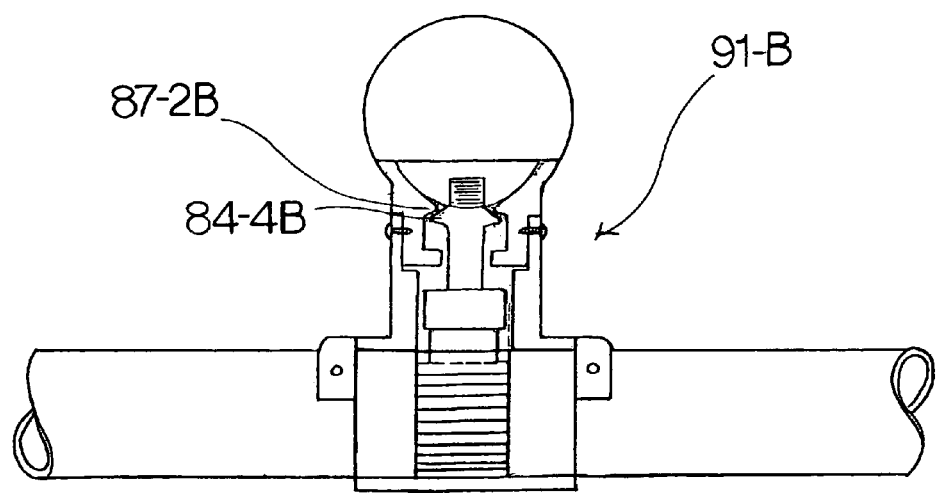
FIG. 11-B'
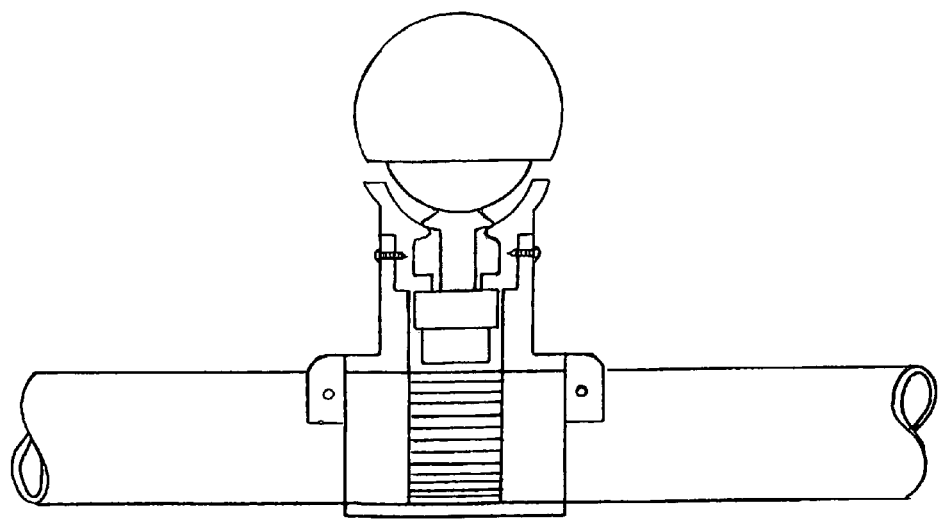
FIG. 11-B"

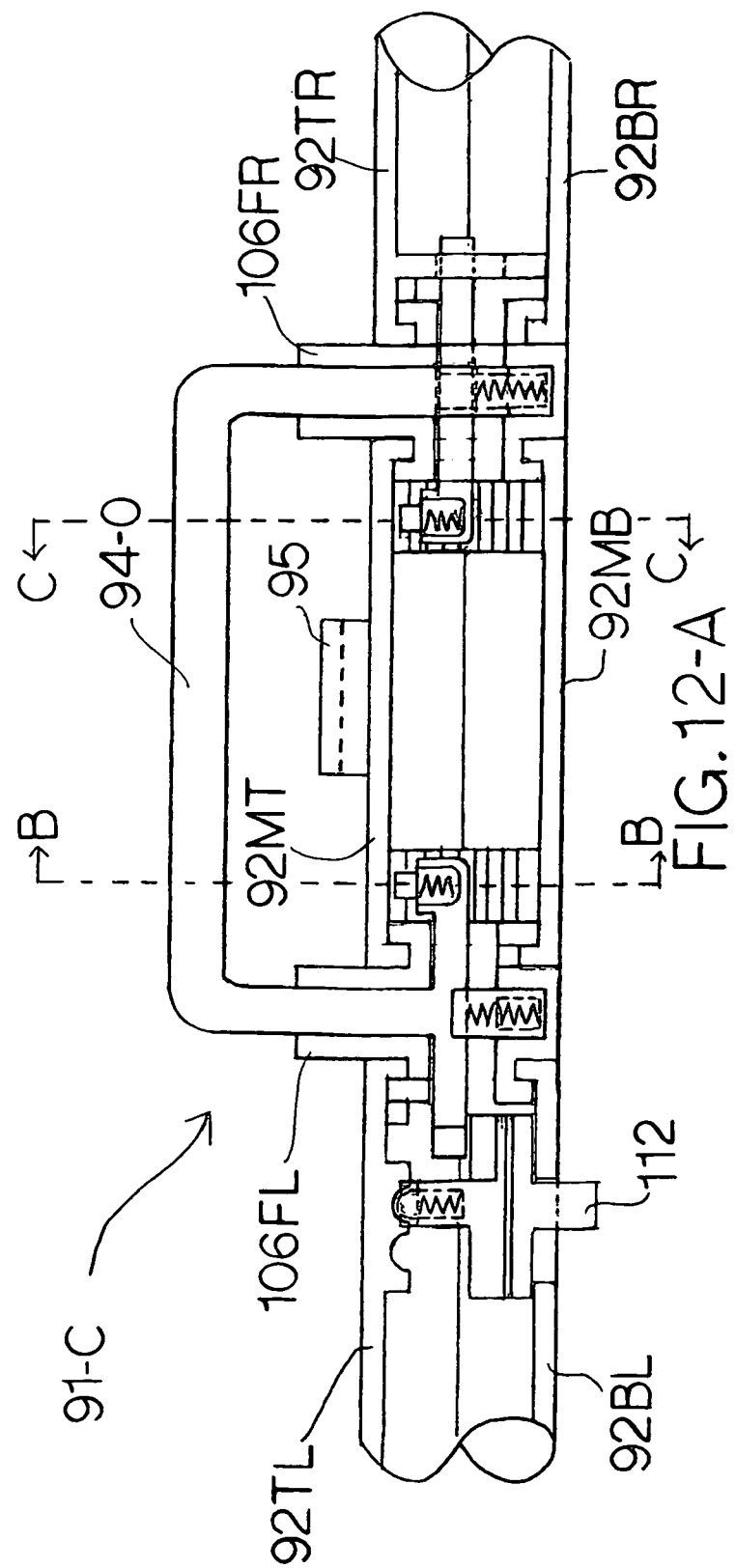

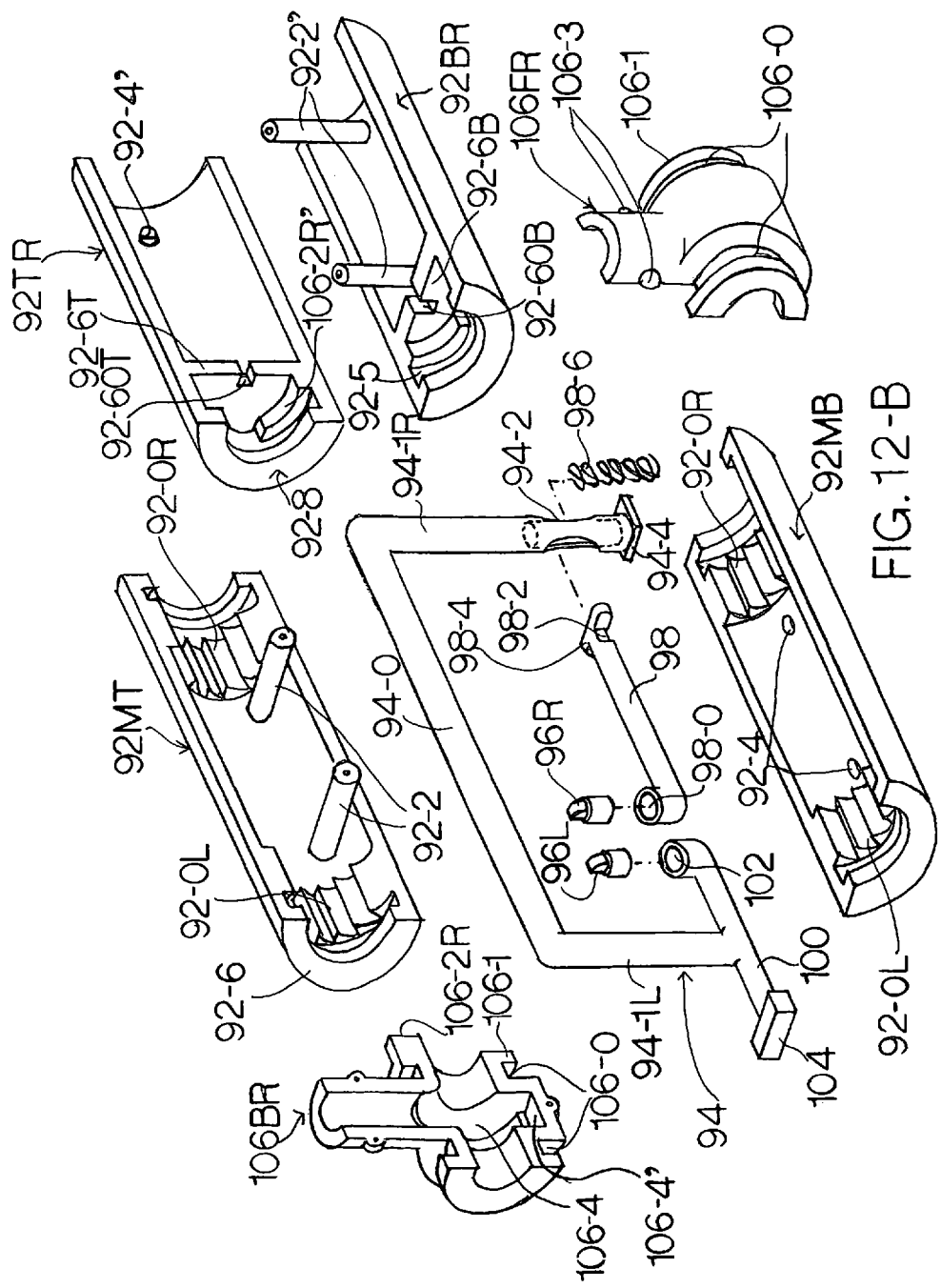
FIG. 12-B

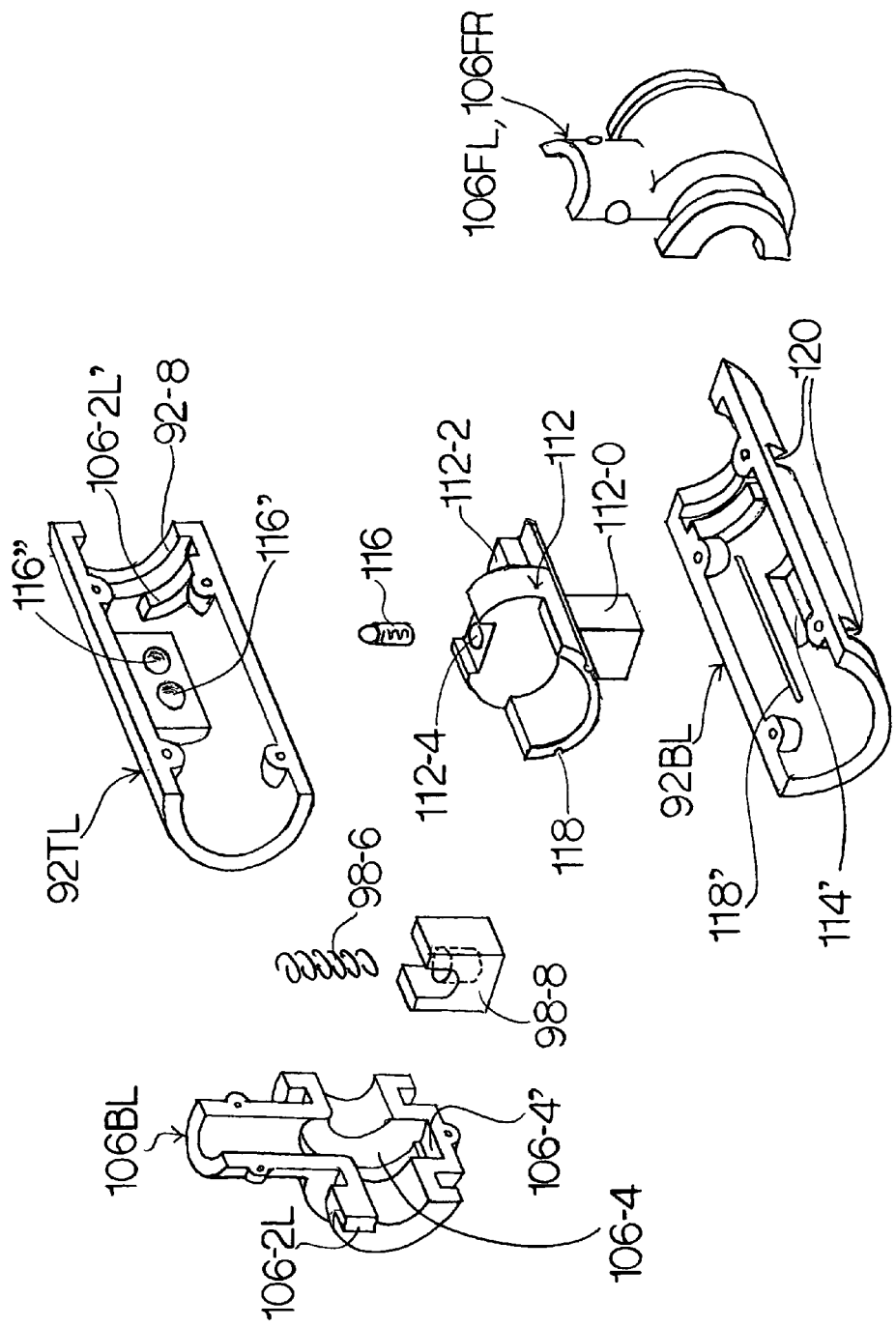
FIG.12-C

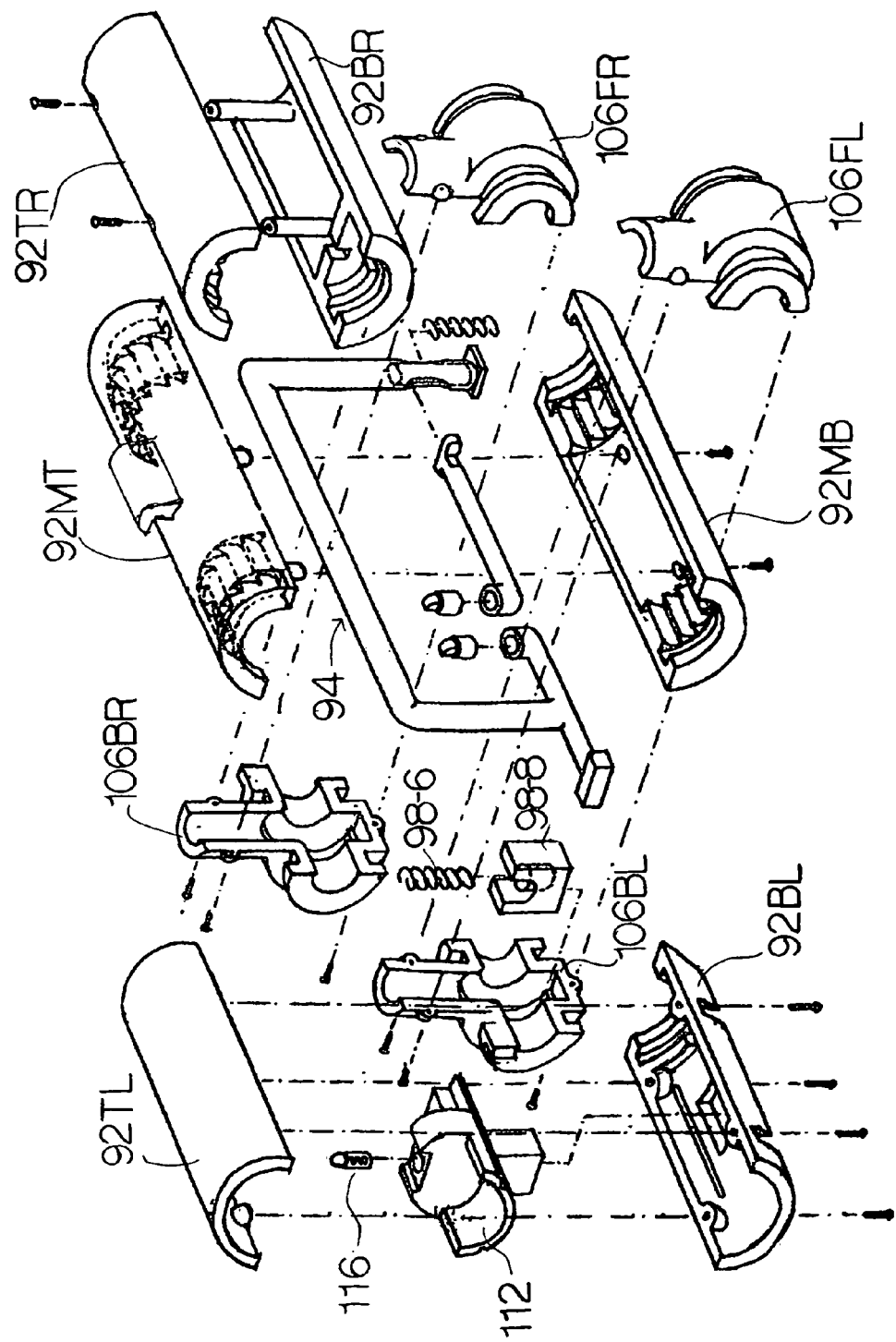
FIG. 12-D

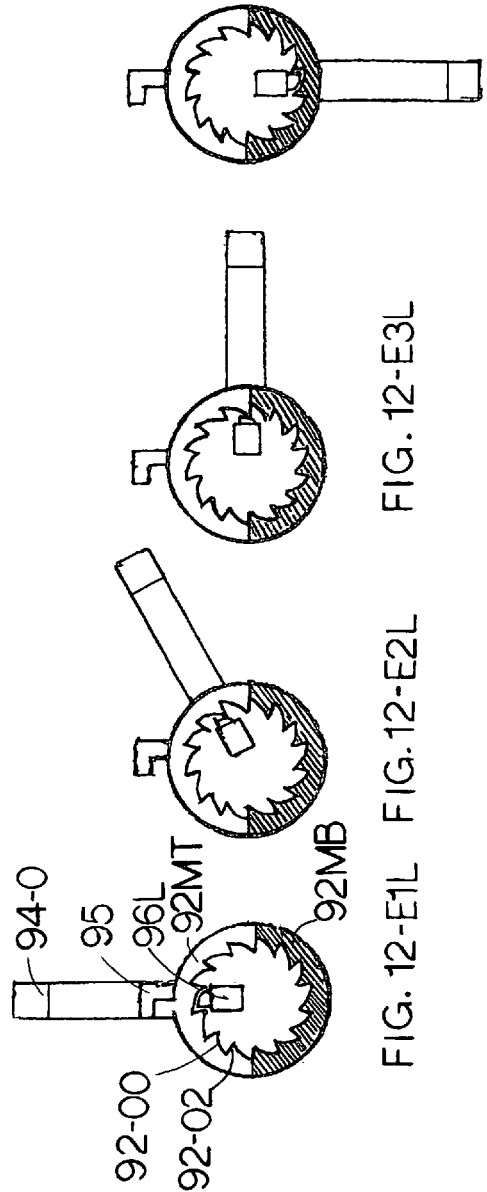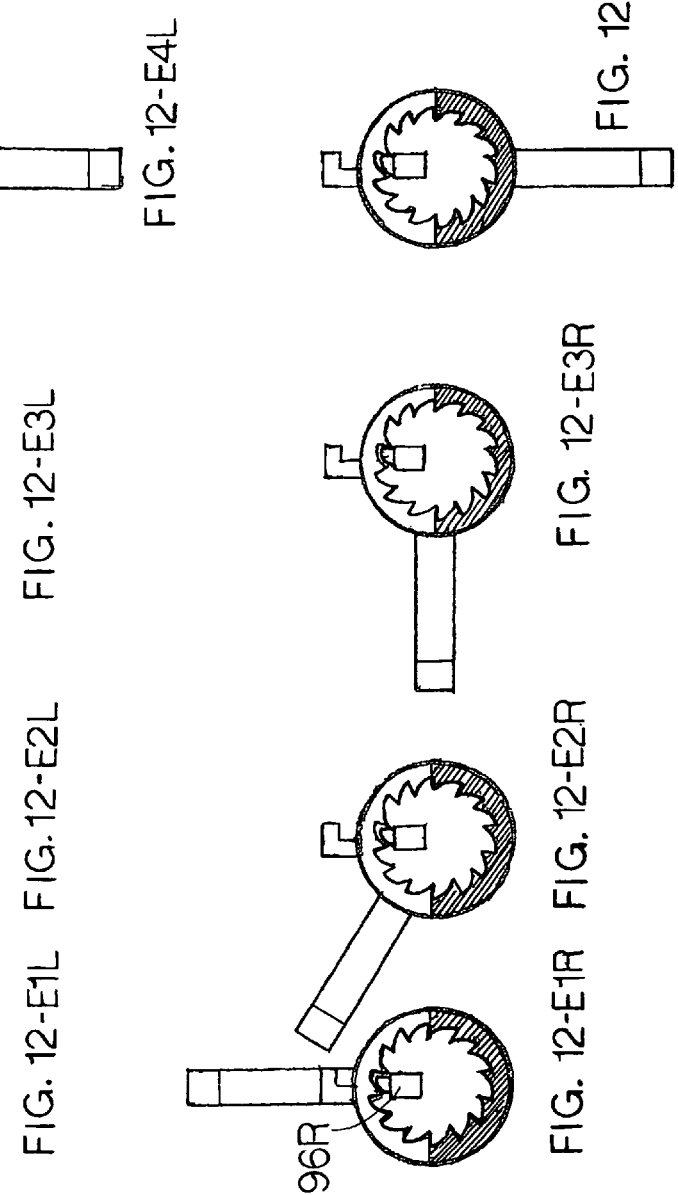

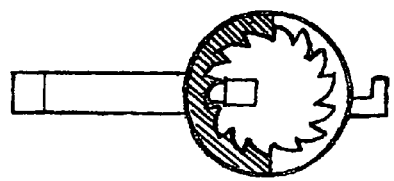
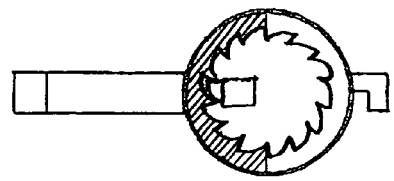
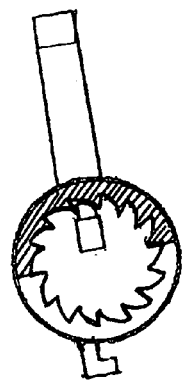
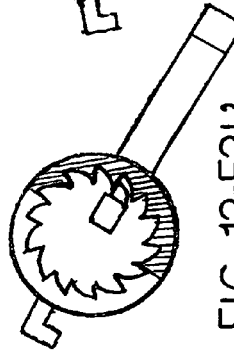
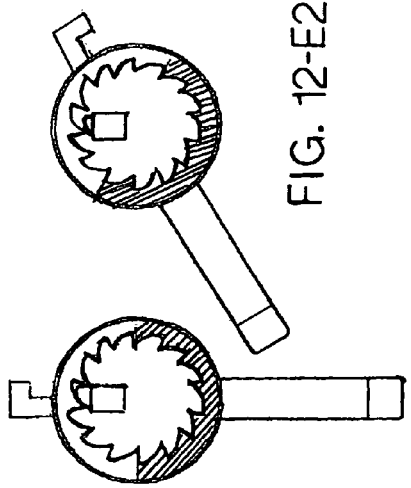
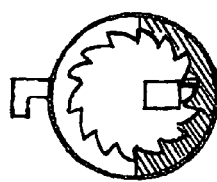
FIG. 12-E4L'
FIG. 12-E4R'
FIG. 12-E3L'
FIG. 12-E3R'
FIG. 12-E2L'
FIG. 12-E2R'
FIG. 12-E1L', 12-E4L
FIG. 12-E1R', 12-E4R

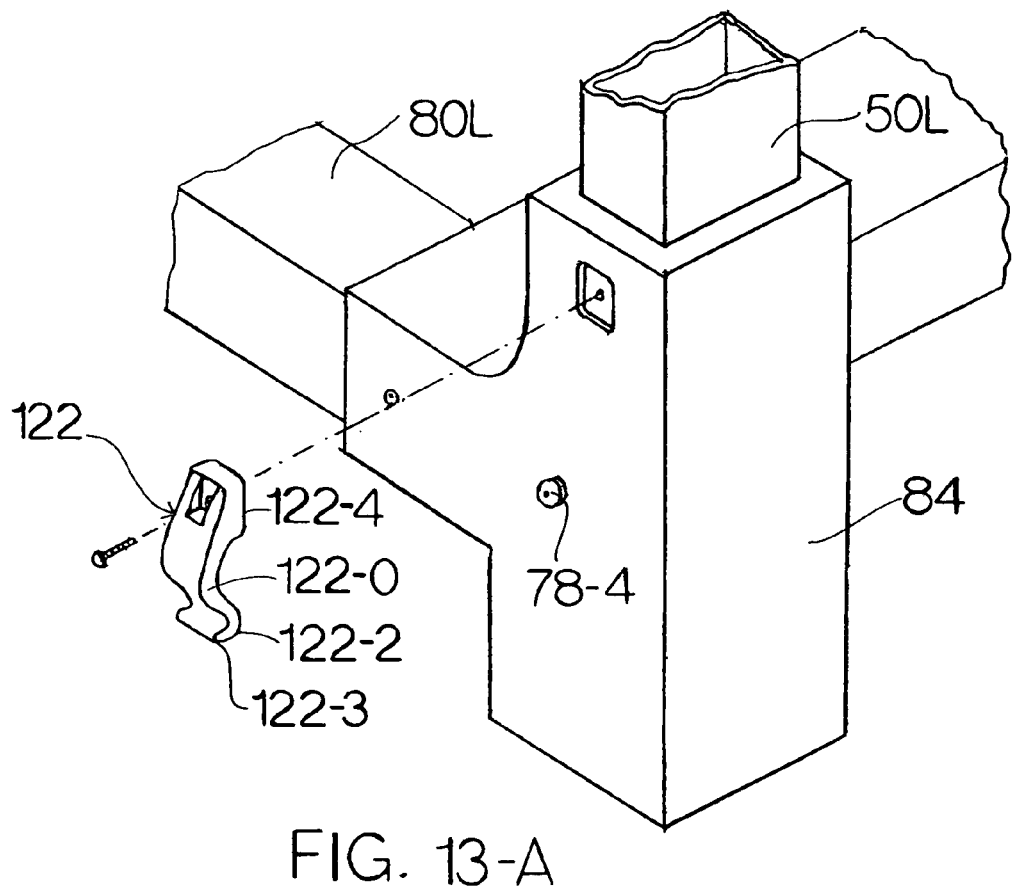
FIG. 13-A

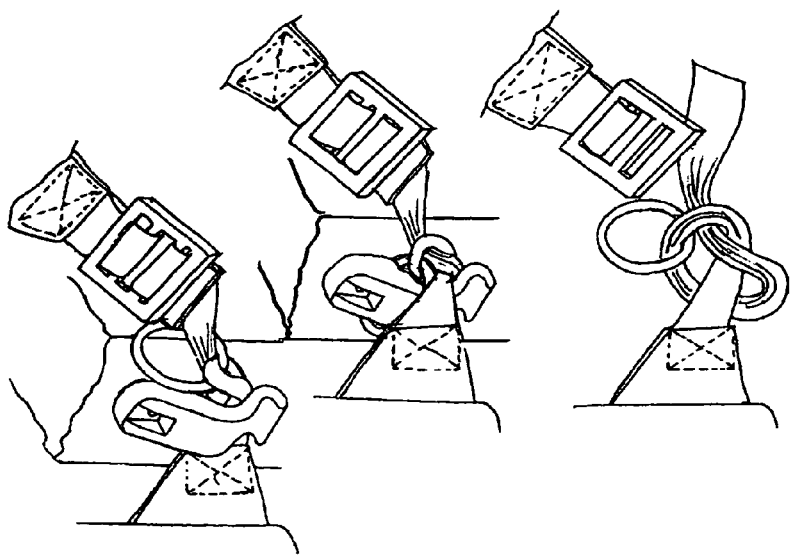
FIG. 13-B3
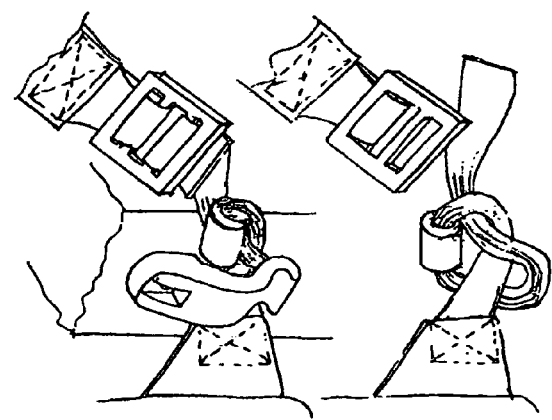
FIG. 13-B2
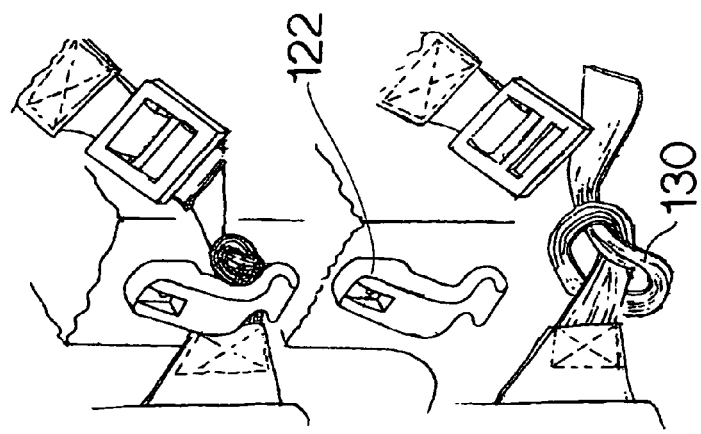
FIG. 13-B1

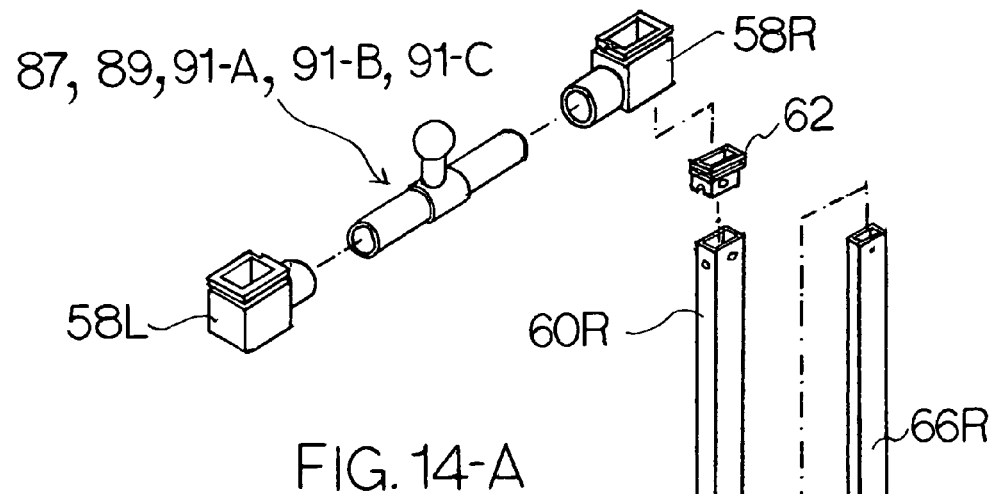
FIG. 14-A
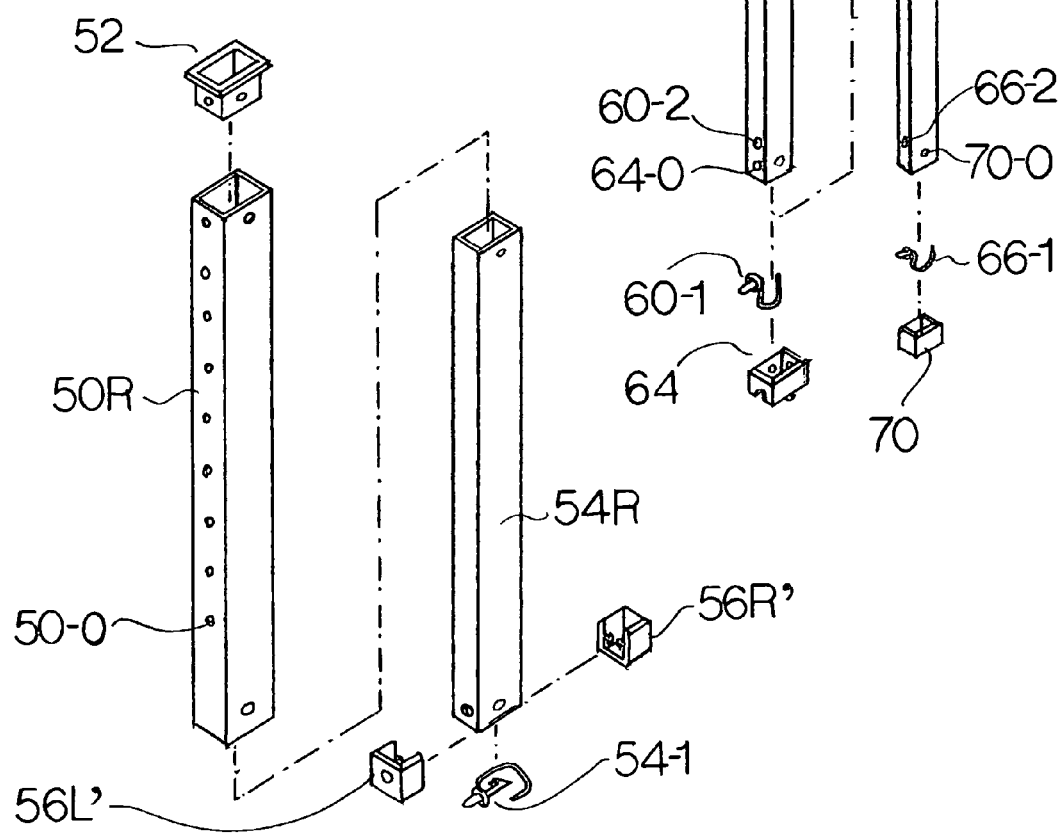
FIG. 14-B

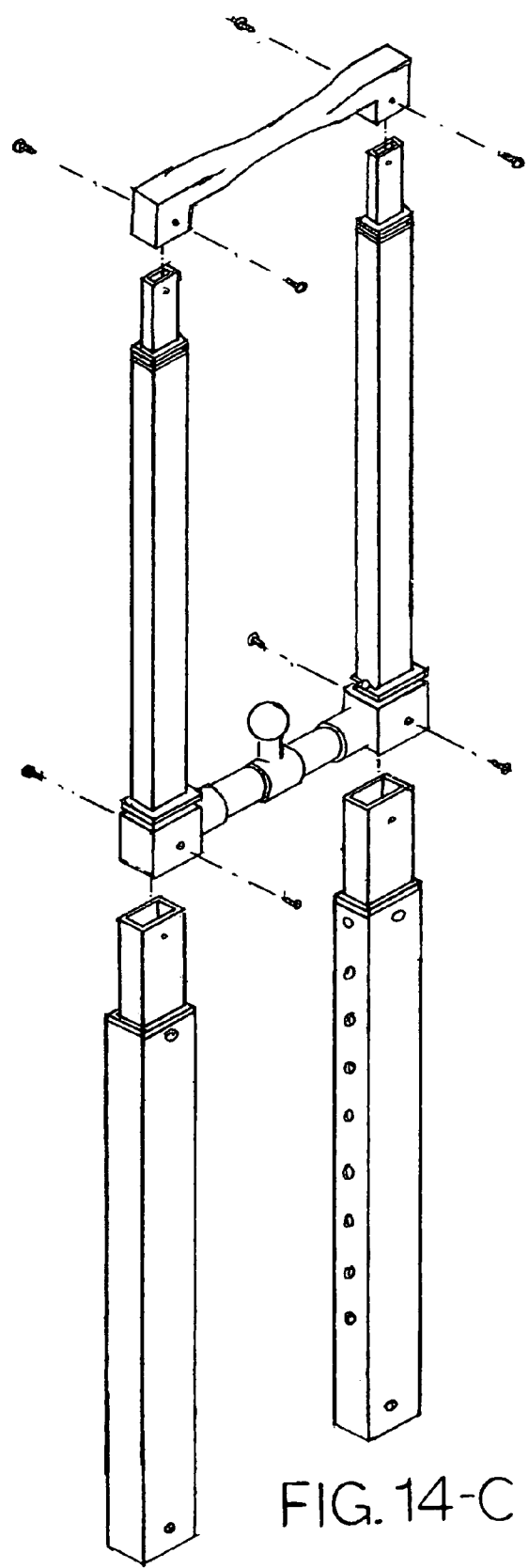
FIG. 14-C

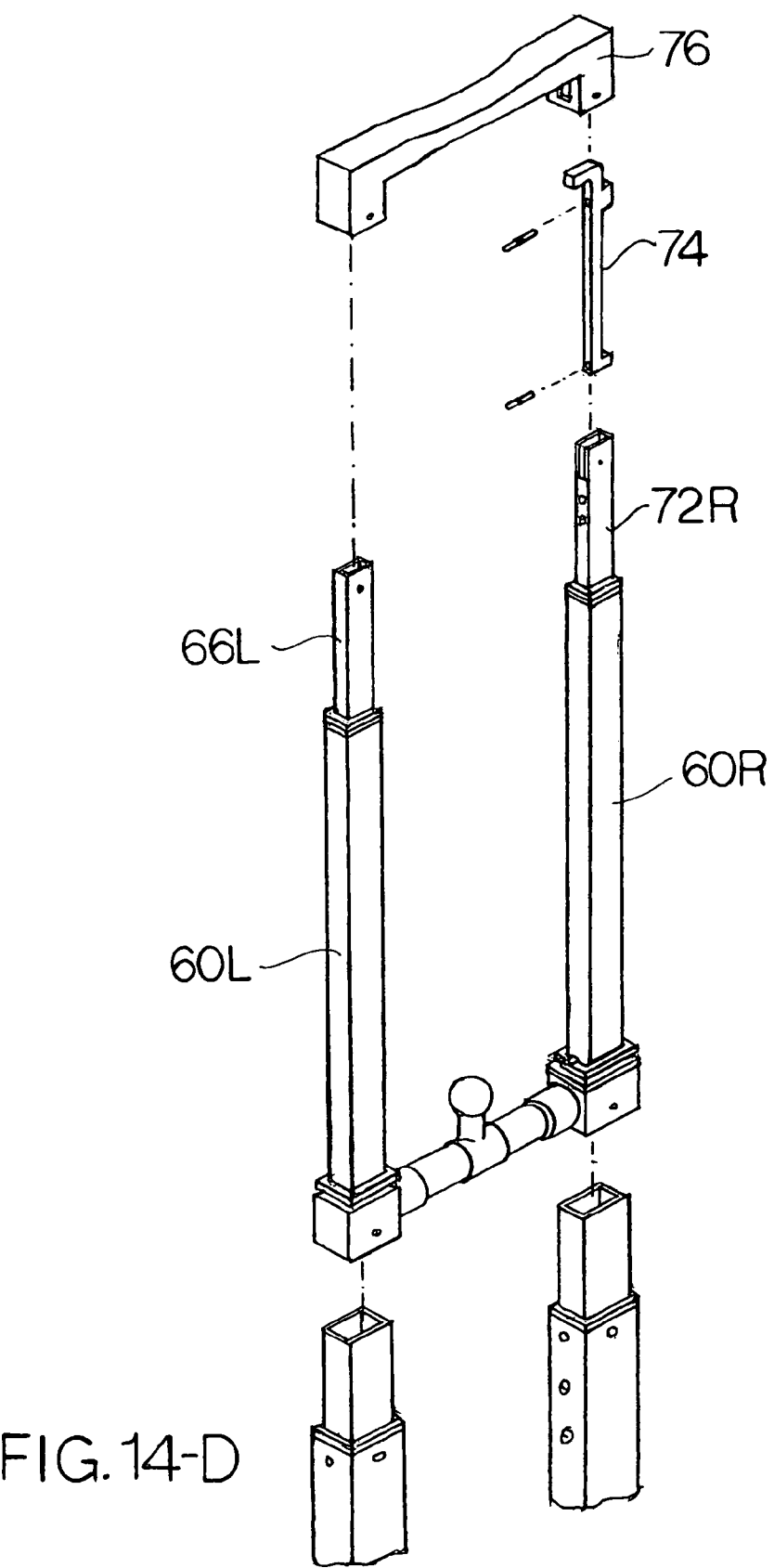
FIG.14-D

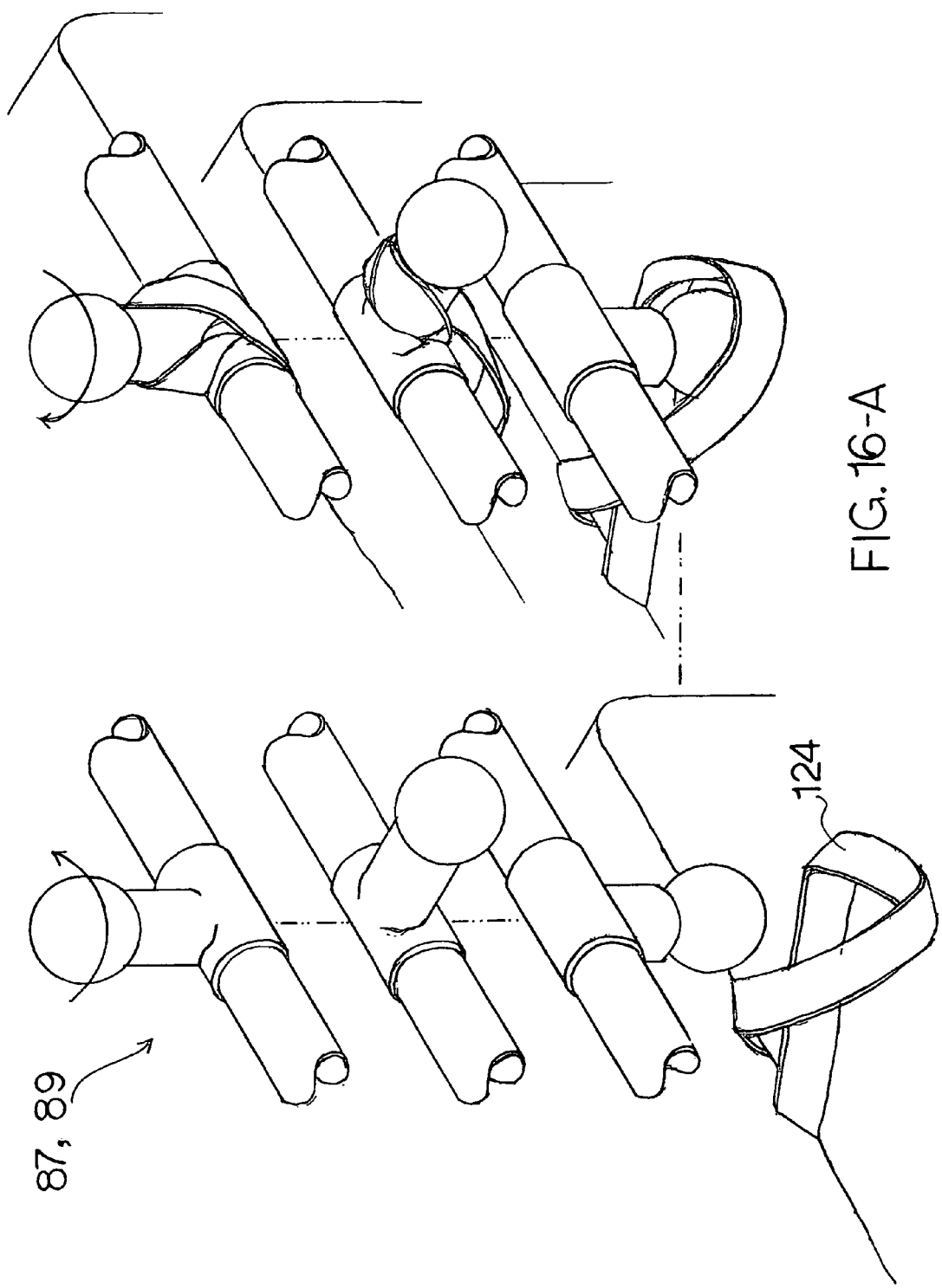
FIG. 16-A

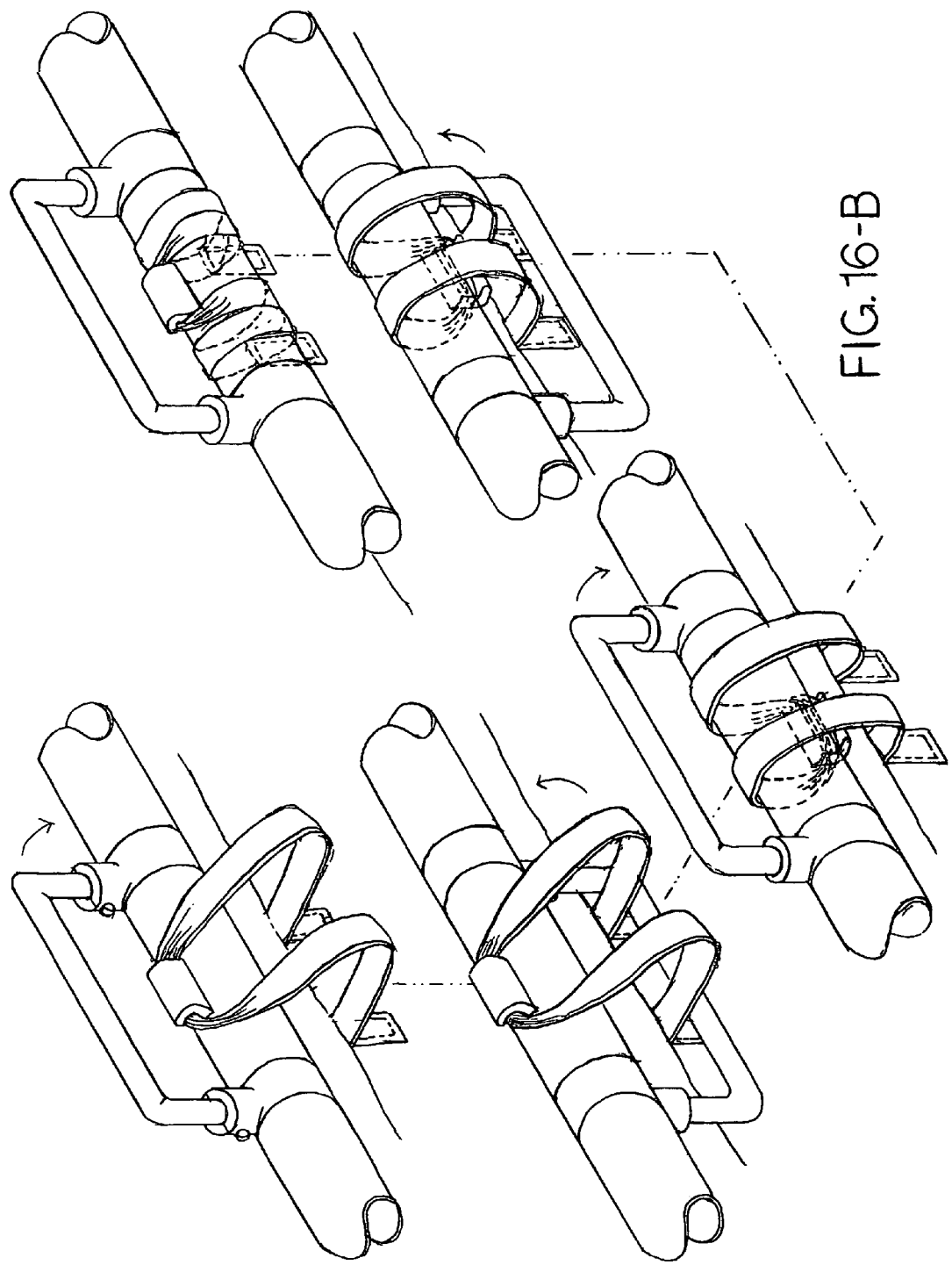
FIG.16-B

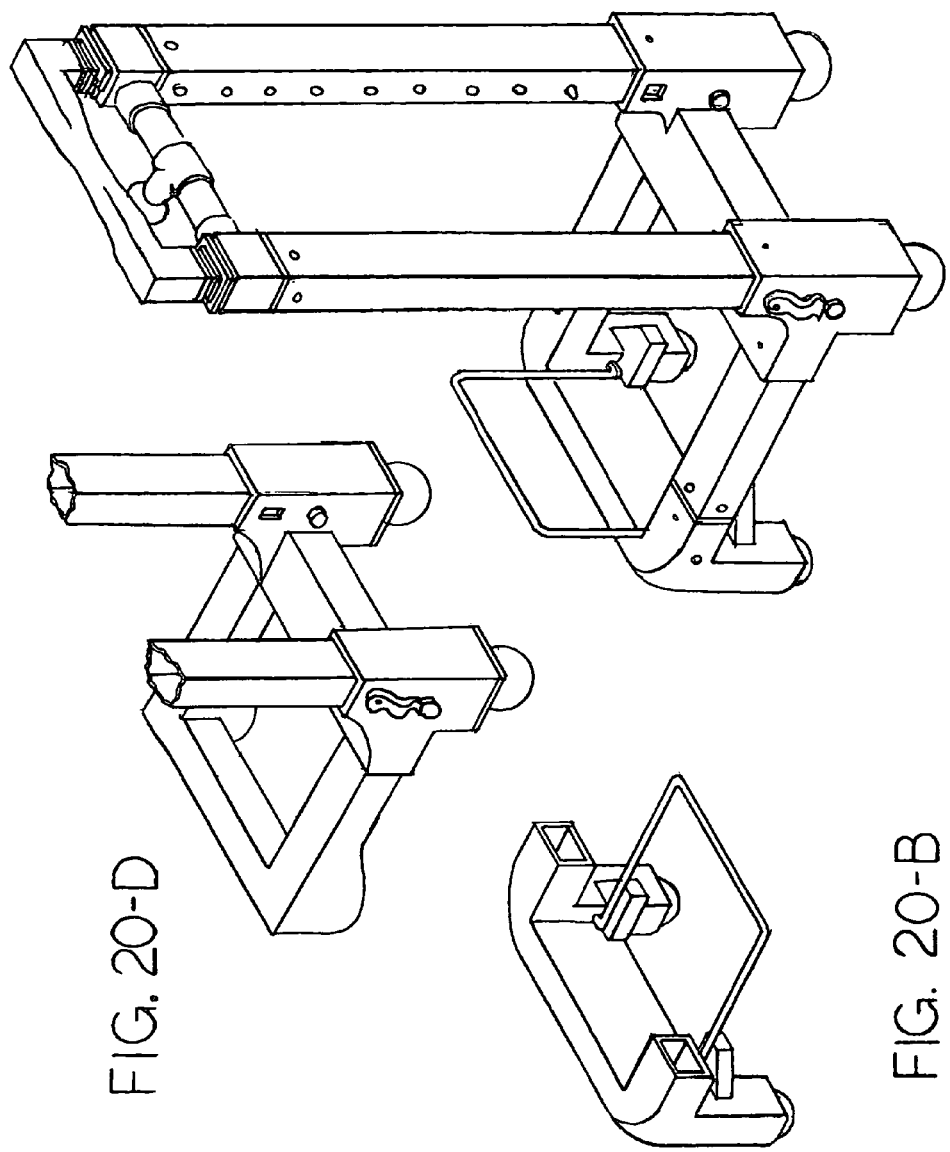

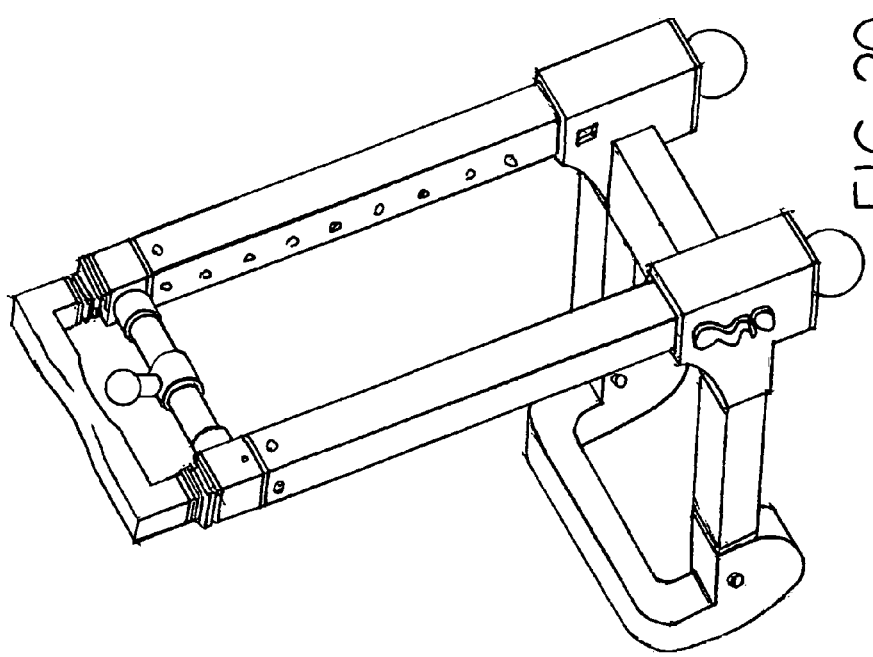
FIG. 20-C'
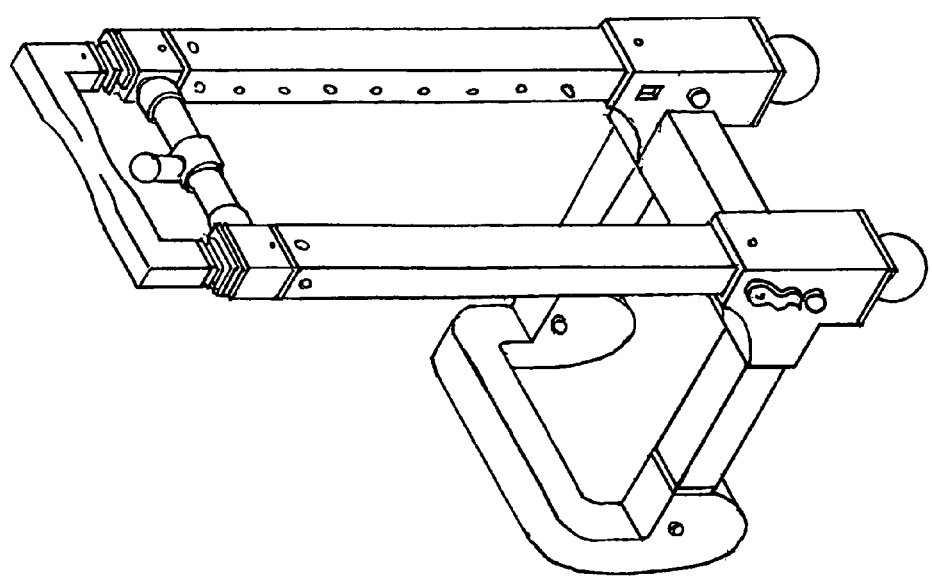
FIG. 20-C

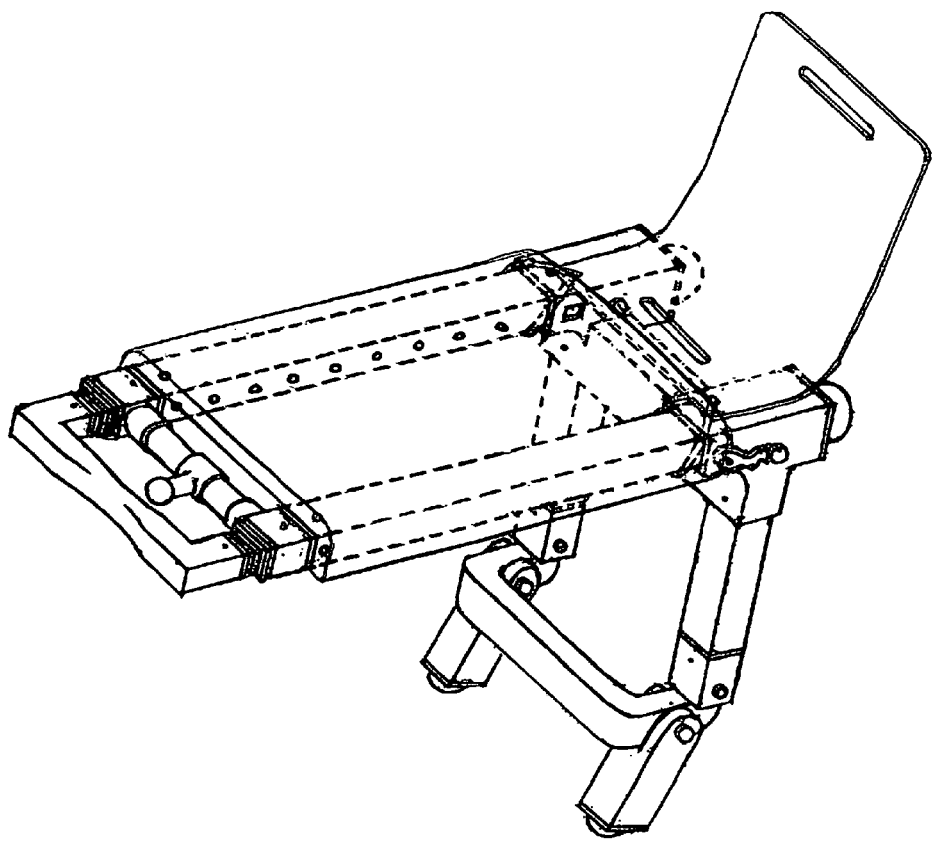
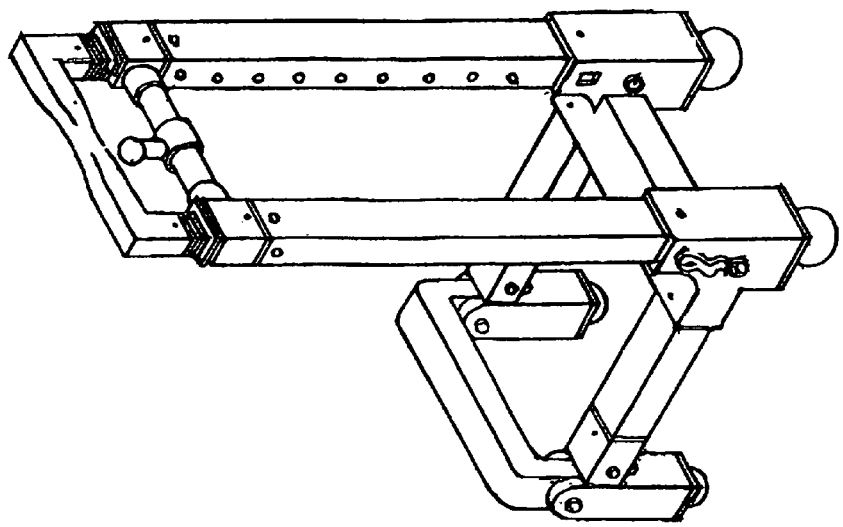
FIG. 21-B
FIG. 21-A

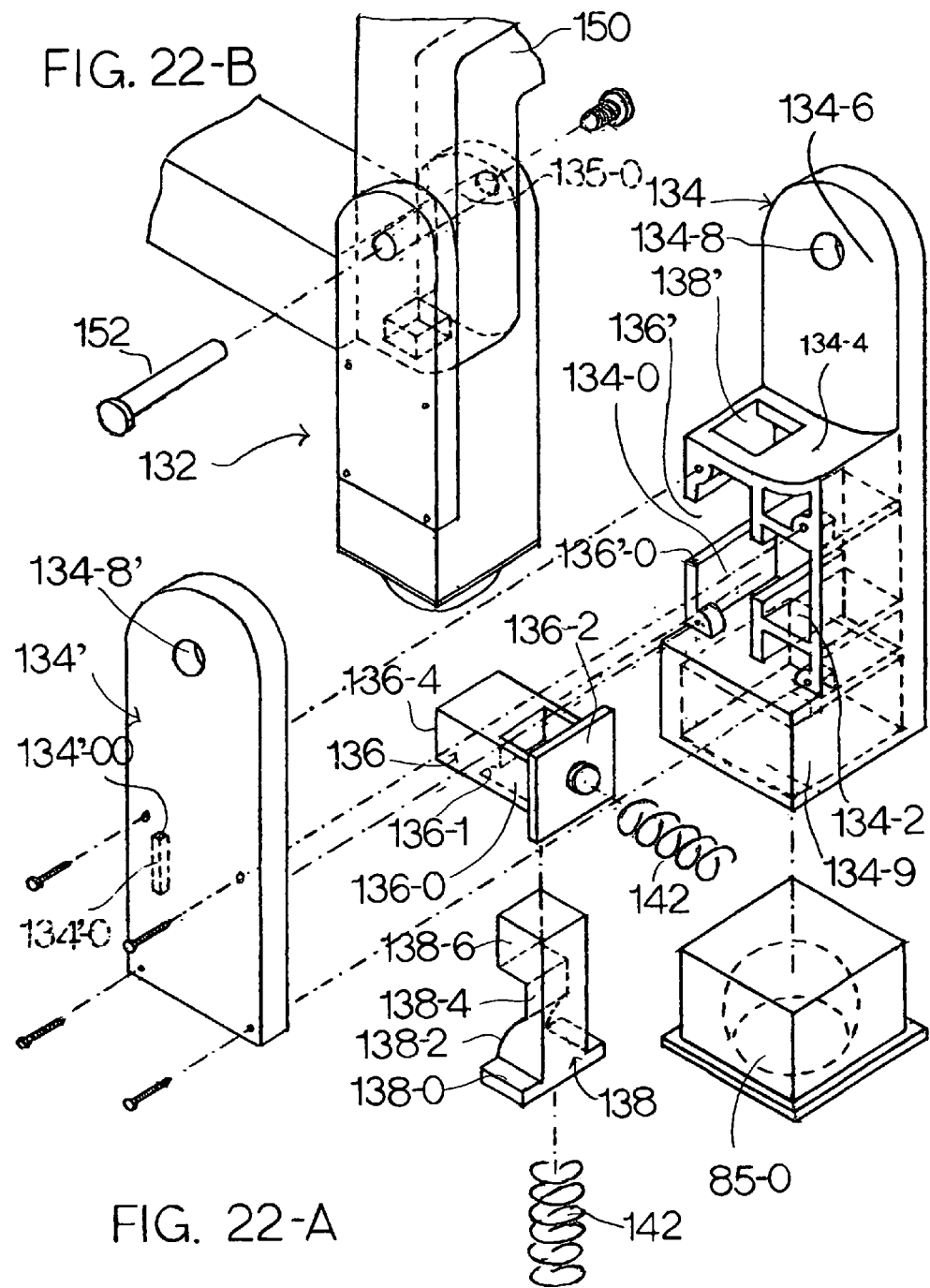

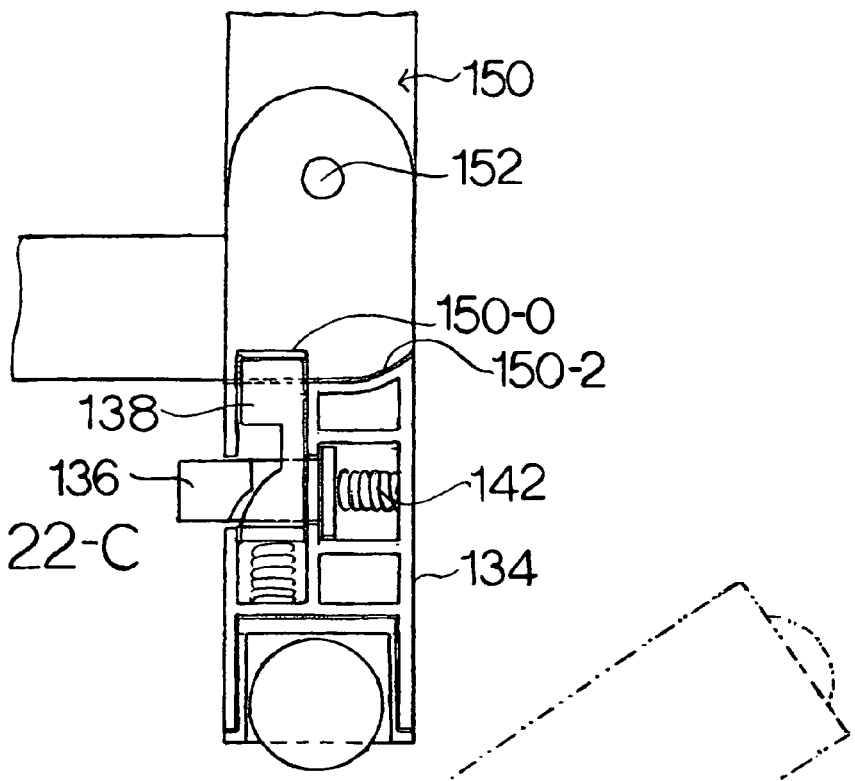
FIG. 22-C
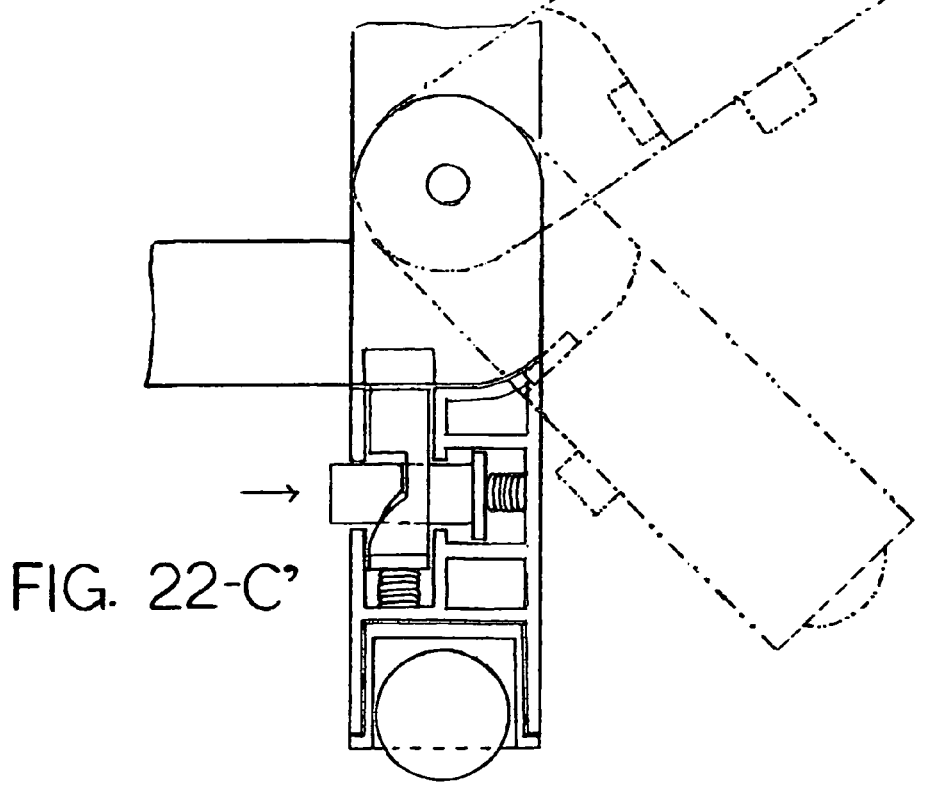
FIG. 22-C'

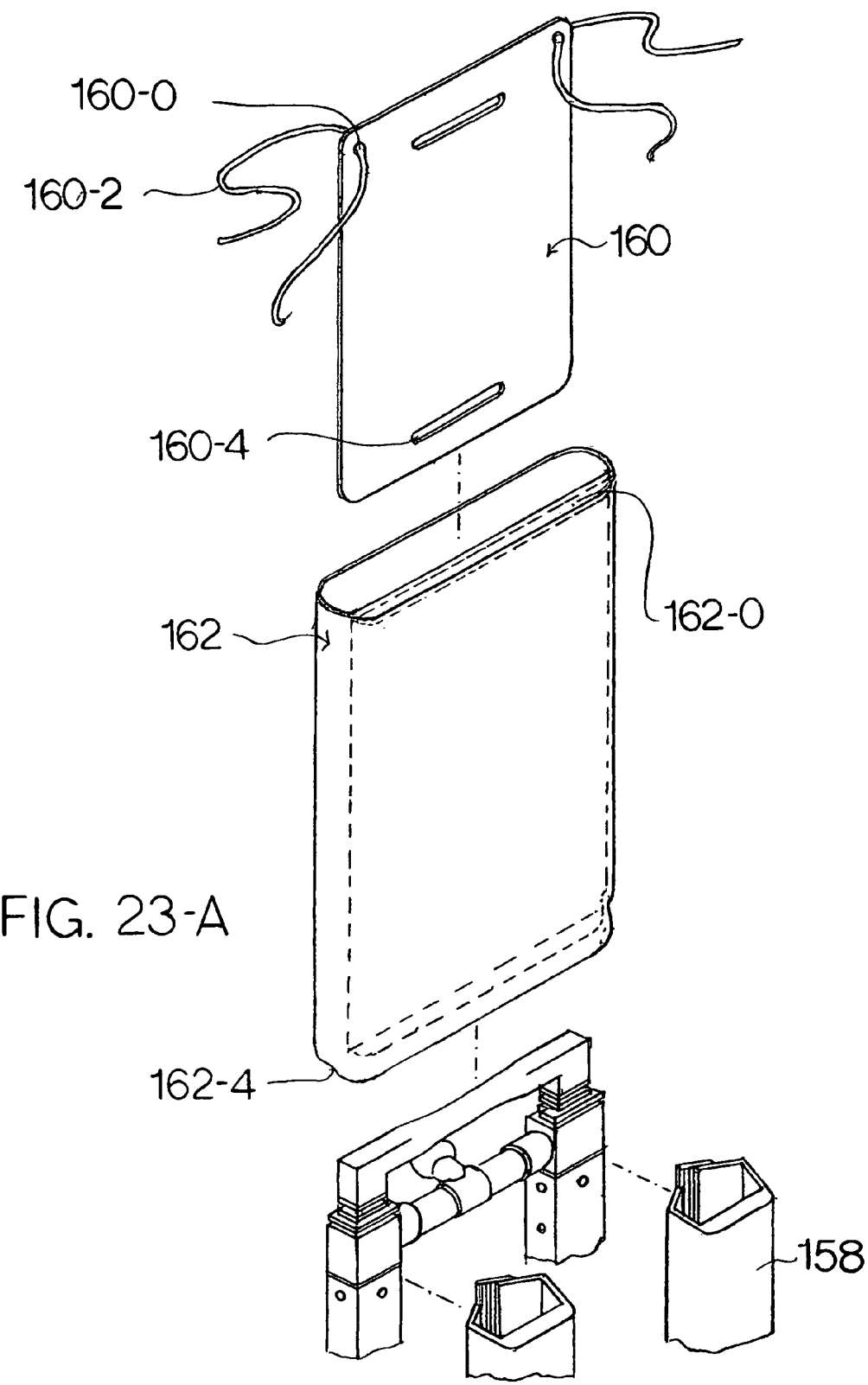
FIG. 23-A

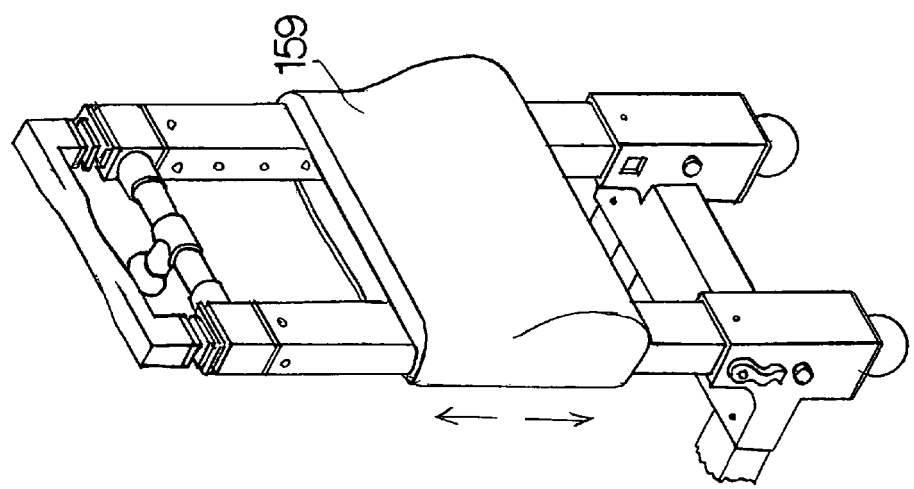
FIG. 23-C
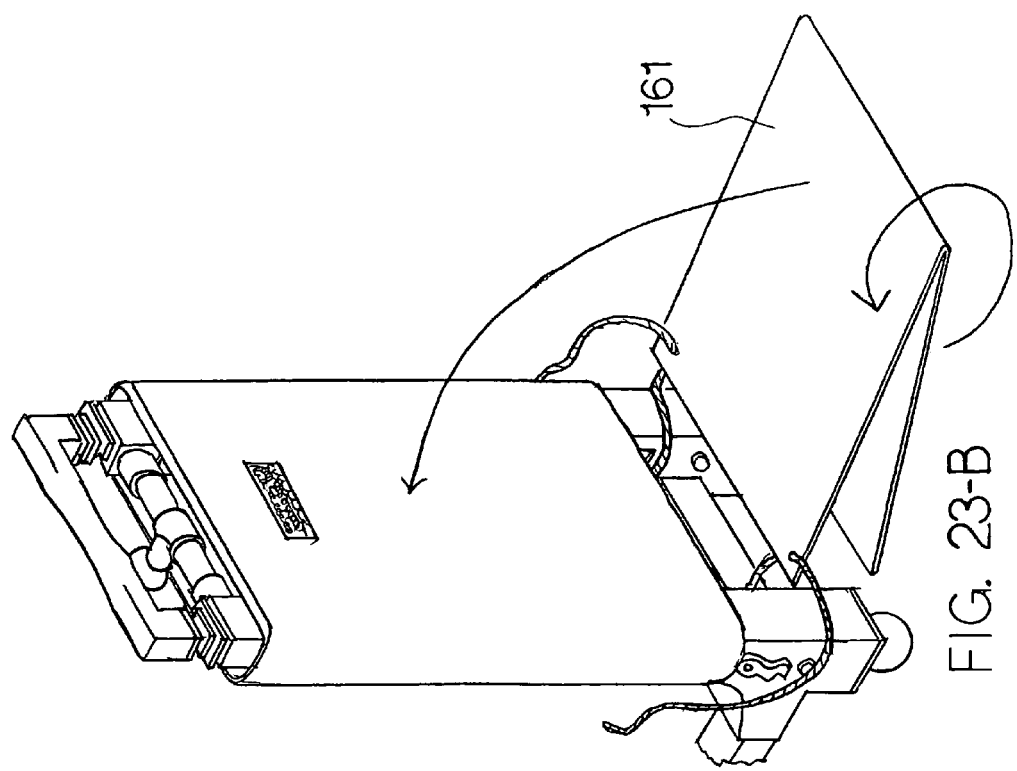
FIG. 23-B

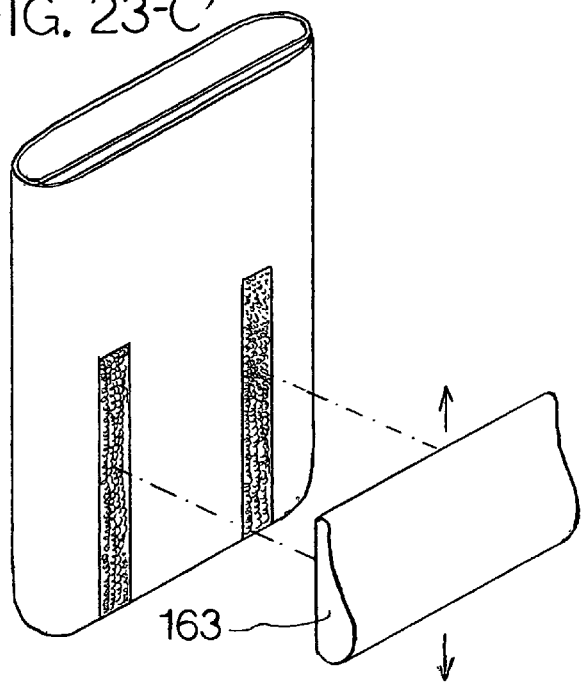
FIG. 23-C'
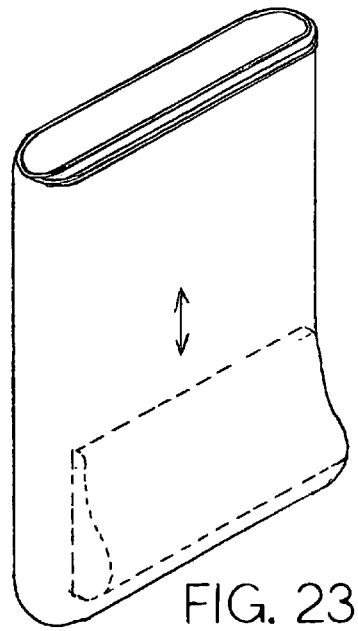
FIG. 23-C"
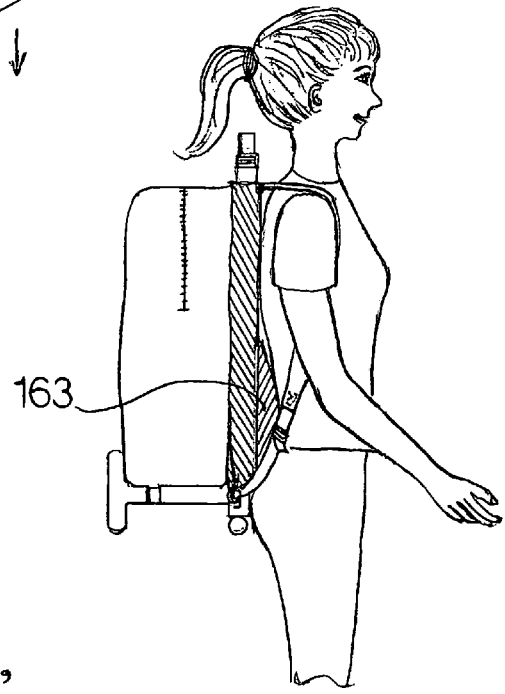
FIG. 23-C'''

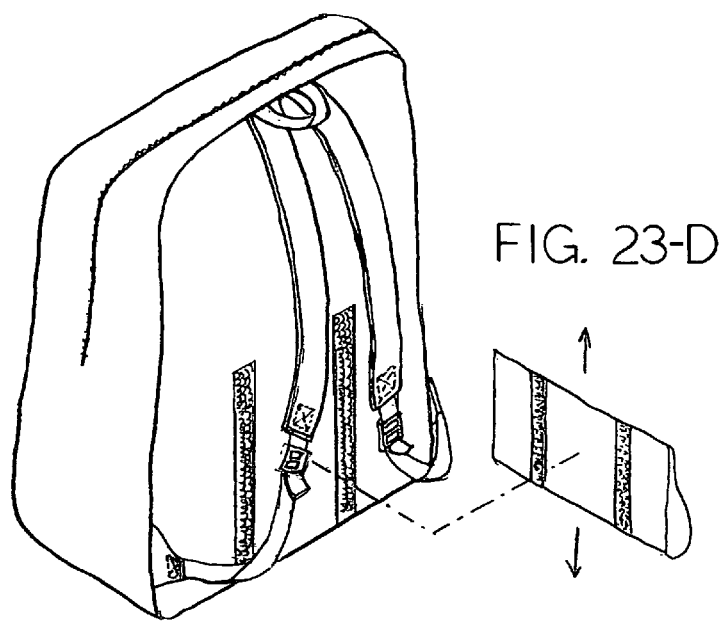
FIG. 23-D
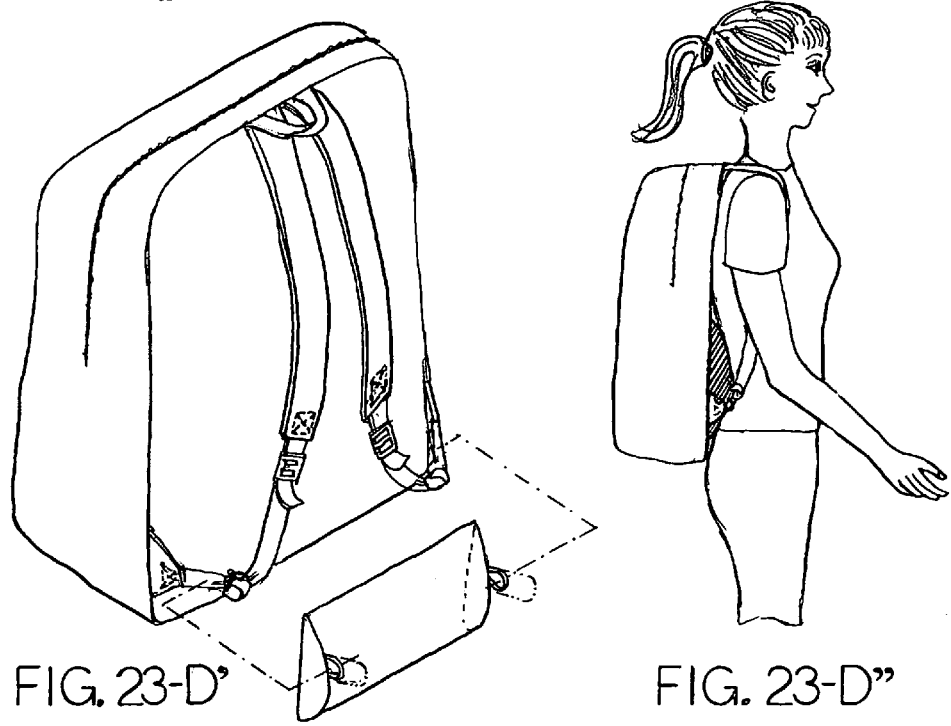
FIG. 23-D'
FIG. 23-D"

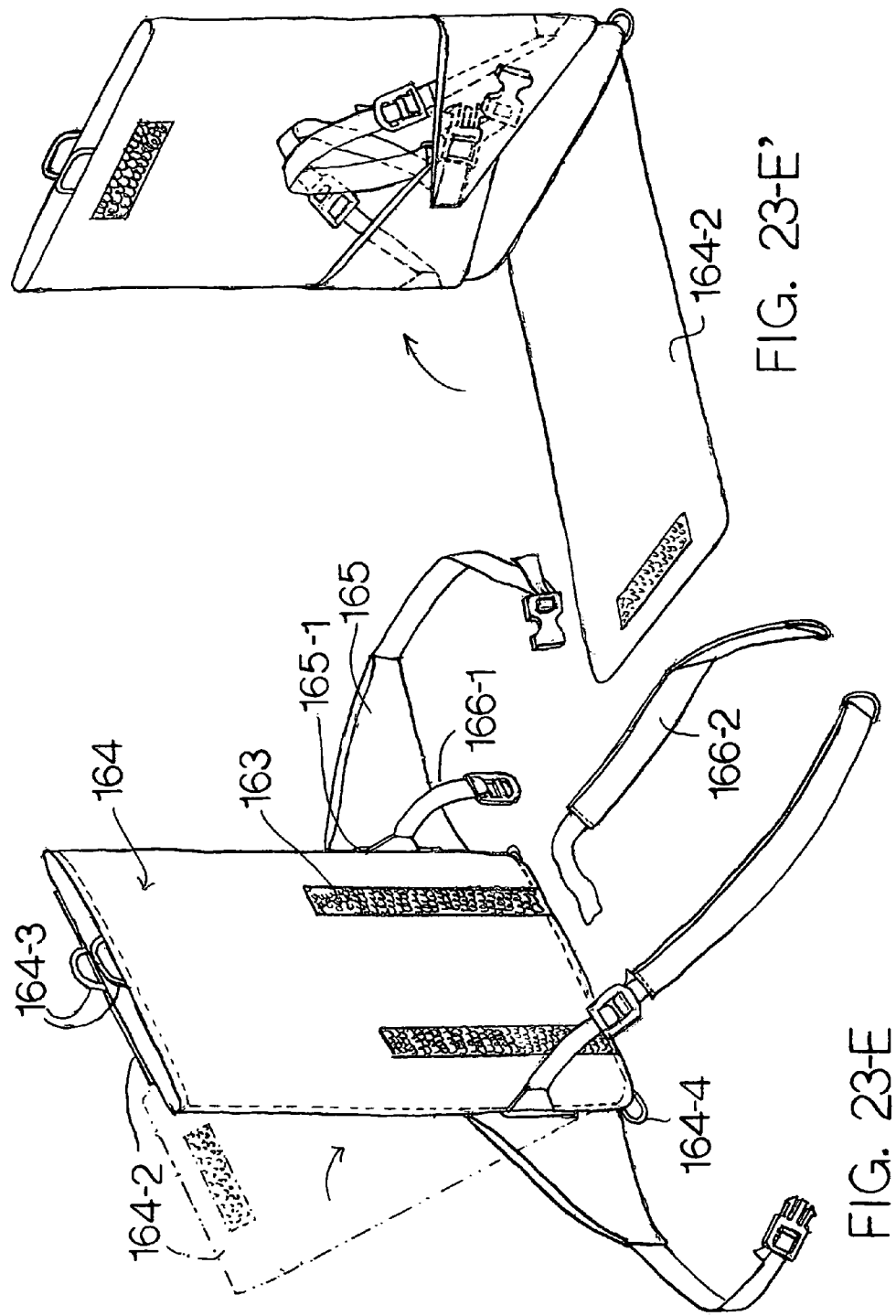

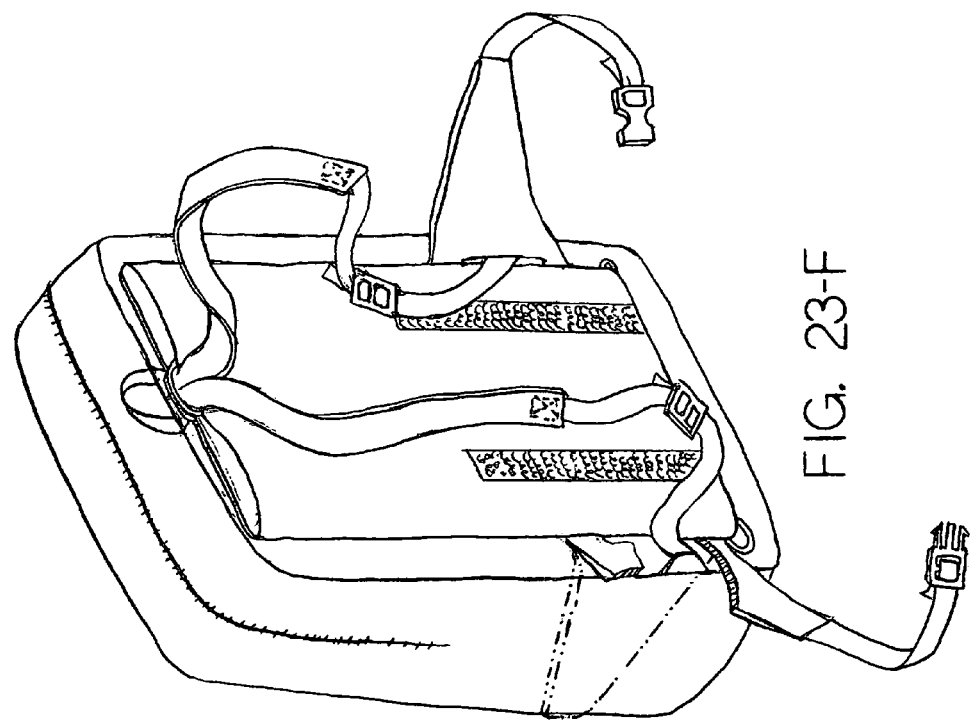
FIG. 23-F
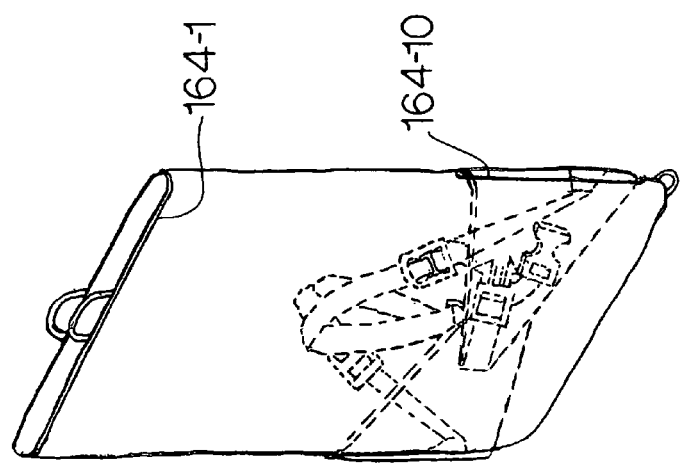
FIG. 23-E"

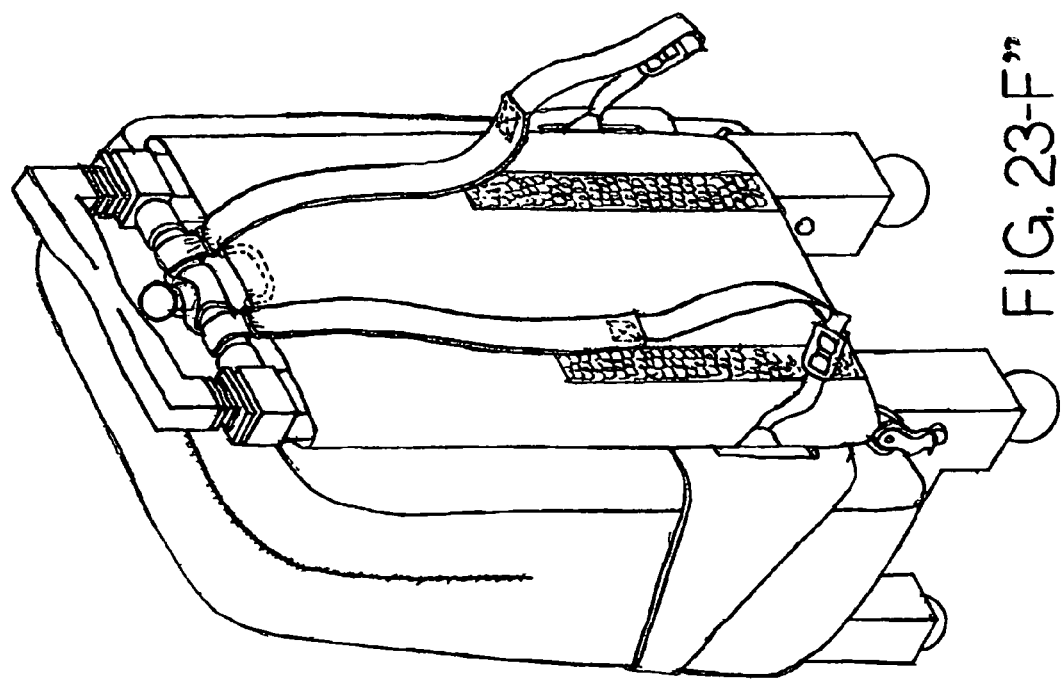
FIG. 23-F"
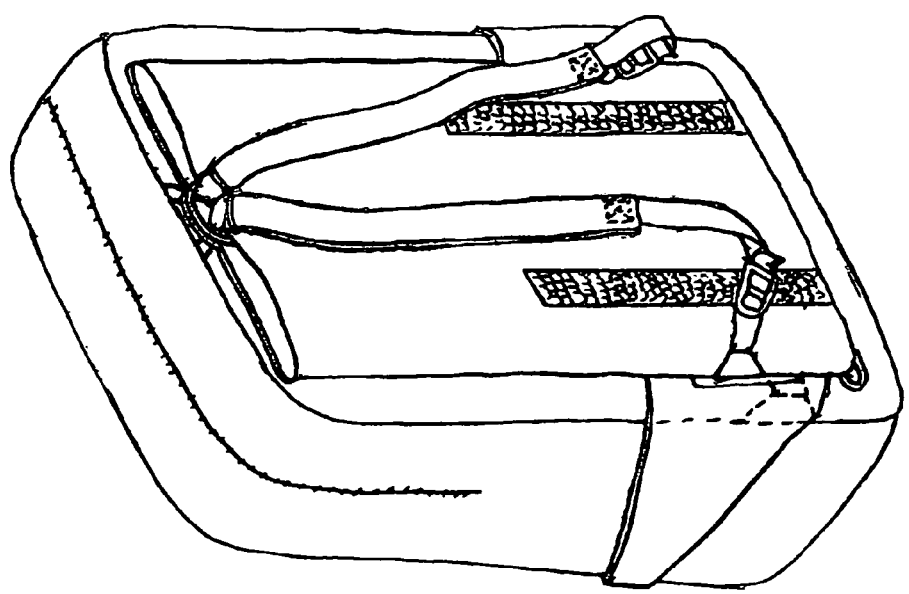
FIG. 23-F'

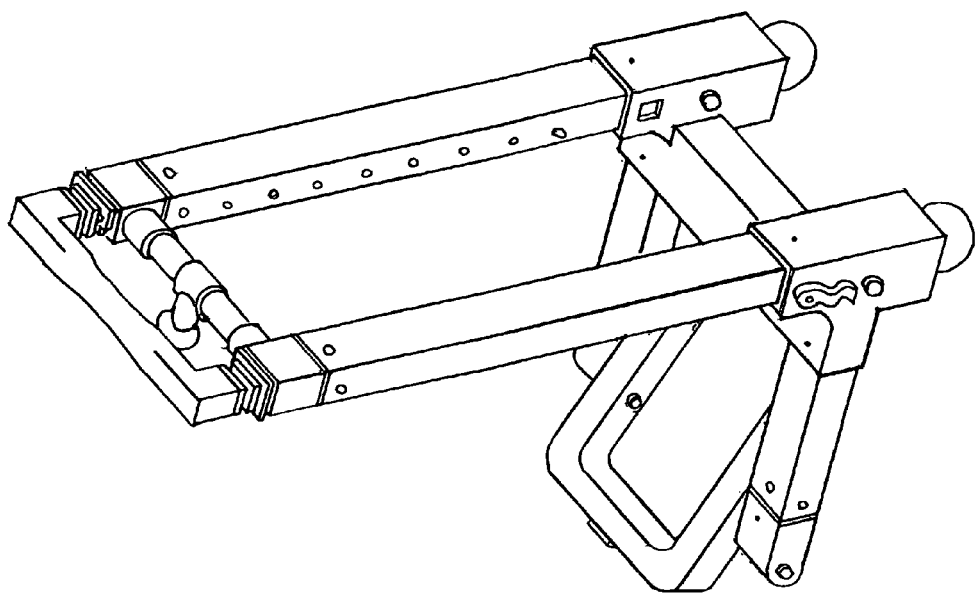
FIG. 24-A'
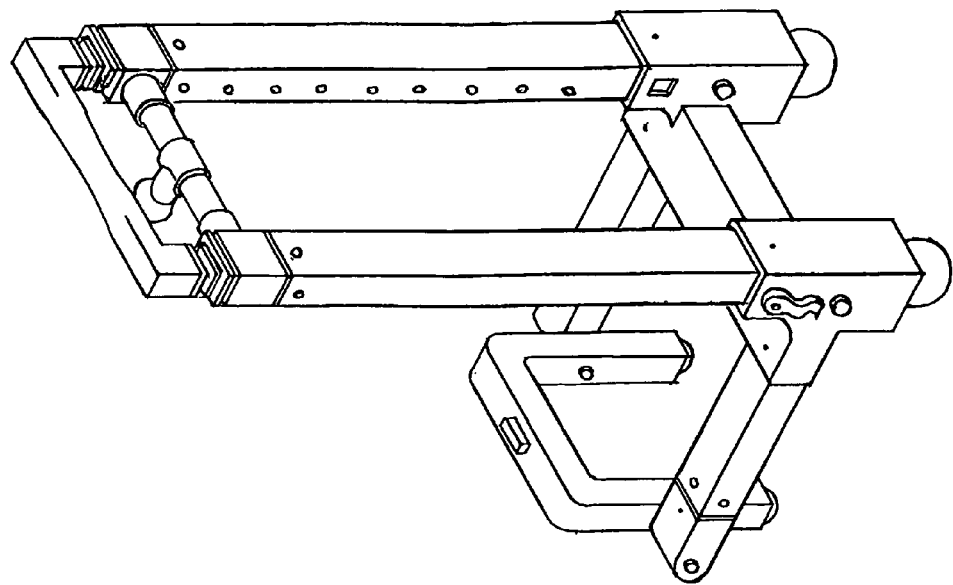
FIG. 24-A

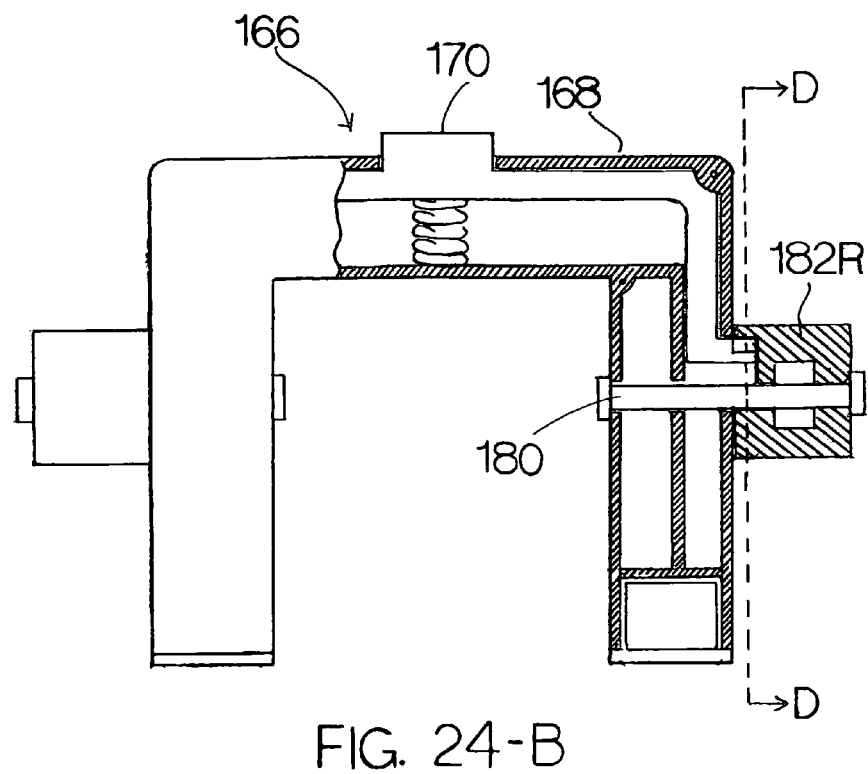
FIG. 24-B
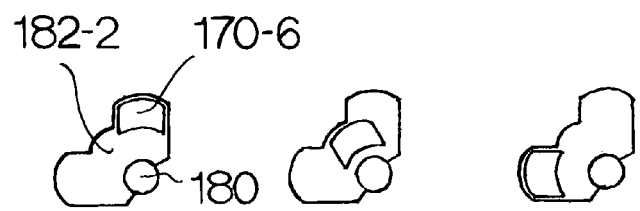
FIG. 24-B"A    FIG. 24-B"B   FIG. 24-B"C

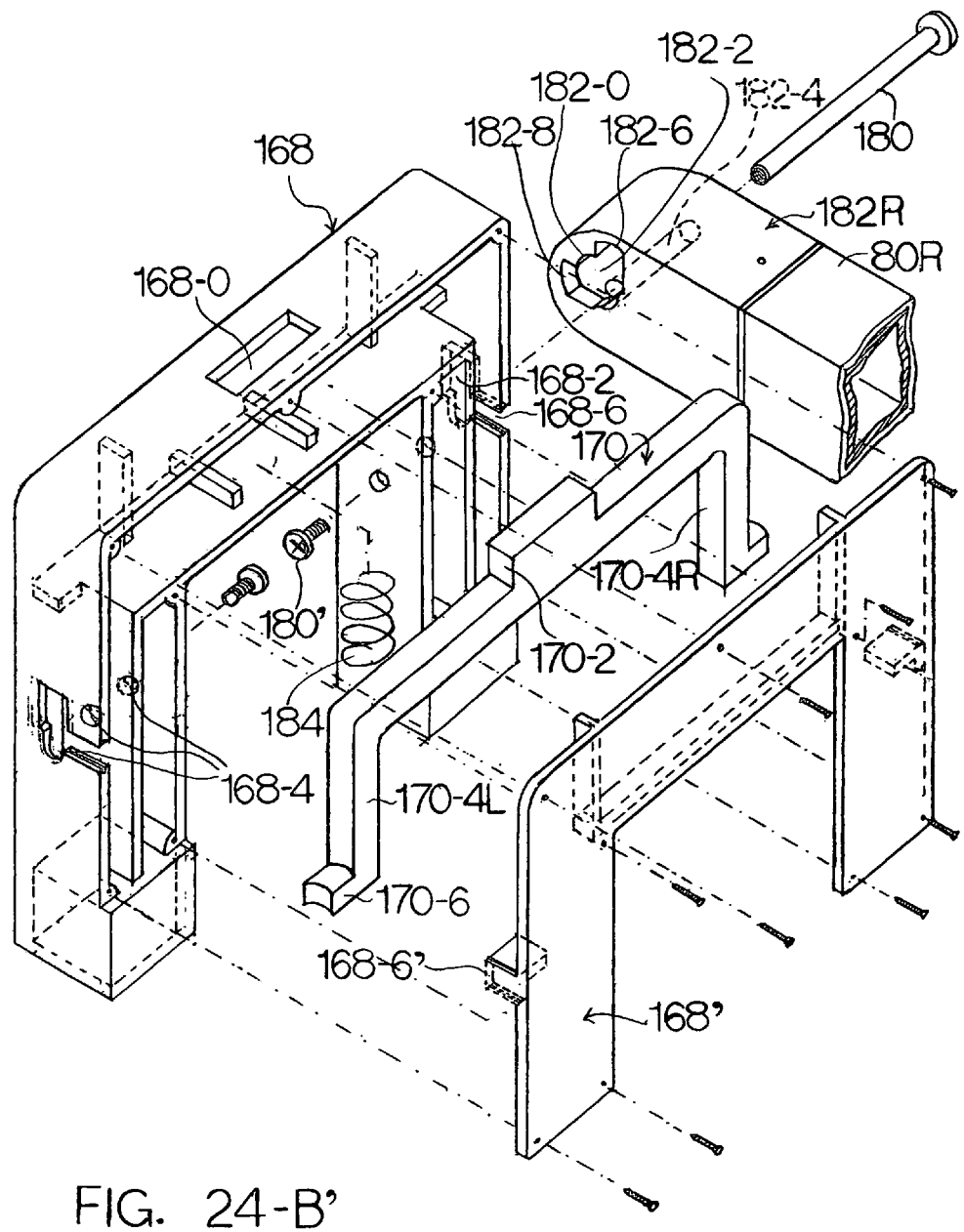
FIG. 24-B'

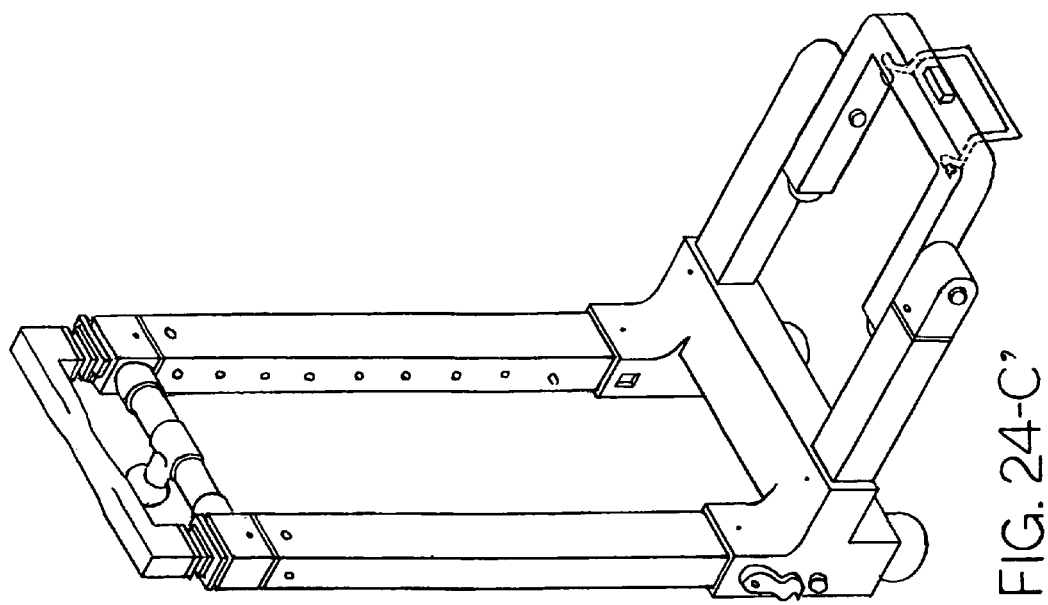
FIG. 24-C'
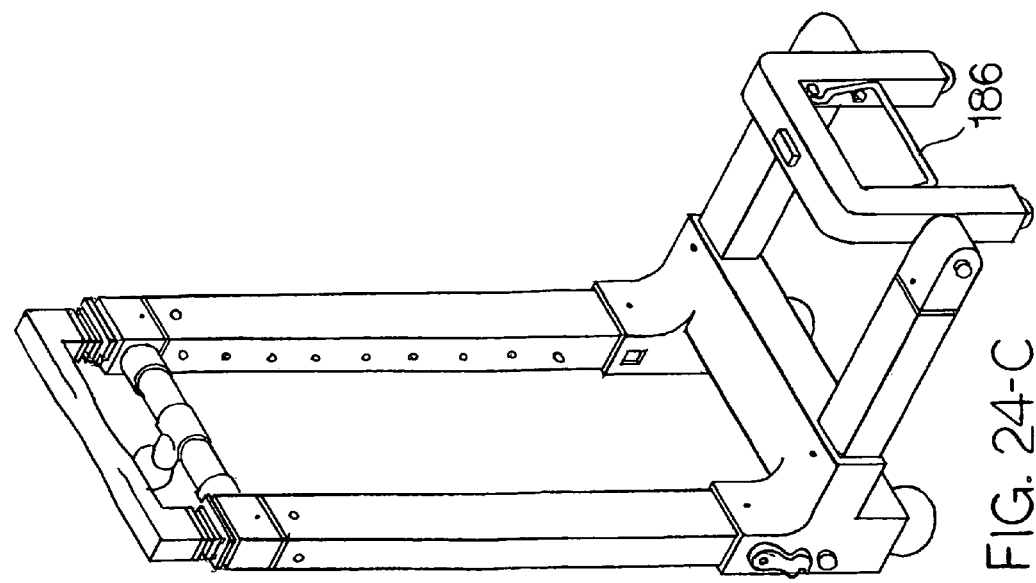
FIG. 24-C

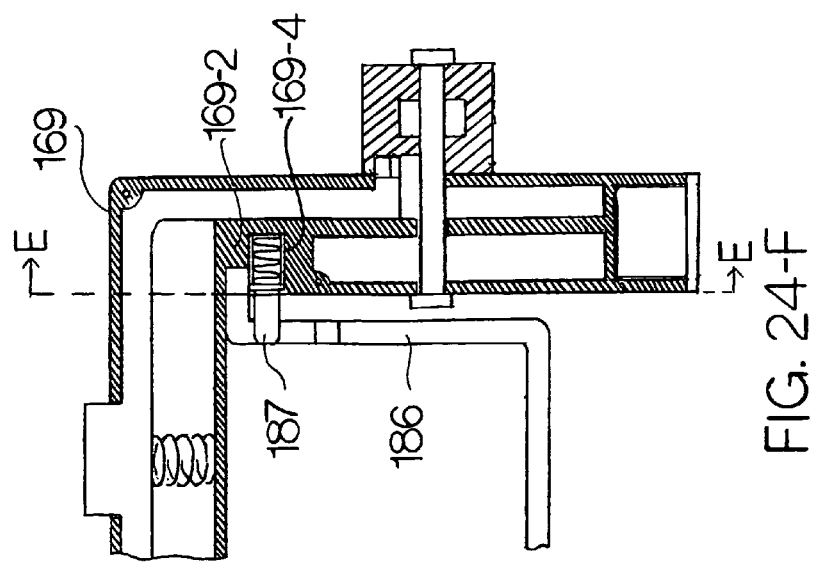
FIG. 24-F
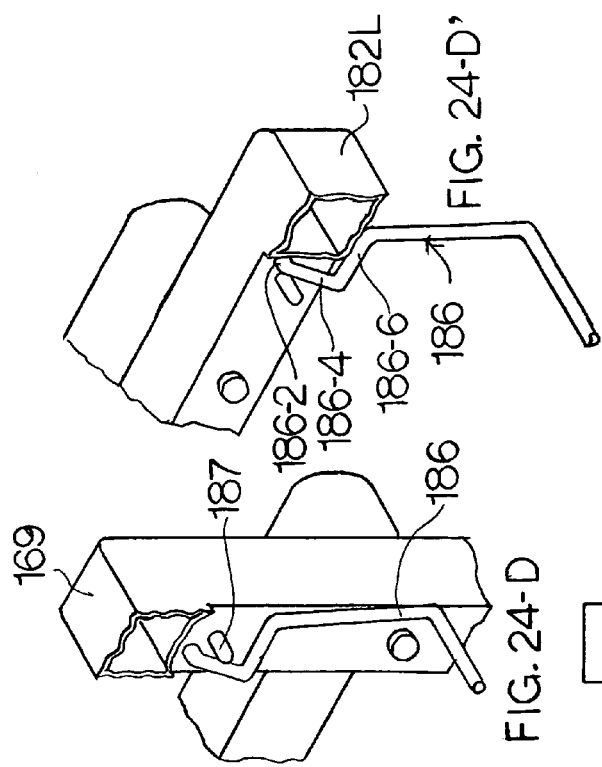
FIG. 24-D'
FIG. 24-D
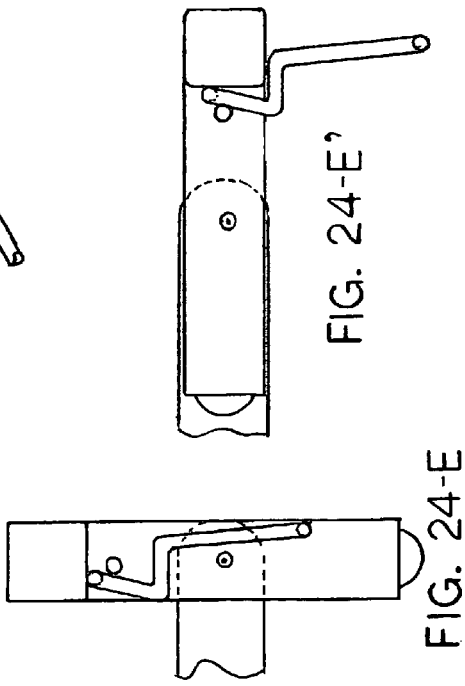
FIG. 24-E'
FIG. 24-E

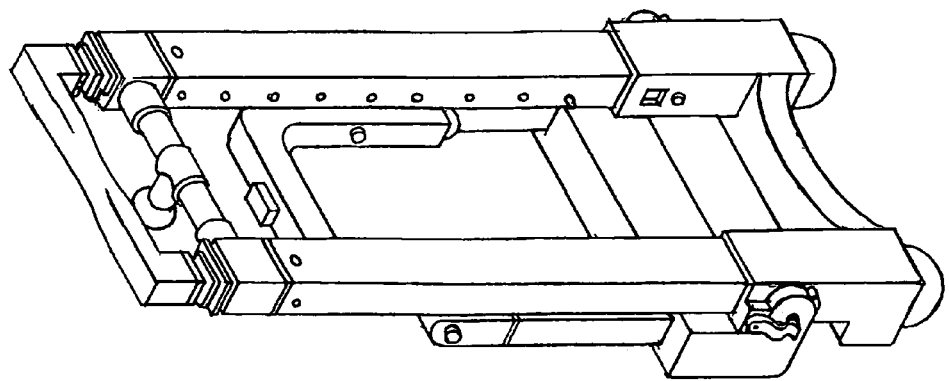
FIG. 25-B
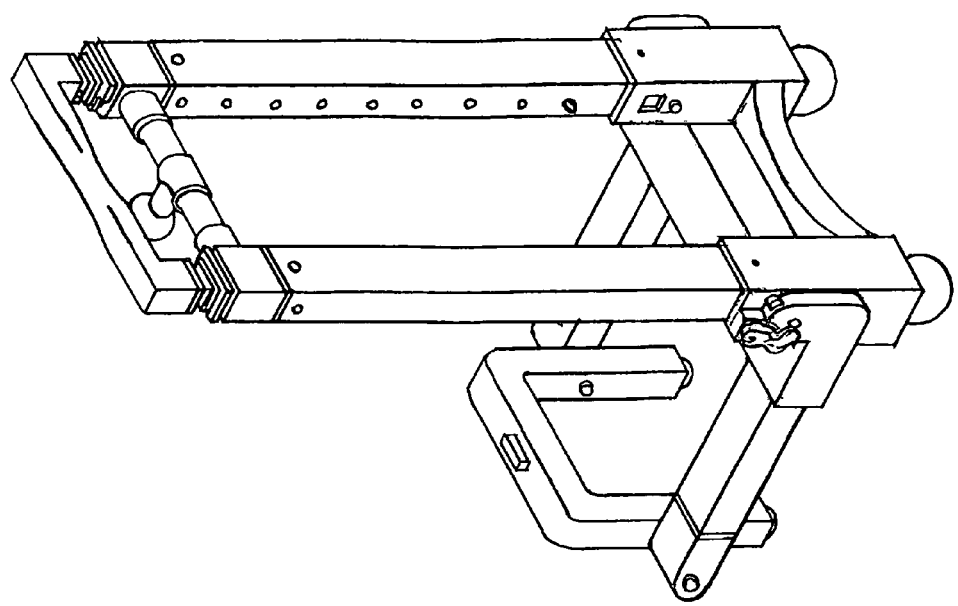
FIG. 25-A

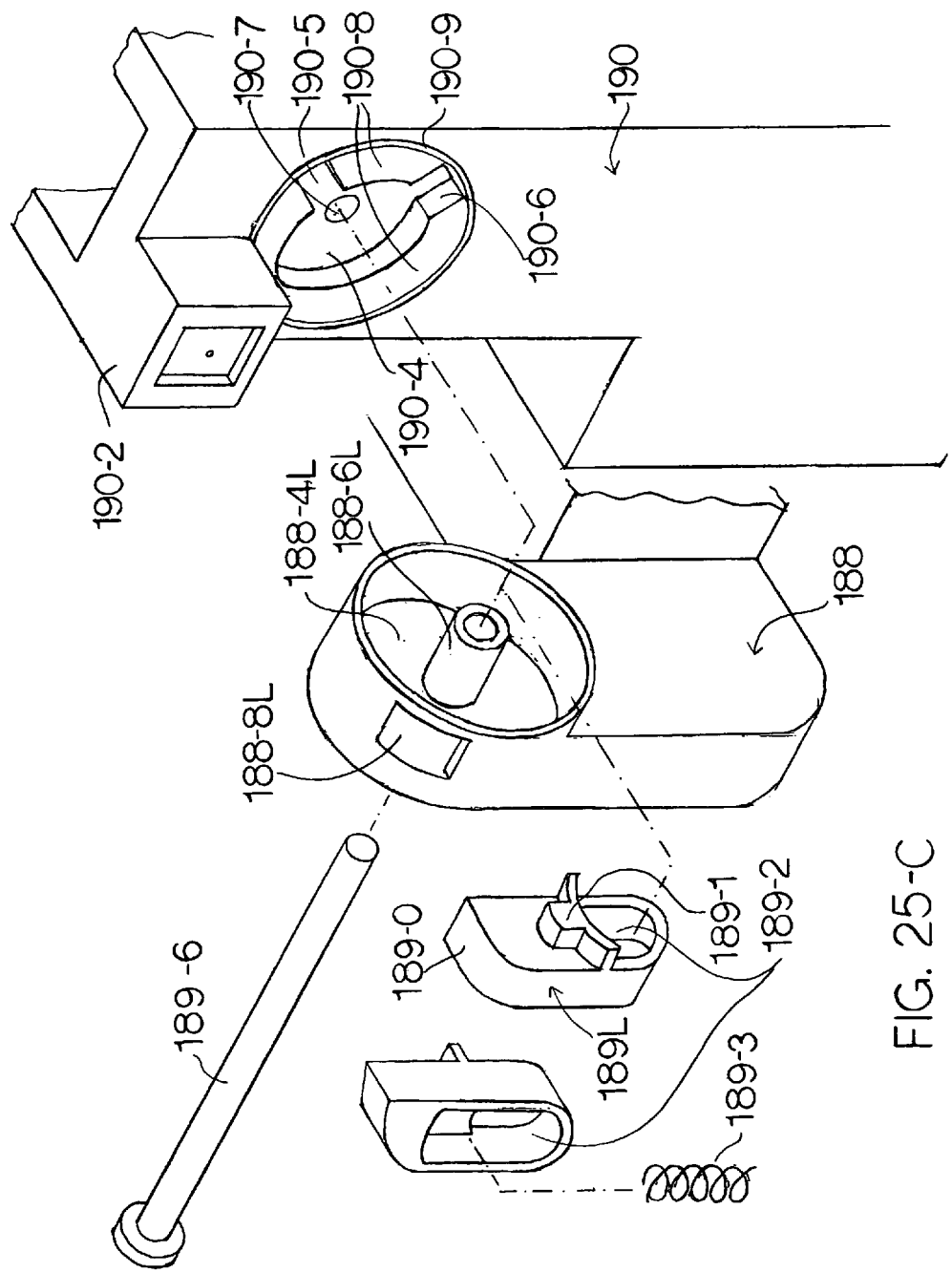
FIG. 25-C

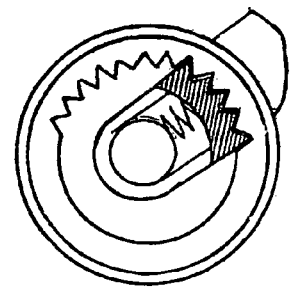
FIG. 25-F4
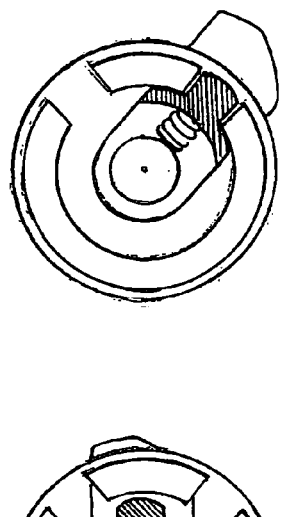
FIG. 25-D3
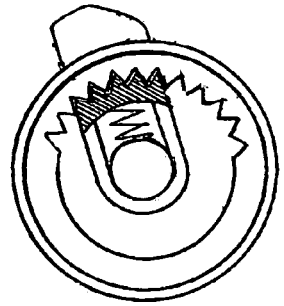
FIG. 25-F3
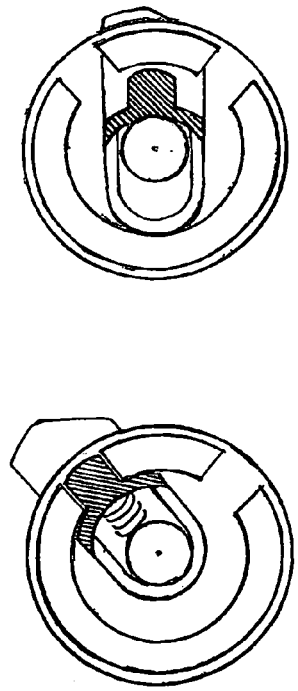
FIG. 25-D2
FIG. 25-D1
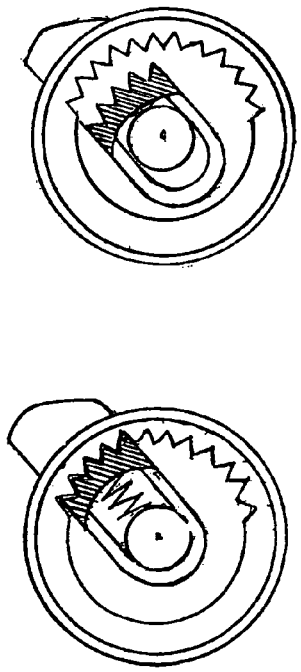
FIG. 25-F2
FIG. 25-F1

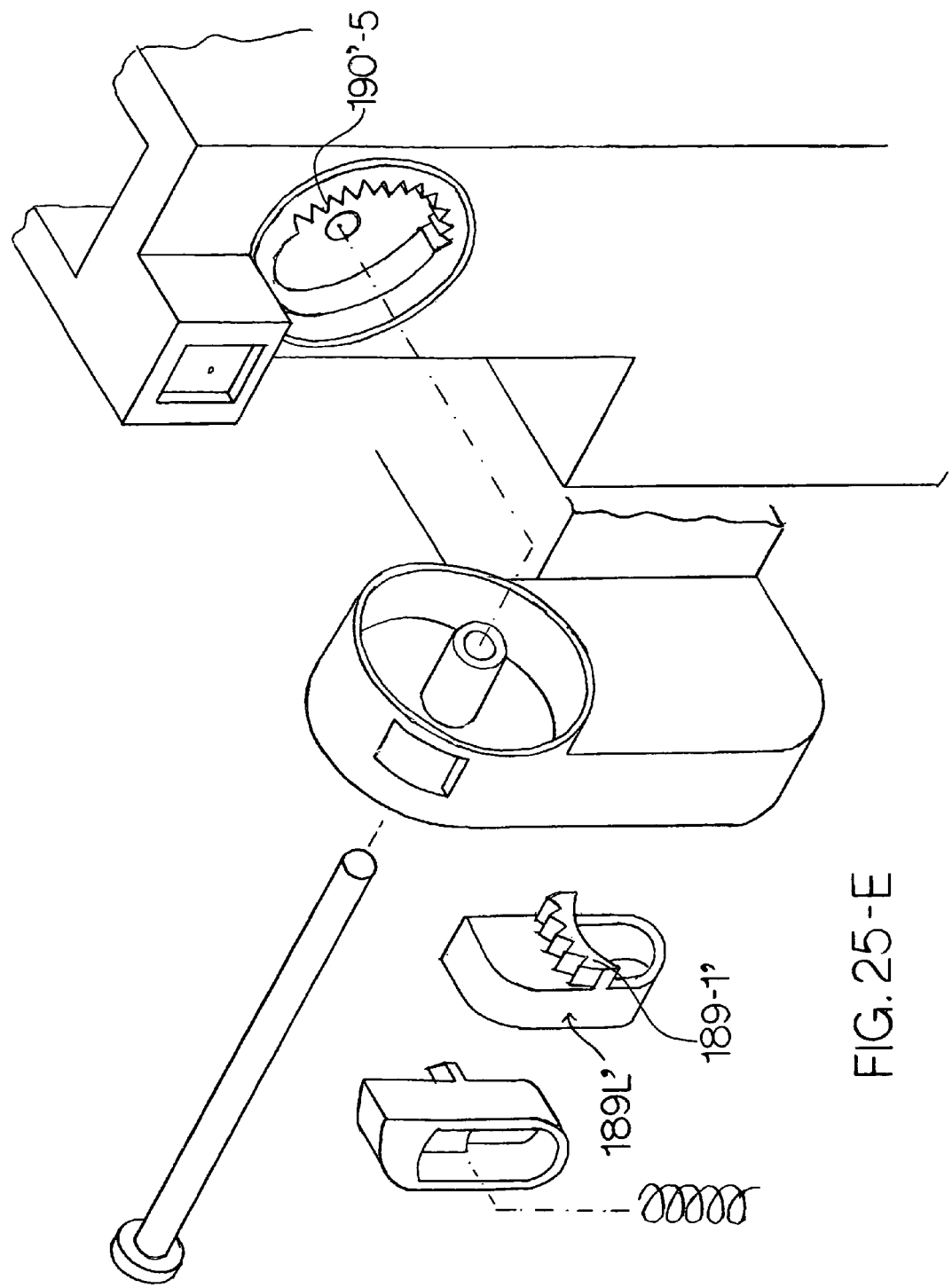
FIG. 25-E

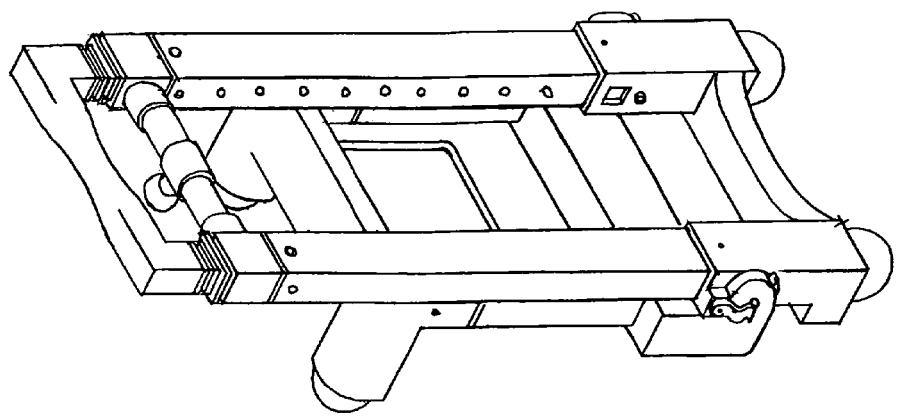
FIG. 25-G'
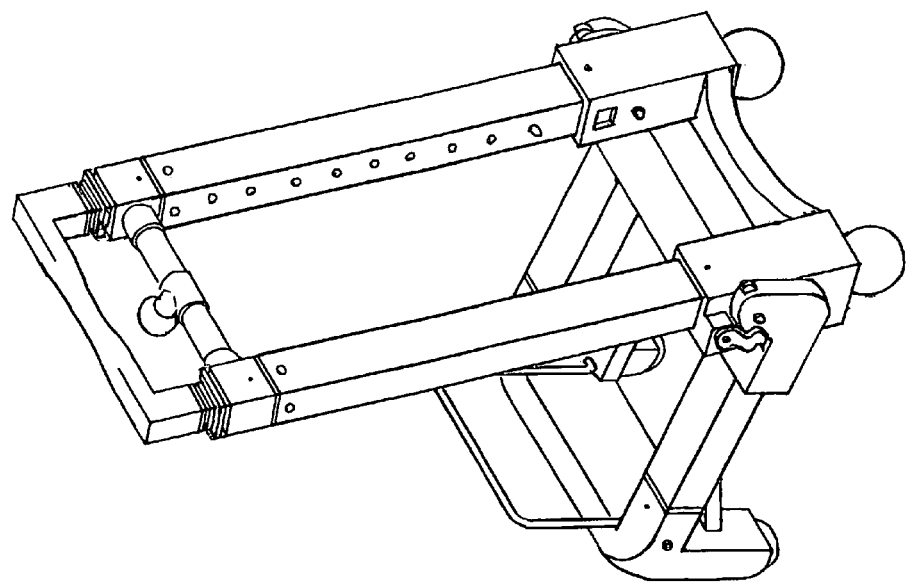
FIG. 25-G

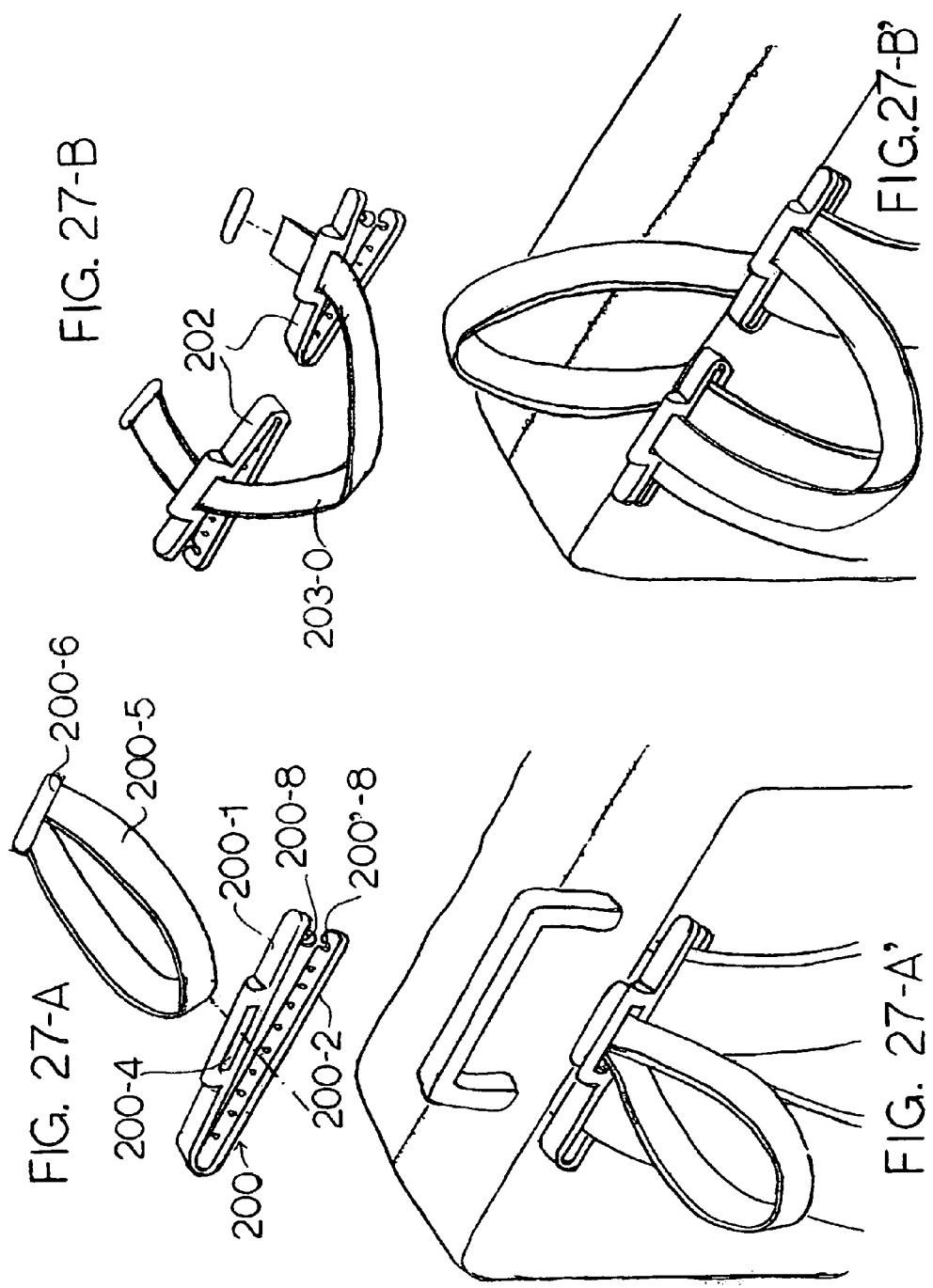

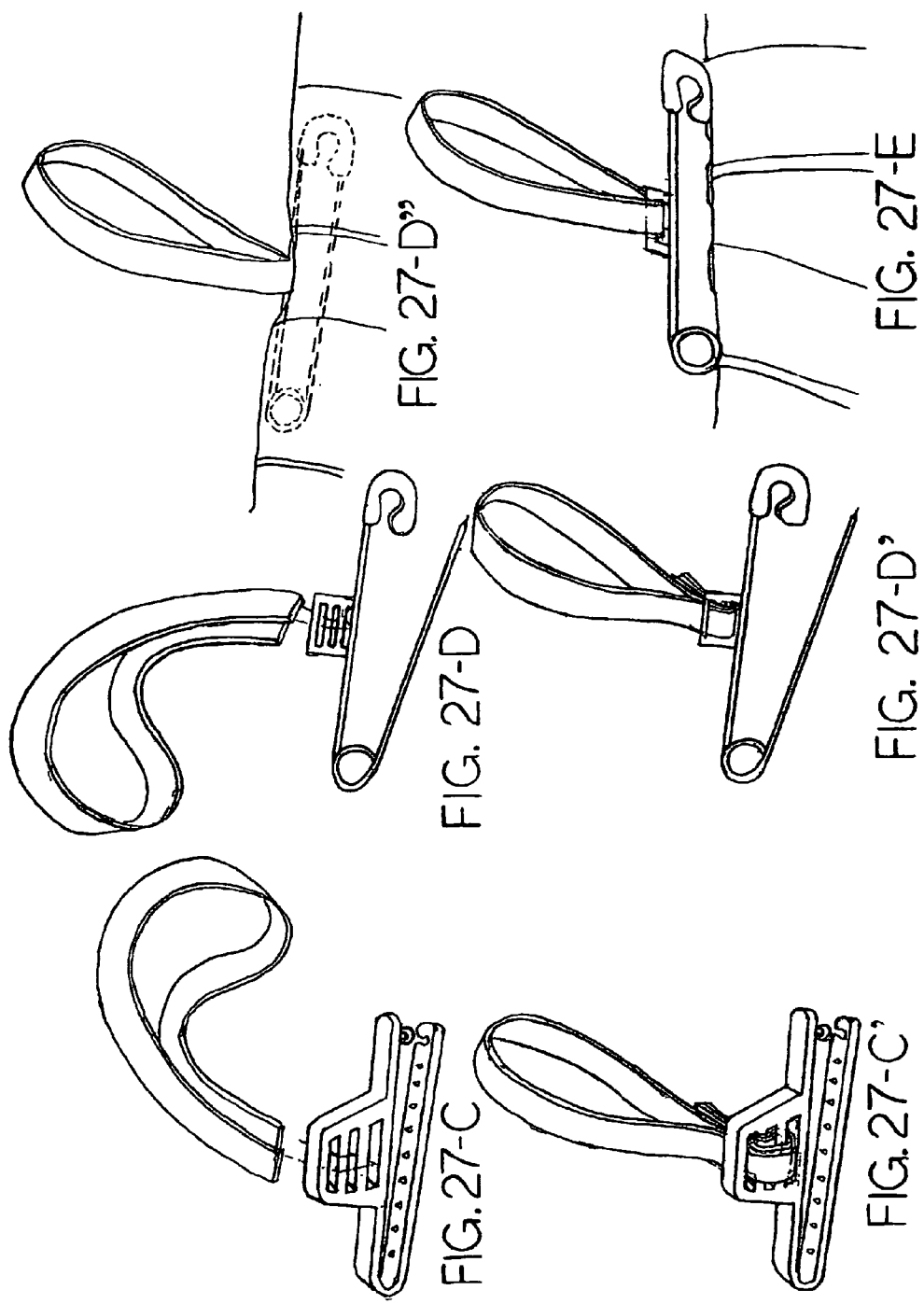

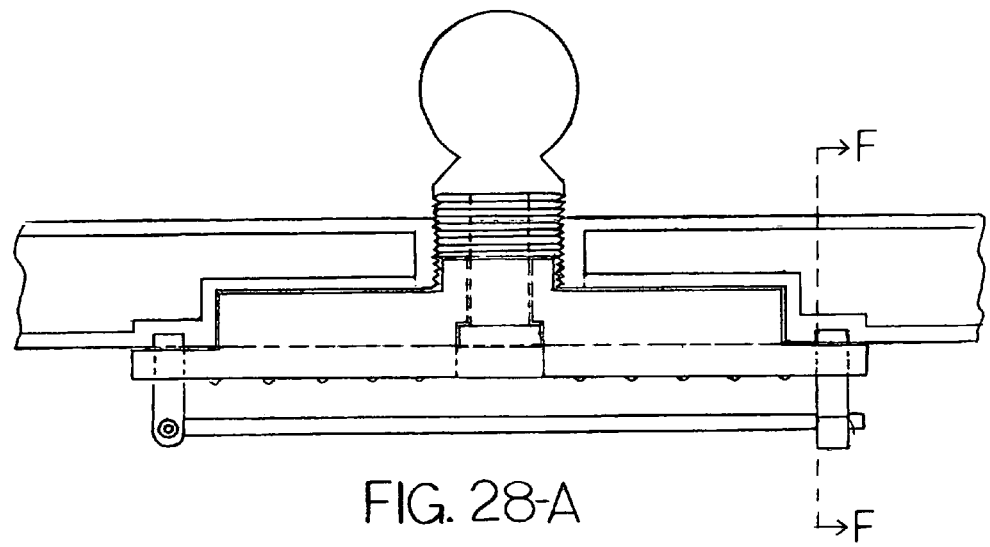
FIG. 28-A
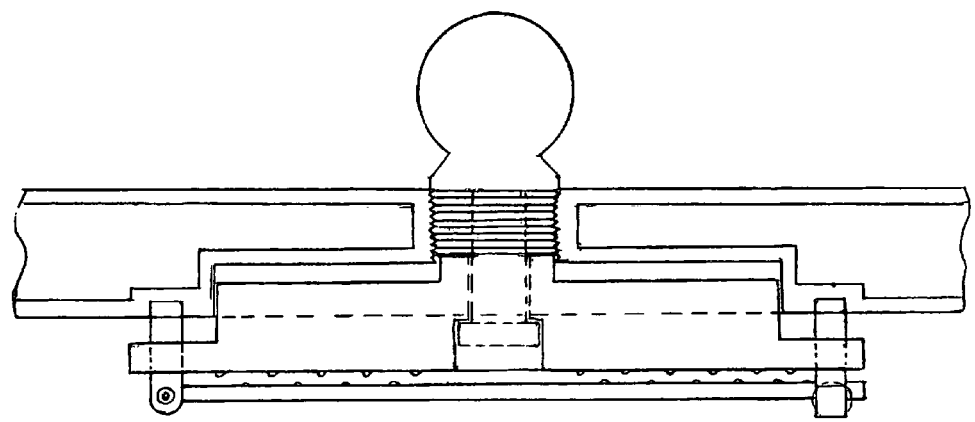
FIG. 28-A'

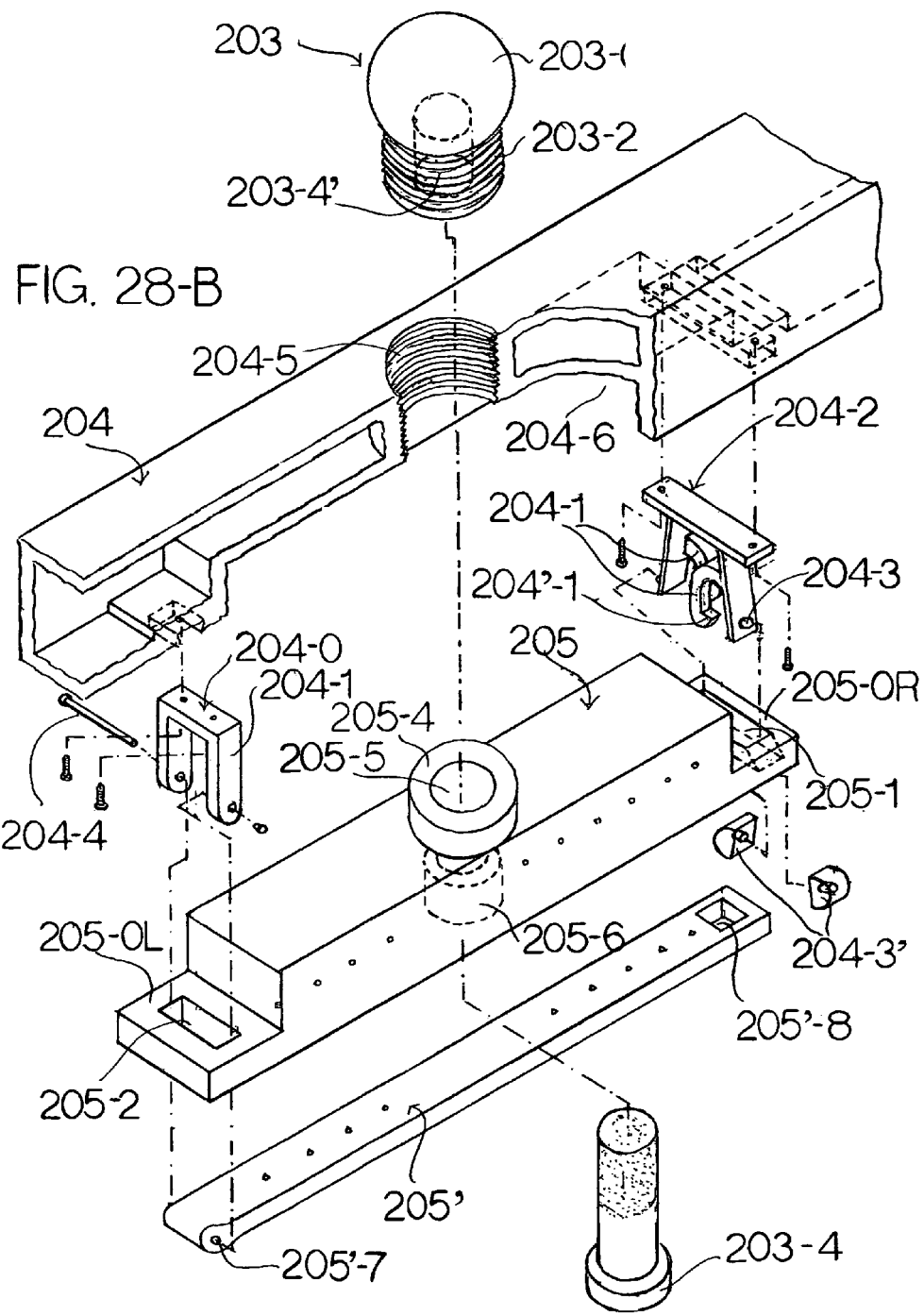

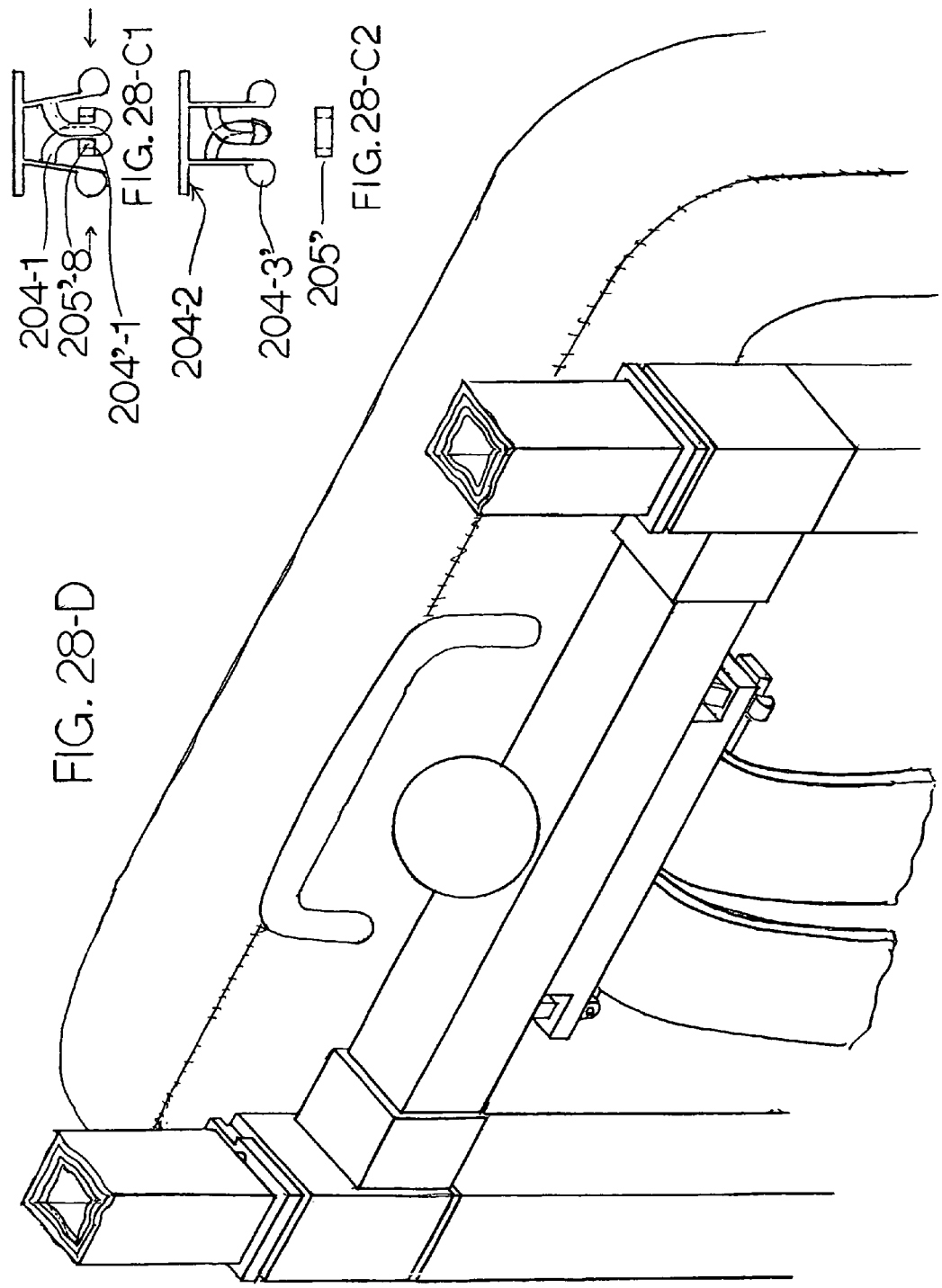

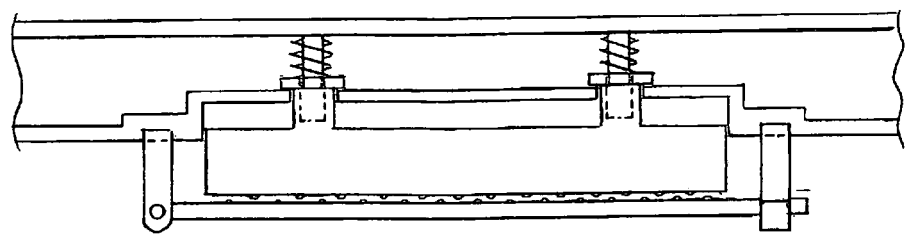
FIG. 29-A
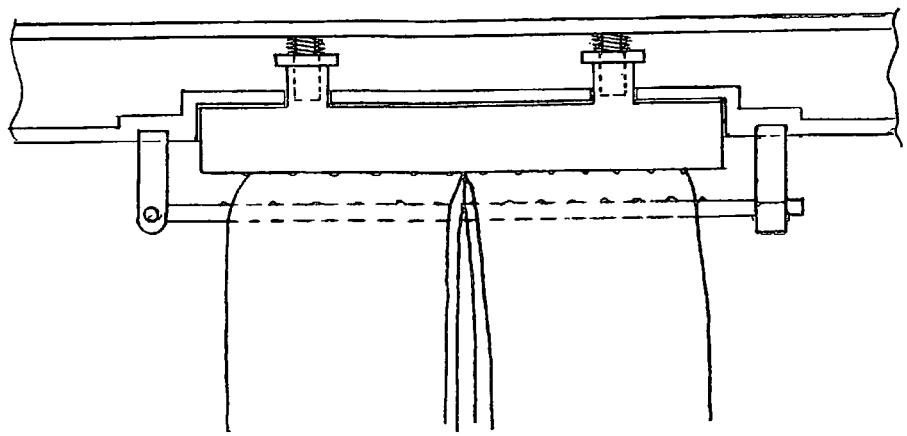
FIG. 29-B

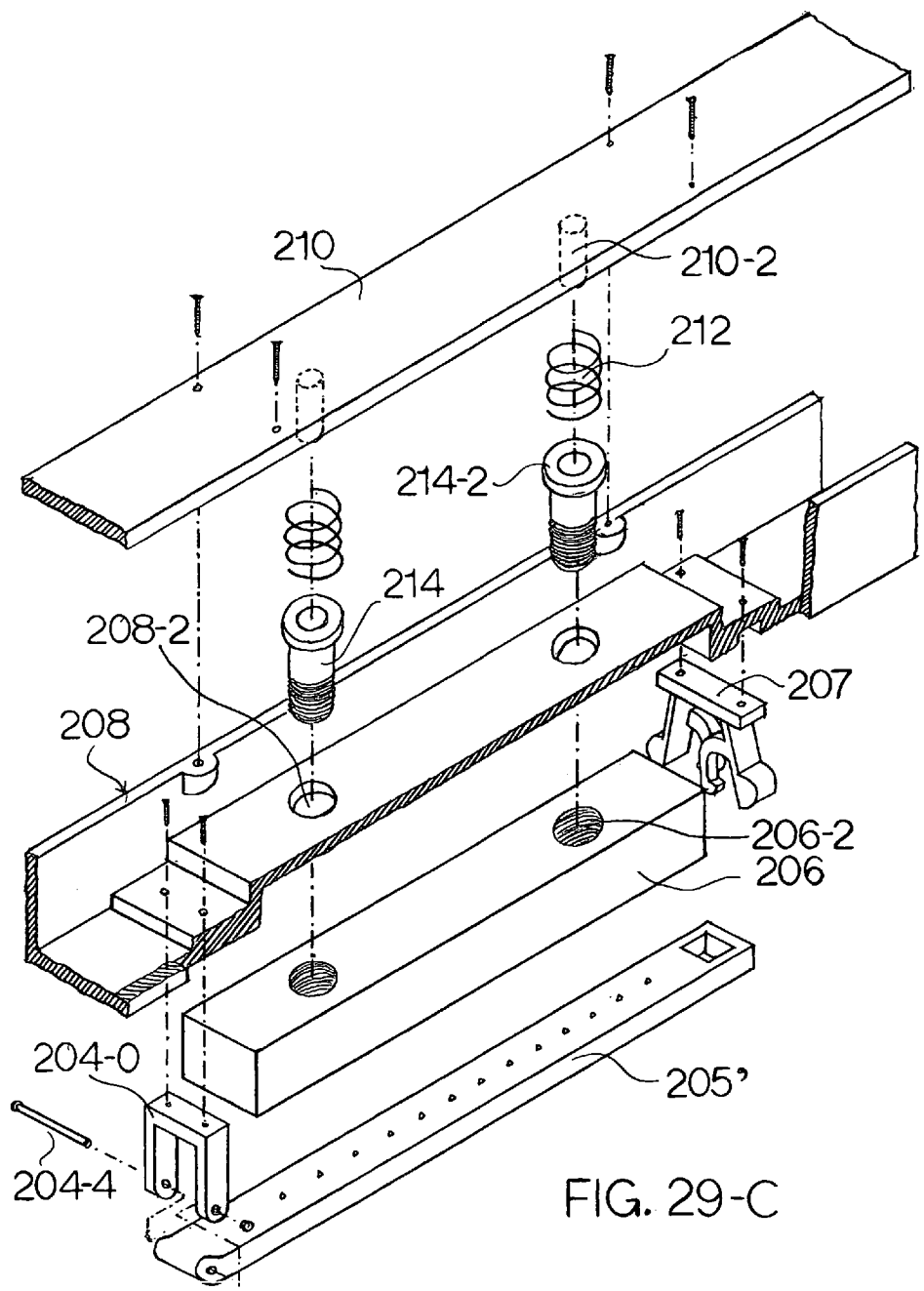
FIG. 29-C

FIG. 30-A
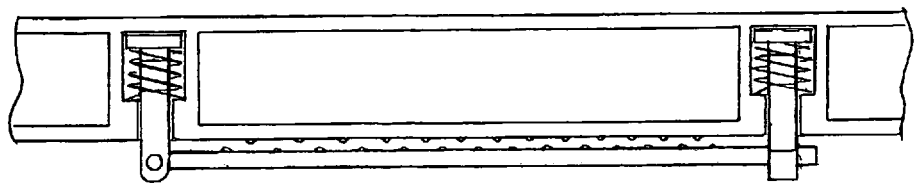
FIG. 30-B
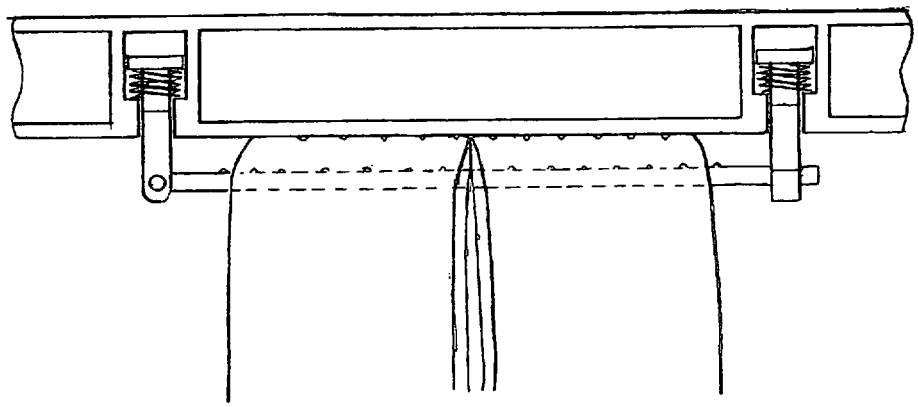

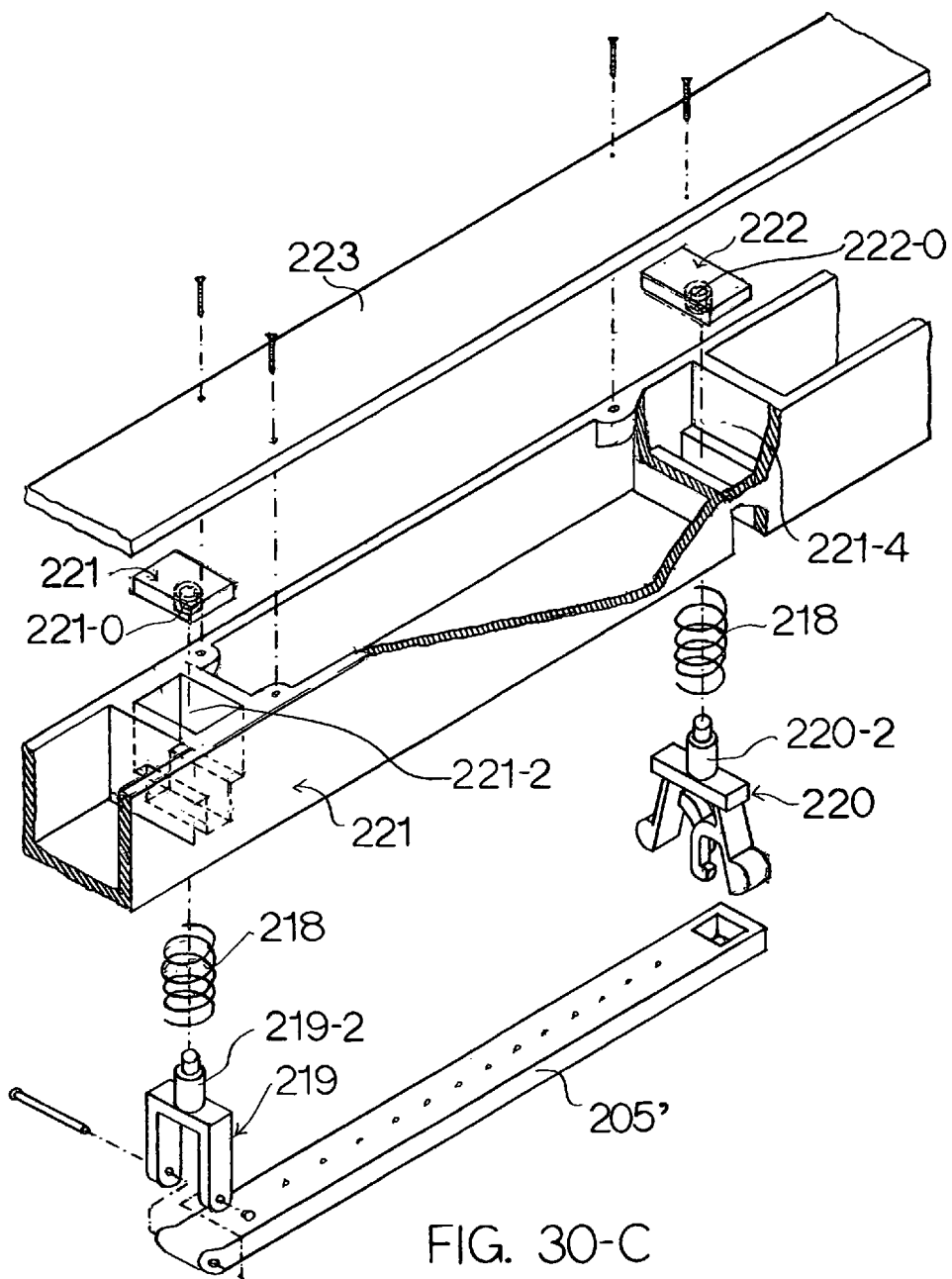
FIG. 30-C

FIG. 31-A
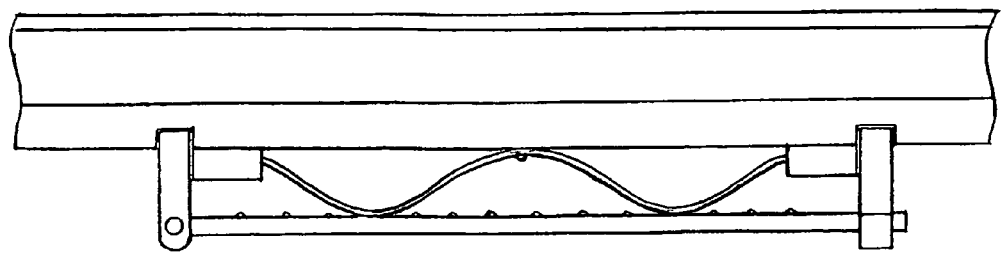
FIG. 31-B
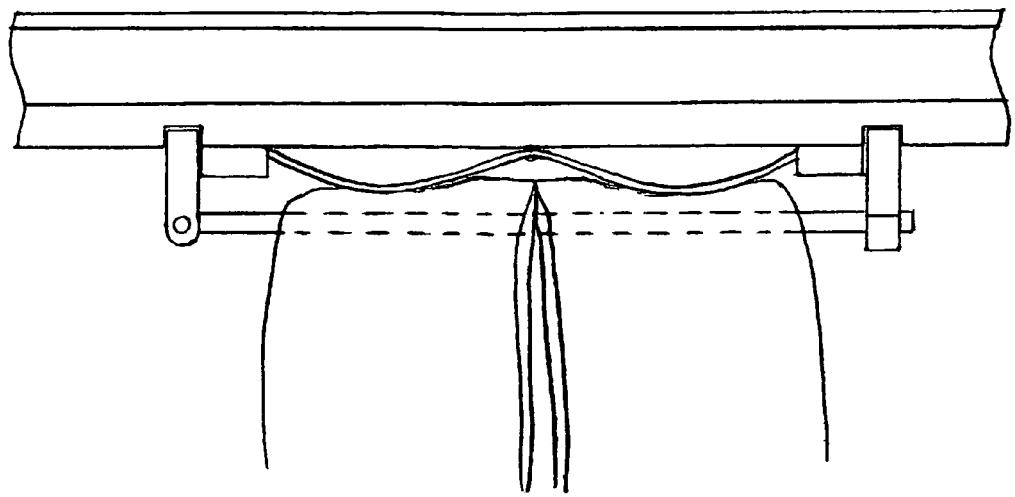

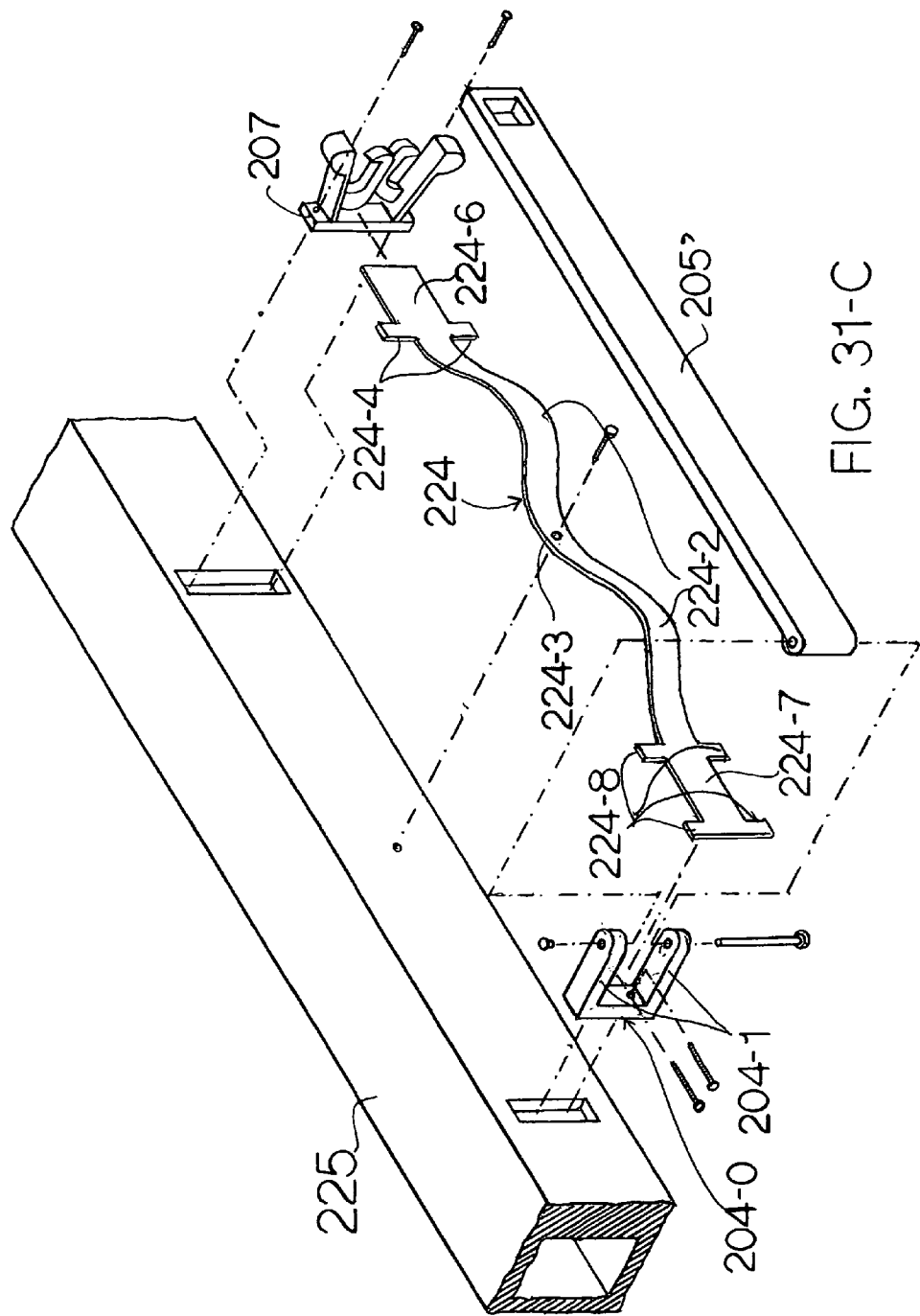

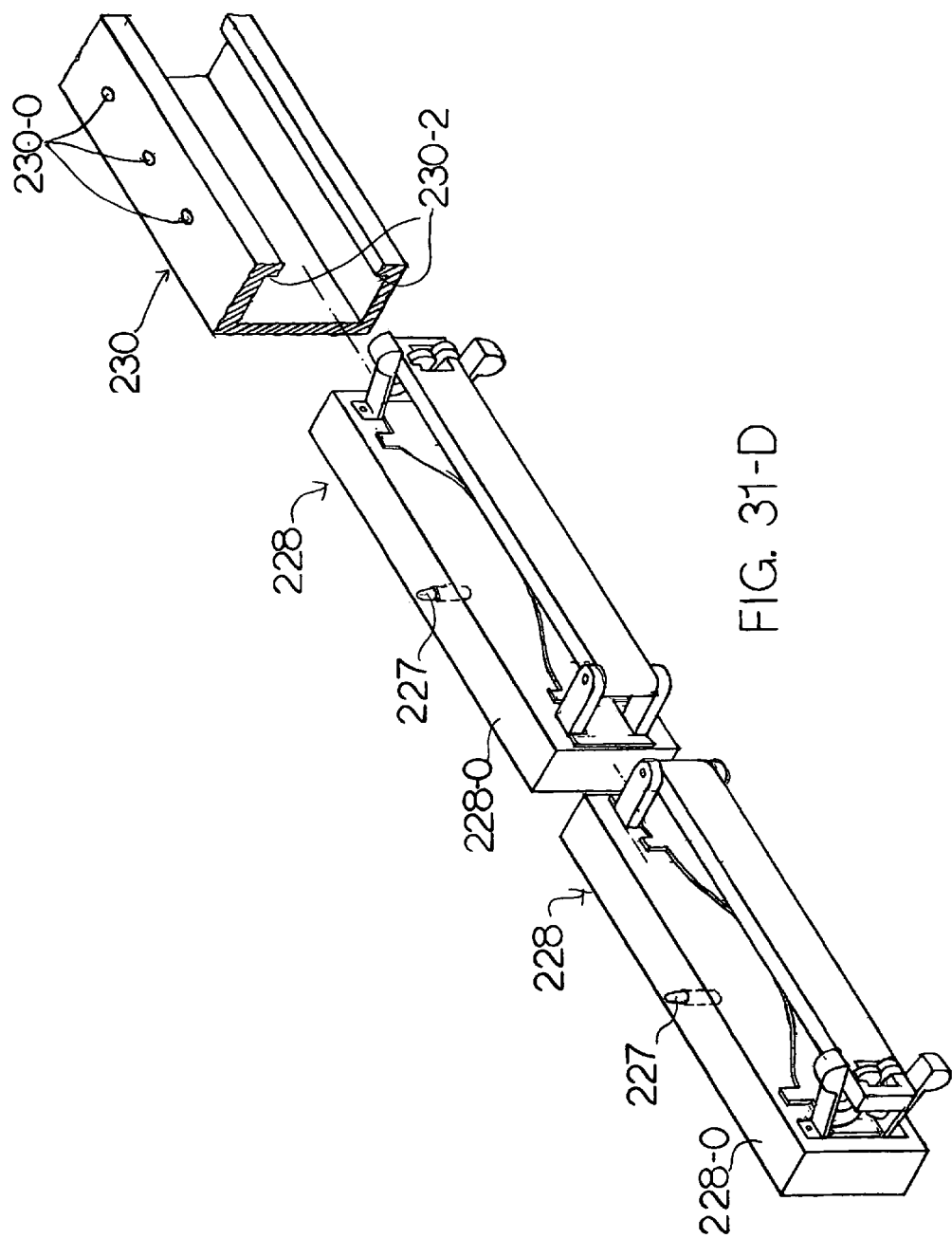
FIG. 31-D

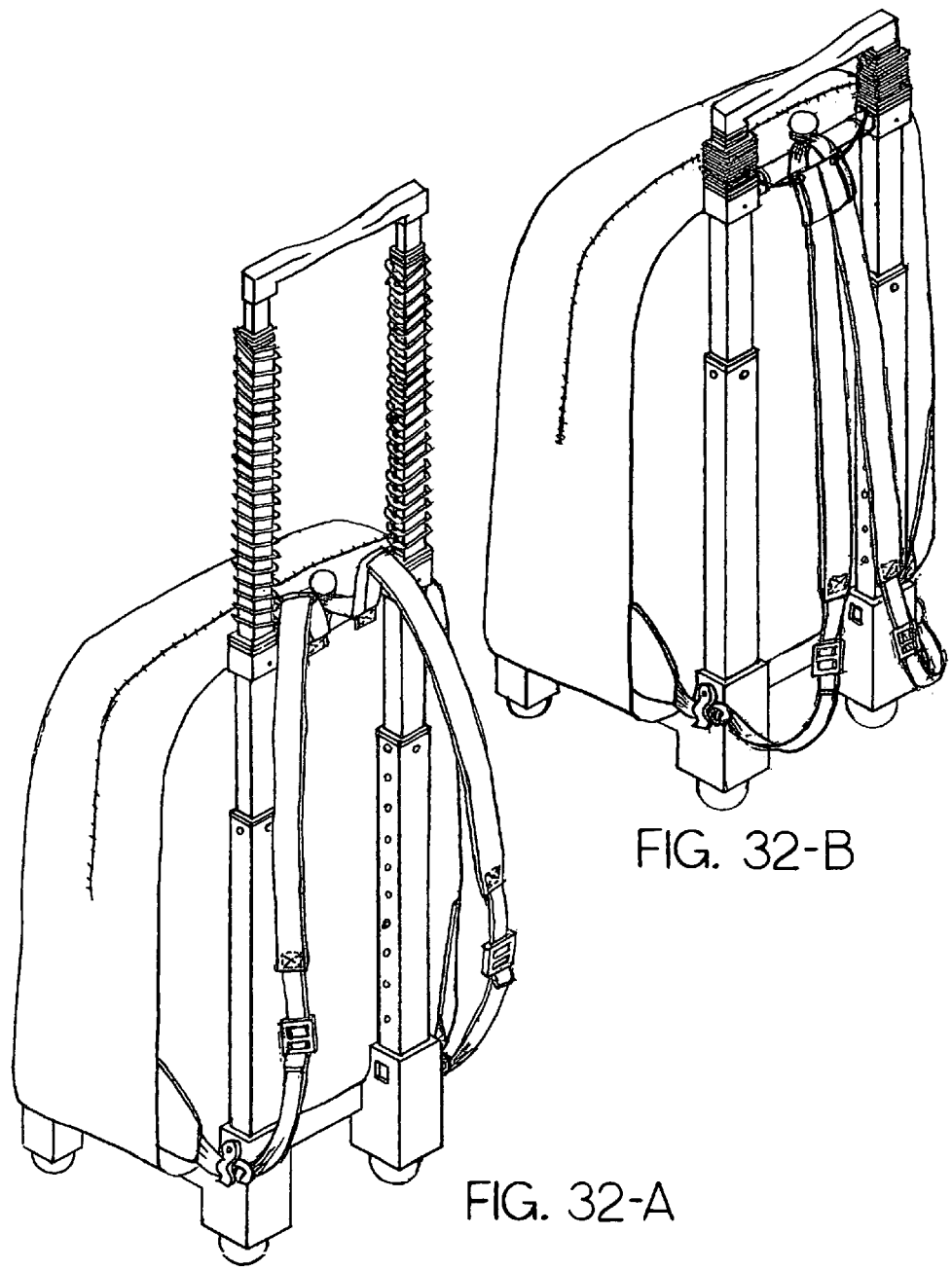
FIG. 32-B
FIG. 32-A

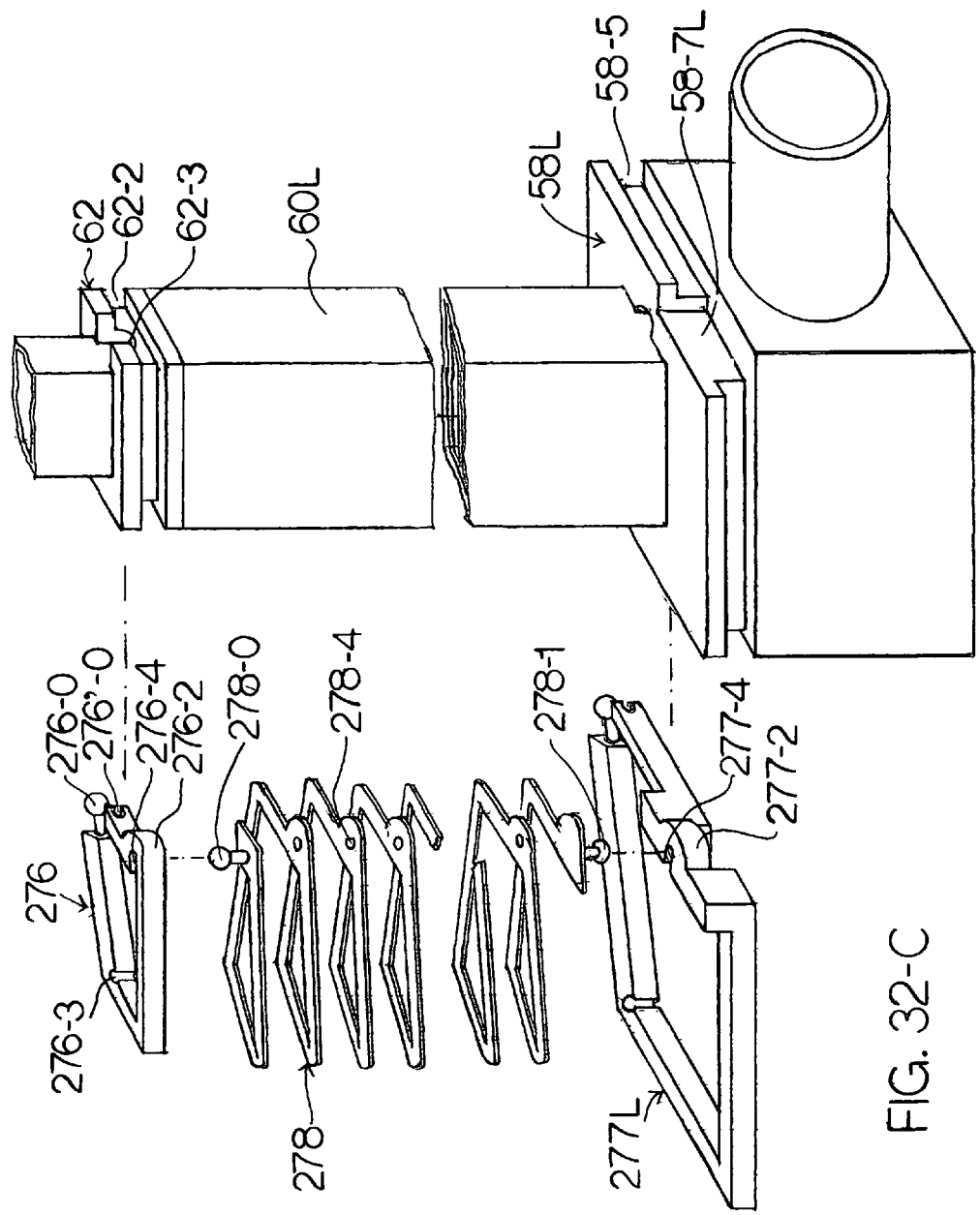

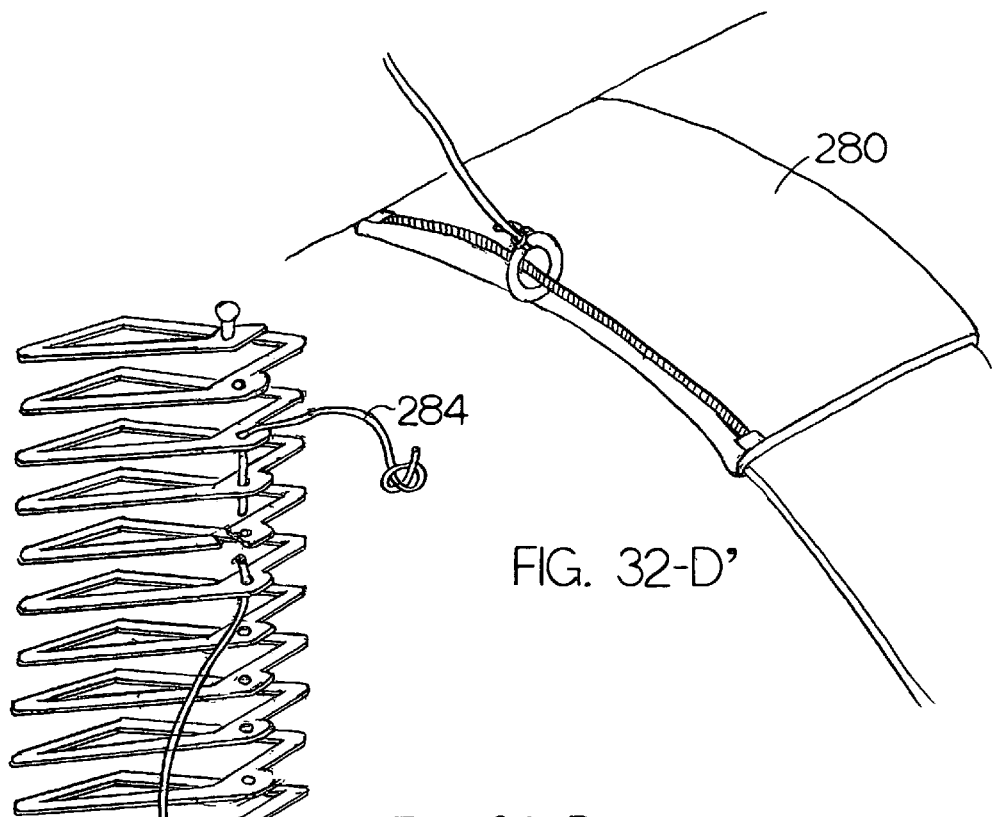
FIG. 32-D'
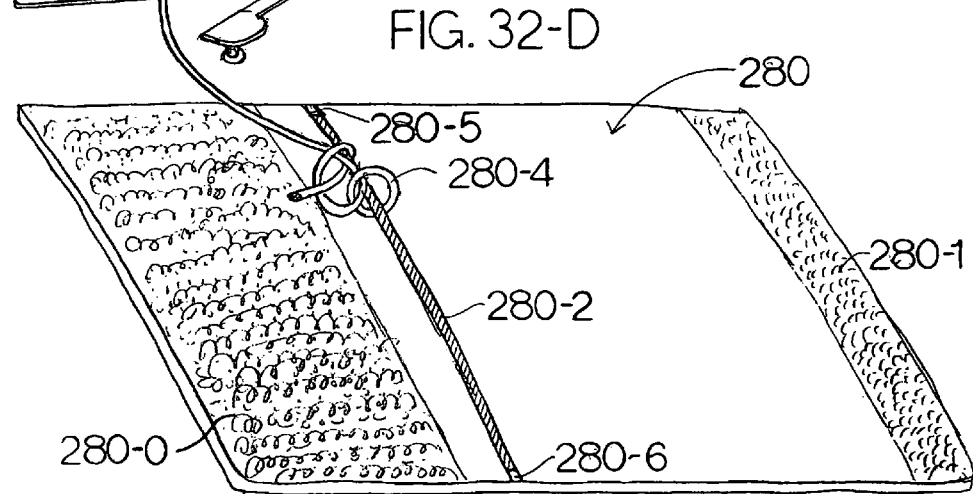
FIG. 32-D

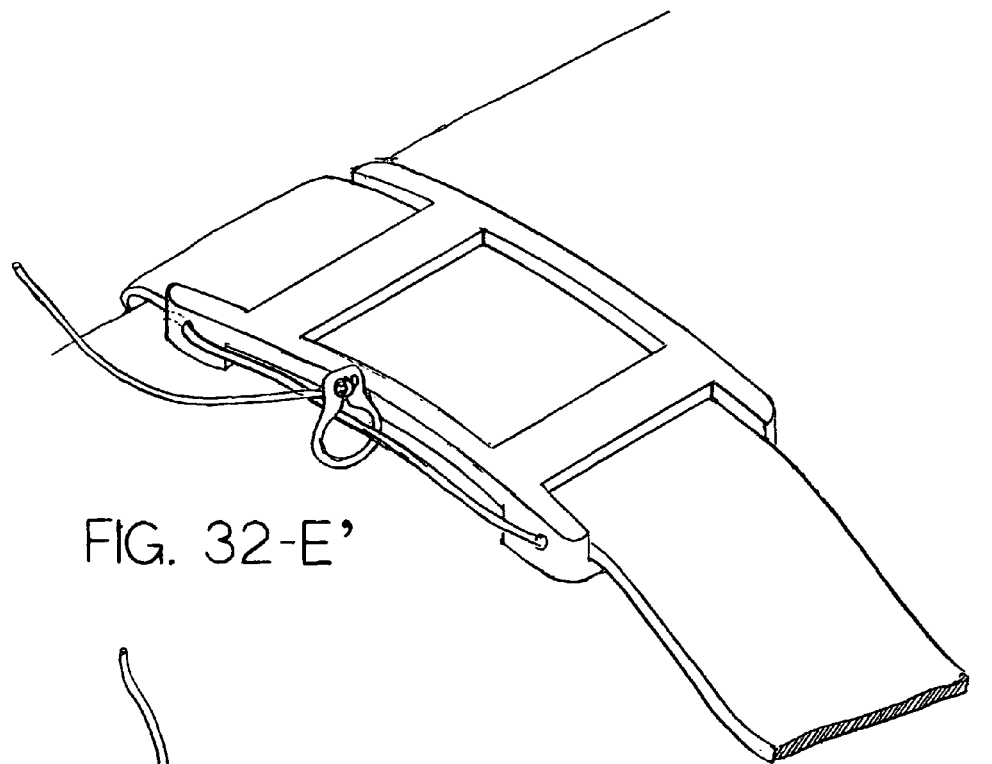
FIG. 32-E'
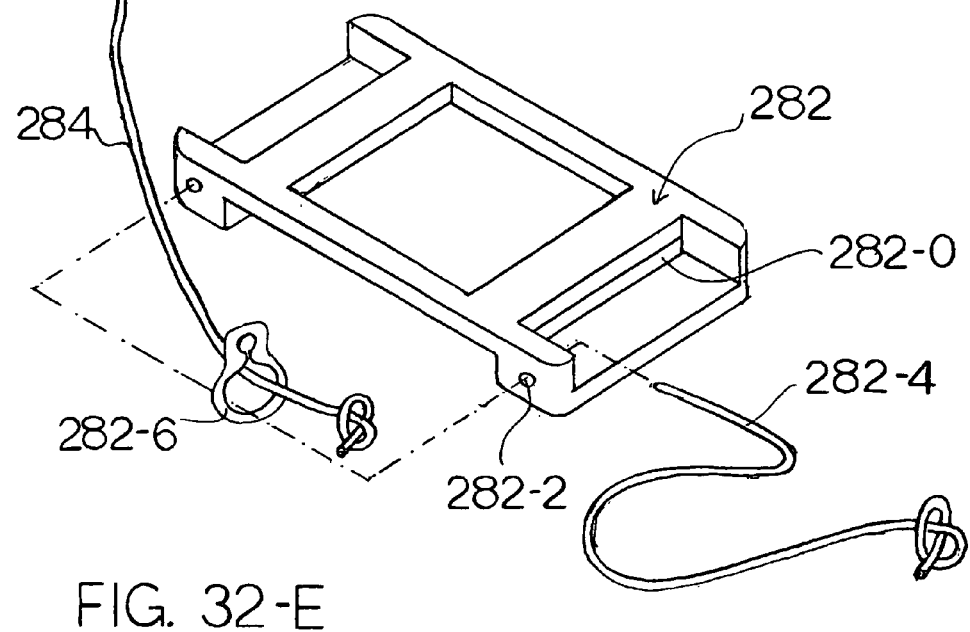
FIG. 32-E

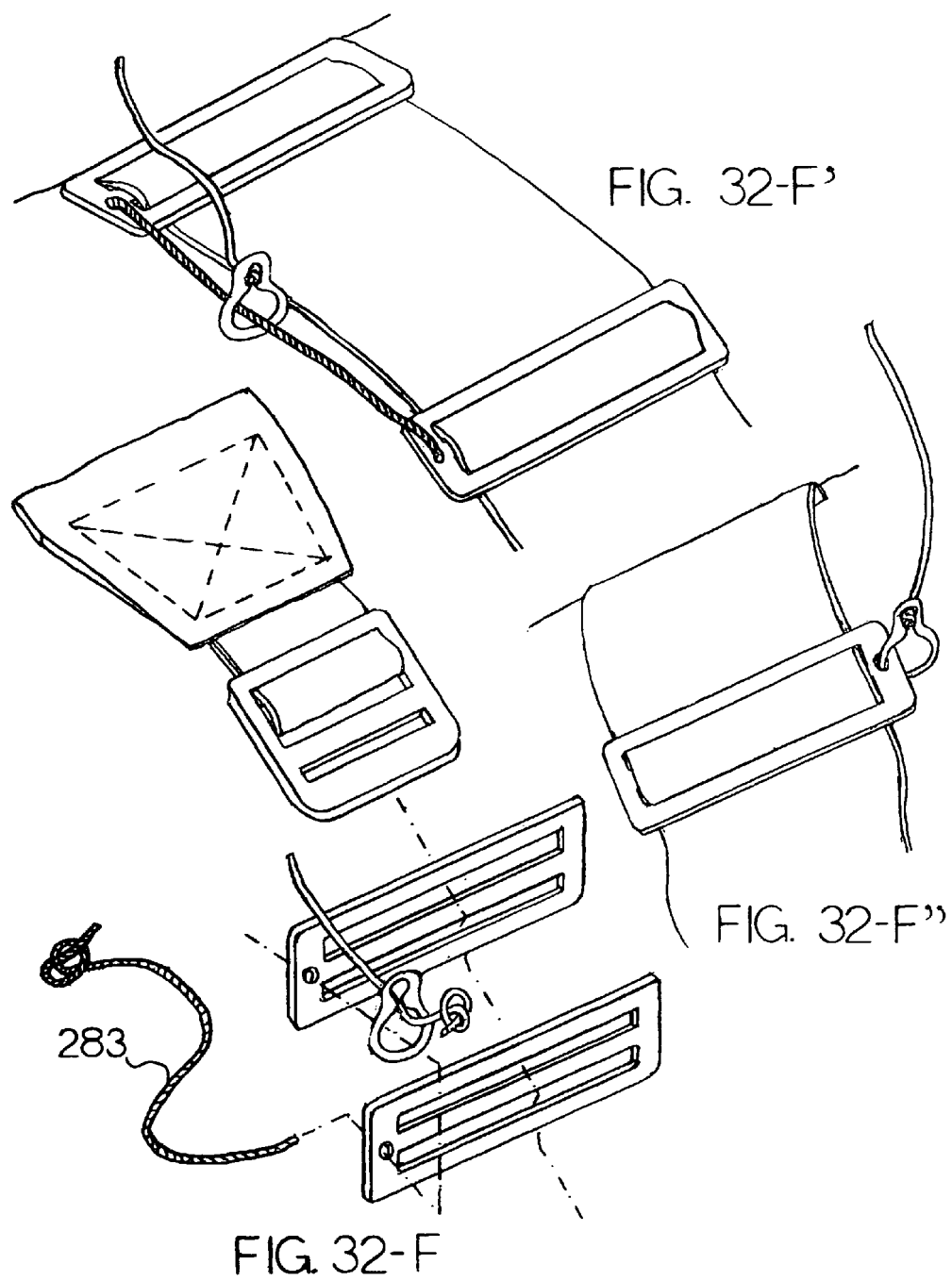

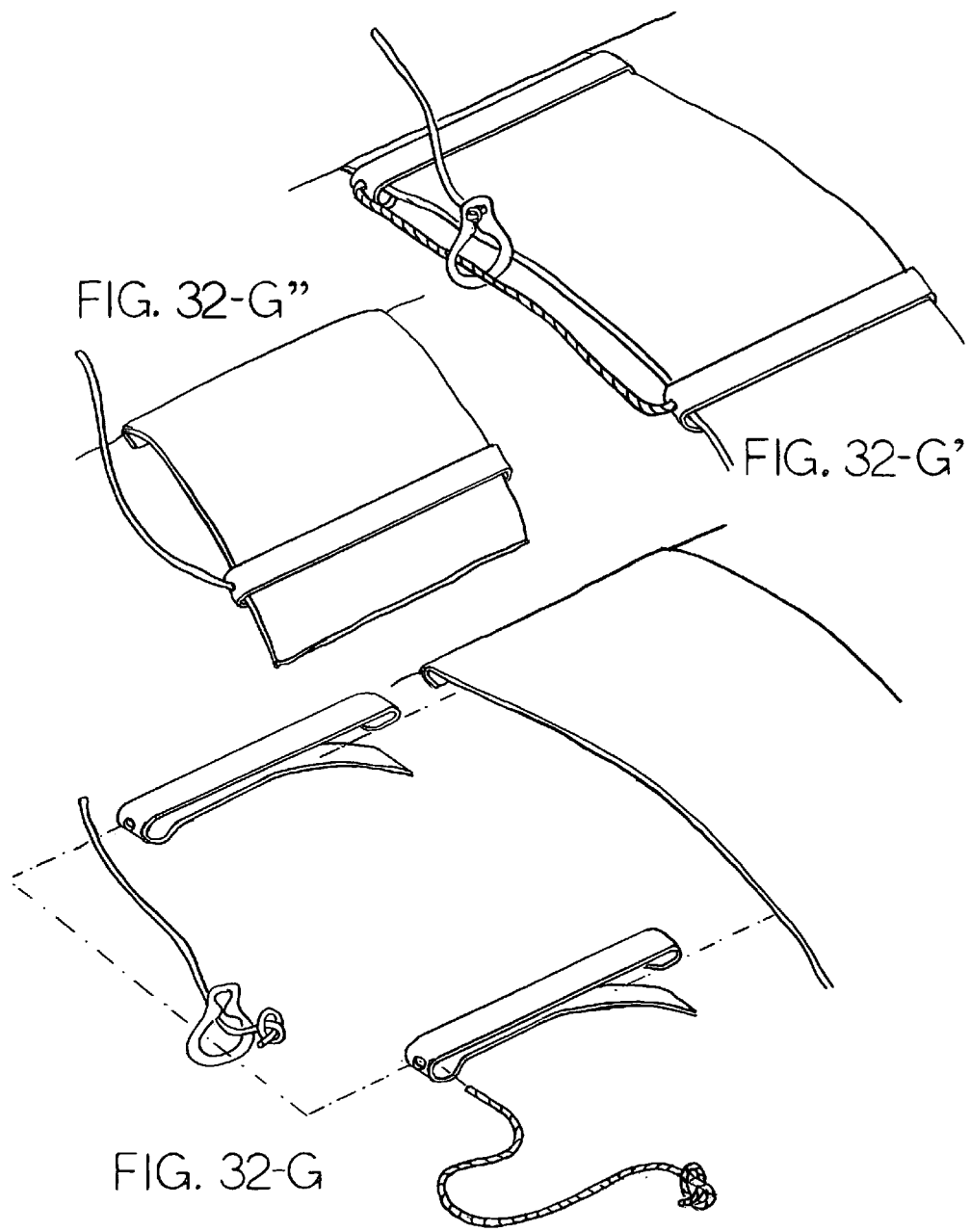
FIG. 32-G"
FIG. 32-G'
FIG. 32-G

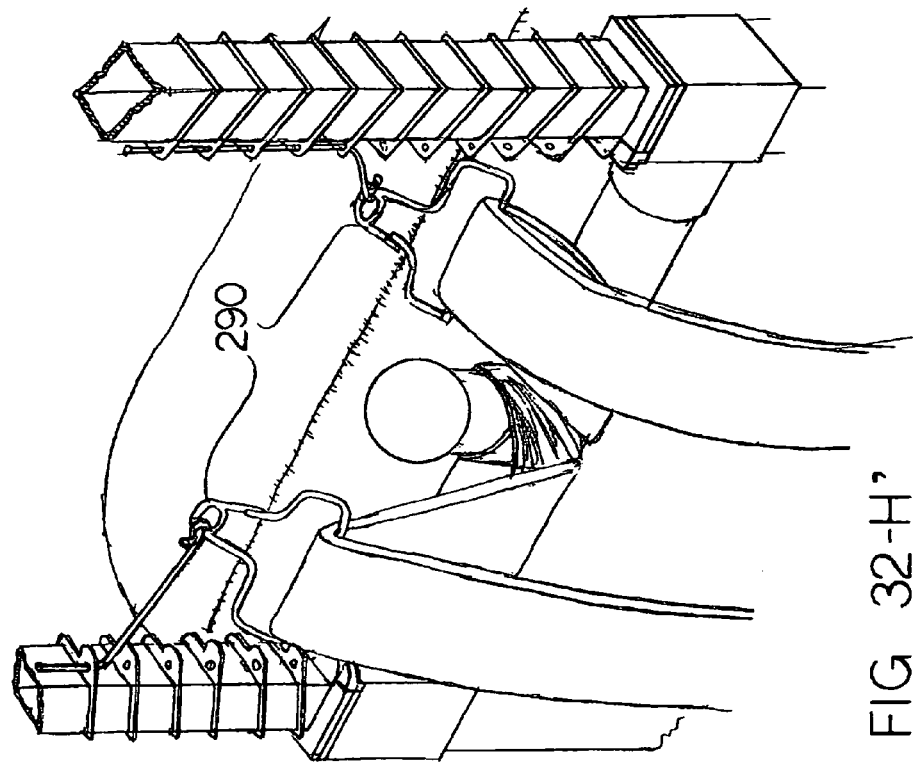
FIG. 32-H'
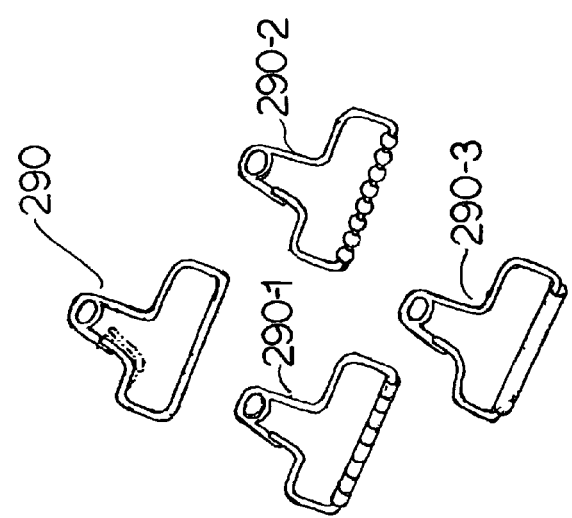
FIG. 32-H

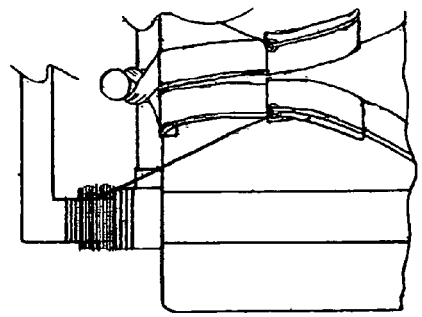
FIG. 32-JB'
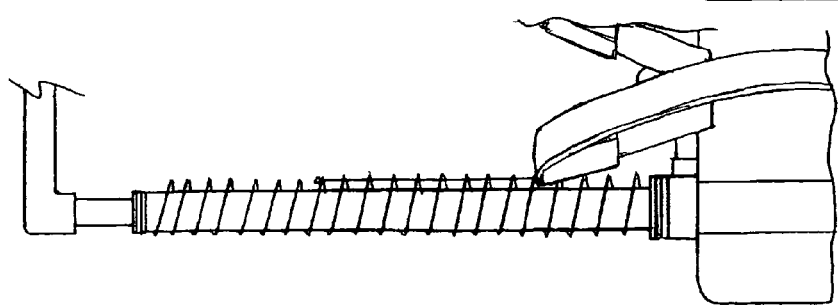
FIG. 32-JB
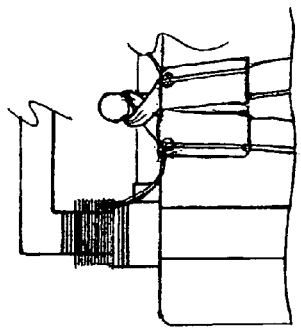
FIG. 32-JA'
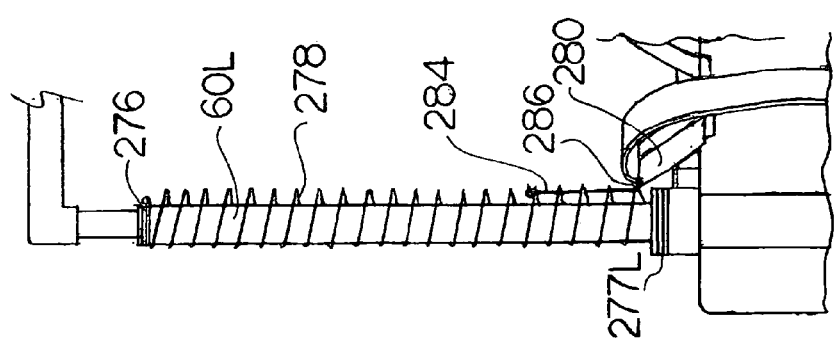
FIG. 32-JA

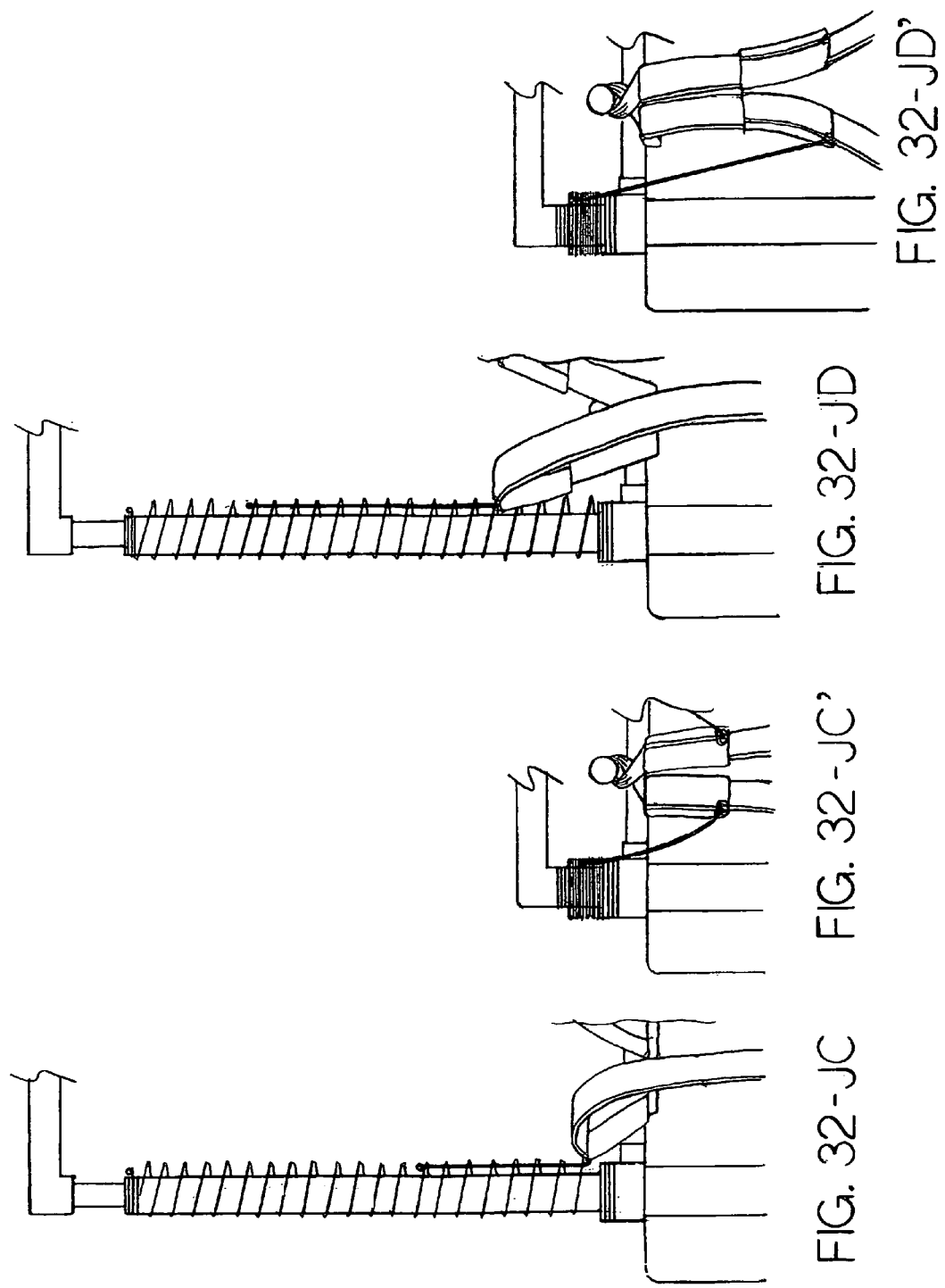

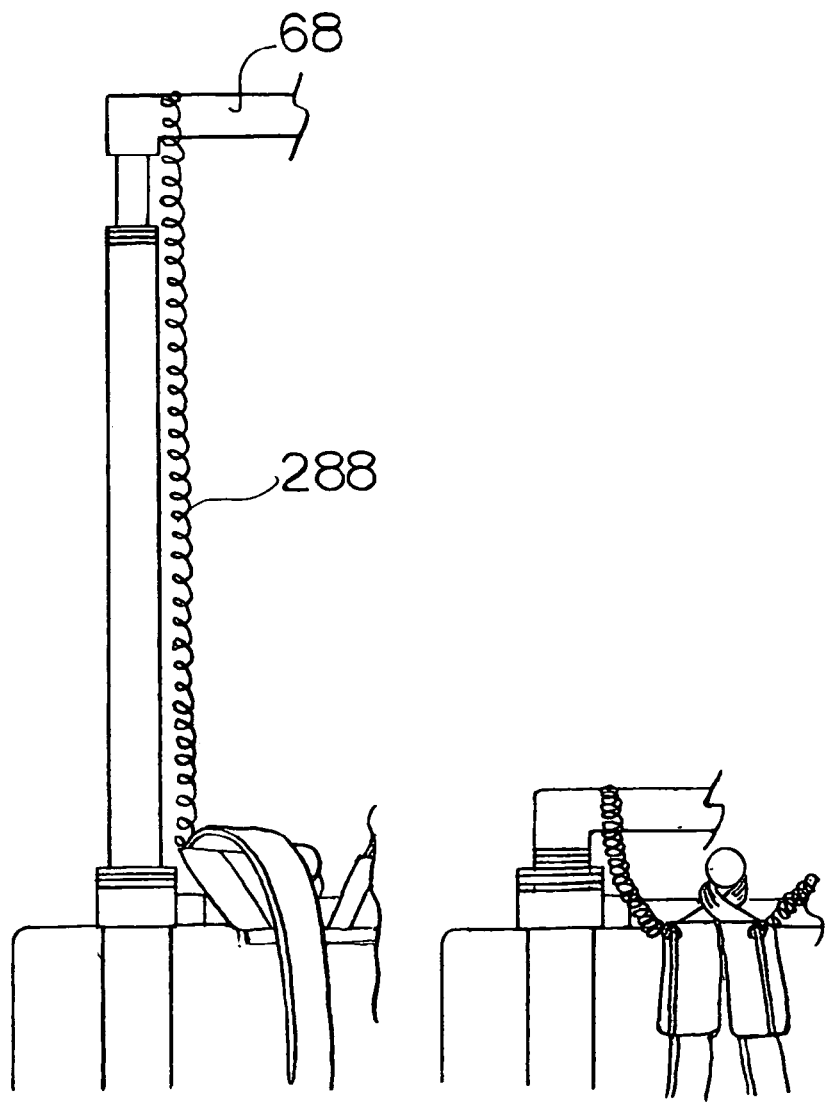
FIG. 32-JE   FIG. 32-JE'

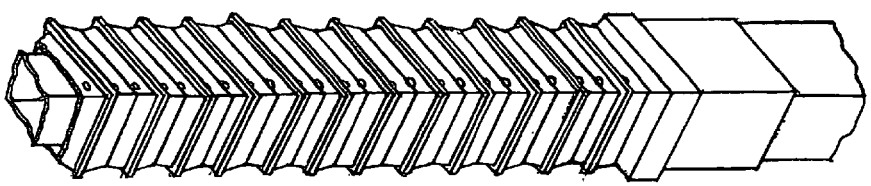
FIG. 32-L
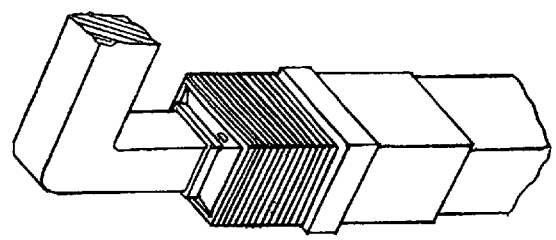
FIG. 32-L'
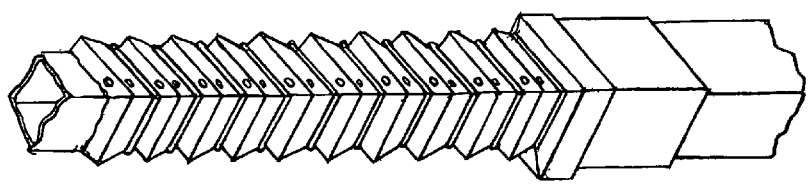
FIG. 32-K
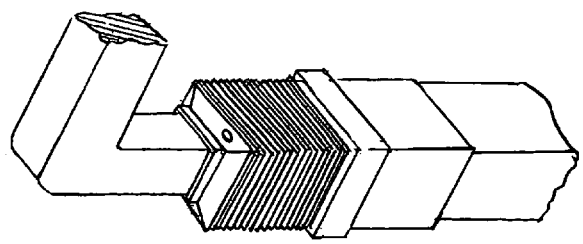
FIG. 32-K'

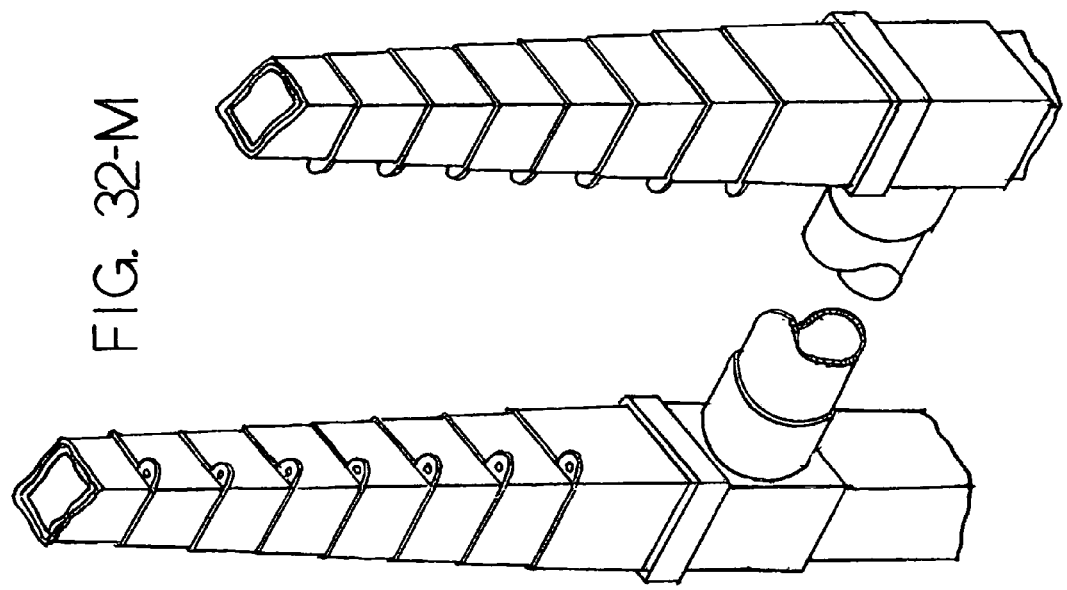
FIG. 32-M
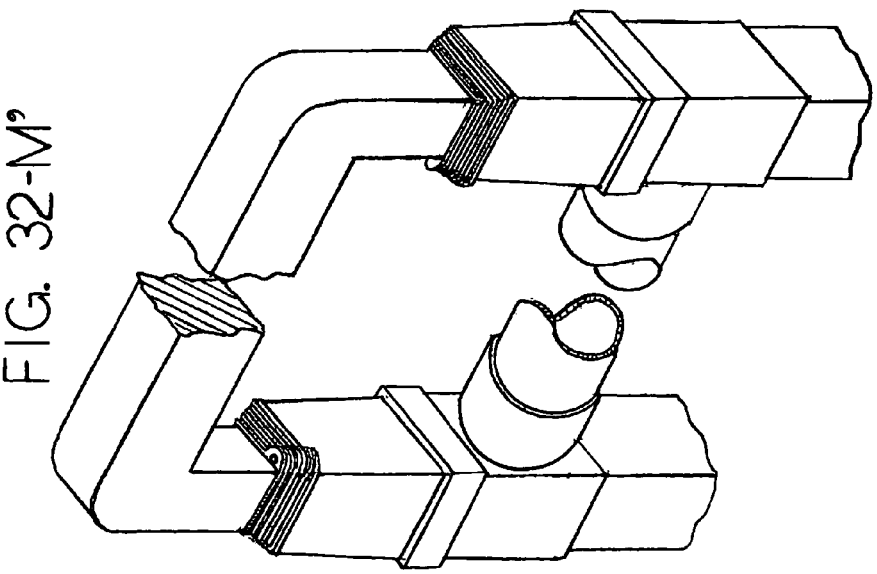
FIG. 32-M'

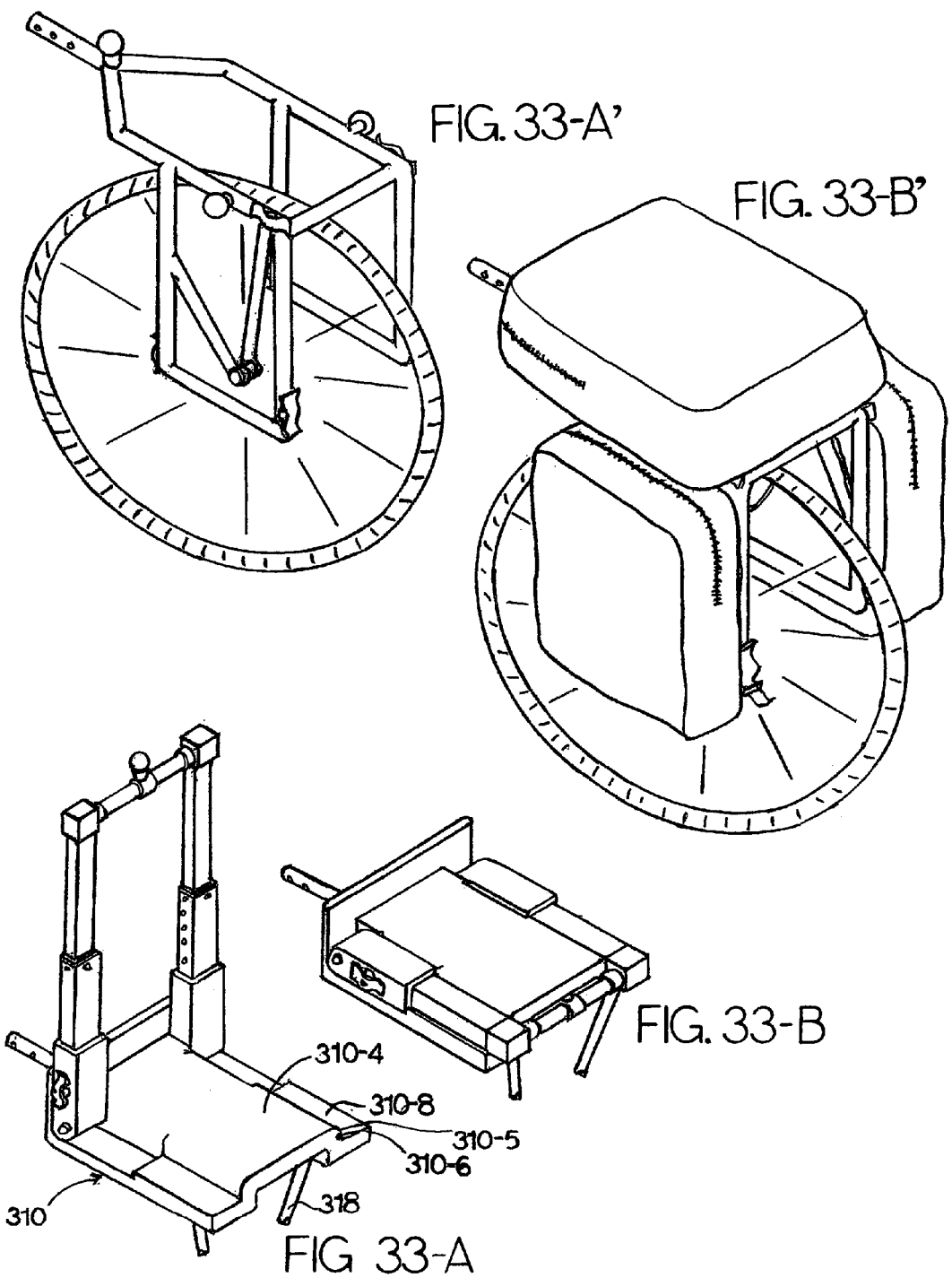

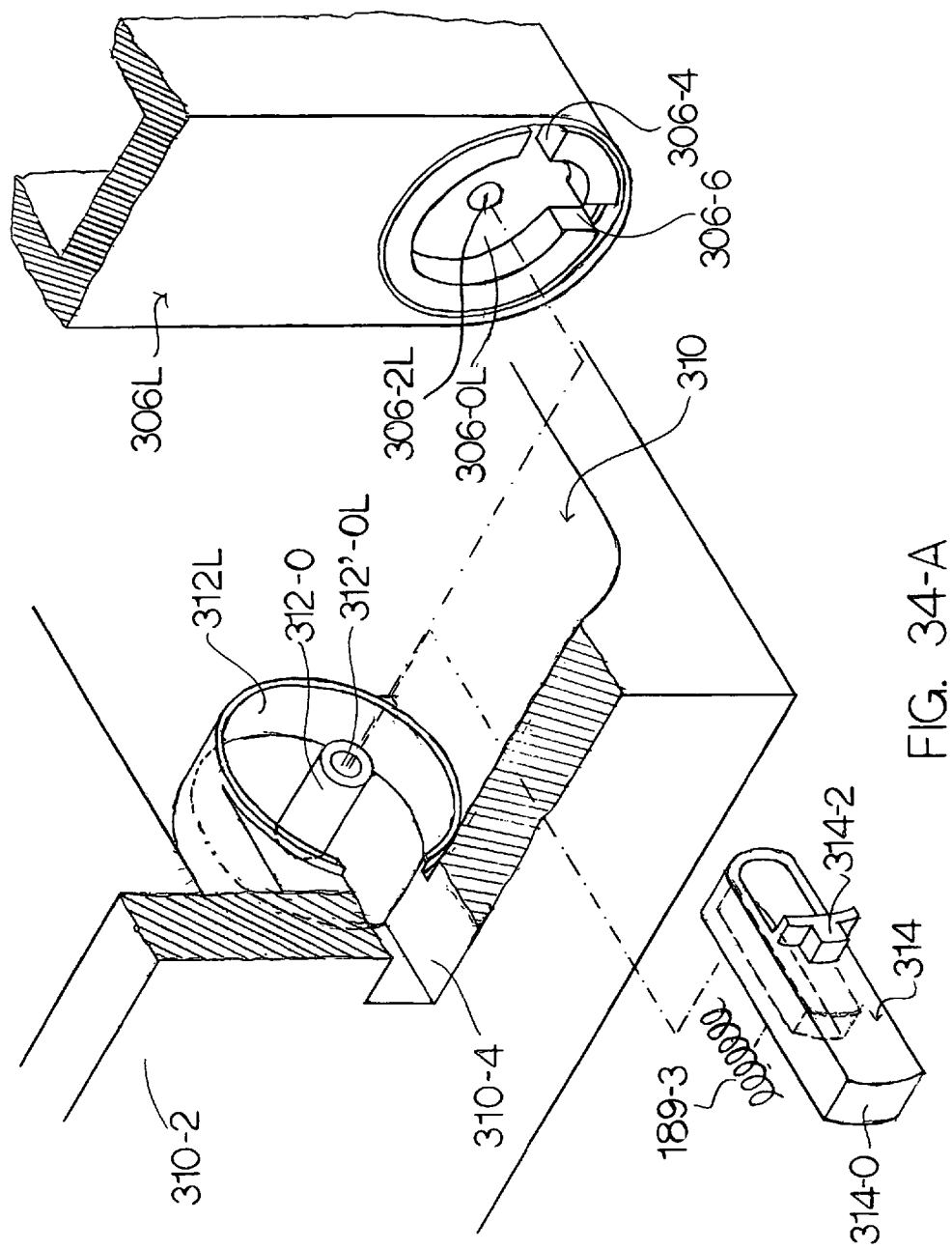
FIG. 34-A

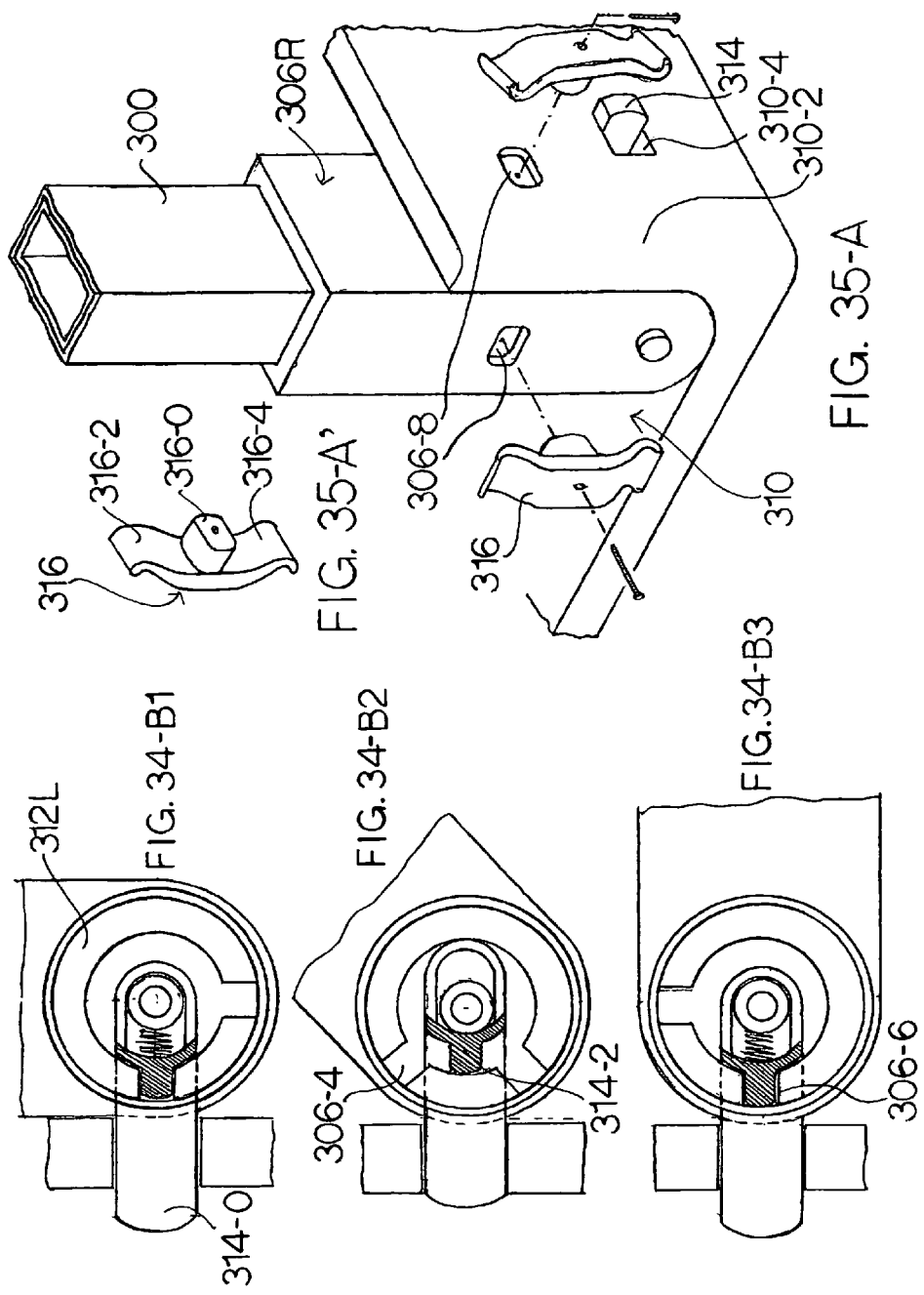

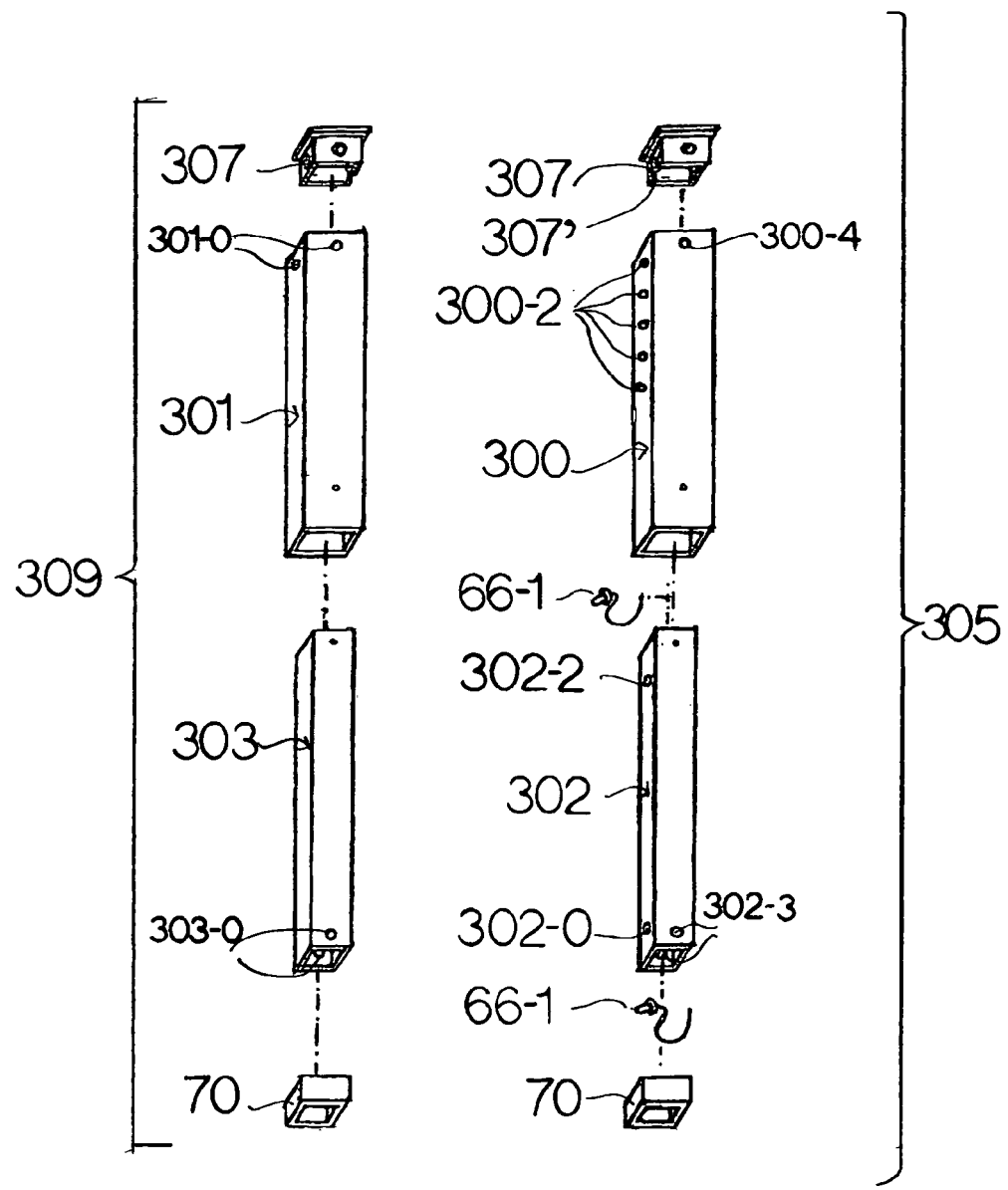
FIG. 36-A

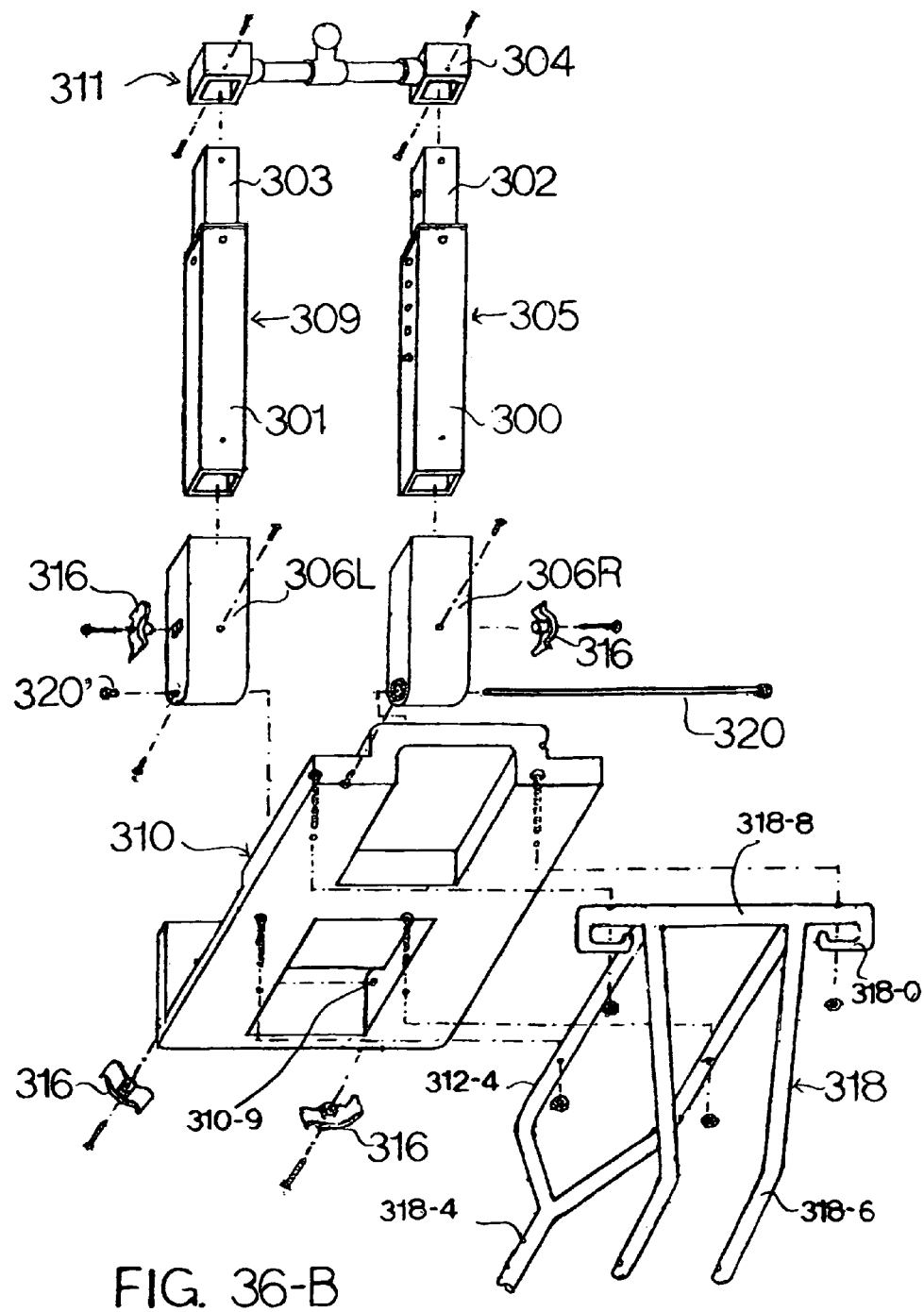
FIG. 36-B

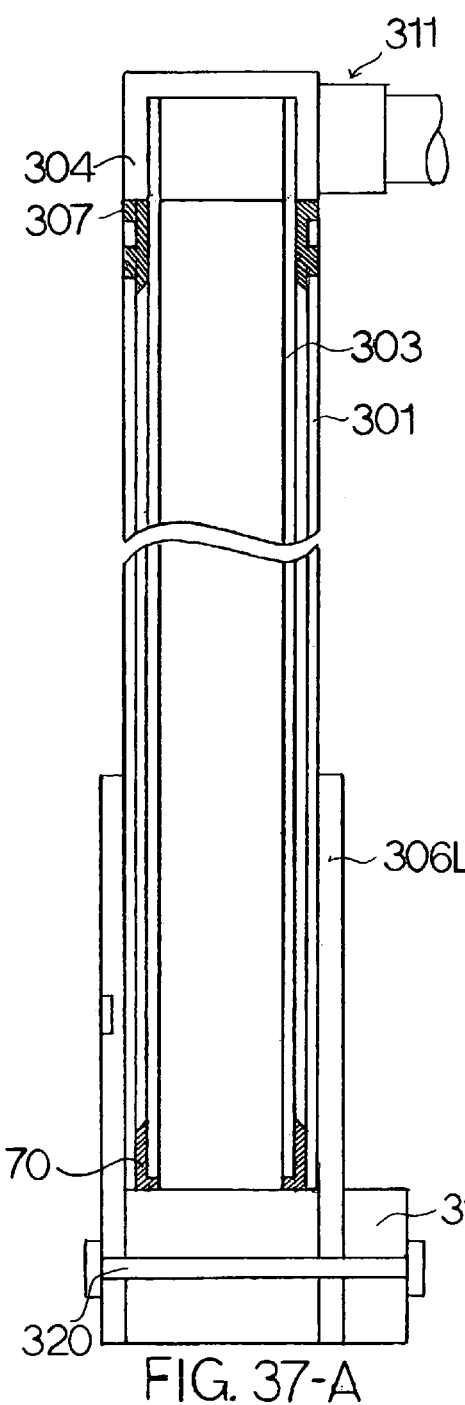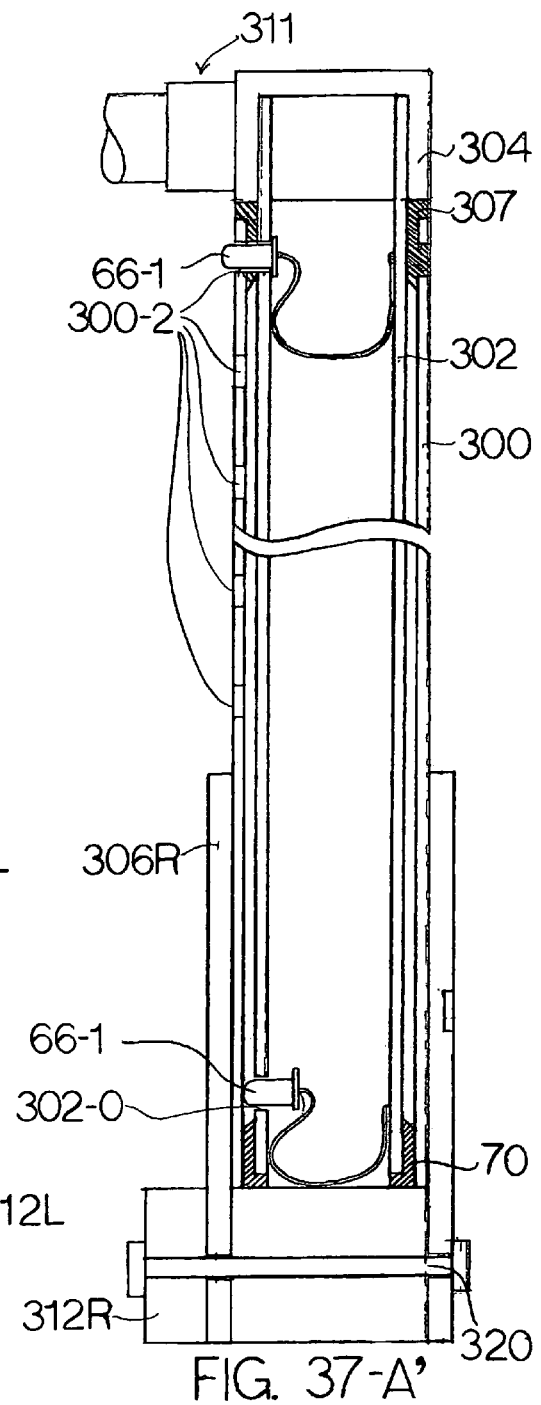
FIG. 37-A      FIG. 37-A'

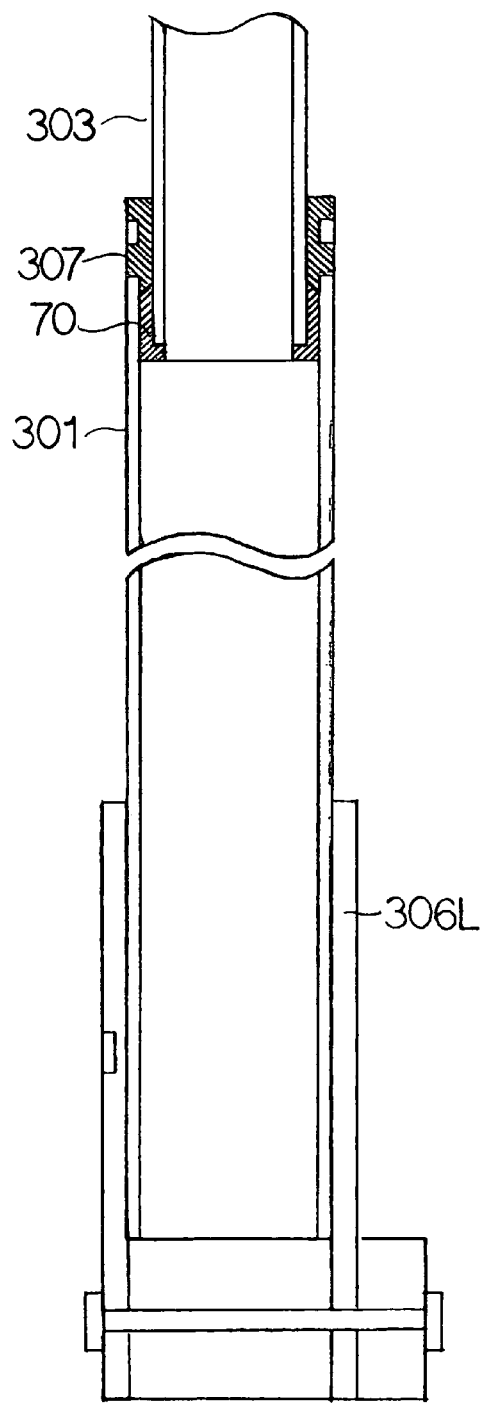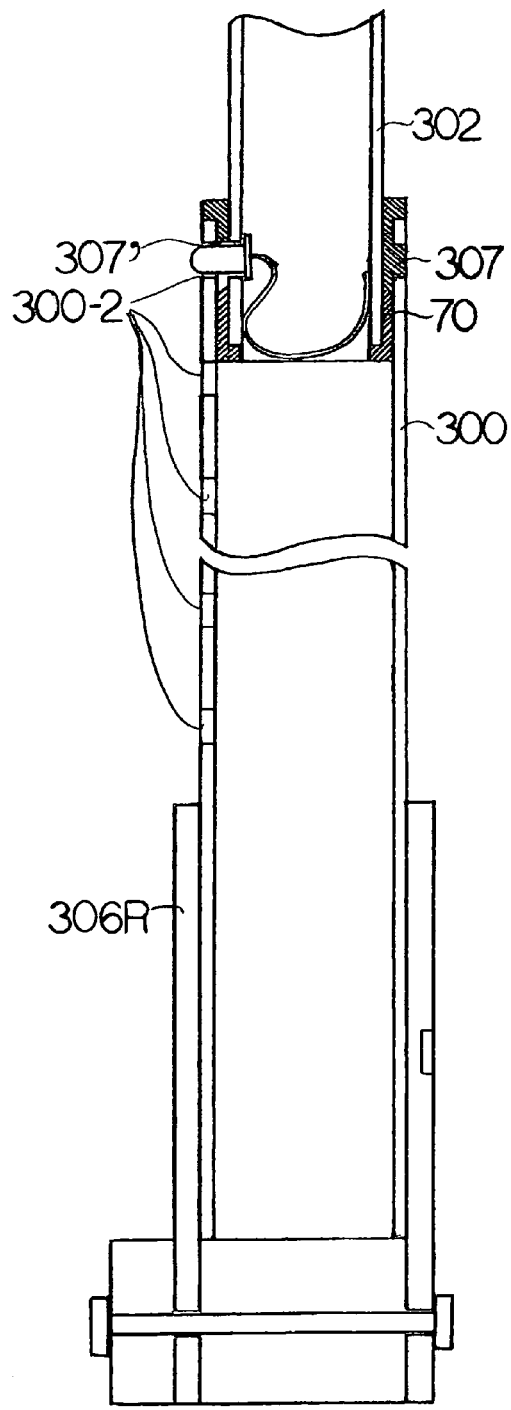
FIG. 37-B  FIG. 37-B'

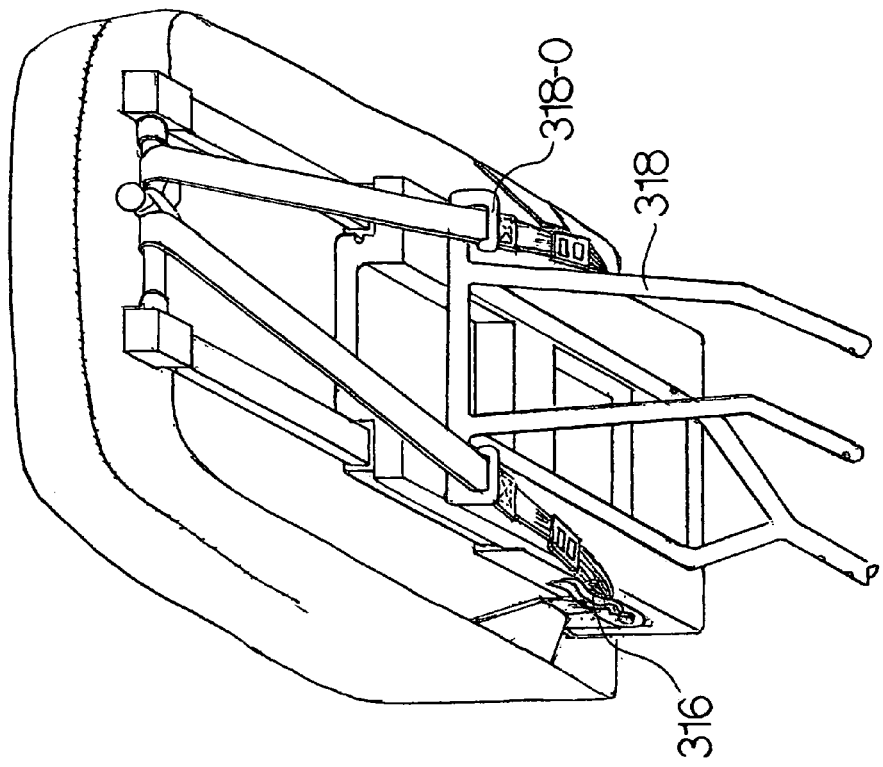
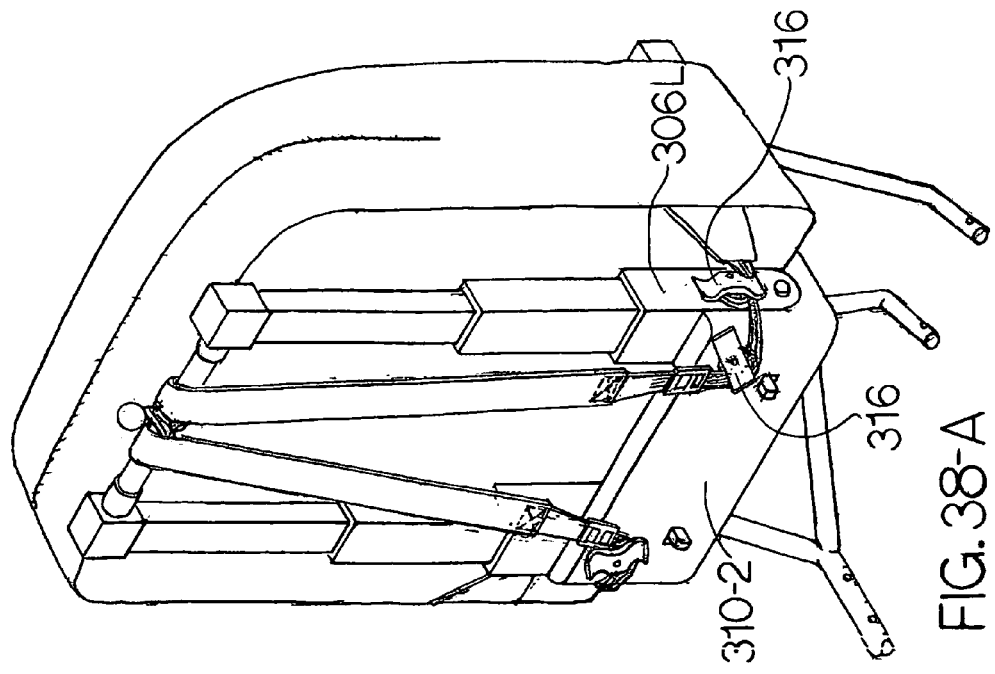

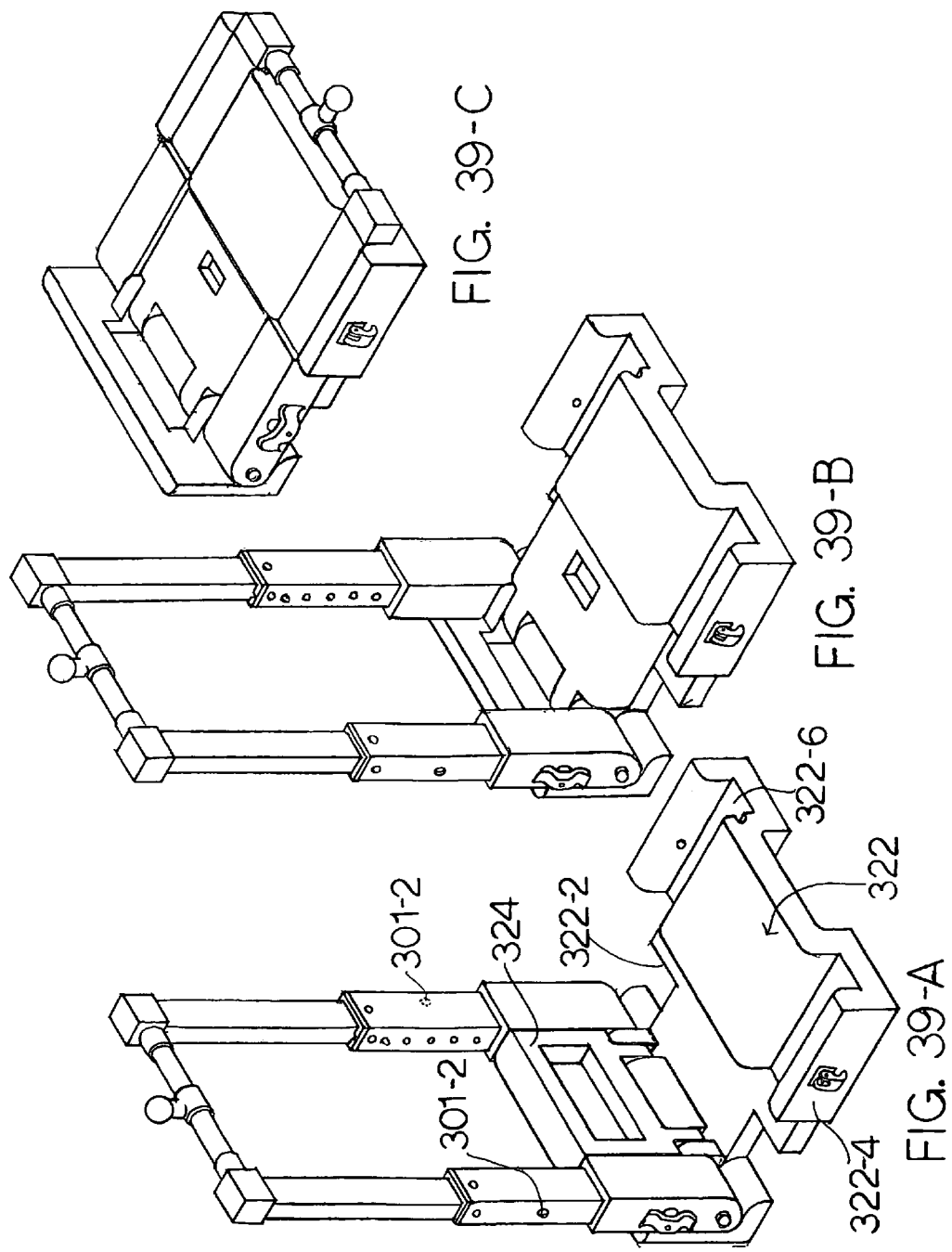

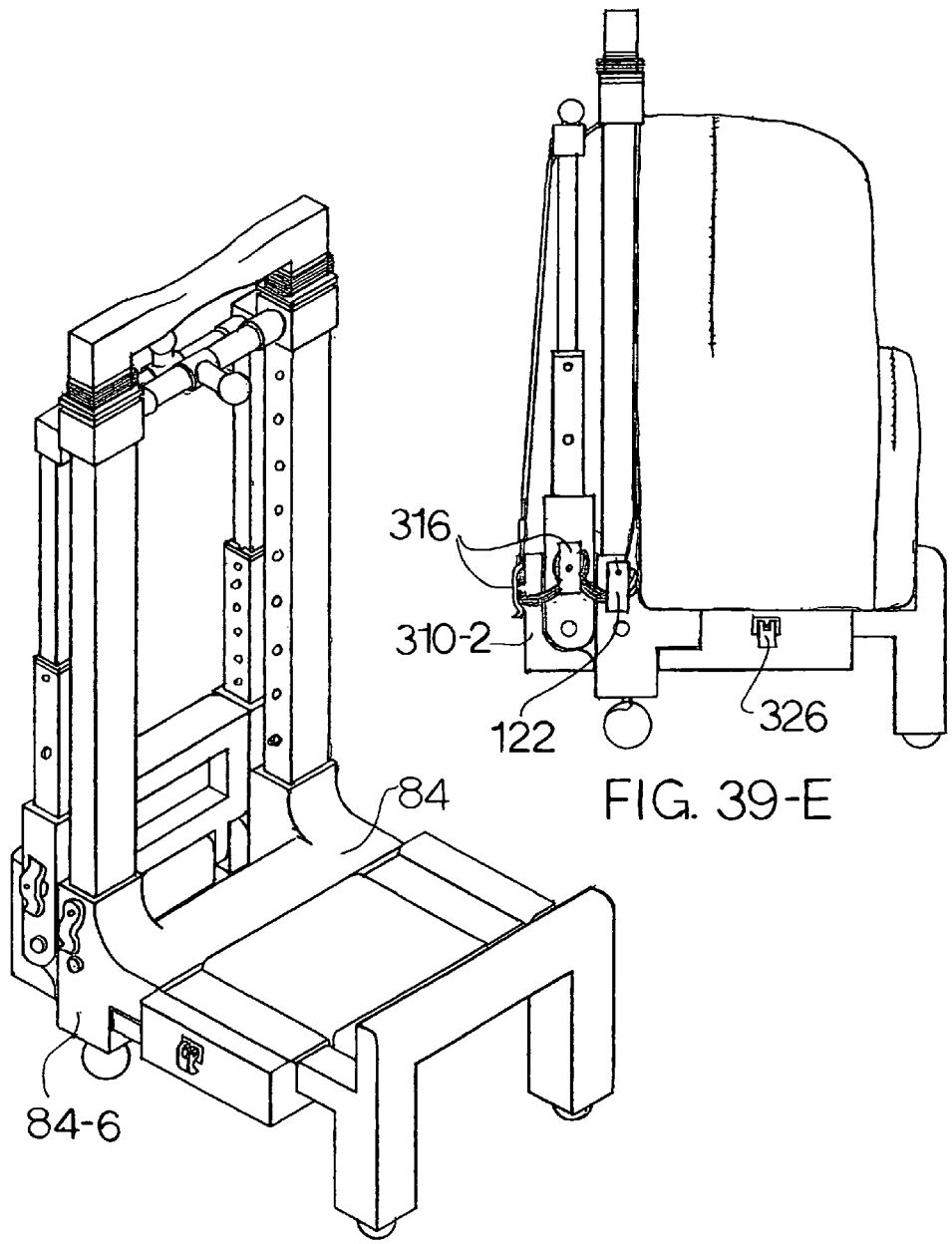
FIG. 39-E
FIG. 39-D

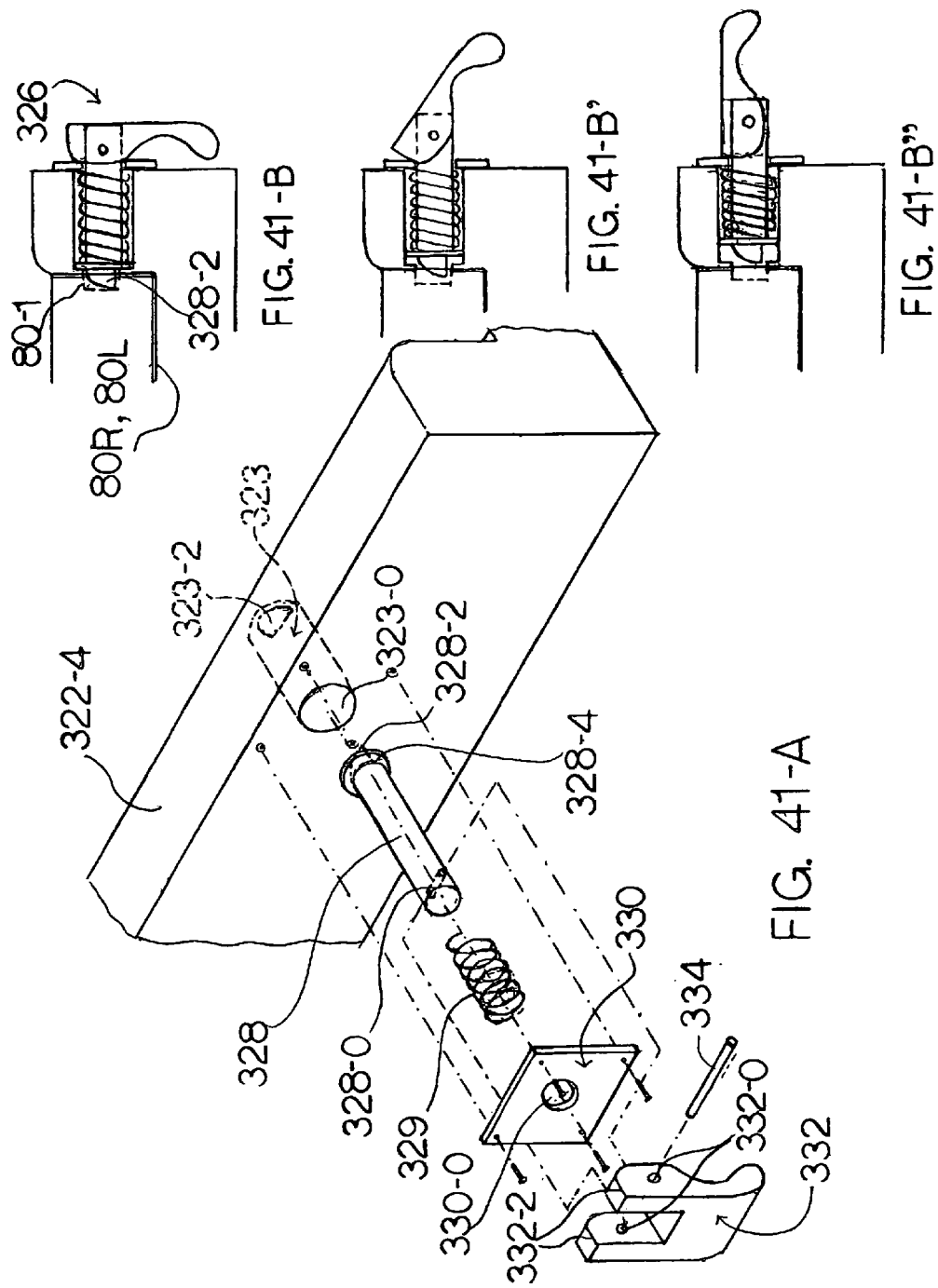

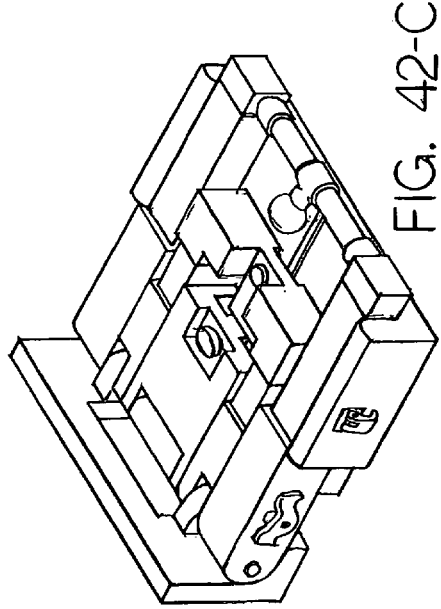
FIG. 42-C
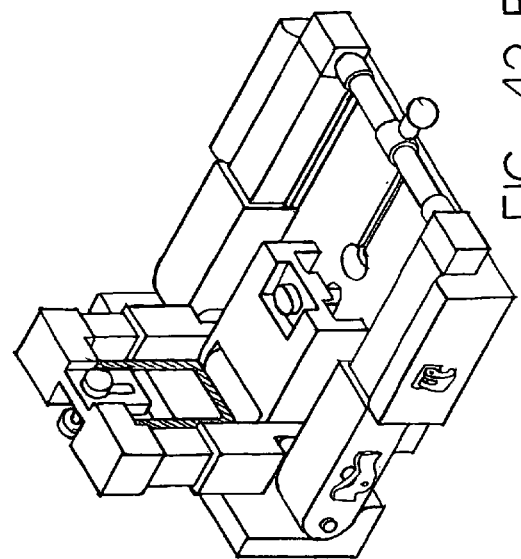
FIG. 42-B
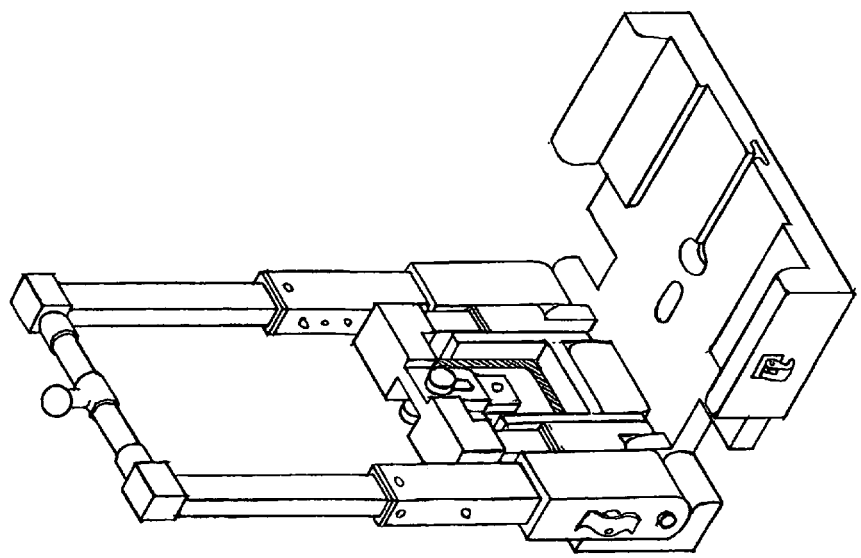
FIG. 42-A

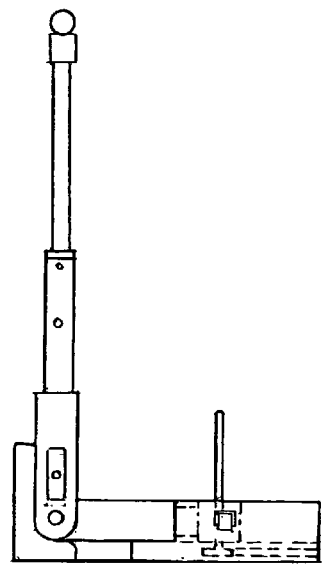
FIG. 42-D
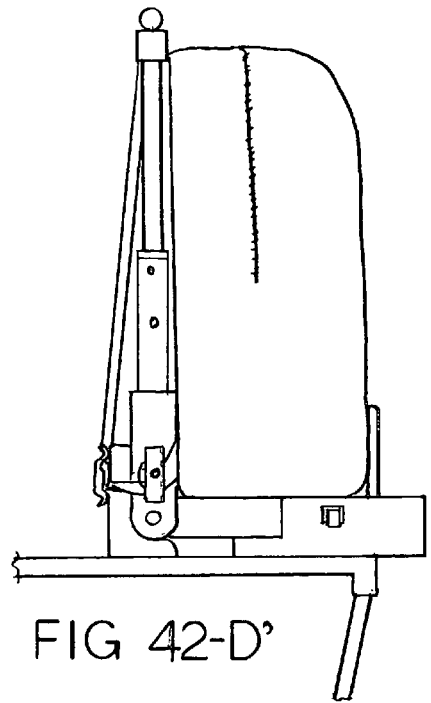
FIG 42-D'
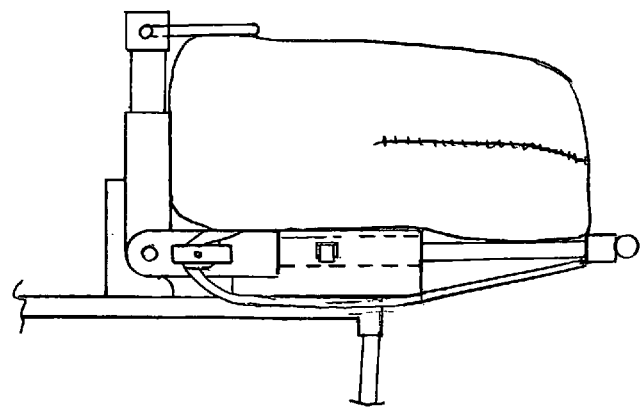
FIG. 42-E

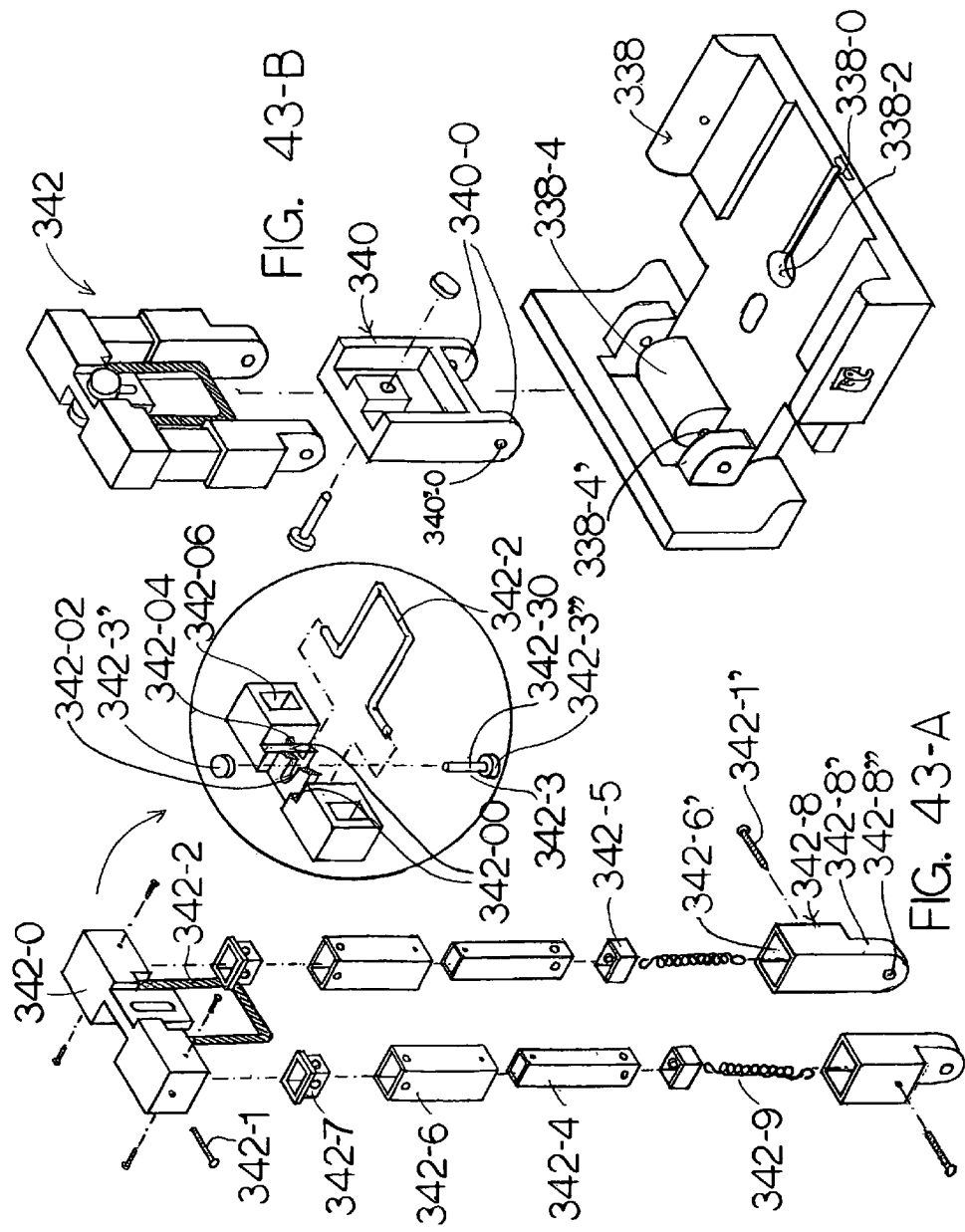

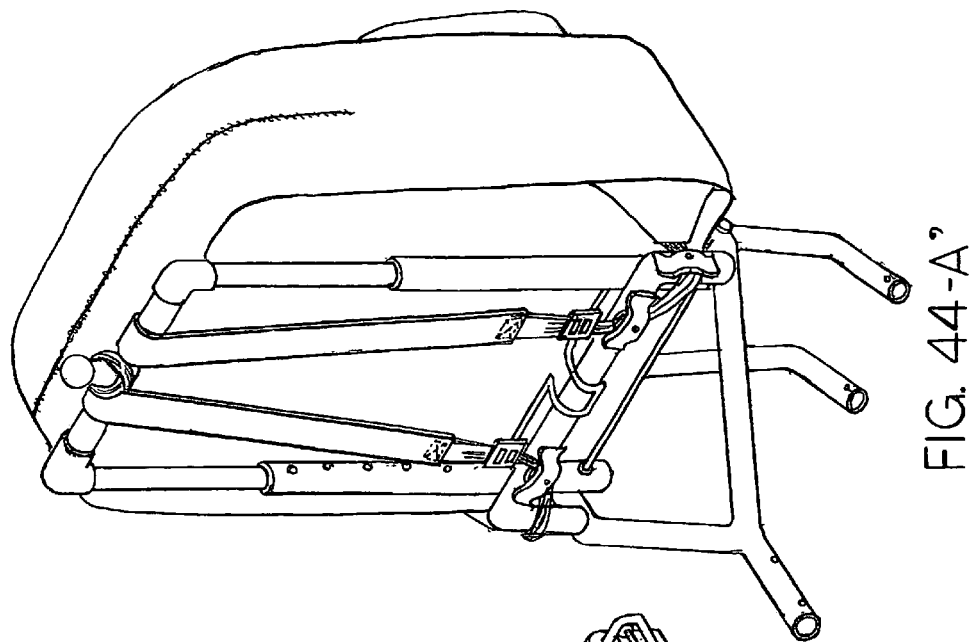
FIG. 44-A'
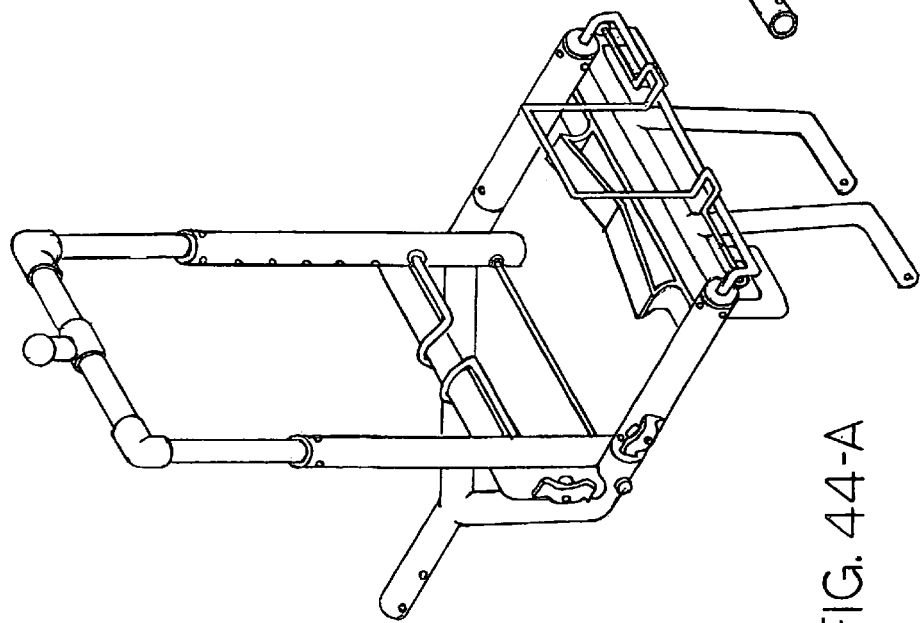
FIG. 44-A

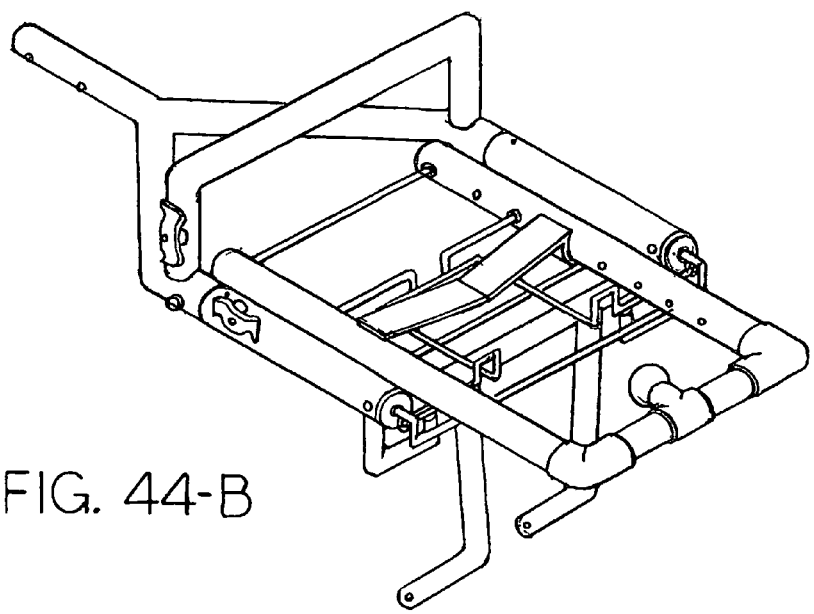
FIG. 44-B
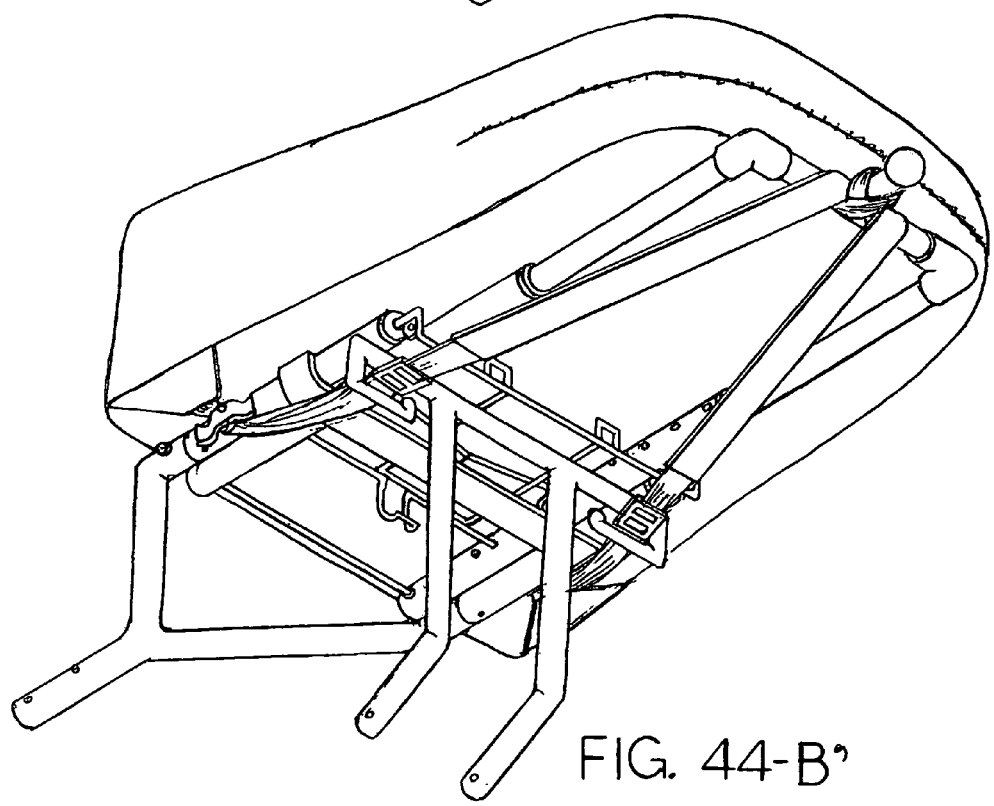
FIG. 44-B'

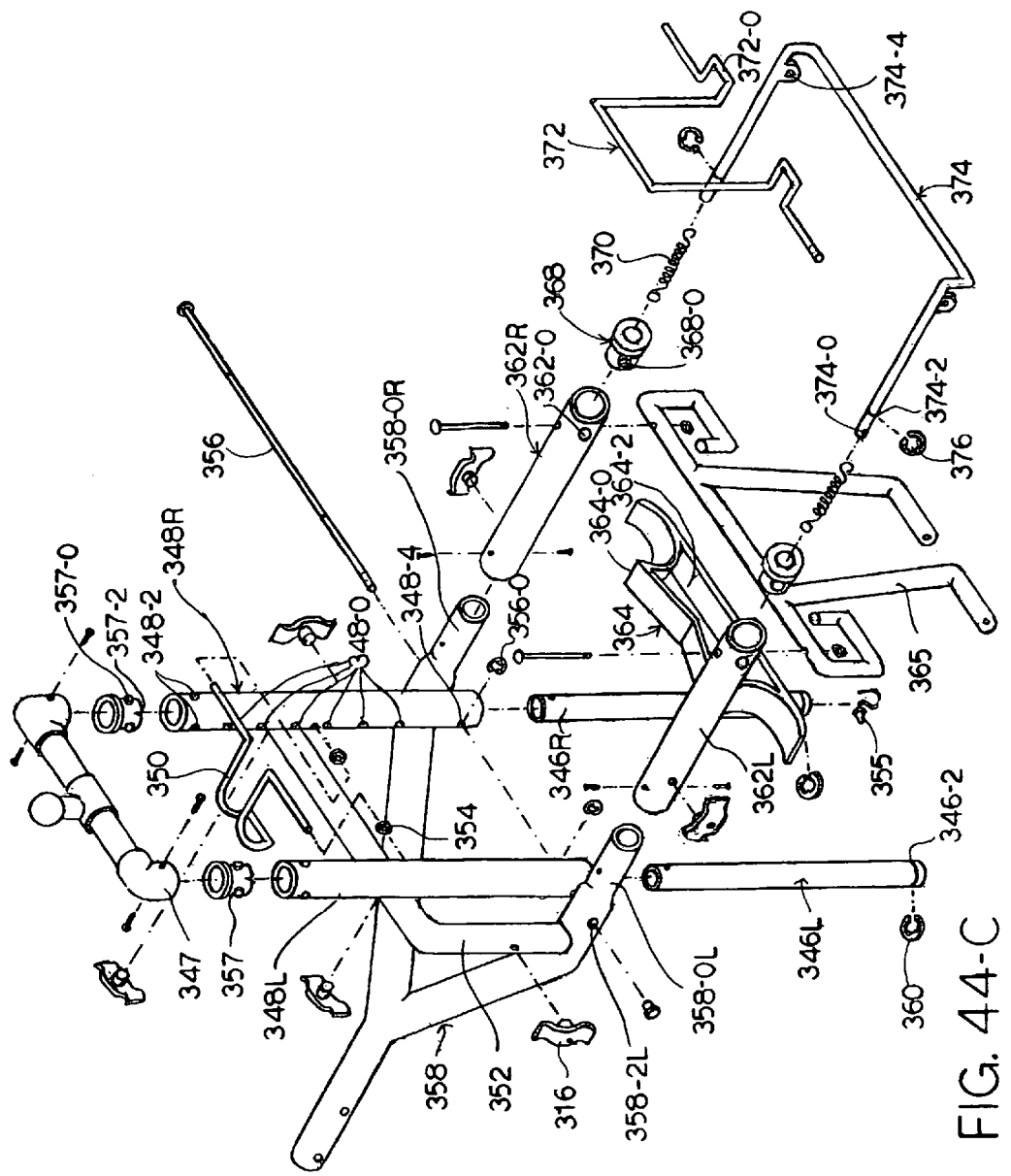
FIG. 44-C

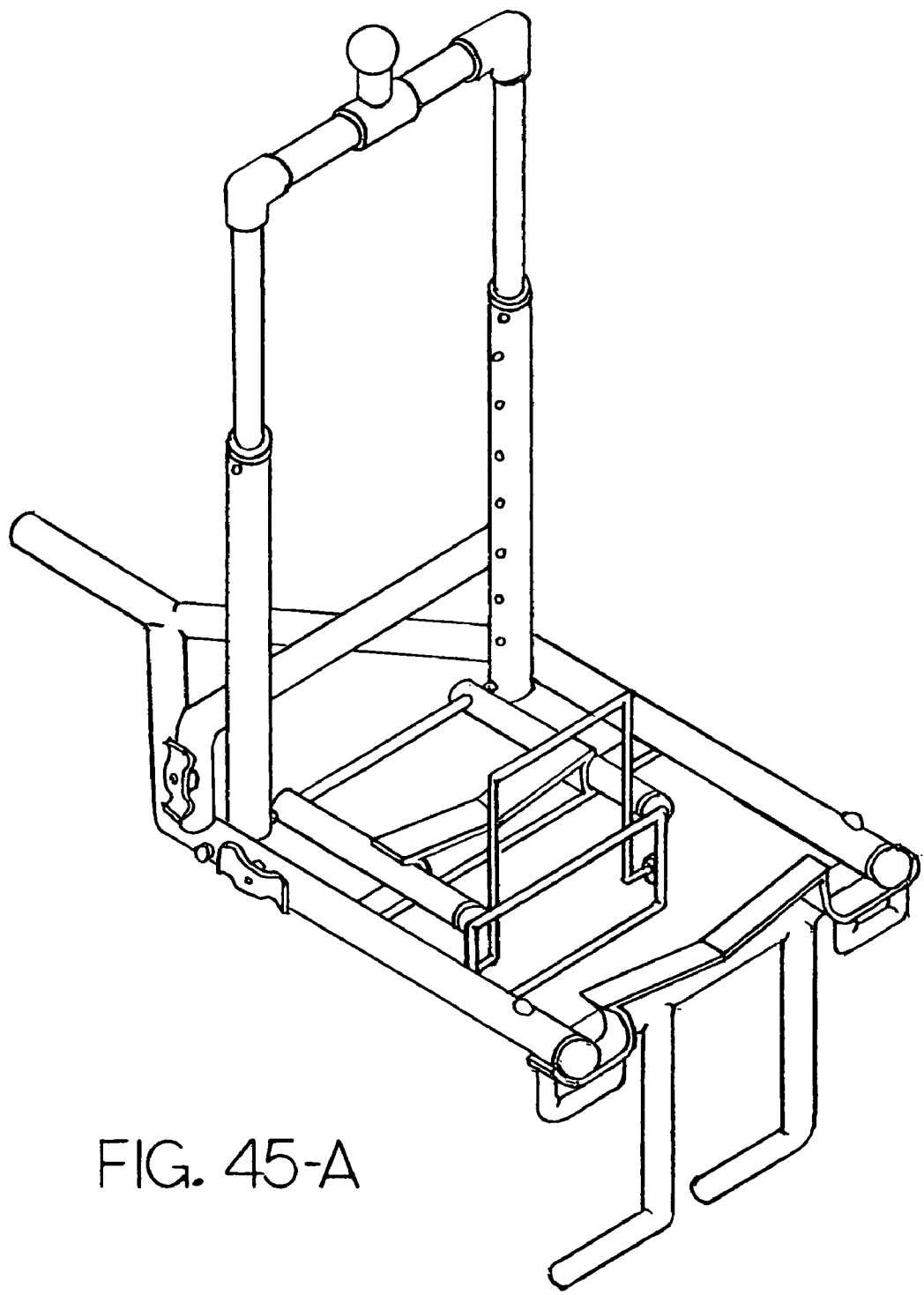
FIG. 45-A

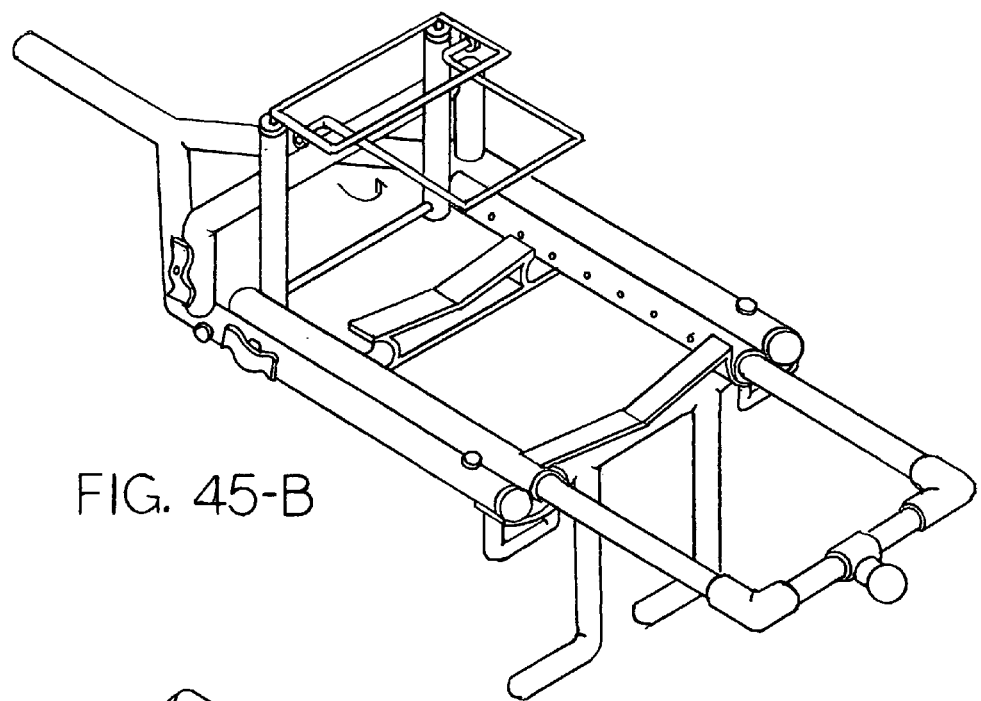
FIG. 45-B
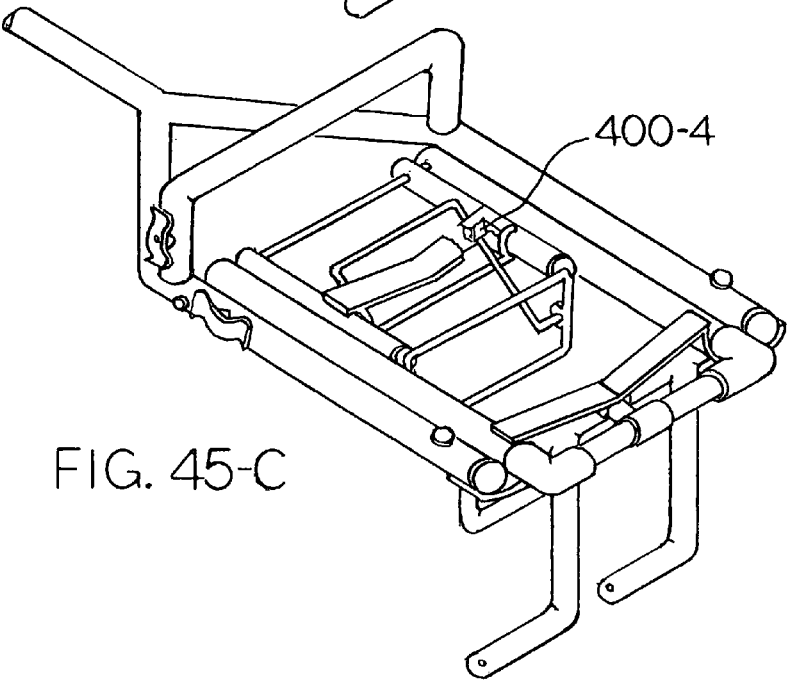
FIG. 45-C

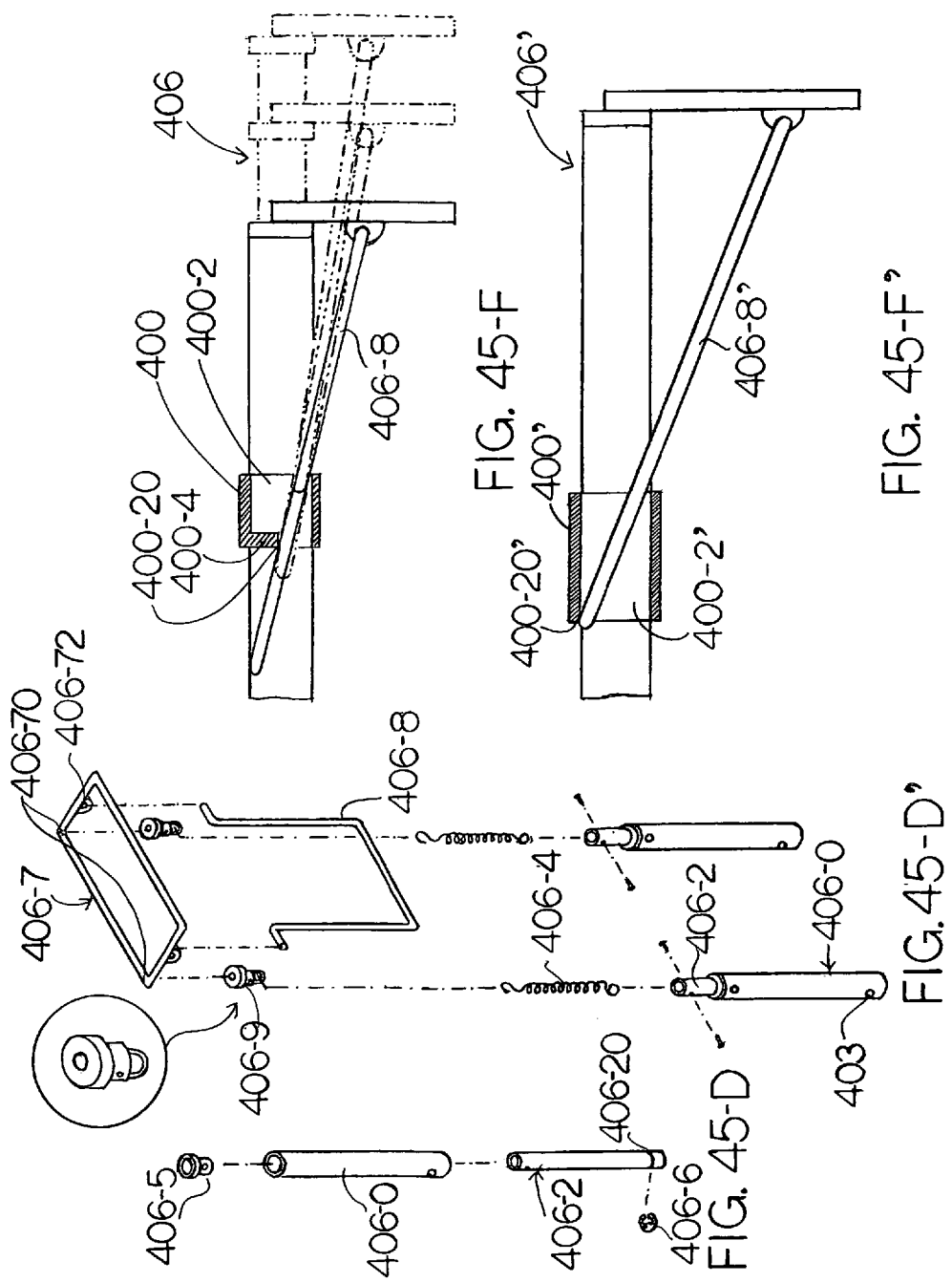

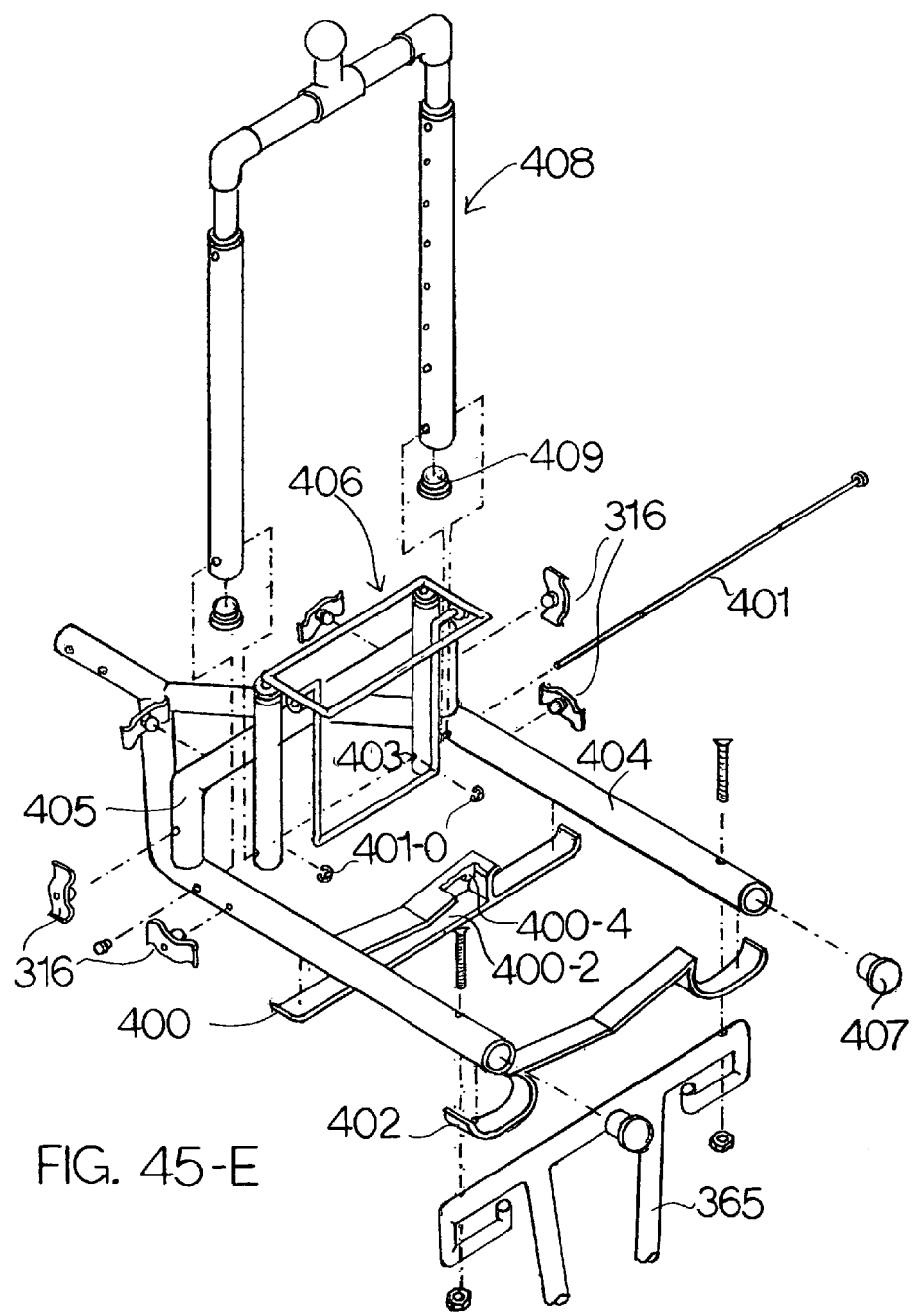
FIG. 45-E

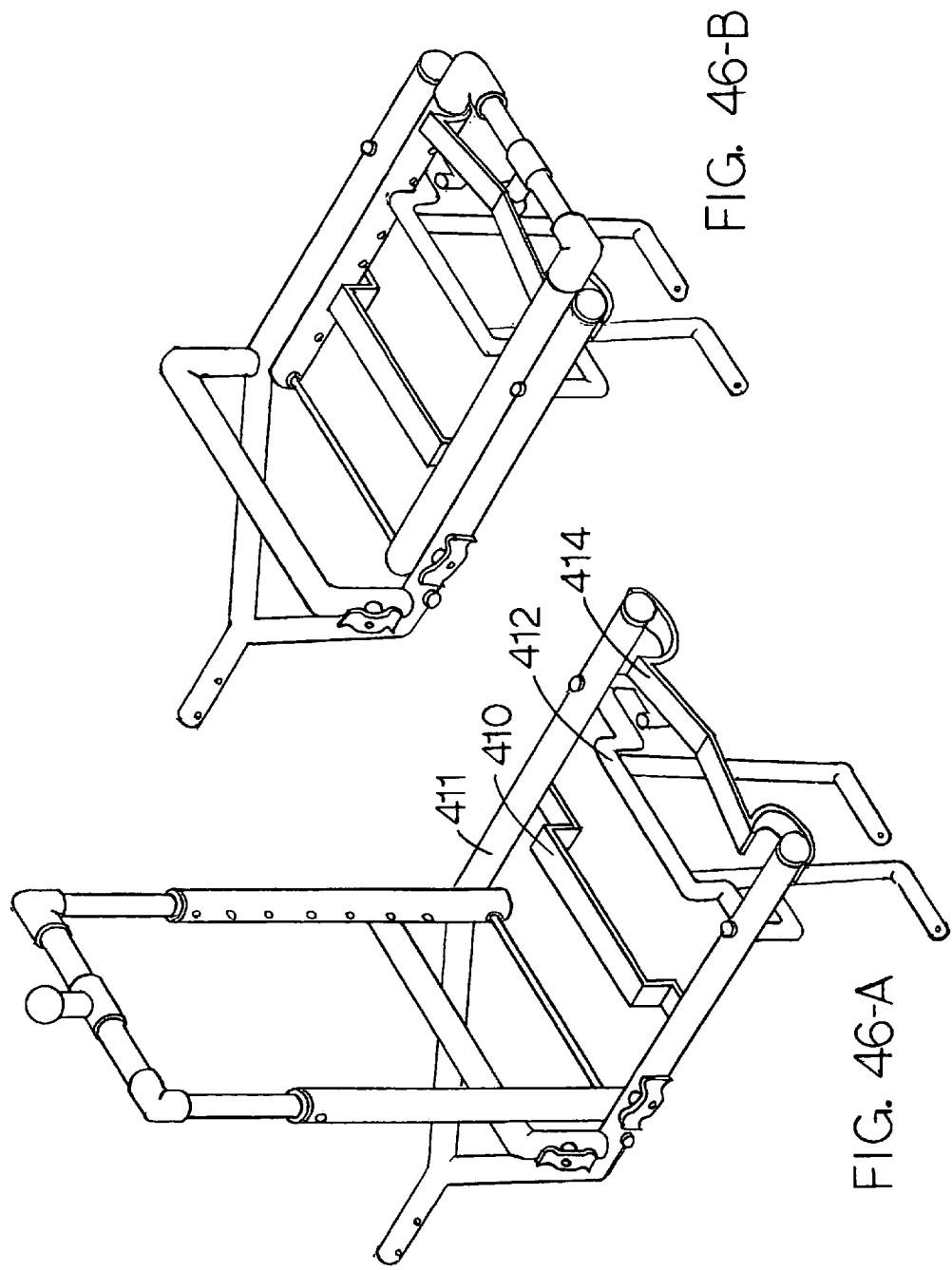

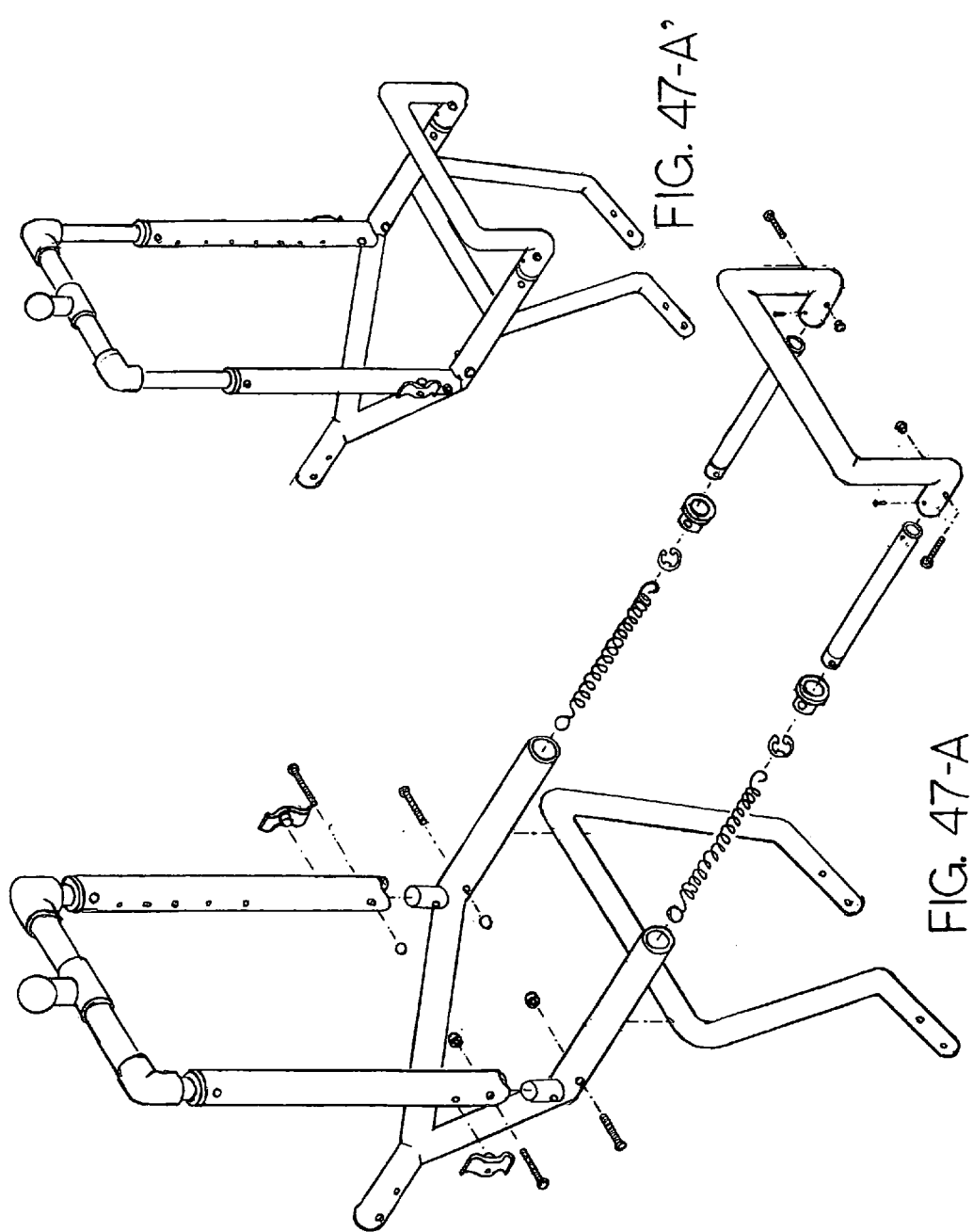

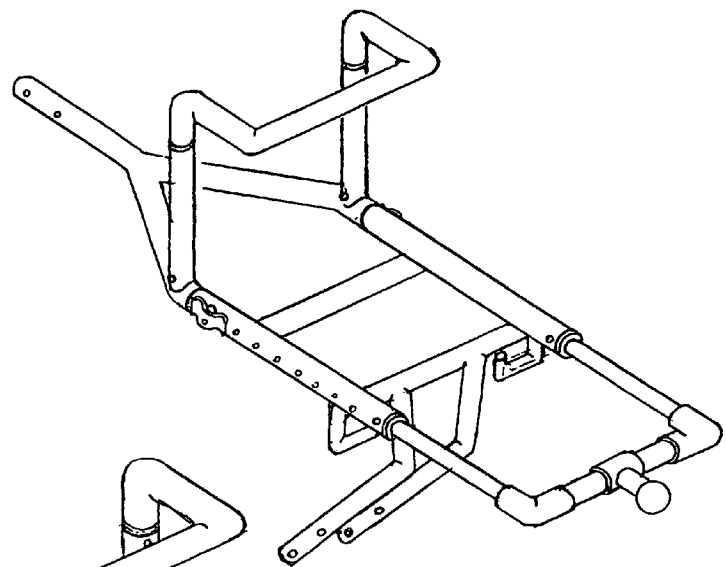
FIG. 48-A'
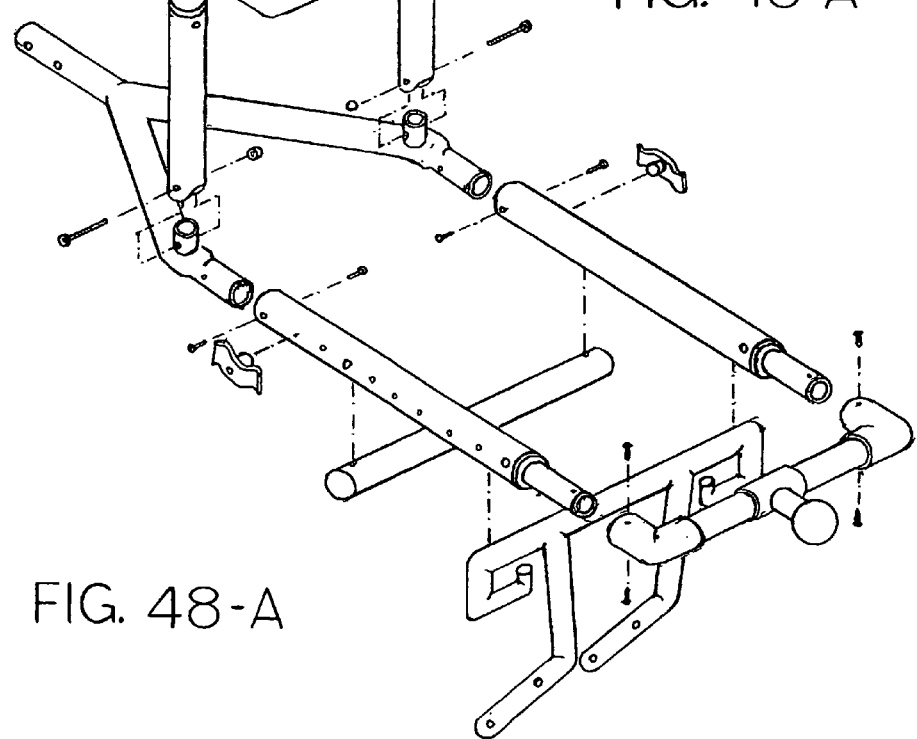
FIG. 48-A

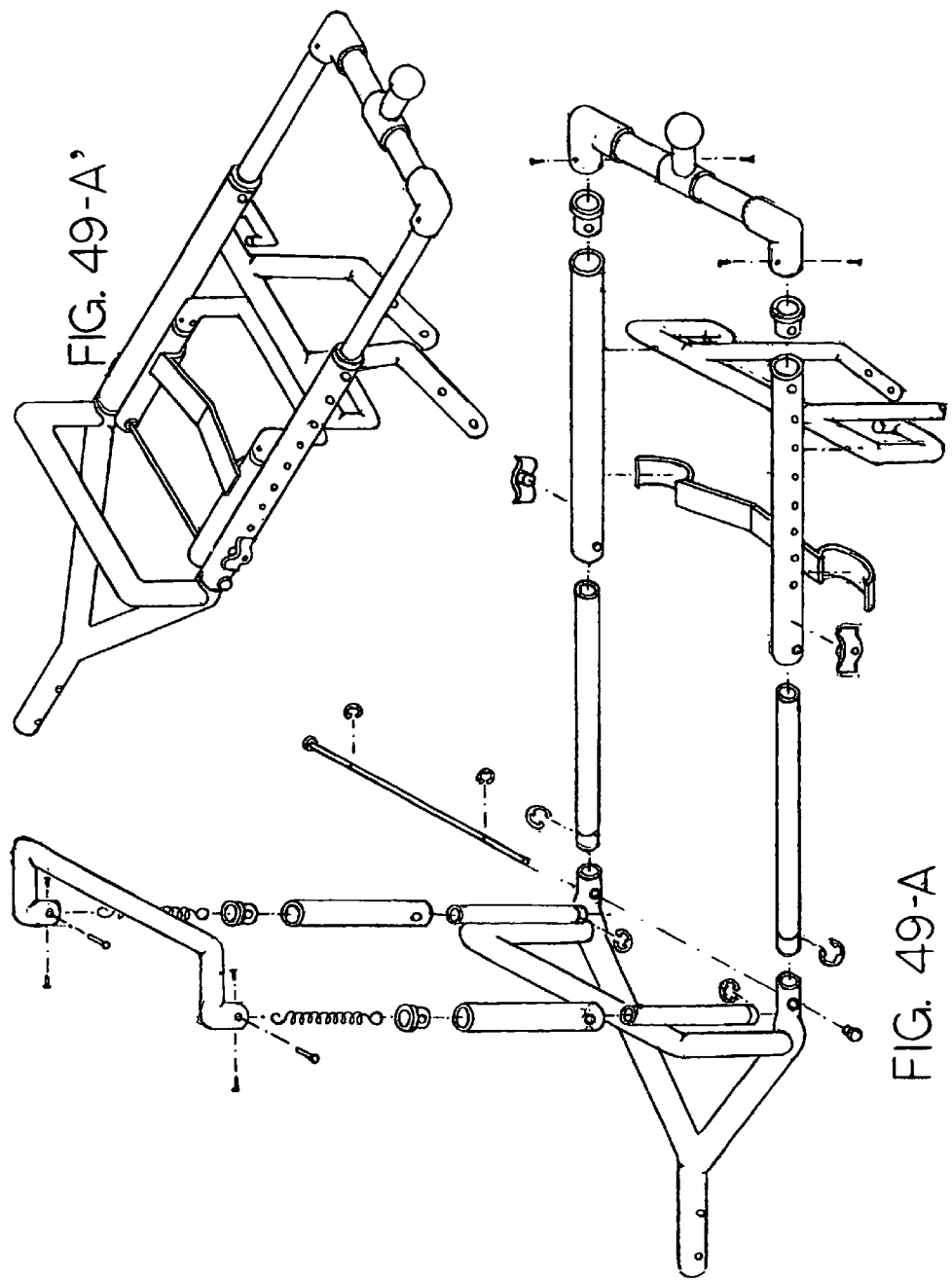

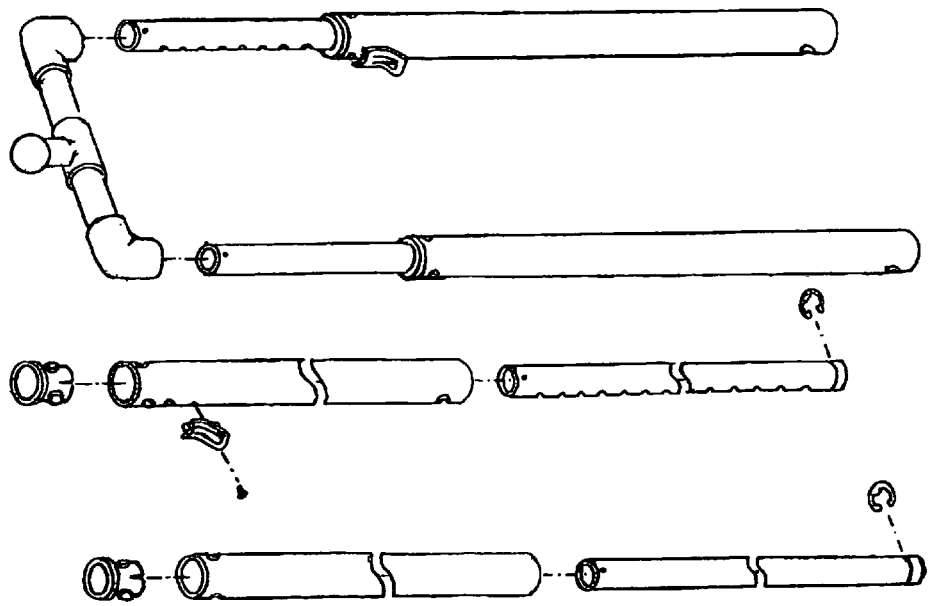
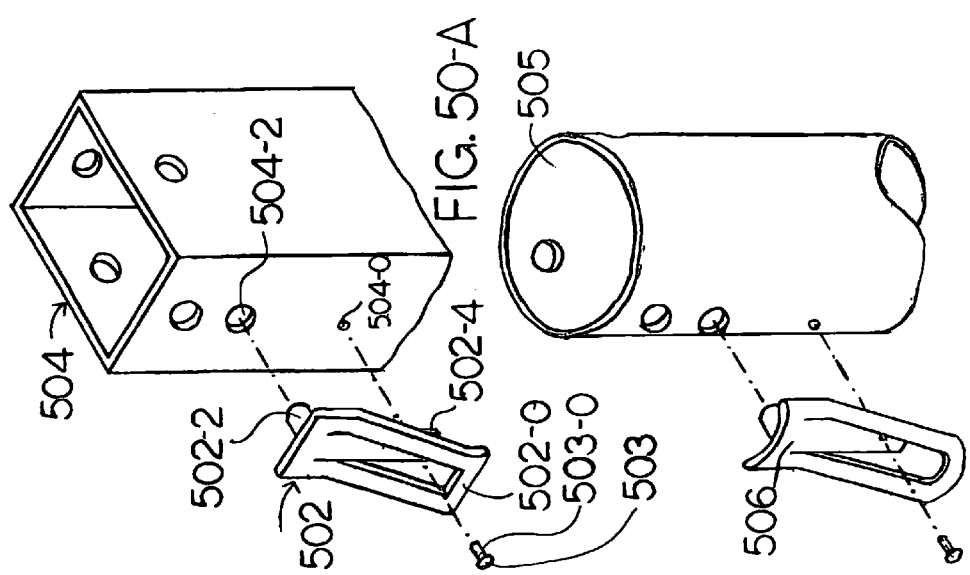

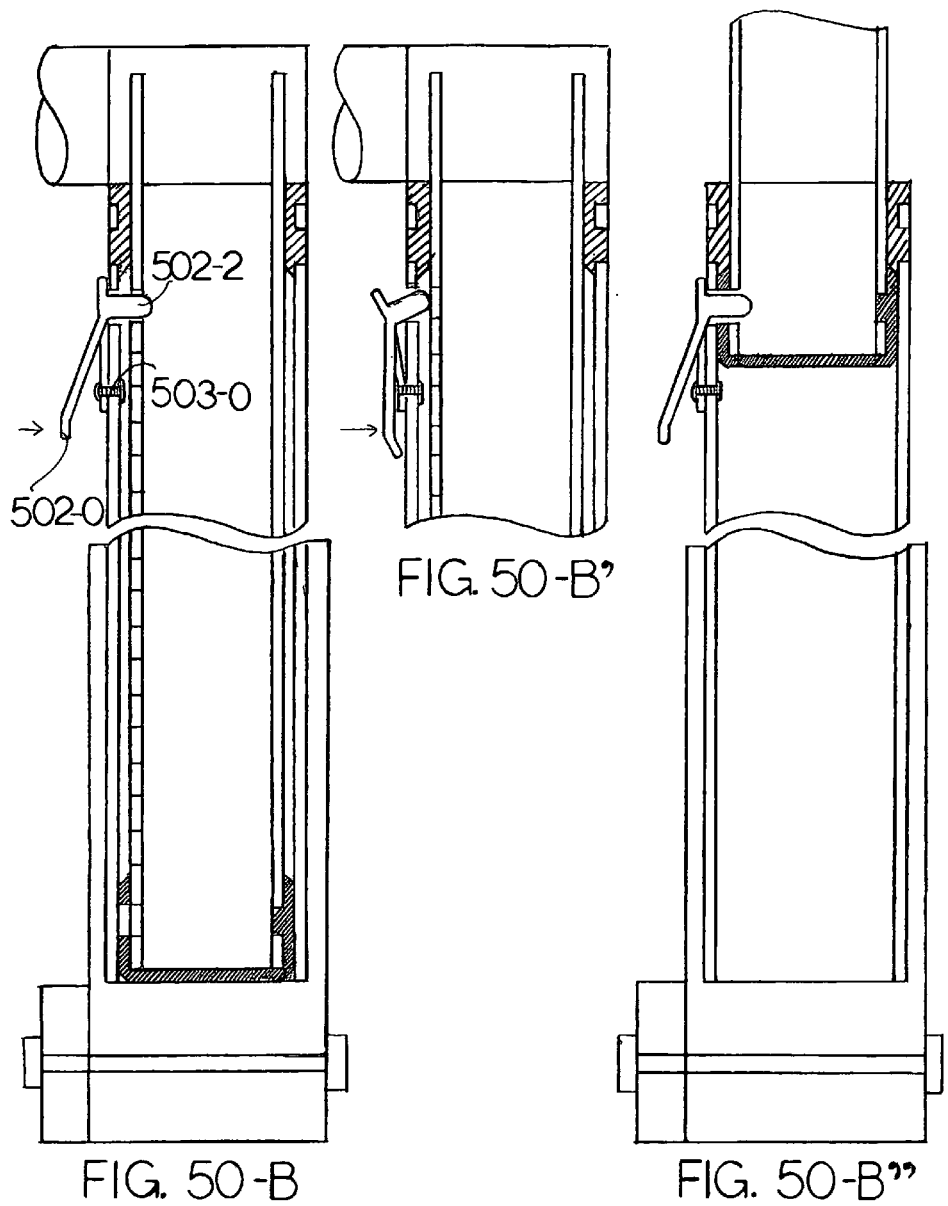
FIG. 50-B  FIG. 50-B'  FIG. 50-B''

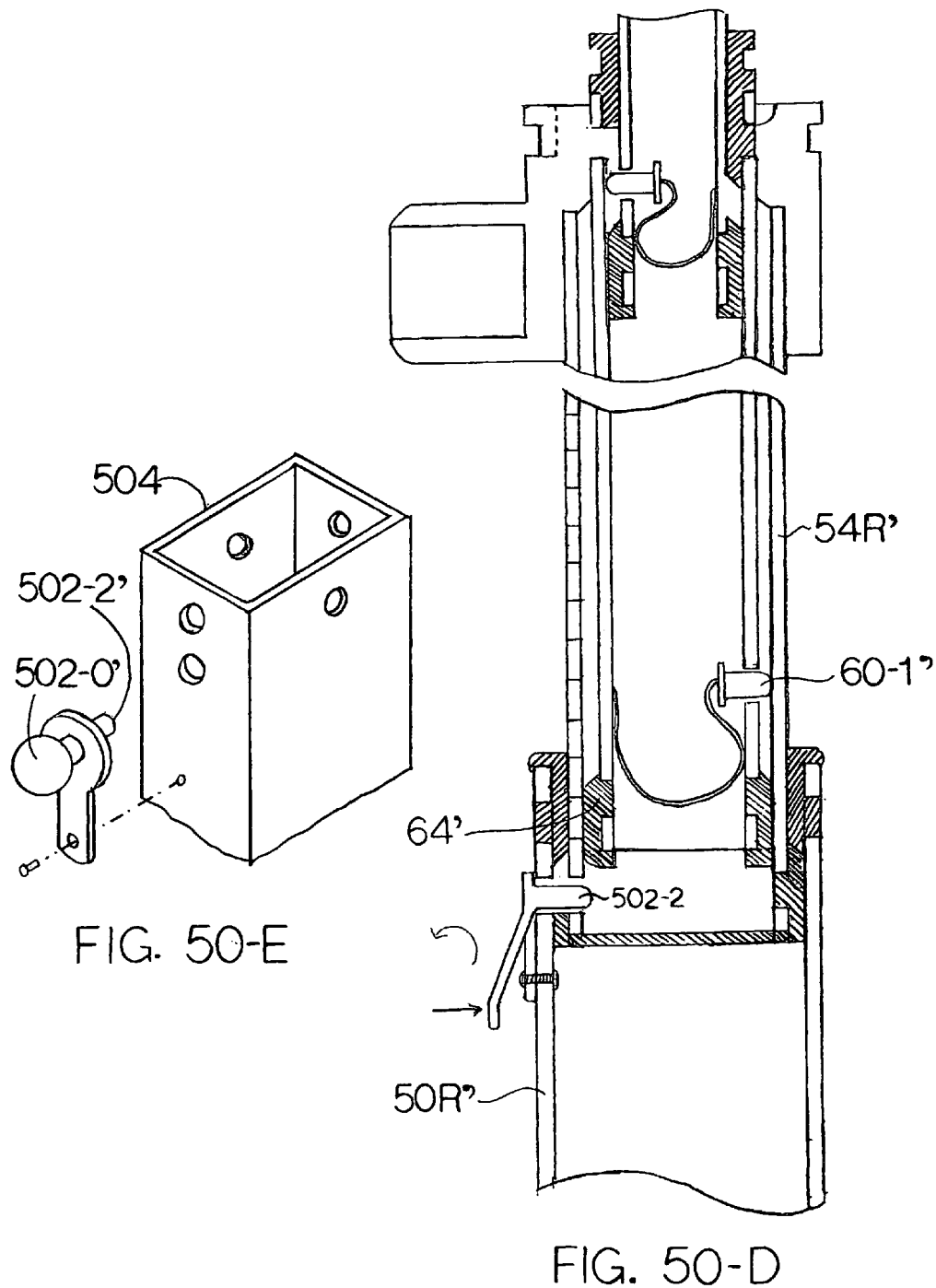
FIG. 50-E
FIG. 50-D

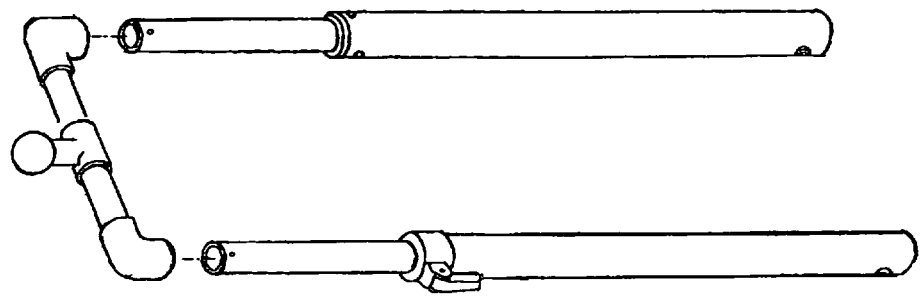
FIG. 51-B'
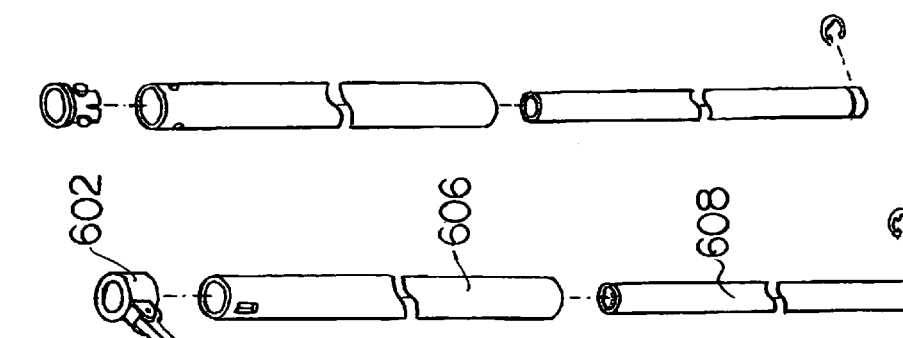
FIG. 51-B
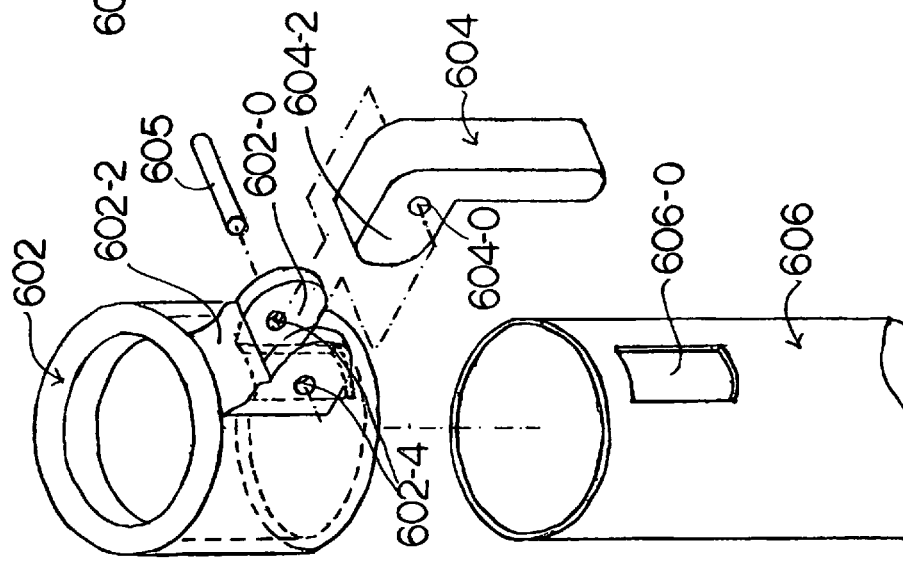
FIG. 51-A

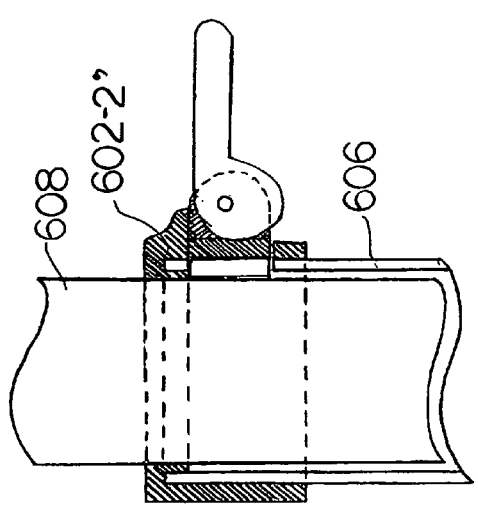
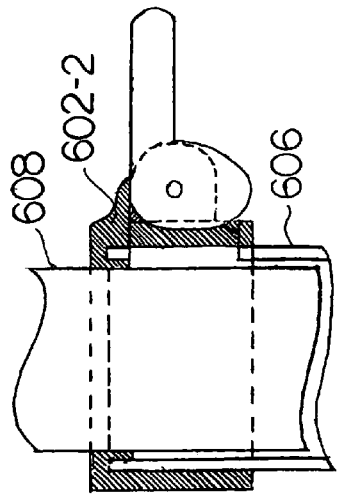
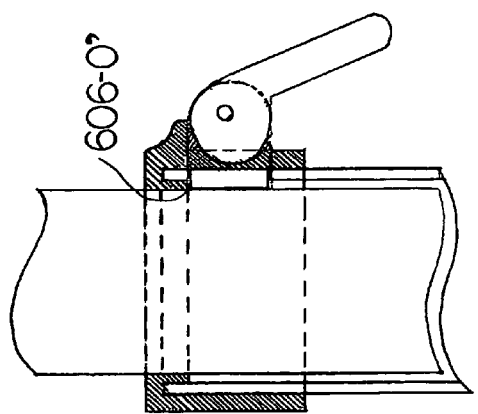
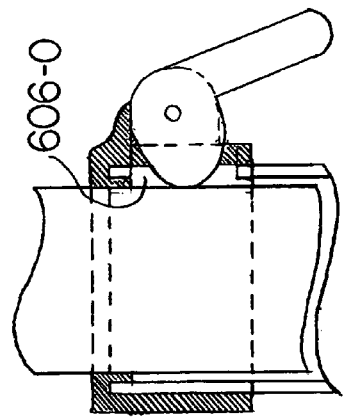
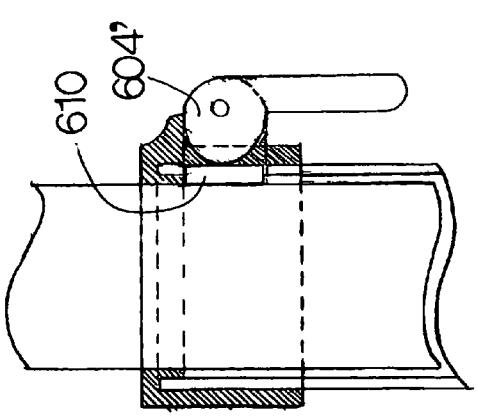
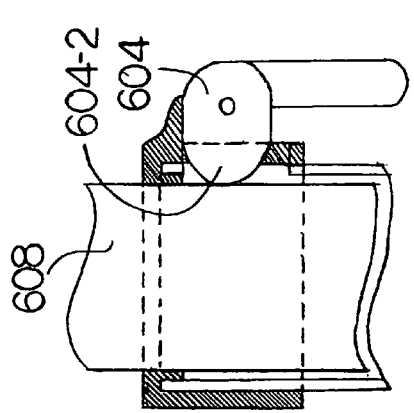
FIG. 51-D1  FIG. 51-D2  FIG. 51-D3
FIG. 51-C1  FIG. 51-C2  FIG. 51-C3

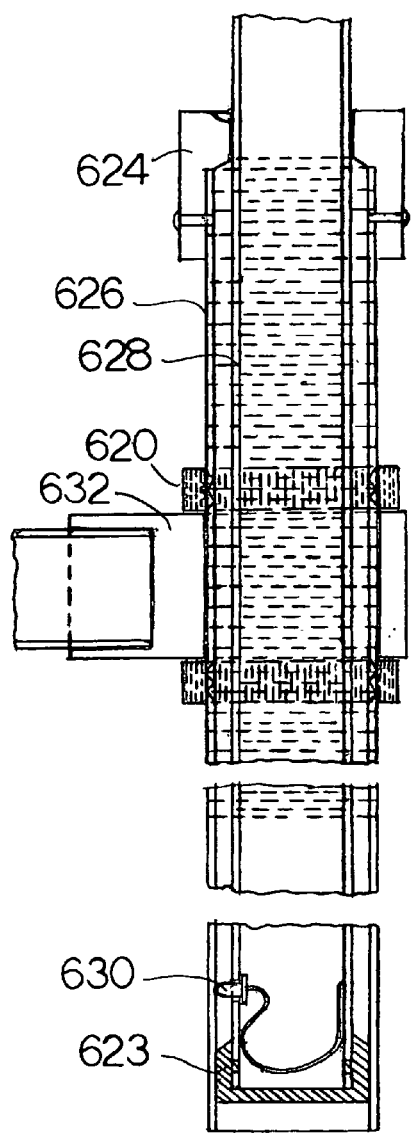
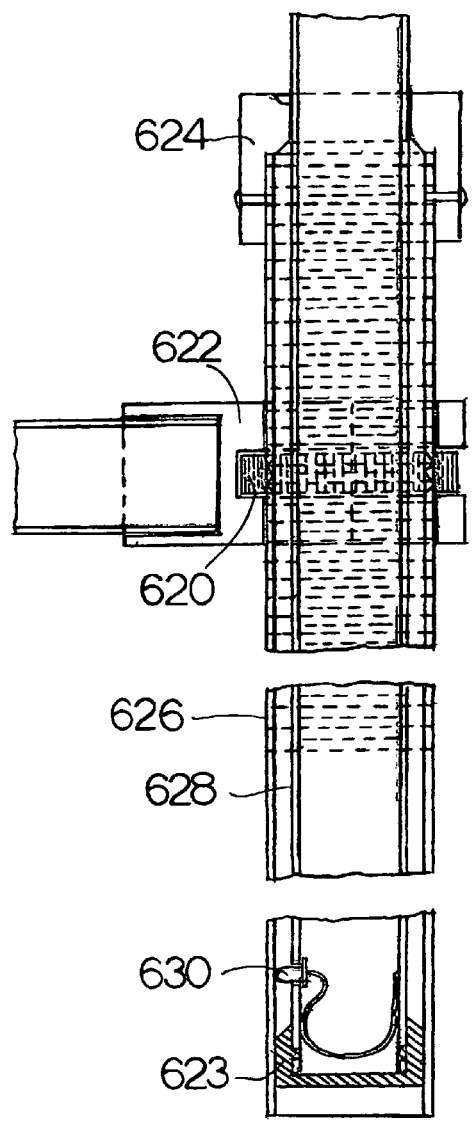
FIG. 51-F    FIG. 51-E

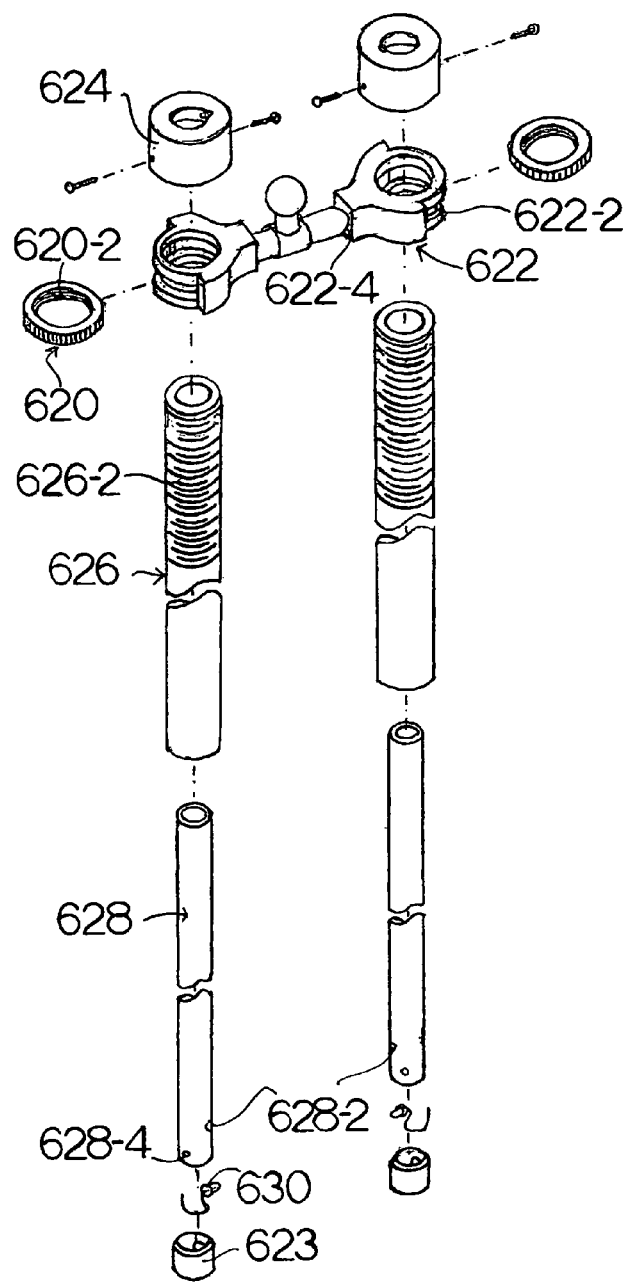
FIG. 51-E'
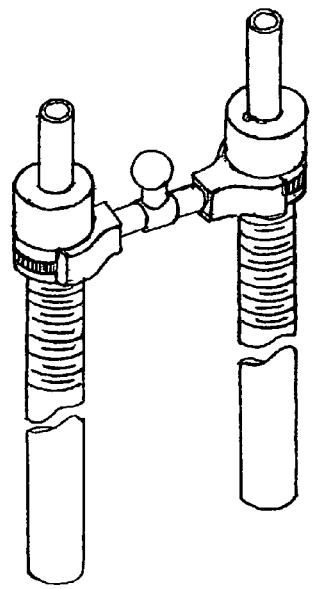
FIG. 51-E"

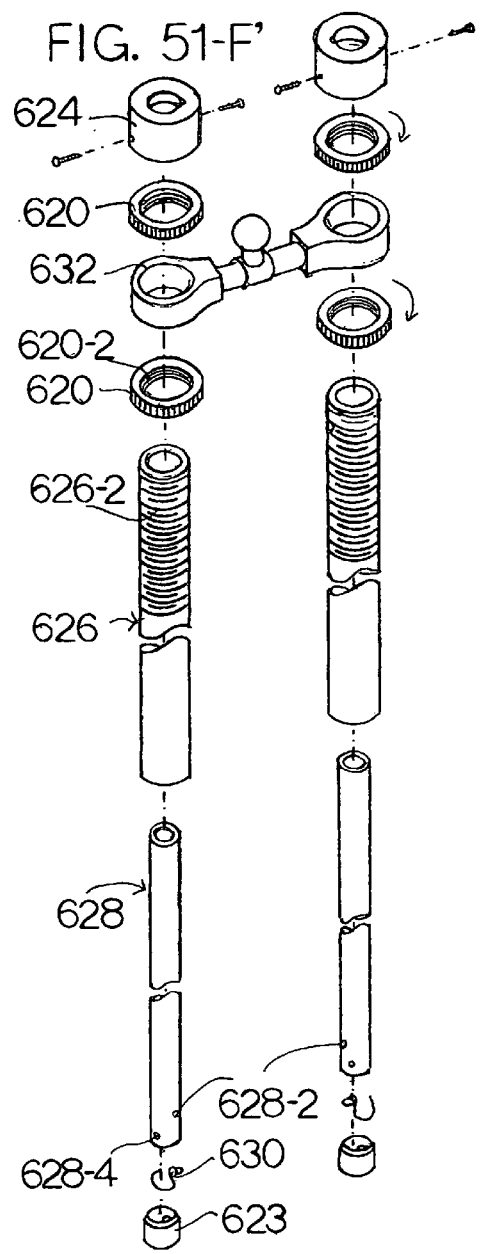
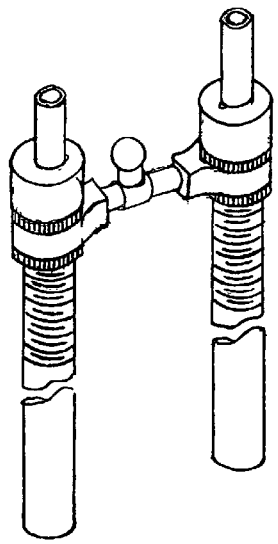
FIG. 51-F'
FIG. 51-F"

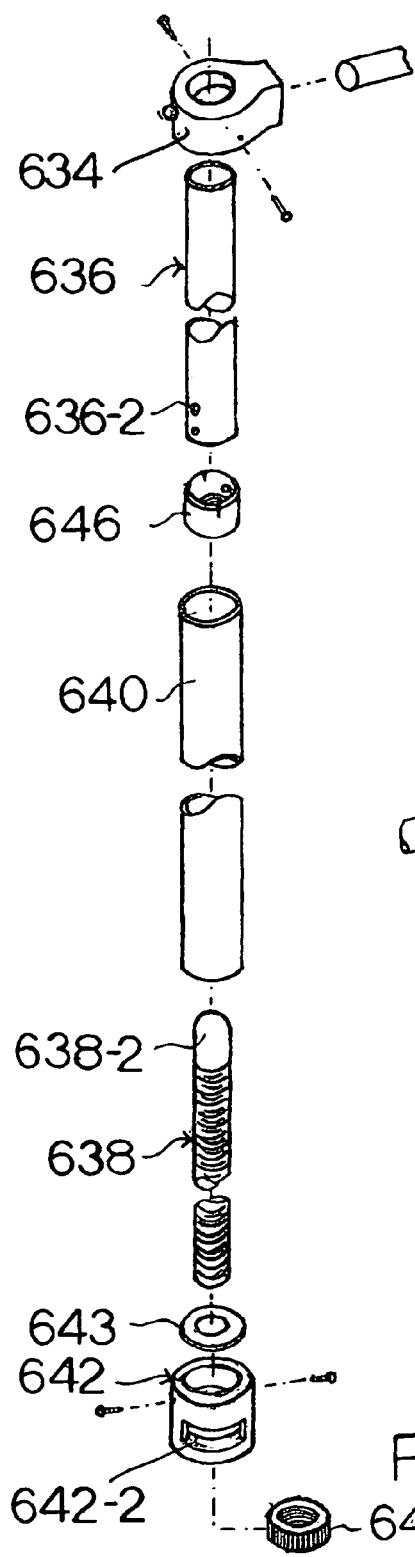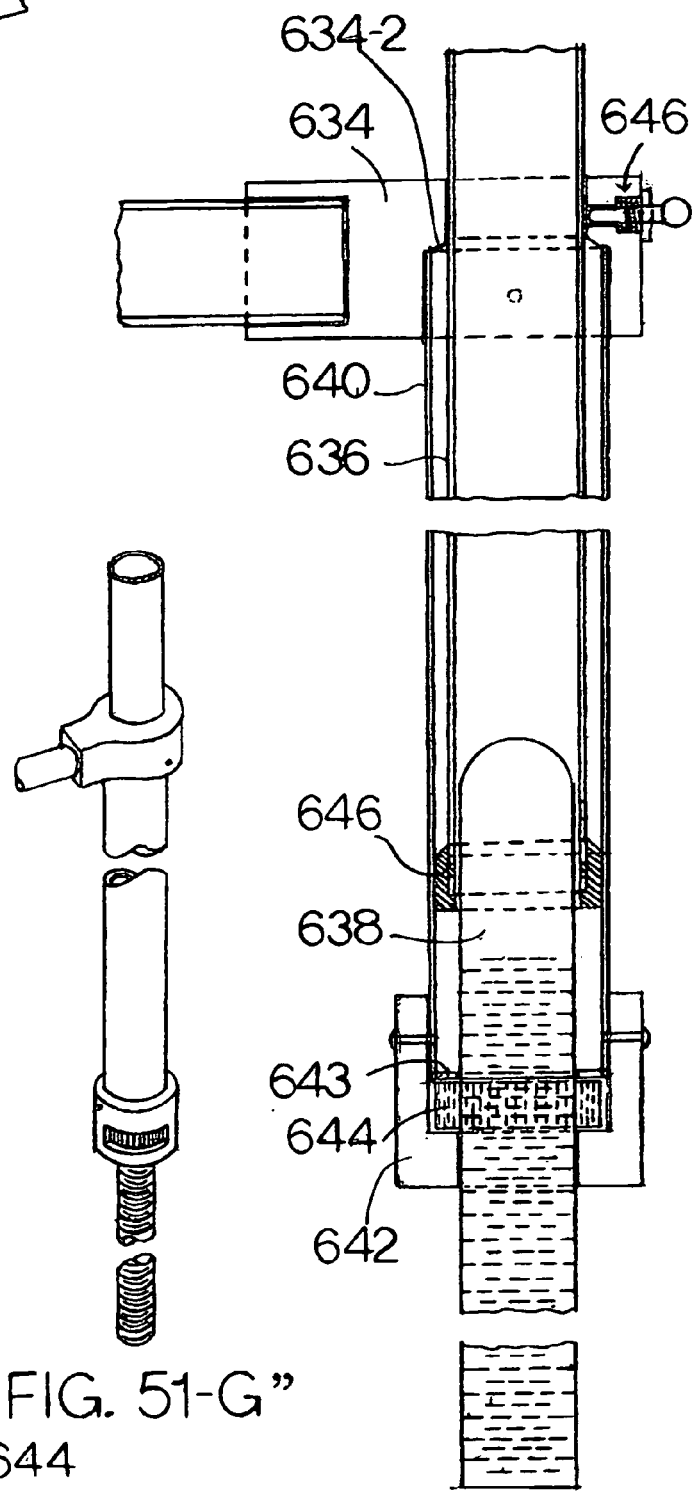
FIG. 51-G'  FIG. 51-G"  FIG. 51-G

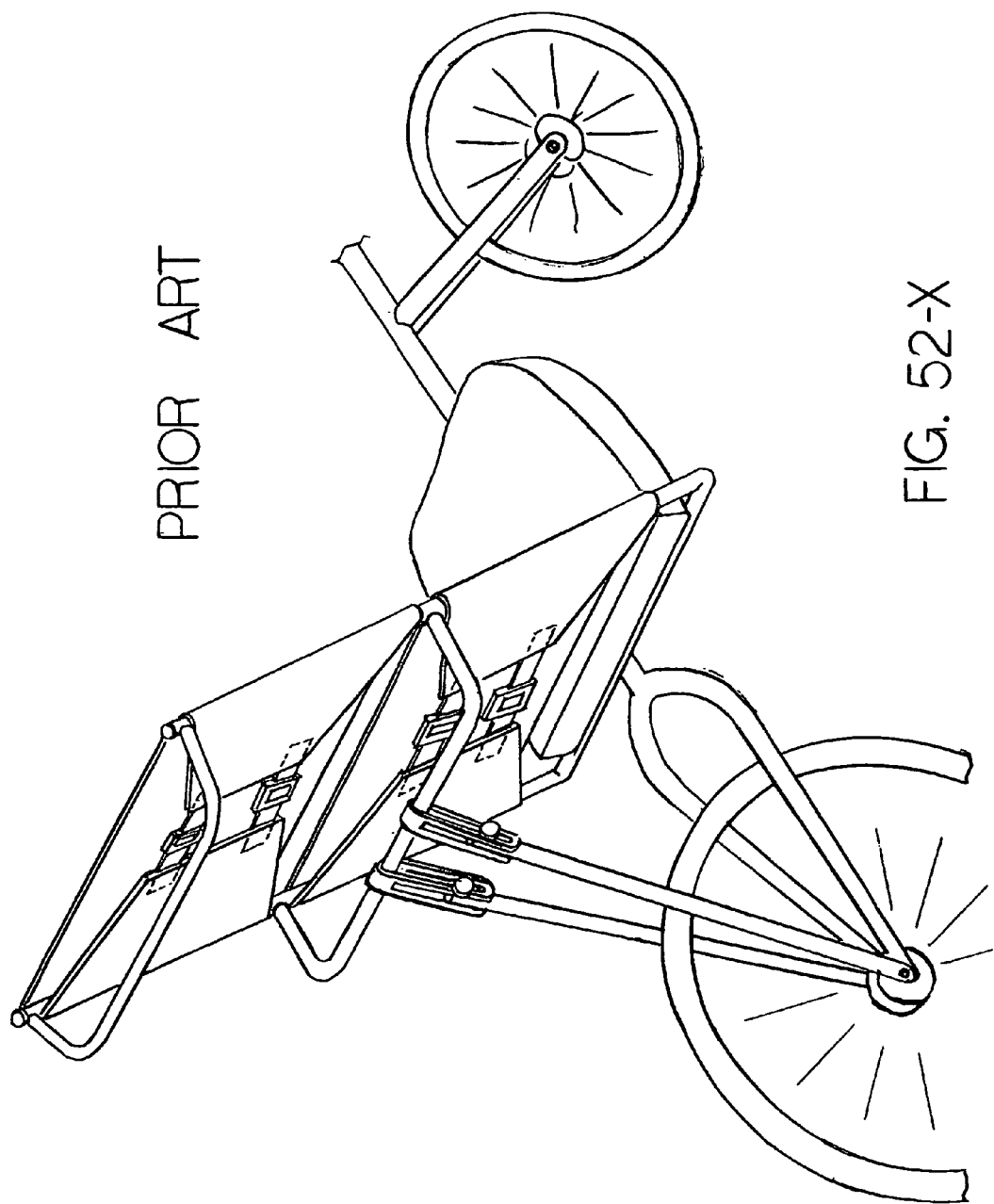
PRIOR ART
FIG. 52-X

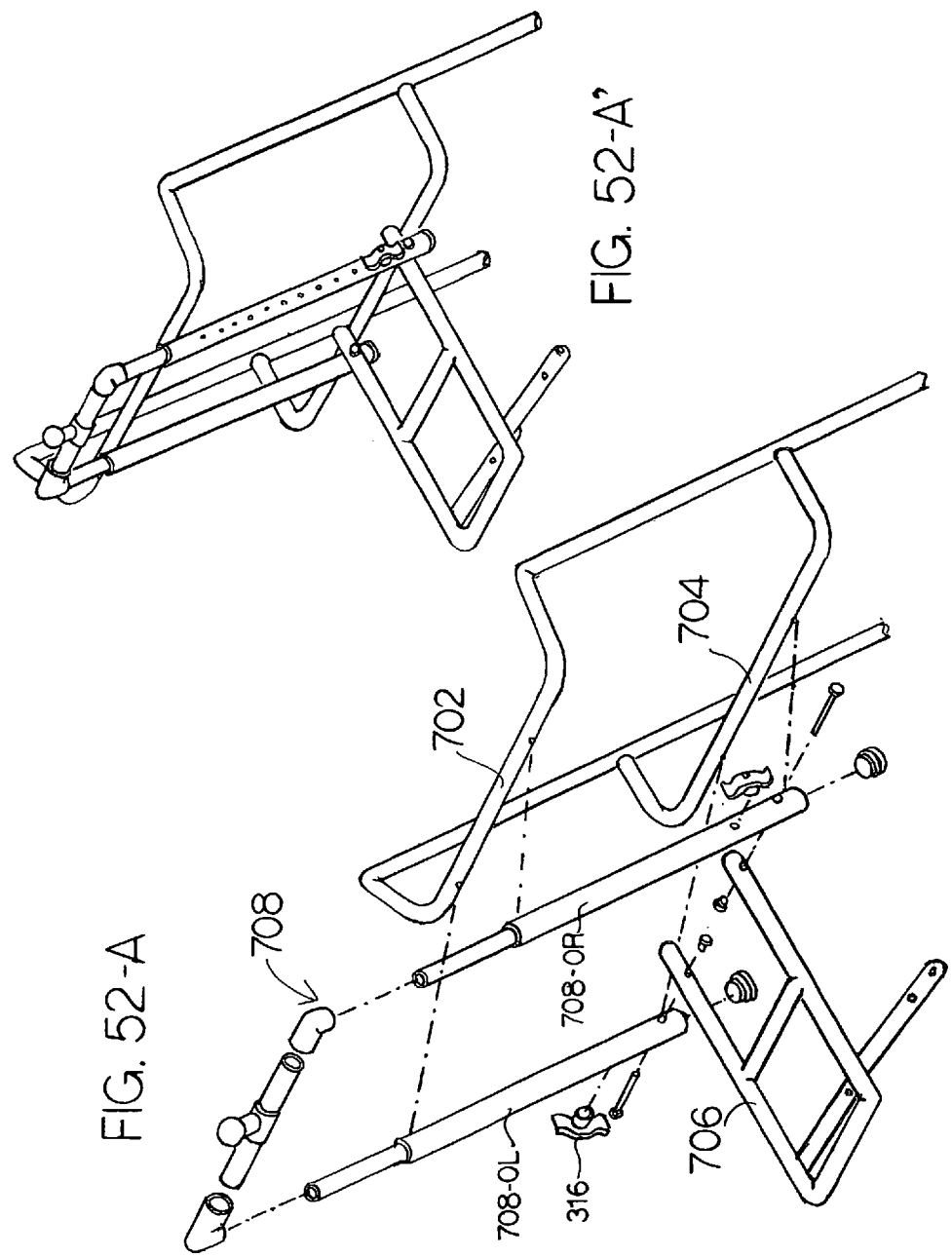

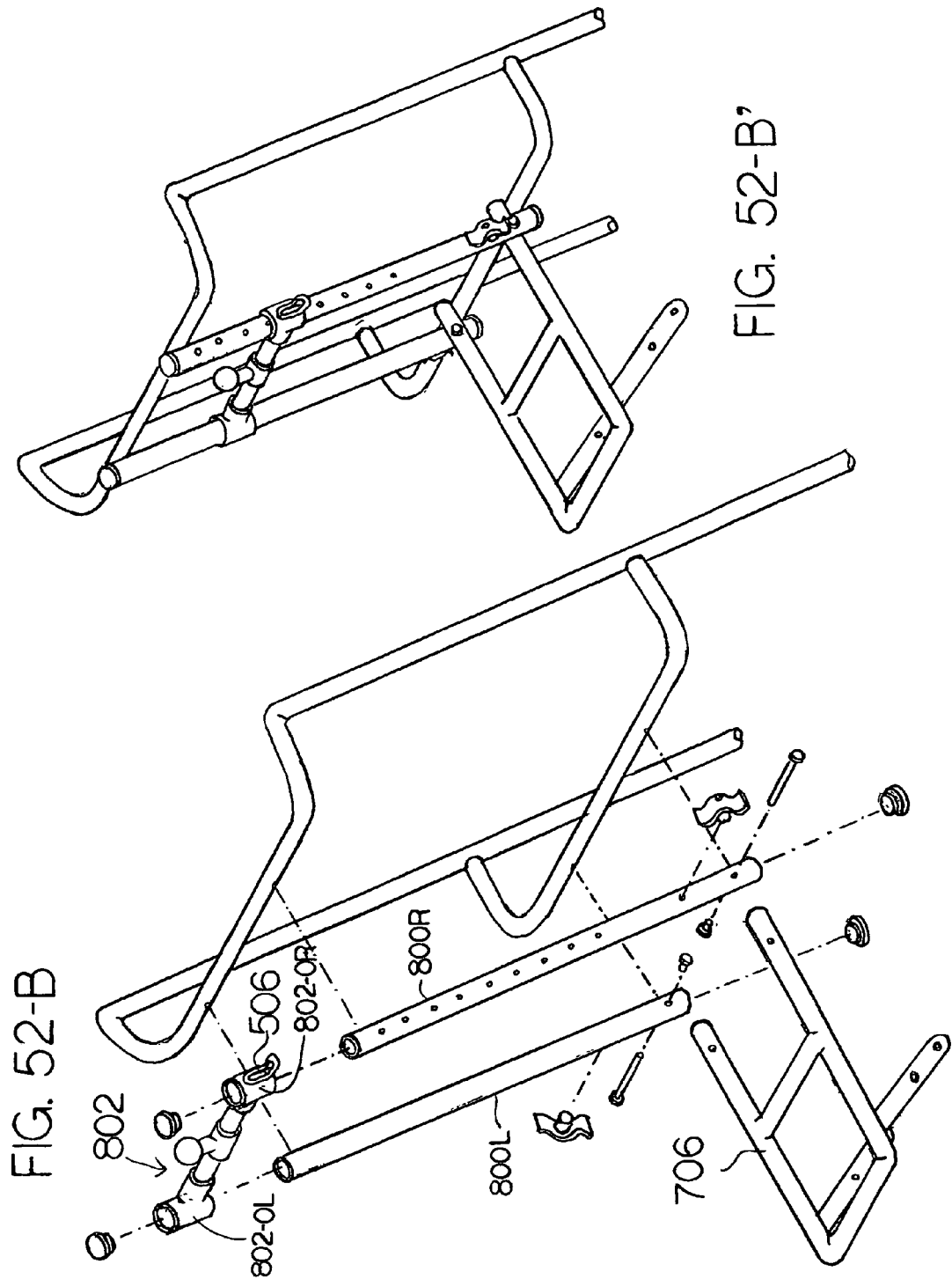

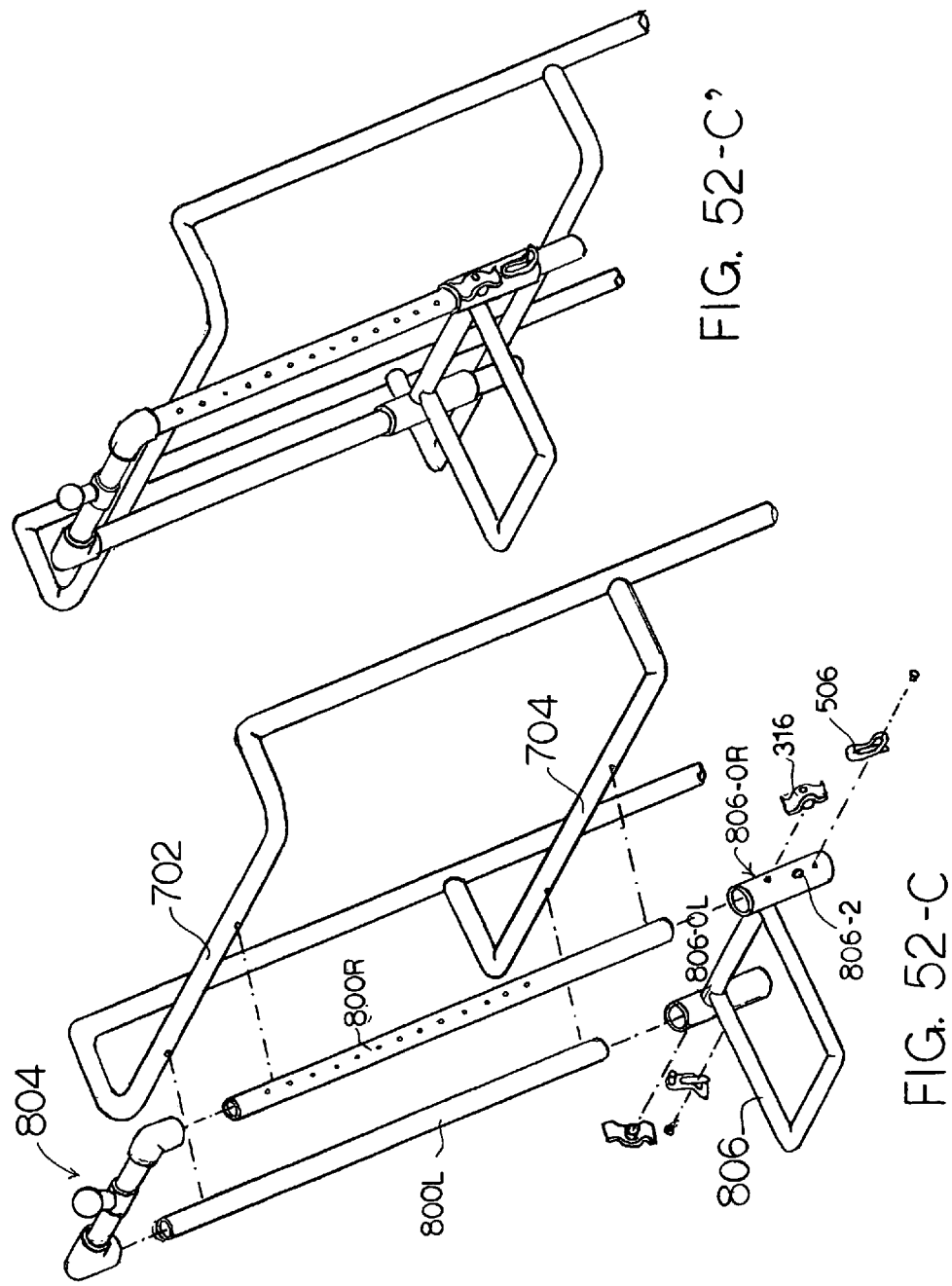

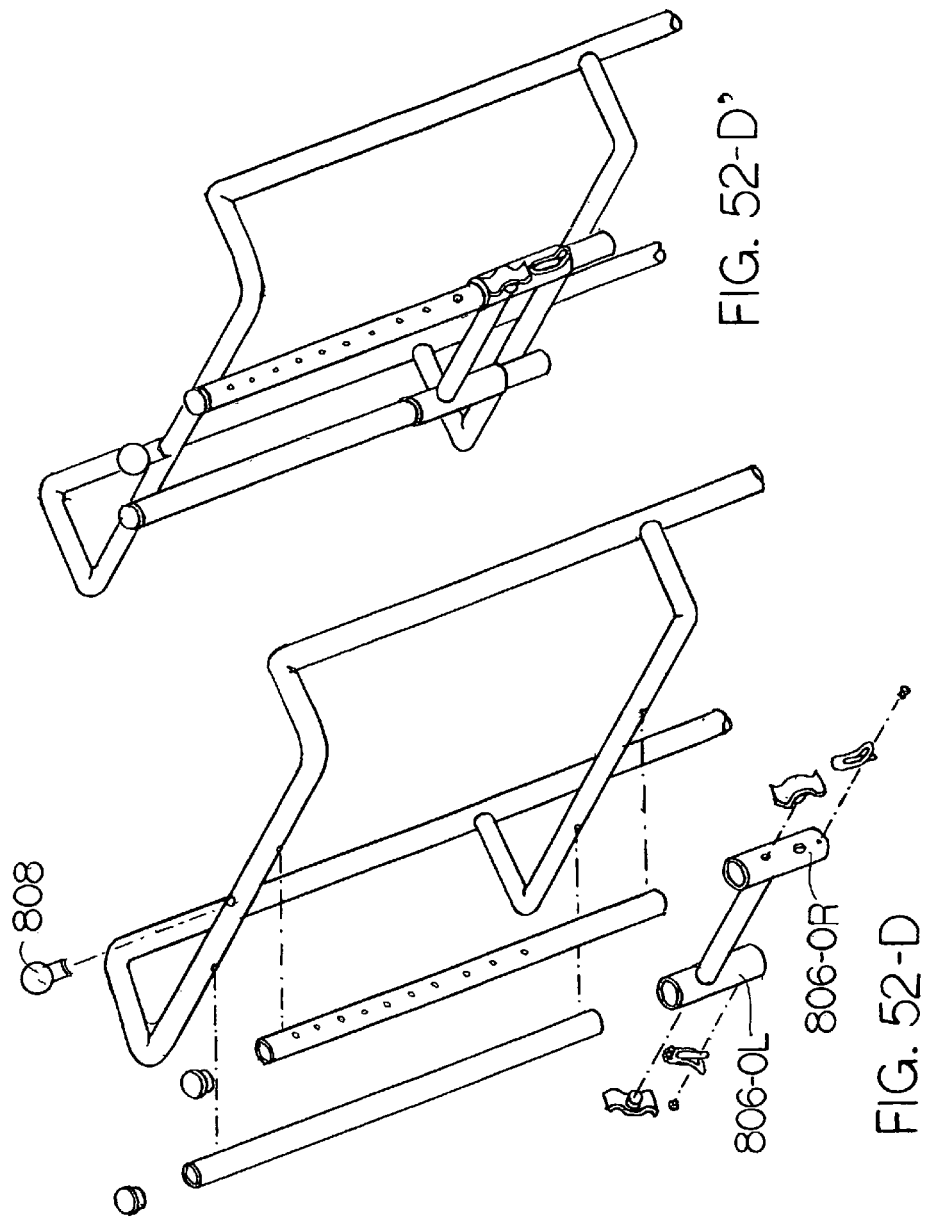

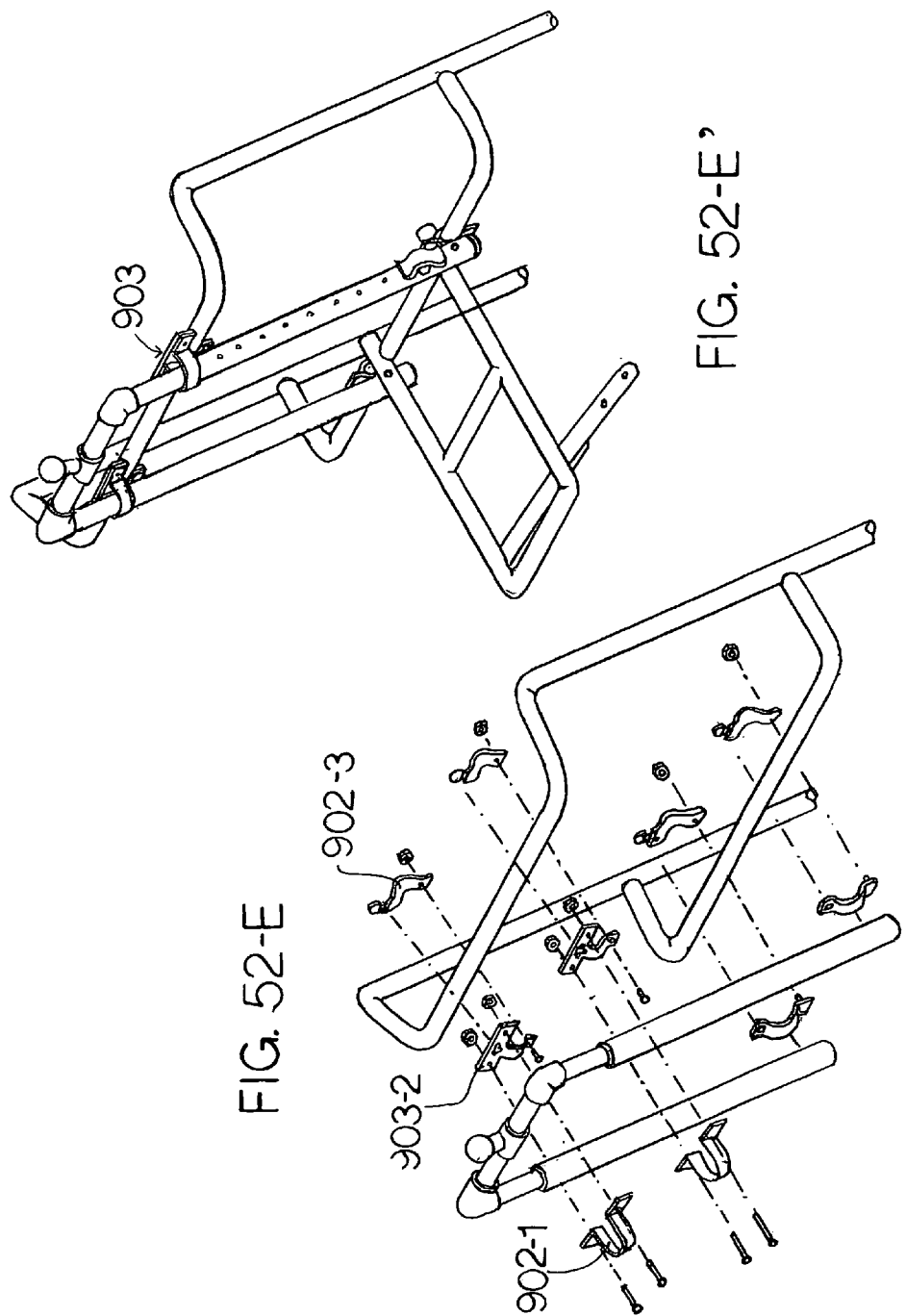

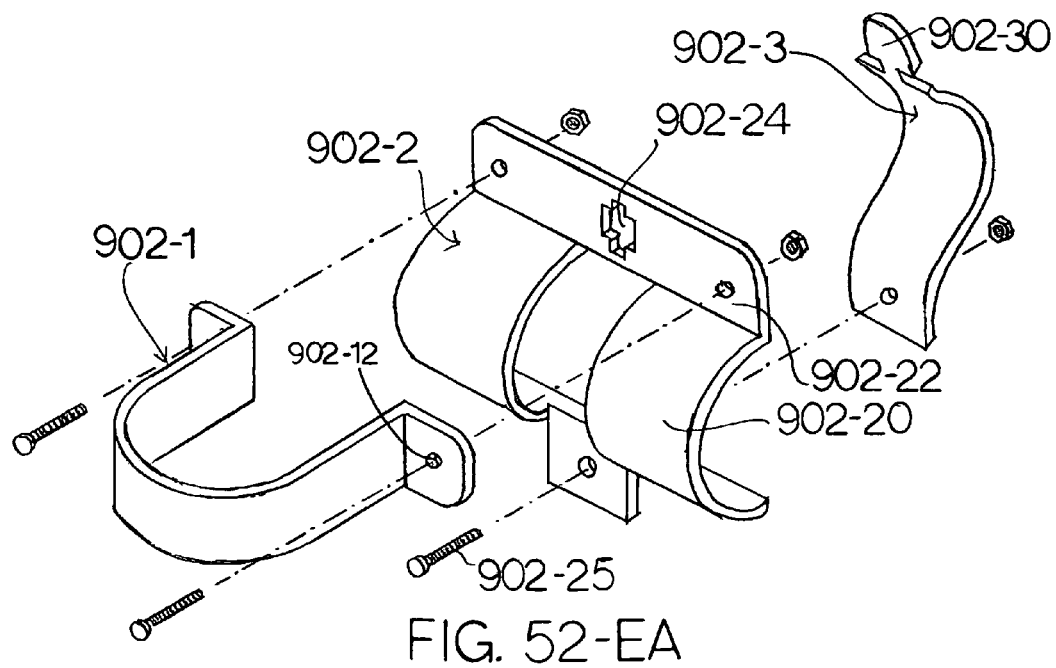
FIG. 52-EA
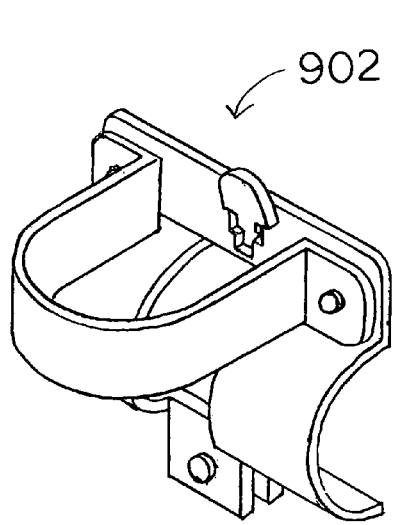
FIG. 52-EA'
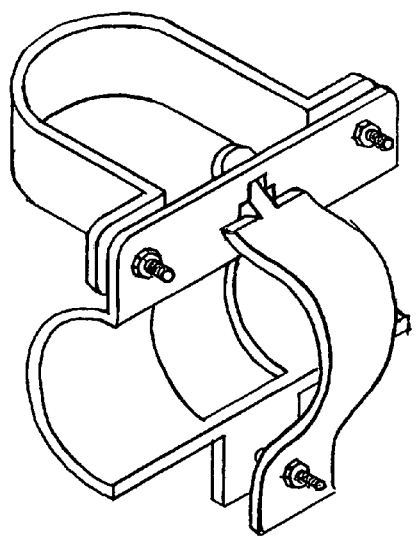
FIG. 52-EA"

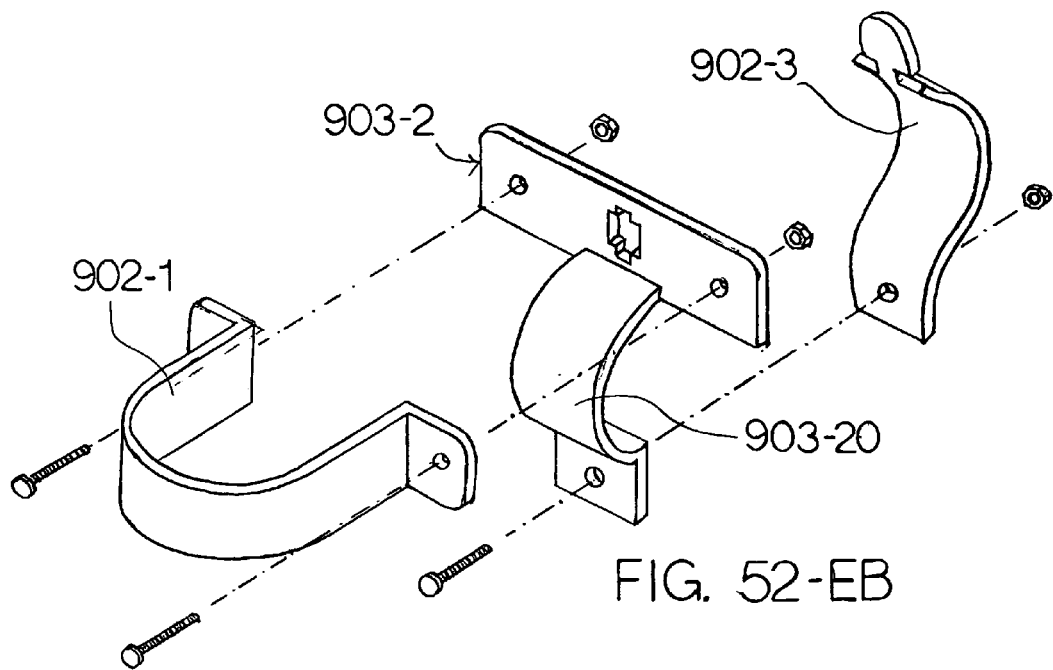
FIG. 52-EB
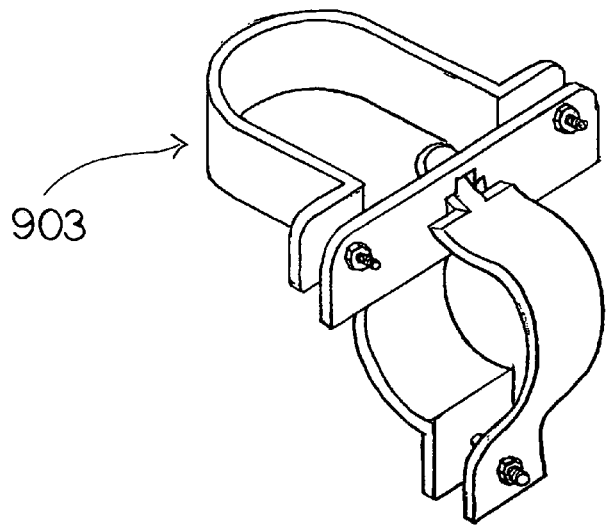
FIG. 52-EB'

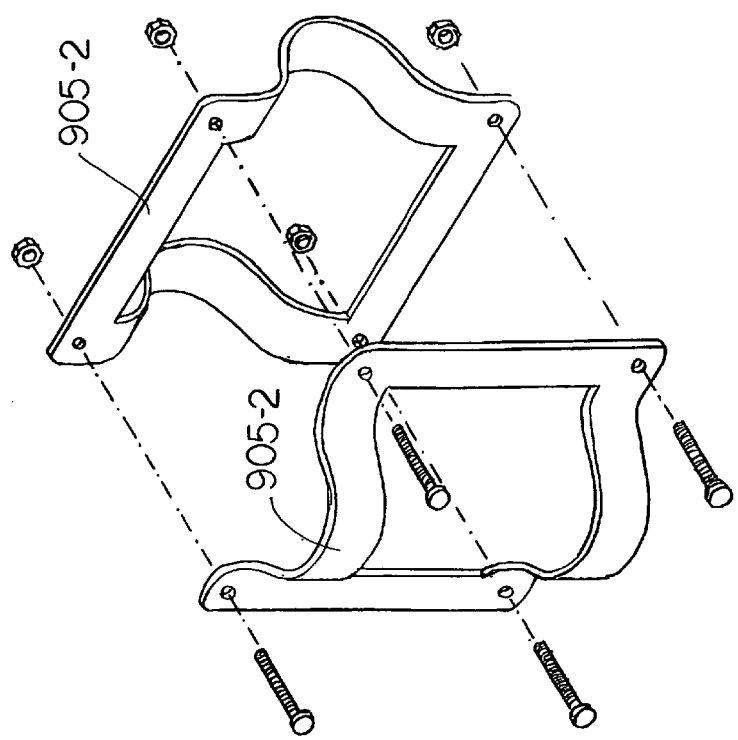
FIG. 52-EC
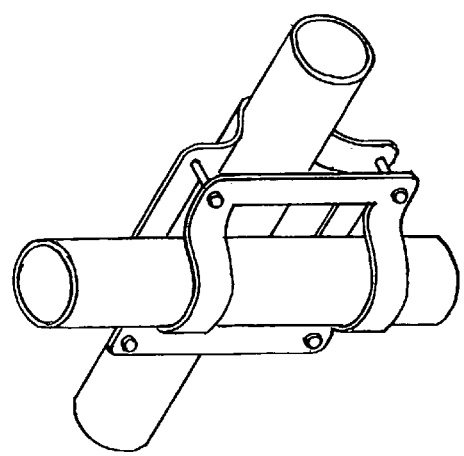
FIG. 52-EC'

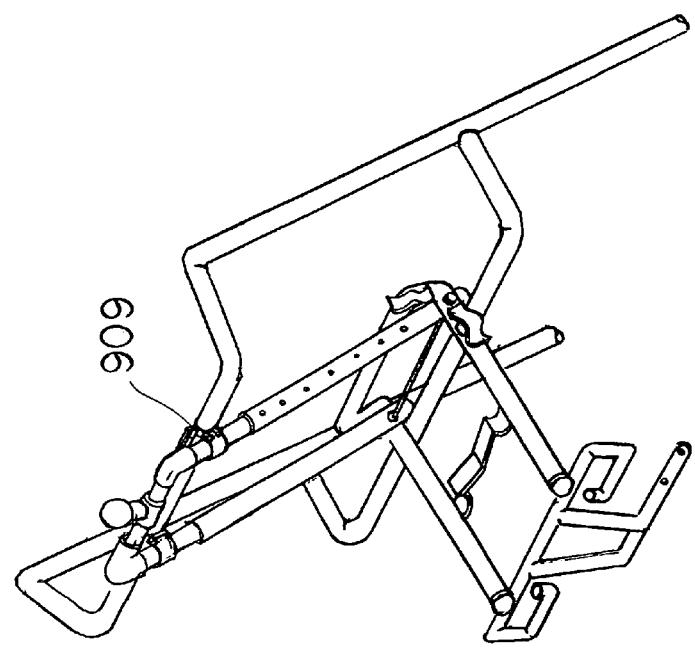
FIG. 52-G
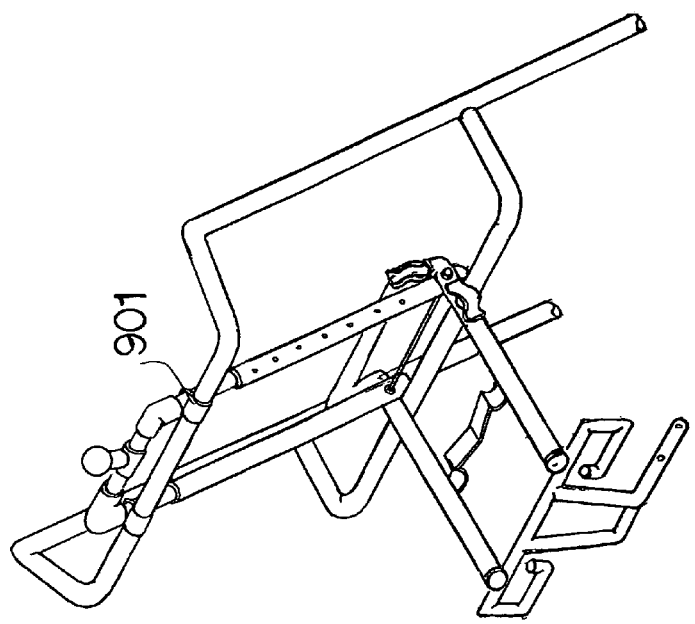
FIG. 52-F

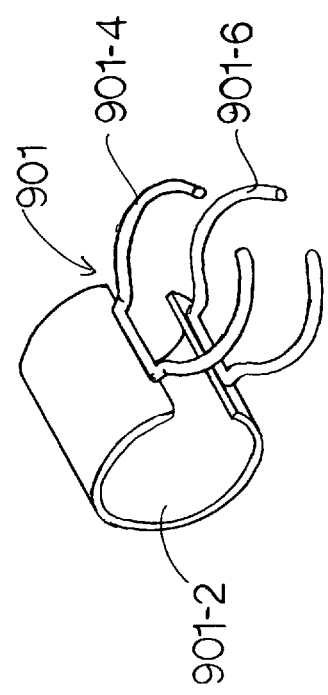
FIG. 52-F'
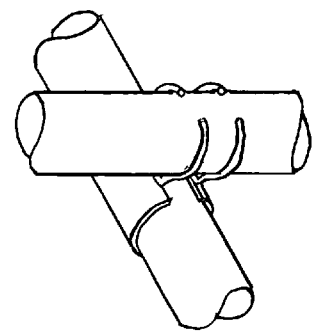
FIG. 52-F'C
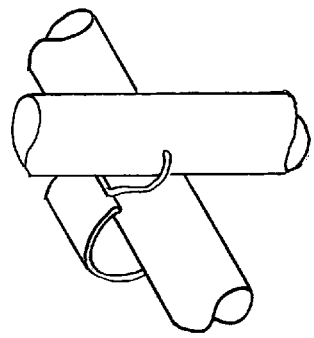
FIG. 52-F'B
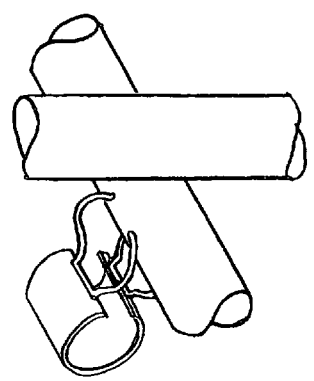
FIG. 52-F'A

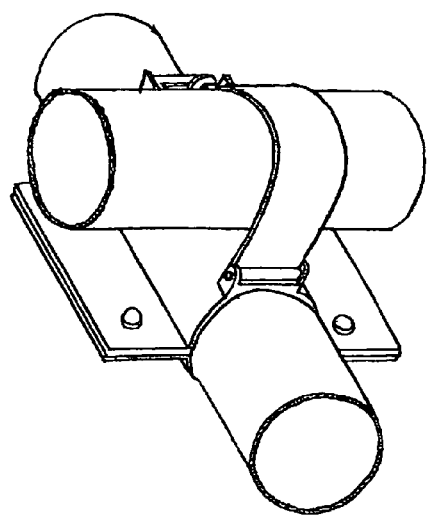
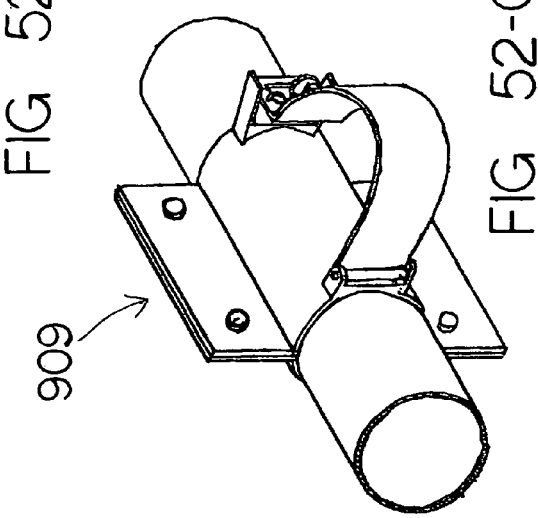
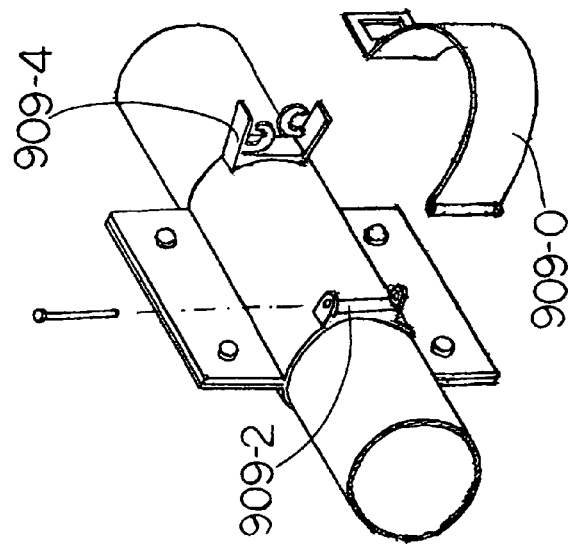
FIG 52-G'C
FIG 52-G'B
FIG. 52-G'A

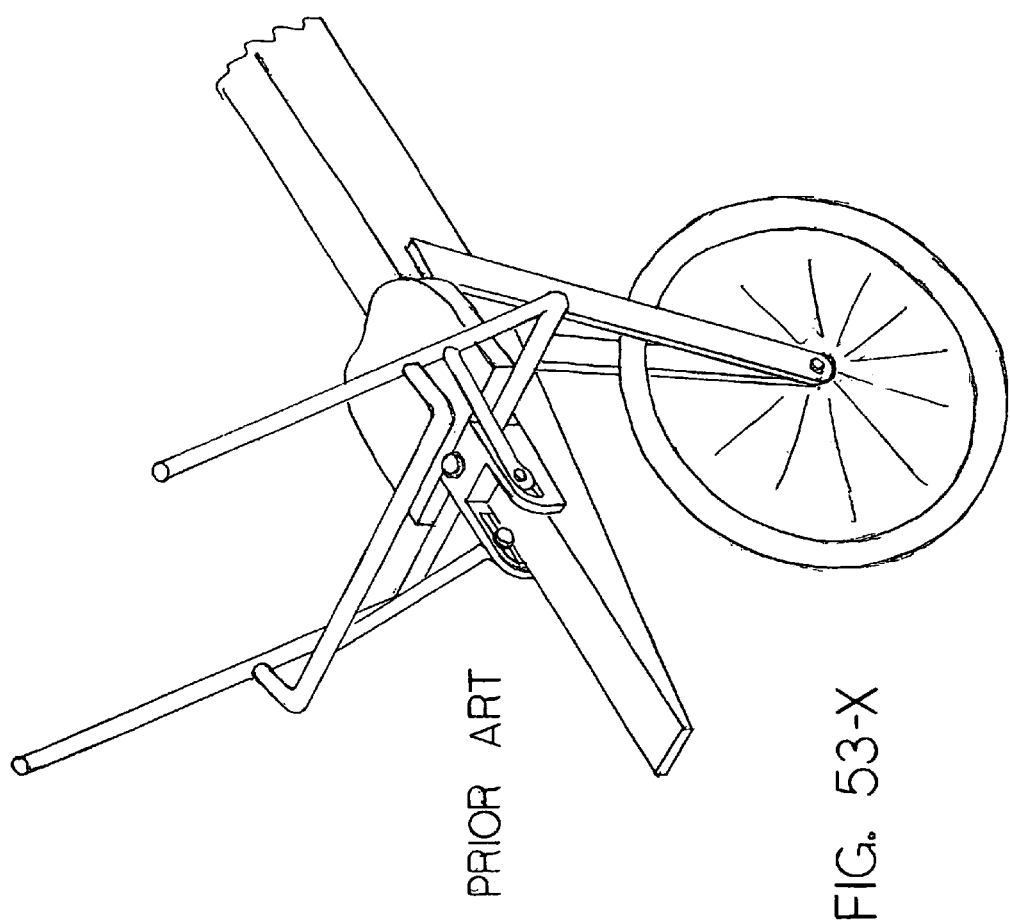
PRIOR ART
FIG. 53-X

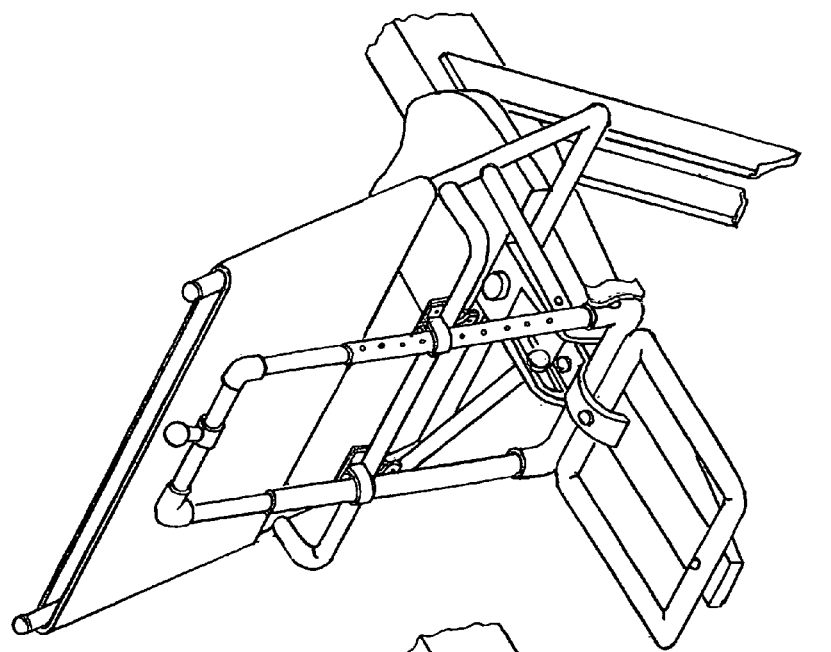
FIG. 53-A'
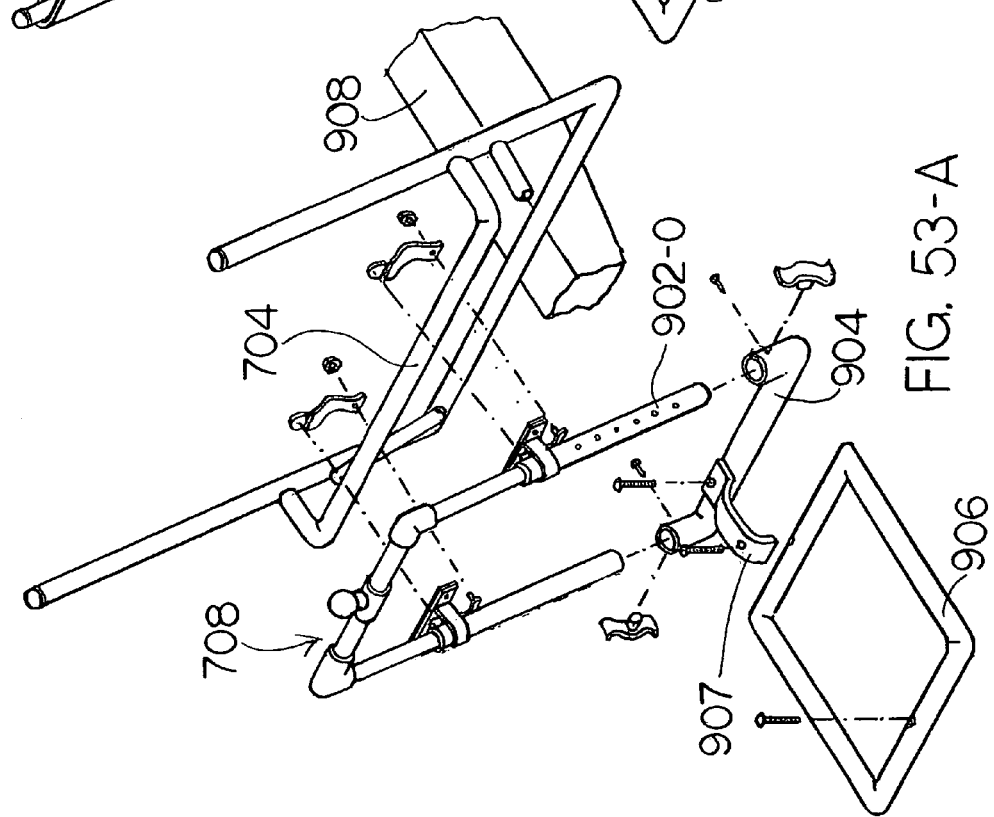
FIG. 53-A

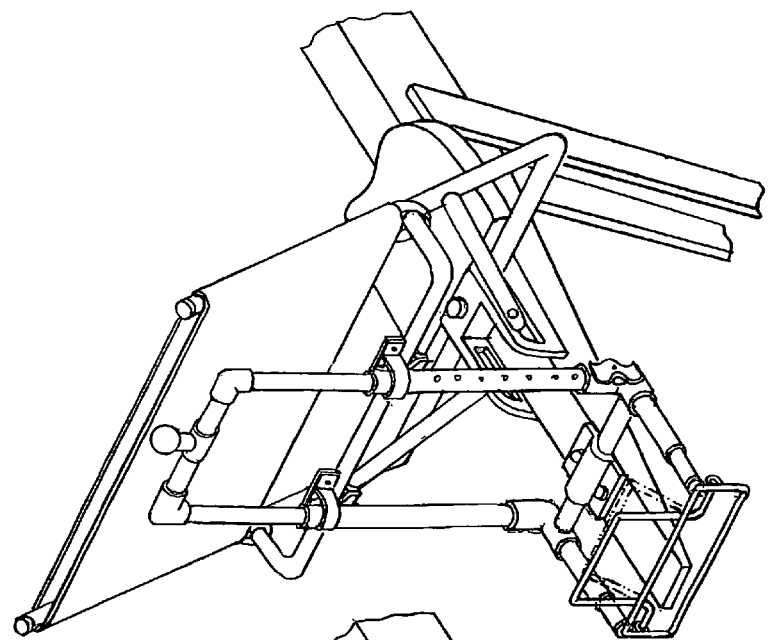
FIG. 53-C
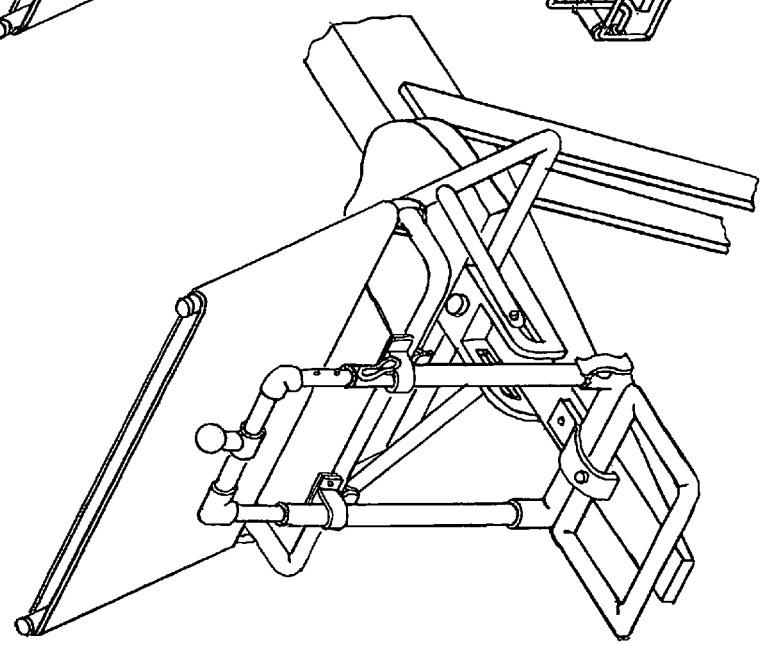
FIG. 53-B

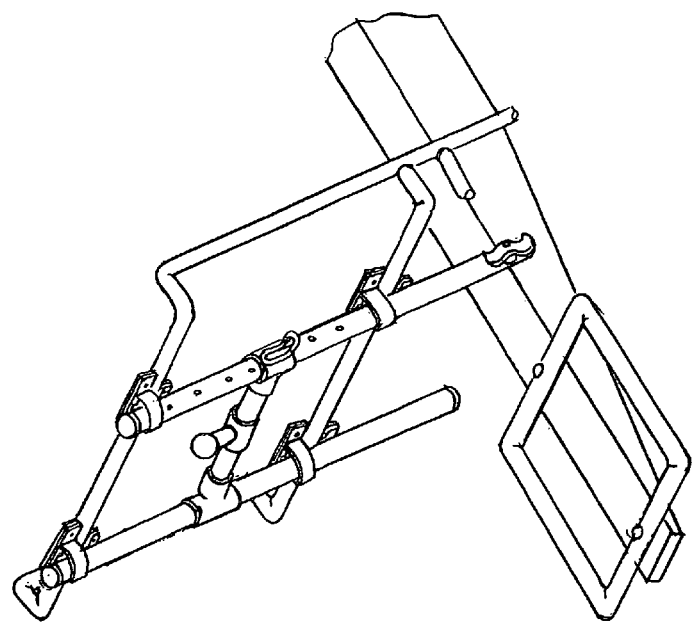
FIG. 54-A
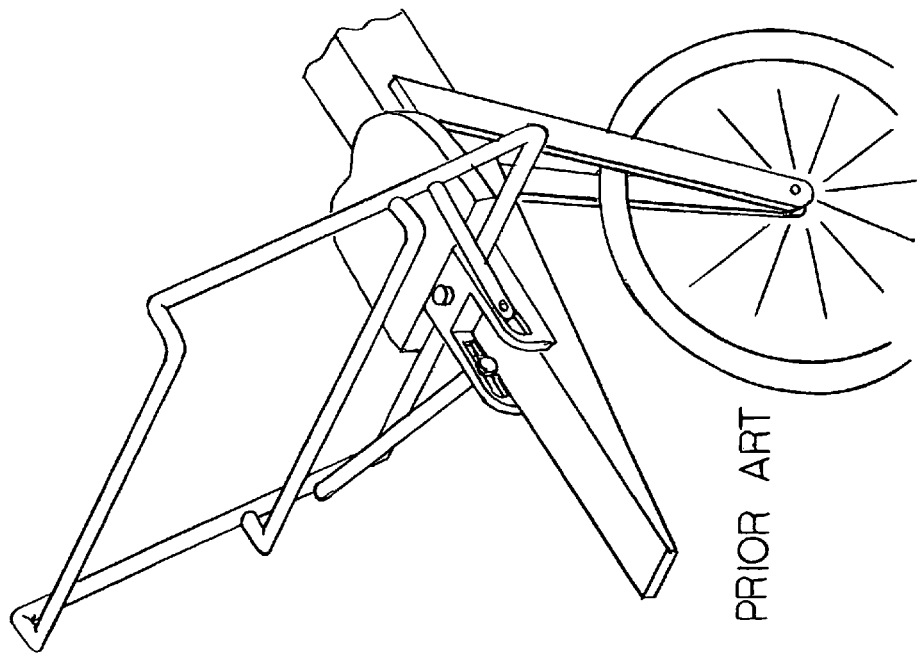
PRIOR ART
FIG. 54-X

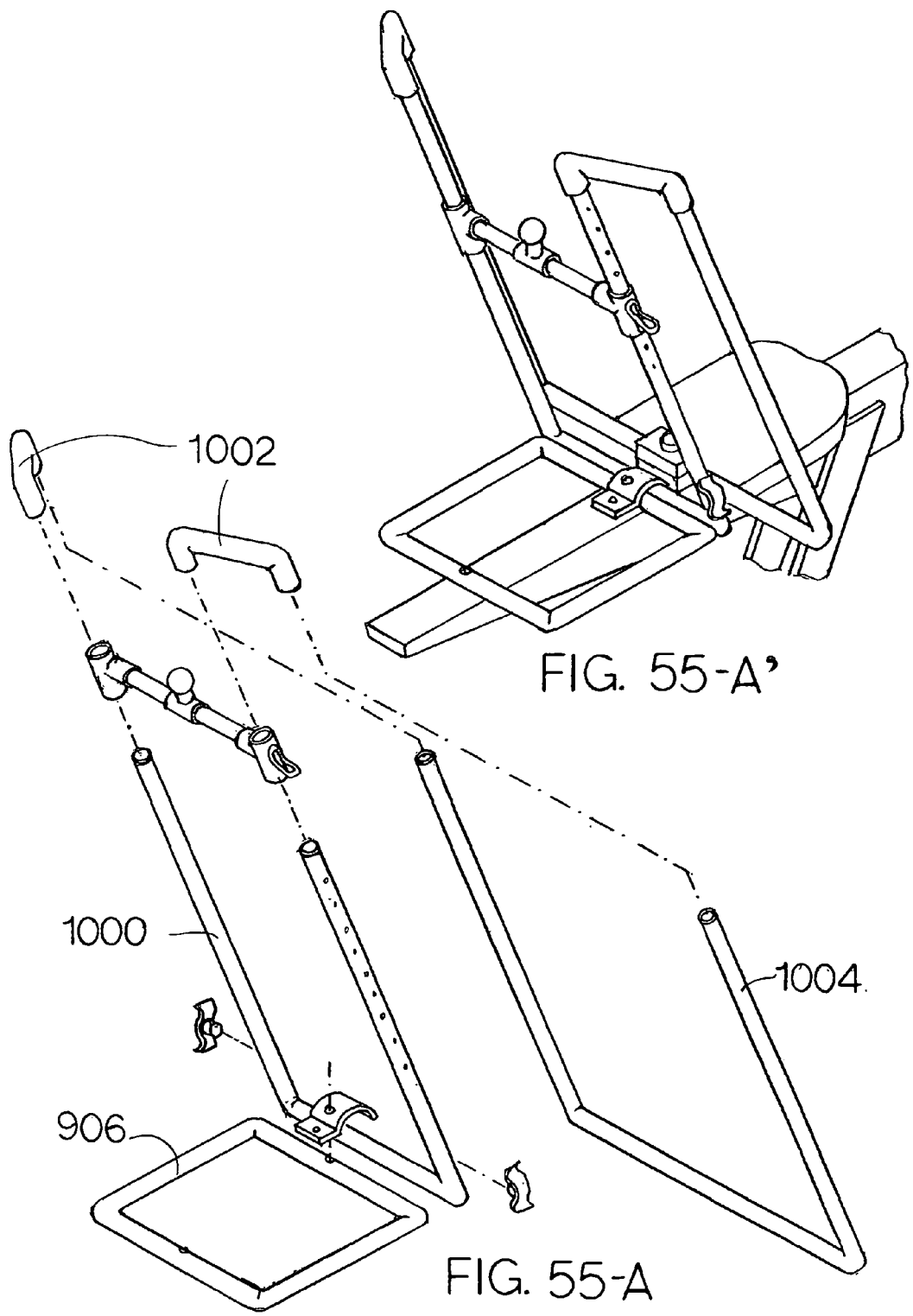

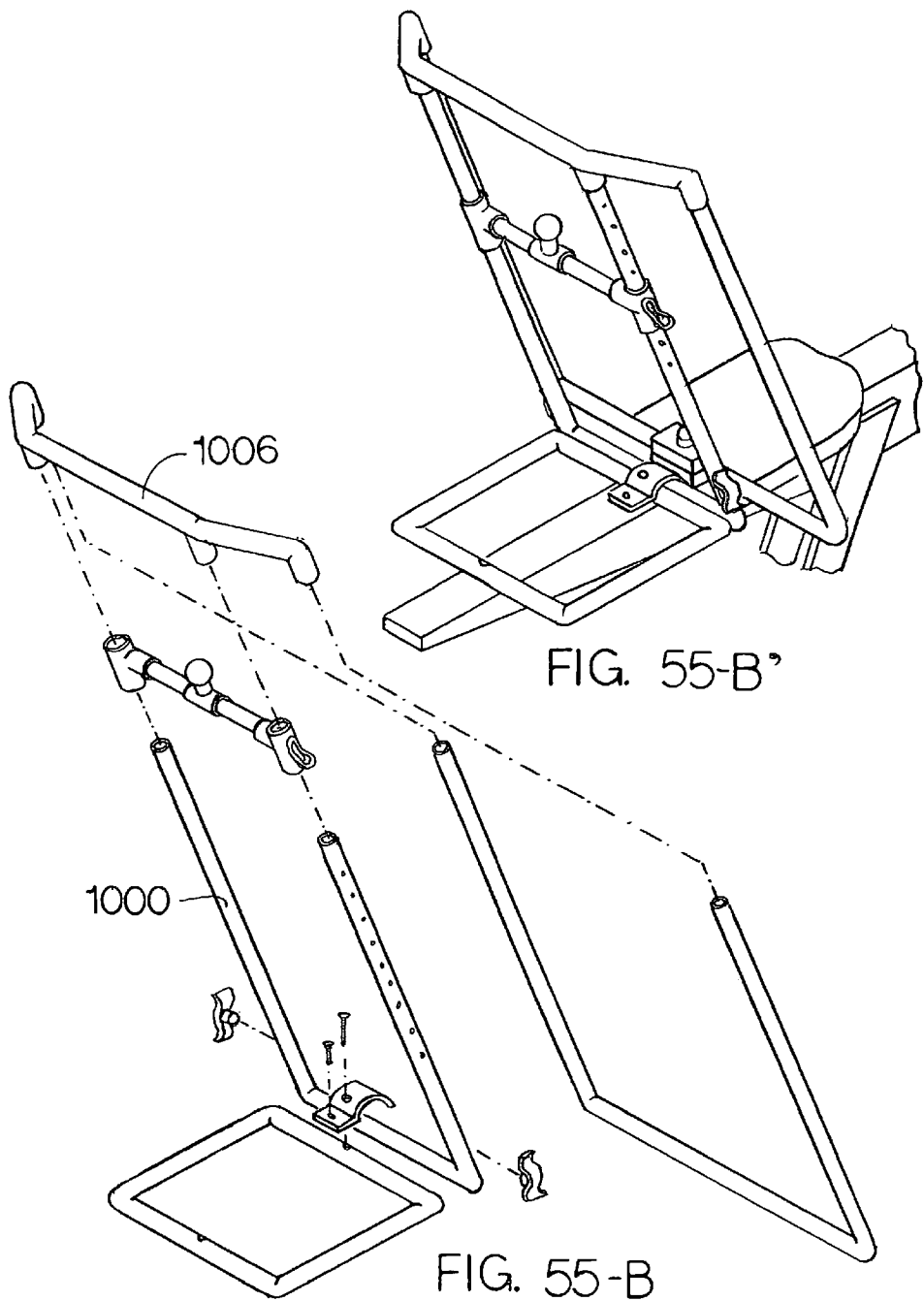
FIG. 55-B'
FIG. 55-B

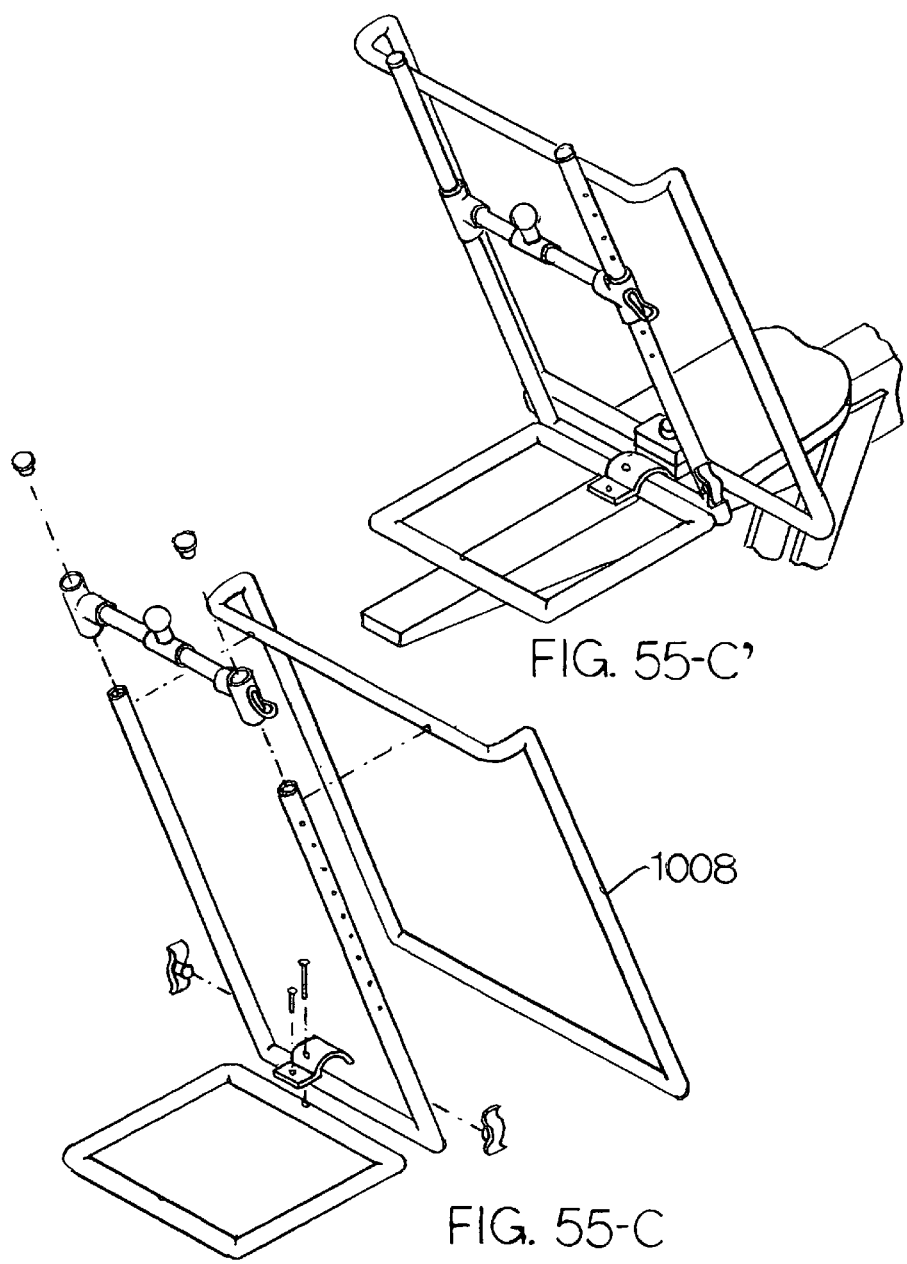
FIG. 55-C'
FIG. 55-C
1008

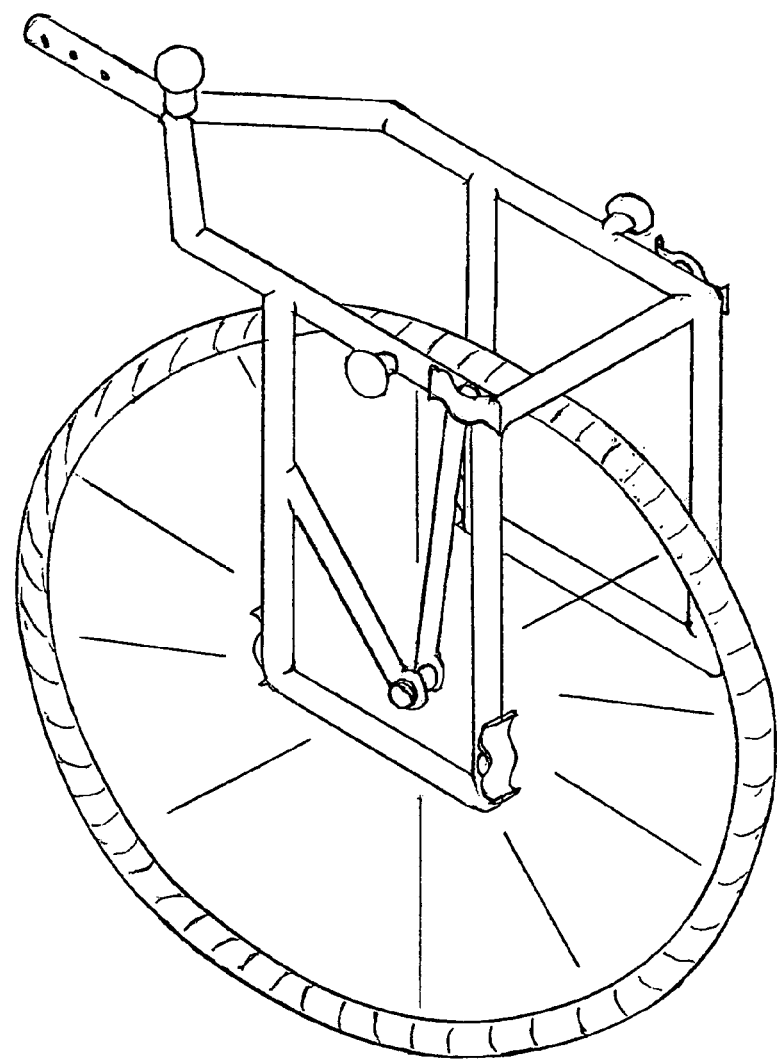
FIG. 55-D

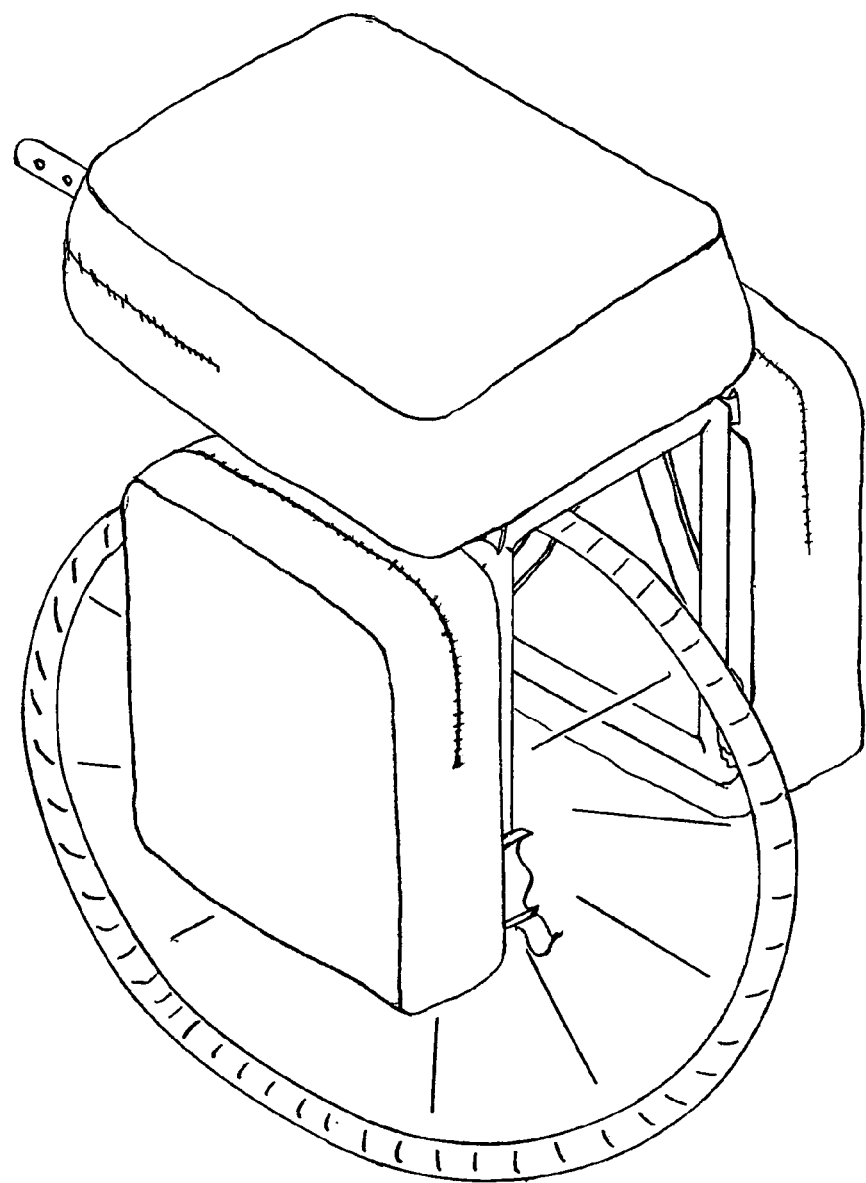
FIG. 55-D'

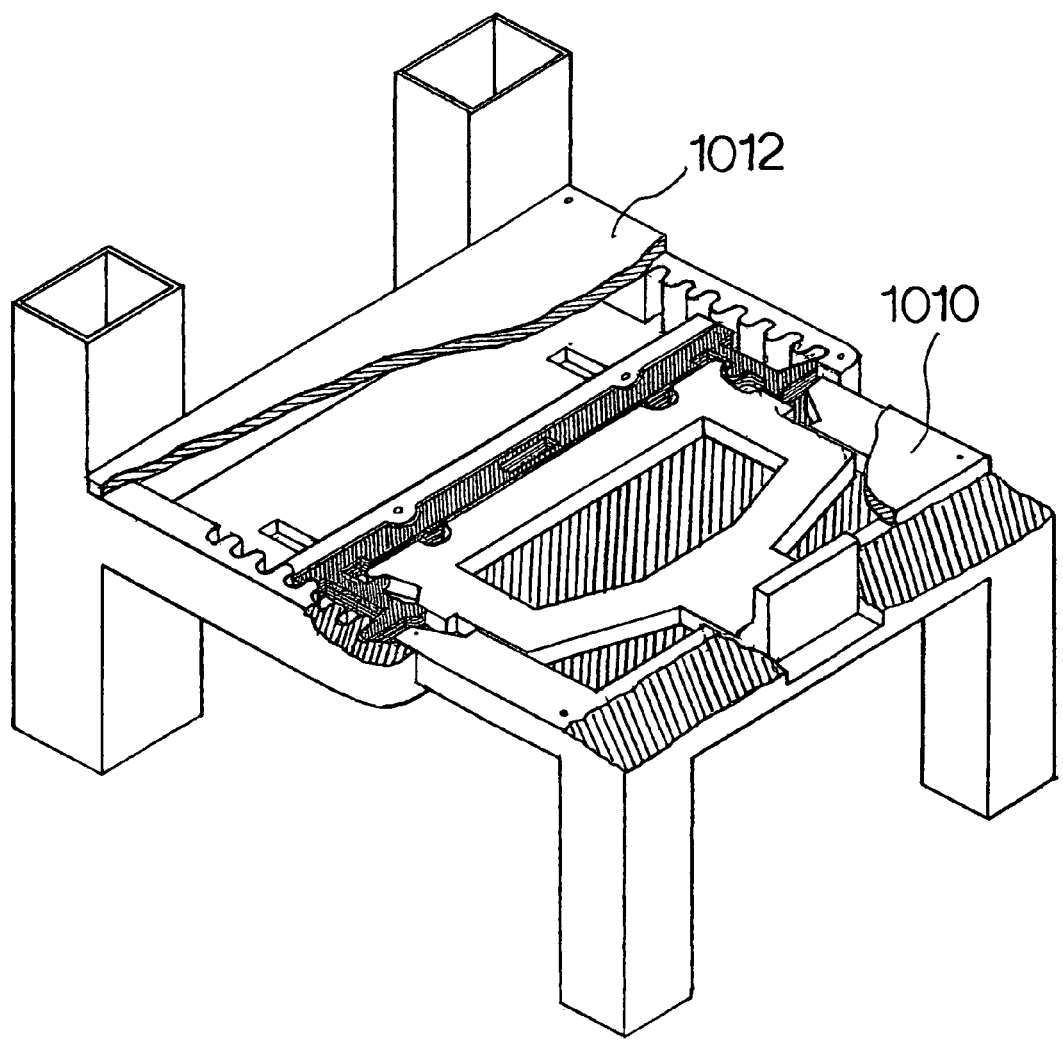
FIG. 56-A

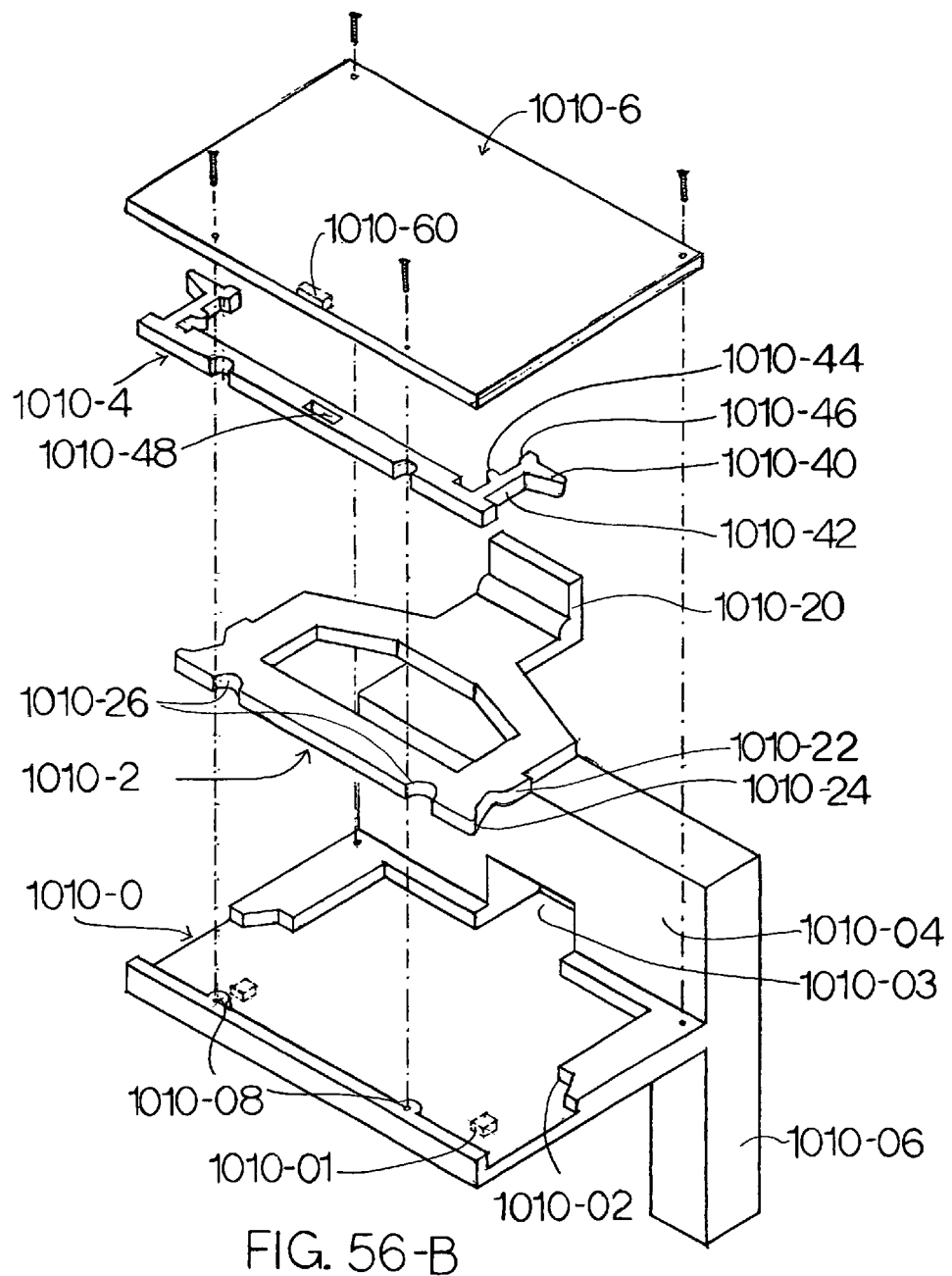
FIG. 56-B

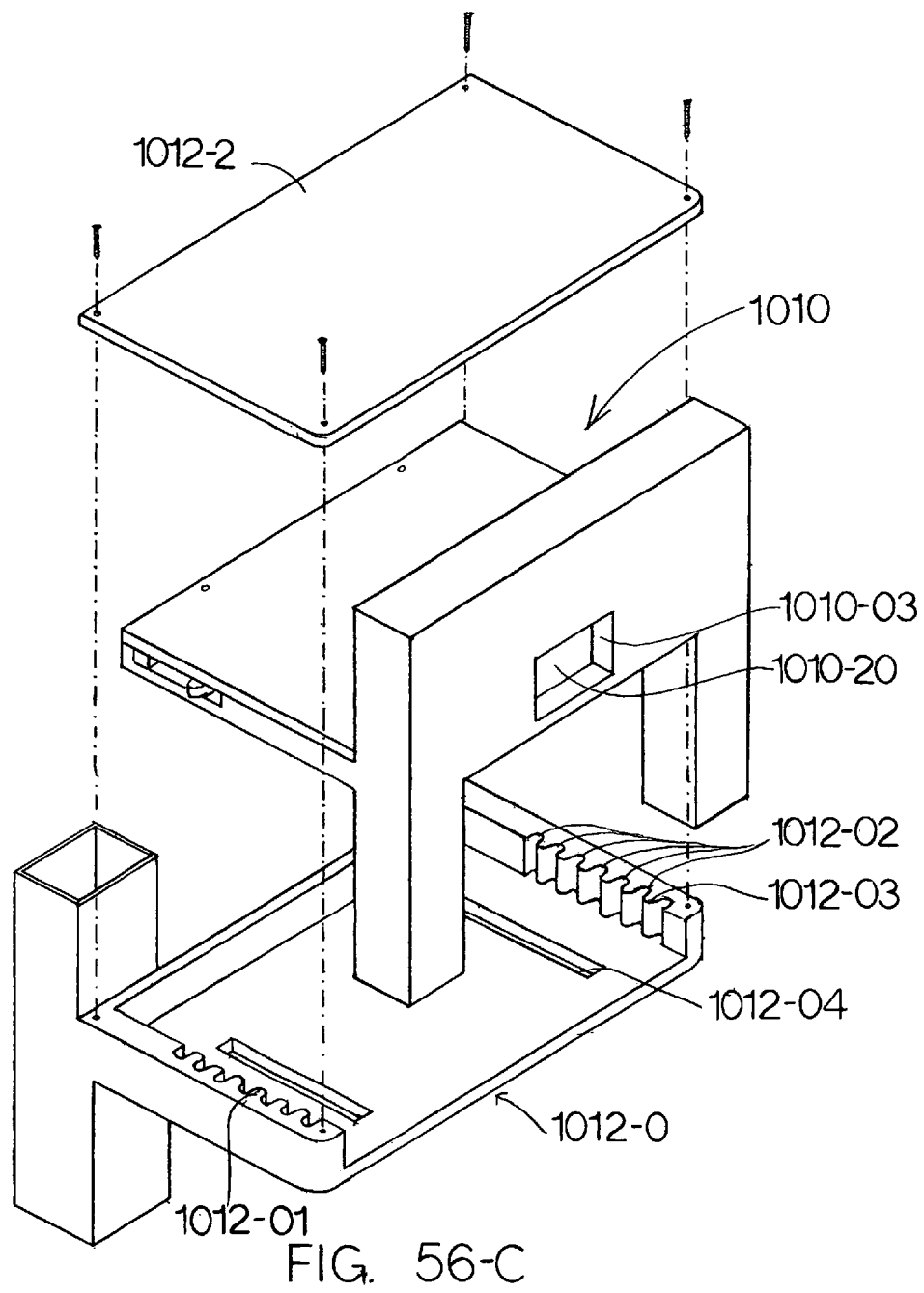
FIG. 56-C

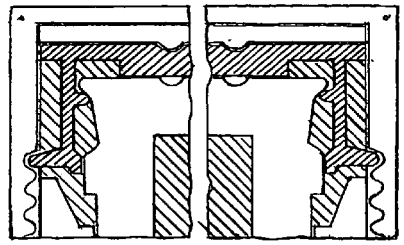
FIG. 56-D1
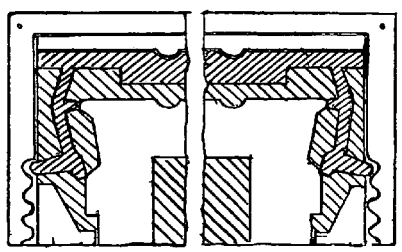
FIG. 56-D2
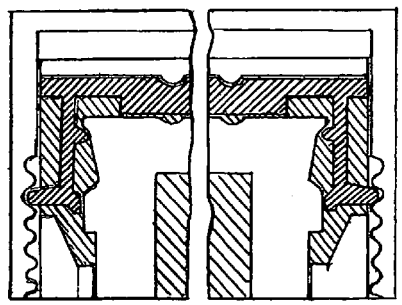
FIG. 56-D7
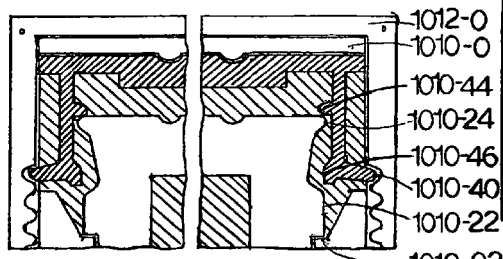
FIG. 56-D3
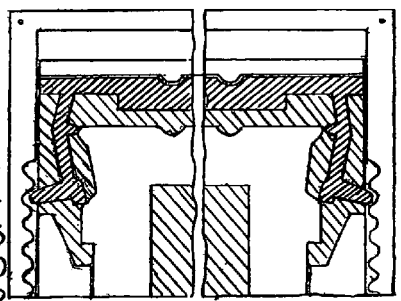
FIG. 56-D6
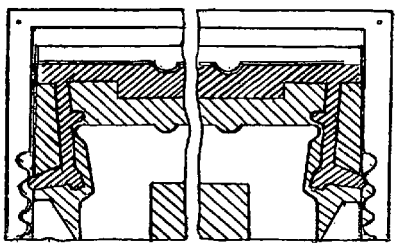
FIG. 56-D4
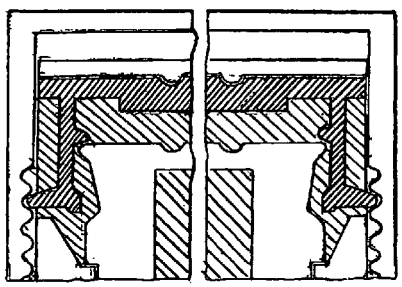
FIG. 56-D5

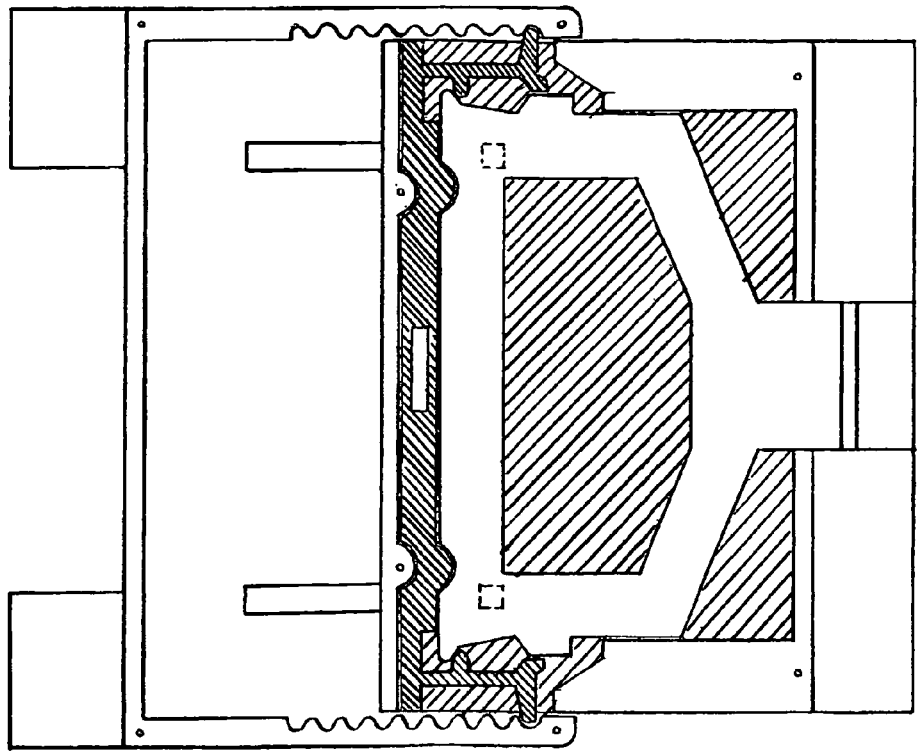
FIG. 56-E'
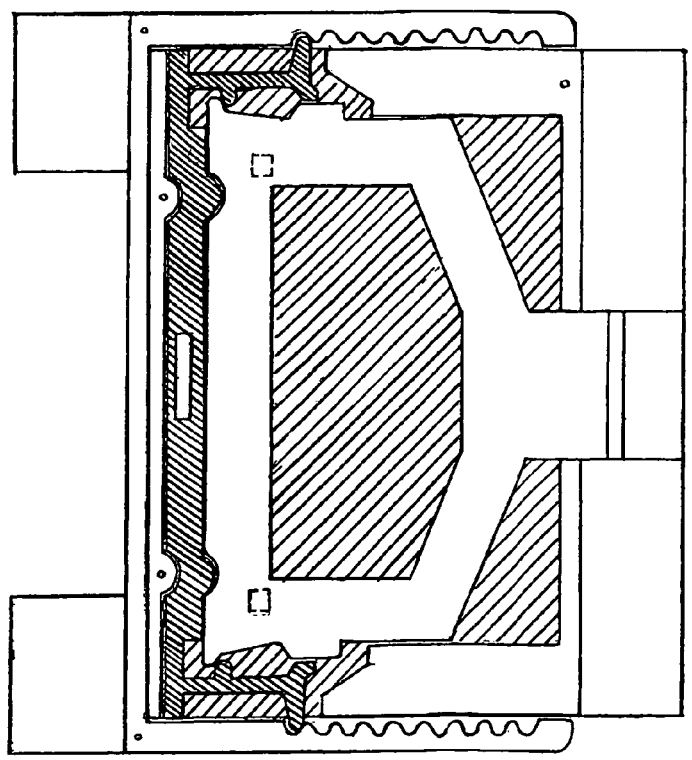
FIG. 56-E

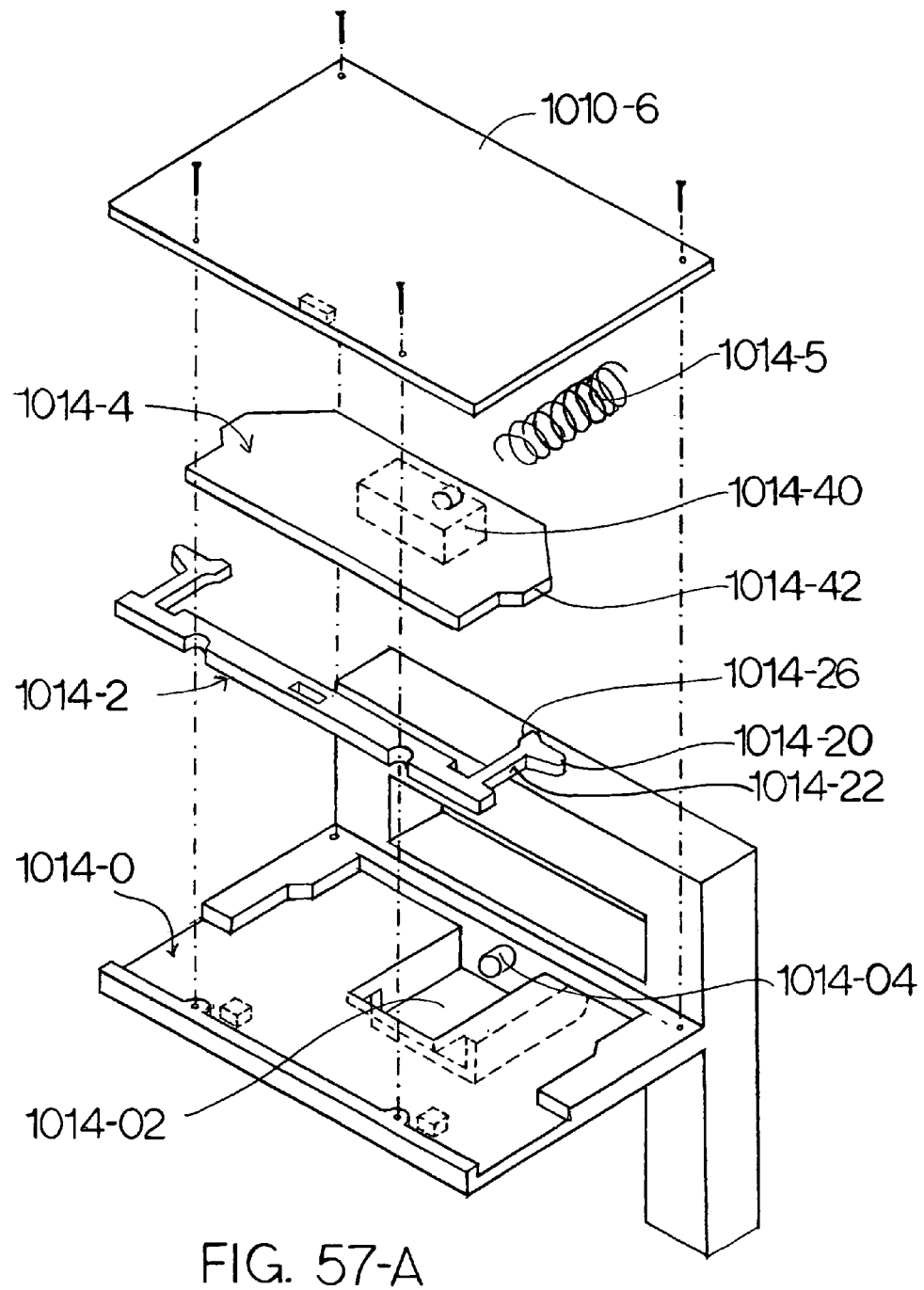
FIG. 57-A

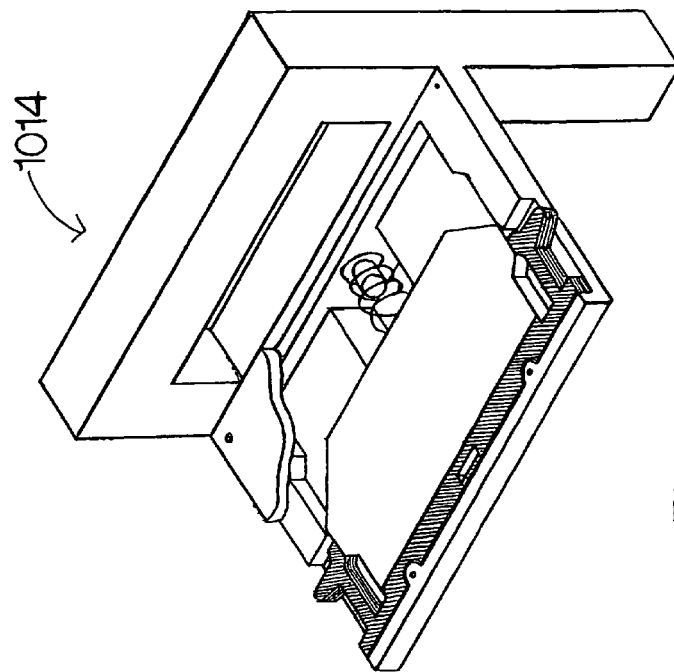
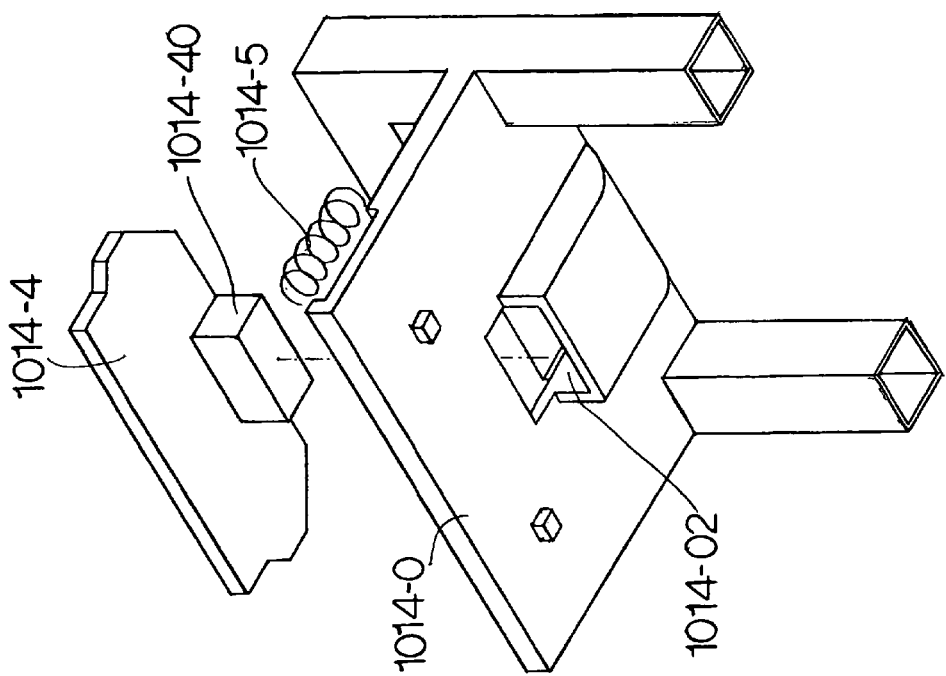
FIG. 57-B
FIG. 57-A'

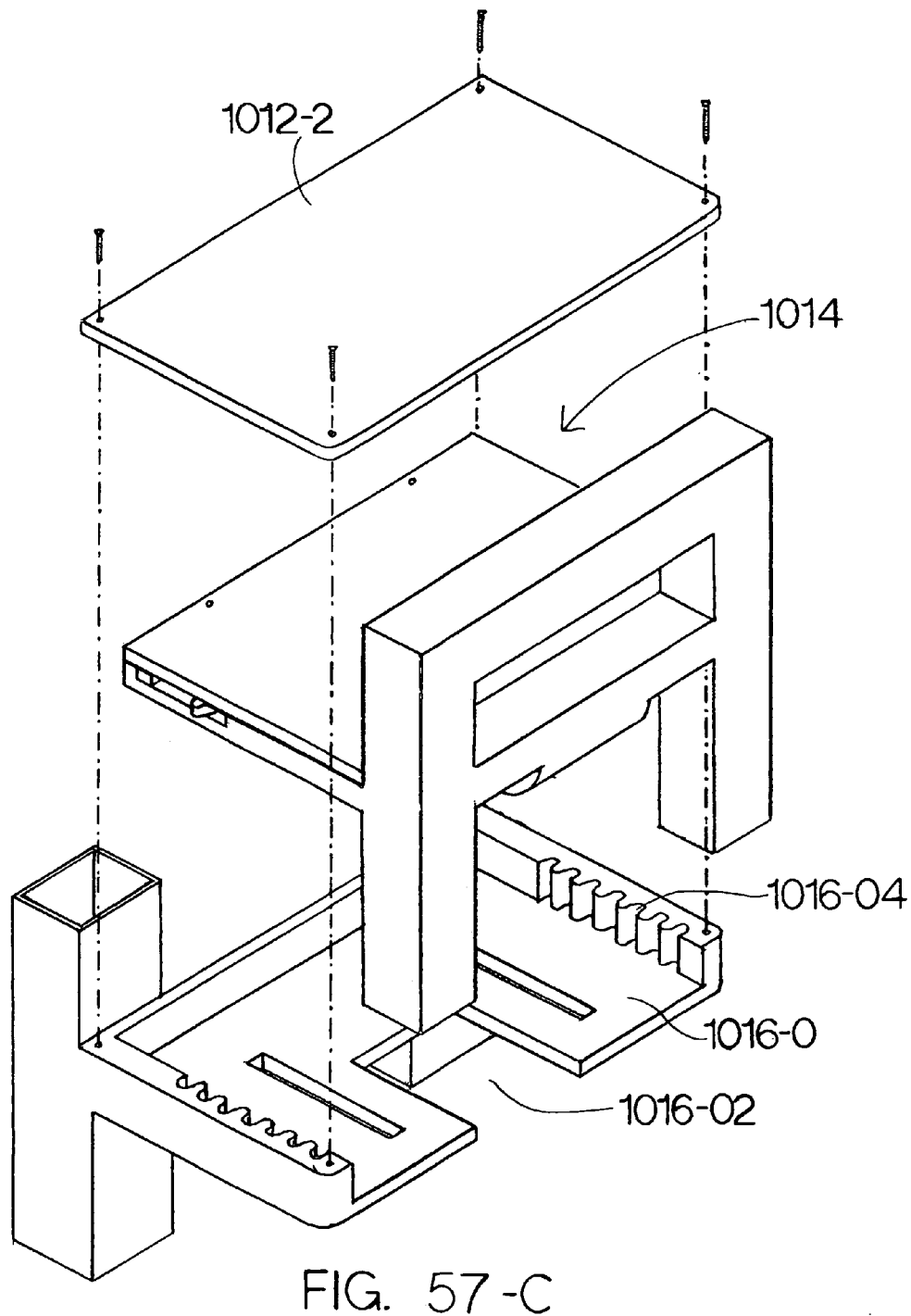
FIG. 57-C

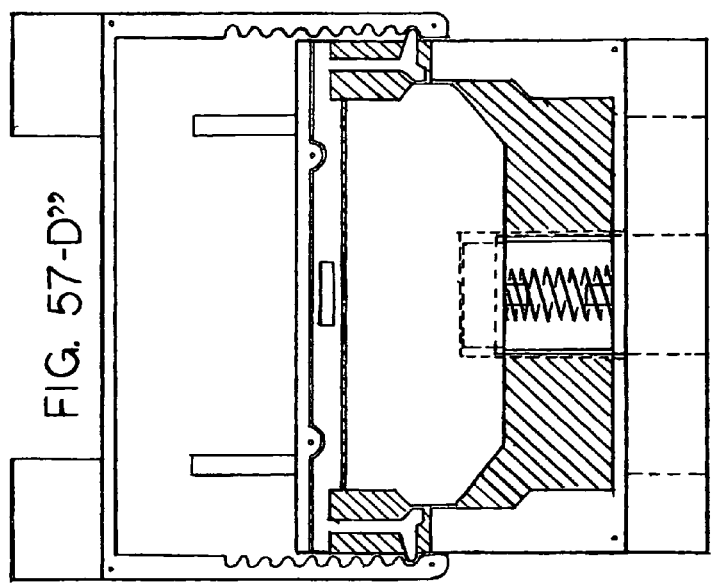
FIG. 57-D"
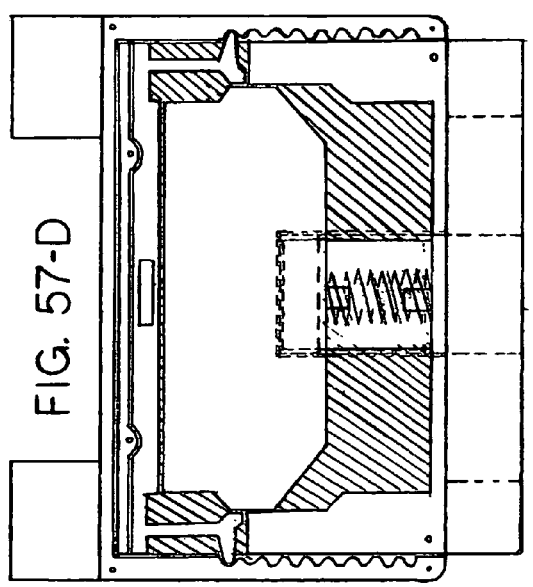
FIG. 57-D
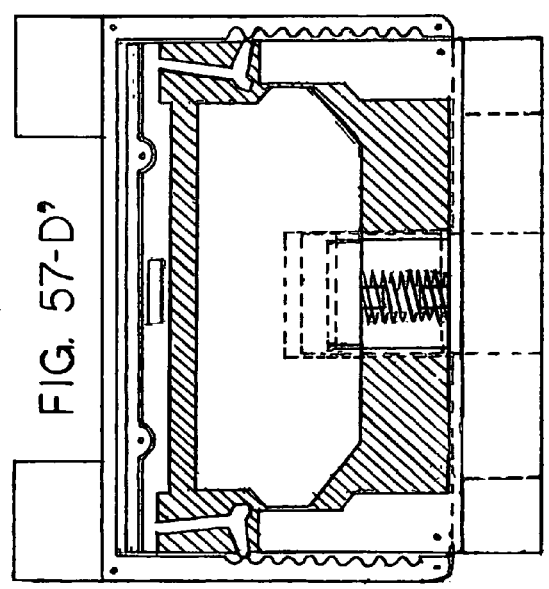
FIG. 57-D'

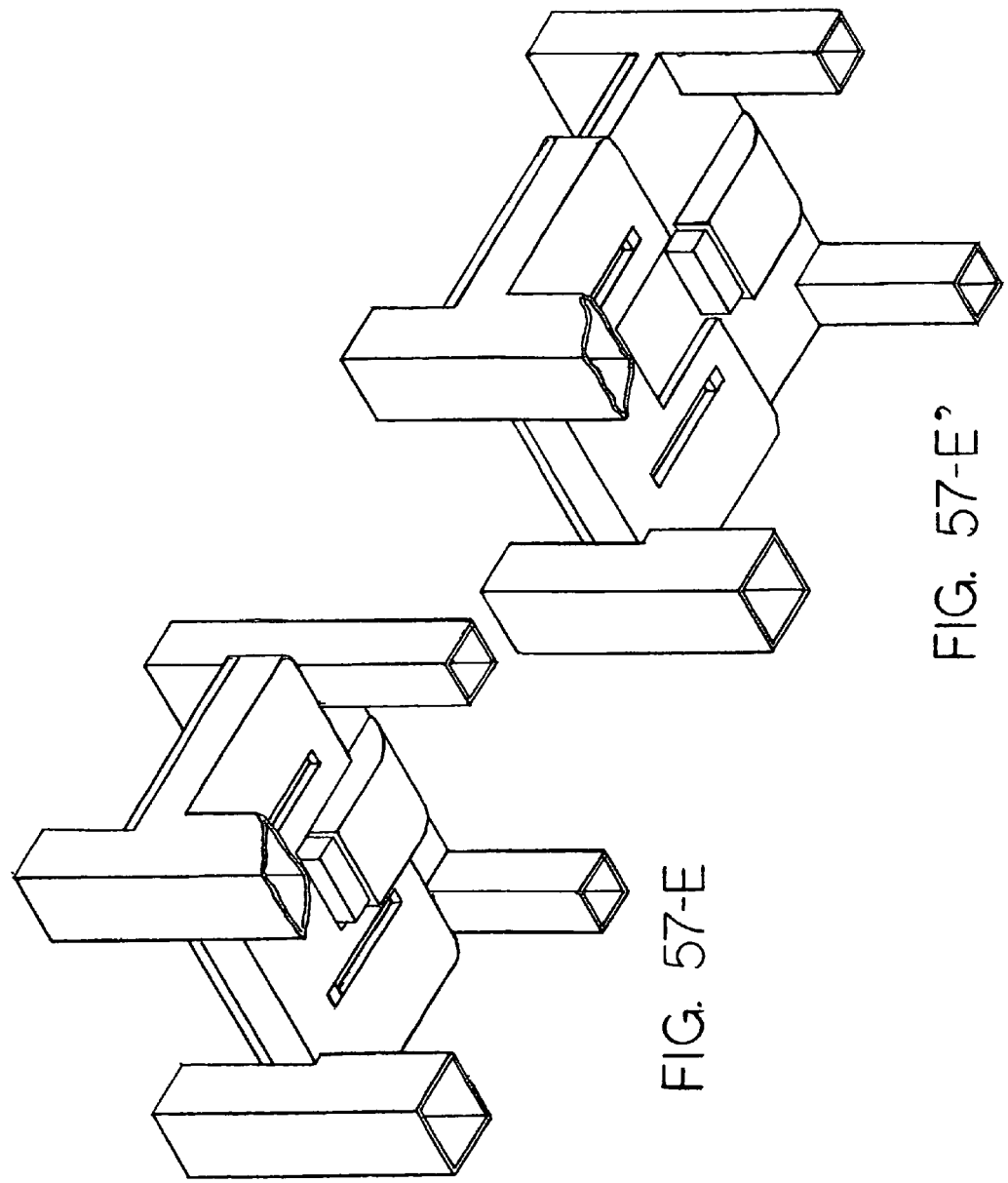

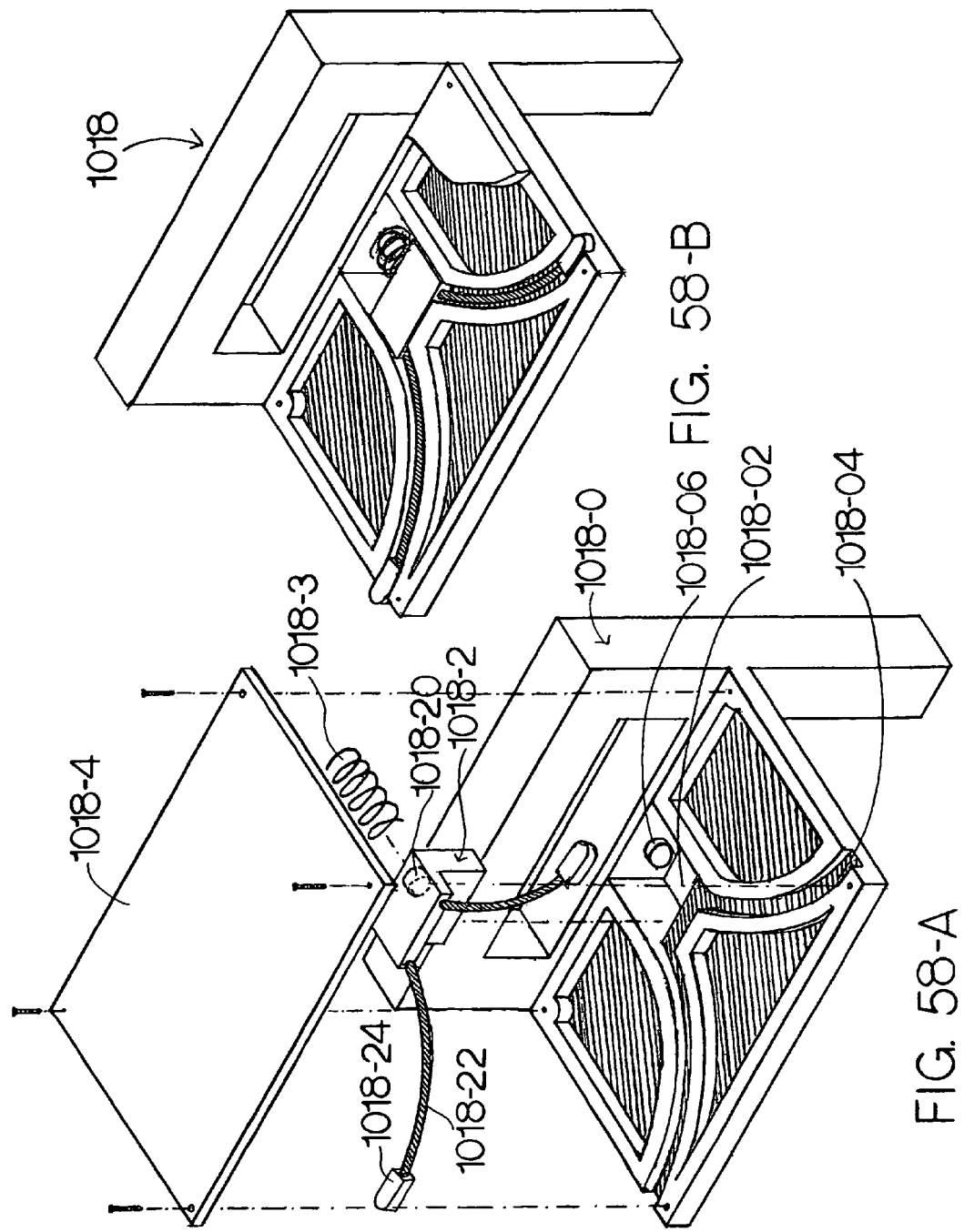
FIG. 58-A   FIG. 58-B

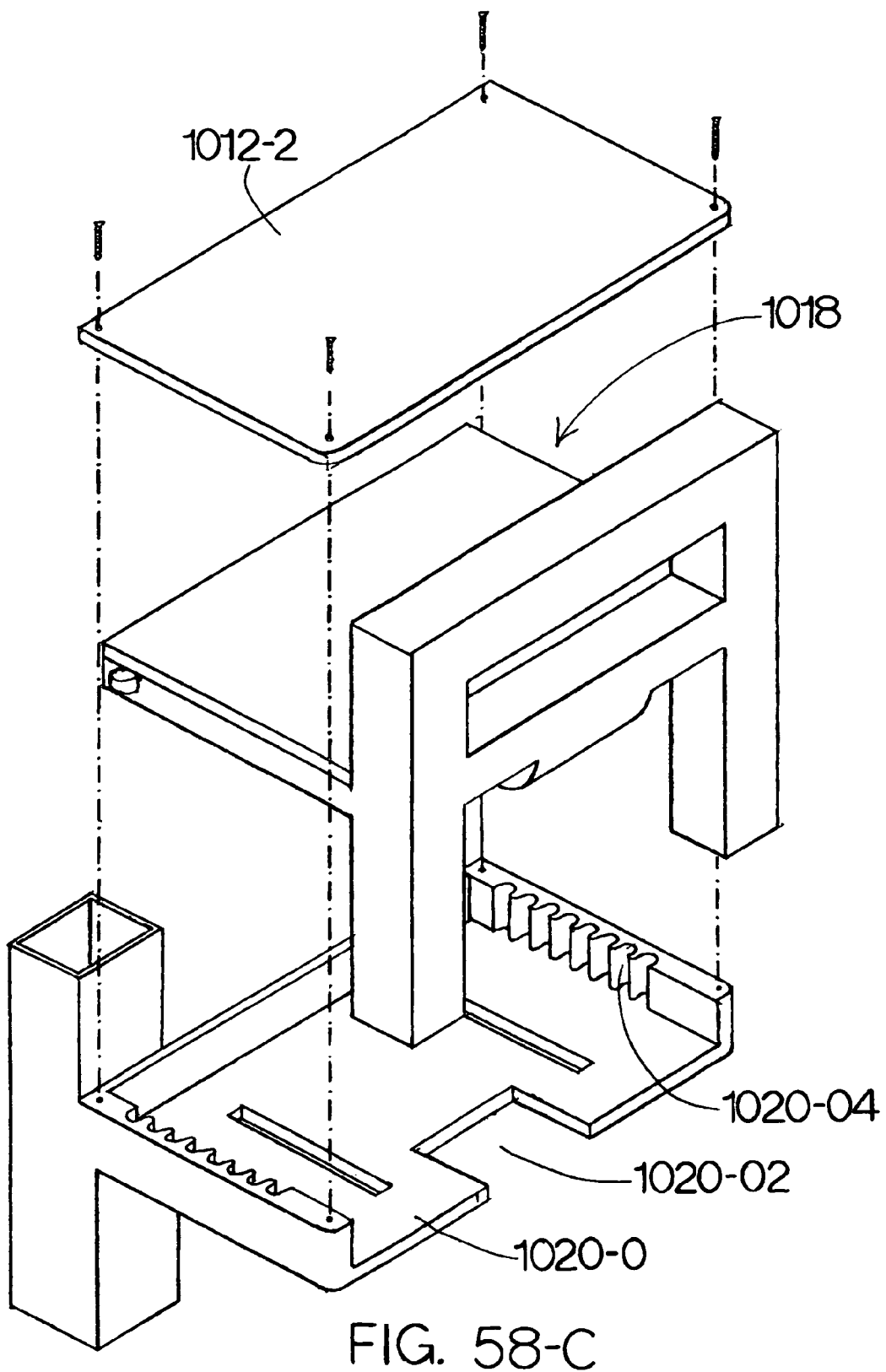
FIG. 58-C

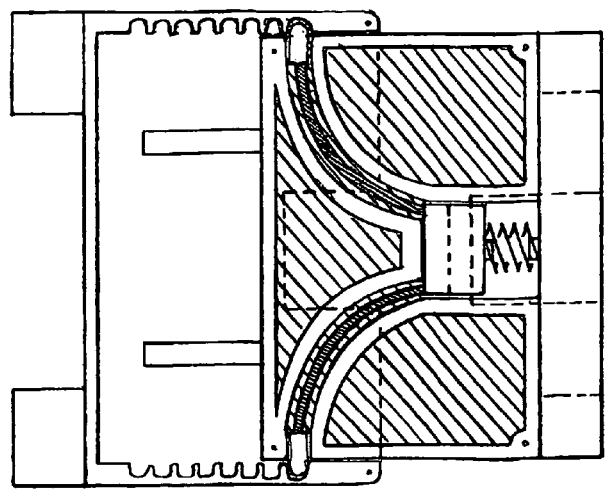
FIG. 58-D''
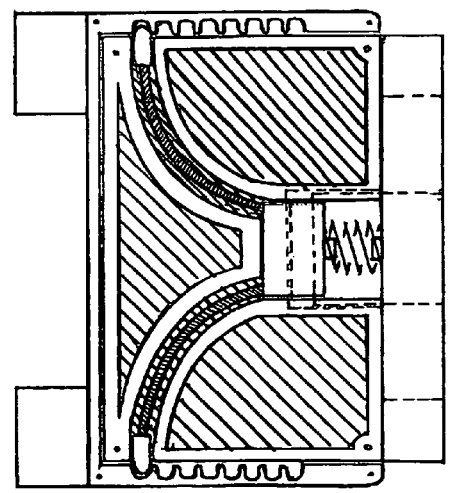
FIG. 58-D
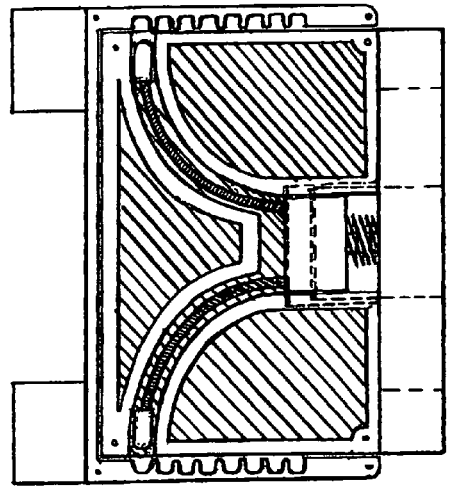
FIG. 58-D'

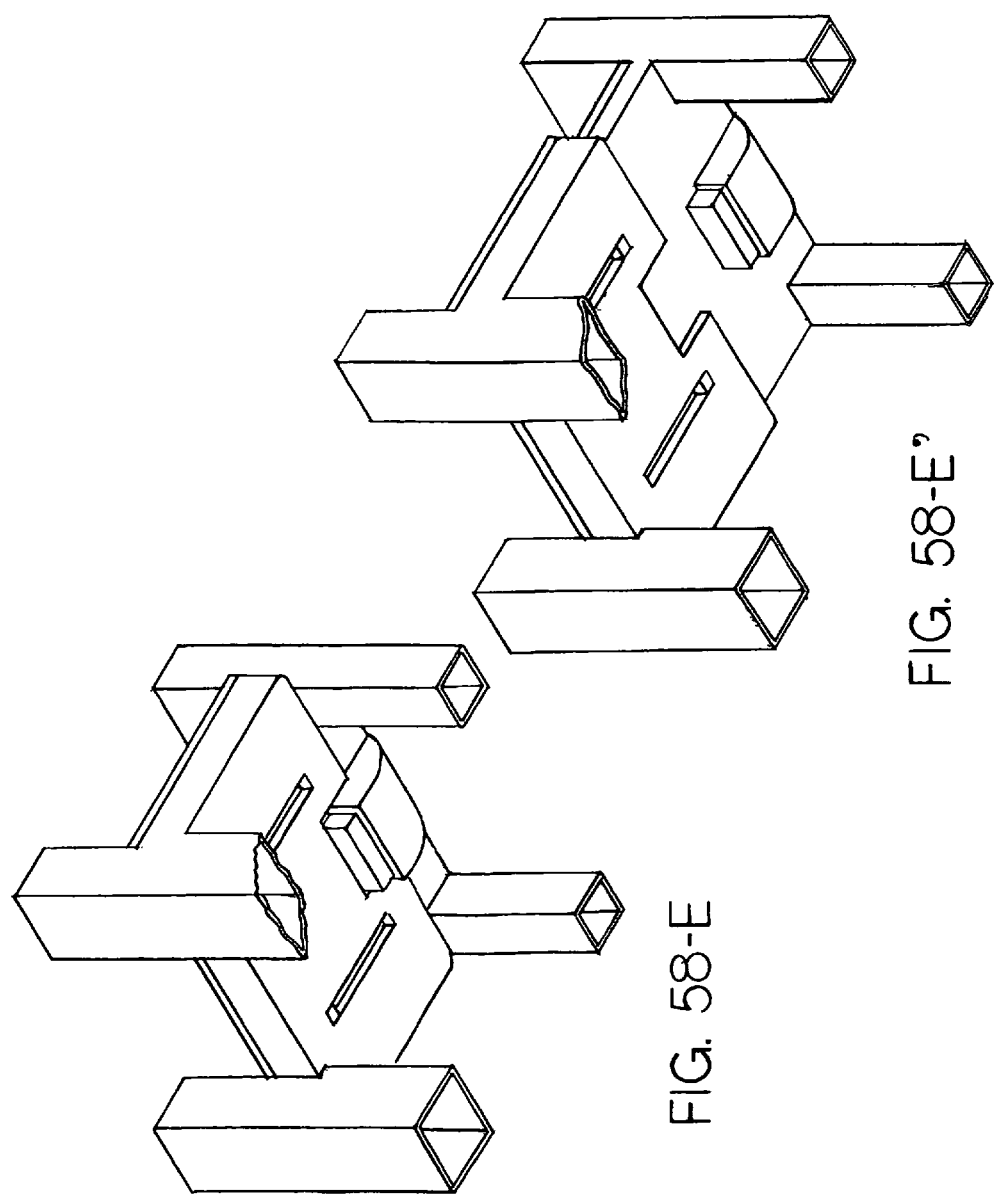
FIG. 58-E
FIG. 58-E'

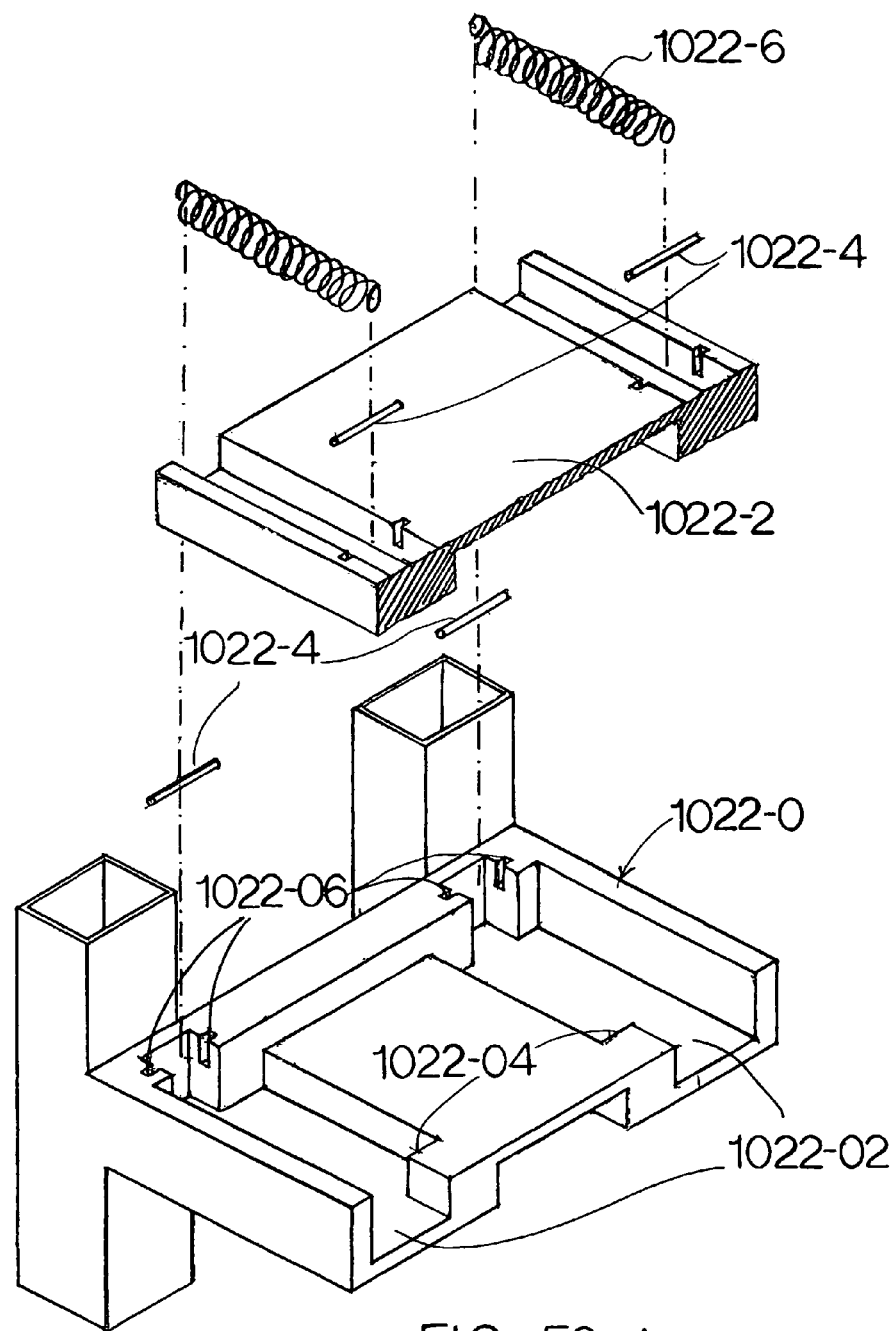
FIG. 59-A

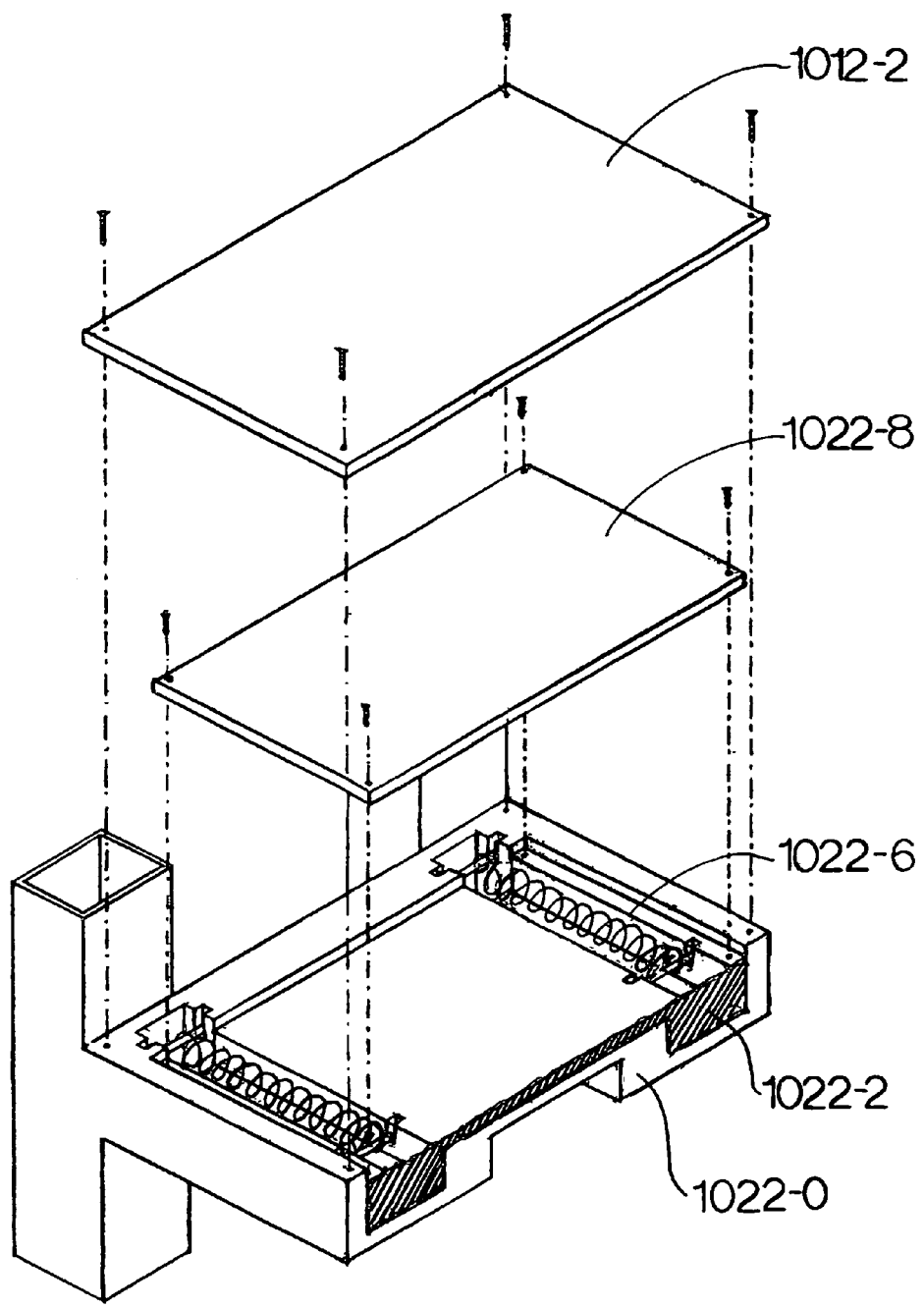
FIG. 59-A'

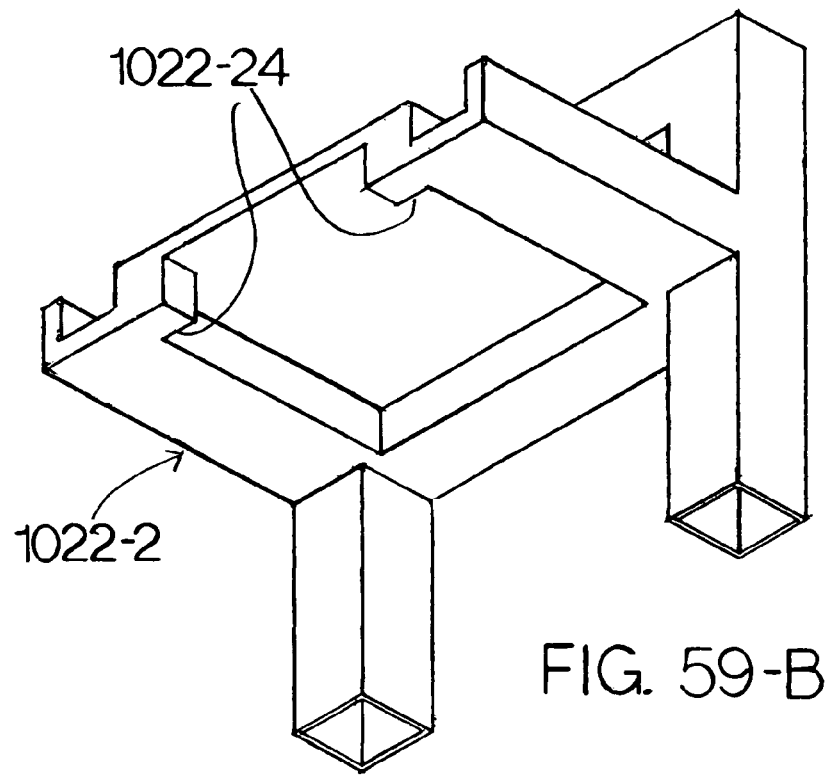
FIG. 59-B
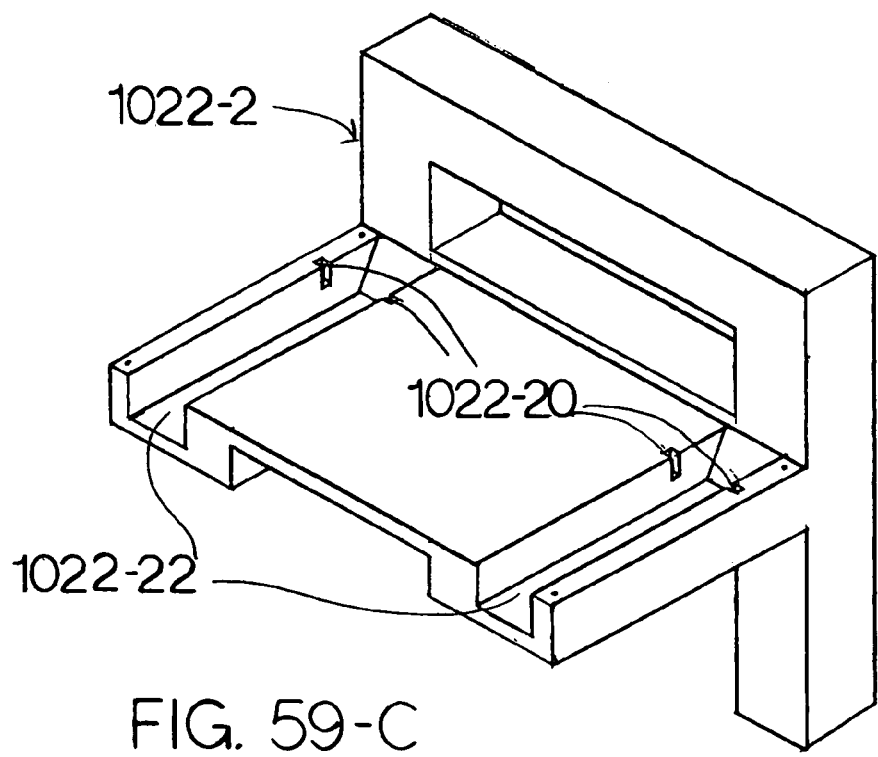
FIG. 59-C

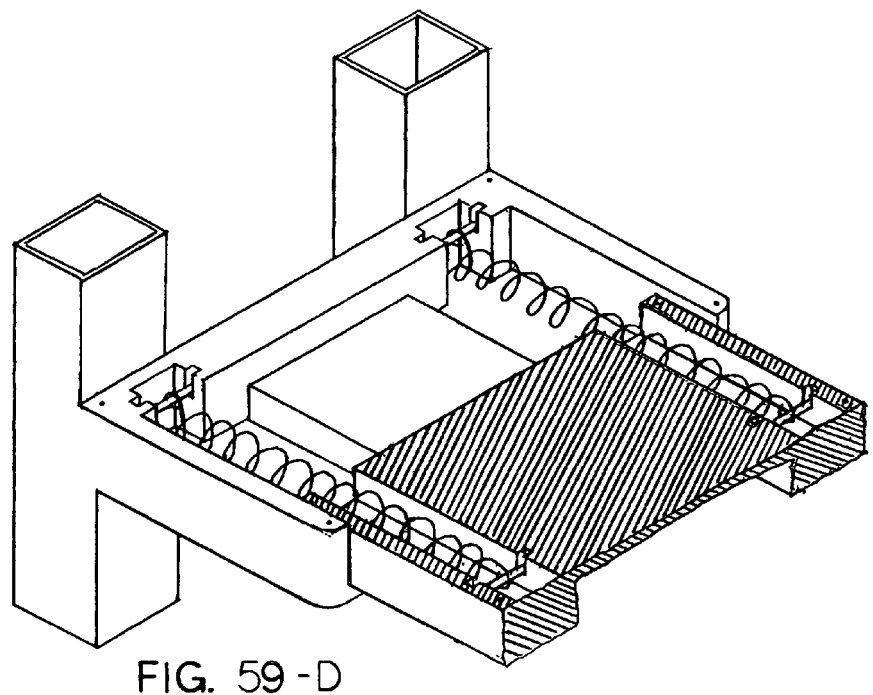
FIG. 59-D
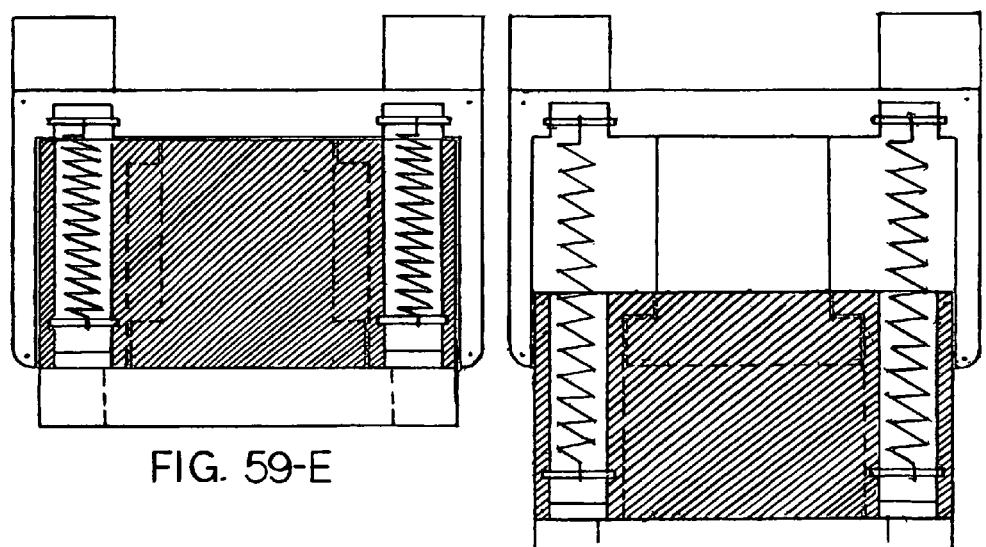
FIG. 59-E
FIG. 59-E'

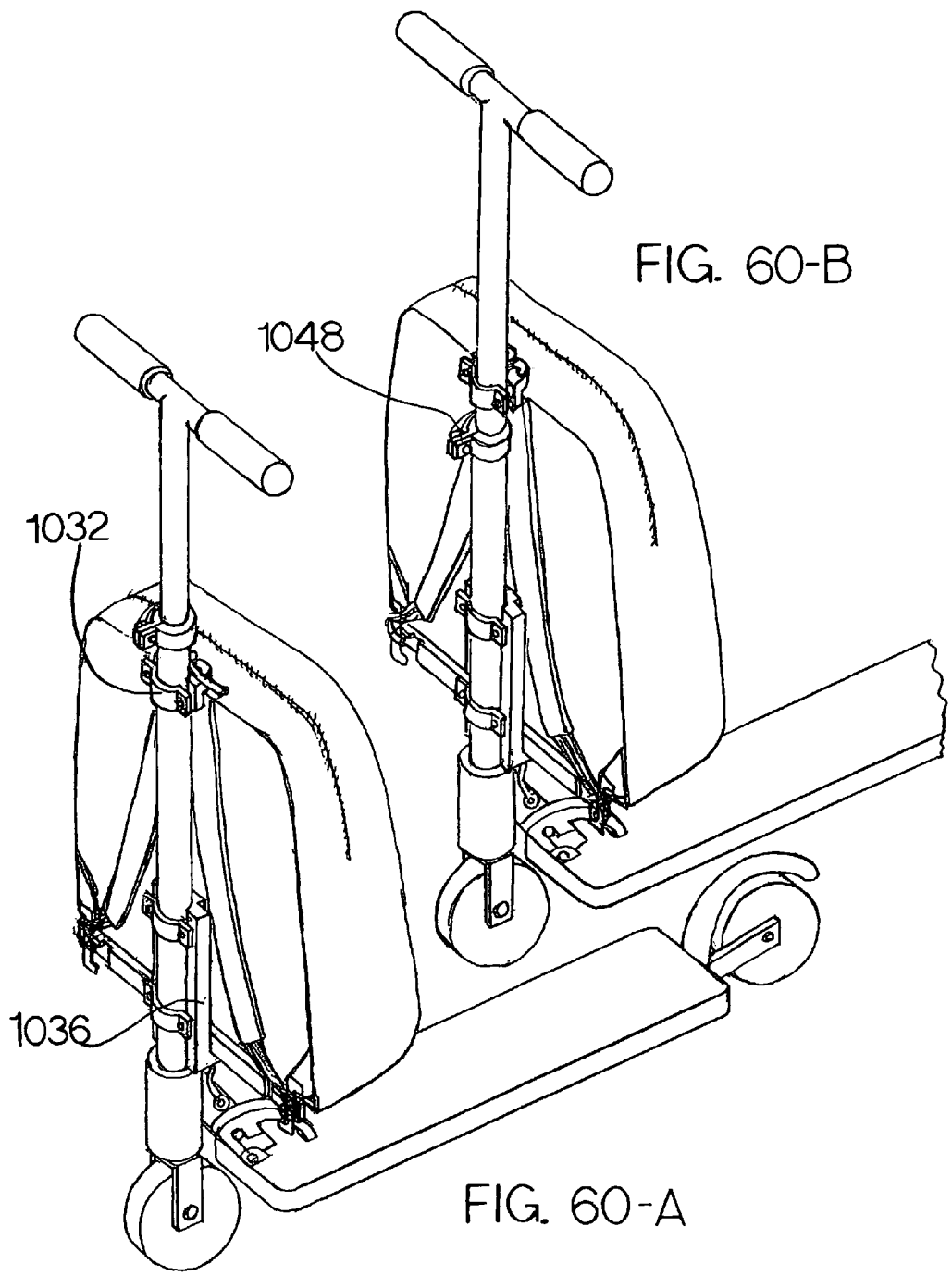
FIG. 60-B
FIG. 60-A

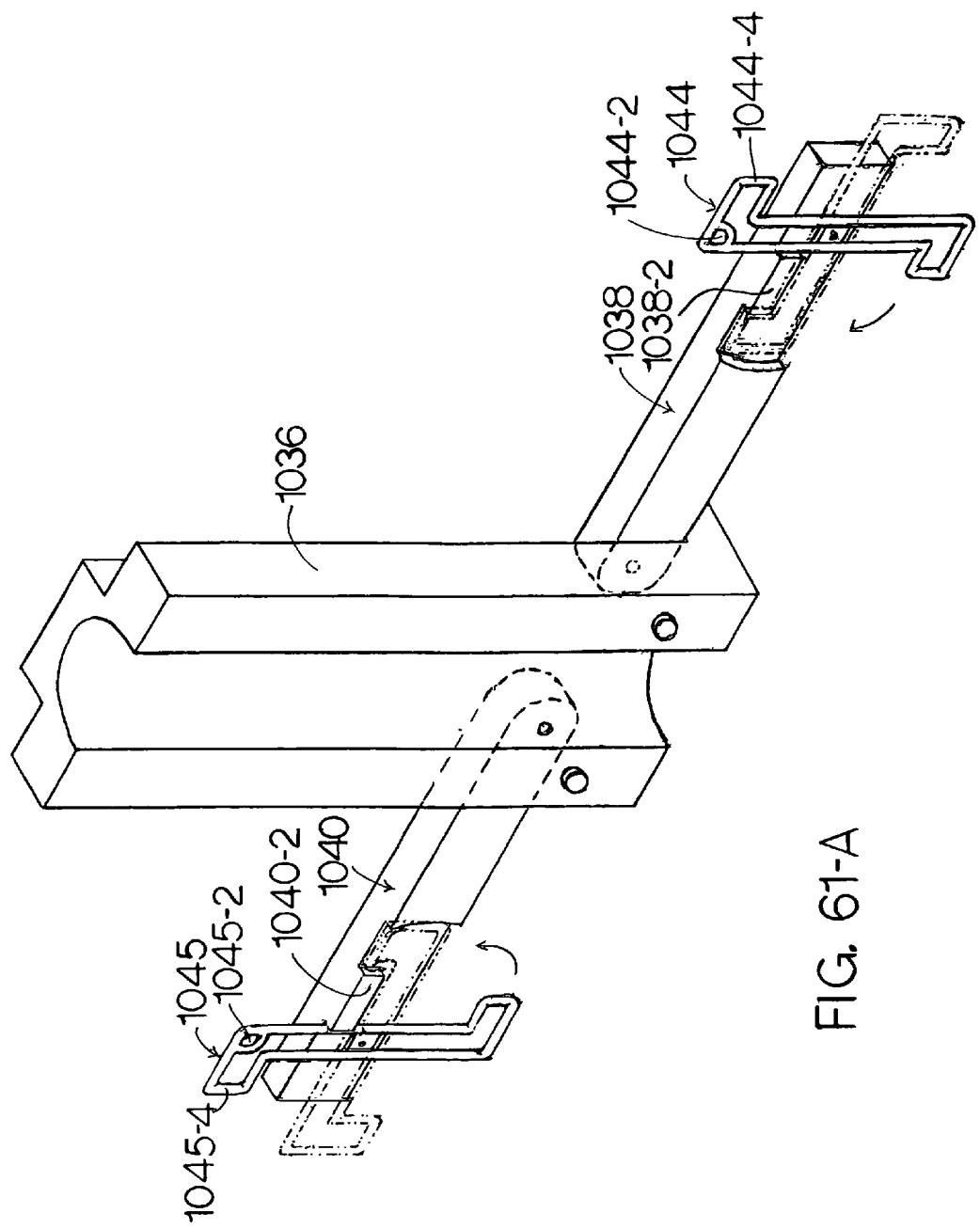
FIG. 61-A

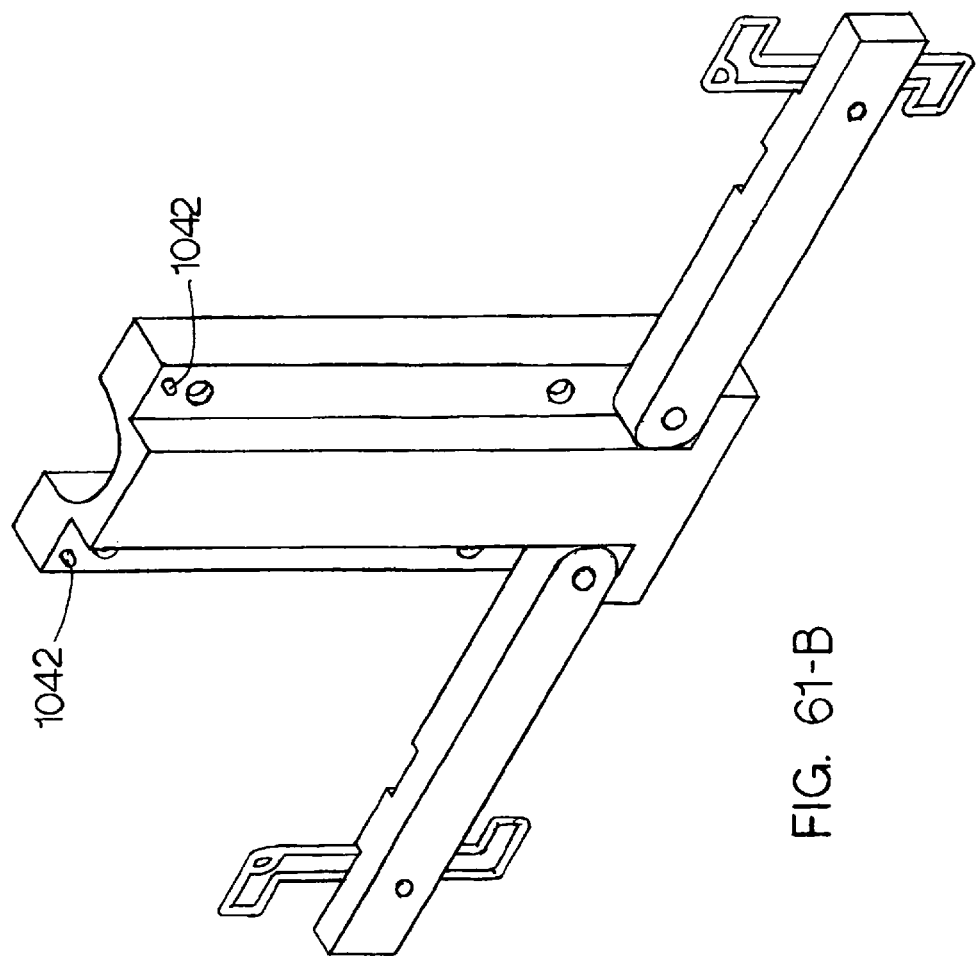
FIG. 61-B

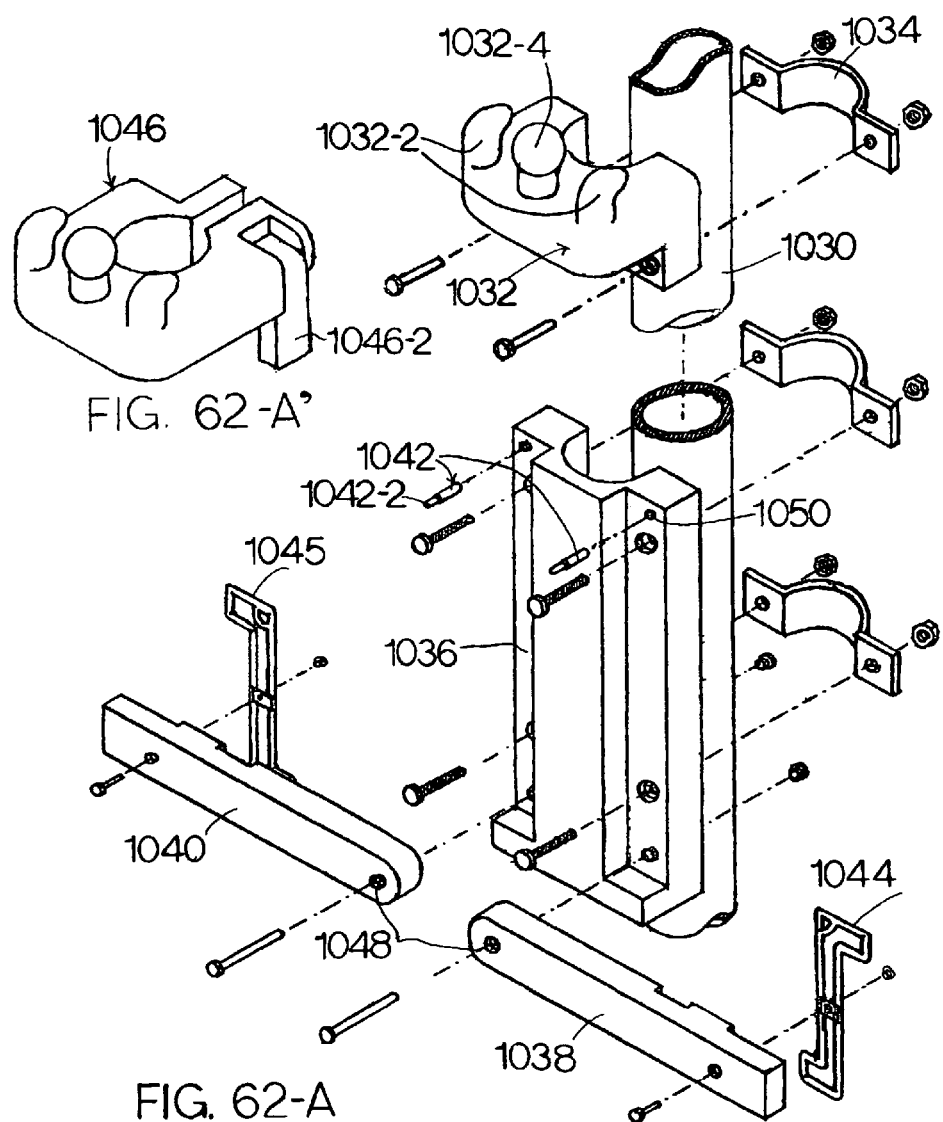
FIG. 62-A'
FIG. 62-A

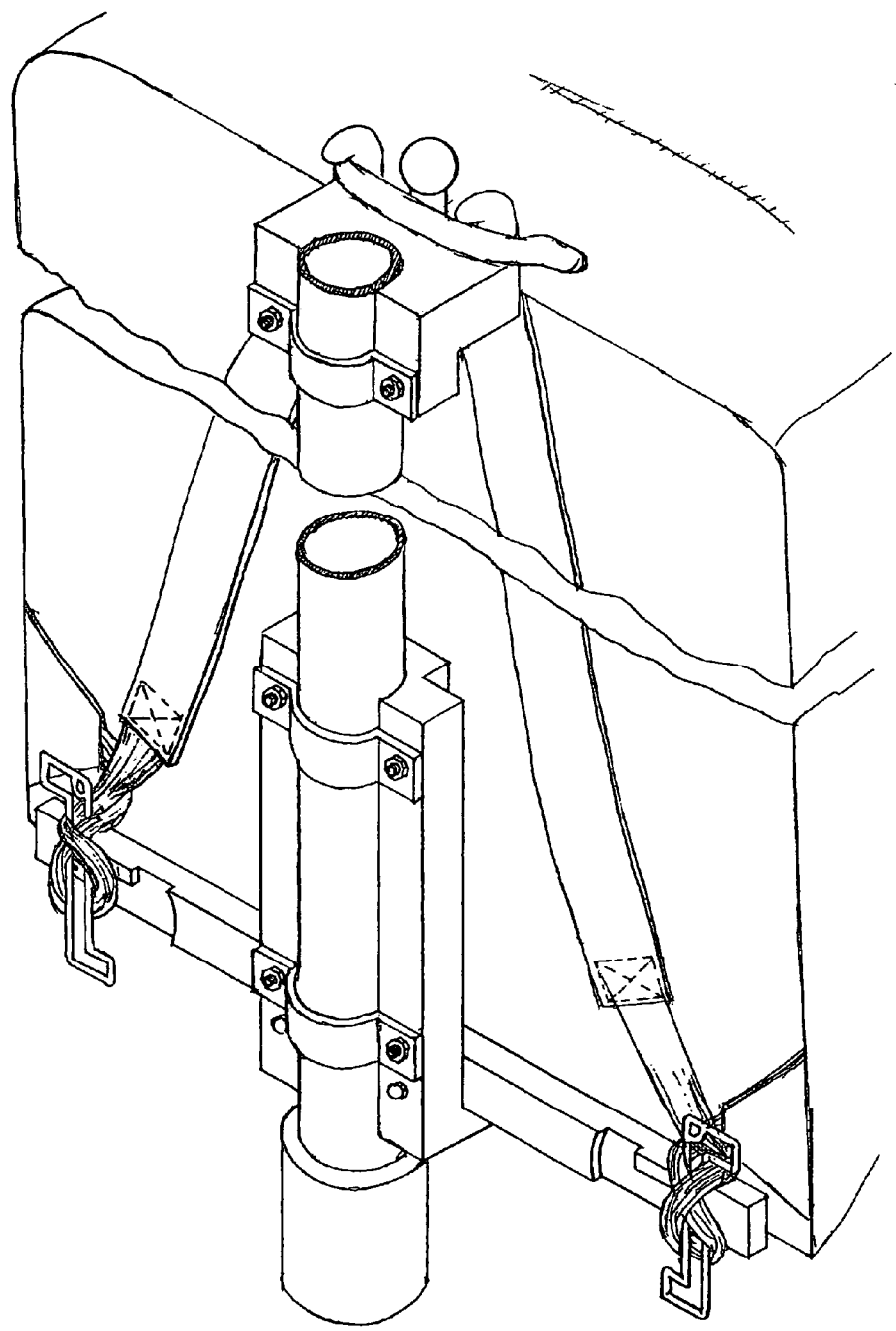
FIG. 62-B

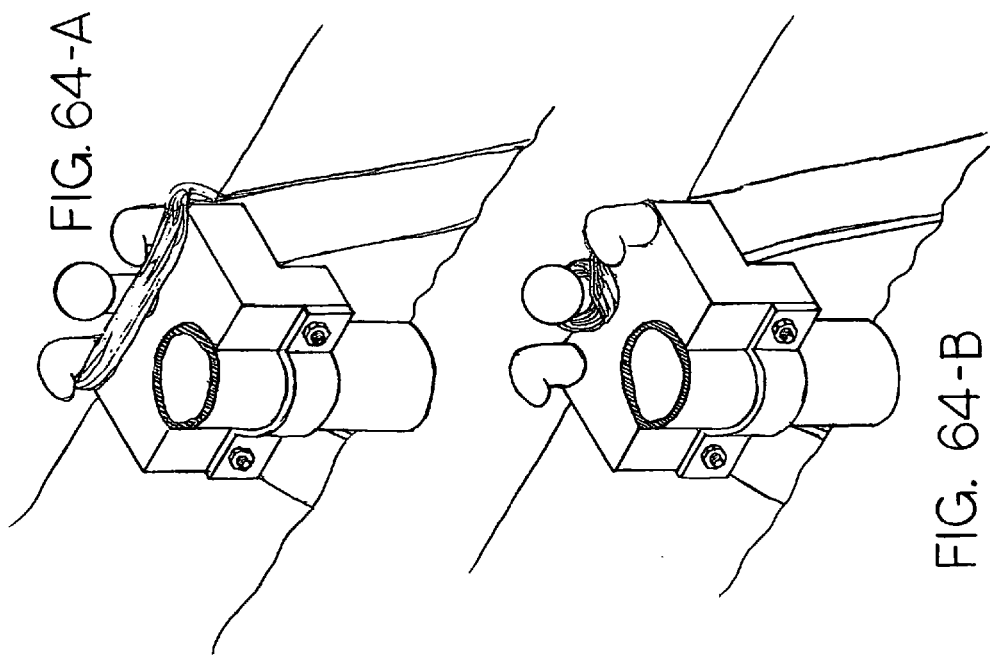
FIG. 64-A
FIG. 64-B
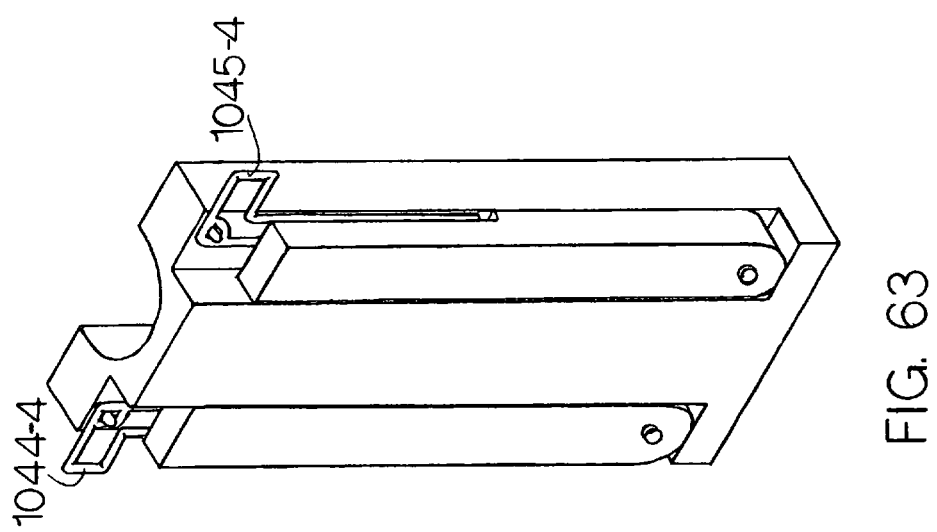
FIG. 63

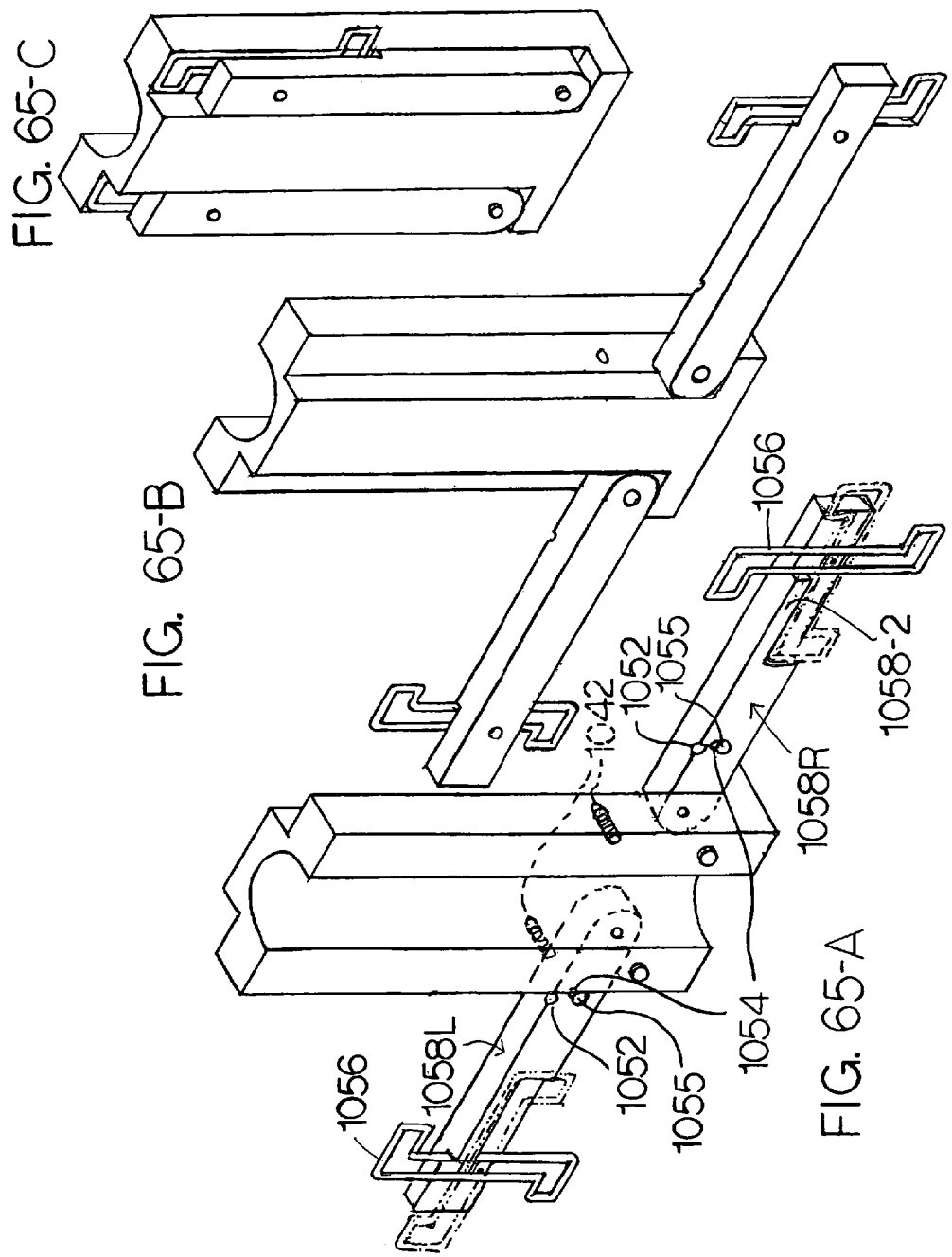

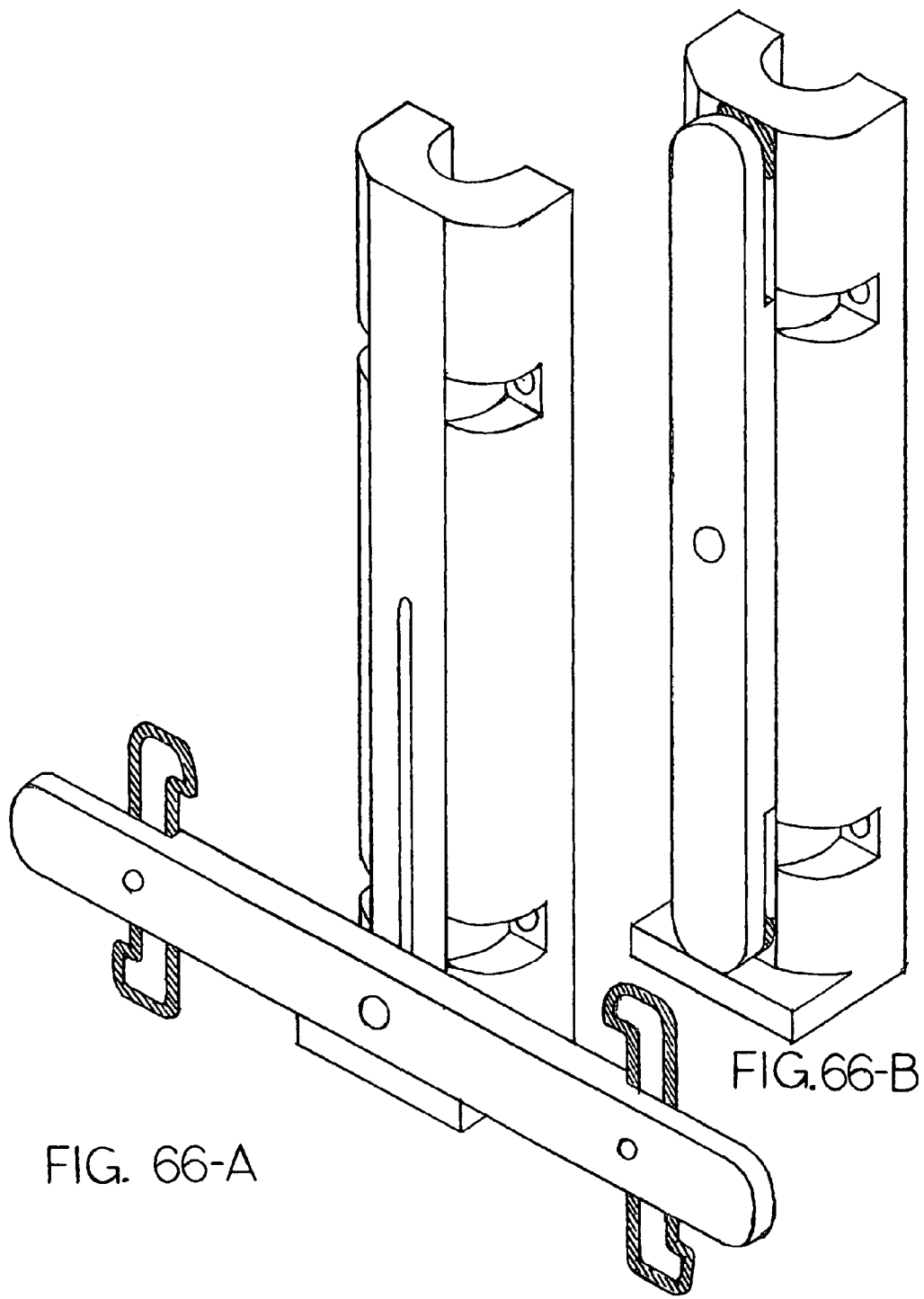
FIG. 66-A
FIG. 66-B

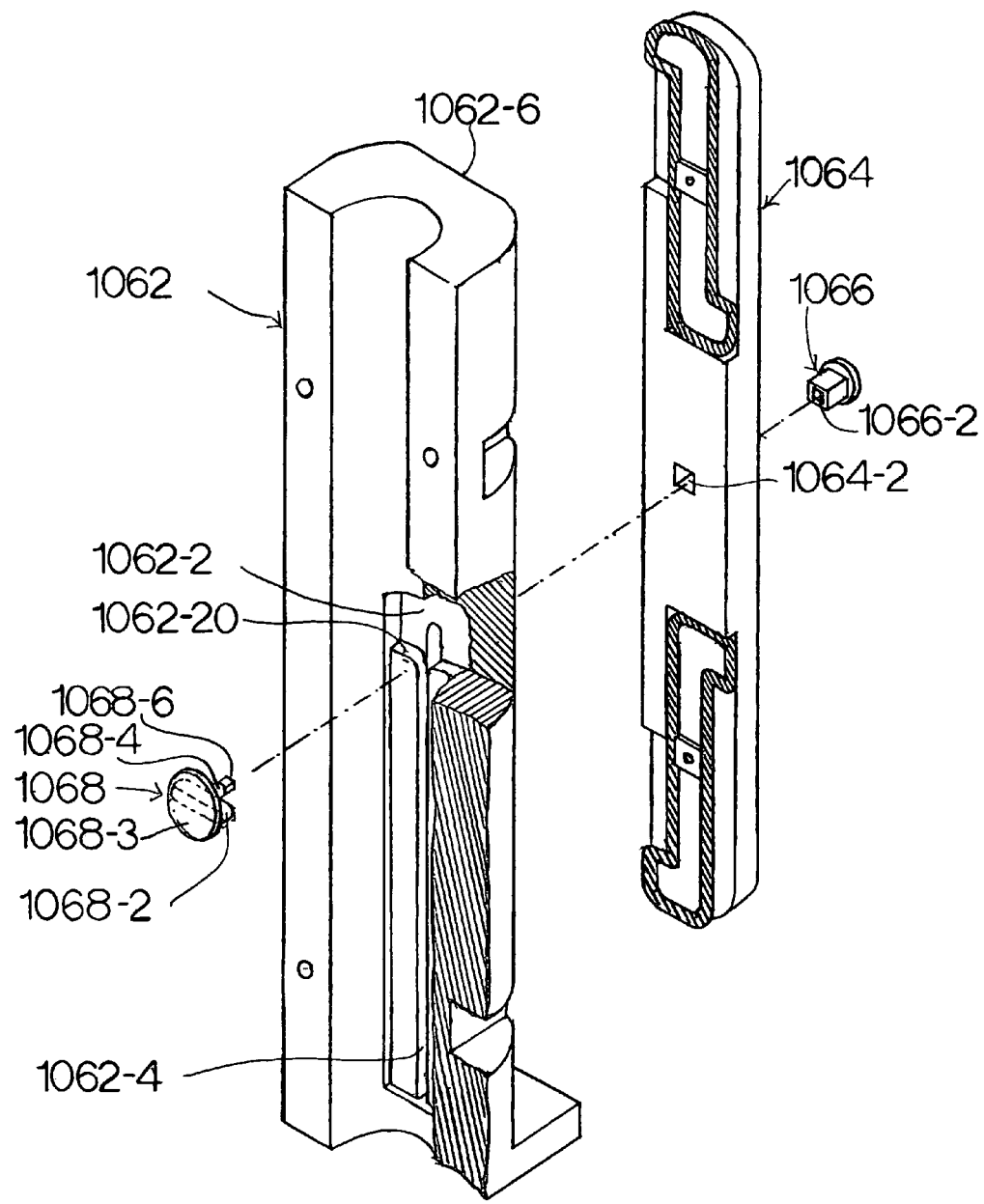
FIG. 66-C

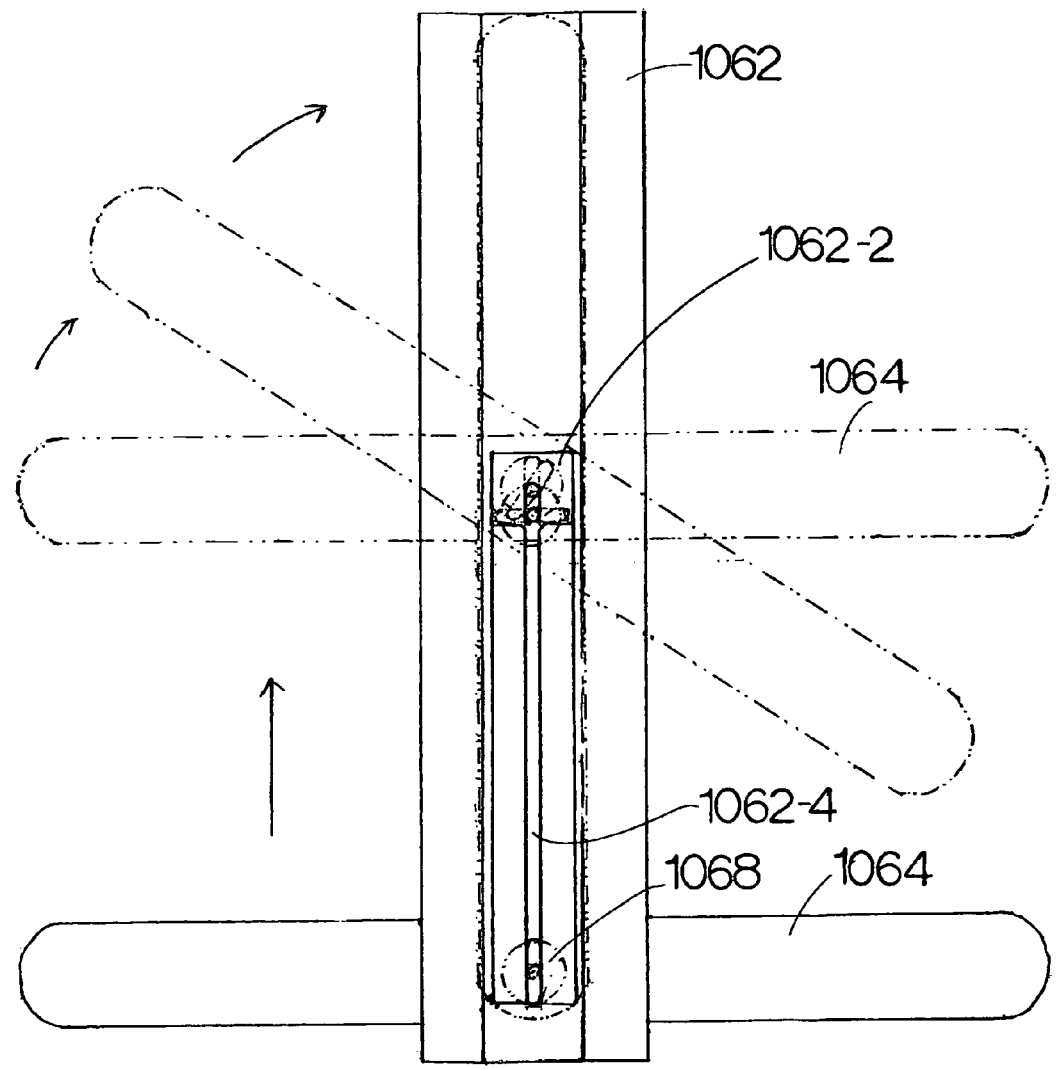
FIG. 66-D

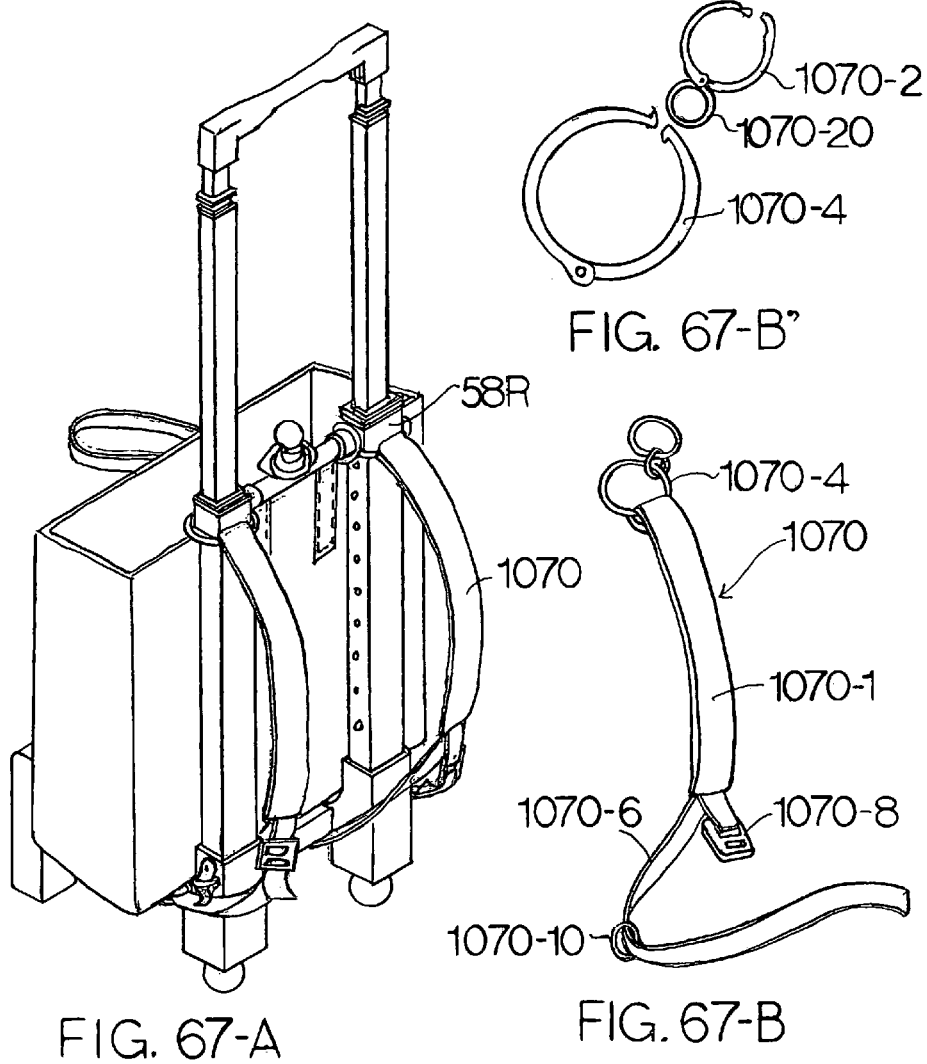

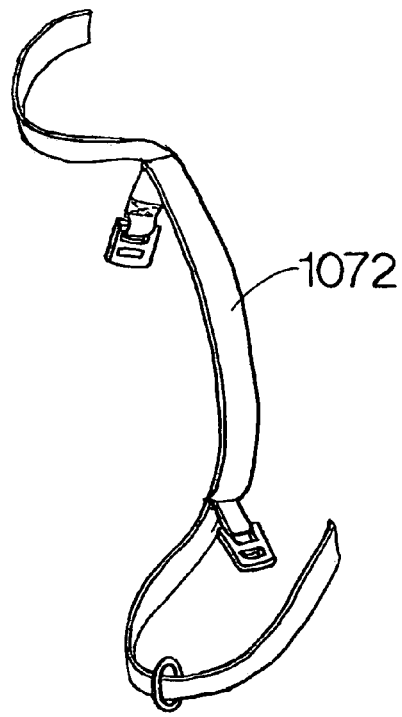
FIG. 67-C
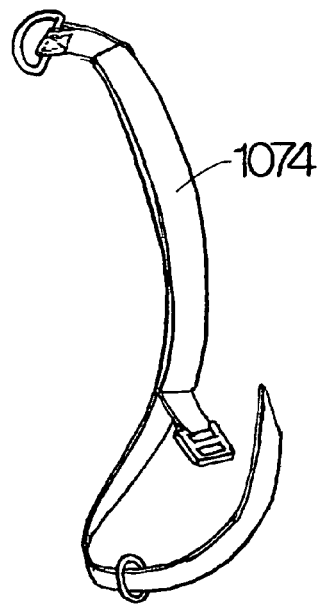
FIG. 67-D
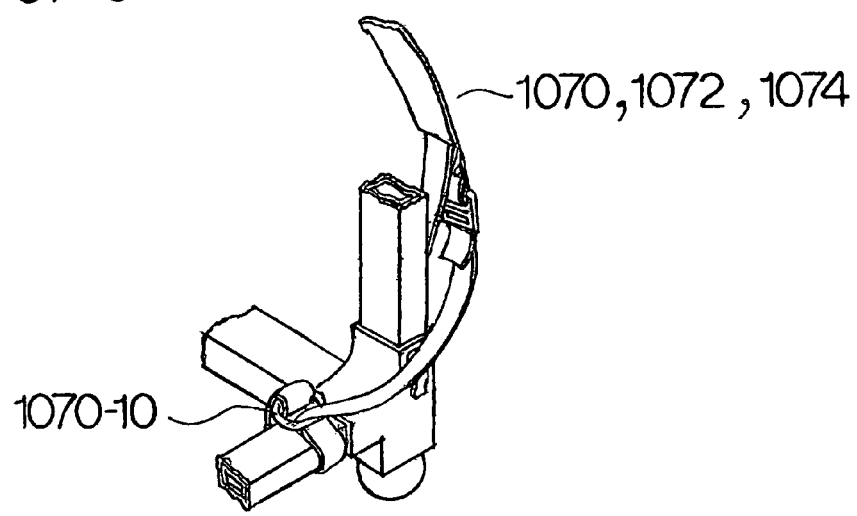
FIG. 67-E

CUSTOMIZING PACK CARRIER ON WHEELS

CROSS REFERENCES TO RELATED APPLICATIONS

This application is entitled to the benefit of Provisional Patent Application Ser. No. 60/240,104 filed on Oct. 16, 2000.

BACKGROUND

1. Field of Invention

The present invention relates to a pack carrier for various wheeled means specifically one that is customized to accommodate one or more desirable conveniences comprising choice of pack, self-adjusting base, quasi-permanent adjustment to height of user, strap lifting, option for a seat and backrest, option for carrying pack upright or horizontally, and ergonomic back support.

2. Discussion of Prior Art

There are numerous patents and products in the market covering luggage carriers with telescoping handle tubes. The closest in application to my present invention is a telescoping handle and base assembly that is permanently attached to a backpack. This type of backpack on wheels assembly offered a solution to the problem of school kids who must lug heavy stuff to school.

The back problems associated with children carrying too heavy backpacks to school have been addressed and confirmed by medical doctors worldwide. Experts say that school children should carry no more than 8–10% of their body weight. Any excess load can damage posture and promote back pain in the future if not presently. According to an April 1999 issue of Contact Kids magazine, 3,300 kids ages 5–14 sought emergency treatment for injuries caused by heavy backpacks in 1997 alone.

However, backpacks on wheels have some drawbacks. They do not readily fit into school lockers. The base platform of this backpack has to be made of wood or similar rigid material to reinforce the connection between the back wheels and the front legs. A weak or flexible base causes the whole assembly to tip forward, thus, unstable. A flexible base also puts more stress on the connection between the back wheels with the main frame.

The handle and wheeled base assembly and the backpack easily wear out. From my children's experience, despite its rigid base, the members connecting the back wheels and the front support still break and the front support falls off. The backpack straps become worn out from abrasive contact with the ground in less than a school year of use. Pockets where the straps can be tucked in are provided but are not always used because it is inconvenient to bend down to do so every time you change from backpack to "groundpack" mode. A backpack with a fixed single position tether means on its shoulder straps for connecting to an extendible handle bar affixed to said backpack is presented in prior art but not many backpacks available to a common consumer have those. Furthermore, the position of the tether means cannot be adjusted to conform to the dimensions of the user.

The young are picky about the style, color, brand name, quality, size, and what not of what they bring to school. The choices on these wheeled backpacks are limited. Generally, they look basic and austere in terms of juvenile standards. Parents continue to purchase these wheeled backpacks for very good reasons. Getting their kids to willingly use these luggage-looking backpacks to school can be a frustrating task.

On some days, the user does not have to bring a heavy load to or from school. If they do not want to carry a wheeled backpack on such occasions, a spare regular backpack must be on hand. There is also the extra task of transferring the lighter load into the regular backpack.

Generally, bikes, wagons, and the like that are used outside stay outside after use for sanitary reasons and for protection of the floors from scratches and undue wear. Shoes worn outside are usually left in the mudroom or by the door. The same rule should apply to backpack on wheels. Some scenarios resulting from this situation are: a) the backpack is emptied of contents needed for the rest of the day and said contents are transferred into another bag and the backpack on wheels is left by the door, b) the whole thing is carried to the bedroom and parked on a mat there, and c) the dirty wheels are rolled through the house regardless. Overall, these scenarios leave much to be desired. Either the child is deprived easy access to his/her backpack and of the benefit of wheels or, dirt and germs get transmitted wherever the backpack on wheels go inside the home.

A regular pack can also be loaded onto a typical luggage cart with telescoping handles and wheeled base and held in place with tie downs. Not only is this arrangement unattractive and dangerous to school kids, it also does not allow them to use the combination in the backpack mode despite the available shoulder straps or supplemental shoulder harness. The transverse bars between the upright components and/or the wheel axle may be in a place that can poke and pinch the user if he attempts to carry the combination on his back.

In the case with carriers for backpacks on bikes, none presently exist that require no tie downs. Bike racks in the market all require tie downs that are easily misplaced to carry their load. Luggage including backpacks are always strapped lying down.

Removable and transferable padded back supports with all sorts of attachment straps are present in prior art for use on chairs and sport packs but none has been adapted for use with just any typical backpack.

SUMMARY OF THE INVENTION

The present invention is a compact portable carrier illustrated using a telescoping handle assembly for a main frame and an adjustable base that will convert any kind/size of pack into a backpack on wheels.

The handle assembly consists of four pairs of tubes, each pair slidably disposed inside a next larger sized pair. The second pair of upright tubes telescope in and out of a first pair to adjust to the height of the backpack. Once the desired height is located, spring buttons fix the position of the second pair relative to the first. The second pair of upright tubes is joined at the top by a transverse bar that houses a means of gripping the backpack handle strap, thus, partially securing the backpack onto the pack carrier. This bar also helps to maintain the parallel relationship between the tubes and their pairs. The third pair of tubes telescopes in and out of the second pair and provides part of the handle height. The fourth and topmost pair of tubes is joined at the top with another transverse bar that serves as a handle bar and as a space maintainer. The handle bar allows the third and fourth pair of tubes below it to move in unison as it travels in and out of the fixed first and second pair of tubes. The position of the fourth pair of tubes inside the third pair of tubes can be adjusted and quasi-permanently fixed until it is "outgrown". The entire telescoping handle may be shortened and simplified by eliminating the fourth pair of tubes. The third pair will be joined at the top by the handle bar.

Towards the bottom of each of the first pair of tubes is a special hook through which the lower portion of the backpack strap slides in. The strap then becomes a sling for lifting the carrier in the backpack mode.

A mechanism for lifting the backpack straps off the ground prior to rolling comprise of a sinuous material coiled around the third pair of tubes, a backpack strap adaptor with a ring, and a piece of string connecting them both. The length of the string, its point of attachment to the coiled material and the location of the attachment piece along the backpack strap all determine the degree to which the strap is lifted.

The carrier has a base that expands and contracts to conform to the depth of the backpack. A raised front member situated above the front legs snugly holds the backpack in place. The front legs by virtue of it being always near the outer front edge of the backpack provide stability for backpacks of different depths. The base is equipped with the basic two back wheels and two front legs. Another version may be equipped with two lockable casters at the back and an inconspicuous ball bearing glide under each of the front legs.

The pack carrier can be equipped with an ergonomically designed padded back support that promotes better posture, comfort, and less fatigue for the user.

Several folding versions of the pack carrier are also presented. The front legs may be collapsed to transform the upright components into a comfortable backrest. A hidden seat slides out from the bottom of the backrest. The raised front member may also be collapsed to carry a backpack with depth beyond the extending capacity of the base. Moreover, the upright components can be folded down towards the base when not in use.

The pack carrier for bikes uses the same applicable mechanisms as the ground carrier and allows backpacks to be carried upright or lying down without the use of tie downs. The cleat replaces the hook to additionally secure the backpack onto the rack. Several folding and non-folding versions are presented. Some of these versions can use an independently unique one-piece clamping article.

My invention also includes a backpack carrier mounted on a one-column frame such as that found on a scooter. Scooters are very convenient and fast means to move from one building to another around school campuses.

Objects and Advantages

Accordingly, the objects and advantages of my invention are:

All school backpacks fit in school lockers when squushed. The squushed backpack and the carrier will both fit inside the locker whether attached to or detached from each other. The carrier does not even need to be folded to fit in the locker.

The mechanism for automatically raising the backpack straps before it is rolled protect the straps from getting worn out, thus, extending the usable life of backpacks. When used properly, the pack carrier can last longer than the handle and base assembly on wheeled backpacks. This is because unlike wheeled backpacks, the platform of the pack carrier is independent of the base of the backpack it carries, and therefore, can justifiably be made to last longer than a backpack. The front legs are less likely to break off from the back wheel housing and come off the unit. Extending the usable lives of both the backpack and the carrier allow us to save our valuable resources. We are also spared the regret associated with discarding a wheeled backpack unit that has a broken leg but still has a usable backpack or discarding one that has a worn backpack strap or broken zipper but still has a usable handle and base assembly. With my pack carrier arrangement, one need to replace only the part that has lost its function.

In addition, the mechanism for automatically raising the backpack straps, the padded backrest, seat and the strap hooks are all replaceable and transferable from one carrier to another. Also, since the handle length can be adjusted and then fixed quasi-permanently to conform to a users desired height, a fast growing child may need only one durable pack carrier throughout his entire school life. That can all translate to further savings.

A base equipped with two swiveling casters and two glides certainly has an advantage over the basic rigid, non-swiveling back wheels found in most luggage carriers. The user can push and pull the loaded pack carrier in every which way along narrow aisles and into small spaces between rows of seats in a bus. Any heavy piece of furniture is always easier to maneuver if it has four wheels instead of just two.

Since my pack carrier can accommodate any kind of backpack, users are more willing to use it in conjunction with backpacks of their choice. This will relieve parents of the difficult task of having to force their children to use something that is actually for their own good. Peer pressure against the use of luggage-looking packs is also alleviated. The mechanism for raising backpack straps can also be a source of amusement. Even one's favorite non-backpack style bag may be attractively attached to the gripper of the pack carrier via their handle straps. Add a backpack harness and the whole combination becomes a backpack on wheels. The pack carrier offers several possible attachment points for a backpack harness.

Furthermore, the pack carrier may be converted to a seat with a padded backrest by simply collapsing the front legs or inclining by some other means. When weather permits, older students usually sit outside on the grass to read or visit with friends. Having a pack carrier with the seat option is certainly welcome during these times. It can also be used at home while reading or doing schoolwork on the floor or while watching TV provided the wheels are cleaned or covered. The detachable, washable padded back support also offers the user an opportunity to express his individuality by choice of designs, color, pockets and other embellishments.

Also, the present invention offers a solution to the problem of having to leave dirty backpack on wheels by the door. The user can simply detach the backpack from the pack carrier and drag just the pack to the bedroom. Better still, he/she can load the pack onto a spare clean pack carrier and roll it even up to the bed. Attaching or detaching a backpack to or from a pack carrier is a simple procedure. It takes about 15 seconds if the pack carrier uses a one-piece back pad and about 5 seconds if it has a pair of slim back pads.

In the case of bikes, my pack carrier for bikes has the advantage of allowing the user to carry a backpack upright in addition to the usual lying down position and without the use of dangling easily misplaced tie downs. A manufacturer of a bike rack also markets special bags that have grooved bottoms to allow the bag to slide onto their racks where they are thereby retained without the use of tie downs. However, these bags are small and cost prohibitive, thus, do not serve the needs of an average user. A minor modification of my basic pack carrier for bikes makes it possible to carry another backpack loaded ground pack carrier. This is especially useful to kids who bike to school and also need a wheeled backpack when they get there.

With the increasing acceptance of the recumbent bicycle, a backpack carrier may be incorporated onto the frame of the backrest giving the combination a unified look. Having a backpack carrier for recumbent bikes is a matter of necessity because the rider's back is no longer free to bear a backpack. Existing seat bags and panniers in the market are mostly designed exclusively for specific models/makes of recumbent bikes. Seat bags for use with a specific model of recumbent bike can cost about five times that of a good quality backpack for less room. Waterproof panniers can even cost up to ten times that. There is also a backpack conversion harness just for panniers that cost about three times that of a good backpack. Rack packs are also available but for two to four times the cost of a very good quality backpack and again require the use of tie downs. It is probably true that someone who can afford a recumbent can easily accommodate these high-priced bags. So, it is also true that they can accommodate the one-time added cost of a backrest with a provision for carrying any backpack of their choice without tie downs. The savings realized by not having to purchase a special seat bag, pannier, or backpack harness can more than offset this added cost. A regular pack carrier for upright bikes can also be modified to adapt to recumbents by simply redesigning its bike attachment section and by allowing the upright tubes to incline forward with the backrest.

The backpack is the most preferred luggage container by students whether they lug it on wheels or against their backs. The padded back support for the main frame, in addition to being a means of cushioning against the rigid main frame, is a very convenient medium for providing the user with added options like waist belts, supplemental shoulder straps, lumbar support pads and pockets for storage of extra items like rain gear, wash cloths, etc. When detached from the pack carrier, the padded back support can also be used to transform any plain backpack into an ergonomic backpack.

The one-column type of pack carrier adapted to scooters can relieve scooter riders, mostly students, of the heavy book load on their backs.

DESCRIPTION OF DRAWINGS

FIG. 3-A is an oblique view of the second largest right tube and its respective top and bottom retaining caps and spring button.

FIG. 3-B is a fragmentary view of the respective top retaining cap of the second largest left tube showing the configuration of the inner walls.

FIG. 7-A is a fragmentary exploded isometric view of the components of the quasi-permanent height-adjustable handle bar I.

FIGS. 7-BA, 7-BB, and 7-BC are fragmentary cross-sectional views taken along the same section as in FIG. 6 illustrating the positions of the control rod positioning members relative to apertures on the fourth and third largest tubular members at increasing height levels for height-adjustable handle bar I.

FIGS. 7-CA, 7-CB, and 7-CC are fragmentary cross-sectional views showing the operation at increasing height-adjusted levels when using a longer control rod having a third plunger button.

FIG. 7-D is an exploded perspective view of the components of the quasi-permanent height-adjustable handle bar II.

FIG. 7-D' is an exploded perspective view of the components of the quasi-permanent height-adjustable handle bar II variation.

FIG. 7-E is an exploded perspective view of the components of the quasi-permanent height-adjustable handle bar III.

FIGS. 8-A, 8-B, and 8-C are bottom perspective views of the different types of catch and bumper combinations.

FIGS. 8-A1, 8-A2, 8-A3, and 8-A4 are fragmentary cross-sectional views taken along the longitudinal midsection of a completed telescoping handle assembly that uses either a longitudinally mounted rigid quarter cylinder bumper or a longitudinally mounted narrower flexible bumper on the bottom retaining cap, 64, on FIG. 4 illustrating the latching and unlatching operation of the spring button.

FIGS. 8-B1, 8-B2, 8-B3, and 8-B4 are fragmentary cross-sectional views of the structure referred in FIG. 8-A1 taken along the section line A—A of FIG. 8-A1 when the longitudinally mounted quarter cylinder bumper is used.

FIGS. 8-C1, 8-C2, 8-C3, and 8-C4 are fragmentary cross-sectional views similar to FIG. 8-B1 when the longitudinally mounted narrower flexible extension is used.

FIGS. 9-A and 9-B are partial top views of the right side of the base in the retracted and extended positions respectively with the top casing removed.

FIG. 10-A is a perspective exploded view of the assembly of components of the rotating knob assembly I.

FIGS. 10-A' and 10-A" are front views of the rotating knob assembly I in the tightened and loosened positions respectively with the front half of the cylindrical knob housing removed.

FIG. 10-B is a perspective exploded view of the assembly of components of the rotating knob assembly I.

FIGS. 10-B' and 10-B" are front views of the rotating knob assembly II in the tightened and loosened positions respectively with the front half of the cylindrical knob assembly removed.

FIG. 11-A is a perspective exploded view of the assembly of components of the rotating knob assembly III.

FIGS. 11-A' and 11-A" are front views of the rotating knob assembly III in the tightened and loosened positions respectively with the front half of the cylindrical knob assembly removed.

FIG. 11-B is a perspective exploded view of the assembly of components of the rotating knob assembly IV.

FIGS. 11-B' and 11-B" are front views of the rotating knob assembly IV in the tightened and loosened positions respectively with the front half of the cylindrical knob housing removed.

FIG. 12-A is a cross-sectional front view taken along the longitudinal midsection of the transverse bar of the entire ratchet grip assembly.

FIG. 12-B is a fragmentary perspective exploded view of the right part of the ratchet grip assembly.

FIG. 12-C is a fragmentary, perspective, exploded view of the left part of the ratchet grip assembly.

FIG. 12-D is an exploded view of the entire ratchet grip assembly.

FIGS. 12-E1L, 12-E2L, 12-E3L, and 12-E4L are fragmentary cross-sectional views taken along section line B—B of FIG. 12-A illustrating the operation of the ratchet grip assembly when the handle grip is rotated forward.

FIGS. 12-E1R, 12-E2R, 12-E3R, and 12-E4R are fragmentary cross-sectional views taken along section line C—C of FIG. 12-A illustrating the operation of the ratchet grip assembly when the handle grip is rotated forward.

FIGS. 12-E1L', 12-E2L', 12-E3L', and 12-E4L' are fragmentary cross-sectional views taken along section line B—B of FIG. 12-A illustrating the operation of the ratchet grip assembly when the handle grip is rotated backward.

FIGS. 12-E1R', 12-E2R', 12-E3R', and 12-E4R' are fragmentary cross-sectional views taken along section line C—C of FIG. 12-A illustrating the operation of the ratchet grip assembly when the handle grip is rotated backward.

FIG. 13-A is a fragmentary exploded isometric view of the lower section of one side of the telescoping handle assembly specifically showing contour and installation of one form of retaining means of the present invention.

FIGS. 13-B1, 13-B2, and 13-B3 are perspective views of several ways to secure a flexible strap of a pack onto the retaining means shown in FIG. 13-A.

FIG. 14-A is an exploded isometric view of the assembly of the upper portion of the main frame of the present invention.

FIG. 14-B is an exploded isometric view of the assembly of the lower potion of the main frame of the present invention.

FIG. 14-C is an exploded isometric view of the structures assembled in FIGS. 14-A and 14-B.

FIG. 14-D is an exploded isometric view of the entire handle assembly further showing the installation of a height-adjustable fourth tube.

FIG. 16-A is an isometric view illustrating the external operation of the rotating knob assemblies I and II.

FIG. 16-B is an isometric view illustrating the external operation of the ratchet grip assembly.

FIGS. 20-A and 20-B are isometric views of the pack carrier with a front section having a collapsible topside extension.

FIG. 20-C is an isometric view of the pack carrier with the front support legs contoured for rocking motion when the carrier is inclined forward and with the reinforced connection between the main frame and the base.

FIG. 20-C' is the carrier shown in FIG. 20-C in the tilted position.

FIG. 20-D is an isometric view of the pack carrier having a non-expandable base with the front support legs contoured for rocking motion and with the connection between the main frame and the base reinforced.

FIG. 21-A is an isometric view of the pack carrier with collapsible front support legs.

FIG. 21-B is an isometric view of the pack carrier with collapsed front support legs, cushioned main frame and a provision for a seat.

FIGS. 22-A and 22-B are exploded views of the assembly of the collapsible leg in FIGS. 21-A.

FIG. 22-C is a cross-sectional side view of the assembled collapsible leg taken along the longitudinal midsection of the leg.

FIG. 22-C' is similar to FIG. 22-C further showing the collapsing operation. FIG. 23-A is an exploded perspective view of the assembly of the cushioning envelope and seat on the main frame shown in FIG. 21-B.

FIG. 23-B is an exploded isometric view of another type of seat provision for the main frame that can be retained on the exposed side of the padded support when not in use.

FIG. 23-C is a perspective view of an ergonomically designed padded support.

FIG. 23-C' is a perspective view of a detachable and adjustable ergonomically designed supplemental padding about to be attached to a cushioning envelope via hook and loopn fasteners.

FIG. 23-C" is a perspective view of a cushioning envelope having a very stretchable outside pocket that houses a movable ergonomically designed supplemental padding.

FIG. 23C''' is a side view of a person carrying a pack carrier with an ergonomic padded back support.

FIG. 23-D is a perspective view of an ergonomically designed supplemental padding about to be attached to a common backpack by hook and loop fasteners.

FIG. 23-D' is a perspective view showing how an ergonomically designed supplemental padding can be attached to a common backpack's shoulder straps.

FIG. 23-D" is a side view of a person carrying a backpack with an ergonomically designed supplemental padding.

FIG. 23-E is a perspective back view of a well-equipped padded back support.

FIG. 23-E' is a perspective front view of the back support in FIG. 23-E having a hook and loop fastener retained flap for storage of waist belt and shoulder harness.

FIG. 23-E" is a perspective front view of the back support in FIG. 23-E having a slit pocket for storage of waist belt and shoulder harness.

FIG. 23-F is a perspective back view of a padded back support and backpack combination when the backpack's own original straps are used for carrying.

FIG. 23-F' is a perspective back view of a padded back support and backpack combination when the supplemental shoulder harness is used.

FIG. 23-F" is a perspective back view of a pack carrier with a padded back support and backpack combination when the supplemental shoulder harness is used.

FIGS. 24-A and 24-A' are isometric views of the pack carrier with a front section having collapsible topside extension and support legs.

FIG. 24-B is a partial cross-sectional front view taken along the longitudinal midsection of the collapsible topside extension and support legs in FIG. 24-A.

FIG. 24-B' is a fragmentary exploded isometric view of the assembly in FIG. 24-B.

FIGS. 24-B"A, 24-B"B, and 24-B"C are fragmentary cross-sectional views taken along section line D—D of FIG. 24-B during the collapsing operation.

FIGS. 24-C and 24-C' are isometric views of the pack carrier in FIG. 24-A further including the swing-out support.

FIGS. 24-D and 24-D' are fragmentary isometric views of the swing out support in FIG. 24-C and 24C' respectively.

FIGS. 24-E and 24-E' are cross-sectional views taken along section line E—E of FIG. 24-F.

FIG. 24-F is a partial cross-sectional front view taken along the longitudinal midsection of the collapsible topside extension and front support legs of FIG. 24-C.

FIGS. 25-A and 25-B are isometric views of a collapsible main frame and base version of the pack carrier in FIG. 24-A.

FIG. 25-C is an exploded isometric view of the assembly of components for the pivotal connection between the main frame and the base of the pack carrier.

FIGS. 25-D1, 25-D2, and 25-D3 are fragmentary cross-sectional views illustrating the internal operation of the pivotal connection in FIG. 25-C.

FIG. 25-E is a fragmentary exploded isometric view of the assembly of components shown in FIGS. 25-F1, 25-F2, 25-F3, 25-F4.

FIGS. 25-F1, 25-F2, 25-F3, and 25-F4 are similar to FIGS. 25-D1, 25-D2, and 25-D3 having a locking tooth and recess combination defined by an interlocking arc of pointed notches.

FIGS. 25-G and 25-G' are isometric views of a collapsible main frame and base version of the pack carrier in FIG. 20-A.

FIGS. 27-A, 27-B, 27-C & 27-C', 27-D & 27-D' are exploded perspective views of some types of supplemental attachment means for the backpack.

FIGS. 27-A', 27-B', 27-D", and 27-E are perspective views of the attachment means shown in FIGS. 27-A, 27-B, and 27-D' when attached to the backpack.

FIGS. 28-A and 28-A' are front views of the clamp grip I in the loosened and tightened positions respectively without the front casing on the transverse bar.

FIG. 28-B is an exploded perspective view of the assembly of components of clamp grip I.

FIGS. 28-C1 and 28-C2 are partial cross-sectional views taken along section line F—F of FIG. 28-A specifically showing the operation of the clamp closure.

FIG. 28-D is a perspective view of the clamp grip I installed on the backpack.

FIGS. 29-A and 29-B are front views of the clamp grip II without the front casing on the transverse bar without and with the backpack straps respectively.

FIG. 29-C is an exploded perspective view of the assembly of components of the clamp grip II.

FIGS. 30-A and 30-B are front views of the clamp grip III without the front casing on the transverse bar without and with the backpack straps respectively.

FIG. 30-C is an exploded perspective view of the assembly of components of clamp grip III.

FIGS. 31-A and 31-B are front views of the clamp grip IV without the front casing on the transverse bar without and with the backpack straps respectively.

FIG. 31-C is an exploded perspective view of the assembly of components of clamp grip IV.

FIG. 31-D is an exploded perspective view of the assembly of the smaller-sized clamp grip IV units onto the transverse bar.

FIG. 32-B is a perspective view of the loaded pack carrier in FIG. 32-A with the handle assembly in the retracted position.

FIG. 32-C is a fragmentary exploded oblique view of the assembly of the spring and attachment components of one type of strap lifting apparatus onto the main frame of the pack carrier.

FIG. 32-D is a fragmentary perspective view illustrating the linkage between the spring component in FIG. 32-C and the pad wrap adaptor.

FIG. 32-D' is a perspective view of the "linked" pad wrap adaptor installed on a backpack's shoulder strap.

FIG. 32-E is a fragmentary perspective view of the assembly of the tie onto the slip-on pad adaptor.

FIG. 32-E' is a fragmentary perspective view of the "linked" slip-on pad adaptor installed on the backpack's shoulder strap.

FIG. 32-F is a fragmentary perspective view of the assembly of components of a strap adaptor using a pair of buckles.

FIG. 32-F' is a fragmentary perspective view of the "linked" pair of buckles installed on a backpack's shoulder straps.

FIG. 32-F" is a perspective view of a single-buckle adaptor installed on a backpack's shoulder straps.

FIG. 32-G is a fragmentary perspective view of the assembly of components of a strap adaptor using a pair of clips.

FIG. 32-G' is a fragmentary perspective view of the "linked" pair of clips installed on a backpack's shoulder straps.

FIG. 32-G" is a perspective view of a single clip adaptor installed on a backpack's shoulder straps.

FIG. 32-H is a perspective view of the collection of possible ring-type alternates to the strap adaptors.

FIG. 32-H' is a fragmentary perspective view of the extended loaded pack carrier using a ring in FIG. 32-H in conjunction with the spring and tie.

FIGS. 32-IA and 32-IB are perspective views of examples of wheels that can be retained in a flexible groove with a constricted top.

FIGS. 32-IA' and 32-IB' are the respective front views of the wheels in FIGS. 32-IA and 32-IB retained inside a groove.

FIG. 32-I is a fragmentary perspective view of a "linked" strap adaptor using a wheeled connecting means inside a grooved flexible member.

FIGS. 32-JA and 32-JA' are fragmentary front views of the loaded carrier in FIGS. 32-A and 32-B respectively with the pad wrap adaptor having a slidable ring positioned on the part of the shoulder strap closest to the main frame.

FIGS. 32-JB and 32-JB' are fragmentary front views of the loaded carrier in FIG. 32-A and 32-B respectively with the pad wrap adaptor positioned a certain distance from the top of the shoulder straps.

FIGS. 32-JC, 32-JC', 32-JD, 32-JD' are fragmentary front views similar to FIGS. 32-JA, 32-JA', 32JB, and 32-JB' using a pad adaptor having a fixed attachment point.

FIGS. 32-JE and 32-JE' are fragmentary front views of the loaded pack carrier utilizing the alternate smaller-sized coils mounted outside the main frame.

Figures 1, 32:
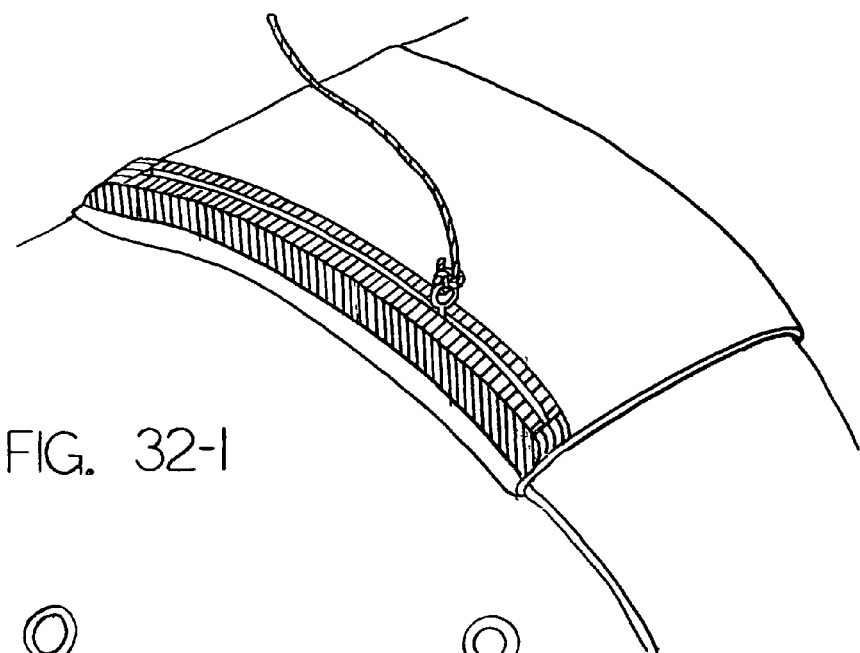
FIG. 32-A is a perspective view of a backpack loaded pack carrier with the handle assembly utilizing the strap lifting apparatus in the extended position, ready for rolling.
Figures 1A, 32:
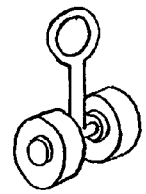
Figures 1A, 32:
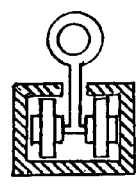
Figures 1B, 32:
Figures 1B, 32:
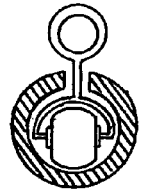

FIGS. 32-K and 32-L are fragmentary perspective views of an accordion-like collapsible outer layer in the extended position.

FIGS. 32-K' and 32-L' are fragmentary perspective views of an accordion-like collapsible outer layer in the retracted position.

FIGS. 32-M and 32-M' are perspective views of a collapsible outer layer made up of concentric tubes with tapering cross-sections in the extended and retracted positions respectively.

FIG. 33-A' is a partial perspective view of a bike having three pack carriers—one horizontally positioned over the back wheels and two vertically placed astride the back wheels.

FIG. 33-B' is a view of FIG. 33-A' wherein each pack carrier is loaded with any non-customized commercially available backpack.

FIGS. 33-A and 33-B are perspective views of one type of pack carrier I mounted on a bike in the upright and folded positions respectively.

FIG. 34-A is an exploded fragmentary perspective view of the assembly of components of the pivotal connection between the main frame and base of the pack carrier in FIG. 33-A.

FIGS. 34-B1, 34-B2, and 34-B3 are fragmentary cross-sectional views showing the operation of the pivotal connection shown assembled in FIG. 34-A.

FIG. 35-A is a fragmentary exploded perspective view of one of the rear corners of the pack carrier on bike of FIG. 33-A specifically showing mounting of the cleats.

FIG. 35-A' is a perspective view of the cleat used in FIG. 35-A.

FIG. 36-A is an exploded oblique elevated view of the assembly of the nesting tubular components of the main frame of the pack carrier in FIG. 33-A.

FIG. 36-B is an exploded oblique elevated view of the final assembly of the components of the pack carrier in FIG. 33-A.

FIGS. 37-A and 37-A' are fragmentary cross-sectional front views taken along the longitudinal midsection of the retracted main frame for the left and right columns respectively.

FIGS. 37-B and 37-B' are fragmentary cross-sectional front views taken along the longitudinal midsection of the fully extended main frame for the left and right columns respectively.

FIGS. 38-A and 38-B are perspective views of the pack carrier in FIG. 33-A with the backpack loaded in the upright and horizontal positions respectively.

FIGS. 39-A, 39-B, and 39-C are perspective views of another type of pack carrier II for bikes additionally capable of carrying a loaded ground-use pack carrier.

FIGS. 39-D and 39-E are views of the carrier in FIG. 39-A showing the mounted unloaded and loaded ground-use pack carrier respectively.

Figure 40:
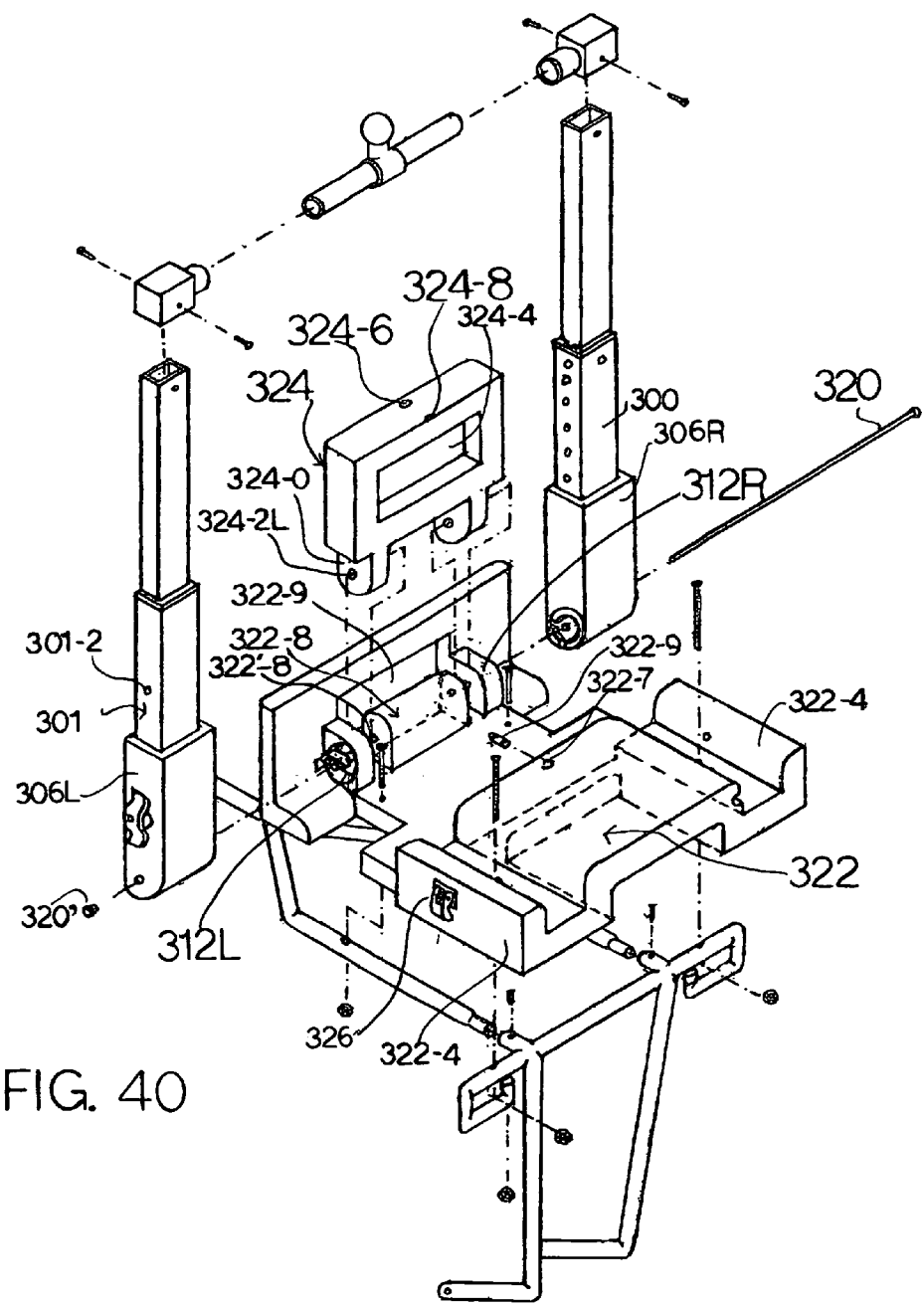

FIG. 40 is an exploded perspective view of the assembly of components of the pack carrier in FIG. 39-A.

FIG. 41-A is an exploded fragmentary perspective view of the assembly of components for the locking mechanism of the pack carrier in FIG. 39-A.

FIGS. 41-B, 41-B', and 41-B" are fragmentary cross-sectional views showing the operation of the locking mechanism.

FIGS. 42-A, 42-B, and 42-C are perspective views of another type of pack carrier III in FIG. 39-A additionally having a self-adjusting front hugger.

FIGS. 42-D, 42-D', and 42-E are side views of the carrier in FIG. 42-A without a loaded pack, with a pack loaded upright, and with a pack loaded horizontally respectively.

FIGS. 43-A and 43-B are exploded perspective views of the assembly of components for the pack carrier in FIG. 42-A.

FIGS. 44-A and 44-A' are perspective views of the tubular type of pack carrier I for bikes having a self-adjusting front support without and with a loaded backpack respectively.

FIGS. 44-B and 44-B' are perspective views of the pack carrier in FIG. 44-A in the folded position and with the backpack loaded horizontally.

FIG. 44-C is an exploded perspective view of the assembly of components of the pack carrier in FIG. 44-A.

FIGS. 45-A and 45-B are perspective views of another type of tubular pack carrier II having a self-adjusting front hugger usable between upright and horizontal positions of the backpack.

FIG. 45-C is a perspective view of the carrier in FIG. 45-A when folded down to a rack.

FIGS. 45-D and 45-D' are exploded perspective views of the assembly of components of the self-adjusting front support.

FIG. 45-E is an exploded perspective view of the assembly of components of the carrier in FIG. 45A.

FIG. 45-F is a partial cross-sectional view showing how protrusion 400-4 works to anchor the front member 406-8.

FIG. 45-F' is a partial cross-sectional view showing how the front hugger can be designed such that it can be anchored without the need for protrusion 400-4.

FIGS. 46-A and 46-B are perspective views of the tubular bike pack carrier III in the upright and folded down positions respectively.

FIGS. 47-A and 47-A' are perspective views of the tubular pack carrier IV during and after assembly respectively.

FIGS. 48-A and 48-A' are perspective views of the tubular pack carrier V during and after assembly respectively.

FIGS. 49-A and 49-A' are perspective views of the tubular pack carrier VI during and after assembly respectively.

FIGS. 50-A and 50-A' are exploded perspective views of a push-controlled externally mounted spring buttons conforming to the shape of the tube its on.

FIGS. 50-B, 50-B', and 50-B" are front cross-sectional views taken along the longitudinal midsection of the tubular main frame showing the operation of the spring button of FIG. 50-A or FIG. 50-A'.

FIGS. 50-C and 50-C' are fragmentary perspective views of the assembly of components for the adjustable main frame using the externally mounted button in FIG. 50-A or FIG. 50-A'.

Figure 6:
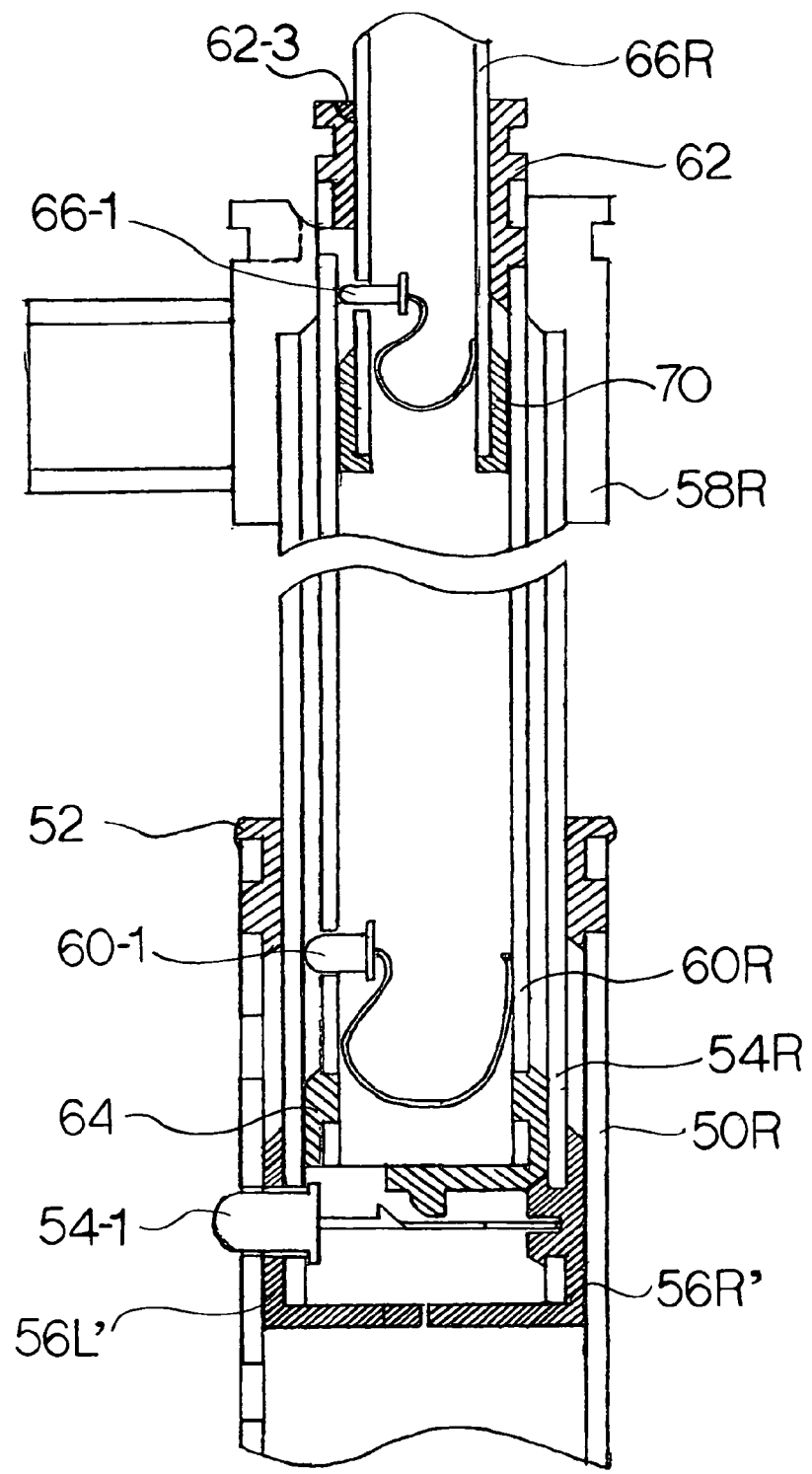
FIG. 6 is a fragmentary cross-sectional front view taken along the longitudinal midsection of the shorter side of a completed telescoping handle assembly.

FIG. 50-D is a front cross-sectional view taken along the longitudinal midsection of the main frame of a ground-use pack carrier similar to that in FIG. 6 showing the use of the externally mounted button in FIG. 50-A or FIG. 50-A'.

FIG. 50-E is a perspective view of a pull-controlled externally mounted spring button.

FIG. 51-A is an exploded perspective view of the friction knob assembly.

FIGS. 51-B and 51-B' are fragmentary perspective views of the assembly of components for the adjustable main frame using the friction knob assembly of FIG. 51-A.

FIGS. 51-C1, 51-C2, and 51-C3 are fragmentary cross-sectional views taken along the longitudinal midsection of a main frame column showing the operation of the friction knob assembly of FIG. 51A.

FIGS. 51-D1, 51-D2, and 51-D3 are views similar to that of FIGS. 51-C1, 51-C2, and 51-C3 further including a plate, 610, with the friction knob assembly.

FIG. 51-E is a cross-sectional front view taken along the longitudinal midsection of the threading adjuster I assembly.

FIG. 51-E' is an exploded perspective view of the assembly of components of threading adjuster I.

FIG. 51-E" is a perspective view of the assembled threading adjuster I.

FIG. 51-F is a cross-sectional front view taken along the longitudinal midsection of the threading adjuster II assembly.

FIG. 51-F' is an exploded perspective view of the assembly of components of threading adjuster II.

FIG. 51-F" is a perspective view of the assembled threading adjuster II.

FIG. 51-G is a cross-sectional front view taken along the longitudinal midsection of the threading adjuster III assembly.

FIG. 51-G' is an exploded perspective view of the assembly of components of threading adjuster III.

FIG. 51-G" is a perspective view of the assembled threading adjuster III.

FIG. 52-X is a fragmentary view of one type of commercially available recumbent bike.

FIGS. 52-A and 52-A' are perspective views of the first type of pack carrier for the recumbent bike of FIG. 52-X during and after assembly respectively.

FIGS. 52-B and 52-B' are perspective views of the second type of pack carrier for the type of recumbent bike in FIG. 52-X during and after assembly respectively.

FIGS. 52-C and 52-C' are perspective views of the third type of pack carrier for the type of recumbent bike in FIG. 52-X during and after assembly respectively.

FIGS. 52-D and 52-D' are perspective views of the fourth type of pack carrier for the type of recumbent bike in FIG. 52-X during and after assembly respectively.

FIGS. 52-E and 52-E' are perspective views of the fifth type of pack carrier for the type of recumbent bike in FIG. 52-X during and after assembly respectively.

FIGS. 52-EA, 52-EA', 52-EA", 52-EB, 52-EB', 52-EC, and 52-EC' are perspective views of the retaining clamp used for the pack carrier in FIG. 52-E'.

FIGS. 52-F and 52-G are perspective views of a folding model of recumbent bike pack carrier adapted from one for upright bikes showing the main frame disposed behind and in front of the transverse bar respectively.

FIGS. 52-F', 52-F'A, 52-F'B, and 52-F'C are perspective views of the clasp used for the pack carrier in FIG. 52-F.

FIGS. 52-G'A, 52-G'B, and 52-G'C are perspective views of the clasp used for the pack carrier in FIG. 52-G.

FIG. 53-X is a fragmentary perspective view of another type of commercially available recumbent bike.

FIGS. 53-A and 53-A' are perspective views of one type of pack carrier for the type of recumbent bike in FIG. 53-X during and after assembly respectively.

FIG. 53-B is a perspective view of the carrier similar to one in FIG. 53-A' but using an externally mounted spring button.

FIG. 53-C is similar to the carrier in FIG. 53-A' further including a self-adjusting front hugger.

FIG. 54-X is a fragmentary perspective view of yet another type of recumbent bike.

FIG. 54-A is a perspective view of one type of pack carrier for the type of recumbent bike in FIG. 54X.

FIGS. 55-A, 55-A', 55-B, and 55-B' are perspective views of the possible pack carriers for a recumbent bike having a seat with no transverse bar during and after assembly.

FIGS. 55-C and 55-C' are perspective views of the pack carriers in FIGS. 55-A' and 55-B' adapted to a recumbent bike already having a top transverse bar.

FIG. 56-A is a fragmentary internal perspective view of the semi-self adjusting platform base for a pack carrier.

FIGS. 56-B and 56-C are exploded perspective views of the assembly of components of the platform base in FIG. 56-A.

FIGS. 56-D1 through 56-D7 are fragmentary and internal top views of the platform base without the top plate 1012-2 for the front and back sections, showing the operation of the adjusting mechanism.

FIGS. 56-E and 56-E' are internal top views of the platform base without the top plate 1012-2 in the retracted and fully expanded positions respectively.

FIGS. 57-A, 57-A' and 57-C are exploded perspective views of the assembly of components of the platform base in FIG. 57-B.

FIG. 57-B is a perspective internal view of the assembled front section of the manually adjustable platform I.

FIGS. 57-D, 57-D' and 57-D" are internal top views showing the operation of the platform I from a retracted position to an extended position respectively.

FIGS. 57-E and 57-E' are bottom perspective views of the assembled platform I in FIG. 57-C in the retracted and extended positions respectively.

FIGS. 58-A, 58-B, and 58-C are perspective views of the assembly of components of the manually adjustable platform II.

FIGS. 58-D, 58-D', and 58-D" are internal top views showing the operation of the platform II from a retracted position to a fully extended position.

FIGS. 58-E and 58-E' are bottom perspective views of the assembled platform II in FIG. 58-C in the retracted and extended positions respectively.

FIGS. 59-A, 59-B, 59-C, and 59-D are fragmentary perspective views of the assembly of components of the alternate self-adjusting plate platform.

FIGS. 59-E and 59-E' are internal top views showing the assembled platform in FIG. 59-A' in the retracted and expanded positions respectively.

FIG. 60-A is a perspective view of the single column pack carrier as adapted to a scooter with the main support bracket mounted on the same member.

FIG. 60-B is similar to FIG. 60-A except that the main support bracket is mounted on the next upper member.

FIGS. 61-A and 61-B are perspective back and front views of the lower portion of the single column pack carrier respectively.

FIG. 62-A is an exploded perspective view of the assembly of components of the single column pack carrier.

FIG. 62-A' is a perspective view of an alternate easily adjustable main support bracket for the single column pack carrier.

FIG. 62-B is a fragmentary perspective back view of a backpack loaded on a single column pack carrier.

FIG. 63 is a perspective back view of the lower portion of the pack carrier in FIG. 61-B in the folded position.

FIGS. 64-A and 64-B are fragmentary perspective views showing the operation of the retaining means on a backpack's handle straps.

FIGS. 65-A. 65-B, and 65-C are perspective views of a variation of the single column pack carrier assembled in FIG. 62-A with emphasis on the re-location of the retaining spring plungers.

FIGS. 66-A and 66-B are perspective views of the lower portion of the single column pack carrier II in the extended and folded arm positions respectively.

FIG. 66-C is an exploded perspective view of the assembly of components of the lower portion of the single column pack carrier II.

FIG. 66-D is a back view showing the folding operation of the assembled components in FIG. 66-C.

FIG. 67-A is a perspective view of a non-backpack bag loaded onto the ground-use pack carrier rendered usable as a backpack with the addition of the backpack harness.

FIGS. 67-B, 67-C and 67-D are perspective views of one of two symmetrical parts of some forms of the backpack harness.

FIG. 67-B' is an exploded perspective view of the rings comprising the upper attachment point for the harness in FIG. 67-B.

FIG. 67-E is a perspective view showing the attachment of the strap, buckle and ring combination to a junction in a pack carrier.

DESCRIPTION OF THE INVENTION

Pack Carrier on Ground

Description of the Upright Components of the Invention

Figure 1:
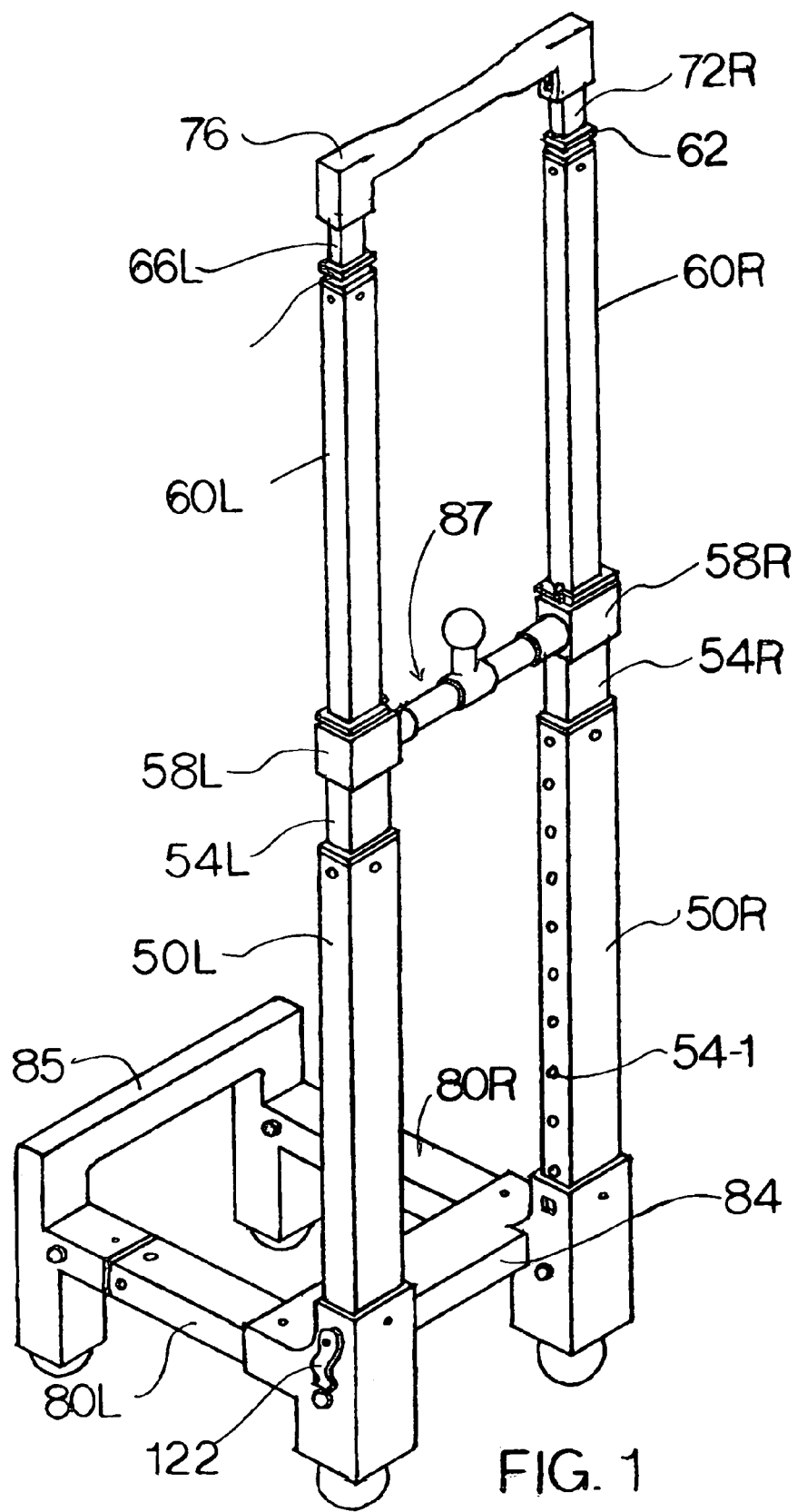
FIG. 1 is a fragmentary isometric view of several components of the invention incorporated into one pack carrier.

The pack carrier in its basic form is shown in FIG. 1. The upright main frame comprise of 4 pairs of retractable tubular members 50L and 50R, 54L and 54R, 60L and 60R, and 66L and 66R maintained in parallel relationship by a transverse bar assembly 87, a handgrip 68 and a base plate 84. To simplify the process of describing the invention, subsequent illustrations will show for the most part just the right side components of the pairs of tubes. The numbers are usually suffixed with the letter R. Some left side components are mirror images of their right counterparts and may be used interchangeably. To illustrate better, however, the left side tubes will be suffixed with the letter L even if they are the same as the right side tubes.

Figure 2:
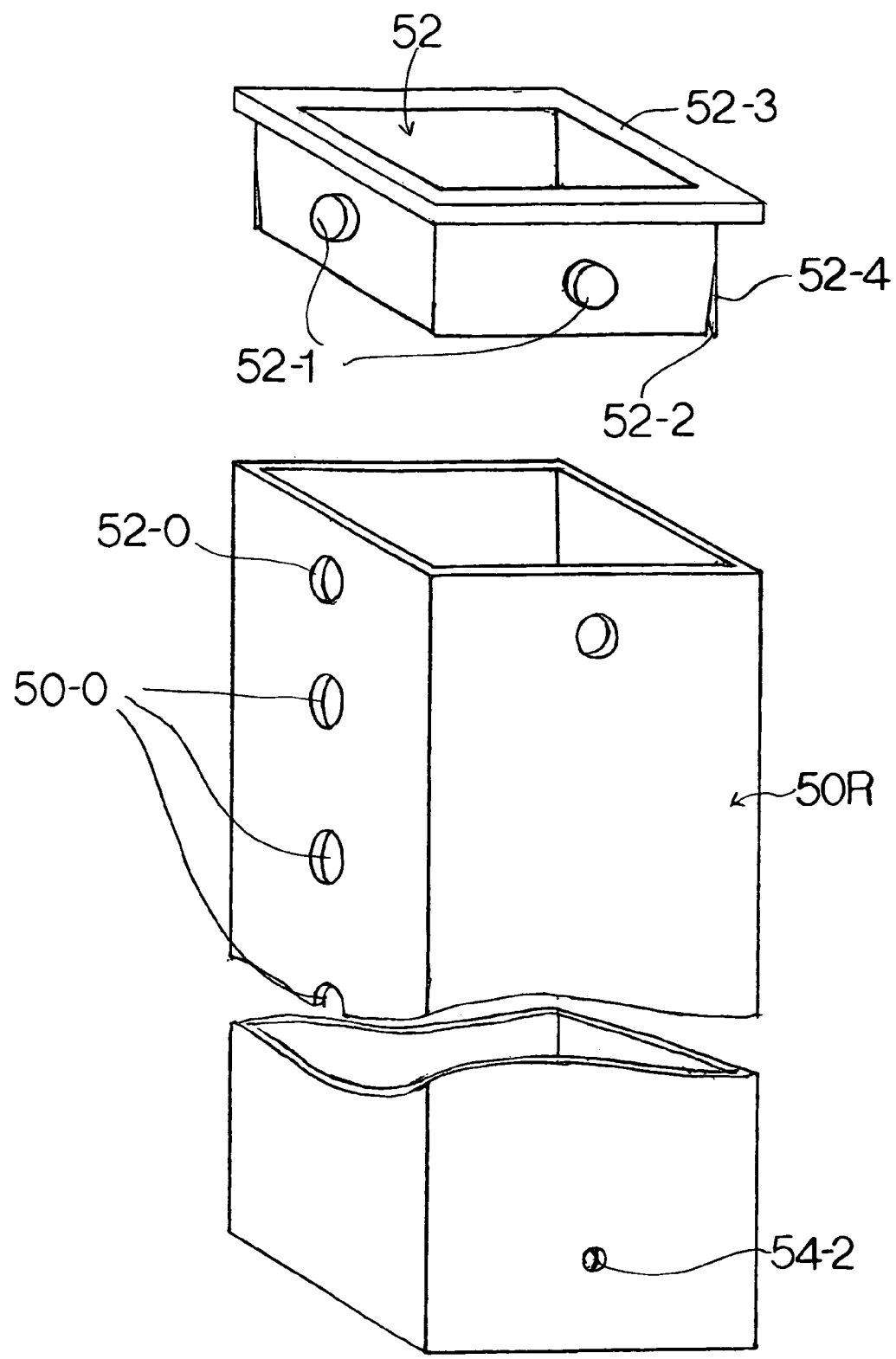
FIG. 2 is an oblique view of the largest right tube and its respective top retaining cap.

Referring to FIG. 2, the largest tube, tube 50R is shown as having a plurality of apertures 50-0 spaced equally apart on one side along its longitudinal axis. Towards the top is an aperture 52-0 on each side. A top retaining cap 52 is open at the top, has a rim 52-3, protrusion 52-1 on each outer wall, and slit 52-4 on two opposite corners. The bottom surface 52-2 is sloping up inwardly. Cap 52 dimensionally mates into top of tube 50R. Protrusions 52-1 fit snugly into apertures 52-0.

Referring to FIG. 3-A, the next largest tube, tube 54R, dimensionally mates into cap 52. Tube 54R has an aperture 54-0 on its lower end on the side facing tube 54L. It also has an aperture 56-0 on each of the other three sides. A snap button 54-1 has a leg 54-5 and a catch 54-2 and is dimensionally receivable through the bottom of tube 54R with its positioning member 54-3 disposed into apertures 54-0 on tube 54R and aperture 56-3 on bottom retaining cap 56L'. Snap button 54-1 also has a single dome shaped head 54-3 with flange welded to a wire leg 54-4 of a shape that approximates the inside cross section of the tube 54L or 54R. A 'C' shape with well rounded curves would approximate a round cross section while one with sharper corners would approximate a rectangular cross section.

Bottom retaining caps 56L' and 56R' are also shown in FIG. 3-A. Cap 56L' has half of a push-in fastener 56-1L' disposed on each of its two facing inner walls and an aperture 56-3 on the remaining wall. It also has a small window 56-4 at the bottom. Cap 56R' has the other half of a push-in fastener 56-IR' disposed on each of its two facing inner walls and a whole push-in fastener 56-10 on the remaining wall. When installed, both caps dimensionally mate tube 54R with tube 50R. Fasteners 56-1L', 56-1R' and 56-10 all have horizontally positioned channels 56-2 on their tips and all fasteners fit snugly into apertures 56-0. Aperture 56-3 aligns with aperture 54-0. A top retaining cap 58R is also shown in FIG. 3-A. It has a cylindrical socket 58-6R facing cap 58L.

A sectional view of cap 58L is shown in FIG. 3-B. It shows a corner recess 58-7L, guide notch 58-4, channel 58-5 that borders the perimeter, a surface 58-2 beveled upward inwardly and a horizontal flat section 58-3.

Figure 4:
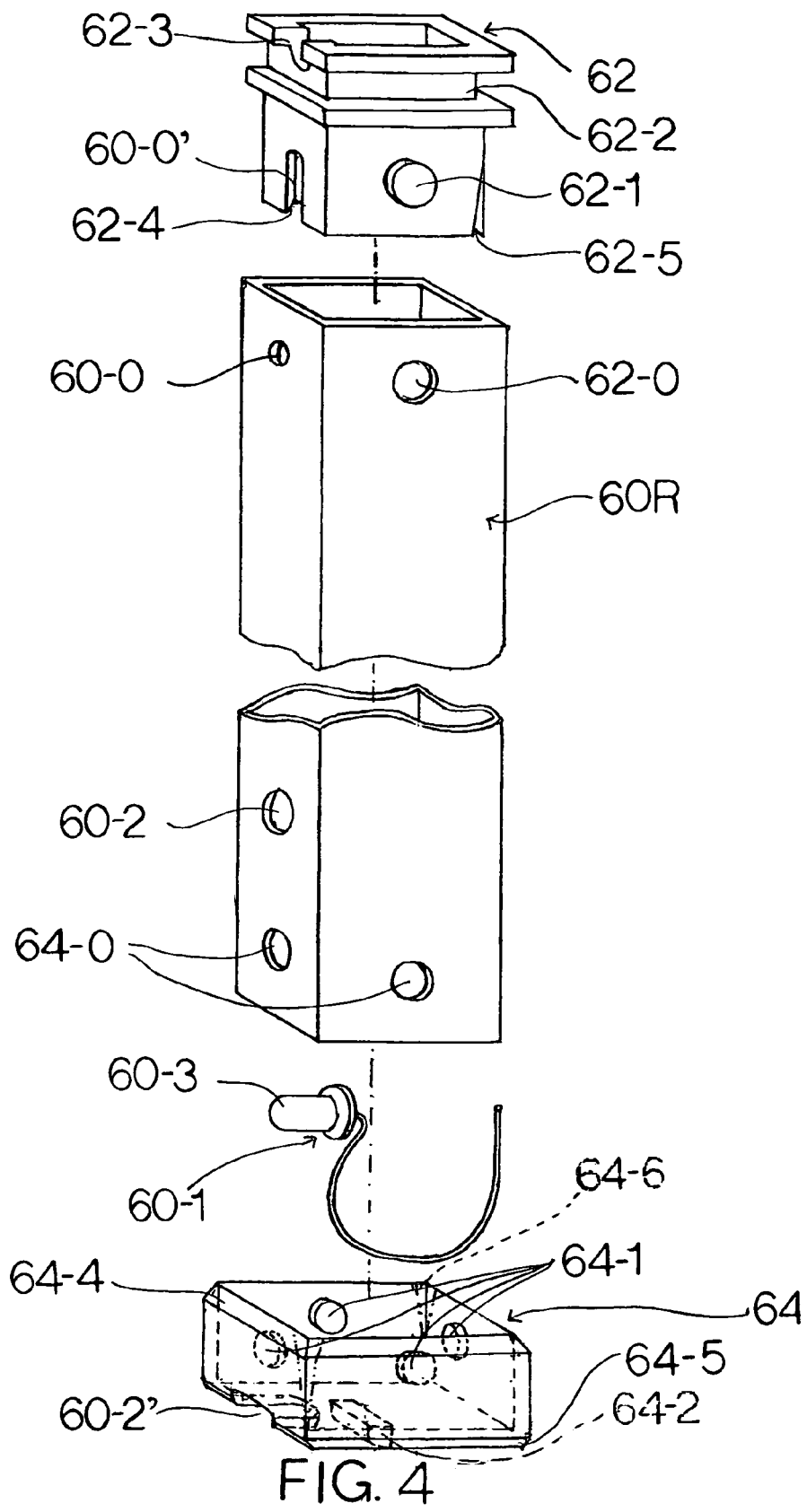
FIG. 4 is an oblique view of the third largest right tube with its respective top and bottom retaining cap and spring button.

Referring to FIG. 4, the third largest tube, tube 60R, has a terminal cavity 60-0 on its upper end and an aperture 60-2 on its lower end, both on the side facing tube 60-L. Also on the upper end of each of the three remaining sides is an aperture 62-0. On the lower end of each of the four sides is an aperture 64-0. A snap button 60-1 is dimensionally receivable through the bottom of tube 60R with its positioning member 60-3 disposed into aperture 60-2. Snap button 60-1 comprises of a single dome-shaped head 60-3 welded or riveted to a U-shaped wire or leaf spring leg. It is positioned with the leg disposed along the longitudinal dimension of tube 60R.

A bottom retaining right side cap 64 shown on FIG. 4 has a protrusion 64-1 on each of the inner walls, a quarter-cylinder-shaped bumper 64-2 disposed at or near the center of the bottom surface and an orifice 60-2' centered on the bottom edge of the side facing the left. It also has slits 64-6 on two opposite top corners. The top edge of each of its sides 64-4 is beveled upward inwardly while the bottom edge 64-5 is beveled downward inwardly. Bottom cap 64 dimensionally mates tube 60R with tube 54R. Protrusions 64-1 fit snugly into apertures 64-0.

The top retaining cap 62 is open at the top and has a channel 62-2 carved on the upper end around the perimeter. The side facing its left counterpart has an inverted U-shaped orifice 60-0' disposed on its lower end. Each of the three remaining sides has a protrusion 62-1 on its outer wall. The cap may also have an optional notch 62-3 located on the same side as the orifice. Slits 62-5 are on bottom corners of the side opposite orifice 60-0'. Cap 62 dimensionally mates into tube 60R and protrusions 62-1 fit snugly into apertures 62-0. If no fourth pair of tubes is adapted for this invention, cap 62 will be eliminated. A handle bar will receive the top of tube 60R.

Figure 5:
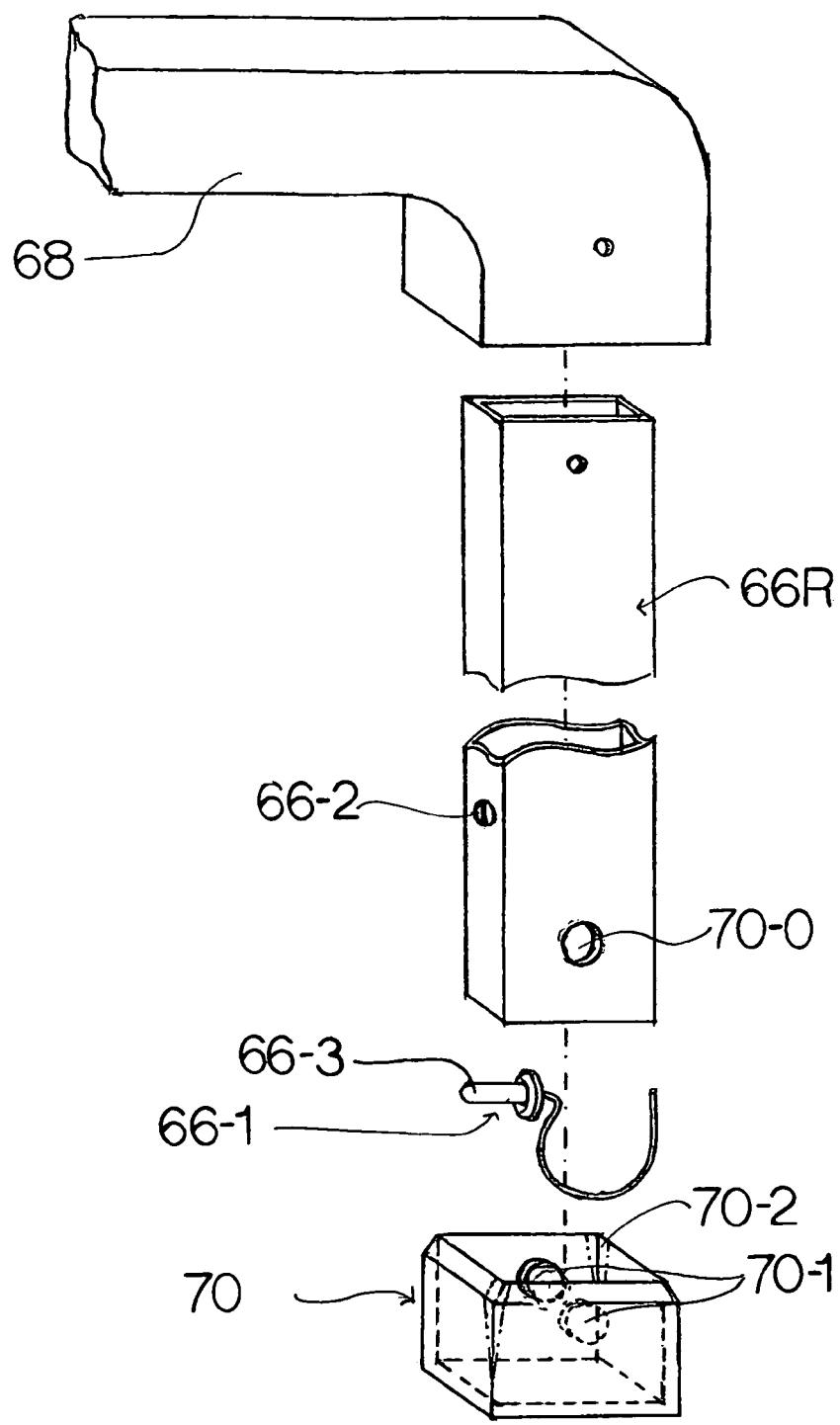
FIG. 5 is an oblique view of the fourth largest right tube with its respective bottom retaining cap and spring button and a fragment of the top handle bar.

Referring to FIG. 5, a fourth and smallest pair of tubes, 66R may be included in the main frame of this invention. Tube 66R has an aperture 66-2 on its lower end on the side facing 66L. Each of the two other sides adjacent to said side has an aperture 70-0. A bottom retaining cap 70 has protrusions 70-1 on two facing inner walls. The top edge of each of its sides is beveled upward inwardly and two opposite upper corners have slits 70-2. The bottom of cap 70 may be open or close. Cap 70 dimensionally mates tube 66R and 60R. Protrusions 70-1 fit snugly into apertures 70-0. Snap button 66-1 is just a smaller version of button 60-1. It is dimensionally receivable through the bottom of tube 66R with its head 66-3 disposed into aperture 66-2 and its leg disposed along the longitudinal dimension of tube 66R. The handle bar 68 dimensionally receives the upper end of tubes 66R and 66L.

FIG. 6 illustrates the dimensional relationship between the four retractable tubes, their respective top and bottom retaining caps, and their respective snap buttons. As you can see, tube 54R dimensionally mates into top cap 52, tube 60R mates into top cap 58R, tube 66R mates into top cap 62. Bottom retaining caps 56L' and 56R' dimensionally mates tube 54R with tube 50R. Bottom cap 64 dimensionally mates tube 60R with tube 54R. Bottom cap 70 dimensionally mates tube 66R with tube 60R.

Assembly of the Components Described Above

Referring to FIGS. 14-A and 14-B, assembly of the upright components of the pack carrier is as follows:

1. Snap button 66-1 is inserted into the bottom of tube 66R and its positioning member 66-3 is engaged into aperture 66-2.
2. The bottom of tube 66R is then slipped into retaining cap 70 facilitated by the corner slits 70-2. Protrusions 70-1 accordingly lock into apertures 70-0.
3. Top retaining cap 62 is inserted into the top of tube 60R, facilitated by slits 62-5 and lock into place when protrusions 62-1 mate with apertures 62-0. Orifice 60-0' aligns with terminal cavity 60-0.
4. Tube 66R is inserted into the bottom of tube 60R.
5. Snap button 60-1 is inserted into the bottom of tube 60R. Positioning member 60-3 of button 60-1 is engaged into aperture 60-2.
6. The bottom of tube 60R is then slipped into retaining cap 64 facilitated by the corner slits 64-6. The aperture 60-2 on tube 60R should be on the same side as terminal cavity 60-0. Protrusions 64-1 accordingly lock into apertures 64-0.

Steps 1 thru 6 are done for the left tubes as well. The resulting sub-assembly is shown as the upper portion of the middle member on FIG. 14-C.

7. Snap button 54-1 goes through the bottom of tube 54R. Positioning member 54-3 of said button is engaged into aperture 54-0.
8. The bottom retaining cap 56R' is gently extended to align the push-in fasteners 56-IR' with apertures 56-0 on tube 54 before being pushed in.
9. After the cap 56R' is fastened onto one side of tube 54R, the C-type leg 54-4 of snap button 54-1 is guided into channels 56-2 of fasteners 56-1R' and 56-10 where it remains.
10. The other half of bottom cap 56L' is installed in the same manner as that for cap 56R'. A small window 56-4 is provided at the bottom of cap 56L' to allow the assembler the means to guide a portion of the snap button leg 54-4 into the channels 56-2 of the newly installed fasteners 56-1L'.
11. Top retaining cap 52 is inserted into the top of tube 50R facilitated by slits 52-4. Protrusions 52-1 accordingly lock into apertures 52-0.
12. The last aperture 50-0 on tube 50R is temporarily covered or blocked.
13. Tube 54R is inserted into the bottom of tube 50R. Snap button 54-1 engages into the second to the last aperture 50-0 on tube 50R. At this point, an adequate upper portion of tube 54R is left projecting at the top of tube 50R.

Steps 7 thru 13 are done for the left tubes as well. The completed sub-assembly is shown in the lower portion of FIG. 14-C.

Figure 15:
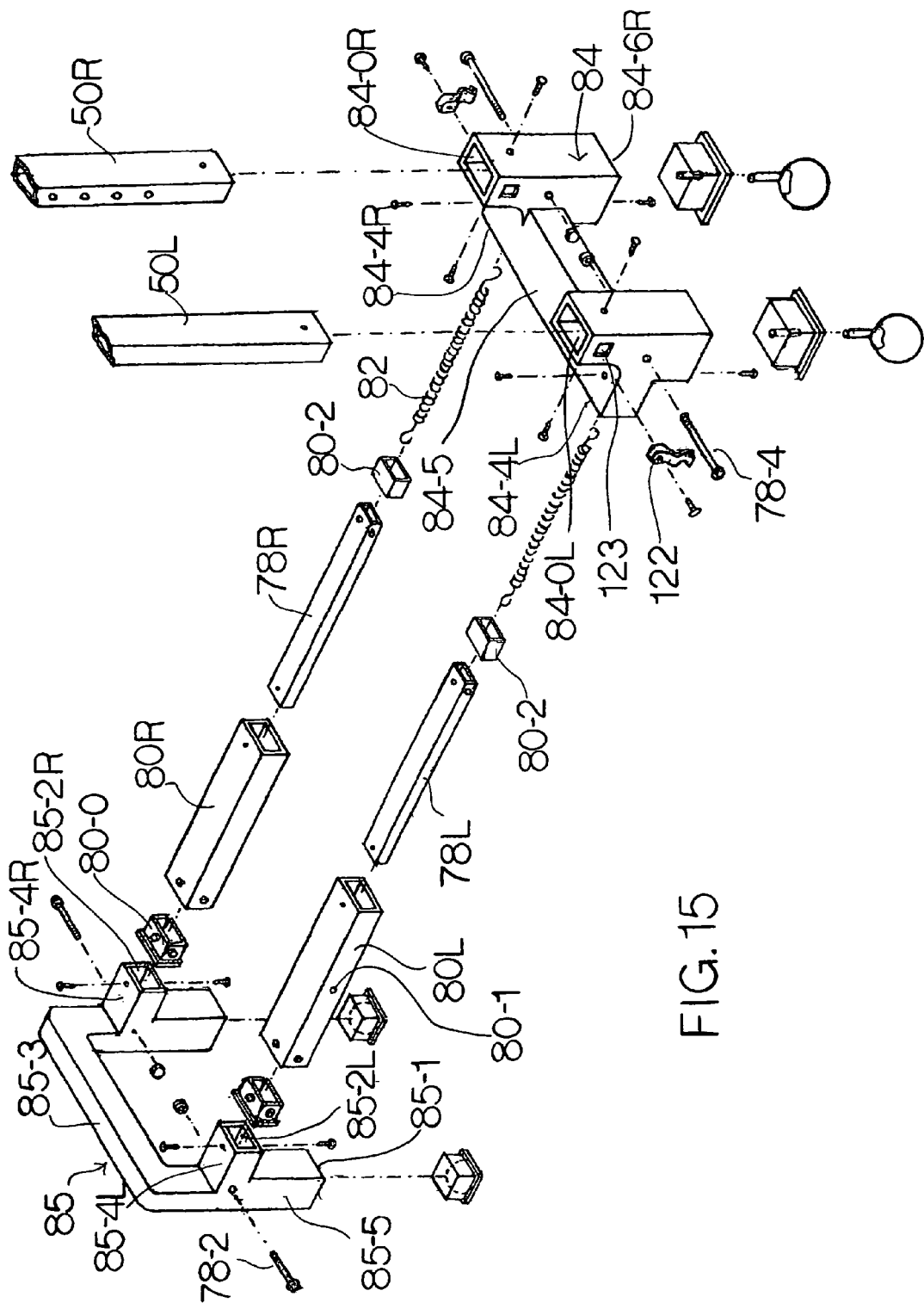
FIG. 15 is an exploded isometric view illustrating the assembly of the self-adjusting base of the present invention.

14. Tube 50R with tube 54R in it and tube 50L with tube 54L in it are both inserted into base 84 sockets 84-0R and 84-0L respectively and fastened in front and back with screws. Refer to FIG. 15 for an illustration of base 84. An upright position for the tubes 50R and 50L will facilitate succeeding assembly work.
15. A transverse bar with gripping means for a backpack strap is assembled doing steps that will be discussed separately. It has a left and right terminals. The left terminal is mated into a side socket 58-6L of retaining cap 58L and fastened in place with screws. The right terminal is likewise mated into socket 58-6R of cap 58R and fastened in place with screws.
16. The top of the previous assemblies on tubes 66R and 60R, and 66L and 60L are each inserted through the bottom of caps 58R and 58L respectively of the assembly done in step 15. The beveled section 58-2 of caps 58R and 58L will be resting on the beveled top edge 64-4 of bottom caps 64 on tube 60R and 60L respectively.
17. The upper ends of tubes 66L and 66R are received into their respective sockets in handle bar 68 and are permanently fastened into place with screws.
18. The projecting upper portion of tubes 54R and 54L resulting from the completed assembly of steps 7 thru 14 are then inserted through the bottom of caps 58R and 58L of the assembly in step 16. The top edges of tubes 54R and 54L stop upon reaching the flat section 58-3 of caps 58R and 58L respectively. Cap 58R is fastened onto tube 54R, cap 58L is fastened onto tube 54L with screws that do not go beyond the inner walls of tubes 54L or 54R.

Description of the Horizontal Components of the Invention

Referring to FIGS. 1 and 15, the substantially horizontal frame comprise mainly of two pairs of telescoping tubular members 80L and 80R, and 78L and 78R held in parallel relationship by rear base plate 84 and a raised front base 85. Tube 80R has an aperture on each side towards its outer end. A front retaining cap 80-0 is open at the top, has an upper rim, a protrusion on the outer face of each side, slits on two opposite upper corners and a bottom edge that is beveled upward inwardly. If tube 80R has the same cross sectional dimensions as tube 50R, cap 80-0 would be the same as cap 52 shown in FIG. 2. Cap 80-0 dimensionally mates into tube 80. The protrusions on cap 80-0 fit snugly into the said apertures on tube 80R. An optional aperture 80-1 may be provided in the midsection of each of the exposed sides of tubes 80R and 80L. Its function will be discussed in a later section.

For maximum base expansion capacity, the next smaller tube, tube 78R is made slightly longer than tube 80R. It also has an aperture on each side towards its inner end. A rear retaining cap 80-2 is open at the bottom, has a protrusion on the inner face of each side, slits on each of the upper corners, and a top edge that is beveled upward inwardly.

Figure 26:
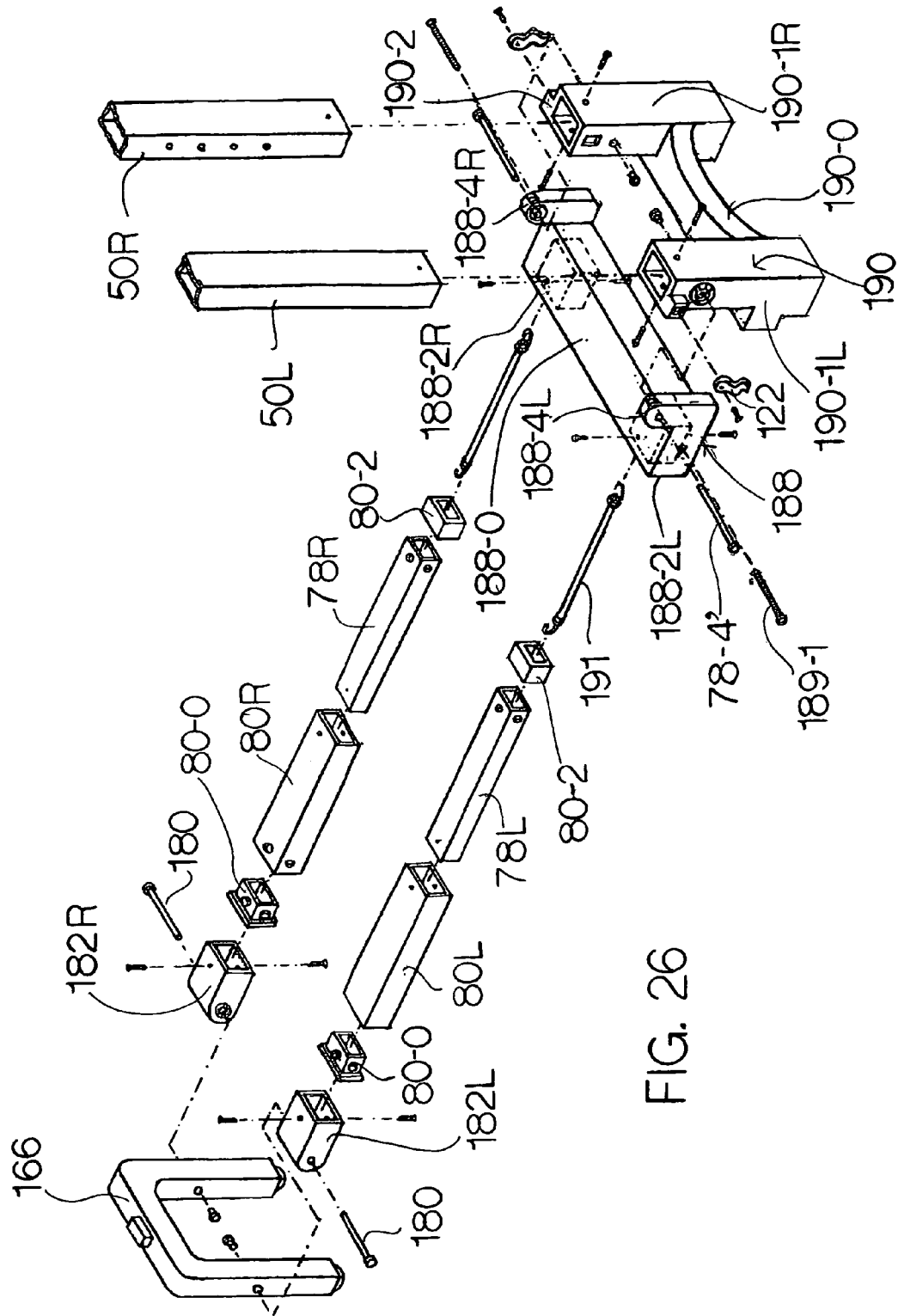
FIG. 26 is an exploded fragmentary isometric view of the assembly of the lower portion of the pack carrier in FIG. 25-A.

Referring to FIG. 9, an extension spring 82 including its terminal hooks has a free length slightly less than the distance between the back anchoring rod 78-4 and the front anchoring rod 78-2. Its diameter is such that it can operate freely inside tube 78R. It should be comfortably extendible up to about twice its free length. The extension spring 82 can be substituted with an elastic cord having similar capabilities. FIG. 26 shows one example of such cord.

Rear base 84 comprise of a pair of rear members each having three sockets namely: an upright top facing socket 84-0R or 84-0L, an upright bottom-facing socket 84-6R or 84-6L, and a front lateral socket 84-4R or 84-4L for the right or left tubes respectively. The pair of rear members is joined together by a rear transverse bar 84-5 that also acts to maintain a parallel relationship between the pairs of upright members and between the pairs of horizontal members. Referring to FIG. 13-A, each leg houses a shallow non-circular recess 123 into which a slinging hook 122 is fastened. Hook 122 is a small replaceable member whose midsection 122-0 extends outward, followed by a lower section 122-2 that first extends inward and finally a section 122-3 that extends outward. The upper section 122-4 is shaped for mating and mounting with a screw onto the shallow non-circular recess 123.

Raised front base 85 comprise of a pair of front members each having two extensions each normal to each other and each terminating with a socket. The bottom extensions 85-5 form the front legs and terminate with sockets 85-1. The inwardly lateral extensions 85-4R and 85-4L terminate with sockets 85-2R and 85-2L respectively. The pair of front members is joined together by a front transverse bar 85-3 that extends upward beyond the level of the horizontal tubes.

Assembly of the Horizontal Components Described

Referring to FIG. 15, assembly of the base is as follows:
1. A rear anchoring rod 78-4 is snugly installed through a small side hole going through the cross section of each upright rear member and terminated on the other end with a cap.
2. A slinging hook 122 is fastened onto recess 123 of each rear member of base 84.
3. A front anchoring rod 78-2 is snugly installed through a small side hole going through the cross section of each lateral extension of base 85 and terminated on the other end with a cap.
4. Bottom retaining cap 80-2 is slipped onto the end of tube 78R where the apertures are. The protrusions accordingly lock into the apertures.
5. Top retaining cap 80-0 is slipped into the end of tube 80R where the apertures are. The protrusions accordingly lock into the apertures.
6. Referring to FIG. 9, the extension spring 82 is attached to rear anchoring rod 78-4 by its hooked end. The end is then crimped with a tool to prevent it from slipping out.
7. The free end of extension spring 82 is shoved into the capped end of tube 78R.
8. The uncapped end of tube 78R is shoved into the uncapped end of tube 80R.
9. Tube 80R is then pushed into socket 84-4R of rear base 84 and fastened thereon with short screws.
10. The free end of extension spring 82 is "fished" out from inside nesting tubes 78R and 80R using a tool that can reach inside tube 78 in case the spring is so much shorter than tube 78. The fished-out end is extended until it reaches and attaches to front anchoring rod 78-2 in the lateral extension 854R or 85-4L of base 85 where it is crimped in place.
11. The uncapped end of tube 78R is engaged into socket 85-2R of front base 85 and fastened thereon with short screws.
12. Steps 4 thru 11 are repeated for the left side members as well.
13. The rear casters and their sockets are installed into bottom sockets 84-6 of rear base 84.
13. The front ball bearing glides are installed into bottom sockets 85-1 of front base 85.

Description of the Folding Raised Front Member

Referring to FIGS. 20-A and 20-B, the raised front member may be folded down to accommodate luggage that is deeper than the fully expanded platform of the carrier. Because the front legs cannot self-extend accordingly, the loaded carrier could tip forward. It should be promptly tilted back for rolling.

Description of Gripping Means

A. Rotating Knob Assembly I, 87

Referring to FIGS. 10-A, 10-A', and 10-A", the rotating knob assembly, 87 comprise of a transverse bar 90, a knob housing 88, a contact bushing 86-6, a knob stopper 86-4, a rotating knob 86, and side stops 90-2.

Transverse bar 90 is a cylindrical tube having towards the center of its longitudinal axis a friction generating surface 90-4. It has two small holes proximal each edge of surface 90-4. The length of transverse bar 90 is determined by the distance between the left and right upright telescoping tubes. Its diameter is such that it is receivable inside cylindrical socket 58-6R of cap 58R.

A contact bushing 86-6 consist of a non-cylindrical upper portion that has a cylindrical hollow or cavity along its longitudinal axis. The lower portion consist of a wider cylindrical member with a wider cylindrical hollow along it longitudinal axis. The bottom of this cylindrical member is arched to conform to the arched surface 90-4. It may also have a rough surface to enhance holding power between bar 90 and other moving parts in the assembly. Bushing 86-6 has a slightly smaller diameter than the inner diameter of housing 88.

Knob housing 88 looks like a cylindrical T-fitting with an inner diameter that allows transverse bar 90 to be snugly disposed in it. The upright arm of knob housing 88 has an inner surface 88-0 that is threaded from the top to a level that is determined in conjunction with the vertical dimensions of contact bushing 86-6 and rotating knob 86. Referring to FIG. 10-A, this level is such that there is some working room above the cylindrical lower portion of bushing 86-6.

A knob guide 86-4 is a cylindrical member with a threaded outside surface that dimensionally mates into the threaded inner surface 88-0 of knob housing 88. It has a non-cylindrical hollow along its longitudinal axis that fits over the upper portion of contact bushing 86-6.

Rotating knob 86 consist of a spherical top 86-0, a cylindrical middle section 86-1 that has a threaded outside surface, and a push-in fastener 86-2 at the bottom. The threads of section 86-1 dimensionally mate with surface 88-0 of knob housing 88.

Side stop 90-2 is simply an arched member with two small push-in fasteners on its bottom surface.

Assembly of Rotating Knob I, 87

Knob assembly, 87 is assembled as follows:
1. Contact bushing 86-6 is dropped into the upright arm of knob housing 88.
2. Knob guide 86-4 is threaded down surface 88-0 with a tool that mates with its non-cylindrical center cavity until it reaches the lowest threaded point where its inner cavity aligns with the non-cylindrical upper portion of contact bushing 86-6. Note that a significant part of bushing 86-6 is resting meanwhile inside the transverse arm of housing 88.
3. With knob housing 88 turned upside down, transverse bar 90 is gently pushed into the transverse arm of knob housing 88 until the friction conducive surface 90-4 inside falls right next to the upright arm of housing 88. Housing 88 has to be turned upside down to keep the contact bushing 86-6 out of the way. It also acts as a means to engage the upper portion of bushing 86-6 into the knob guide 86-4 cavity.
4. Push-in fasteners at the bottom of side stops 90-2 are aligned with their respective holes on transverse bar 90 and then pushed into place.
5. The rotating knob 86 is screwed into knob housing 88. Its push-in fastener bottom goes through the cylindrical inner cavity on bushing 86-6 and finally anchored into the larger cylindrical cavity on the lower portion of bushing 86-6.

Operation of Rotating Knob Assembly I, 87

Referring to FIGS. 10-A, 10-A', and 10-A", rotating knob 86 can be rotated along its longitudinal axis while inside knob housing 88. The threads are oriented so that by convention, knob 86 goes down as it is turned clockwise and goes up as it is turned counter-clockwise. The non-circular center cavity of knob guide 86-4 prevents contact bushing 86-6 from rotating with knob 86. The bottom of guide 86-4 acts as an obstruction that prevents knob 86 from leaving knob housing 88. Bushing 86-6 gets lifted up as knob 86 is turned counter-clockwise. It sinks into surface 90-4 of bar 90 as knob 86 is turned clockwise, thereby tightening the connection between bar 90 and knob housing 88.

Starting from a loosened position of knob 86 as shown in FIG. 10-A", knob housing 88 is rendered free to rotate along the longitudinal axis of transverse bar 90. This is because there is no contact between bushing 86-6 and surface 90-4 of bar 90. Tightening the grip on the backpack handle strap after it is attached to the knob assembly is accomplished by the rotation of knob housing 88 along the longitudinal axis of bar 90. After the grip is tight enough, rotating knob 86 is turned clockwise. The final fixed position of rotating knob 86 is variable depending on the user's preferences. The user has to determine by experimenting on how much of the strap has to be wound around the knob housing 88 before the housing 88 is moved to its desired fixed position. FIG. 16-A illustrates the operation based on the assumption that an upright final position of knob housing 88 is desired. To loosen and release the handle strap, the user turns the rotating knob 86 counterclockwise to loosen contact with surface 90-4 of bar 90 and then moved toward the direction of the backpack. Side stops 90-2 simply prevent knob housing 88 from shifting along bar 90.

B. Rotating Knob Assembly II, 89

Referring to FIGS. 10-B, 10-B', and 10-B", knob assembly 89 comprise of a transverse bar 90, a knob housing 88', a contact bushing 87-2, a rotating knob 86', bolt stopper 88-4, and side stops 90-2.

Knob housing 88' looks like housing 88 except for its upright arm. This arm has a small aperture 86-5 on one side and requires less number for threads on its inner surface than that in housing 88. Actually, housing 88 will serve the purpose of housing 88' after a small aperture is made on its side.

Contact bushing 86-6' is a solid cylindrical member with a flat top and a bottom arched to fit the arc of surface 90-4. The bottom may also have a rough surface to enhance holding power between the transverse bar 90 and other moving parts in the assembly.

Rotating knob 86' consist of a spherical top 86-0', a cylindrical middle section 86-1' that has a threaded outside surface, and a cylindrical bottom section 86-2' that terminates with a flange.

Assembly of the Rotating Knob Assembly II, 89

Knob assembly 89 is assembled as follows:
1. Transverse bar 90 is gently pushed into the transverse arm of knob housing 88' until surface 90-4 inside falls right next to the upright arm of housing 88'.
2. Side stops 90-2 are installed the same way as that for assembly 87.
3. Contact bushing 86-6' is dropped inside the upright arm of knob housing 88' positioned such that the bottom arch nests with the arch of surface 90-4.
4. Rotating knob 86' is screwed down until its bottom flange rests on top of contact bushing 86-6'.
5. Bolt 88-4 is mounted into hole 88-5.

Operation of Knob Assembly II, 89

Referring to FIGS. 10-B, 10-B', and 10-B", contact bushing 87-2 is not attached to knob 86'. Turning knob 86' clockwise enables its flanged bottom 86-2' to push contact bushing 86-6' down tightly onto surface 90-4 of tube 90. Turning knob 86' counter-clockwise simply loosens the contact between bushing 87-2 and surface 90-4. It cannot eliminate it. Nevertheless, knob housing 88' is still free to rotate along the longitudinal axis of tube 90. Bolt 88-4 in hole 88-5 act as an obstruction preventing knob 86' from leaving housing 88'. Except for its internal parts, knob assembly 89 operates in the same way as knob assembly 87 in how it grips and tightens the backpack handle strap.

C. Rotating Knob Assembly III, 91-A

Referring to FIGS. 11-A, 11-A', and 11-A", the rotating knob assembly 91-A comprise a transverse bar 90A with sidestops 90-2, a knob housing 88-A, a top-like locking member 84-A, a compression spring 85-A, a barrier 87-A, and finally a knob 86-A.

Transverse bar 90A has a fixed contact surface 90-4A which consist of deep grooves running longitudinally along bar 90A and spreading along the circumference of said bar.

Knob housing 88-A differs from previous housings 88 and 88' because no portion of its inner surfaces is threaded. This is because knob 86-A is not tightened using rotational motion. The lower section of the inner walls is made thicker to support barrier 87-A.

Locking member 84-A has a rod-like knob connector 84-2A on top and a gear tooth contact surface 84-0A at the bottom.

Barrier 87-A is basically a cylinder with a pair of wing funnels 87-0A on the top and a thicker walled bottom that acts as stopper 87-2A for compression spring 85-A and locking member 84-A. It dimensionally mates into the thinner walled section of knob housing 88-A.

Knob 86-A is a sphere with its lower section carved out to make room for the funnels, 87-0A of barrier 87-A. It also has a socket 86-2A that dimensionally mates with the upper section of knob connector 84-2A.

Assembly of Rotating Knob III, 91-A

Rotating knob 91-A is assembled as follows:
1. Transverse bar 90-A is gently pushed into the transverse arm of knob housing 88-A until surface 90-4A inside falls right next to the upright arm of housing 88-A.
2. Side stops 90-2 are installed as in previous knob assemblies.
3. Locking member 84-A is dropped into the upright arm of housing 88-A.
4. Compression spring 85-A is dropped onto locking member 84-A.
5. Barrier 87-A is mated into the upper thinner section of housing 88-A with the pair of funnel wings conveniently positioned either in line with or normal to bar 90-A and fastened in place with screws or permanently glued in place.
6. Knob connector 84-2A of locking member 84-A is screwed or permanently glued into socket 862A of knob 86-A. At this point, contact surface 84-0A is lodged in one of the deep grooves on surface 90-4A of bar 90-A.

Operation of Rotating Knob III, 91-A

Right after assembly, the unit is in locked position. To unlock, knob 86-A is lifted up via the bottom portion of knob cap 86-0A that is not occupied by funnel 87-0A. Locking member 84-A is consequently lifted and contact surface 84-0A is dislodged from the groove it is in on surface 90-4A. Spring 85-A is compressed in the process. Knob 86-A has to remain lifted so that it can be rotated radially around bar 90-A. With the knob positioned below bar 90-A, the backpack handle strap is then wrapped around the knob assembly as illustrated in FIG. 16-A. The funnels 87-0A of barrier 87-A act as deterrents for preventing the wound handle strap from slipping out of the knob and from obstructing the locking and unlocking of the knob assembly. Locking consists of simply releasing the lifting force on the knob at its desired position.

D. Rotating Knob Assembly IV, 91-B

Referring to FIGS. 11-B, 11-B', and 11-B", the rotating knob assembly 91-B consist of a transverse bar 90-B with side stops 90-2, a knob housing 88-B, a locking member 84-B, a barrier 87-B and finally a knob 86-B.

Transverse bar 90-B is basically the same as bar 90-A. Knob housing 88-B is the same as 88-A.

Locking member 84-B is similar to locking member 84-A except for an added locking extension 84-4B extending radially outward on the shaft between knob connector 84-2B and moving contact surface 84-0B.

Assembly of Knob Assembly IV, 91-B

Knob assembly 91-B is assembled as follows:
1. Transverse bar 90-B is gently pushed into the transverse arm of knob housing 88-B until surface 90-4B inside falls right next to the upright arm of housing 88-B.
2. Side stops 90-2 are installed as in previous assemblies.
3. Locking member 84-B is dropped into the upright arm of housing 88-B. Its contact surface 84-0B is lodged into a groove on surface 90-4B of bar 90-B.
4. With the funnel wings positioned conveniently as in the previous knob 91-A, barrier 87-B is pushed in past locking extension 84-4B, mated into knob housing 88-B and then screwed or glued in place.
5. Knob connector 84-2B of locking member 84-A is screwed or glued into socket 86-2B of knob 86-B.

Operation of Knob Assembly 91-B

After assembly, the unit is in locked position. Locking extension 84-4B is below extension 87-2B. To unlock, knob 86-B is lifted up via the exposed bottom portion of knob cap 86-0B. Locking member 84-B is lifted by virtue of its being attached to knob 86-B. Extension 84-4B pushes upward against extension 87-2B which, in turn, gives to allow extension 84-4B to go through and be released. At this unlocked position, extension 84-4B is above extension 87-2B. Contact surface 84-0B is dislodged from its groove on surface 90-4B. At this unlocked position, the knob and housing can be rotated to positions necessary for easy attachment of the backpack handle strap to the knob assembly as shown in FIG. 16-A. Knob 86-B is pushed down to lock once the desired final position is reached.

E. Ratchet Grip Assembly 91-C

FIG. 12-A illustrates a cross-sectional front view of the entire ratchet grip assembly. The parts are grouped into several sections and are detailed in FIGS. 12-B thru 12-D. The external parts are labeled in FIG. 12-A to help relate the location of the internal parts to the entire assembly.

Referring to FIG. 12-B, a revolving grip 94 basically consist of a turning arm 100 and a holding arm 98 joined together with a handle grip 94-0 to use for operation of the assembly. Left leg 94-1L joins the turning arm 100 to handle grip 94-0. Right leg 94-1R joins the holding arm 98 to handle grip 94-0. Arm 102 is fixed onto leg 94-1L while arm 98 is not. Turning arm 100 terminates on the left with a flat-bottomed anchor 104 and on the right with a socket 102. Holding arm 98 terminates on the right with a flat-sided neck 98-2 and a retainer 98-4 and on the left with a socket 98-0.

Grippers 96L and 96R are spring plungers. A spring plunger is simply an encased spring button that is press fit into a socket. As shown in FIG. 12-B, the button head has three flat sides and a remaining side and the top forming a smooth arched surface. Gripper 96-L is pressed into socket 102 while gripper 96-R is pressed into socket 98-0. The arched surface of the buttons should be positioned toward the front side.

Handle grip 94-0 terminates on the right side with a hollow 94-2 and a flat base 94-4. Hollow 94-2 extends from the point on the right leg where it equals the length of the left leg 94-1L down to the same level where the turning arm 100 would rest if handle grip 94-0 were pushed down.

Compression spring 98-6 is of size receivable into hollow 94-2.

Bottom transverse bar 92BR and top transverse bar 92TR are basically longitudinal halves of a cylindrical tube. Their right ends connect the ratchet grip assembly to retaining cap 58R on FIG. 3-A. Their left ends form flange 92-8 extending inwardly that dimensionally mates with channels 106-0 on link 106FR and link 106BR. Bar 92TR and bar 92BR have plates transversely disposed inside their longitudinal cavity. Next to the plate 92-6T on transverse bar 92TR on the flange side is a small side extension called stopper 106-2R' whose function will be evident shortly. Each plate in bar 92BR and bar 92TR has a bottom guide slot 92-60B and a top guide slot 92-60T. These slots are just wide enough to fit in neck 98-2 of holding arm 98. Between flange 92-8 and these plates is a channel 92-5 that dimensionally receives rim 106-1 and wall stopper 106-2R of links 106BR and 106FR.

The middle section of the transverse bar consist of two longitudinal halves namely: the middle top half 92MT and the middle bottom half 92MB. Each half bar has half of a ratchet 92-0L on the left end and 92-0R on the right end with teeth capable of interlocking with the button head of grippers 96L and 96R respectively. Bars 92MT and 92MB are bound on both ends with flange 92-6 extending inwardly.

Referring to FIG. 12-A, a catch 95 is disposed on the middle part of the outer surface of transverse bar 92MT.

Referring to FIG. 12-C, back right link 106BR, front right link 106FR, back left link 106BL, and front left link 106FL are similar to a longitudinally halved tee pipe fitting. Links 106FR and 106FL, and 106BR and 106BL have channels 106-0 running along its perimeter on both ends. These channels are bound on the edges by rim 106-1. Back right link 106BR has a rim 106-1 on the right that terminates on top with a small outside extension called wall stopper 106-2R. Back left link 106BL has a rim 106-1 on the left that terminates on top with another wall stopper 106-2L. The cylindrical hollow inside each link features a deeper cavity 106-4 in the transverse midsection. Cavity 106-4 has a circular arc except for its bottom portion, which is notched down deeper to create a flat surface 106-4'.

Spring socket 98-8 houses a compression spring 98-6. Shape-wise, it is cubical with a U-shaped groove on top. The hole for the spring 98-6 extends down from the midsection of this groove. Its flat bottom rests on the flat section 106-4' of cavity 106-4 inside left side links 106BL and 106FL.

Referring to FIG. 12-C, transverse bars 92TL and 92BL are basically longitudinal halves of a cylindrical tube. Their left ends connect the ratchet grip assembly to retaining cap 58L on FIG. 3-A. The right end of both bars has a flange 92-8 extending inwardly that dimensionally mates with channels 106-0 on links 106FL and 106BL respectively. Inside transverse bar 92TL, disposed close to its midsection, is a housing for unlocking cavity 116' and locking cavity 116".

Locking member 112 is founded on a longitudinal lower half of a cylindrical tube. Locking knob 112-0 is disposed at the bottom, a flat top locking surface 112-2 is on the right, and a cylindrical spring housing 112-4 is at the center. It can easily slide or move along the longitudinal axis of transverse bar 92TL. Channel guides 118 are simply two small grooves disposed longitudinally on the outer wall of member 112. Spring housing 112-4 has a notched top to accommodate the physical dimensions of the housing for cavities 116' and 116". The socket for locking spring plunger 116 extends down from the surface of this notch. Locking spring plunger 116 is has a dome-shaped head. Transverse bar 92BL also has knob opening 114' and two protrusions 118' running longitudinally on its inner wall.

Referring to FIG. 12-D, assembly of the ratchet grip is as follows:

1. All spring plungers, 96L, 96R, and 116 are press fitted into their respective sockets.
2. A compression spring 98-6 is inserted into hollow 94-2 in right leg 94-IR of grip 94. Another compression spring 98-6 is inserted into spring socket 98-8.
3. Turning arm 100 of revolving grip 94 is laid on the U-shaped groove atop spring socket 98-8 where compression spring 98-6 already is.
4. Spring socket 98-8 with turning arm 100 on top of it is laid on the flat section 106-4' of cavity 106-4 of left back link 106BL. The left leg 94-1L should occupy the upright branch of link 106BR.
5. Left front link 106FL is fastened with screws to link 106BL thus encasing the left leg 94-1L and part of turning arm 100 of grip 94. Screws go through tiny slots 106-3 protruding from strategic parts of the outer walls of the links where they cannot interfere with the mechanisms inside.
6. Holding arm 98 is turned so that retainer 98-4 can be urged through hollow 94-2 of right leg 94IR.
7. Right leg 94-1R of grip 94 is laid on the flat section 106-4' of cavity 106-4 of right back link 106BR.
8. Right front link 106FR is fastened with screws to link 106BR thus encasing the right leg 94-1R and part of holding arm 98.
9. Neck 98-2 of holding arm 98 is disposed into bottom guide slot 92-60B on plate 92-6B of transverse bar 92BR with retainer 98-4 in a transverse position. Flange 92-8 of bar 92BR concurrently nests into channel 106-0 of already joined right links 106BR and 106FR. Rim 106-1 of these links nest into channel 92-5 of bar 92BR. Wall stopper 106-2R aligns with stopper 106-2R'.
10. Bar 92 TR is fastened over bar 92BR with screws going through holes 92-4' on bar 92TR and screw housing rods 92-2'.
11. The portion of the turning arm 100 with socket 102 and the holding arm 98 with socket 98-0 are enclosed with middle transverse bars 92MB and 92MT which are fastened together with screws that go through screw holes 92-4 and housing rods 92-2. Concurrently, flanges 92-6 on both ends of bar 92MT and 92MB nest with channel 106-0 of links 106BR and 106FR on the right and with channel 106-0 of links 106BL and 106FL on the left. Also, grippers 96L and 96R each interlock with a ratchet tooth space.
12. Locking member 112 is laid on transverse bar 92BL with locking knob 112-0 exposed through knob opening 114'. Concurrently, protrusions 118' on bar 92BL mate with channel guides 118 on locking member 112.
13. Flanges 92-8 of transverse bars 92BL and 92TL are slid simultaneously into channel 106-0 on the left side of already joined links 106BL and 106FL and fastened together by screws going inward through depressions 120 on the outer walls of bar 92BL. Concurrently, housing for cavities 116' and 116" fit within the notched top of spring housing 112-4 of locking member 112.

Operation of Ratchet Grip Assembly 91-C

The series of figures FIGS. 12-E1L thru 12-E4L show the partial cross section of assembly 94 (refer to FIG. 12-B) when viewed from the left side and focused on spring plunger 96L when the handle grip 94-0 is in the forward motion.

The series of figures FIGS. 12-E1R thru 12-E4R show the partial cross section of assembly 94 when viewed from the right side and focused on spring plunger 96R when the handle grip 94-0 is in the forward motion.

The series of figures FIGS. 12-E1L' thru 12-E4L' show views from the left side and focused on plunger 96L when the handle grip 94-0 is in backward motion.

The series of figures FIGS. 12-E1R' thru 12-E4R' show views from the right side and focused on plunger 96R when handle grip 94-0 is in backward motion.

Referring to FIGS. 12-A thru 12-E and E' series and FIG. 16-B, the backpack handle strap 12-4 is hooked onto catch 95 from behind. Handle grip 94-0 is rotated forward. Inside, gripper 96L travels up and down along left ratchet 92-0L as shown on FIG. 16-B' because its beveled surface 96-0 gives when pushed against a ratchet tooth surface 92-00. Gripper 96R remains nested in a ratchet tooth space. Its flat surface 96-2 resists pressure from the flat ratchet tooth surface 92-02. The spring inside the gripper cannot be compressed to allow movement of the ratchet. This allows transverse bar 92MT and 92MB to remain stationary even as the handle bar 94-0 is rotated forward. Note that the handle bar 94-0 cannot be rotated backward beyond its highest position. Nor can it be rotated forward beyond its lowest position at the bottom. This is because stopper 106-2R' on the right transverse bars 62TR and 62BR bump into wall stopper 106-2R of link 106BR. Likewise, stoppers 106-2L' on the left transverse bars 62TL and 62BL bump into wall stopper 106-2L of link 106BL.

When handle bar 94-0 is rotated backward from its forwarded position, the flat surface 96-2 of gripper 96L pushes against the flat ratchet tooth surface 92-02 thus propelling the middle transverse bars 92MT and 92MB to turn simultaneously in the same direction as handle bar 94-0. Concurrently, gripper 96R travels up and down along right ratchet 92-0R because its bevelled surface 96-0 gives when the bevelled tooth surface 92-00 of ratchet 92-0R pushes against it. Neck 98-2 of holding arm 98 keeps gripper 96 always upright.

The forward and backward motions of the handle grip 94 may be done several times as is necessary to tighten the grip of the ratchet assembly on the handle strap of the backpack. In contrast to that of rotating knob assemblies 87 and 89, the final position of handle bar 94-0 does not depend on the preferences of the user. This is because the revolving grip 94 can be locked in place only when it is in the upright position. Referring to FIGS. 12-A and 12-C, after the final motion of the handle grip 94 is made to the upright position, locking knob 112-0 of locking member 112 is shoved inward. The knob's locking surface 112-2 slides beneath anchor 104 of turning arm 100 thereby resisting forward movement of handle grip 94. Locking member 112 is held in this locked position by its locking spring plunger 116 that has concurrently lodged inside locking cavity 116" of transverse bar 92T.

To release the backpack handle strap, locking knob 112-0 is shoved outward. Locking surface 112-2 slides away from beneath anchor 104. Then, handle grip 94 is pushed down and maintained in that "down" position. Turning arm 100 and holding arm 98 compress their respective springs 98-6. Grippers 96L and 96R release their grip on their respective ratchets. The backpack strap is pulled away and is unwounded as the transverse bars 92MT and 92MB spin freely to release it.

Padded Back Support

Referring to FIG. 23-A, the padded back support is a cushioning envelope 162 made using resilient material like foam, rubber, flexible plastic, encased air, fiberfill, cotton, or other similar material, 162-0, that is of adequate thickness, placed between the main frame of the pack carrier and the user's back, to eliminate the discomfort derived from direct contact with the rigid upright handle assembly when the pack carrier is used in the backpack mode. Referring to FIG. 23-C, support 159 is an example of an ergonomically designed support to promote good posture, more comfort, and less fatigue for the user. It may be shorter than just the plain pad in FIG. 23-A to allow room for vertical adjustment. The resilient material may be pre-molded and fitted over the upright tubes without a separate casing or it may be a resilient sheet inserted into the pocket of a case made of fabric, vinyl or similar covering material. The case may be designed to form a loop through which the upright members can go, thereby retaining the padded support with the carrier. The bottom corners 162-4 may be notched to expose slinging hooks 122. The covering material is preferably slightly stretchable for ease in slipping it over the upright members and also to hold itself in place around tubes 50R and 50L. It can further have means at its bottom corners to secure it onto the pack carrier. The covering may also be furnished with harnesses, waist belts, pockets or extra flaps for storage and for protection of the user's clothes from the dirty wheels when the carrier is used in the backpack mode.

Referring to FIG. 23-C' the optional ergonomic component could be a supplemental cushion 163 made of resilient material that is adjustably movable along the exposed face of the cushioning envelope by some means like hook and loop fasteners. The loop and hook components of the fastener may be mounted on the face of the envelope and on the supplemental cushion respectively. The loop component may be inherent in the fabric that the exposed face of the envelope is made of thereby obviating the need for mounting a separate loop component and providing unlimited position options for cushion 163. A pocket may be provided for storage of the cushion. Referring to FIG. 23-C''', a pocket made of very stretchable fabric can serve not only for storage but also to maintain the padding in the right position, thereby obviating the use of the hook and loop fastener. The exposed side of cushion 163 is shaped and positioned to conform to a section of the posture correct inwardly contoured spinal curvature of the user's body primarily between the thoracic and lumbar regions. The lateral cross-sectional shape of the cushion can generally range from a teardrop to a circle and segments therefrom. One possible shape is that of a segment of a teardrop cut along a line parallel to its long axis. Another possible shape is that of a segment of a circle. The radius of curvature will be depended on the contour of the user's back. The body is no longer than the width of the cushioning envelope. Referring to FIG. 23-D, if the user's backpack is provided with the same attachment means as that on the cushion, the supplemental cushion can also be transferable for use on the backpack alone. Referring to FIG. 23-D' another means to attach said pad to the backpack is by a closed loop structure like a tiny ring of small strap attached to both side edges of the exposed surface of the cushion 163. The loop structure can than receive the lower section of the shoulder straps and confined in place by a lump or equivalent on the strap that could also be used in conjunction with the slinging hook 122 of the pack carrier. The loop structure can also be stretchable to adapt to the distance between the lower ends of the shoulder straps.

Referring to FIGS. 23-E, 23-E', and 23-E'', a well equipped padded back support 164 further includes, in addition to the supplemental cushion 163 and its attachment means, a waist/hip belt 165, a supplemental shoulder harness 166-1 and 166-2, a pocket 164-1 or flap 164-2, one or more supporting loops 164-3 on top, a side loop 164-4 at each of the bottom corners, another loop on the lower section of each side. If the base of the waist belt is wide enough, the loop on the lower section can be embodied in a slit 165-1 on the base of the waist/hip belt itself, which also serves as an exit for the harness when it is not needed.

Equipped with the supporting loop 164-3 and waist/hip belt 165, the back support 164 can be detached from the main frame of the pack carrier and used behind any pack as a comfortable back cushion as shown in FIG. 23-F. With the shoulder harness components 166-1 and 166-2, support loop 164-3, and side loops 164-4, support 164 can transform packs without shoulder straps into 'backpacks'. Referring to FIGS. 23-F' and 23-F'', the upper portion 166-2 of the supplemental harness is terminated on one end with a flexible strap and on the other end with a loop structure or a D ring. The flexible strap is for connecting to the buckle on the lower portion 166-1 of the harness. The end with the loop structure or D ring is for connecting to the pack's own handle straps or to a transverse bar on the pack carrier. The D ring may also be replaced with a flexible strap and buckle combination shown in FIG. 67-C. The side loops 164-4 anchor the back support onto the hooks 122 of the pack carrier when the supplemental harness is used. When not in use, the waist belt is pulled back toward the front to embrace the body of the pack or to be stored on the front face of the back support. A person carrying an ergonomically padded carrier and backpack equipped with a supplemental lumbar cushion are shown in FIGS. 23-C''' and 23-D'' respectively.

An alternate back support is a two-piece slim back pad 158 that may be of the same resilient material as support 162. Referring to FIG. 23-A, pads 158 may be pre-molded so that its inner dimensions conform to the outer dimensions of the largest tube 50R or 50L. It encloses the tube the same way the common pipe insulators do to utility pipes.

Both the one-piece and two-piece back supports may be fastened around the main frame with hook and loop fasteners, snap fasteners, ties, laces, buttons, zippers, adhesive, or other state of the art means.

Operation of Pack Carrier

A. Height Adjustment of Transverse Bar with Gripping Means

Referring to FIGS. 3-A, 4, 6, and 8-A, handle bar 68 or handle bar 76 is pushed down until the bottom retaining caps 64 of tubes 60R and 60L touches the bottom caps 56R' and 56L' on each of tubes 54R and 54L. This is evident when tubes 66R and 66L begin to retract into tubes 60R and 60L respectively. Snap button 54-1 on tube 54R is pushed in as deep as possible with a fingertip to disengage its positioning member 54-3 from aperture 500 of tube 50. The elevated section of catch 54-2 latches onto bumper 64-2 of cap 64. Snap button 54-1 on tube 54L is likewise pushed in as deep as possible with a fingertip. Its catch latches onto bumper 64-2 of cap 64L. While the snap buttons are held by the bumpers in that position, the transverse bar assembly is freely moved up or down until its desired height is reached. Then handle bar 76 or 68 is pulled up until snap buttons 66-1 on tubes 66R and 66L is engaged into aperture 60-0 of tubes 60R and 60L thereby drawing out tubes 60R and 60L from tubes 54R and 54L respectively. The bumpers 64-2 where buttons 54-1 are latched on get lifted thereby releasing positioning member 54-3 which in turn is wiggled into the closest aperture 50-0 on tubes 50R and 50L.

Referring to FIGS. 3-A, 8-A, and 8-B, the quarter cylinder bumper 64-2 in bottom retaining cap 64 of tube 60R may be replaced with a pair of rigid substantially quarter cylindrical shaped longitudinally mounted bumpers 289 on cap 64'. The catch 54-2 on snap button 54-1 is replaced with a catch 290. Catch 290 comprise of a flexible member with a tapered front 290-1, a midsection that has a latching surface 290-2, and a stem 290-3 of width no bigger than the distance between the pair of bumpers 289. Catch 290 contracts as it is urged into the section between the pair of bumpers 289 and then goes back to its original size right after the latching surface clears the end of said bumpers. To unlatch, bumpers 289 are lifted up together with the handle assembly thereby releasing button 54-1. The process is shown in FIGS. 8-B1 thru 8-B4.

Referring to FIG. 8-C, a third alternative is a pair of narrower, flexible longitudinally mounted bumpers 294 on cap 64". Catch 292 becomes a rigid member with a tapered front 292-1, a midsection that has a latching surface 292-2, and a stem 292-3 of width no bigger than the distance between the pair of bumpers 294. Bumpers 294 flex sideways as rigid catch 292 is urged into the section between them. They go back to its original position right after the latching surface 292-2 of catch 292 clears them. To unlatch, bumpers 294 are lifted up together with the handle assembly thereby releasing button 54-1. The process is shown in FIGS. 8-C1 thru 8-C4.

Getting the proper distance between the transverse bar and the base of the pack carrier that is suitable for a particular backpack can be achieved by adjusting means. Adjusting means may involve raising or lowering the transverse bar having the gripping means in conjunction with fixedly located hooks 122. In a later section on bike pack carriers, it is also shown that adjusting means can also involve raising or lowering the housing for the hooks or cleats in conjunction with a fixed located gripping means (FIG. 52-C).

B. Installing the Padded Back Support

Referring to FIGS. 23-A and 23-C, the one-piece cushioning envelopes 162 or 159 the two-piece support 164 is slipped down over the upright components of the carrier until its bottom front edge rests on the corners where the horizontal and upright components meet.

C. Attachment of Backpack to the Carrier

Figure 17:
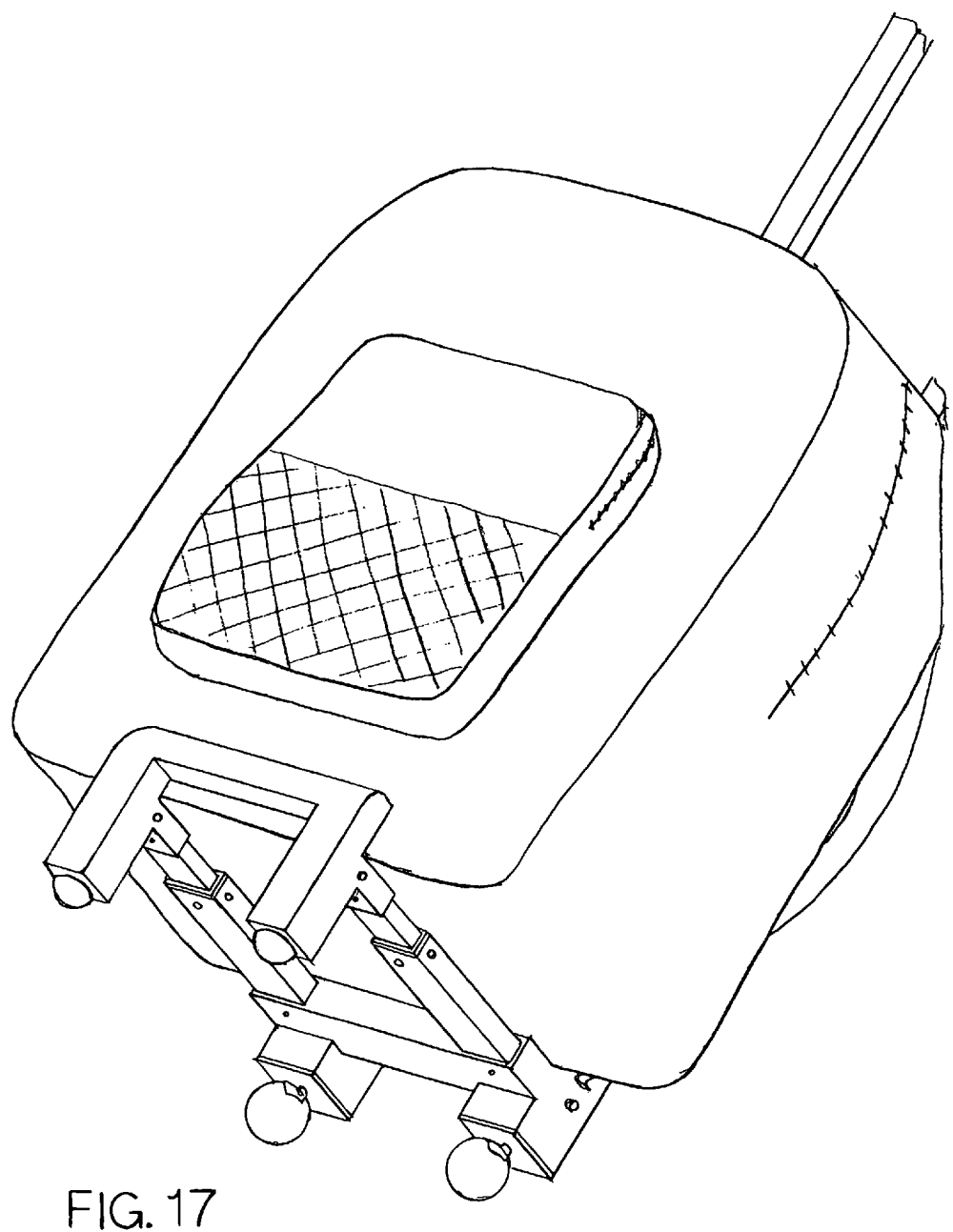
FIG. 17 is a bottom perspective view of the self-adjusting pack carrier base of the present invention.

The backpack is laid onto the horizontal base components. Referring to FIGS. 15 and 17, the front transverse bar 85-3 of raised front base 85 is pushed forward by the lower front face of the backpack. Referring also to FIGS. 9-A and 9-B. Consequently, the smaller tubes 78R and 78L telescope out of tubes 80R and 80L respectively. The extent of expansion is just enough to accommodate the extra depth of the backpack. The adaptability of the spring, cord, or equivalent elastic member disposed inside tubes 78R and 80R makes this happen. FIG. 9-B illustrates the sectional view of the relevant portions of the base when the maximum expansion possible is reached. Front retaining cap 80-0 on tube 80R come together with rear retaining cap 80-2 to prevent tube 78R from leaving tube 80R. Because the raised transverse bar 85-3 and the front legs are all parts of one front base, they move together in the same direction. Therefore, the location of the front legs relative to the outer edge of the backpack is maintained. This prevents the pack and carrier from tipping over.

Referring to FIG. 16-A where the gripping means shown can be that of any knob assemblies, 87, 89, 91-A, 91-B, the user is preferably positioned behind the backpack. The rotating knob is loosened either by turning counter-clockwise for assemblies 87 and 89 or by lifting for assemblies 91-A and 91-B to allow their respective knob housings to rotate along the longitudinal axis of transverse bar 90. The knob housing is brought as close as possible to the backpack handle strap 124. Strap 124 is wound as many times as necessary around the neck of the housing before the housing is rotated back up to its desired final position. The operating details were presented earlier with each of the gripping means.

Referring to FIG. 16-B where the gripping means is that of a ratchet grip assembly, the user is preferably positioned in front of the backpack. The handle strap 124 is latched onto catch 95 from behind. The handle bar 94-0 is rotated forward and the backward several times as is necessary to tighten the grip on the handle strap.

The upper portion of the backpack is retained by any of the possible gripping means described and their equivalents. Any of this gripping means can be referred to as a possible first retaining means. Many of them have control means to effect a snug connection.

Referring to FIGS., 13-A, 13-B1 thru B3, and 19, each of the lower unpadded ends of the backpack straps are disconnected from the padded upper portion and knotted to form a lump or obstruction 130 big enough to prevent the strap from going through the slinging hook 122. A small ring or bead may also be added in the knot to provide a bigger and more secure obstruction. Then each of the lower ends of the straps is slung onto their respective hooks 122. With the strap lump 130 positioned on the side of hook 122 that is opposite the backpack, the strap is entered beneath the outward extension 122-3. An upward pull of the strap urges the inward extension 122-2 to move outward slightly and allow the strap to go through until it reaches the midsection 122-0 where it stays in place. The unpadded ends are then reconnected with their respective padded upper ends of the backpack strap via buckles or snap fasteners that already come with the straps. A hook 122 or its equivalent can be referred to as a second or third retaining means.

Figure 18:
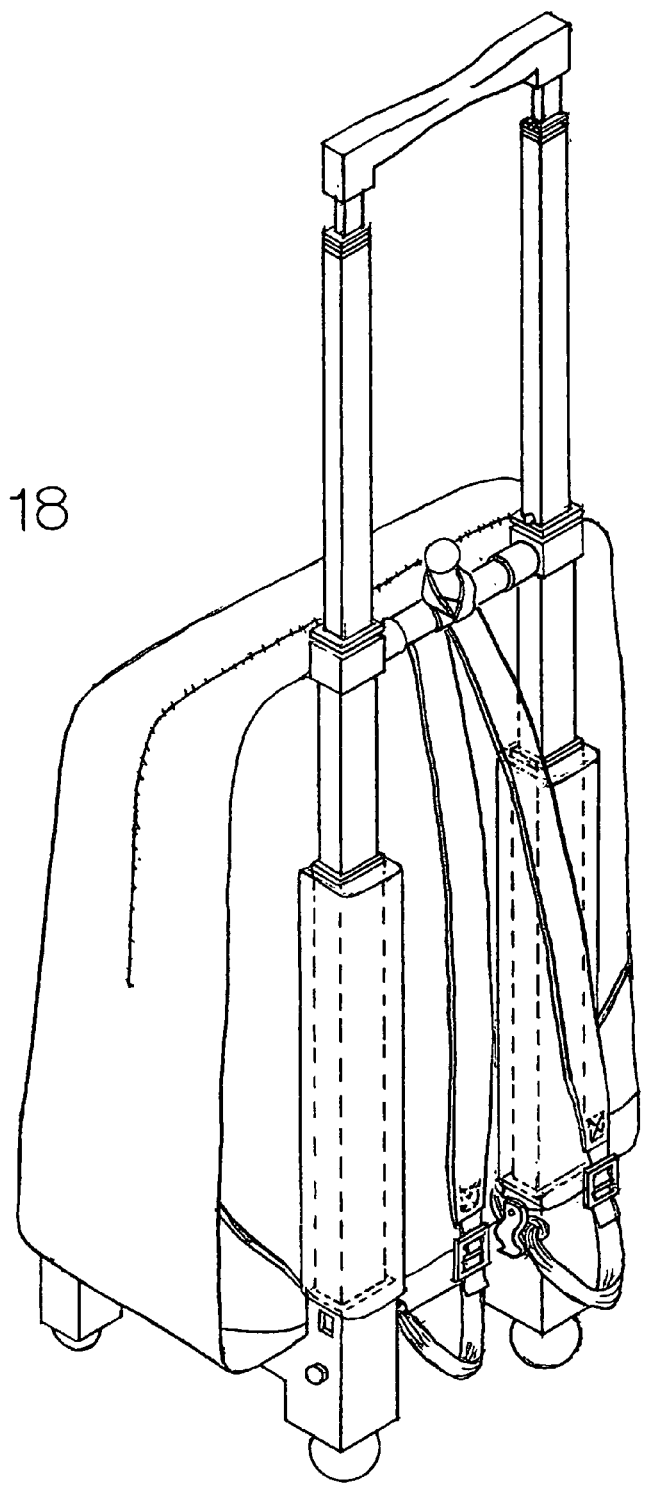
FIG. 18 is an isometric view of the loaded pack carrier using separate cushioning wraps for each column and a hook 122 located inwardly.
Figure 19:
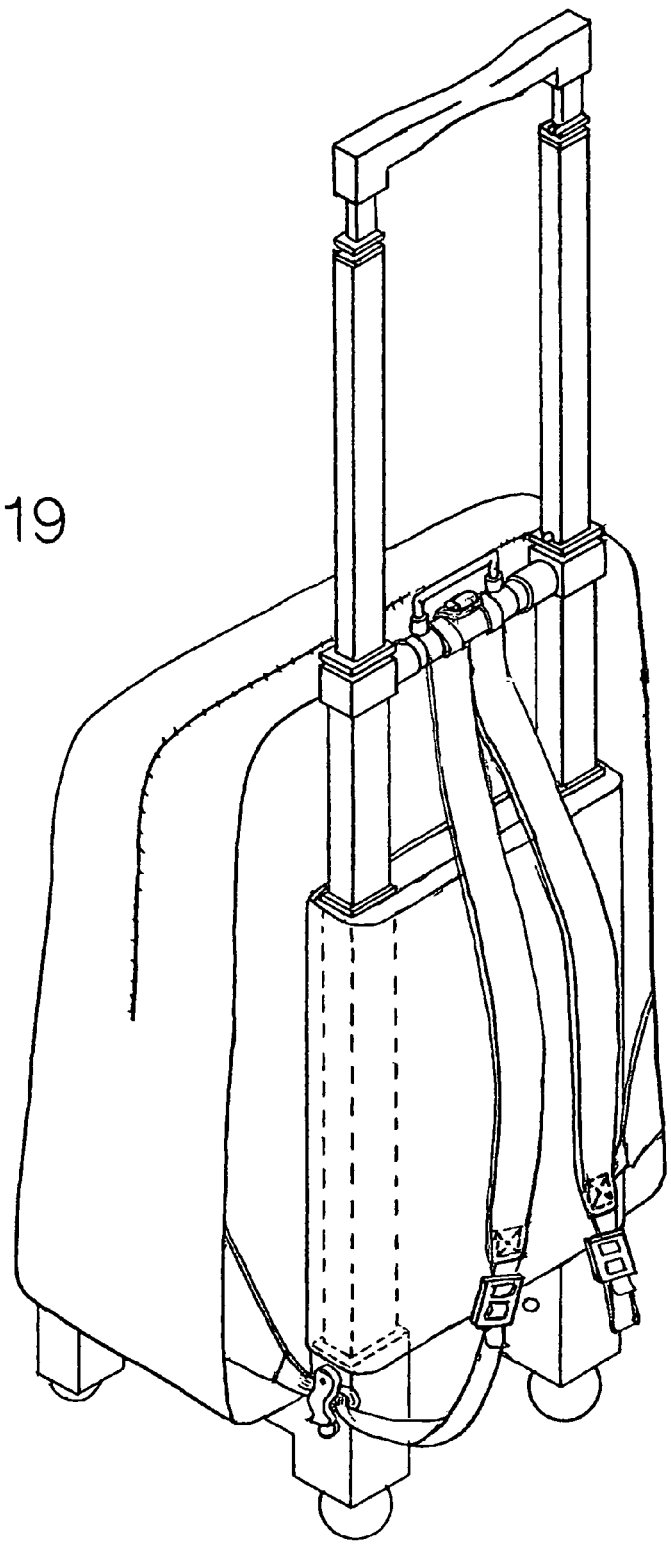
FIG. 19 is an isometric view of the loaded pack carrier using a one-piece cushioning envelope for all columns and a hook 122 located outwardly.

Referring to FIG. 18, if hooks 122 are installed in the inner side of the base, the knotted straps can be slung and unslung onto hooks 122 without having to be separated first from the upper padded ones. This is particularly advantageous especially when used in conjunction with the two-piece slim pack support pads 164 shown in FIG. 23. It allows the backpack to be detached from the carrier within a very short time. Referring to FIG. 19, if the hooks 122 are installed on the outer side of the base, it would be desirable for the lower unpadded strap and the upper padded strap to be connected and reconnected by snap fasteners or release buckles to save time. Some backpacks come already equipped with these time saving fasteners. Several other types of fasteners may be mounted in place of hook 122. It is preferable that they all secure the backpack on its rear corners just using the strap itself without the addition of an adaptor or the like. Other possible types, namely cleats 316, 1044, 1045, and 1056 are presented in later sections of this disclosure. Likewise, each of them can also be referred to as a second or third retaining means.

D. Operation of Handle Assembly

Handle bar 68 is pulled up. Positioning members 66-3 of snap buttons 66-1 in tubes 66R and 66L engage into their respective terminal cavities 60-0 in tubes 60R and 60L. Tubes 60R and 60L are drawn out of tubes 54R and 54L respectively. Positioning members 60-3 of snap buttons 60-1 in tubes 60R and 60L engages onto guide notches 58-4R and 58-4L of tubes 54R and 54L respectively. The top retaining caps 58R and 58L meet with their respective bottom retaining caps 56L' and 56R'. Top retaining caps 62R and 62L meet with their respective bottom retaining caps 70. The vertical components are tilted back and pulled. The pack carrier rolls on the ground on its rear wheels or casters.

To retract, handle bar 68 is pushed down. Positioning members 60-3 are urged back into tubes 60R and 60L by guide notches 58-4R and 58-4L respectively. Tubes 60R and 60L retract terminally into tubes 54R and 54L respectively after which positioning members 66-3 of snap buttons 66-1 begin to retract into tube 66R and 66L just from the downward force further applied to the handle bar. At this point, tubes 66R and 66L start to retract into tube 60R and 60L respectively until resistance from caps 58R and 58L or from the rotating assembly components is encountered by the handle bar 68.

Quasi-permanent Height-adjustable or Height-selecting Handle Bar I

A fourth pair of tubes may be added to the handle assembly that can be extended quasi-permanently. The same quasi-permanent extension can be adapted to a two or three-pair tube assembly. Referring to FIGS. 7-A and 14-D, tube 72R is dimensionally receivable inside tube 60R. It has apertures 72-0, 72-1, 72-2, and 72-3 disposed along its side facing tube 72L. It also has apertures 70-2 on the front and back toward its lower end and a notch 72-4 on its upper end facing 72L. A control rod 74 is dimensionally receivable inside tube 72R. It has a switch arm 74-4 extending outwardly. It also has a drilled aperture 74-0 near its upper end and another drilled aperture 74-2 near its lower end both facing the side where switch arm 74-4 extends. Spring plungers 74-1 and 74-3 have extra long positioning members 74-10 and 74-30 respectively. Extensions 74-6 and 74-7 behind the apertures accommodate the extra length of the spring plungers and also serve as stabilizers.

Handle bar 76 has a cavity 76-2R capable of receiving the upper ends of tube 72R and control rod 74. It has a switch window 76-0R disposed on the inner side facing 72L.

Assembly of the adjustable handle bar is as follows:
1. Spring plungers 74-1 and 74-3 are each press fit into apertures 74-0 and 74-2 respectively on control rod 74.
2. The upper portion of control rod 74 is wriggled into cavity 76-2R from below until its switch arm 74-4R is jutting out of window 76-0R.
3. Control rod 74 is disposed bottom first inside tube 72 by first compressing the positioning members 74-10 and 74-30 as they enter the top of tube 72R until positioning member 74-10 engages into aperture 72-1.
4. The upper end of tube 72R is eased into cavity 76-2R and fastened at the front and at the back with screws. Note that notch 72-4 on tube 72R align with window 76-0R on handle bar 76 so that movement of switch arm 74-4R is not obstructed.
5. Another control rod 74 may be installed in the same manner on the left side members of the assembly.

Operation of the Adjustable Handle Bar I

Referring to FIG. 7-BA, the illustration shows the position of control rod 74 when 72R is at its shortest usable length. This is probably best for a short person. At this position, only spring plunger 74-1 is active because its positioning member 74-10 is engaged in aperture 72-1 on tube 72R. Plunger 74-3 is not. From a retracted position of the handle assembly, switch arm 74 is pushed down to its lowest position. The extra-long positioning member 74-10 of spring plunger 74-1 gets engaged into aperture 72-1 of tube 72-R. Handle bar 76 is then pulled upward. Positioning member 74-10 engages into the first aperture that it encounters which happens to be terminal cavity 60-0 of tube 60R. Spring plunger 74-3 in control rod 74 and snap button 66-1 in tube 72R are rendered inactive.

To switch from one position to another from an extended position, one has to push positioning member 74-10 into tubes 60R and 72R before the switch arm 74 can be moved. One might need the aid of a narrow article to reach in through terminal cavity 60-0 and through the particular occupied height-defining aperture on tube 72R. Any activated positioning member has to be pushed in again when the handle assembly is retracted for the first time after the switch. The change in height becomes evident on the succeeding extensions of the handle assembly. To avoid having to push any active positioning member after switching is done, a notch 62-3 is made on cap 62 capable of urging in the active positioning member as tube 72R is pushed down into tube 60R as shown in FIGS. 4, 6, and many others.

The second illustration, FIG. 7-BB, shows the position of control rod 74 when about half the length of 72R is rendered usable. This would be best for a person of medium height. At this position only spring plunger 74-3 is active because it is aligned with an aperture 72-2. Plunger 74-1 is not.

From an extended position of the handle assembly, the current active positioning head is pushed inward through tubes 604 and 72R and maintained while switch arm 74 is placed in a middle position. The extra long positioning member 74-30 of spring plunger 74-3 gets engaged into aperture 72-2 of tube 72R. Handle bar 76 is pulled upward. Positioning member 74-30 engages into terminal cavity 60-0 of tube 60R, drawing tube 60R out from that point on. Spring plunger 74-1 and snap button 66-1 are rendered inactive.

The third illustration, FIG. 7-BC, shows the position of control rod 74 when the entire length of 72R is rendered usable. This would be best for a tall person. At this position, none of the spring plungers in the control rod 74 are activated. Neither plunger is aligned with any aperture on 72R that is capable of aligning with terminal cavity 60-0 of tube 60R.

From an extended position of the handle assembly, the currently active positioning member is pushed inward while switch arm 74 is pushed up to the highest position. Positioning member 74-10 of plunger 74-1 gets engaged into aperture 72-0 of tube 72R. Aperture 72-0 simply serves to anchor the control rod 74R while not in use. In a retracted handle position, positioning member 74-10 remains on top of retaining cap 62 which is above aperture 60-0 in tube 60R. Handle bar 76 is pulled upward. Positioning member 66-3 of snap button 66-1 engages into terminal cavity 60-0 in tube 60R drawing out tube 60R from then on.

The previous illustrations show a control rod shortened to include only two plunger buttons. Referring to FIGS. 7-CA thru 7-CC, a plunger button 66-1' can very well be appended to a longer control rod in place of the snap button 66-1. This obviates the need for aperture 72-0 to anchor the shorter control rod when none of its positioning buttons are active. Furthermore, smaller adjustment increments may be achieved by inserting more plunger buttons on the control rod and more corresponding apertures on tube 72R.

In addition, the positions of the positioning members relative to their respective activating apertures may be reversed. The switching directions are reversed accordingly.

Adjustable Handle Bar II

Another way to effect a quasi-permanent height adjustment on the handle bar is one that lends itself appropriately to an assembly of tubes having a circular cross-section.

Referring to FIG. 7-D, a spiral control rod 75 is dimensionally receivable inside tube 73. Plunger buttons 75-1, 75-2, and 75-3 are arranged spirally along the length of the control rod. The top of rod 75 is flanked by a top retaining flange 75-4 and a non-cylindrical anchoring hollow 75-40.

Tube 73 is dimensionally receivable inside tube 71. It has apertures 73-1, 73-2, and 73-3 vertically aligned along its length, each aperture defining a particular handle height.

Tube 71 has a terminal cavity 71-1 on its upper end closest to the line of apertures on tube 73.

Button heads 75-1-, 75-20, and 75-30 are capable of being engaged one at a time into height-defining apertures 73-1, 73-2, and 73-3 in tube 73 respectively. The particular button head currently engaged in a height-defining aperture is capable of being engaged further into the terminal cavity 71-1 of tube 71. This is possible because the row of apertures on tube 73 and the terminal cavity 71-1 on tube 71 are on the same vertical plane that goes through the center common to both tubes 73 and 71.

Handle bar 79 is a lifting member that also provides housing for the top terminals of tube 73 and the control knob 77 for control rod 75. It may have a marker 79-3 to indicate the line of height-defining apertures in tube 73 below.

Control knob 77 has a top retainer 77-3 that the user manipulates and is labeled according to the positions of the plunger buttons on the control rod 75 below. It also has a cylindrical body 77-2 and a bottom non-cylindrical anchoring plug 77-1. Plug 77-1 mates with hollow 75-40 of rod 75.

Top retaining cap 71-3 and bottom retaining cap 73-5 hold tubes 73 and 71 together.

Assembly of height adjustable handle bar II is as follows:
1. Bottom retaining cap 73-5 is mounted to the bottom of tube 73 aided by slit 73-52. Protrusions 73-7 engage into apertures 73-4 on tube 73.
2. Top retaining cap 71-3 is mounted to the top of tube 71. Protrusions 71-30 engage into apertures 71-20 of tube 71.
3. The top of tube 73 is inserted through the bottom of tube 71 until a good portion of tube 73 is jutting out the top of tube 71.
4. The bottom of control rod 75 is inserted into the top of tube 71 in the assembly in step (c) until bottom retainer 75-4 rests on top of tube 71 while compressing the plunger button heads. At this juncture, all button heads are aligned in the same horizontal plane as their respective height-defining apertures on tube 71.
5. The top of assembly in (d) is inserted into tube housing 79-1 of handle bar 79 where it is fastened in place by a permanent adhesive or with very short screws that do not go beyond the inner walls of tube 73.
6. Anchoring plug 77-1 is coated with permanent adhesive and control knob 77 is inserted into knob housing 79-2. Anchoring plug 77-1 adheres permanently into the anchoring hollow 75-40 of rod 75. Its cylindrical body 77-2 nests inside knob housing 79-2.

Operation of Height Adjustable Handle Bar II

From a retracted position of the handle assembly, the user turns the control knob 77 to direct the desired height setting label on the top retainer 77-3 to the marker 79-3 on handle bar 79. The corresponding plunger button on control rod 75 engages into its respective aperture on tube 73. The handle is lifted up. Tube 73 extends out of tube 71 only until the specific plunger button in (a) engages into the terminal cavity 71-1 of tube 71. Further lifting of the handle now extends tube 71 out of the next larger tube it is in. As discussed earlier, it is necessary to press the active plunger button inward before turning the control knob 77 during adjustment.

Adjustable Handle Bar II Variation

A variation of adjustable handle bar II involves the means by which the plunger buttons are made communicable to any of the height-defining apertures on tube 73. In the adjustable handle bar II, this is done by turning a control knob that is directly connected to the control rod inside a fixed tube 73. This time, tube 73 is grasped and turned around a fixed control rod instead as shown in FIG. 7-D'.

Control rod 83 is similar to rod 75 in FIG. 7-D except for its upper section. Rod 83 has no flange and it has an inside threaded mounting cavity 83-0.

Handle adaptor 83-2 is an elbow terminating on one end with a lateral socket 83-24 and on the other end with a plug 83-20. Plug 83-20 is a cylindrical extension threaded on the outside except for a short smooth section 83-22. Plug 83-20 threads down into cavity 83-0 of control rod 83. It also has labels 83-26 indicating the positions of the plunger buttons below. Plug 83-20 and mounting cavity 83-0 may be made to mate securely with other means other than threading. The use of a very strong permanent adhesive on their roughened surfaces one is one alternative means.

Top retaining cap 81 has a lower cavity 81-2 dimensionally capable of receiving the upper portion of tube 13 through the bottom. It has a top cavity 81-4 that goes through to the lower cavity 81-2 dimensionally capable of receiving plug 83-20 through the top. It has a marker 81-6 indicating the vertical alignment of the height defining apertures on tube 73 below.

Adjustable handle bar II variation is assembled as follows:
1. Steps 1, 2, and 3 of the adjustable handle bar II assembly are applied.
2. Plug 83-20 of handle adaptor 83-2 is received into the top of cap 81.
3. The top of control rod 83 is received through the bottom of cap 81 and mated or threaded with plug 83-20. The thread may be coated with permanent adhesive before threading for increased fastened strength.
4. The bottom of control rod 83 is received into the top of tube 73 of the assembly in step 1 until the top of tube 73 is snug inside the lower cavity 81-2 of cap 81 with control rod 83 inside it. At this juncture, all button heads in rod 83 are aligned in the same horizontal plane as their respective height-defining apertures in tube 73.
5. Cap 81 and tube 73 are fastened together with short screws that do not go beyond the inner walls of tube 73.

Height Adjustable Handle Bar III

Still another way to effect a quasi-permanent height adjustment is by using one plunger button for all height defining apertures.

Referring to FIG. 7-E, spiral control rod 75' has one plunger button 75'-1 at its lower end.

Tube 73' has toward its lower end a plurality of height-defining apertures 73'-1 arranged radially on the same horizontal plane as that of plunger button 75'-1 when the control rod 75' is installed in it.

Tube 71 has a plurality of height defining terminal cavities 71'-7, 71'-8', and 71'-9 spiraling along its length. Each terminal cavity has a corresponding height-defining aperture that is on the same vertical plane running through the center common to tubes 73' and 71'.

Handle bar 79' has markers 79'-3, 79'-4, and 79'-5 indicating the positions of the spirally arranged terminal cavities on tube 71' below.

Control knob 77' is labeled according to the position of the plunger button in control rod 75' below.

Assembly and operation from the viewpoint of the user is basically the same as in the adjustable handle bar II. The single plunger button that was set to engage into one of several height-defining apertures on tube 73' further engages into the corresponding height-defining terminal cavities on tube 71' every time the handle is lifted.

Adjustable Handle Bar III Variation

The adjustable handle bar II can likewise be modified wherein tube 73' is grasped and turned around a fixed control rod to communicate the single plunger button in the control rod to any of the height defining apertures on tube 73'.

Referring to FIGS. 7-E and 7-D', the new control rod will be similar to rod 75' in FIG. 7-E except for its upper mating section which is the same as that of control rod 83 in FIG. 7-D'.

The new handle adaptor will be similar to adaptor 83-2 except for the presence of only one label indicating the position of the plunger button below.

The new top retaining cap will be the similar to cap 81 except for the presence of more markers indicating the positions of the height-defining apertures below.

Assembly is basically the same as that for the adjustable handle bar II variation.

Adjustable Handle Bar I Variation

Finally, a variation of the adjustable handle bar I is also possible wherein the control rod is permanently connected to the handle bar, obviating the need for a switch arm on the control rod and for a window on the handle bar.

Seat and Backrest Option

The pack carrier can be tilted or inclined forward and used as a backrest in conjunction with a seat mounted and retained behind the main frame. Incling means are provided either by collapsible front legs, a fixable hinged connection, or simply by the shape of the connection between the upright and horizontal components of the pack carrier. Each of these means are described below.

Referring to FIG. 23-A, a seat 160 comprises of a polyethylene sheet or any thin pad just slightly smaller than cushioning envelope 162. Close to each of its top corners is an aperture 160-0 big enough for a cord 160-2 to go through. The seat is mounted onto the main frame by simply tying the cord 160-2 loosely on the lower section of the main frame tubes. When not being used, the seat is concealed inside the loop of the cushioning envelope 162. In addition to a loose tie mounting, the seat may also have slots on its top and bottom sections to facilitate its being pulled in and out of the cushioning envelope after and before use. One can use an extra length of cord when mounting the seat if he or she prefers to have the seat farther out during use.

Referring to FIG. 23-B, the seat 161 may comprise of a double-layered pad that is folded and unfolded as shown to protect the user's clothes from the dirty face of the seat when the pack carrier is used in the backpack mode. The double-layered pad 161 may be an integral part of the cushioning envelope as well.

Referring to FIGS. 20-C and 20-C', the front legs of the basic pack carrier are shaped to allow rocking motion when the handle assembly is tilted forward. The fixed connection between the main frame and the base can be reinforced for added strength.

Referring to FIG. 20-D, the same idea can be applied to a carrier that does not have an extendible base.

Description of Folding Front Legs

Referring to FIGS. 21-A, 21-B, 22-A, 22-B, and 22-C, the front legs of the basic pack carrier may be folded to allow the carrier to be used as a backrest. The raised front member does not fold down so that it can continue to provide support for the backpack still on the carrier. Each leg 132 has a hinge relationship to the raised front member 150. Leg 132 consist of leg frames 134 and 134', a controller 136, a locking member 138 and two compression springs 142.

Leg frame 134 consist of an upwardly extending side hinge section 134-6 that has a pin opening 134-8, a main body that has a top surface 134-4 that slopes upward outwardly, an opening 138' on the flat section of its top surface 134-4, a side opening 136' and several compartments or chambers inside. Chamber 134-0 houses locking member 138, the front end of controller 136, and a compression spring 142. Chamber 134-2 houses the rear end of controller 136 and another spring 142. Chamber 134-9 houses the socket for the ball bearing glide 85-0.

Controller 136 consists of a cubical shaped member whose rear half is hollowed out. The hollowed-out section 136-0 includes a downwardly sloping bottom section 136-1 extending towards the front. The solid front section serves as push button 136-4 which is receivable inside side opening 136' of leg frame 134.

Locking member 138 is also cubical with side flanges 138-0 at the bottom. Its top section 138-6 is receivable inside opening 138' of leg frame 134. The lower section has a carved out surface 138-2 that slopes upward inwardly from the bottom front and terminates on top with a neck 138-4.

Leg frame 134' is simply the fourth missing side of leg frame 134 opposite the side with the hinge section 134-6. It also has a pin opening 134-8', and a small rectangular protrusion plug 134'0. Plug 134'-0 has tiny narrow protrusions 134'-00 on top and bottom that slide into a short groove 136'-0 on side opening 136' of leg frame 134.

The raised front member 150 has a rounded front bottom edge shaped to allow free outward rotation of folding leg 132. It has hinge pin holes 135-0 and a bottom cavity 150-0.

Assembly of the folding front legs is as follows:

1. Locking member 138 is inserted into the bottom of the hollowed section 136-0 of controller 136.
2. The combination in step 1 is inserted into chambers 134-0 and 134-2 from the side of leg frame 134.
3. Spring 134 is disposed behind flange 136-2 of controller 136 in chamber 134-2. Push button 136-4 of controller 136 pops out through opening 136'. Flange 136-2 prevents controller 136 from leaving leg frame as well as stabilizes horizontal movement of controller 136 along channel 134-2.
4. Another spring 142 is disposed at the bottom of flange 138-0 of locking member 138 in chamber 134-0. The top section 138-6 of locking member 138 pops out through opening 138'. Flange 138-0 prevents locking member 138 from leaving leg frame as well as stabilizes vertical movement of said locking member along chamber 134-0.
5. The leg frame 134' is positioned onto the open side of leg frame 134. Protrusion 134'-00 slide into grooves 136'-0 of frame 134.

6. Frame 134' is fastened to frame 134 with screws.
7. A ball bearing glide 85-0 is mounted into chamber 134-9 of assembled leg 132.
8. Referring to FIG. 22-B, the assembled folding front leg 132 is mated onto the raised front member 150. All pin holes 134-8' and 135-0 are aligned and the exposed top section 138-6 of locking member 138 is lodged into cavity 150-0 of raised front member 150. A hinge pin 152 is inserted through the pin holes and capped at the end. The sloping surface 134-4 of leg frame 134 covers the otherwise unsightly gap between the rounded edge 150-2 of raised member 150 and the top of the main body of leg 132.

The assembled folding front leg is shown in FIG. 21-A.

Operation of the Folding Front Leg

Referring to FIGS. 22-A, 22-B, 22-C, and 22-C', each leg is folded down separately. Button 136-4 is pushed inward. The sloping surface of its hollow section 136-1 comes in contact with the sloping surface 138-2 of locking member 138, urging the locking member 138 downward. The top section 138-6 of member 138 dislodges from cavity 150-0 of raised front member 150. This renders the leg free to be pushed outward and up. With the legs out of the way, the padded carrier tilts back to be used as a backrest in conjunction with a seat 160 that slides out from under the cushioning envelope 162. The rounded front bottom edge 150-2 can also become an axis of rotation when the user desires to tilt the backrest even further back.

The installed seat, padded backrest and the folded front legs are shown in FIG. 21-B.

Description of Folding Front Legs and Topside Extension

Referring to FIGS. 15, 24-A, and 24-A', the front transverse bar 85-3 of raised front base 85 may be folded together with the front legs resulting in member 166. This is another method to enable the carrier to be converted to a backrest.

Referring to FIGS. 24-B and 24-B', a connector 182R replaces the previous right lateral extension 85-4R of the raised front base 85. One end is socket for the front uncapped end of smaller base tube 78R. An axis pin 180 that runs through its pin aperture 182-4 replaces the previous front anchoring rod 78-2. The other end opposite the socket and past pin 180 is closed and thick walled especially on the side adjacent to the folding raised member frame 168. This is to be able to carve a deep recess 182-2 on that side. The shape of recess 182-2 is that of a quarter section of a circle having pin aperture 182-4 as its center. Upright notch 182-6 and folding notch 182-8 are further carved outward on the recess, one on each end or 90° apart. The section between the notches is deterrent 182-0 with an inner arched surface conforming to the arc of a circle with aperture 182-4 as its center.

A push control member 170 basically consist of a bar having a raised midsection called push button 170-2 and two legs 170-4R and 170-4L at each end. Each leg terminates in a positioning tip 170-6 extending outwardly. Tip 170-6 has an arched top surface designed to mate with the arch on surface of deterrent 182-0. This facilitates sliding of the tip 170-6 from one notch to the other. Tip 170-6 also has an arched bottom designed to mate with the surface of axis pin 180.

A folding raised member and leg frame 168 looks like an inverted U terminating in sockets for glides or casters. It houses the push control member 170 and functions as the raised front transverse bar 85-3 and the front legs 85-SR and 85-5L of FIG. 15. To house the control member 170, frame 168 has an opening 168-0 on its top midsection, a tip window 168-2 on each side adjacent to each respective recess 182-2, and apertures 168-4 just below said window. Other protrusions keep member 170 in place.

Assembly of member 166 is as follows:

1. Compression spring 184 is anchored onto the frame wall underneath opening 168-0.
2. Push control member 170 is inserted into frame 168 from the back. Push button 170-2 is urged outside opening 168-0 by spring 184. The positioning tips 170-6 enter through openings 168-6 and protrude out from windows 168-2.
3. The back wall 168' of frame 168 is fastened to the latter with screws. Protrusions 168-6' on back wall 168' close openings 168-6 on frame 168.
4. Ball bearing glides or casters are installed into the bottom sockets of 168.
5. Member 168 is positioned upright between connectors 182R and 182L with both right and left positioning tips 170-6 lodged into their respective upright notches 182-6.
6. Axis pins 180 are inserted through apertures 182-4 on connectors 182R and 182L from the exposed side going all the way through aperture 168-4 on frame 168.
7. The ends of pins 180 are capped with caps 180'.

Operation of Folding Member 166

At an upright position of member 166, positioning tip 170-6 is lodged into upright notch 182-6 and held there by the strength of compression spring 186. To fold, button 170-2 is pushed and held down while member 166 is rotated forward about axis pin 180. This is so because tip 170-6 has to clear deterrent 182-0 before it can begin to move into another notch. After member 166 is rotated halfway, pressure on button 170-2 can be released. The contact between the surface of deterrent 182-0 and the arched surface of positioning tip 170-6 allows free rotation of member 166. When member 166 has reached its final horizontal position, tip 170-6 drops into folded notch 182-8 and is held there by the resistance of spring 186. These steps are illustrated on FIGS. 24-B"A thru B'C.

Referring to FIG. 24-A', the front legs and raised front member 166 is folded down; the upright components tilt ready for use as a backrest.

The model shown in FIG. 24-A may be further improved by adding on a swing-out rod support that can hold up the front section of the carrier. This is especially useful for carrying luggage or backpack that is deeper than its platform's maximum expanded capacity.

Referring to FIGS. 24-C thru 24-E', the swing-out support 186 is basically a U shaped rod whose ends are bent to separate them into sections. Bend 186-2 allows the terminals of the support to be disposed into cavity 169-2 of member 169. Member 169 is similar to the raised front member and leg frame 166 described previously. It is simply elongated to accommodate added cavities 169-2 and 169-4 as shown in FIG. 24-F. Section 186-4 directs the rod towards the outer edge of member 169. Section 186-6 supports the outer edge of member 169. A plunger button 187 is disposed into cavity 169-4. Its purpose is to prevent rod support 186 from swinging out when not in use.

Description of Foldable Rear Bases 188 and 190

Referring to FIGS. 25-A and 25-B, the previous rear base 84 can be divided into two parts with a hinge relationship to each other. This option allows the pack carrier to be fully collapsible. The rear base connected to the horizontal telescoping tubes is designated as member 188. While the rear base connected to the upright handle assembly is designated as member 190.

Referring to FIGS. 25-C and 26, rear base member 188 comprise of a rear transverse member 188-0 with a lateral socket 188-2R and a hub 188-4R on its right end and a lateral socket 188-2L and a hub 188-4L on its left end. Hollow cylindrical pin frames 188-6R and 188-6L are disposed on the center of hubs 188-4R and 188-4L respectively. These pin frames serve as an axis about which the rear base member 188 rotates. Windows 188-8R and 188-8L are disposed in the side wall of hubs 188-4R and 188-4L respectively. The windows are positioned to allow convenient access to spring biased plugs 189R and 189L that are mounted inside the hubs.

A spring biased plug 189R or 189L has a button 189-0 on one end and a locking tooth 189-1 protruding on one side of its midsection. The top of the locking tooth is arched to mate with the circular arched surface 190-8 in recess 190-4 in rear base 190, which will be described shortly. On the other end of plug 189R or 189L is an elongated slot 189-2 that is longer at the back than it is in front. Isometric views of the back and front of plug 189L are shown in FIG. 25-C.

Rear base member 190 comprise of its own transverse member 190-0 terminating on the right and on the left with upright members 190-1R and 190-1L respectively. Each upright member terminates on top with a socket for tube 50R or tube 50L and at the bottom with a socket for rear casters. There is also a protrusion 190-2 on the outer side of each upright member. Just below protrusion 190-2 is a deep circular recess 190-4 having an aperture 190-7 as center. It functions similarly to recess 182-2 in FIG. 24-B'. Two notches 190-5 and 190-6 are carved 90° apart extending outward from the recess. The notches are separated by an arched surface 190-8. A shallow circular groove 190-9 borders the circumference of recess 190-4. Groove 190-9 dimensionally mates with the walls of hub 188-4L or hub 188-4R.

Assembly of foldable rear base 188 with rear base 190 is as follows:
1. Referring to FIGS. 25-C and 25-D1 thru D3, spring biased plug 189L is mounted on pin 188-6L of hub 188-4L via its elongated slot 189-2 through which the pin passes. The locking tooth must be on the exposed side.
2. A compression spring 189-3 is disposed between the pin surface and top of slot 189-2, thus forcing button 189-0 out through window 188-8L.
3. Rear base members 188 and 190 are brought together. Wall of hub 188-4L mates with groove 190-9. Pin 188-6L on hub 188-4L aligns with aperture 190-7. Locking tooth 189-1 lodges into notch 190-5 and held in there by the force of spring 189-3.
4. Hinge pin 189-6 is pushed from the outside into the hollow of pin 188-6 and all the way through the other side of member 190 via aperture 190-7 where it is then capped.
5. Steps 1 thru 4 are repeated for the components on the right side.

Referring to FIG. 25-E, the locking tooth 189-1 may be replaced with a row of pointed locking teeth 189'-1. Notches 190-5 and 190-6 may be replaced with an arc of pointed notches 190'-5. This combination allows the user to incline the upright handle assembly to any of several positions between upright and folded states as shown in FIGS. 25-F1 thru F4. This is a particularly desirable option because the user can convert it into a reclining backrest even if the front legs cannot be collapsed as shown in FIGS. 25-G and 25-G'.

Referring to FIG. 9-A and FIG. 26 for the rest of the folding base, the new rear anchoring rods 78-4' each go through the side of lateral sockets 188-2L and 188-2R. The new front anchoring rods are the axis pins 180. Assembly of the retracting tubes and their respective retaining caps remain the same as that for the basic non-folding version. Protrusions 190-2 are now the new points of attachment for slinging hooks 122. These are the points of minimum interference between hooks 122 and hubs 188-4L and hubs 188-4R. Note the use of an alternate heavy duty elastic 191 instead of a helical spring.

Operation of the folding and locking mechanisms of rear base members 188 and 190 references FIGS. 25-D1 thru D3. From an open position right after assembly to a folded position, button 189-0 of plug 189L is pressed inward toward the center and held in that position. Spring 189-3 is compressed against the surface of pin 188-6 and top of slot 189-2. Plug 189L slides down transversely along pin 188-6L guided by it elongated slot 189-2. Locking tooth 189-1 is dislodged from notch 190-5. With the button 189-0 held in the depressed position, the rest of the horizontal base is rotated toward the upright tube assembly about axis pins 189-6 and 188-6L and 188-6R. Tooth 189-1 comes in contact with arched surface 190-8. At this point, pressure on button 189-0 may be released. Tooth 189-1 freely glides along this arched surface and subsequently drops into notch 190-6 where it stays lodged until button 189-0 is pressed again to unfold the carrier.

Description of Alternative Means of Attaching Backpacks with No Flexible Handle Straps Referring to FIG. 27-A, clip 200 is a plastic article that can be easily slipped over and under the padded backpack straps just below where the straps are attached or sewn to the backpack. This is the place where the flexible handle straps could have been. Clip 200 consist of two narrow plates joined together on one end with a thinned section that serves as a tiny hinge to provide a hinge relationship between the top and bottom plates. The other ends terminate with a mating closure 200-8 and 200'-8. Closure 200-8 is situated on the bottom face of top plate 200-1. It consists of a lump or knob joined to the top plate by a narrow neck of length about the thickness of the lower plate 200-2 plus an allowance for the thickness of a compressed padded strap. Closure 200'-8 of plate 200-2 is a notch shaped to laterally receive the neck of member 200-8. It has a constricted edge that "gives" slightly when the neck is pushed into it. The top plate 200-1 has a narrow opening or slit 200-4 where an alternate flexible strap 200-5 can be slipped through. Plug 200-6 joins both ends of a looped strap and anchors strap 200-5 to clip 200 by virtue of the plug having a larger cross sectional area than slit 200-4. The other end of the looped strap is now equivalent to a flexible handle strap and can be anchored to any of the gripping means presented earlier. An alternate strap 202-0 with plugs on both ends may also be used with this clip. Either plate 200-1 or plate 200-2 may have a row of tiny spikes on the face that comes in contact with the padded straps to enhance the clip's grip on the padded straps. A long one-piece clip 200 may suffice for padded straps whose tops are sewn close together. The alternate strap 200-5 and clip 200 combination installed on a backpack is shown in FIG. 27-A'.

Referring to FIG. 27-B, a pair of shorter clips 202 may be used for straps that are mounted far apart. The alternate strap 203-0, which comes "plugged" on only one end may be used. The other end is knotted after it has gone through slits of both clips 202 The alternate strap 203-0 and clips 202 combination installed on a backpack is shown in FIG. 27-B'.

Referring to FIG. 27-C, a clip that has a buckle in place of the slits may also be used.

Note that these clips can also be the detachment points of the backpack from the carrier. The clips and the wounded alternate straps may be left on the gripping means assembly.

Finally, even an ordinary safety pin with an attached alternate flexible strap can be used as shown in FIGS. 27-D thru 27-E.

Clamp Grip I

An alternate gripping means for all backpacks with or without handle staps is the clamp grip that attaches to the padded backpack straps like the clips previously discussed. FIGS. 28-A and 28-A' are partial cross-sectional views of the gripping assembly in the open and close positions respectively.

Referring to FIG. 28-B, the clamping mechanism consist of an adjusting knob 203, a transverse bar 204, a hinge 204-0, a closure 204-2, a clamp 205 and a clamp mate 205'.

Adjusting knob 203 consist of a spherical knob head 203-0, a cylindrical threaded midsection 203-2, and a push-in fastener 203-4 at the bottom.

Transverse bar 204 need not have a circular cross section because knob 203 is not rotated along the longitudinal axis of bar 204. One with a rectangular cross section is shown in FIG. 28-B. The bar has at its midsection a threaded cylindrical opening 204-0 that mates with the threaded midsection 203-2 of adjusting knob 203. At the bottom is another large rectangular opening 204-6 that connects with top opening 204-5.

Clamp 205 is a rectangular block with side flanges 205-0R and 205-0L. Centered on its top is an elevated cylindrical member 205-4 with cylindrical hollow 205-5 that joins another larger-sized hollow 205-6 below it. The upper portion of clamp 205 is dimensionally receivable inside bottom opening 204-6 of bar 204. Member 205-4 is receivable into the bottom of top opening 204-5. The right flange 205-0R has a rectangular closure guide window 205-1 whose shorter sides slope down outwardly. The left flange 205-0L has a rectangular hinge guide window 205-2. On the bottom is a row of tiny protrusions to enhance gripping capabilities.

Clamp mate 205' is also a rectangular member. A hinge pin hole 205'-7 is on the left end and a closure window 205'-8 is on the right end. On top is a row of tiny protrusions.

Hinge housing 204-0 is a part preferably made of metal or similarly strong material that permanently connects the clamp mate 205' to the bottom of bar 204. Emanating straight down from each end of its rectangular top is a leg 204-1 that has a pin hole towards the lower end. It dimensionally fits into guide window 205-2 of clamp 205.

Closure 204-2 is also a part preferably made of metal or similarly strong material that temporarily connects clamp mate 205' to the bottom of bar 204 by virtue of its closure arms 204-1. Emanating down outwardly close from each end of its rectangular top plate is a springy leg that will terminate with a push button 204-3' after assembly. Again emanating inwardly from these springy legs are closure arms 204-1 with support tips 204'-1. When the push buttons on the legs are compressed inward, closure arms 204-1 dimensionally fit through closure window 205'-8 of clamp mate 205'.

Assembly of clamp grip I is as follows:
1. Hinge housing 204-0 and closure 204-2 are fastened to the bottom of transverse bar 204 with screws or weld.
2. Clamp 205 is maintained in position in the bottom opening 204-6 of bar 204. Hinge housing 204-0 and the compressed closure 204-2 go through hinge guide window 205-2 and closure guide window 205-1 of clamp 205 respectively. The elevated cylindrical member 205-4 fit into the lower section of top opening 204-5 of transverse bar 204.
3. Buttons 204-3' are fastened to tips 204-3.
4. Adjusting knob 203 is screwed down top opening 204-5. Roughened top portion of bushing 203-4 is pushed up through hollow 205-6 and 205-5 and is then permanently adhered to the cavity 2034' of knob 203 with permanent adhesive.
5. The end of clamp mate 205' with the hinge pin hole 205'-7 is eased in between the legs of hinge housing 204-0. The pin holes are aligned and a hinge pin 204-4 is inserted into them and then capped on the other end.

Note that the bushing 203-4 and cavity 203-4' of knob 203 may be replaced with a dimensionally equivalent push-in fastener that is integral to knob 203. In such case step #4 above will be: Adjusting knob 203 is screwed down top opening 204-5 until the push-in fastener bottom latches onto hollow 205-6 of clamp 205.

The relevant parts of a backpack loaded on a carrier with the clamp grip are shown in FIG. 28-D.

Operation of clamp grip I is as follows:
1. The top portion of the padded backpack straps is inserted between clamp 205 and clamp mate 205'.
2. Referring to FIG. 28-C1, closure window 205'-8 of clamp mate 205' is pressed against the support tips 204'-1 of arms 204-1 of closure 204-2. The tips 204'-1 are urged inward toward each other by virtue of its smooth beveled edges that come in contact with the sides of closure window 205'-8. The arms go through window 205'-8 after which its tips latch on to the window's bottom edge, thus, supporting clamp mate 205'.
3. To tighten grip on the backpack strap, the knob head 203-0 is turned clockwise. The bottom of the knob's threaded midsection 203-2 pushes down onto elevated member 205-4. Clamp 205 goes down along the legs of hinge housing 204-0 and closure guide 204-2 and maintained in a fairly level position by windows on its flange ends. Turning the knob head is halted when a good grip on the backpack is achieved.
4. To release the clamp, the buttons 204-3' on the legs of closure 204-2 are pressed inwardly toward each other. The support tips 204'-1 recede and the right end of clamp mate 205' drops down and out. These are shown in FIGS. 28-C1 and 23-C2.

Clamp Grip II

FIGS. 29-A and 29-B show a modification of the previous clamping means. The adjusting knob 203 is eliminated and replaced with a self-adjusting mechanism using compression springs. The flanges 205-0L and 205-0R of clamp 205 are also eliminated. Note that these flanges are optional even for the clamp grip I. When present however, they serve to protect hinge housing 204-0 and closure 204-2 or 207 from possible breakage or deformation due to constant handling. They also help to maintain a level clamp 206.

Referring to FIG. 29-C, clamp grip II mainly comprise of a transverse bar box 208 and cover 210, a clamp 206, the clamp mate 205', the hinge housing 204-0, the closure 207, a pair of connectors 214, and a pair of compression springs 212.

The transverse bar box 208 is mainly a rectangular shaped member with two holes 208-2 on its bottom sufficiently spaced apart so as to maintain a stable level connection with clamp 206. The rest of its bottom is shaped to receive clamp 206 and the hinge housing 204-0 and closure 207 that are mounted below it.

The transverse bar box cover 210 is a rectangular sheet of about the same thickness as the walls of box 208. It has two cylindrical spring guides 210-2 disposed on its underside directly above holes 208-2 of bar box 208.

Clamp 206 is a rectangular block with apertures 206-2 that align with the holes 208-2 of bar box 208 when placed in its final position.

Connector 214 is a cylindrical shaped member with a hollow body and a flange 214-2 on top. The hollow section dimensionally receives spring guide 210-2 of box cover 210. The lower portion of the body of connector 214 may be threaded as a means of connecting to aperture 206-2 of clamp 206 whose inside surface may also be threaded in conjunction.

Assembly of clamp grip II is as follows:
1. Connectors 214 are each inserted into holes 208-2 on bar box 208 and then permanently screwed and/or glued into apertures 206-2 of clamp 206.
2. Hinge housing 204-0 is mounted into position with screws.
3. Closure 207 is also mounted into position with screws.
4. Compression springs 212 is laid on top of connectors 214.
5. Box cover 210 is laid on box 208 and fastened thereon with screws. Spring guides 210-2 fall into place inside spring 212 and connector 214.
6. The left end of clamp mate 205' is fastened onto hinge housing 204-0 with hinge pin 204-4.

Operation of clamp grip II is the same as in clamp grip I except for the elimination of the extra step of turning a knob head to tighten the grip on the padded straps. The strong compressive resistance of springs 212 does the job.

Clamp Grip III

Referring to FIGS. 30-A, 30-B, and 30-C, the clamps 205 or 206 are eliminated. Transverse bar 221 is reshaped to house cavities 221-2 and 221-4 that allow vertical movement of hinge pin 219 and closure 220. The new transverse bar cover 223 will no longer have spring guides. The compression springs 218 are now acting on hinge housing and closure 220 that both go up or down cavities 221-2 and 221-4 respectively allowing clamp mate 205' to adjust to the thickness of the padded strap. Hinge housing 219 and closure 220 have cylindrical extensions 219-2 and 220-2 respectively on top to house compression springs 218 and to connect with their respective stoppers. Stopper 221 has a cylindrical female component that receives the top of extension 219-2 of hinge pin 219. It is topped with a flange that approximates the shape of the top of cavity 221-2. Stopper 222 also has a cylindrical female component that receives the top of extension 220-2 of closure 220. It is topped with a flange that approximates the shape of cavity 221-4. If the cylindrical extension 219-2 and 220-2 are dimensionally the same, stoppers 221 and 222 will be the same as well.

Assembly of clamp grip III is as follows:
1. Hinge housing 219 is inserted through the bottom of cavity 221-2.
2. A compression spring 218 is dropped into cavity 221-2 and rests on the flat rectangular top of hinge housing 219.
3. The cylindrical female component 221-0 of stopper 221 is mated and adhered permanently to top extension 219-2 of hinge housing 219.
4. Closure 220 is inserted through the bottom of cavity 221-4.
5. A compression spring 218 is dropped into cavity 221-4 and rests on the flat rectangular top of closure 220.
6. The cylindrical female component 222-0 of stopper 222 is mated and adhered permanently to top extension 220-2 of closure 220.
7. Box cover 223 is laid onto the top of bar 221 and screwed in place.
8. The left end of clamp mate 205' is mounted onto hinge housing 219 with hinge pin 204-4.

Operation is again basically the same as in the two previous versions except for the part where clamp mate 205' is now the member that adjusts to the thickness of the backpack strap.

Clamp Grip IV

This modification involves the replacement of the helical compression springs 212 and clamp 206 in FIG. 29-C with a single flat-type spring 224. Spring 224 is formed out of a strip of strong material that is formed into two waves with both crests 224-2 facing clamp mate 205'. This is so that when pressure is applied on these crests in a direction away from clamp mate 205', a resisting force opposite the direction of the applied pressure is realized. The resisting force in this case is applied to the backpack strap that is sandwiched between the clamp mate 205' and the flat spring 224, thus keeping said strap in place. Spring 224 terminates on the closure side with stopper 224-4 and on the hinge side with stopper 224-8. Stopper 224-4 consists of a pair of small protrusions each extending transversely from the main spring body. Next to the stopper 224-4 is a closure-side guide 224-6 which, is just an extension of the flat spring 224. Stopper 224-8 consists of two pairs of protrusions separated by an extension of the flat spring 224 called the hinge-side guide 224-7.

Assembly of clamp grip IV is as follows:
1. Referring to FIG. 31-C, hinge housing 204-0 and closure 207 are mounted onto their respective positions on the underside of transverse bar 225.
2. Hinge-side guide 224-7 is pushed between hinge legs 204-1.
3. Closure-side guide 224-6 is pushed between the springy legs of closure 207.
4. Trough 224-3 of spring 224 is mounted on the transverse bar 225 with a screw.
5. Clamp mate 205' is mounted onto hinge housing 204-0 with hinge pin 204-4.

Operation of clamp grip IV is the same as that for clamp grip II. The single flat-type spring does the job of the helical spring and clamp in clamp grip II. Stoppers 224-4 and 224-8 retain the flat spring within the clamp grip assembly. The guides help to keep the flat spring aligned with the clamp mate as its ends move in response to the pressure applied on it by the backpack strap.

Still another variation would be the use of a pair of smaller-sized clamp units, one for each padded strap. The flat spring may consist of only one wave. Furthermore, these smaller units may be movable along the underside of the transverse bar and then temporarily fixed so as to adjust to the location of padded straps that could be mounted so far apart on a backpack. One such variation using clamp grip IV is shown in FIG. 31-D. The underside of a hollow transverse bar 230 is equipped with a pair of mini clamp grips 228 that is slidable inside said transverse bar and supported by runners 230-2. Bar 230 also has a plurality of apertures along its side that comes in contact with buttons 227 on the clamp grips. A plunger button 227 is disposed on a side of base 228-0 of grip 228. The positions of the clamps are temporarily fixed when the snap buttons engage into the apertures.

Any of the clamp grips described and its equivalent can also be referred to as a possible first retaining means. The clamps uses compression means to effect a snug connection between the upper part of the backpack and the main frame.

Description of Strap Lifting Apparatus

Referring to FIGS. 32-A thru 32-E', the apparatus comprise of a pair of low resisting extension springs 278, a pair of top spring holders 277, a pair of bottom spring holders 276, a pair of strap adaptors 280 or 282, and two pieces of string connectors 284.

Referring to FIGS. 4 and 32-C, a top holder 276 is an article designed to fit snugly into receiving channel 62-2 of top retaining caps 62 of tubes 60L and 60R. If only three pairs of tubes are used in the upright handle assembly the channel referred to becomes part of the handle bar. The two terminals of the open corner of holder 276 are joinable by mating closures 276-0 and 276'-0. Closure member 276-0 is a laterally extending neck and knob combination while closure member 276'-0 is a lateral notch with a constricted entry. The corner 276-3 next to closure member 276'-0 is thinned to provide a hinge-type relationship between the adjacent sides. The corner next to closure 276-0 extends outward to accommodate a notch 276-4 emanating from the unexposed side.

Referring to FIGS. 3-A and 32-C, a bottom spring holder 277 is an article designed to fit snugly into channel 58-5 of top retaining caps 58L and 58R of tubes 54L and 54R respectively. Holder 277L is similar to holder 276 except for its size and the shape of its extension. Corner extension 277-2 consists of an elevated section that fits into free space 58-7L. It has a notch 277-4 emanating from its unexposed side. Dimensionally speaking, this notch is retracted inward rather than extended outward like notch 276-4 of top holder 276. This is to vertically align notch 276-4 with notch 277-4 when both holders are mounted onto their respective channels.

The top and bottom spring holders may be made a fixed integral part of top retaining caps. However, removable holders as well as the channels on the retaining caps offer additional possibilities for attachment of trifles or ornaments that when combined with the spring may provide amusement to the user. For example, the top spring holder may house a head of an animal and the bottom holder may house the tail or feet. The spring may be of a certain texture and color that suggest the body of that animal, and so on. The holders may simply be tied, fastened with hook and loop fasteners, or spring clamped around the receiving channels on the top and bottom retaining caps or around any point bounding the desired span along the handle assembly upwards from the gripping means.

Referring to FIGS. 32-D and 32-D', spring 278 is a helical extension spring with a very low load rate or resistance made of a slender, flat and lightweight material. The common "slinky" fits the description. Its inside shape and dimensions in its free state are only slightly larger than the shape and dimensions of tubes 60L and 60R where it is wound on. This is particularly important because given the same-sized pole to wound on, given the same extended length, and given the same number of coils, a spring with smaller inner dimensions does not sag or stretch as much as a looser larger-sized spring. Also considering that given the same size pole to wound on, the same extended length, and the same inner dimensions, a spring with the lesser number of coils fit more snugly around the given pole than one with more coils. In short, two variables namely: size and number of coils determine the holding power or fit of a given spring that is wound around a tube. There is a negative correlation between the spring's holding power and the gap between the tube and spring. There is also a negative correlation between the spring's holding power and the number of coils. An ideal combination can be determined whereby the resulting spring would leave no gaps between the tube and the inner walls of the spring when the spring is at its extended state while at the same time have a reasonably fair number of coils for aesthetic reasons.

The spring 278 has a column of apertures 278-4 disposed close to the backpack straps. It is terminated at the top with a neck and ball attachment 278-0 and another neck and ball attachment 278-1 at the bottom both of which lie on the same column as apertures 278-4.

Referring to FIG. 32-D, pad wrap strap adaptor 280 is a thin, flexible, rectangular piece of material that is flanked on one of its shorter side by a wide strip of loop fastener 280-0 and on the opposite side by a narrower strip of hook fastener 280-1. This material may be made of durable fabric, rubber, plastic, dense foam or similar thin flexible material. Towards the center and running along its shorter section is a loosely fitting cord 280-2 whose ends are attached to each of the longer sides at points 280-5 and 280-6.

Connector 284 is simply a string-like member having proximal and distal terminals. The proximal terminal is attached to a strap adaptor and the distal terminal is attached to the rest of the strap lifting apparatus.

A ring 280-4 is received outside cord 280-2 for attachment of connector 284. Ring 282-6 in FIG. 32-E may also be used instead if the user needs to detach the backpack from the carrier on a frequent basis. It has a tiny hole with a constricted side opening or slit where a knobbed end of string 284 can easily slide in and out. Another alternative is to replace the ring with an easily disconnected snap hook. Adaptor 280 installed on a padded backpack strap is shown in FIG. 32-D'.

Referring to FIG. 32-E, a slip-on buckle-type pad strap adaptor 282 is an alternative to adaptor 280. It consists of a thin flexible material just like adaptor 280. It is also rectangular in shape although it is less than half the size of adaptor 280. Two slits 282-0 run along its shorter section, each disposed a short distance from either of its ends. The middle section may be hollowed out to reduce bulkiness. On one longitudinal side or edge are two tiny holes 282-2. These holes 282-2 are mounting points for a cord 282-4 that loosely runs along the edge of the adaptor. Ring 282-6 is installed to move along cord 282-4. Adaptor 282 installed on a padded backpack strap is shown in FIG. 32-E'.

The shoulder strap adaptors may be a clamping article similar to those shown in FIGS. 27-A and 31-C in addition to the various small clamping devices and buckles commercially available that can be redesigned to accommodate a connecting means to any of the collapsible outer layers discussed above. A pair of any of these articles in rigid or flexible form may be used for each shoulder strap, spaced apart depending on the dimensions of the user, and joined together by a cord 283 that works just like cords 280-2 and 282-4 of adaptors 280 and 282 respectively. Examples are shown in FIGS. 32-F, 32-F' and 32-F''' and FIGS. 32-G, 32-G', and 32-G'''. Adaptors 280 or 282 may likewise be reduced in length and used in pairs for each shoulder strap.

Assembly of lifting apparatus is as follows:

1. Springs 278 are each wound around tubes 60L and 60R one coil at a time.
2. Top attachment 278-0 of spring 278 is pushed into notch 276-4 on top spring holder 276 for the left side of the handle assembly. The same is done for the right side as well. Top spring holder 274 is turned over when mounted on the right side.

3. Holder 276 is opened up via its thinned corner 276-3, slipped into receiving channel 62-2 of retaining cap 62L and closed by urging the neck of closure member 276-0 through the constricted entrance of closure member 276'-0. At this juncture, top attachment 278-0 in notch 276-4 is secured by virtue of the channel 62-2 wall blocking its entryway. The same is done for the right side as well.

4. The bottom attachments 278-1 of springs 278 are pushed into notches 277-4 on their respective bottom spring holder 277L and its mirror image 277R.

5. Bottom spring holder 277L is opened up and slipped into channel 58-5 of cap 58L and closed. At this juncture, attachment 278-1 in notch 277-4 is secured by virtue of the channel 58-5 blocking its entryway. The ball portion of attachment 278-1 rests on the space underneath the elevated corner extension 277-2 of holder 277L.

6. Adaptor 280 is used for this assembly. It is mounted to the backpack by laying it over the strap with the corded face up and folding the edges back behind the strap where they are overlapped and held in place by the hook and loop fasteners.

If adaptor 282 is used instead of adaptor 280, it is mounted to the backpack by first separating the padded strap section of the backpack from the lower unpadded section. Then the open end of the padded strap is slipped through each of the slits 282-0 and the adaptor is urged up all the way to where the strap meets the body of the backpack. Then the upper padded strap section is joined back with its lower unpadded section.

7. One end of a piece of string 284 about 12 inches long is tied to ring 280-4 or 282-6.

8. What length of strap is needed to comfortably carry the backpack is determined and the straps are adjusted accordingly.

9. How high the strap resulting from step 8 has to be lifted to avoid contact between the ground and its lower part is determined by tilting the loaded carrier and rolling it.

10. Referring to FIG. 32-JA, adaptor 280 or 282 is positioned along the padded strap such that its lower end coincides with the lifting point 286 determined in step 9.

11. In FIG. 32-JA, it is assumed for illustration purposes that the lifting point 286 is within the length of adaptor 280 or 282. With the handle assembly in the extended position, the other end of string 284 is attached to spring 278 starting with an aperture 278-4 that is taken to be at the same level as the higher end of adaptors 280 or 282.

12. Referring to FIG. 32-JA', the handle assembly is retracted and the shortest distance between the starting aperture and the near corner 280-5 of the adaptor is determined. This distance is also about the same distance between the starting aperture and the last aperture through which string 284 is going to run.

13. With the handle assembly back in the extended position, string 284 is inserted into the next higher apertures until it has moved up the same distance determined in step 12 to which point, the string is tied. Any excess string may be cut off.

14. Referring to FIG. 32-JB, the lifting point is beyond the length of adaptor 280 or 282. This happens if the backpack is small and/or the user is on the heavy side. In this case, a longer-sized adaptor may be used. The pair of buckles or other clamping articles can also be used. For purposes of illustration, however, the regular-sized adaptor is used. The far corner 280-6 of the adaptor is moved up to the lifting point and steps 11 to 13 are carried out. Note that when the handle assembly is in the retracted position as shown in FIG. 32-JB', more of string 284 is now exposed between the spring 278 and the near corner of adaptor 280 or 282. While the exposed length is still acceptable up to some point, it may be annoying beyond that. Then the use of a longer adaptor is recommended. Referring to FIGS. 32-JC and JC' and 32-JD and JD', this problem is further aggravated if the string 284 is fixed at the far corner 280-6 and cannot retract along a cord 280-2 or 282-4.

Referring to FIGS. 32-JE and 32-JE', an alternate extendible and flexible cord 288 comprising of smaller-sized coils also with a very low load rate or resistance that is mounted outside tube 60R or 60L. It may be attached to a top spring holder 276 or to receiving channel 62-2 in FIG. 32-C or to a handle bar 68 that can already have a provision for attachment of said cord 288.

Operation of the lifting apparatus consists of simply lifting the handle bar in preparation for rolling. Tubes 66R, 66L, and 60R and 60L with their respective top retaining caps 62R and 62L extend upwards. Their top spring holders 276 also extend up, thus, stretching the spring upwards as well. String 284 whose upper end is attached to the spring is likewise lifted. Its lower end that is attached to strap adaptor 280 or 282 on the padded backpack strap is lifted as well, thus, keeping the backpack strap off the ground. The ring at the terminals of string 284 slides along cords 280-2 or 282-4 to a point along the strap adaptor that is always closest to the lifting source, thereby minimizing slack on the string whether the handle assembly is in the retracted or extended position.

Referring to FIG. 32-H, the strap adaptor may be replaced with an elongated ring 290 that can easily receive the padded straps. This ring installed in combination with the other parts of the lifting apparatus is shown in FIG. 32-H'. Ring 290 works just like rings 280-4 or 282-6. The padded strap itself serves as the cord 280-2 or 282-4. Rings 290-1, 290-2, and 290-3 are basically rings 290 equipped with glides or rollers on the part that is in contact with the underside of the padded strap to facilitate its movement as the handle bar is extended or retracted.

Cords 280-2, 282-4, and 282-6 can be replaced with another flexible member 287 that can retain a tiny wheel. The wheel has an axle with means for attaching the proximal terminal of connector 284 as shown in FIG. 32-I. It is basically a groove with a constricted opening to expose the attachment means for connector 284. Perspective views of enlarged examples of wheels are shown in FIGS. 32-IA and 32-IB and their respective cross-sectional views inside the retaining flexible members are shown in FIGS. 32-IA' and 32-IB'. To be used as a substitute for cord 283, each end of the flexible member 287 may be connected with one or more adapting articles that have means for plugging the end of the groove and for attaching to a piece of the two-piece strap adaptors. These adapting articles may be an integral part of the strap adaptors themselves.

The helical extension spring may be replaced with an accordion-like collapsible outer layer as shown in FIGS. 32-K and 32-K' and FIGS. 32-L and 32-L', or, with a series of short collapsible nesting concentric tubes with tapering cross-sections as shown in FIGS. 32-M and 32-M'.

Bike Pack Carrier I

Description of the Invention

Referring to FIGS. 33-A and 33-B the basic pack carrier on bike comprises a vertical retractable handle assembly 298 that folds down onto a platform 310 mounted on a carrier support 318.

Referring to FIGS. 34-A, 34-B, and 34-C, the folding mechanism and operation are basically the same as that for the pack carrier on ground on FIGS. 25-C and 25-D1 thru 25-D3. The new spring biased plug 314 has a longer button 314-0 for easy access from the back of bumper 310-2, necessitating widening the window 310-4 for assembly. The recess 306-0L on base 306L is deepened for added holding strength. The length of locking tooth 314-2 of plug 314 is also extended accordingly. The folding mechanism may be controlled only on one side to free the user's other hand to move the upright or folded handle assembly to another desired position. Therefore, the right side of the platform 310 may have a hub 312R with pin aperture 312'-0R but with no cavity and base 306R may have an aperture 306-2R but with no recessed section.

Referring to FIGS. 33-A, 34-A and 35-A, bumper 310-2 is a narrow wall extending upward from the rear of platform 310. It provides extra structural support for hubs 312L and 312R, support for the upright retractable tube assembly 298, and a house for grooves 306-8 and windows 310-4 for button 314-0.

Referring to FIGS. 35-A and 35-A', the slinging hook 122 in FIG. 13-A is replaced with a cleat 316. Cleat 316 is a small replaceable member comprising of a mid-section 316-0 from which two arms extend. The upper arm 316-2 extends straight up and then inwardly and finally outwardly. The lower arm likewise extends straight down and then inwardly and finally outwardly. The middle section is shaped for mating and mounting with a screw onto a shallow non-circular groove 306-8.

Base 306R and 306L has top vertical sockets that accept tubes 300 and 301 respectively. Each base also has a groove 306-8 on its exposed side.

Referring to FIGS. 36-A, 36-B, 37-A, and 37-B, tube 302 is assumed to have the same cross-sectional dimensions as tube 54R earlier. On its side facing tube 303 on the left are apertures 302-2 and 302-0 on the upper and lower ends respectively. Two more apertures 302-3 are each disposed on the front and back of the tube's lower end. Tube 300 will have the same cross-sectional dimensions as tube 50R earlier. On its side facing tube 301 on the left is a series of equally spaced apertures 300-2. Apertures 300-4 are on the upper section of the remaining three sides. Tube 301 is dimensionally like tube 300. Apertures 301-0 are on the upper end of each of its four sides. Tube 303 is dimensionally like tube 302. Apertures 303-0 are each disposed on the front and back of the tube's lower end.

Top retaining cap 307 is dimensionally equal to cap 52 on FIG. 2 except for a side notch 307'. Cap 304 is closed on top and dimensionally mates with tubes 303 and 302 and has an inwardly lateral branch that serves as a socket for the terminals of a gripping means assembly.

Referring back to FIGS. 33-A, 33-B, and 34-A, platform 310 comprises of hubs 312L and 312R, a back bumper 310-2 with button opening 310-4, grooves 306-8, and a main horizontal section that is shaped to provide a sufficiently level surface to lay the backpack on whether the vertical handle assembly is upright or folded down. The elevated section 310-4 has a side groove 310-6 running along the portion adjacent to tube 302 when the handle assembly is in the folded position. It also has a pin aperture 310-9 on the rear end of section 310-4.

Carrier support 318 is preferably made of metal tubing bent and joined to provide a horizontal support for platform 310, to provide retainers for the backpack straps when the backpack is carried lying down, and as a means of attaching said platform to a bike. The front attachment section, 318-4 is anchored to the tubular member underneath the bike seat. Extending out from this section is the support 318-2 which is basically a pair of tubes spaced apart to cover as much of the platform area as possible for maximum support. Joining this pair of tubes is a transverse bar 318-8 terminating with lateral extensions called strap retainers 318-0 shaped to enclose the padded backpack straps. Attached or welded to the underside of bar 318-8 is a pair of tubes extending substantially downwards towards another bike attachment point 318-6.

Assembly of the Bike Pack Carrier I

1. Referring to FIG. 36-A, assembly of member 305 is as follows:
    a. Snap button 66-1 is inserted into the bottom of tube 302 with its head disposed out of aperture 302-0.
    b. The bottom of tube 302 is pushed inside bottom retaining cap 70.
    c. Another snap button 66-1 is inserted into the top opening of tube 302 with its head disposed out of aperture 302-2.
    d. Top retaining cap 307 is inserted into the top opening of tube 300.
    e. Tube 302 is inserted into tube 300 from the bottom until it goes through cap 307.
2. Member 309 is assembled as follows:
    a. The bottom of tube 303 is pushed inside bottom retaining cap 70.
    b. Top retaining cap 307 is inserted into the top opening of tube 301.
    c. Tube 303 is inserted into tube 301 from the bottom until it goes through cap 307.
3. Referring hereon to FIG. 36-B, the lower end of tubes 300 and 301 are mounted into the top opening of base 306R and 306L respectively and fastened thereon with very short screws that do not go beyond the inner wall of tubes 300 or 301.
4. Referring back to FIG. 34-A. spring biased plug 314 is inserted into button opening 310-4 of bumper 310-2 and mounted onto pin 312-0 of hub 312L.
5. Compression spring 189-3 is inserted in the cavity between the pin 312-0 and button 314-0.
6. Base 306L is mounted next to hub 312L, their apertures aligned.
7. Hinge pin 320 is inserted through aperture 306-2R, pin aperture 312'-0R of hub 312R, pin apertures 310-9 of platform 310, pin aperture 312'-0L of hub 312L, and finally through aperture 306-2L and capped with cap 320' thereafter.
8. The cap 304—gripping transverse bar—cap 304 assembly 311 is mounted to the upper ends of tubes 303 and 302 and fastened thereon with screws.
9. Cleats 316 are mounted onto their respective grooves 306-8 on bases 306R and 306L and bumper 310-2.
10. The assembled unit above is then mounted onto carrier support 318 with screws or bolts.
11. The carrier support 318 is mounted onto the bike.

Operation of the Retractable Upright Tube Assembly 298

Referring to FIGS. 37-A and 37-A', the tube assembly is in the retracted position. Caps 304 on the left and right of gripper transverse bar are rested on caps 307 of tubes 301 and 300. The head of upper button 66-1 that is already fixed into aperture 302-2 of tube 302 becomes further engaged into notch 307' of cap 307 and into the topmost aperture 300-2 of tube 300. The head of the lower button 66-1 remain disposed only into aperture 302-0 of tube 302 and rendered inactive inside the lower end of tube 300.

To carry the backpack in the upright position, the retractable tube assembly has to be extended to the right height. To extend, the head of upper button 66-1 is pushed inward with a finger to disengage it from topmost aperture 300-2. Pressure on the button head is maintained for the duration needed to dislodge it from aperture 300-2 while the gripper transverse bar 311 is pulled longitudinally outward. Shortly thereafter, the lower button 66-1 is engaged into the lowest aperture 300-2. If the desired height of the transverse bar is not attained at this point, the lower button 66-1 is pressed repeatedly to disengage it from the series of apertures 300-2 while the transverse bar is moved upward until the desired height is reached. At maximum height, the bottom of caps 307 and top of caps 70 gently collide with each other to prevent tubes 303 and 302 from leaving tubes 301 and 300 respectively. At the same time, lower snap button 66-1 engages into notch 307' of cap 307 and into topmost aperture 300-2. These are shown in FIGS. 37-B and 37-B'.

Referring to FIG. 38-A, a backpack of height close to that of the retractable tube assembly is mounted on the platform. The flexible handle strap is attached to the gripping means on the transverse bar as presented earlier. The padded straps are passed over the transverse bar. Each lower unpadded portion of the strap is wound about the middle section 316-0 of the closest cleat 316 on the back of bumper 310-2 of platform 310. The remaining strap is wound about the middle section of the cleat on the exposed side of the nearest base 306L or 306R until the backpack is snug against the bumper.

Referring to FIG. 38-B, a backpack is carried in the lying position. The retractable tube assembly is first folded down. As shown in FIGS. 34-B1 and B2, button 314-0 of plug 314 in hub 312L is pushed inward. Pressure on the button is maintained while the handle bar is moved toward the main section of platform 310. After locking tooth 314-2 is dislodged from upright notch 306-4, pressure on the button can be released. The tube assembly is laid onto the recessed portion 310-8 of the platform 310. The head of button 66-1 protruding out of an aperture 300-2 in tube 300 is urged back in by virtue of the top rounded edge 310-5 of the elevated section 310-4 of platform 310 and then released out again as it reaches the side groove 310-6 where it remains. The groove allows the position of tube 300 in relation to tube 302 to be maintained while achieving a snug fit between the handle assembly and the platform. If the tube assembly were in the retracted position, it is first extended as described earlier before the backpack is laid on the platform. At this folded position, locking tooth 314-2 of plug 314 is lodged into folded notch 306-6 as shown in FIG. 34-B3. After the backpack is laid on the platform, its handle strap is fastened to the gripping means on the transverse bar. The padded straps are passed over the transverse bar, the remaining straps are urged into the strap retainers 318-0 of carrier support 318 and, finally, the remaining strap are wound about the cleats 316 on the exposed side of the nearest base 306L or 306R until the backpack is snug against the platform.

To retract, the head of lower snap button 66-1 is pushed inward to disengage it from aperture 300-2 while the handle bar is pushed inward longitudinally and repeatedly thereafter to disengage it from the series of holes 300-2 on tube 300.

To unfold, pressure on button 314-0 of plug 314 in hub 312 is maintained. Locking tooth 314-2 is dislodged from the folding notch 306-6. In the upright position, locking tooth 314-2 lodges into upright notch 306-4. Head of button 66-1 is urged in as it passes upper rounded edge of groove 310-6 and then released after passing top edge 310-5.

Bike Pack Carrier II

FIGS. 39-A thru 39-E are several illustrations of a version of a pack carrier for a bike that is capable of carrying another basic pack carrier on ground. The tube assembly is basically unchanged except for an aperture 301-2 on the midsection of the exposed sides of tubes 300 and 301. Platform adaptor 324, which is an elevated portion of the platform 322, is hinged out of the way to allow room for rear base 84 of the basic pack carrier on ground as shown in FIG. 1. Two large notches 322-2 are made on the edge next to the bases 306L and 306R of the tube assembly for the rear legs or bottom sockets 84-6 of the rear base 84. The top edges of the notches may be rounded off to facilitate entry of the legs. Two extensions 322-4 extends upward laterally from the section where tubes 300 and 301 are resting when the handle assembly is in the folded state. Two channels 322-6 are thereby created where the outer tubes 80R and 80L on the base of the ground pack carrier can nest in.

Referring to FIG. 40, an aperture 322-7 is drilled through a side of the elevated main section of platform 322 for a spring plunger 322-9 to be pushed through. Pin bridge 322-8 acts as a spacer, stabilizer and reinforcement for the hinge mechanism. It can have the same cross-sectional shape as hub 312L or 312R for uniformity. If an optional bumper window 322-9 is present, it can be rounded off the back for drainage of weather elements. Platform adaptor 324 is a member with a level front and back having two leg extensions 324-0 each with apertures 324-2R and 324-2L. A shallow hemispherical hollow 324-6 is carved on its top. A quarter spherical notch 324-8 is carved on the top front edge closest to hollow 324-6.

Referring to FIG. 41-A, each extension 322-4 is equipped with a locking mechanism 326 for securing the basic ground pack carrier onto the bike pack carrier.

The mechanism comprises of a hole 323 on extension 322-4, locking rod 328, compression spring 329, closure plate 330, a hinge pin 334 and a control knob 332. The hole consist of a horizontal cylindrical hollow 323-0 emanating from the midsection of the exposed side of extension 322-4 and terminating close to the opposite side after which an elongated dome-shaped hole 323-2 completes the passage through extension 322-4.

Locking rod 328 comprise of a cylindrical rod with a retaining tip 328-2 shaped to be received into hole 323-2. Behind the top is a circular flange 328-4. On the other end of rod 328 is a transverse pin hole 328-0. Locking rod 328 with flange 328-4 is loosely receivable inside hole 323 of extension 322-4.

Compression spring 329 should have a strong load rate and is receivable between hole 323 and the portion of locking rod 328 behind the flange 328-4.

Closure plate 330 has an aperture 330-0 in its center enough to receive the "pin-holed" end of locking rod 328.

Control knob 332 comprises of two carved heads 332-2 with a pin hole 332-0. The distance between the pin hole and the top of the head is longer than that between the pin hole and the side of the head.

Assembly of the locking mechanism is as follows:
1. Locking rod 328 is received inside compression spring 329.
2. Both are disposed inside hole 323. The retaining tip 328-2 of rod 328 engages into hollow 323-2.
3. Closure plate 330 is positioned such that one end of locking rod 328 protrudes out of aperture 330-0. The plate is then fastened into place on extension 322-4 with screws.
4. Control knob 332 is positioned to hold the rod protrusion in aperture 330-0 between its two heads 332-2.
5. Hinge pin 334 is inserted through the first pin hole 332-0 of control knob 332 through pin hole 328-0 of rod 328 and finally through the second pin hole 332-0 of knob 332 after which it is capped or flattened to secure it in place.

Operation of Locking Mechanism 326

Referring to FIG. 41-B, the figure shows a partial cross-sectional view of the locking mechanism in its free state. When tube 80R or 80L of the base of an upright ground pack carrier is laid onto channel 322-6, the retaining tip 328-2 is automatically urged in by the bottom edge of tube 80R or 80L. The tip 328-2 is released upon contact with aperture 80-1 as shown in FIG. 15 on tube 80R or 80L thereby locking the carrier base in place.

The next figure FIG. 41-B' shows the control knob 332 being lifted upward and out against plate 330. Since the distance between the pin 334 and top of head 332-2 is more than that between pin 334 and the side of the head, the "pin holed" end of rod 328 is forced further out of aperture 330-0. The compression spring 329 is contracted and the retaining tip 328-2 is disengaged from aperture 323-2, thereby freeing the base of the ground pack carrier. FIG. 41-B" shows the completed operation.

Apertures 301-2 shown in FIG. 39-A may be added onto tubes 300 and 301 to also avail of the locking mechanism 326 for the tube assembly when it is in the folded position.

In the event that the presence of the smaller base tube 78R or 78L inside tube 80R or 80L respectively limits the extent to which retaining tip 328-2 can engage into aperture 80-1, it is advisable to add on a protrusion just around aperture 80-1. The extension 322-4 on platform 322 is reduced accordingly to accommodate the extra mass. The same is advised for apertures 301-2 in the tube assembly.

Referring to FIG. 40, assembly of this second version of pack carrier on bike is basically the same as that for the first one except for the extra steps needed to install the locking mechanism 326 and the platform adaptor 324. Installation of the platform adaptor 324 is as follows:

Adaptor 324 is positioned between hubs 312R and 312L with spacer 322-8 falling between its two bottom leg extensions 324-0. Then the two bases 306R and 306L are positioned against their respective hubs. Finally, hinge pin 320 is inserted through apertures 306-2R of base 306R, through pin aperture 312'-0R of hub 312R, through adaptor aperture 324-2R, through spacer aperture 322'-8, through adaptor aperture 324-2L, through pin aperture 312'-0L of hub 312L, and finally through aperture 306-2L of base 306L, after which, it is capped with cap 320'.

Operation of the Bike Pack Carrier II

The platform adaptor 324 is laid on platform 322 to provide a level base surface for the backpack. The head of spring plunger 322-9 in platform 322 is urged inward by notch 324-8 and finallly engages into concave hollow 324-6 of platform adaptor 324 where it remains until the adaptor 324 is lifted via a recess in a wall of the lifting cavity 324-4. The weight of the backpack is sufficient to hold the adaptor down on the platform 322 without the spring plunger 322-9. However, the retaining capability of the plunger is needed when all upright parts are folded down after use as shown in FIG. 39-C. Operation of bike pack carrier II for a regular backpack mounted upright or lying down is thereafter the same as that for the first version.

To carry a backpack already loaded on a ground pack carrier, platform adaptor 324 is lifted out and pushed against bumper 310-2. FIGS. 39-D and 39-E show a ground pack carrier loaded onto a bike pack carrier II. The ground carrier base mates with the bike carrier platform and is retained by the locking mechanism 326. The padded straps are passed over the handle bar of the pack carrier on bike, the bottom strap is coiled around the nearest cleat 316 behind the bumper 310-2 and the remaining strap is coiled around the cleat 316 on the base 306R or 306L of the upright tube assembly.

To release the ground pack carrier, the control knobs 332 are lifted and maintained in the lifted position while the ground pack carrier is unloaded from the bike pack carrier.

Bike Pack Carrier III

Referring to FIGS. 42-A, 42-B, and 42-C, a third version of the pack carrier is similar to the second version with the addition of a self-adjusting raised front member 342 in place of the elevated portion of platform 322. Member 342 provides snug front support to the backpack whether the backpack is carried upright or lying down, thus, reducing movement of the backpack relative to the pack carrier as the bike travels along rugged roads. It may be folded down and used simply to elevate the platform if the depth of the backpack is beyond the maximum expansion capacity of member 342 or if the user prefers not to use it.

Referring to FIG. 43-A, the self adjusting member 342 mainly comprise of a top connecting frame 342-0 with a front support piece 342-2 that swivels front or back, two pairs of telescoping tubes 342-6 and 342-4 with their respective retaining caps, a pair of expansion springs 342-9 and a pair of connecting bases 342-8.

Top connecting frame 342-0 comprises a bar that terminates at each end with a bottom facing socket 342-06 that dimensionally mates with inner tube 342-4. A swivel hole 342-04 centered right next to a corner edge shown is provided on each of the thicker unexposed sides of the sockets 342-06. The midsection of top connecting frame 342-0 has a plate with an elongated central opening 342-02 extending downwards. Retainer 342-3 has a small circular plate 342-3" with a stem 342-30 that goes through elongated opening 342-02 of top support frame 342-0.

The description and function of the telescoping tubes and their retaining caps and expansion springs are ideas borrowed from the horizontal components of the ground pack carrier on FIG. 15.

A connecting base 342-8 has a top facing socket 342-6' for outer tube 342-6. Two opposing socket walls are made thicker at the lower end to accommodate a bottom anchoring rod 342-1' for one end of the expansion spring 342-9. Base 342-8 also has leg extension 342-8' with pin aperture 342-8".

Assembly of member 342 is as follows:
1. Bottom retaining cap 342-5 is mounted onto inner tube 342-4.
2. Top retaining cap 342-7 is mounted onto outer tube 342-6.

3. Inner tube 342-4 is inserted into the bottom of outer rube 342-6 until a manageable length of it is exposed on the top end of outer tube 342-6.
4. Bottom anchoring rods 342-1' is installed in both bases 342-8.
5. Top anchoring rods 342-1 are installed through the side of socket terminals of top support frame 342-0.
6. Terminals of front support piece 342-2 are inserted into a swivel hole 342-04. The other arm is inserted into the other swivel hole by flexing the piece slightly.
7. One end of expansion spring 342-9 is hooked up onto bottom anchoring rod 342-1'.
8. The spring 342-9 is inserted into the inner and outer tube assembly from step 3 and the bottom of outer tube 342-6 is wiggled into socket 342'-6 where it is fastened in place with screws.
9. The other end of spring 342-9 is fished out of the inner and outer tube assembly and hooked to a top anchoring rod 342-1.
10. Inner tube 342-4 is wiggled into socket 342-06 where it is fastened in place with screws.
11. Stem 342-30 of retainer 342-3 is inserted into elongated opening 342-02 after which a top plate 342-3' is welded and permanently fastened to the tip of the said retainer stem.

Referring to FIG. 43-B, assembly of the remaining parts of the carrier is as follows:
1. Legs 340-0 of platform adaptor 340 is positioned next to the ends of spacer 338-4, followed by leg extensions 342-8' of member 342.
2. Referring back to FIG. 40, the two bases 306R and 306L are positioned against their respective hubs.
3. Hinge pin 320 is inserted through apertures 306-2R of base 306R, pin aperture 312'-0R of hub 312R, aperture 342-8" of connecting base 342-8, right pin aperture 340'-0 of adaptor 340, spacer aperture 338-4', left pin aperture 340'-0 of adaptor 340, left aperture 342-8" of connecting base 342-8, aperture 312'-0L of hub 312L, and aperture 306-2L of base 306L, after which, it is capped with cap 320'.

Operation of Bike Pack Carrier III

Referring to FIGS. 42-D and 42-D', to carry a backpack upright, the self-adjusting raised front member 342 is laid onto platform 338. Top plate 342-3' of retainer 342-3 is pushed rearward until the bottom plate 342-3" drops into entry hole 338-2 of platform 338. Then plate 342-3' is pushed forward. Bottom plate 342-3" travels along retaining groove 338-0 as raised front member 342 adjusts to the depth of the backpack.

The backpack is loaded onto the carrier on top of adaptor 340 and member 342 with the piece 342-2 in the upright position. Stopping surfaces 342-00 between the midsection of frame 342-0 and its sockets 342-06 maintain the piece 342-2 in the upright position. Contact between support piece 342-2 and the front of the backpack automatically extends the length of member 342.

The backpack straps are fastened as discussed earlier.

Referring to FIG. 42-E, the backpack is carried lying down. The platform adaptor 340 may or may not be used depending on what is more stable considering the width of the backpack. The retractable tube assembly is folded down and locked by mechanism 326. It is then extended to conform to the length of the backpack. Member 342 stays upright with support piece 342-2 extending out horizontally. The backpack is then loaded and contact between the support piece 342-2 and the front of the backpack automatically extends the height of member 342. The backpack straps are then fastened to the carrier as before.

Tubular Bike Pack Carrier I

FIGS. 44-A and 44-B are illustrations of a pack carrier made mainly of metal tubing and rod stock. Its slim, compact design and strength may make it preferable by some over the other versions presented earlier. It can carry a backpack upright as shown in FIG. 44-A' or lying down as shown in FIG. 44-B'. It also has a self-adjusting raised front member incorporated in its platform.

Description of parts:

Referring to FIG. 44-C, the handle strap gripping means is the same as in other versions. The bottom facing sockets in elbows 347 dimensionally mates over smaller tubes 346R and 346L.

Tube 346R has an aperture 346-0 on its lower end where head of snap button 355 is disposed. A thin shallow notch 346-2 is carved around the outer circumference of tubes 346R and 346L past the aperture 346-0. Tubes 346R and 346L are each receivable within the inner dimensions of cap 357.

Tube 348R has a series of apertures 348-0 on its inner surface facing tube 348L. On the upper ends of tubes 348R and 348L are three more apertures 348-2 spaced equally around their respective circumferences. A pair of hinge apertures 348-4 is disposed at each of the lower ends of tubes 348R and 348L. Tubes 348R and 348L are each receivable within the outer dimensions of top retaining cap 357. Three protrusions 357-0 around the circumference of the cap 357 are receivable into apertures 348-2 of tube 348R or 348L. Cap 357 also has slits 357-2 to facilitate insertion into tube 348R or 348L.

Frame 358 comprise of a horizontally mounted Y-shaped tube with a U-shaped upright bumper 352 welded onto the two branching arms. The terminals 358-0R and 358-0L of the arms have reduced outer dimensions. Just before each reduced section is a pair of hinge apertures 358-2R and 358-2L.

Upright clasp 350 is a rod bent to a shape that allows it to clasp the horizontal section of bumper 352 thus, retaining the retractable tube assembly in the upright position even without the backpack. It is mounted onto an aperture 354 welded to the inner side of tubes 348R and 348L.

Retaining ring 360 is receivable inside tube 348R or 348L.

The retractable tube assembly support 364 comprise of a narrow plate bent or shaped to clasp and retain tubes 348R or 348L while in the folded position. Its ends are welded to the bottom of horizontal platform tubes 362R and 362L.

Platform tube 362R and 362L dimensionally mate with reduced terminals 358-0R and 358-0L of frame 358 respectively. On each of their proximal ends are three apertures 362-0 spaced equally around its circumference.

Retaining cap 368 is similar to cap 357 except for its smaller top opening. The protrusions 368-0 are receivable into apertures 362-0 of tube 362R or 362L.

The self-adjusting platform 374 is a U-shaped tube or rod that is receivable inside cap 368 and tube 362R or 362L. It has a spring attachment hole 374-0 disposed close to its terminals. Shortly past the hole 374-0 is a thin shallow notch 374-2 carved around the circumference of the tube. Close to each corner of the U-shaped member is an aperture 374-4 welded to the bottom. The base of the shape U is sunken or lowered.

Retaining ring 376 is receivable inside tube 362R but not inside the smaller top opening of retaining cap 368.

Front hugger 372 is a rod bent to a shape shown that allows it to stay upright with pressure from the backpack's front. It is mounted onto the welded apertures 374-4 of platform 374. Integrated in its shape is a retainer 372-0 that bumps onto platform 374, thus blocking rotation beyond an upright position.

Extension spring 370 has a closed loop on one end and an open hook on the other.

Hinge pin 356 has two notches for retaining rings 356-0. Assembly of the tubular pack carrier I is as follows:

1. Bumper 352, cleats 316, support 364, apertures 354, and apertures 374-4 are welded to their respective attachment points as shown in FIG. 44-C.
2. Snap button 355 is inserted into the bottom of tube 346R and its head engaged into aperture 346-0.
3. A metal retaining ring 360 is mounted onto each notch 346-2 on tubes 346R and 346L using a tool especially made for that purpose.
4. Top retaining caps 357 are inserted into the tops of tubes 348R and 348L.
5. Tubes 346R and 346L are inserted into the bottom of tubes 348R and 348L respectively until they go past caps 357.
6. A retaining cap 368 is inserted into each end of self-adjusting platform 374 past the spring attachment holes 374-0 and the notches 374-2.
7. Retaining rings 376 are mounted onto notches 374-2.
8. The open hook end of an extension spring 370 is hooked onto each hole 374-0 and crimped in place.
9. The springs 370 and the terminals of platform 374 are inserted as far as possible inside the proximal ends of tubes 362R and 362L.
10. Retaining caps 368 are each pushed into outer ends of tube 362R and 362L. Their protrusions 368-0 engage into apertures 362-0.
11. The free looped end of extension spring 370 on the right is fished out the distal end of tube 362R, extended, and urged into terminal 358-0R until its hook aligns with the pair of hinge apertures 358-2R.
12. Tube 346R is pulled further out of tube 348R to clear the pair of hinge apertures 348-4 on tube 348R.
13. Hinge pin 356 is inserted into one aperture 358-2R from the exposed outer side of frame 358, going through the closed loop on the end of spring 370 and then through the second aperture 358-2R on the inner side of frame 358.
14. Hinge aperture 348-4 on tube 348R is then aligned with the end of hinge pin 356 in step 13. The pin 356 is pushed through both hinge apertures 348-4.
15. Tube 346L is pulled further out of tube 348L to clear the pair of hinge apertures 348-4 on tube 348L.
16. The hinge pin 356 in step 14 is further inserted into the apertures 348-4 of tube 348L.
17. Step 11 is carried out for the left side components as well.
18. The hinge pin in step 16 is inserted into one aperture 358-2L from the inner side of frame 358, going through the closed loop on the end of spring 370, and then through the second aperture 358-2L on the exposed outer side of frame 358 where it is capped in place.
19. Retaining rings 356-0 are installed on notches on hinge pin 356 to anchor tubes 348R and 348L against frame 358.
20. The left end of upright clasp 350 is inserted into aperture 354 on tube 348L.
21. Clasp 350 is slightly flexed and its right end inserted into aperture 354 on tube 348R.
22. The reduced terminals 358-0R and 358-0L of frame 358 are inserted into the distal end of tubes 362R and 362L respectively and fastened together with short screws that do not obstruct the movement of spring 370 inside.
23. The top of tubes 346R and 346L are received into the sockets of elbows 347 where they are fastened in place with screws.
24. Front hugger 372 is flexed so that its ends can be engaged into apertures 374-4 of platform 374.
25. The bottoms of tubes 348R and 348L are closed up with caps. This is not shown in FIG. 44-C.
26. Support 365 is bolted or welded directly onto platform tubes 362R and 362L. For packaging purposes, a bolt and nut connection is preferable. The bolt may be pre-welded to the bottom of platform tubes 362R and 362L where it cannot interfere with the mechanisms inside the said platform tubes.

Operation of Tubular Pack Carrier I

Referring to FIG. 44-A, the pack carrier is ready to carry a backpack in the upright position. Upright clasp 350 holds the pair of tubes 348R and 348L in the vertical position as it grabs onto bumper 352. Tubes 346R and 346L are extended by pressing the head of snap button 355 every time the button head engages into an aperture 348-0 as the telescoping assembly is lifted. The manner of securing the backpack is the same as that of previous bike pack carriers as shown in FIG. 44-A'. Front hugger 372 self-adjusts forward to conform to the depth of the backpack. It stays upright as retainer 372-0 anchors onto self-adjusting platform 374. When front hugger 372 cannot be used, self-adjusting platform 374 is pulled outward to allow the collapsed hugger 372 to rest into the hollow midsection 364-2 of support 364. A protrusion or some other kind of retainer may be disposed in the hollow midsection 364-2 to discourage hugger 372 from wobbling up and down inside.

When not in use or to prepare to mount a backpack on its back, the retractable tube assembly is folded down. Downward pressure is placed on the top midsection of handle assembly support 364. Its gripping ends 364-0 recede outward to accommodate tubes 348R and 348L. The folded carrier is shown in FIG. 44-B. To mount the backpack, the tube assembly is extended to the desired length and the straps are wound in their respective places as shown in FIG. 44-B'.

Tubular Bike Pack Carrier II

FIGS. 45-A and 45-B show still another version of a pack carrier on bike made of metal tubing or similar strong material. This version has a self-adjusting raised front member that can be used when the backpack is either upright or lying down. FIG. 45-C shows the unit folded down to a rack.

Description of Parts of Tubular Carrier II

Referring to FIG. 45-E, tubular carrier II comprise of a platform frame 404, bumper 405, a middle transverse support 400, a front transverse support 402, bottom support 365, a front hugger assembly 406, a retractable handle assembly 408, and several cleats 316.

Platform frame 404 looks like an extended Y while bumper 405 looks like an inverted shallow U-shaped member.

The middle transverse support 400 comprises of a narrow plate, shaped to clasp and retain the folded front hugger assembly 406. It also has a hollow midsection 400-2 designed to anchor the movable raised hugging member 406-8 when folded as shown in FIG. 45-C. It is similar to the support 364 shown previously in FIG. 44-C.

The front transverse support 402 is similar to support 400 except for the absence of a hollow midsection.

Referring to FIGS. 45-D and 45-D', front hugger assembly 406 comprise of two telescoping tubes 406-0 and 406-2 with a raised front members 406-7 and 406-8 connected to the exposed end of the smaller tube 406-2. It is assembled as follows:

a. Referring to FIG. 45-D, retaining ring 406-6 is installed on notch 406-20 of small tube 406-2.

b. Top retaining cap 406-5 is installed onto large tube 406-0.

c. Small tube 406-2 is received into the bottom of large tube 406-0 up through cap 405-6.

d. Referring to FIG. 45-D', the hook end of extension spring 406-4 is attached to the bottom of connector 406-9.

e. The loop end of extension spring 406-4 is dropped into tube 406-2.

f. Connector 406-9 is mated onto the top of small tube 406-2 and screwed in place.

g. Steps (a) thru (f) are carried out for a second set of tubes.

h. The exposed tops of connectors 406-9 are each welded onto corners 406-70 of hugger base 406-7.

i. The raised hugging member 406-8 is slightly flexed inward and inserted into hinge apertures 406-72 of hugger base 406-7.

The handle assembly 408 is put together in the same manner as in tubular carrier I.

Referring to FIG. 45-E, assembly of the tubular bike pack carrier II is as follows:

1. Bumper 405 is welded onto tube frame 404.
2. Middle support 400 and front support 402 are welded or bolted into place underneath platform tube frame 404.
3. The completed handle assembly 408 and front hugger assembly 406 are installed side by side with hinge pin 401. The looped end of extension spring 406-6 are each fished out from inside the lower end of hugger assembly 406 and positioned so that the hinge pin 401 goes through each of them as it goes through apertures 403 on their lower ends.
4. Caps 407 are installed onto the opened front end of tube frame 404.
5. Caps 409 are installed into the exposed ends of assembly 408.
6. Cleats 316 are welded on or screwed onto their respective spots as shown on FIG. 45-E.
7. Bottom support 365 is screwed onto the platform tube frame 404 during mounting on the bike.

Operation of Tubular Bike Pack Carrier II

By now, the use and operation of this version is similar to that shown in FIGS. 44-A' and 44B'. Referring to FIGS. 45-C, 45-E, and 45-F, the hollow midsection 400-2 of middle transverse support 400 may be disposed with a protrusion 400-4 that has an inner edge 400-20. This edge will discourage the raised hugging member 406-8 from moving up and down inside the hollow 400-2 when not in use. Referring to FIG. 45-F', the dimensions of the parts of the front hugger assembly 406 and the dimension and position of the middle transverse support 400 may also be designed so that no protrusion is needed to anchor member 406-8. That is when the tip of member 406-8' meets the inner top edge 400-20' of hollow section 400-2' when the hugger assembly 406' is at the retracted position.

The optional upright clasp 350 that is part of the first version is eliminated because it interferes with the folding tubes 406-0. The handle assembly 408 and backpack can still be retained in the upright position when the straps are wound snugly onto their respective attachment points. If a retainer is still desired, it can be installed on the bumper instead, possibly a ring and clasp combination. The bumper may receive the ring end while the upright handle assembly may receive the clasp. The clasp illustrated on FIG. 52-G'B may be used.

Tubular Bike Pack Carrier III

As shown in FIGS. 46-A and 46-B, this is a simpler version of the two previous carriers. The self-adjusting front huggers are eliminated. A transverse support 410 may or may not have gripping ends. Bottom support 412 is also lifted slightly to the same level as support 410 and platform tubes 411. These level supports bear most of the backpack load virtually eliminating any downward pressure on front transverse support 414 that can cause its gripping ends to recede and loosen grip on the folded handle assembly. Because of this advantage, bottom support 412 may also be used in place of bottom support 365 in the two previous versions.

Tubular Bike Pack Carrier IV

As shown in FIGS. 47-A and 47-A', this is a unit with a self-adjusting front hugger for use with backpacks mounted upright.

Tubular Bike Pack Carrier V

As shown in FIGS. 48-A and 48-A', this is a unit with a self-adjusting front hugger for use with backpacks mounted on its back.

Tubular Bike Pack Carrier VI

As shown in FIGS. 49-A and 49-A', this is a unit with a folding self-adjusting front hugger for use with backpacks mounted on their backs.

The assemblies for the above versions are easy to follow by now just by looking at the illustrations and therefore, will no longer be discussed in detail.

Alternate Means of Adjusting Height of Transverse Bar with Gripping Means

The use of internally mounted spring or snap buttons is the only means shown so far to adjust the height of the retaining means for both ground and bike pack carriers. Other possible means will now be presented.

I. Externally Mounted Spring Button Anchoring Means

Referring to FIG. 50-A, a flat-type spring button 502 comprises of a button head 502-2, a push control member 502-0, and a mounting plate 502-4. It is fastened onto the outside of the rectangular larger tube 504 with a rivet 503 that goes through a hole on mounting plate 502-4 and a hole 504-0 on the larger tube wall. The button head 502-2 is disposed into an aperture 504-2.

In FIG. 50-A', the spring button 506 is basically the same as button 502 but designed to conform with a cylindrical tube 505.

How the button operates is shown in FIGS. 50-B thru 50-B". The series of holes are now on the inner tube. Push member 502-0 is pushed inward causing the button head 502-2 to recede outward and dislodge from the hole of the inner tube that it is in. The push is maintained on member 502-0 while the inner tube is adjusted up or down to its desired position after which the pressure on member 502-0 is released. Minor upward or downward adjustments are made until the button head 502-2 lodges into the nearest hole on the inner tube.

The spring button mounting plate and push control members can be lengthened and aperture 504-2 can be widened so that the button head can clear both inner and outer tubes. Swiveling the button on the axial rivet stem 503-0 allows the button head to be temporarily set out of the way leaving both hands of the user free to adjust the inner tube relative to the outer tube. This option is particularly desirable when a spring button is mounted on both left and right tubes. One button on only one side may be needed for bike pack carriers while buttons may be necessary on two sides for ground carriers where some lifting capability is expected from the handle assembly. Mounting of spring buttons 502 or 506 onto a telescoping handle assembly for bike pack carriers is shown in FIGS. 50-C and 50-C'. The rivet 503 for mounting the buttons must not be in contact with the inner telescoping tube.

Referring to FIG. 50-D and back to FIG. 6, externally mounted spring buttons 502 or 506 are used on a ground pack carrier. The series of holes are now on tube 54R' and 54L' and the spring buttons 502 or 506 are on tubes 50R' and 50L'. Snap button 60-1' is made to face opposite the side with the plurality of holes so that it cannot lodge into any of them. The bottom retaining cap 64' on tube 60 has a curved edge on the part that comes in contact with the tip of the positioning head 502-2 of spring 502. The bumpers are eliminated.

As shown in FIG. 50-E, the push control member 502-0 may be replaced with a finger-friendly extension 502-0' disposed directly behind button head 502-2'. Here the user tugs on the extension to dislodge button head 502-2' from the holes it is in.

If the plurality of holes are provided on both opposing sides of the inner tube and a corresponding aperture 504-2 is also on the opposing side of the outer tube, a nut and bolt type of anchoring hardware may be used.

II. Friction Between Walls of the Inner Tube and an Externally Controlled Friction Source Friction is introduced to the outer walls of the inner tube to deter its movement. Referring to FIG. 51-A, the system comprise of a friction knob housing 602, a hinge pin 605, a friction knob 604, and a window 606-0 on the larger or outer tube 606.

Housing 602 is a member that has an opening 602-0 surrounded by a knob socket protrusion 602-2 into which friction knob 604 is disposed before hinge pin 605 is inserted into pin holes 602-4 and 604-0. As construed from FIG. 51-B, housing 602 serves as a top retaining cap for tube 606 as well.

Friction knob 604 has a head 604-2 that comprises a lop-sided barrel that rotates along the axis of hinge pin 605 running through it. The section of 604-2 with a larger radius provides the friction for inner tube 608.

Window 606-0 on tube 606 allows head 604-2 to establish contact with the inner tube 608.

The assembly of the system is easily understandable just by referring to FIGS. 51-B and 51-B'. The holes along the inner tube are eliminated. The top retaining cap for one of the larger tubes 606 is replaced by friction knob housing 602. The larger tube 606 is equipped with a window 606-0.

Operation is illustrated on FIGS. 51-C1 thru C3. FIG. 51-C1 shows the elongated section of knob head 604-2 in tight contact with inner tube 608. Movement of tube 608 is prevented. To release the inner tube, the knob handle is pulled up and out. The knob rotates along pin axis to a position where the shorter section of its head is closest to the inner tube. Contact cannot be made with the inner tube 608 thus leaving it free to be adjusted up or down inside larger tube 606.

Another row of figures, FIGS. 51-D1 thru D3 show the same operation except for the addition of another member 610 which is a plate slightly smaller than the size of window 606-0'. It is placed between the window 606-0' and knob 604' after the inner tube is already inside the bigger tube so that it does not fall in. Plate 610 replaces a portion of the elongated section of knob 604 thereby allowing the opening 602-0 and the extra long section knob head to be reduced. The new knob 604' has a shorter elongated section and the new opening 606-0' and the new knob socket protrusion 602-2' are both smaller than before.

III. Threading Adjuster Assembly I

Referring to FIGS. 51-E and 51-E', the threading adjuster assembly I comprises a large tube 626, a pair of adjusting rings 632, retaining means holder 622, a top retaining cap 624, and a small tube 628 and its usual internally mounted spring button and bottom retaining cap.

Tube 626 is a tubular member of length about the height of a backpack. It threaded on its outer walls on the upper portion of its length.

Adjusting ring 620 is a short tube with inside walls threaded to mate with and receive the threaded upper portion of tube 626. Its outer walls are ridged to provide traction for turning using the user's fingers.

Tube 628 is another tubular member receivable inside tube 626 and is a little longer than tube for maximum extending capability. It has apertures 628-2 and 628-4 at its lower end.

Supporting connector 622 is another short tubular member receivable outside tube 626 and capable of being supported by ring 620. It has a side window 622-2 of size capable of receiving just ring 620 from the side and into an inner recess. The other side has a socket 622-4 for receiving a bar containing retaining means.

The top retaining cap 624 works the same way as cap 58R in FIG. 3-A except for the absence of a socket for the retaining means.

Assembly of the threading adjuster I is as follows:
1. Adjusting ring 620 is received through the side window 622-6 of supporting connector 622.
2. The top of tube 626 is threaded or wound up the bottom of the combination in (1), thread 620-2 mating with thread 626-2.
3. Spring button 630 is inserted at the bottom of tube 628 with its head engaged in aperture 628-2.
4. The bottom of tube 628 is inserted into cap 623, its inner protrusions engaging into apertures 628-4.
5. The top of tube 626 is inserted through the bottom of cap 624 and screwed in place. The threaded portion that stays inside the cap may need to be filled up with a filling adhesive before screwing for greater fastening strength.
6. The top of tube 628 in step (4) is inserted through the bottom of tube 626 until the top and bottom retaining caps 624 and 623 bump against each other.
7. Steps (1) thru (6) are repeated for another column as needed.

The fully assembled unit with the retaining means at the highest level is shown in FIG. 51-E".

IV. Threading Adjuster Assembly II

Referring to FIGS. 51-F and 51-F', a pair of adjuster rings 620 is used for each column. A revised connector 632 is simplified as a result. Assembly is very similar to that of assembly I and can be easily inferred just by viewing FIG. 51-F'". Operation is also similar except for the extra adjuster ring 620 to turn. They can be turned together or one at a time.

V. Threading Adjuster Assembly III

Referring to FIGS. 51-G and 51-G", the connector 642 works the same way as connector 622 in FIG. 51-E'. The socket 622-4 is replaced with a long tube 640 disposed transversely upward relative to the side window 642-2. The upper end of tube 640 is connected to a retaining means holder 634.

Tube 636 is receivable inside tube 640. An outer threaded inner tube 638 with a dome-shaped top 638-2 is receivable inside tube 636.

Adjusting ring 644 has threaded inner walls to mate with the threaded outer walls of tube 638. It is receivable through the top or side window of connector 642 during assembly.

Retaining ring 643 works like a washer. Its outer diameter equals that of tube 640 and it inner diameter is slightly larger than that of tube 638.

Assembly is as follows:
1. Adjusting ring 644 is placed inside connector 642.
2. Retaining ring 643 is laid over the top of ring 644.
3. The bottom of tube 638 is threaded down the adjusting ring through the top of connector 642.
4. The bottom of tube 640 is inserted into connector 642 and screwed in place.
5. The bottom of tube 636 is inserted into retaining cap 646.
6. The bottom of capped tube 636 is inserted through the top of tube 640.
7. The top of the assembly in (6) is inserted through the bottom of holder 634 until the top of tube 640 rests on stopper 634-2.
8. Tube 640 and holder 634 are permanently fastened together with screws.
9. Steps (1) thru (8) are repeated for another column as needed.

The assembled unit is shown in FIG. 51-6".

Referring to FIG. 51-G, an optional externally controlled spring button 646 is installed into holder 634 to retain tube 636 in the extended position. An aperture 636-2 is disposed on the lower section of tube 636 accordingly.

Operation is the same as that in the previous threading adjusters in that and adjusting ring 644 is turned towards the right and left to respectively raise or lower the retaining means.

Pack Carrier for Recumbent Bikes

All the carriers presented for upright bikes can be slightly modified to adapt to recumbent bikes.

Model I

Referring to FIG. 52-X, one type of recumbent bike has a backrest comprising of two parallel inclined tubes joined by a transverse bar on top, another transverse bar at the bottom, and another one somewhere in between. The entire backrest except for the middle transverse bar 704 can be bent out from a single length of tube. A regular pack carrier for an upright bike can be slightly modified to take advantage of these readily available attachment structures.

Referring to FIGS. 52-A and 52-A', the handle assembly or main frame 708 is assembled in the same manner as assembly 408 in FIG. 44-C. It has a pair of large tubes 708-0R and 708-0L of length that is at least the distance between the transverse bars 702 and 704. The upper and lower ends of tubes 708-0R and 708-0L are welded onto the transverse bars. Platform 706 has a hinge relationship with the handle assembly to allow the platform to remain substantially level despite changes in the inclination of the backrest. Its ends are resting on top of middle transverse bar 704 for extra support. The assembly and operation are by now easily understood just by referring to FIGS. 52-A and 52-A'.

Model II

Referring to FIGS. 52-B and 52-B' the distance between transverse bars 702 and 704 is adequate for the height of a fairly good-sized backpack. In this case, the telescoping handle assembly can be replaced with just a pair of tubes 800R and 800L. One of the tubes has a series of holes on one side. The rotating knob assembly 802 is terminated with tubes 802-0R and 802-0L that are movable up or down tubes 800R and 800L respectively. Tubes 802-0R and 802-0L are anchored in place by an externally installed flat-type spring button 506 whose button head is lodged into one of the holes. As shown in FIG. 51-A, friction is also another means used to anchor the knob assembly, 802.

Model III

Referring to FIGS. 52-C and 52-C', a pair of tubes 800R and 800L are joined and terminated on top by a fixed rotating knob or equivalent gripper assembly 804. The platform 806 is a level base that is height adjustable by virtue of the tubes 806-0R and 806-0L disposed on both its rear corners that can receive tubes 800R and 800L up or down respectively. Tubes 806-0R and 806-0L also house cleats 316 and spring buttons 506.

Assembly comprises of the following:
1. A cleat 316 is welded on the exposed side of each of tubes 806-0R and 806-0L.
2. Spring buttons 506 are riveted onto tubes 806-0R and 806-0L so that their button heads are disposed into apertures 806-2 thereon.
3. Tubes 800R and 800L are inserted into tubes 806-0R and 806-0L respectively.
4. The tops of tubes 800R and 800L are capped with the gripper assembly 804
5. The top and bottom sections of tubes 800R and 800L are welded onto transverse bars 702 and 704.

To operate, the desired position of platform 806 is first determined by the height of the backpack. Push members of spring buttons 506 are each pressed to dislodge the button heads from their respective holes on tubes 800R and 800L and apertures 806-2 and then swiveled out of the way. Platform 806 is adjusted up or down to the desired level. Spring buttons 506 are swiveled back to their original orientation and slight final adjustments are done until the button heads lodges into the nearest hole on tubes 800R and 800L.

Model IV

Referring to FIGS. 52-D and 52-D', another model uses a non-rotating knob 808 and joined tubes 806-0R and 806-0L with no platform. The parallel tubes are welded onto the transverse bars. Without a platform, the weight of the backpack is supported mainly by knob 808. A fixed knob welded onto the top transverse bar 702 offer a reliable and secure hold on the backpack's handle strap and can be used in place of a rotating one especially if no platform is provided.

To operate, the backpack handle strap is wound around the knob 808 until snug. The spring buttons are swiveled out of the way. Then the joined tubes 806-0R and 806-0L are adjusted up or down until the cleats are closest to the spot where the lower ends of the straps attaches to the backpack. At the desired point, the spring buttons are swiveled back and the button heads lodge into their respective holes along tubes 800R and 800L. The lower unpadded end of the padded straps are then wound around their respective cleats until secure.

Model V

The model shown in FIG. 52-E is the same as that in FIG. 52-A except for the manner in which it is mounted. Permanent attachment by weld of the handle assembly is avoided. This allows the owner of a particular recumbent bike the option of installing the pack carrier of his choice on his bike. Special clamps 902 or 903 shown in FIGS. 52-EA' and 52-EB' are used. They are to be attached onto the point where the vertical handle assembly intersects with the top transverse bar as shown in FIGS. 52-E and 52-E'.

Referring to FIG. 52-EA, clamp 902 comprises of brackets 902-1, 902-2, and 902-3 bolted together. Bracket 902-1 is the familiar looking U-shaped plate used for anchoring pipes. Bracket 902-2 provides anchoring points for bracket 902-1 of the vertical pipe and bracket 902-3 of the horizontal pipe. Its midsection 902-20 is shaped to wrap about halfway around the horizontal pipe. Bracket 902-1 is anchored onto the holes on each end of the top flat plate 902-22. The cross-like window 902-24 in the center is where the head 902-30 of bracket 902-3 is held in place. A bottom flat plate serves as an anchoring place for the lower end of bracket 902-3. The opening in the midsection 902-20 allows the two perpendicular pipes to touch each other for a more compact connection. The three brackets described above are joined together with bolts 902-25 as shown in FIGS. 52-EA' and 52-EA".

Referring to FIGS. 52-EB and 52-EB', clamp 903 uses a different middle bracket 903-2. Bracket 903-2 has a solid midsection 903-20 that goes between the two perpendicular pipes. The connection may be less conspicuous but not as compact as before. This type of mounting is going to be used in succeeding illustrations.

A third type of connection as shown in FIGS. 52-EC and 52-EC' uses two of the same bracket 905-2, each positioned perpendicular to each other. This is possible because bracket 905-2 is as high as it is wide and the tubes being joined have the same cross-sectional dimensions. For joining different-sized tubes, brackets of the same type but of different sizes can be used. The mounting procedure is readily understood just by referring to the illustrations presented.

Model VI

A folding model shown in FIG. 52-F is an adaptation of one in the section for upright bike pack carriers using metal tubing. The handle assembly is supported by leaning on the unexposed side of the top transverse bar 702. A clasp 901 as shown in FIG. 52-F' may be used to eliminate clattering in case the backpack handle straps are not tightly secured onto the gripper assembly. The horizontal or transverse bar is forcibly pushed between the upper arms 901-4 and lower arms 901-6 and finally into clasp trunk 901-2 of clasp 901. As the transverse bar is being urged into clasp trunk 901-2 of clasp 901, the vertical tube of the carrier is also being urged into the right and left arms of said clasp. The procedure is shown in FIGS. 52-F'A thru 52-F'C.

Another clasp 909 shown in FIGS. 52-G'A thru G'C can be installed on the transverse bar. The clasping mechanism is the same as that of the clamp grip in FIGS. 28-C1 and C2. The clasp band 909-0 works just like clamp mate 205' but shaped to conform to the cross-section of the upright tube. The hinge housing 909-2 and closure 909-4 work just like hinge housing 204-0 and closure 204-2 in FIG. 28-B respectively. As mentioned earlier, clasp 909 may also be used on the bumper and handle combination for tubular carriers on upright bikes.

Model VII

Referring to FIG. 53-X, another type of recumbent bike has a backrest with no top transverse bar. It however has a level surface at the back that can serve as a platform support for a backpack.

Referring to FIGS. 53-A, 53-A', and 53-B, the middle transverse bar 704 serves as the attachment point for the upper portion of the larger tube 902-0 in the handle assembly or mainframe 708. The handle assembly is joined together at the bottom by twin 90 elbow 904 that is consequently anchored onto support 908 by bracket 907. Platform 906 is also anchored independently on front and back onto support 908 with screws or bolts.

As shown on FIG. 53-B, the main frame may be mounted vertically instead of inclined. Finally, referring to FIG. 53-C, a self-adjusting front hugger such as that assembled in FIGS. 45-D and 45-D' may be added on.

Model VIII

FIG. 54-X shows a model with two transverse bars and a platform support, therefore, features of pack carriers shown on FIGS. 52 thru 53-C may be combined. One such combination is shown on FIG. 54-A.

Model IX

Finally, there is a backrest model with no transverse bars. Two parallel tubes of a U-shaped member 1000 can be mounted behind the backrest frame 1004 using connectors 1002. Connectors 1002 are shorter versions of twin elbow 904 in FIG. 53-A' and used to connect the tops of tube 1000 and backrest frame 1004 to each other. The U-shaped tube 1000 should be less than the width of a regular backpack to provide support during sudden stops and for aesthetic considerations, the width of platform 906 will match the proposed width of the main frame.

Assembly of this type of pack carrier is simple and easily understood just by looking at FIGS. 55-A and 55-A'. The size and length of connector 1002 are functions of the desired space between the frame 1004 and tube 1000 and the space between each of the parallel members of the main frame. The connectors, frame 1004, and tube 1000 are fastened together with screws.

The pair of connectors 1002 may be joined by a transverse bar for a more sturdy pack carrier. The resulting connector 1006 is shown in FIGS. 55-B and 55-B'. Note that if the inclination of the backrest is not adjustable, the U-shaped member 1000 may be mounted upright and the orientation of the sockets of the top connector 1006 is changed accordingly.

Model X

The carrier shown in FIGS. 55-B and B' can be adapted to a frame that already has a top transverse bar as shown in FIGS. 55-C and C'.

Alternate Semi-self-adjusting Platform for Pack Carriers

Only one type of self-adjusting platform has been presented so far. Referring to FIGS. 9-A and 9-B, expansion and contraction are accomplished by the use of springs or heavy-duty elastics mounted inside telescoping tubes.

Other type of plate platforms will be disclosed shortly comprising of several semi-self-adjusting types and several manually-adjusting types. Several sliding means are described to effect the adjustment needed to accommodate the thickness or depth of the backpack.

An alternative to this method is presented in FIGS. 56-A thru 56-E'. This semi-self-adjusting type lends itself well to a plate platform although it can be adapted to look like a tube platform as well by hollowing out its center. It is only semi-self-adjusting because, one still has to push or pull a control member to activate or deactivate its adjusting mechanism.

Referring to FIGS. 56-A, 56-B, and 56-C the semi-self-adjusting plate platform basically comprise of a front platform extension 1010 that can extend out of a larger rear platform 1012. A pair of button heads 1010-40 slip in and out of one in several in a row of wave-like indentations 1012-01 as the raised front member 1010-04 is urged out by the backpack. At the desired position, the button heads 1010-40 are trapped into the indentation they are in by a control member 1010-2, thus preventing further movement by the front platform extension 1010.

A front member base 1010-0 comprise of a plate flanked in front by a raised front member 1010-04 with a center opening 1010-03 and the pack carrier's two front legs 1010-06. The protrusions 1010-02 on top of the plate serve as guides or retainers for the control member 1010-2 and flexible button 1010-4. There are also retainers 1010-01 disposed on the underside.

Control member 1010-2 comprises of a thin plate with a button contact extension 1010-22 and an on/off extension 1010-24 on each side and a finger button 1010-20 in front.

Twin flexible button 1010-4 comprises of a slim plate terminating transversely with button neck 1010-42 on each end. Along neck 1010-42 are on/off protrusions 1010-44, button contact protrusion 1010-46, and finally the button head 1010-40 itself.

Front member top plate 1010-6 is a plain plate with a bottom protrusion 1010-60 and several holes for screws.

Rear platform 1012 comprises of a rear member base 1012-0 and rear member top plate 1012-2. Rear base 1012-0 is a plate flanked at the rear with the two rear legs of the pack carrier and at both sides with a row of indentations 1012-01. Further inward from the row of indentations 1012-01 is a pair of narrow elongated holes 1012-04.

Assembly of the entire plate platform is as follows:
1. Starting with the assembly of the front platform extension 1010, control member 1010-2 is laid onto front member base 1010-0. Notches 1010-26 allow member 1010-2 to clear mounting protrusion 1010-08 on base 1010-0 during assembly.
2. Finger button 1010-20 of member 1010-2 is urged into opening 1010-03 of front member base 1010-0.
3. Twin flexible button 1010-4 is laid onto the space left between control member 1010-2 and the mounting protrusions 1010-08.
4. Front member top plate 1010-6 is laid on top of base 1010-0. Bottom protrusion 1010-60 lodges into mounting cavity 1010-48 of twin flexible button 1010-4 to retain it in place.
5. Base 1010-0 and top plate 1010-6 are fastened together with screws.
6. The just assembled front platform extension 1010 is laid onto rear member base 1012-0 while button heads 1010-40 are urged inward and subsequently are lodged into the innermost indentation 1012-01. Bottom retainers 1010-01 of front base 1010-0 are lodged into elongated holes 1012-04 of rear member base 1012-0.
7. Rear member top plate 1012-2 is laid onto rear member base 1012-0 and secured in place with screws.

Operation of the Semi-Self-Adjusting Platform

A cross-sectional top view of the platform is shown in FIG. 56-D3. The button 1010-4 in the "on" position right after assembly. Button head 1010-40 is free to extend into and retract from indentation 1012-01 with the right pressure between the surfaces of twin flexible button head 1010-40 and wave crest 1012-03 of rear member base 1012-0. Consequently, the entire front platform extension 1010 can be pushed out to adjust to the depth of the backpack.

Referring to FIG. 56-D4, platform extension 1010 is pushed outward. Button head 1010-40 is urged out by virtue of the flexing of button neck 1010-42 caused by the sliding pressure and resistance between the surfaces of the rigid smoothly curved wave-like indentation and the movable rounded button head 1010-40. The button neck 1010-42 is flexed until its head 1010-40 reaches the next wave crest 1012-03. Further pushing of platform extension 1010 causes the button head 1010-40 to drop into the next wave trough 1012-02 as shown in FIG. 56-D5. In short, the button head moves in and out of the series of wave crests and troughs. When the desired platform expansion is reached, the control member 1010-2 is shifted to the "off" position by pushing finger button 1010-20 inward via the front opening 1010-03. On/off extension 1010-24 of control member 1010-2 applies pressure on the on/off protrusion 1010-44 of twin flexible button 1010-4 causing the button neck 1010-42 to flex out of the way. The "off" position is attained when extension 1010-24 has overtaken protrusion 1010-44. At this point, button contact protrusion 1010-46 of flexible button 1010-4 is obstructed by control contact extension 1010-22 of control member 1010-2 thus preventing movement of button head 1010-40. The result is shown in FIGS. 56-D6 and 56-D7.

Referring back to FIGS. 56-D1 and 56-D2, control member 1010-2 is switched "on" from an "off" position. The finger button 1010-20 of control member 1010-2 is pushed out from the rear via the opening 1010-03 of front platform extension 1010 until the tip of control contact extension 1010-22 is in contact with stopper surface 1010-02 of front member base 1010-0. As this is being done, on/off extension 1010-24 of control member 1010-2 applies pressure on the on/off protrusion 1010-44 of twin flexible button 1010-4 causing the button neck 1010-42 to flex out of the way. At the same time, control contact extension 1010-22 slides down releasing contact with button contact protrusion 1010-46. The "on" position is attained when extension 1010-24 is now below protrusion 1010-44, which is also the point when the obstruction on the button head has been adequately withdrawn. All these conditions are shown in FIG. 56-D3.

The size of opening 1010-03 should be just enough for finger button 1010-20 of control member 1010-2 to smoothly slide in. This is to prevent the user from inadvertently putting the plate platform in the "on" position.

The cross sectional top view of the semi-adjustable plate platform in the retracted and fully expanded positions are shown in FIGS. 56-E and 56-E' respectively. At maximum expansion, underside retainers 1010-01 of front member base 1010-0 gently collide onto the front end of elongated holes 1012-04 of rear member base 1012-0, thus, preventing the front platform extension 1010 from leaving rear platform 1012. At the same time, button heads 1010-40 of twin flexible button 1010-4 are lodged into the outermost wave trough 1012-02 of rear member base 1012-0.

Alternate Manually Adjustable Plate Platform I

Another version of a plate platform is one that is manually adjusted. It is a modification of the semi-self-adjustable version presented earlier. Referring to FIG. 57-A, the on/off protrusions for the new twin flexible button 1014-2 and the on/off extensions for the new control member 1014-4 are all eliminated. The finger button is replaced with a bottom extension 1014-40 that connects to a compression spring 1014-5.

The front member base 1014-0 has a bottom projected cavity 1014-02 that houses the bottom extension 1014-40 of control member 1014-4 and the spring 1014-5 as shown in FIG. 57-A'. The assembled front platform member extension 1014 is shown in FIG. 57-B.

Referring to FIG. 57-C, rear member base 1016-0 has a notch 1016-02 to allow room for the bottom cavity 1014-02 of front member base 1014-0.

As shown in FIGS. 57-A, 57-B, and 57-C, assembly of the manually adjustable platform I is similar to that of the semi-self-adjusting one. There is only the extra step of installing the spring 1014-5 inside the bottom-projected cavity 1014-02 of front base 1014-0.

Operation of the Manually Adjustable Platform I

Starting from an "off" position as shown in FIG. 57-B, the bottom extension 1014-40 of control member 1014-4 is accessed by the user's hand from the bottom front. It is pulled outward with the fingers. Spring 1014-5 compresses as the extension 1014-40 slides into bottom projected cavity 1014-02. At the same time, the control contact extensions 1014-42 slides away from button contact protrusion 1014-26. Button neck 1014-22 is left free to flex its head 1014-20 out of the indentation 1016-04 on rear base 1016-0 as the front platform extension 1010 is pulled out. The outward pull on bottom extension 1014-40 of control member 1014-4 should be maintained while the platform extension 1010 is being moved.

The cross-sectional top views of the manually adjustable platform in the retracted and fully expanded positions are shown in FIGS. 57-D and 57-D" respectively. The retracted platform shown in FIG. 57-D' is ready for adjusting considering the position of the control member 1014-4 and the compressed state of spring 1014-5. The bottom isometric views of the retracted and fully expanded positions of the adjustable platform are also shown in FIGS. 57-E and 57-E' respectively.

Alternate Manually Adjustable Plate Platform II

Shown on FIGS. 58-A thru 58-D' is another manually adjustable plate platform using a pair of buttons that are directly attached to a control box 1018-2 that is operated just like the bottom extension 1014-40 in FIG. 57-A.

Referring to FIGS. 58-A and 58-C, this manually adjustable plate platform comprise of a front member base 1018-0, a control box 1018-2, a compression spring 1018-3, a front member top plate 1018-4, a rear member base 1020-0 and a rear member top plate 1012-2.

Front member base 1018-0 is equipped with a pair of smoothly curved channels 1018-04 extending from the top edge of a bottom cavity 1018-02 to the farthest outer edge of base 1018-0. Cavity 1018-02 works just like the bottom projected cavity 1014-02 in FIG. 57-A.

Control box 1018-2 has on one face a protrusion 1018-20 that acts as a spring retainer. On the other face is a pair of button stems 1018-22 a little shorter than the length of channel 1018-04. Stems 1018-22 terminate with button heads 1018-24 that can project out the edge of front member base 1018-0. Said stems and button heads are dimensionally receivable along channels 1018-04.

Referring to FIG. 58-C, rear member base 1020-0 is similar to the previous base 1016-0 in FIG. 57-C except for its shallower notch 1020-02 and the rearward location of its grooves 1020-04. This is to provide the least steep channel curve possible for a given size platform so that the stems and button heads of control box 1018-2 can slide more smoothly along the channels.

Assembly of the alternate manually adjustable platform II is as follows:

1. The control box 1018-2 is simply placed into cavity 1018-02 of front member base 1018-0 with its flexible stem 1018-22 and button head 1018-24 disposed along channel 1018-04.
2. Compression spring 1018-3 is inserted into cavity 1018-02 with spring retainers 1018-20 and 1018-06 inside its coils.
3. Front member top plate 1018-4 is laid onto base 1018-0 and fastened down with screws.
4. The assembled front platform extension 1018 shown in FIG. 58-B is laid onto rear member base 1020-0 while the control box 1018-2 is pulled forward. Button head 1018-24 is lodged into the innermost indentation.
5. The assembly in step (4) is enclosed with a rear member top plate 1012-2 fastened down on said base with screws.

The partial cross-sectional top views of the retracted and fully extended plate platforms are shown in FIGS. 58-D and 58-D" respectively. From the user's viewpoint, operation is the same as that of the previous manually adjustable platform I. The user pulls back the control box 1018-2 at the bottom front thus compressing the spring 1018-3. At the same time, the button head 1018-24 retracts from the indentation it is in and into channel 1018-04 thereby allowing front platform extension 1018 freedom to be moved in and out while the pressure on the control box is maintained as shown in FIG. 58-D'. The bottom isometric views of the retracted and fully extended plate platforms are shown on FIGS. 58-E and 58-E' respectively.

Note that the indentation and button illustrations on all the plate platforms are not drawn to scale relative to the plate to show more detail.

Alternate Self-adjusting Plate Platform

Finally, the original self-adjusting tube platform idea illustrated in FIGS. 9-A and 9-B can be adapted to a plate platform. The telescoping tubes are replaced with grooved plates that slide past each other. The grooves house the tension springs 1022-6 that are anchored to a rear platform on one end and to a smaller front platform on the other. The original retaining caps are replaced with protrusions or stoppers molded onto the grooved plate. Anchoring means for the springs may also be integrated with the plate.

Referring to FIGS. 59-A and 59-A', the entire platform assembly consist of a rear member base 1022-0, a front member base 1022-2, two pairs of anchoring rods 1022-4 and a pair of tension springs 1022-6.

Rear member base 1022-0 shown in FIG. 59-A is basically a plate flanked by a rear groove 1022-02 along each side, a rear rod notch 1022-06 at the rear end of each said groove, and a rear stopper 1022-04 at the front end of each said groove.

Front member base 1022-2 shown in FIGS. 59-B and 59-C is a smaller sized plate flanked by a front groove 1022-22 along each side. A front rod notch 1022-20 is at the rear end of each groove and a forward stopper 1022-24 is at the front end of each said groove.

Anchoring rods 1022-4 are metal rods that can withstand tensile force from the stretched spring 1022-6.

Tension spring 1022-6 is dimensionally receivable into grooves of front member base 1022-2.

Referring to FIGS. 59-A and 59-A', assembly of the self-adjusting plate platform is as follows:

1. The two pairs of anchoring rods 1022-4 are inserted into their respective notches.
2. Front member base 1022-2 is laid onto rear member base 1022-0.
3. Tension springs 1022-6 are set into the exposed grooves of front member base 1022-2. Their hooked ends are attached to their respective anchoring rods 1022-4 and crimped close.
4. Front member top plate 1022-8 is laid onto front member base 1022-2 and fastened thereon with screws.
5. Rear member top plate 1012-0 is laid onto rear member base 1020-0 and fastened down thereon with screws.

If the ends of spring 1022-6 are initially looped, the anchoring rods are made to go through these loops first before said rods are set into their respective notches. This eliminates the assembly time spent crimping the hooked ends close.

FIG. 59-D is an isometric view of the self-adjusting platform in the fully extended position without the top plates. FIGS. 59-E and 59-E' are partial cross-sectional top views of the platform in the retracted and fully extended positions respectively.

Backpack Carrier on a Single Column I

A pack carrier on a single column as in a scooter is shown on FIGS. 60-A and 60-B. FIG. 60-A assumes a column long enough to accommodate a regular-sized backpack. The main support bracket 1032 and arm frame 1036 are both mountable on the same member. FIG. 60-B assumes a column that is too short to provide ample space between bracket 1032 and arm frame 1036. Bracket 1032 is mounted on the next upper member. It is recommended that the main support bracket 1032 be easily adjustable up or down so that the next upper member can freely telescope in and out of the next larger tube it is in despite the presence of the main support bracket. Such bracket 1046 is shown in FIG. 62-A'. This bracket has to be installed on the scooter during assembly. It works in the same manner as the bracket 1048 (prior art) shown in FIG. 60-B that controls the height of the scooter handlebars. A mere flip of a lever 1046-2 loosens or tightens the grip of the bracket on the column, thus, allowing easy vertical adjustment of any tube nested in it.

Referring to FIG. 61-A frame 1036 comprises of an elongated member having a back contoured to conform to the shape of the column it is mounted on. The front side houses a pair of arms 1038 and 1040 that swing out to the right and left respectively. Towards the end of each arm is a Z-shaped cleat that can swivel out transversely for use and swivel in longitudinally when not in use. Apertures 1044-2 and 1045-2 are each disposed on the top inner corner of cleats 1044 and 1045 respectively in order to lodge spring plunger button heads 1042-2 when the arms are folded in. Protrusions 1038-2 and 1040-2 allows cleats 1044 and 1045 respectively to stay upright when the cleats are used together to anchor a backpack.

The front view of frame 1036 is shown in FIG. 61-B. Note the spring plunger buttons 1042 toward the top. The folded arms are shown on FIG. 63. The button heads 1042-2 lodges into apertures 1044-2 and 1045-2, thus keeping the arms in place on the arm frame.

The main support bracket 1032 is simply a mountable member that has two side hooks and a middle "knobbed" protrusion.

Referring to FIG. 62-A, assembly of the backpack carrier on a single column I is as follows:

1. The swing-out cleats 1044 and 1045 are attached to their respective arms with strong rivets or hinge pins that also allow swiveling freely along the rivet axis.
2. Spring plunger buttons are pushed into plunger holes 1050.
3. Arms 1038 and 1040 are attached to the double arm frame 1036 with hinge pins that go into countersunk holes 1048 and then capped at the other end. This is to allow the hinge pin heads to be flush with the front surface or backpack side of the arm.
4. The assembly from steps 1 to 3 is then mounted onto the bottom of base column 1030 with mounting brackets.
5. The main supporting bracket 1032 is then mounted onto the upper section of base column 1030 with mounting bracket 1034 just a backpack height distance from the open transverse arms 1038 and 1040.

Operation of the backpack carrier on a single column I is as follows:

1. A spring plunger button head 1042-2 on the right of arm frame 1036 is pressed inward as the exposed cleat portion 1044-4 of cleat 1044 is pulled out.
2. A spring plunger button head 1042-2 on the left of arm frame 1036 is pressed inward as the exposed cleat portion 1045-4 of cleat 1045 is pulled out.
3. The handle strap is hitched onto the side hooks 1032-2 and/or knob 1032-4 of main supporting bracket 1032 as shown in FIG. 62-B. This can be done in several ways, some of which are shown in FIGS. 64-A and 64-B depending on the type of handle strap that is on the backpack. A stiff, thick handle can just be made to hang on all three protrusions on bracket 1032. The more common flexible strap material can be wound around and around the middle knob 1032-4 until a snug fit is reached. If the middle knob 1032-4 cannot accommodate all the winding, the side hooks 1032-2 can take up the slack.
4. The lower ends of the backpack straps are wound around their respective cleats preferably in a number 8 pattern until snug.
5. To detach the backpack, simply do the above steps 4 and 3 in reverse order.
6. To fold when not in use, cleat 1044 of right arm 1038 is swiveled clockwise until protrusion 1038-2 is encountered. Then the entire right arm is swung counter-clockwise until it reaches an upright position. At this point, spring button head 1042-2 lodges into aperture 1044-2 keeping the entire arm in place.
7. Likewise, cleat 1045 of left arm 1040 is swiveled counter-clockwise until protrusion 1040-2 is encountered. Then the entire left arm is swung clockwise until it reaches an upright position. At this point, spring button head 1042-2 lodges into aperture 1045-2 keeping the entire arm in place.

A variation of the single column carrier I of FIG. 60-A is shown in FIGS. 65-A, 65-B, and 65-C. Spring plungers 1042 are relocated lower down the column. This obviates the need for the user to depress the button heads before the arms can be folded or unfolded. This task is relegated to the arm body itself by the presence of a concave notch 1052 on the edge of the arm right next to the button head when the arm is in the swung-out position. Another concave notch 1054 is next to the recess 1055 where the button head settles when the arm is in the folded or upright position. The new swing-out cleats 1056 no longer have apertures 1044-2 and 1045-2 and are also reoriented so that the exposed portions are now the lower ends of the cleats. The protrusions 1058-2 on arms 1058-R and 1058-L are also reshaped accordingly.

Assembly and operation of this type of carrier is basically the same as in FIG. 62-A except for the elimination of operation steps 1 and 2.

Note that the swing-out cleats and the arm may be integrated into one unit. The upper portion of the frame 1036 may also be reshaped to accommodate the new fixed cleat extension.

Backpack Carrier on a Single Column II

Referring to FIGS. 66-A, 66-B, and 66-C, another variation of a column carrier comprises of a single arm 1064 mounted on a frame 1062, and a main support bracket 1032.

Arm 1064 is basically the right arm and left arm in the previous model joined together. Referring to FIG. 66-C, it has a non-circular cavity 1064-2 at its midpoint to acept a hinge pin adaptor 1066 shaped to match the cavity.

Frame 1062 comprises of an elongated member having a back contoured to conform to the shape of the column it is mounted on. The front side has a flat surface 1062-6 running longitudinally along its center to house arm 1064. Going through to the other side of this flat surface is a hinge pin channel 1062-4 running up for about half the length of arm 1064. Behind the surface 1062-6 and surrounding the top of channel 1062-4 is a switching recess 1062-2 sized to allow free rotation of arm anchor 1068-2 and flange 1068-3 together with the rotation of the hinge pin body 1068-4. Recess 1062-2 also has a lower edge 1062-20 that is flat or level.

Assembly comprises of mounting the arm 1064 onto arm frame 1062 using hinge pin 1068 and pin adaptor 1066.

Hinge pin 1068 has a non-circular male connecting terminal 1068-6, a cylindrical body 1068-4, an arm anchor 1068-2, and a flange 1068-3.

Hinge pin adaptor 1066 has a non-circular body of cross-section matching cavity 1064-2 on arm 1064. Said non-circular body has a non-circular hollow 1066-2 matching connecting terminal 1068-6 of hinge pin 1068.

Mounting arm 1064 onto frame 1062 is as follows:
1. The hinge pin 1068 is pushed inside recess 1062-2 until its connecting terminal 1068-6 protrudes out in front of frame 1062.
2. The hinge pin adaptor 1066 is pushed through the front side of cavity 1064-2 of arm 1064.
3. Connecting terminal 1068-6 protruding out in step 1 is permanently mated with the matching hollow 1066-2 of hinge adaptor 1066 with adhesive or weld.

Note that hinge pin adaptor 1066 may be disposed of if the central cavity 1064-2 of arm 1064 can directly mate with the connecting terminal 1068-6 of hinge pin 1068.

Operation of Backpack Carrier for a Single Column II

Referring to FIG. 66-D, the operation is started with arm 1064 at an upright position. Arm anchor 1068-2 is resting on edge 1062-20 of switching cavity 1062-2. At this position, arm 1064 is not free to swing out to the right or to the left. The arm is lifted until the hinge pin body 1068-4 hits the top end of channel 10062-4. Then the arm is rotated clockwise or counter-clockwise until it is in horizontal position. The arm anchor 1068-2 is now in the vertical position and can slide down channel 1062-4. The horizontal arm 1064 at the bottom can now be used to anchor a backpack as shown in FIG. 62-B.

To fold away, the horizontal arm 1064 is lifted all the way up channel 1062-4 and then rotated clockwise or counter-clockwise until vertical and then pulled down slightly until arm anchor 1068-2 of pin 1068 finally rests on edge 1062-20 of recess 1062-2. Flange 1068-3 of hinge pin 1068 retains the arm 1064 on to frame 1062 at all times.

Considering that the mechanism is greatly dependent on hinge pin 1068 and hinge adaptor 1066, it is important that they be both made of sturdy metal and even enlarged. Cavity 1064-2, channel 1062-4, and recess 1062-2 are enlarged accordingly.

Backpack Harness

Referring to FIG. 67-A, a backpack harness is attachable to the pack carrier. This is used when the loaded bag is not a backpack yet the user wants to carry it as one. It can also be used if the backpack's own handle straps are not used because they are worn out or for quicker detaching of the backpack from a carrier that uses a one-piece padded back support. In this case, the backpack is still fastened to the carrier at the usual retaining points. The slack of the shoulder straps is contained between the backpack and the adjacent face of the padded back support. The cushioning envelope is not shown in FIG. 67-A to expose the attachment points of the harness. The handle of the bag can be wound around the knob of transverse bar as shown. An alternate flexible strap such as that shown in FIG. 27-D or the like can be used with the bag if it does not have an appropriate one for wounding.

One type of harness 1070 shown in FIGS. 67-B and 67-B' comprises of a main padded section 1070-1, three rings 1070-4, 1070-2, and 1070-20, a length of flexible strapping material 1070-6, and a fastener 1070-8. An exploded view of the three rings is shown on FIG. 67-B'. Ring 1070-4 is a ring with an opening large enough to receive the largest pair of tubes. It has a tiny hinge that allows it to open up to embrace said tubes. Another ring 1070-2 is a smaller version of ring 1070-4 but large enough to receive the cylindrical extension of caps 58R or 58L. Joining rings 1070-4 and 1070-2 is an even smaller ring 1070-20.

Ring 1070-4 is the attachment point for the upper end of the padded strap 1070-1 while ring 1070-2 prevents ring 1070-4 from slipping down tube 50R when not in use. Ring 170-20 allow both rings to be joined and movable normal to each other. Ring 1070-20 may also be attached permanently on the hinge section of and normal to ring 1070-2. This is simply to minimize its interference with the rotation of ring 1070-2 as it rotates around the cylindrical extension of caps 58R or 58L when ring 1070-4 gets lifted with the strap.

The lower end of strap 1070-1 has a flexible strap 1070-6 and buckle 1070-8 combination. The flexible strap is of length enough to wound around and over the rear corners of the platform of the carrier. An optional ring 1070-10 slidable outside the strapping material can also be provided to minimize winding of the strap before being fastened to the buckle.

Considering its ring components, harness 1070 lends its use more on carriers with tubular components that have round cross-sections.

Another type of harness 1072 shown in FIG. 67-C has a flexible strap and buckle combination at both ends of its padded strap. The upper strap is wound around the tube 50R or 50L and over the side extension of cap 58R or 58L and then buckled close. This type can be used with carriers having circular and non-circular tubular components.

Referring to FIG. 67-D, another type of harness 1074 has a flexible strap and buckle combination at the lower end of its padded strap. Its upper end of the padded strap has a shorter flexible strap terminated with a D ring that can accommodate entry of buckle 1070-8. This type of harness can be used upside down.

The attachment to a junction of the pack carrier of the strap and buckle combination with ring 1070-10 is shown in FIG. 67-E.

Still another type would be a two-piece harness similar to that mounted on a cushioning envelop shown in FIG. 23-E. The unpadded piece is terminated with a buckle on one end and a large D ring on the other. The padded piece is basically the same.

As discussed earlier, these harnesses can be integrated into the cushioning envelope of FIG. 23 provided the envelope is securely fastened onto the carrier.

Conclusion, Ramifications, and Scope of Invention

I have presented as many ramifications as I could regarding my invention starting with the basic versions and adding on options, improvements, and alternate means of effecting adjustments for base platforms and handles in my carriers. While I need to state the versions I currently prefer, these preferences are in no way indicative of what others may perceive because most of these versions are equally desirable depending on the type of backpack they prefer to have, the retaining means that is most easily adaptable to their way of thinking, the type of recumbent bike they have, their ability to afford the extra cost associated with improved versions, etc. Some of my preferences are described below.

I prefer a ground pack carrier with a main frame shown in FIG. 1 having a folding mechanism that can incline to various positions such as that shown in FIG. 25-E and having a self-adjusting tubular platform such as that shown in FIG. 25-G.

I prefer a pack carrier for upright bikes shown in FIG. 33-A for a platform base and FIG. 46A for a tubular base because they are easy to assemble and can be folded down to a rack. The addition of a self-adjusting front member make them work better but at an extra cost.

I prefer any of the pack carriers for recumbent bikes presented. The choices are numerous, most of them equally good, each applicable to specific types of backrest on the recumbent.

The grippers and knobs presented are all workable. Assuming my backpack has a handle strap, I prefer either of that shown in FIGS. 10-A and 10-B. I am somehow ingrained to the conventional idea that tightening or loosening something involves turning a knob. Others may prefer lifting or lowering a knob. Still others think a ratcheting type of motion is more in line with their way of thinking, and so forth. If my backpack does not have a flexible handle strap, I will prefer the clamp grips on FIGS. 31-D and 31-C because it can accommodate my backpack and all other backpacks with or without flexible handle straps. A pack carrier can be equipped with both of my preferred types of retaining means.

The one column pack carriers are all workable. I prefer the one assembled in FIGS. 62-A and 62-A'. The differences between the three versions are adequately discussed.

Having an attachment like the backpack strap lifters on FIGS. 32-A thru 32-G' is optional but desirable for reasons presented earlier. For the outer collapsible layer, I think the slinky type will be preferred by young kids over the other types. Older users will probably prefer the simpler coiled member that attaches to the handle bar shown in FIG. 32-JE. The different kinds of strap adaptors and rings presented are all workable. I prefer the pair of buckles shown in FIG. 32-F.

The harness is desirable inasmuch as it encourages one to get a pack carrier for his or her favorite non-backpack bag. I prefer the one shown in FIG. 67-D.

The padded back support I prefer is that shown in FIG. 23-E" because it can be useful on or off the pack carrier.

The seat option I prefer is that shown in FIG. 21-B.

The method of adjusting the height of the handle bar quasi-permanently that I prefer is shown in FIG. 7-A. It can be adapted for telescoping tubes of circular or rectangular cross-sections.

While my above illustrations and descriptions embody a carrier as a telescoping handle assembly having a definite number, location, and type of retaining means with an extendible tubular base, these should not be construed as limitations on the scope of my invention, but rather, as an example of possible embodiments thereof.

For example, the main frame may be made up of planar instead of tubular members or in a combination of both. The transverse bar disposed on the handle assembly may therefore just be fused with the planar frame, and the retaining means may be fixed or adjustably fixed on the face of said frame. There could also be a provision for one or more members with retaining means slidable along the rest of the main frame beyond the vertical span of the first transverse bar in order to also accommodate extra tall packs or cases having attachment means affixed to their tops.

The base may likewise be made up of planar instead of tubular members or in a combination of both. Planar or platform bases that are not self-adjusting may or may not have a topside extension. Also, more support members may be added to the proximal end of the underside of the back section of the base to provide extra middle support for very deep bases.

The main frames and extendible bases presented are independently novel, unique, and effective and can therefore be adapted together or separately to improve flexibility and performance of main frames and/or supporting bases of other pack carriers and wheeled backpacks introduced in the prior art.

Also, for example, my illustrations embody a fourth pair of tubes to illustrate the operation of the quasi-permanent height-adjustable telescoping handle assembly. The same idea can be applied to any assembly having at least one column made up of at least a pair of telescoping tubes.

Also, for example, the top retaining caps in the illustrations anticipate the use of the strap-lifting accessory and the front support members are terminated with ball bearings, however, these should not be construed as a limitation in scope.

Also, for example, more support members may be added to the proximal end of the underside of the back section of the base to provide extra support especially for very deep bases.

Also, the main frame for pack carriers on bike can be mounted by some means to either side of the bike wheels, one for each side if desired. This is shown in FIGS. 33-A' and 33-B'.

For example, a unique bracket 901 was introduced for use in retaining main frames of bike pack carriers in the upright position. This bracket can also find application in temporarily connecting side by side any pair of tubular members at a specific angle relative to each other.

Most importantly, my carriers are all founded on the idea that most packs can be secured at a set of strategic points where attachment means can be affixed. One set of these strategic points comprise a point proximal the juncture between the topside of the pack and the face of the pack against the main frame and points proximal the rear bottom corners of the pack. With the most popular type of luggage carrier, the backpack, no supplemental straps are necessary.

The handle and shoulder straps are sufficient. To reiterate, a carrier can be made that will have retaining means that can approximate the location of existing sets of strategic attachment points on various packs. Because various other types of packs can be affixed with supplemental attachment means that can also approximate an existing set of retaining means on a pack carrier, a very wide range of securing possibilities can be realized, thereby, providing a customized carrier for most needs at very little cost.

Accordingly, the scope of the invention should be determined by the appended claims and their legal equivalents.

I claim:

1. A main frame of a customizing pack carrier that can be integrated into different wheeled bases for transporting any commercially available non-customized pack, said pack having a top handle, a left closed loop strap, and a right closed loop strap, said main frame comprising:
   a) a frame face of size and shape adapted to have said pack secured thereon,
   b) wherein said frame face has a top frame edge, a left frame edge, and a right frame edge,
   c) wherein the lower end of said mainframe comprises of the lower ends of the left and right frame edges,
   d) pack attachment provisions comprising:
      a) a first releasable retaining means disposed on or proximal to said top frame edge for releasably securing said top handle or said left and right closed loop straps proximal to said top frame edge,
      b) a second releasable retaining means disposed on or proximal to the lower half of said left frame edge for securing said left closed loop strap,
      c) a third releasable retaining means disposed on or proximal to the lower half of said right frame edge for securing said right closed loop strap,
   e) wherein said first and second releasable retaining means comprise a selection from a group consisting of:
      a) a resilient fastening member having an inner surface, wherein said inner surface has a first section for mounting, at least one outwardly extending second section, followed by an inwardly extending third section, and finally ending with an outwardly extending fourth section for accepting and releasing the strap or top handle slung or wound therethrough, and
      b) a fastening member having an inner surface, said inner surface having a midsection for mounting and parts extending laterally from said midsection for accepting and retaining the strap or top handle wound around said midsection,
      c) a fastening member having an inner surface, said inner surface having a midsection for mounting, a first branch and a second branch each extending laterally from said midsection, wherein at least one of the first and second branches comprise an outwardly extending first section, followed by an inwardly extending second section, and finally by an outwardly extending third section for accepting and retaining the strap or top handle slung or wound therethrough,
   whereby a user can quickly attach and detach his or her non-customized pack from the main frame without the time consuming steps of untying and .tying, unbuckling and buckling, or opening and closing any straps on the pack and whereby when the main frame is integrated into a wheeled vehicle like a bike, a scooter, or a base with ground casters, a very effective, attractive, and economical alternative for transporting ordinary non-customized packs is provided.

2. The main frame in claim 1 further including behind said frame face a plurality of extensions for adapting and mounting to a wheeled support.

3. The main frame in claim 1 further including adjusting means to adjustably dispose the second and third releasable retaining means apart from said first releasable retaining means whereby the retaining means can be made to approximate the location of the top handle and straps on said pack.

4. The main frame in claim 3 wherein said adjusting means to adjustably dispose the second and third releasable retaining means apart from said first releasable retaining means comprises a selection from a group consisting of:
   a) providing a structure comprising:
      a) a first face member and a second face member,
      b) wherein the upper part of said frame face comprises of said first face member
      c) wherein the lower part of said frame face comprises of said second face member,
      d) wherein said first face member and said second member overlap each other and are slidably related,
      e) wherein the first releasable retaining means is disposed on said first face member,
      f) a main aperture disposed on said first face member,
      g) a snap button internally mounted to said first face member,
      h) wherein said snap button has a positioning head exposed outwardly through said main aperture,
      i) a plurality of secondary apertures vertically aligned on said second face member,
      j) wherein any of said secondary apertures is disposed adjacent said positioning head by urging inwardly said positioning head out of any said secondary aperture and sliding the first and second face members relative to each other until the desired secondary aperture is aligned with said positioning head, whereupon said positioning head lodges into the adjacent secondary aperture,
   b) providing a structure comprising:
      a) a first face member and a second face member,
      b) wherein the frame face comprises of the first and second face members,
      c) wherein said second face member horizontally overlap said first face member and are both slidably related,
      d) wherein either the first releasable retaining means or the second and third releasable retaining means are on said second face member,
      e) a main aperture on said second face member,
      f) a spring button mounted externally to said second face member,
      g) wherein said spring button has a positioning head capable of engaging inwardly through said main aperture and of being manipulated from behind,
      h) a plurality of secondary apertures aligned vertically along said first face member,
      i) wherein any of said secondary apertures is disposed adjacent said positioning head by urging outwardly said positioning head out of any said secondary aperture and sliding the second face member relative to the first face member and releasing said positioning head into the desired secondary aperture,
   c) providing a structure comprising:
      a) a first face member and a second face member,
      b) wherein said frame face comprises of said first face member and said second face member, c) wherein said second face member horizontally overlap said first face member and are both slidably related,
d) wherein either the first releasable retaining means or the second and third releasable retaining means are disposed on said second face member,
e) a lopsided friction knob mounted on said second face member,
f) a window disposed on said second face member,
g) wherein said friction knob has a head,
h) wherein said head is communicable to said first face member through said window,
whereby the friction between the friction knob head and outer walls of said first member maintains the position of two slidable members relative to each other,
d) providing a structure comprising:
a) a first face member and a second face member,
b) wherein the frame face comprises of said first and second face members,
c) wherein said first and second face members horizontally overlap each other and are both slidably related,
d) wherein the first releasable retaining means is on the first face member and the second and third releasable retaining means is on the second member,
whereby the connections between the retaining means and the attachment parts of said pack and the rigidity of said pack maintains the relative positions between the two slidable members,
e) further including additional retaining means at different levels of said left lower half frame edge and said right lower half frame edge upwardly approaching said top frame edge, whereby the addition of more attachment points even if only three are used at a time obviates the need for adjusting the location of said first retaining means relative to the first and second retaining means,
f) further including additional retaining means at different levels of said top frame edge downwardly approaching the right and left lower half frame edges,
g) providing a structure comprising:
a) a main first tubular member with threaded outside walls,
b) an adjusting ring with threaded inner walls,
c) wherein said threaded outside walls mate with said threaded inner walls,
d) a supporting connector having a tubular terminal received outside said first tubular member,
e) wherein the first retaining means is disposed on said supporting connector,
f) a side window is disposed on said tubular terminal for access into an inner cavity,
g) wherein said adjusting ring is disposed inside said inner cavity,
whereby the location of the tubular terminal and consequently the first releasable retaining means is defined by the position of said adjusting ring, said position being attained by threading through said side window said ring up or down said first tubular member, and
h) providing a structure comprising:
a) a main first tubular member with threaded outside walls,
b) a pair of adjusting rings with threaded inner walls,
c) wherein said threaded outside walls mate with said threaded inner walls,
d) a supporting connector having a tubular terminal received outside said first tubular member,
e) wherein the first releasable retaining means is disposed on said supporting connector,
f) wherein said adjusting rings each border the top and bottom of said tubular terminal,
whereby the positions of the pair of adjusting rings consequently define the location of the first releasable retaining means.

5. The main frame in claim 1 wherein said frame face comprises a single column having:
a) at lease one arm of length about the width of a pack, said arm centrally and rotatably arranged cross-wise on the lower end of said column,
b) wherein the right and left terminals of said arm are the said right frame edge and the said left frame edge respectively,
c) wherein the upper end of said column is the top frame edge, and
d) anchoring means to anchor said arm parallel-wise onto said column when not in use,
whereby a single column main frame on a wheeled base is a more compact carrier and can also be adapted for use on a scooter.

6. The main frame in claim 5 wherein the length of said arm is apportioned between two shorter arms, one end of each of said shorter arms emanate laterally from opposite sides of the lower end of said column, the other end of each of said shorter arms rotatably anchored onto the lower end of said column, wherein said shorter arms are each rotatably urged up towards said column and retained in place when not in use.

7. The main frame in claim 1 further including a supporting base comprising:
a) a base frame of size adapted to supporting the bottom of said pack,
b) wherein said base frame comprises a front section and a back section,
c) sliding means to slide the front and back sections relative to each other,
d) wherein said front section has a front edge,
e) connecting means to connect the lower end of said main frame to said back section,
f) wherein said second and third releasable retaining means disposed proximal the respective lower half of the left and right frame edges are disposed on said back section,
whereby the base can conform to the depth of the loaded pack to better stabilize it.

8. A main frame and supporting base combination in claim 7 wherein said front section has a topside extension proximal to said front edge for helping stabilize the pack on the carrier.

9. The main frame and supporting base combination of claim 7 wherein said back sections relative to each other comprises a selection from a group consisting of:
A. a first sliding means comprising:
a) providing a back right cavity and a back left cavity for said back section,
b) providing a front right cavity and front left cavity for said front section,
c) wherein said back right cavity connects to said front right cavity and runs continuously from a back right terminal to a front right terminal substantially on the right side of said base frame,
d) wherein said back left cavity connects to said front left cavity and runs continuously from a back left terminal to a front left terminal substantially on the left side of said base frame,
e) providing anchoring rods for all the back and front terminals,
f) providing an elongated right elastic member and an elongated left elastic member,
g) wherein one end of said right elastic member is anchored to the anchoring rods on said back right terminal,
h) wherein the other end of said right elastic member is anchored to the anchoring rods on said front right terminal,
i) wherein one end of said left elastic member is anchored to the anchoring rods on said back left terminal, and
j) wherein the other end of said left elastic member is anchored to the anchoring rods on said front left terminal,
   whereby pressure from the load directed normally toward said topside extension automatically draws out said front section thereby stabilizing the load at all times,
B. a second sliding means comprising:
   a) providing at least one of the sides of one of the sections with at least one substantially front-ward directed series of wavy indentations, each indentation having a crest and a trough,
   b) providing the other section with at least one flexing button comprising:
      a) a button head with a smoothly curved side and straight side opposite each other,
      b) an elongated section or neck extending substantially in the same general direction as said series of wavy indentations and capable of being lodged into any of the troughs,
      c) providing a separate rigid control member with one side disposed adjacent the straight side of said button head having a control contact protrusion terminating in a straight surface slidably related against said straight side of said button head, and
      d) wherein said rigid control member is externally controlled by to freely and fixedly lodge and dislodge said button from said trough of one of the indentations,
      whereby said back section and said front section are free to slide-past each other when said button head is freely able to dislodge from any indentation thereby allowing said base frame to be adjusted as needed to the depth of the load.
C. a third sliding means comprising:
   a) providing at least one of the sides of one of the sections with at least one substantially front-ward directed series of wavy indentations, each indentation having a crest and a trough,
   b) providing the other of the sections with the following:
      a) at least one flexing button having a smoothly curved button head fixedly connected by an elongated member to a user-controlled box,
      b) a smoothly curved channel lodging said flexing button and said elongated member,
      c) an elastic member or spring disposed inside a cavity wherein said elastic member is compressible by said user-controlled box,
   c) wherein said back and front sections are arranged such that said button head is capable of lodging into any of the troughs,
      whereby said flexing button and said elongated member are retracted along said smoothly curved channel as said user-controlled box is pulled toward said elastic member rendering both sections free to slide past each other.

10. The main frame in claim 1 further including a supporting base comprising:
   a) a base frame of size adapted to supporting the bottom of said pack, said base frame having an underside,
   b) connecting means for coupling said base frame to the lower end of said main frame
   c) wherein said second and third releasable retaining means disposed proximal to their respective lower half of the left and right frame edges are disposed on the base frame, and
   d) a plurality of extensions from said underside of said base frame for adapting and mounting to a wheeled support.

11. The main frame and supporting base combination in claim 10 further including rotating means to rotatably mount said main frame to said base frame between a position normal to said supporting base and a position folded onto said supporting base, further including folding means to retain said main frame in said normal and folded positions, whereby when said wheeled support is a bike, the resulting bike pack carrier can carry said pack upright or horizontally, and whereby when said wheeled support includes a set of casters, the folding option allows for compact storage of said combination.

12. A main frame and base combination in claim 10 further including:
   1) inclining means for inclining said main frame frontward selected from a group consisting of:
      a) providing for collapsible front support members,
      b) providing fixable hinged connection between said base frame and said main frame, and
      c) providing base support members of predetermined shape to allow rocking or rotational motion in conjunction with reinforced connection between said main frame and said base frame,
   2) provisions for a seat comprising:
      a) a first sheet of material of sufficient size for use as said seat,
      b) storing means for retaining said seat behind said pack on said carrier when not in use,
      c) holding means for attaching said seat onto said main frame and base combination,
      whereby the combination can be transformed into a backrest with seat even without unloading the pack from the carrier.

13. The main frame and base combination in claim 12 wherein said fixable hinged connection between said base frame and said main frame comprises:
   a) the following on one part of said fixable hinged connection:
      a) a circular hub having a normal centrally disposed cylindrical pin frame and a side window, said pin frame defining the axis of rotation of said hinged connection,
      b) a spring biased plug retained normally and rotatably on said pin frame in said hub by a compression spring, said plug having a locking member on one side and a button on one end, said button dimensionally receivable into said side window of said hub,
   b) the following on the other part of said fixable hinged connection:

a) a circular central recess having a central aperture for receiving an axis pin, said recess of size capable of receiving the rotating span of said locking member of said plug when said button of said plug is depressed, b) notches or recess extensions on the perimeter of said central recess, each capable of mating with said locking member when said button is not in its depressed position, wherein each notch corresponds to a specific relative position between said base frame and said main frame, and c) a hinge pin going through said pin frame and through said central aperture on said central recess, said pin being capped in place at both ends, whereby given the above provisions, operating said fixable hinge connection comprise depressing and maintaining depressed position of said button of said plug disposed outside said side window of said hub and urging one part of said hinge connection to rotate past the other part until the desired relative position of both parts is reached after which pressure on said button is released and said locking tooth locks into position inside one of said recess extension, whereby the operation is easy, quick, flexible and lockable in the inclined and fully folded positions.

14. The main frame in claim 1 wherein said frame face comprises a pair of elongated members spaced apart from each other by a base mounted to the bottom ends of said pair and by at least one transverse bar above said base wherein one of said transverse bars is said top frame edge.

15. The main frame in claim 14 wherein said elongated members are spaced parallel to each other each comprising at least one inner tube nested inside at least one outer tube.

16. The main frame in claim 15 wherein the pair of elongated members comprise a pair of nested tube assemblies, each assembly comprising one smallest tube nested inside a second largest tube nested inside a largest tube, wherein one end of the pair of largest tubes is mounted on said base, wherein the pair of smallest tubes is joined to each other on top by one of said transverse bars, wherein the pair of second largest tubes is joined to each other toward its upper end by another one of said transverse bars that is the top frame edge, whereby the nesting relationship between the largest and second largest pair of tubes allows said main frame to be used for packs of different heights.

17. The main frame in claim 15 further including height selecting means for allowing at least one pair of tubes, one tube from each of said pair of elongated members, to have a quasi-permanent extendible length, whereby users of substantially differing heights are accommodated by the same main frame without the hassle of adjusting the main frame each time it is extended.

18. The main frame in claim 15 wherein the nested inner and outer tubes each has a tapering cross-section whereby the tapered form obviates the use of top and bottom tube components for retaining the tubes with each other.

19. The main frame in claim 15 wherein the nested inner and outer tubes can be extended, retracted, and retained in their positions by snap button latching means comprising:

a) providing an inner tube nested within an outer tube, b) providing an aperture near one end of said inner tube, c) providing a series of apertures along the length of said outer tube, d) providing a snap button disposed inside said inner tube of said pair of nesting tubes, wherein said snap button has a positioning member, wherein said positioning member is engaged in said aperture on said inner tube and further capable of engaging into another aperture on said outer tube of said pair of nesting tubes, e) providing a catching extension of predetermined shape and dimension behind said positioning member, so that said extension can latch on to another bumper structure of shape and dimension determined in conjunction with those of said catching extension, f) providing a third elongated member dimensionally receivable inside said inner tube, said elongated member having a bottom terminal containing said bumper structure, g) delivering said third elongated member into said inner tube to reach a maintained position where its said bumper structure is capable of holding onto said catch extension when said catch extension is introduced, h) introducing said catch extension by pressing said positioning member of said snap button inward until the extension latches onto said bumper structure, i) moving the inner and outer tubes relative to each other until the desired position is reached, j) withdrawing said third elongated member from said inner tube to release said bumper structure from said catch extension, k) finely adjusting the positions of the inner and outer tubes relative to each other until said positioning member becomes engaged into the nearest aperture on said outer tube, whereby said snap button latching means easily enables only one person with at least one hand to perform height adjustments.

20. The main frame in claim 1 wherein said first releasable retaining means comprises a selection from a group consisting of:

a) rotary transmission means comprising a protrusion where said top handle of said pack can be wound around, wherein said protrusion is part of a user-controlled rotational segment whose rotation causes said top handle to draw said pack closer towards said main frame as is necessary after which rotation is deterred, b) clamping means comprising:
a) at least one clamp of size capable of enclosing at least one strap of said pack, said strap having a topside and an underside,
b) compression means to increase or decrease clamping pressure on said strap, c) a selection from a group consisting of fixed protrusions, knobs, cavities, hooks, cleats, rings, buckles, clips, hook and loop closures, ratchets, and latches, and cavities.

21. The main frame in claim 20 wherein said clamp in selection (b) comprises:

a) a member on said frame face having an underside for bounding the topside of said strap, b) a bottom clamp mate having a topside facing opposite said underside of said member for bounding the underside of said strap, c) a hinge connection to a hinge housing on one end of said clamp mate and a releasable connection to a closure on the opposite end of said clamp mate, d) wherein said hinge housing and said closure are both held by and slidably related in an up and down fashion to said frame face, e) a first compression spring dimensionally capable of receiving a top section of said hinge housing, f) a second compression spring dimensionally capable of receiving a top section of said closure, g) wherein the bottom ends of said first and second compression springs are supported by said frame face, h) wherein the top ends of said first compression spring and said second compression spring are bordered by a stopper member on said hinge housing and a stopper member on said closure respectively, whereby the presence of straps exerts normal forces onto adjacent surfaces including the topside of said bottom clamp mate and consequently onto said first and second compressive springs by virtue of the stopper member bordering the top ends of the springs.

22. The main frame in claim 20 wherein said clamp in selection (b) comprises:

a) a small flat type spring held on said frame face comprising one of more waves having an underside for bounding said topside of said strap, b) a bottom clamp mate having a topside facing opposite the underside of said flat-type spring for bounding the underside of said strap, c) hinge connection affixed to said frame face, d) closure connection affixed to said face at a predetermined distance from said hinge housing, e) wherein one end of said bottom clamp mate is attached to said hinge connection, f) wherein the other end of said bottom clamp mate is releasably connected to said closure connection, g) wherein one end of said flat-type spring is slidably anchored within borders of said hinge connection and the other is slidably anchored within borders of said closure connection, whereby the presence of straps directly exerts normal forces onto the adjacent underside of said flat-type spring.

23. The main frame in claim 20 wherein the rotation of said protrusion in selection (a) is deterred and allowed by control means comprising a selection from a group consisting of:

a) rotating a member of said rotational segment clockwise or counterclockwise about an axis normal to the direction of its strap-drawing rotation, wherein said clockwise rotation of said member increases contact between a member of said rotational segment and a section of said frame so that rotation is deterred, wherein said counter-clockwise rotation of said member decreases or eliminates said contact so that said rotation can proceed, b) pushing down or pulling up a member of said segment wherein pushing down said member increases contact between a member of said rotational segment and a section of said frame so that said rotation is deterred, wherein said pulling up of said member decreases or eliminates said contact so that said rotation can proceed, and c) sliding a controlling switch towards an off or an on position, wherein said switch is connected to another member that can directly block movement of the user-controlled rotational segment, whereby users can readily relate to the above control means as the normal conventional ways of tightening or loosening connections between things.

24. The main frame of claim 23 wherein said user-controlled rotational segment in (c) contains a ratchet mechanism that defines direction of rotation of said segment, wherein said ratchet mechanism operates through alternating, bi-directional motions imparted by a user on an accessible handle grip, wherein movement of said grip can be allowed and deterred.

25. The main frame in claim 20 wherein said clamp in selection (b) comprises:

a) a top clamping block held by and slidably related in an up and down fashion to said face of said main frame wherein said top clamping block has an underside surface for bounding the topside of said strap, b) a bottom clamp mate having a topside surface facing opposite the underside of said top clamping block for bounding the underside of said strap, wherein said bottom clamp has a hinge connection on one end to said main frame and a releasable connection on the opposite end also to said main frame.

26. The main frame in claim 25 wherein said compression means in selection (b) of claim 20 comprises a selection from a group consisting of:

a) providing an adjusting member of said face capable of exerting pressure when urged toward said top clamping block thereby causing the underside of said block to slide normally toward the facing stationary topside surface of said bottom clamping mate, wherein said pressure is decreased when said adjusting member is urged away from said top clamping block thereby causing the underside of said block to move normally away from the facing topside surface of said bottom clamping mate, b) providing the following provisions:

a) a clamp having dimensions designed to set the space between the underside surface of said top clamping block and the topside surface of said bottom clamp mate initially at close to nothing, b) compressive springs disposed normally between the topside of said clamping block and said face of said frame held in place by extensions on said face that retract into said topside of said clamping block when the springs are compressed, whereby the presence of straps directly exerts normal forces onto the adjacent underside of said top clamping block and consequently onto said compressive springs, whereby the resisting compressive forces exerted by said springs allow the topside and underside surfaces to maintain a snug grip on said strap.

27. A method of releasably securing a backpack, said backpack having a back face, top handle and left and right shoulder straps with flexible lower portions, to a main frame of a pack carrier comprising:

a) providing a main frame of size capable of supporting the back face of a backpack, said main frame having a bottom right corner, a bottom left corner and a top edge, and b) providing the main frame with a right retaining means disposed on or proximal the bottom right corner of the main frame, and c) providing the main frame with a left retaining means disposed on or proximal the bottom left corner of the main frame, and d) providing the main frame with a top retaining means disposed on or proximal the top edge of the main frame, and e) securing the top handle or the upper ends of the shoulder straps onto the top retaining means, and f) securing the flexible lower portion of the right shoulder strap of the backpack onto said right retaining means, and g) securing the flexible lower portion of the left shoulder strap of the backpack onto said left retaining means, and h) wherein the method of securing the flexible lower portions comprises a selection from a group consisting of the following:
  1.) providing at least one obstruction to each of the flexible straps and slinging the strap onto their respective left and right retaining means, the obstruction abutting movement of each of the straps in at least one direction, and
  2.) providing a ring to each of the flexible straps and slinging the ring onto their respective left and right retaining means, the ring abutting movement of each of the straps, and
  3.) directly winding the flexible straps around their respective left and right retaining means, i) wherein the method of securing the top handle or the upper ends of the shoulder straps comprises a selection from a group consisting of the following:
  1.) hanging said top handle onto said top retaining means,
  2.) winding said top handle onto said top retaining means,
  3.) clamping said top handle or the upper ends of the shoulder straps onto said top retaining means, j) wherein the method of releasing the retained straps comprise the reverse of the securing process.

* * * * *